US008694459B2

(12) United States Patent
Zadeh

(10) Patent No.: US 8,694,459 B2
(45) Date of Patent: Apr. 8, 2014

(54) SYSTEM AND METHOD FOR IMAGE RECOGNITION AND MATCHING FOR TARGETED ADVERTISEMENT

(71) Applicant: Lotfi A. Zadeh, Berkeley, CA (US)

(72) Inventor: Lotfi A. Zadeh, Berkeley, CA (US)

(73) Assignee: Z Advanced Computing, Inc., Potomac, MD (US)

( * ) Notice: Subject to any disclaimer, the term of this patent is extended or adjusted under 35 U.S.C. 154(b) by 0 days.

(21) Appl. No.: 13/953,047

(22) Filed: Jul. 29, 2013

(65) Prior Publication Data

US 2013/0330008 A1   Dec. 12, 2013

Related U.S. Application Data

(63) Continuation of application No. 13/621,135, filed on Sep. 15, 2012, now Pat. No. 8,515,890, which is a (Continued)

(51) Int. Cl.
*G06F 17/00* (2006.01)
*G06N 5/02* (2006.01)

(52) U.S. Cl.
USPC ............................................................ 706/48

(58) Field of Classification Search
USPC .......................................................... 706/48
See application file for complete search history.

(56) References Cited

U.S. PATENT DOCUMENTS

| | | | |
|---|---|---|---|
| 7,689,529 B2 | 3/2010 | Fung et al. |
| 7,697,761 B2 | 4/2010 | Napper |
| 7,698,236 B2 | 4/2010 | Cox et al. |
| 7,721,336 B1 | 5/2010 | Adjaoute |
| 7,734,400 B2 | 6/2010 | Gayme et al. |
| 7,734,451 B2 | 6/2010 | MacArthur et al. |
| 7,739,337 B1 | 6/2010 | Jensen |
| 7,742,103 B1 | 6/2010 | He et al. |
| 7,761,742 B2 | 7/2010 | Di Palma et al. |

(Continued)

OTHER PUBLICATIONS

The Concept of A Z-Number—Toward a Higher Level of Generality in Uncertain Computation Lotfi A. Zadeh Computer Science Division Department of EECS UC Berkeley.*

(Continued)

*Primary Examiner* — Kakali Chaki
*Assistant Examiner* — Ababacar Seck
(74) *Attorney, Agent, or Firm* — Saied Tadayon; Bijan Tadayon

(57) ABSTRACT

The current specification covers various new algorithms, methods, and systems for, e.g., image recognition (e.g., for action, gesture, emotion, expression, biometrics, fingerprint, facial, OCR (text recognition), background, relationship, position, pattern, and object), machine learning, training schemes, feature space, clustering, classification, similarity measures, optimization, search engine, ranking, question-answering system, soft (fuzzy or unsharp) boundaries/impreciseness/fuzziness in language, clustering, and recognition, Natural Language Processing (NLP), Computing with Words (CWW), parsing, machine translation, sound and speech recognition, video search and analysis (e.g. tracking), image annotation, geometrical abstraction, image correction, semantic web, context analysis, data reliability (e.g., using Z-number (e.g., "About 45 minutes; Very sure")), rules engine, control system, autonomous vehicle, system diagnosis, medical diagnosis, biomedicine, large number of images analytics, event prediction, financial forecasting, economics, risk assessment, e-mail management, database management, indexing and join operation, memory management, data compression, and crowd-sourcing (using experts or humans).

20 Claims, 178 Drawing Sheets

Related U.S. Application Data

(63) continuation of application No. 13/621,164, filed on Sep. 15, 2012, now Pat. No. 8,463,735, which is a continuation of application No. 13/423,758, filed on Mar. 19, 2012, now Pat. No. 8,311,973.

(60) Provisional application No. 61/538,824, filed on Sep. 24, 2011.

(56) References Cited

U.S. PATENT DOCUMENTS

| | | | |
|---|---|---|---|
| 7,769,512 | B2 | 8/2010 | Norris et al. |
| 7,783,580 | B2 | 8/2010 | Huang et al. |
| 7,784,295 | B2 | 8/2010 | McCormick et al. |
| 7,792,746 | B2 | 9/2010 | Del Callar et al. |
| 7,792,750 | B2 | 9/2010 | Moeller |
| 7,797,268 | B2 | 9/2010 | Bigus et al. |
| 7,801,840 | B2 | 9/2010 | Repasi et al. |
| 7,805,396 | B2 | 9/2010 | Wagner et al. |
| 7,805,397 | B2 | 9/2010 | Kurian et al. |
| 7,805,984 | B2 | 10/2010 | McLain et al. |
| 7,817,854 | B2 | 10/2010 | Taylor |
| 7,832,511 | B2 | 11/2010 | Syed et al. |
| 7,836,496 | B2 | 11/2010 | Chesla et al. |
| 7,840,500 | B2 | 11/2010 | Khanbaghi |
| 7,844,564 | B2 | 11/2010 | Donohue et al. |
| 7,853,538 | B2 | 12/2010 | Hildebrand |
| 7,857,976 | B2 | 12/2010 | Bissler et al. |
| 7,864,552 | B2 | 1/2011 | Heber et al. |
| 7,869,989 | B1 | 1/2011 | Harvey et al. |
| 7,895,135 | B2 | 2/2011 | Norris et al. |
| 7,925,874 | B1 | 4/2011 | Zaitsev |
| 7,930,265 | B2 | 4/2011 | Akelbein et al. |
| 7,934,499 | B2 | 5/2011 | Berthon-Jones |
| 7,941,350 | B2 | 5/2011 | Ginsburg et al. |
| 7,966,061 | B2 | 6/2011 | Al-Abed et al. |
| 7,974,455 | B2 | 7/2011 | Peters et al. |
| 7,991,754 | B2 | 8/2011 | Maizel et al. |
| 7,999,857 | B2 | 8/2011 | Bunn et al. |
| 8,004,544 | B1 | 8/2011 | Zhang et al. |
| 8,015,196 | B2 | 9/2011 | Taranenko et al. |
| 8,016,319 | B2 | 9/2011 | Winkler et al. |
| 8,054,592 | B2 | 11/2011 | Rivers, Jr. |
| 8,077,983 | B2 | 12/2011 | Qiu et al. |
| 8,108,207 | B1 | 1/2012 | Harvey et al. |

OTHER PUBLICATIONS

A Note on Z-numbers Lotfi A. Zadeh ⇑, 1 Department of EECS, University of California, Berkeley, CA 94720-1776, United States.*

The Concept of A Z-Number—A New Direction in Uncertain Computation Lotfi A. Zadeh Computer Science Division Department of EECS UC Berkeley IRI 2011 Aug 3, 2011 Las Vegas.*

Ali Sanayei, titled "Towards a complexity theory: Theoratical foundations and practical applications", submitted to Satellite Meeting Unraveling and Controlling Discrete Dynamical Systems, on Jun. 17, 2011. No page number, volume number, or publisher's location mentioned. (Paper dedicated to Professor Lotfi A. Zadeh, et al., by the author).

Ronald Yager, titled "On Z-valuations using Zadeh's Z-numbers", International Journal of Intelligent Systems, vol. 27, Issue 3, pp. 259-278, Mar. 2012, Wiley Periodicals, Inc. The online version first published on Jan. 20, 2012. No publisher's location mentioned.

\* cited by examiner

| Fact/Proposition | Candidate Probability Distributions $p_1(x)$ .... $p_i(x)$ .... $p_m(x)$ | | |
|---|---|---|---|
| $A_j^*$, e.g., $(A_j, B_j)$ | $p_{1,j}^*$ | $p_{i,j}^*$ | $p_{m,j}^*$ |
| $Z_q = (C_q, D_q)$ | $ts_{1,q}$ | $ts_{i,q}$ | $ts_{m,q}$ |
| X is $E_k$ | $s_{1,k}$ | $s_{i,k}$ | $s_{m,k}$ |
| ∧ operation on test scores | $t_1$ | $t_i$ | $t_m$ |

(rows 2–4: test scores)

FIG 125(a)

SYSTEM AND METHOD FOR IMAGE RECOGNITION AND MATCHING FOR TARGETED ADVERTISEMENT

RELATED APPLICATION

The current application is a Continuation of another application Ser. No. 13/621,135, filed Sep. 15, 2012, now allowed, which is also a Continuation of Ser. No. 13/621,164, filed Sep. 15, 2012, now issued as U.S. Pat. No. 8,463,735, which is a Continuation of another application Ser. No. 13/423,758, filed Mar. 19, 2012, now issued as U.S. Pat. No. 8,311,973, which, in turn, claims the benefit of the U.S. provisional application No. 61/538,824, filed on Sep. 24, 2011. The current application incorporates by reference all of the teachings in all the applications mentioned above, including all its appendices and attachments, and it claims benefits of the earlier filing dates of the provisional and utility applications mentioned above.

RELATED ATTACHED APPENDICES TO SPECIFICATION

In addition to the provisional case above, the teachings of all 33 packages (the PDF files, named "Packages 1-33") attached with this filing (as Appendices) are incorporated herein to this current disclosure. Please note that Packages 1-33 are also the inventor's own teachings, and thus, they may be referred to (from time-to-time) for further details or explanations, by the reader, if needed.

Please note that Packages 1-25 had already been submitted (and filed) with our provisional application.

Packages 1-12 and 15-22 are marked accordingly at the bottom of each page or slide (as the identification). The other Packages (Packages 13-14 and 23-33) are identified here:

Package 13: 1 page, with 3 slides, starting with "FIG. 1. Membership function of A and probability density function of X"

Package 14: 1 page, with 5 slides, starting with "FIG. 1. f-transformation and f-geometry. Note that fuzzy figures, as shown, are not hand drawn. They should be visualized as hand drawn figures."

Package 23: 2-page text, titled "The Concept of a Z-number—a New Direction in Computation, Lotfi A. Zadeh, Abstract" (dated Mar. 28, 2011)

Package 24: 2-page text, titled "Prof. Lotfi Zadeh, The Z-mouse—a visual means of entry and retrieval of fuzzy data"

Package 25: 12-page article, titled "Toward Extended Fuzzy Logic—A First Step, Abstract"

Package 26: 2-page text, titled "Can mathematics deal with computational problems which are stated in a natural language?, Lotfi A. Zadeh, Sep. 30, 2011, Abstract" (Abstract dated Sep. 30, 2011)

Package 27: 15 pages, with 131 slides, titled "Can Mathematics Deal with Computational Problems Which are Stated in a Natural Language?, Lotfi A. Zadeh" (dated Feb. 2, 2012)

Package 28: 14 pages, with 123 slides, titled "Can Mathematics Deal with Computational Problems Which are Stated in a Natural Language?, Lotfi A. Zadeh" (dated Oct. 6, 2011)

Package 29: 33 pages, with 289 slides, titled "Computing with Words—Principal Concepts and Ideas, Lotfi A. Zadeh" (dated Jan. 9, 2012)

Package 30: 23 pages, with 205 slides, titled "Computing with Words—Principal Concepts and Ideas, Lotfi A. Zadeh" (dated May 10, 2011)

Package 31: 3 pages, with 25 slides, titled "Computing with Words—Principal Concepts and Ideas, Lotfi A. Zadeh" (dated Nov. 29, 2011)

Package 32: 9 pages, with 73 slides, titled "Z-NUMBERS—A NEW DIRECTION IN THE ANALYSIS OF UNCERTAIN AND IMPRECISE SYSTEMS, Lotfi A. Zadeh" (dated Jan. 20, 2012)

Package 33: 15 pages, with 131 slides, titled "PRECISIATION OF MEANING—A KEY TO SEMANTIC COMPUTING, Lotfi A. Zadeh" (dated Jul. 22, 2011)

BACKGROUND OF THE INVENTION

Professor Lotfi A. Zadeh, the inventor of the current disclosure, is the "Father of Fuzzy Logic". He first introduced the concept of Fuzzy Set and Fuzzy Theory in his famous paper, in 1965 (as a professor of University of California, at Berkeley). Since then, many people have worked on the Fuzzy Logic technology and science. Dr. Zadeh has also developed many other concepts related to Fuzzy Logic. The last revolutionary one is called Z-numbers, named after him ("Z" from Zadeh), which is the subject of the current invention. That is, the embodiments of the current invention are based on or related to Z-numbers and Fuzzy Logic. The concept of Z-numbers was first published in a recent paper, by Dr. Zadeh, called "A Note on Z-Numbers", Information Sciences 181 (2011) 2923-2932.

In the real world, uncertainty is a pervasive phenomenon. Much of the information on which decisions are based is uncertain. Humans have a remarkable capability to make rational decisions based on information which is uncertain, imprecise and/or incomplete. Formalization of this capability is a purpose of this invention.

Here are some of the publications on the related subjects:

[1] R. Ash, Basic Probability Theory, Dover Publications, 2008.

[2] J-C. Buisson, Nutri-Educ, a nutrition software application for balancing meals, using fuzzy arithmetic and heuristic search algorithms, Artificial Intelligence in Medicine 42, (3), (2008) 213-227.

[3] E. Trillas, C. Moraga, S. Guadarrama, S. Cubillo and E. Castiñeira, Computing with Antonyms, In: M. Nikravesh, J. Kacprzyk and L. A. Zadeh (Eds.), Forging New Frontiers: Fuzzy Pioneers I, Studies in Fuzziness and Soft Computing Vol 217, Springer-Verlag, Berlin Heidelberg 2007, pp. 133-153.

[4] R. R. Yager, On measures of specificity, In: O. Kaynak, L. A. Zadeh, B. Turksen, I. J. Rudas (Eds.), Computational Intelligence: Soft Computing and Fuzzy-Neuro Integration with Applications, Springer-Verlag, Berlin, 1998, pp. 94-113.

[5] L. A. Zadeh, Calculus of fuzzy restrictions, In: L. A. Zadeh, K. S. Fu, K. Tanaka, and M. Shimura (Eds.), Fuzzy sets and Their Applications to Cognitive and Decision Processes, Academic Press, New York, 1975, pp. 1-39.

[6] L. A. Zadeh, The concept of a linguistic variable and its application to approximate reasoning,
Part I: Information Sciences 8 (1975) 199-249;
Part II: Information Sciences 8 (1975) 301-357;
Part III: Information Sciences 9 (1975) 43-80.

[7] L. A. Zadeh, Fuzzy logic and the calculi of fuzzy rules and fuzzy graphs, Multiple-Valued Logic 1, (1996) 1-38.

[8] L. A. Zadeh, From computing with numbers to computing with words—from manipulation of measurements to manipulation of perceptions, IEEE Transactions on Circuits and Systems 45, (1999) 105-119.

[9] L. A. Zadeh, The Z-mouse—a visual means of entry and retrieval of fuzzy data, posted on BISC Forum, Jul. 30, 2010. A more detailed description may be found in Computing with Words—principal concepts and ideas, Colloquium PowerPoint presentation, University of Southern California, Los Angeles, Calif., Oct. 22, 2010.

As one of the applications mentioned here in this disclosure, for comparisons, some of the search engines or question-answering engines in the market (in the recent years) are (or were): Google®, Yahoo®, Autonomy, IBM®, Fast Search, Powerset® (by Xerox® PARC and bought by Microsoft®), Microsoft® Bing, Wolfram®, AskJeeves, Collarity, Vivisimo®, Endeca®, Media River, Hakia®, Ask.com®, AltaVista, Excite, Go Network, HotBot®, Lycos®, Northern Light, and Like.com.

Other references on related subjects are:

[1] A. R. Aronson, B. E. Jacobs, J. Minker, A note on fuzzy deduction, J. ACM27 (4) (1980), 599-603.

[2] A. Bardossy, L. Duckstein, Fuzzy Rule-based Modelling with Application to Geophysical, Biological and Engineering Systems, CRC Press, 1995.

[3] T. Berners-Lee, J. Hendler, O. Lassila, The semantic web, Scientific American 284 (5) (2001), 34-43.

[4] S. Brin, L. Page, The anatomy of a large-scale hypertextual web search engine, Computer Networks 30 (1-7) (1998), 107-117.

[5] W. J. H. J. Bronnenberg, M. C. Bunt, S. P. J. Lendsbergen, R. H. J. Scha, W. J. Schoenmakers, E. P. C. van Utteren, The question answering system PHLIQA1, in: L. Bola (Ed.), Natural Language Question Answering Systems, Macmillan, 1980.

[6] L. S. Coles, Techniques for information retrieval using an inferential question-answering system with natural language input, SRI Report, 1972.

[7] A. Di Nola, S. Sessa, W. Pedrycz, W. Pei-Zhuang, Fuzzy relation equation under a class of triangular norms: a survey and new results, in: Fuzzy Sets for Intelligent Systems, Morgan Kaufmann Publishers, San Mateo, Calif., 1993, pp. 166-189.

[8] A. Di Nola, S. Sessa, W. Pedrycz, E. Sanchez, Fuzzy Relation Equations and their Applications to Knowledge Engineering, Kluwer Academic Publishers, Dordrecht, 1989.

[9] D. Dubois, H. Prade, Gradual inference rules in approximate reasoning, Inform. Sci. 61 (1-2) (1992), 103-122.

[10] D. Filev, R. R. Yager, Essentials of Fuzzy Modeling and Control, Wiley-Interscience, 1994.

[11] J. A. Goguen, The logic of inexact concepts, Synthese 19 (1969), 325-373.

[12] M. Jamshidi, A. Titli, L. A. Zadeh, S. Boverie (Eds.), Applications of Fuzzy Logic—Towards High Machine Intelligence Quotient Systems, Environmental and Intelligent Manufacturing Systems Series, vol. 9, Prentice-Hall, Upper Saddle River, N.J., 1997.

[13] A. Kaufmann, M. M. Gupta, Introduction to Fuzzy Arithmetic: Theory and Applications, Van Nostrand, N.Y., 1985.

[14] D. B. Lenat, CYC: a large-scale investment in knowledge infrastructure, Comm.ACM38 (11) (1995), 32-38.

[15] E. H. Mamdani, S. Assilian, An experiment in linguistic synthesis with a fuzzy logic controller, Int. J. Man-Machine Studies 7 (1975), 1-13.

[16] J. R. McSkimin, J. Minker, The use of a semantic network in a deductive question-answering system, in: IJCAI, 1977, pp. 50-58.

[17] R. E. Moore, Interval Analysis, SIAM Studies in Applied Mathematics, vol. 2, Philadelphia, Pa., 1979.

[18] M. Nagao, J. Tsujii, Mechanism of deduction in a question-answering system with natural language input, in: ICJAI, 1973, pp. 285-290.

[19] B. H. Partee (Ed.), Montague Grammar, Academic Press, New York, 1976.

[20] W. Pedrycz, F. Gomide, Introduction to Fuzzy Sets, MIT Press, Cambridge, Mass., 1998.

[21] F. Rossi, P. Codognet (Eds.), Soft Constraints, Special issue on Constraints, vol. 8, N. 1, Kluwer Academic Publishers, 2003.

[22] G. Shafer, A Mathematical Theory of Evidence, Princeton University Press, Princeton, N.J., 1976.

[23] M. K. Smith, C. Welty, D. McGuinness (Eds.), OWL Web Ontology Language Guide, W3C Working Draft 31, 2003.

[24] L. A. Zadeh, Fuzzy sets, Inform. and Control 8 (1965), 338-353.

[25] L. A. Zadeh, Probability measures of fuzzy events, J. Math. Anal. Appl. 23 (1968), 421-427.

[26] L. A. Zadeh, Outline of a new approach to the analysis of complex systems and decision processes, IEEE Trans. on Systems Man Cybernet. 3 (1973), 28-44.

[27] L. A. Zadeh, On the analysis of large scale systems, in: H. Gottinger (Ed.), Systems Approaches and Environment Problems, Vandenhoeck and Ruprecht, Gottingen, 1974, pp. 23-37.

[28] L. A. Zadeh, The concept of a linguistic variable and its application to approximate reasoning, Part I, Inform. Sci. 8 (1975), 199-249; Part II, Inform. Sci. 8 (1975), 301-357; Part III, Inform. Sci. 9 (1975), 43-80.

[29] L. A. Zadeh, Fuzzy sets and information granularity, in: M. Gupta, R. Ragade, R. Yager (Eds.), Advances in Fuzzy Set Theory and Applications, North-Holland Publishing Co, Amsterdam, 1979, pp. 3-18.

[30] L. A. Zadeh, A theory of approximate reasoning, in: J. Hayes, D. Michie, L. I. Mikulich (Eds.), Machine Intelligence, vol. 9, Halstead Press, New York, 1979, pp. 149-194.

[31] L. A. Zadeh, Test-score semantics for natural languages and meaning representation via PRUF, in: B. Rieger (Ed.), Empirical Semantics, Brockmeyer, Bochum, W. Germany, 1982, pp. 281-349. Also Technical Memorandum 246, AI Center, SRI International, Menlo Park, Calif., 1981.

[32] L. A. Zadeh, A computational approach to fuzzy quantifiers in natural languages, Computers and Mathematics 9 (1983), 149-184.

[33] L. A. Zadeh, A fuzzy-set-theoretic approach to the compositionality of meaning propositions, dispositions and canonical forms, J. Semantics 3 (1983), 253-272.

[34] L. A. Zadeh, Precisiation of meaning via translation into PRUF, in: L. Vaina, J. Hintikka (Eds.), Cognitive Constraints on Communication, Reidel, Dordrecht, 1984, pp. 373-402.

[35] L. A. Zadeh, Outline of a computational approach to meaning and knowledge representation based on a concept of a generalized assignment statement, in: M. Thoma, A. Wyner (Eds.), Proceedings of the International Seminar on Artificial Intelligence and Man—Machine Systems, Springer-Verlag, Heidelberg, 1986, pp. 198-211.

[36] L. A. Zadeh, Fuzzy logic and the calculi of fuzzy rules and fuzzy graphs, Multiple-Valued Logic 1 (1996), 1-38.

[37] L. A. Zadeh, Toward a theory of fuzzy information granulation and its centrality in human reasoning and fuzzy logic, Fuzzy Sets and Systems 90 (1997), 111-127.

[38] L. A. Zadeh, From computing with numbers to computing with words—from manipulation of measurements to manipulation of perceptions, IEEE Trans. on Circuits and Systems 45 (1) (1999), 105-119.

[39] L. A. Zadeh, Toward a perception-based theory of probabilistic reasoning with imprecise probabilities, J. Statist. Plann. Inference 105 (2002), 233-264.

[40] L. A. Zadeh, Precisiated natural language (PNL), AI Magazine 25 (3) (2004), 74-91.

[41] L. A. Zadeh, A note on web intelligence, world knowledge and fuzzy logic, Data and Knowledge Engineering 50 (2004), 291-304.

[42] L. A. Zadeh, Toward a generalized theory of uncertainty (GTU)—an outline, Inform. Sci. 172 (2005), 1-40.

[43] J. Arjona, R. Corchuelo, J. Pena, D. Ruiz, Coping with web knowledge, in: Advances in Web Intelligence, Springer-Verlag, Berlin, 2003, pp. 165-178.

[44] A. Bargiela, W. Pedrycz, Granular Computing—An Introduction, Kluwer Academic Publishers, Boston, 2003.

[45] Z. Bubnicki, Analysis and Decision Making in Uncertain Systems, Springer-Verlag, 2004.

[46] P. P. Chen, Entity-relationship Approach to Information Modeling and Analysis, North-Holland, 1983.

[47] M. Craven, D. DiPasquo, D. Freitag, A. McCallum, T. Mitchell, K. Nigam, S. Slattery, Learning to construct knowledge bases from the world wide web, Artificial Intelligence 118 (1-2) (2000), 69-113.

[48] M. J. Cresswell, Logic and Languages, Methuen, London, UK, 1973.

[49] D. Dubois, H. Prade, On the use of aggregation operations in information fusion processes, Fuzzy Sets and Systems 142 (1) (2004), 143-161.

[50] T. F. Gamat, Language, Logic and Linguistics, University of Chicago Press, 1996.

[51] M. Mares, Computation over Fuzzy Quantities, CRC, Boca Raton, Fla., 1994.

[52] V. Novak, I. Perfilieva, J. Mockor, Mathematical Principles of Fuzzy Logic, Kluwer Academic Publishers, Boston, 1999.

[53] V. Novak, I. Perfilieva (Eds.), Discovering the World with Fuzzy Logic, Studies in Fuzziness and Soft Computing, Physica-Verlag, Heidelberg, 2000.

[54] Z. Pawlak, Rough Sets: Theoretical Aspects of Reasoning about Data, Kluwer Academic Publishers, Dordrecht, 1991.

[55] M. K. Smith, C. Welty, What is ontology? Ontology: towards a new synthesis, in: Proceedings of the Second International Conference on Formal Ontology in Information Systems, 2002.

However, none of the prior art teaches the features mentioned in our invention disclosure.

SUMMARY OF THE INVENTION

Decisions are based on information. To be useful, information must be reliable. Basically, the concept of a Z-number relates to the issue of reliability of information. A Z-number, Z, has two components, Z=(A,B). The first component, A, is a restriction (constraint) on the values which a real-valued uncertain variable, X, is allowed to take. The second component, B, is a measure of reliability (certainty) of the first component. Typically, A and B are described in a natural language. Example: (about 45 minutes, very sure). An important issue relates to computation with Z-numbers. Examples are: What is the sum of (about 45 minutes, very sure) and (about 30 minutes, sure)? What is the square root of (approximately 100, likely)? Computation with Z-numbers falls within the province of Computing with Words (CW or CWW). In this disclosure, the concept of a Z-number is introduced and methods of computation with Z-numbers are shown. The concept of a Z-number has many applications, especially in the realms of economics, decision analysis, risk assessment, prediction, anticipation, rule-based characterization of imprecise functions and relations, and biomedicine. Different methods, applications, and systems are discussed. Other Fuzzy concepts are also discussed.

BRIEF DESCRIPTION OF THE DRAWINGS

FIGS. 12(k)-(l) depict a restriction on probability measure, in one embodiment.

FIG. 84 is a system for the search engine.

FIG. 85 is a system for the pattern recognition and search engine.

FIG. 86 is a system of relationships and designations for the pattern recognition and search engine.

FIG. 87 is a system for the search engine.

FIG. 88 is a system for the recognition and search engine.

FIG. 89 is a system for the recognition and search engine.

FIG. 90 is a method for the multi-step recognition and search engine.

FIG. 91 is a method for the multi-step recognition and search engine.

FIG. 92 is a method for the multi-step recognition and search engine.

FIG. 93 is an expert system.

FIG. 94 is a system for stock market.

FIG. 95 is a system for insurance.

Figure 96:
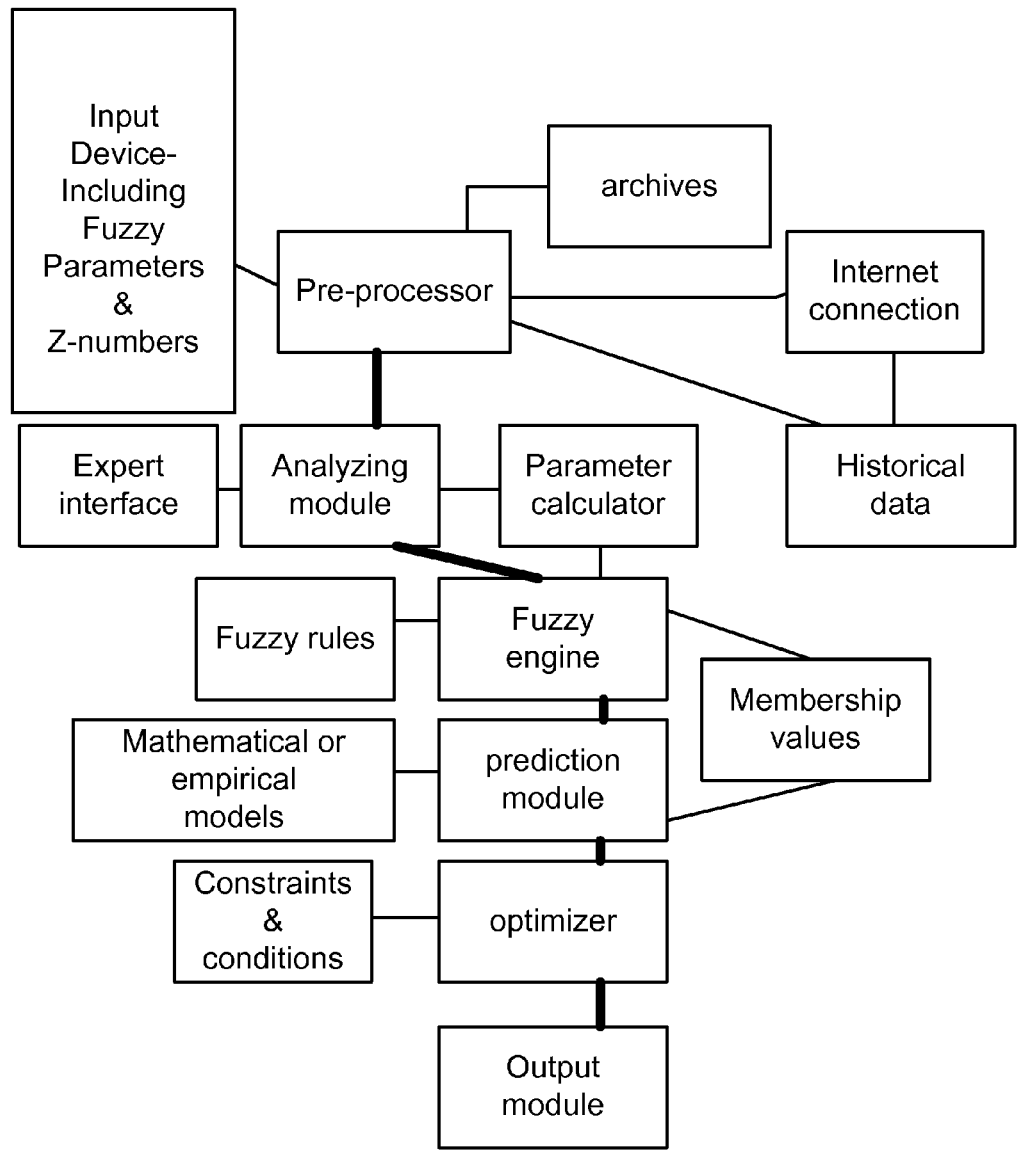

FIG. 96 is a system for prediction or optimization.

Figure 97:
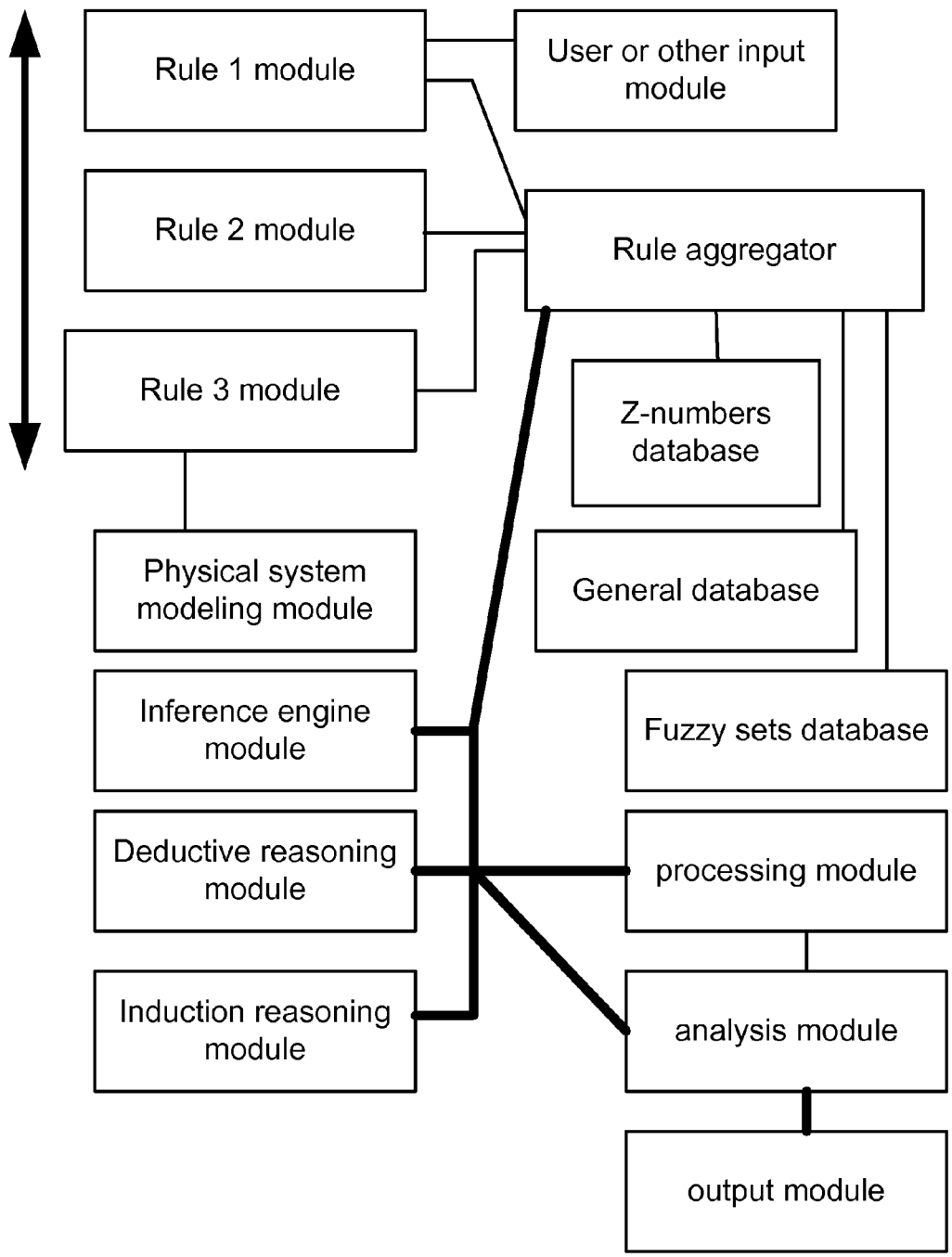

FIG. 97 is a system based on rules.

Figure 98:
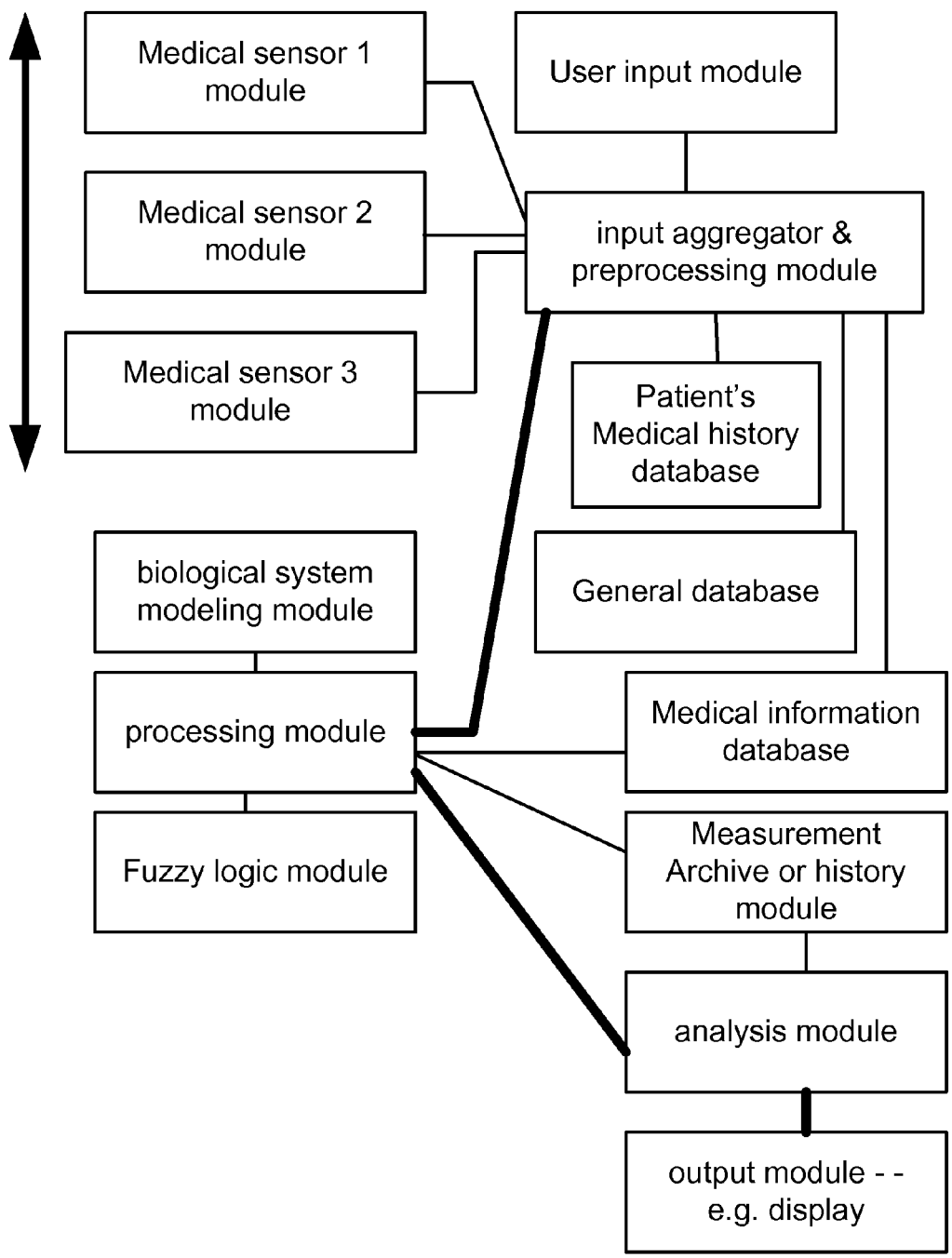

FIG. 98 is a system for a medical equipment.

Figure 99:
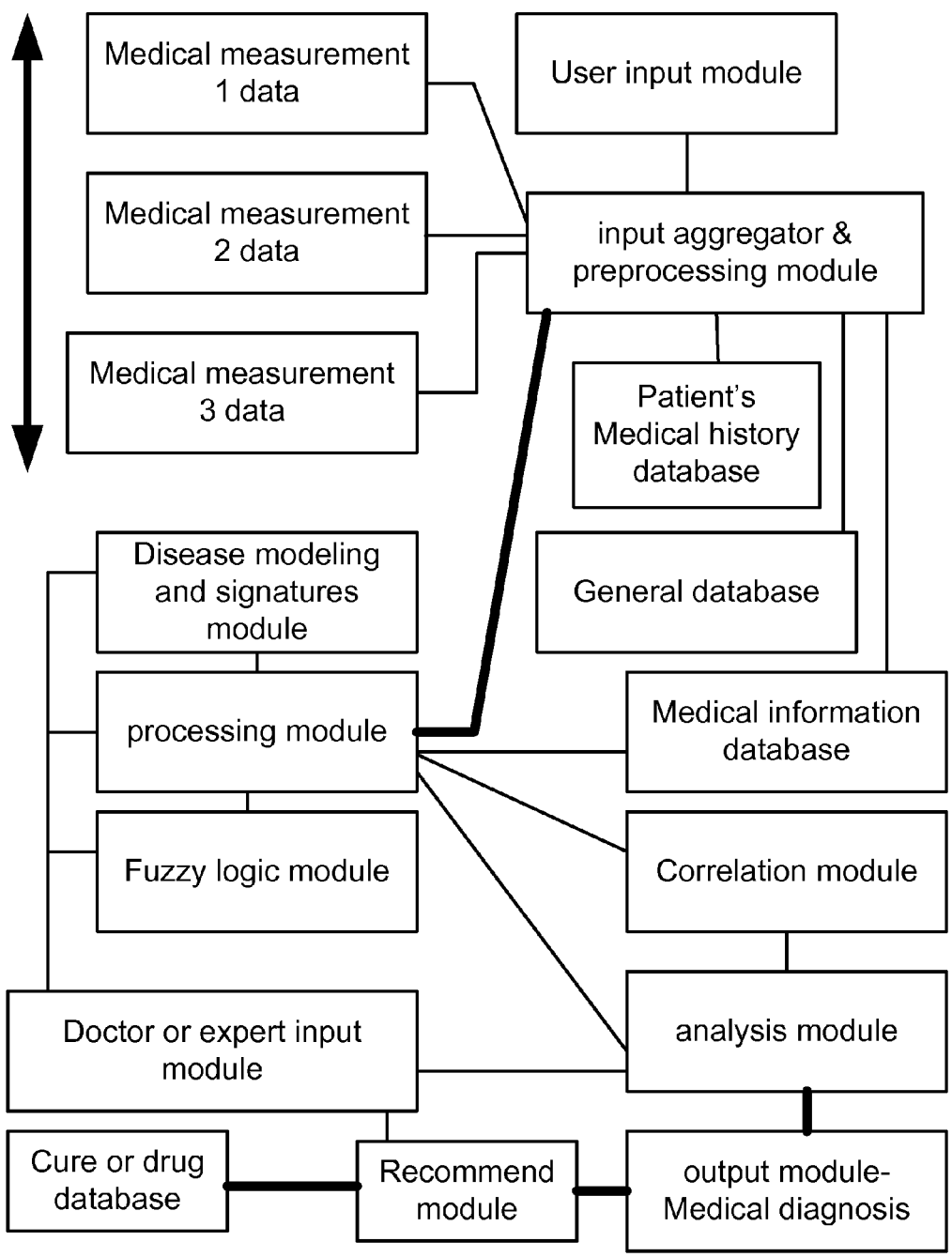

FIG. 99 is a system for medical diagnosis.

Figure 100:
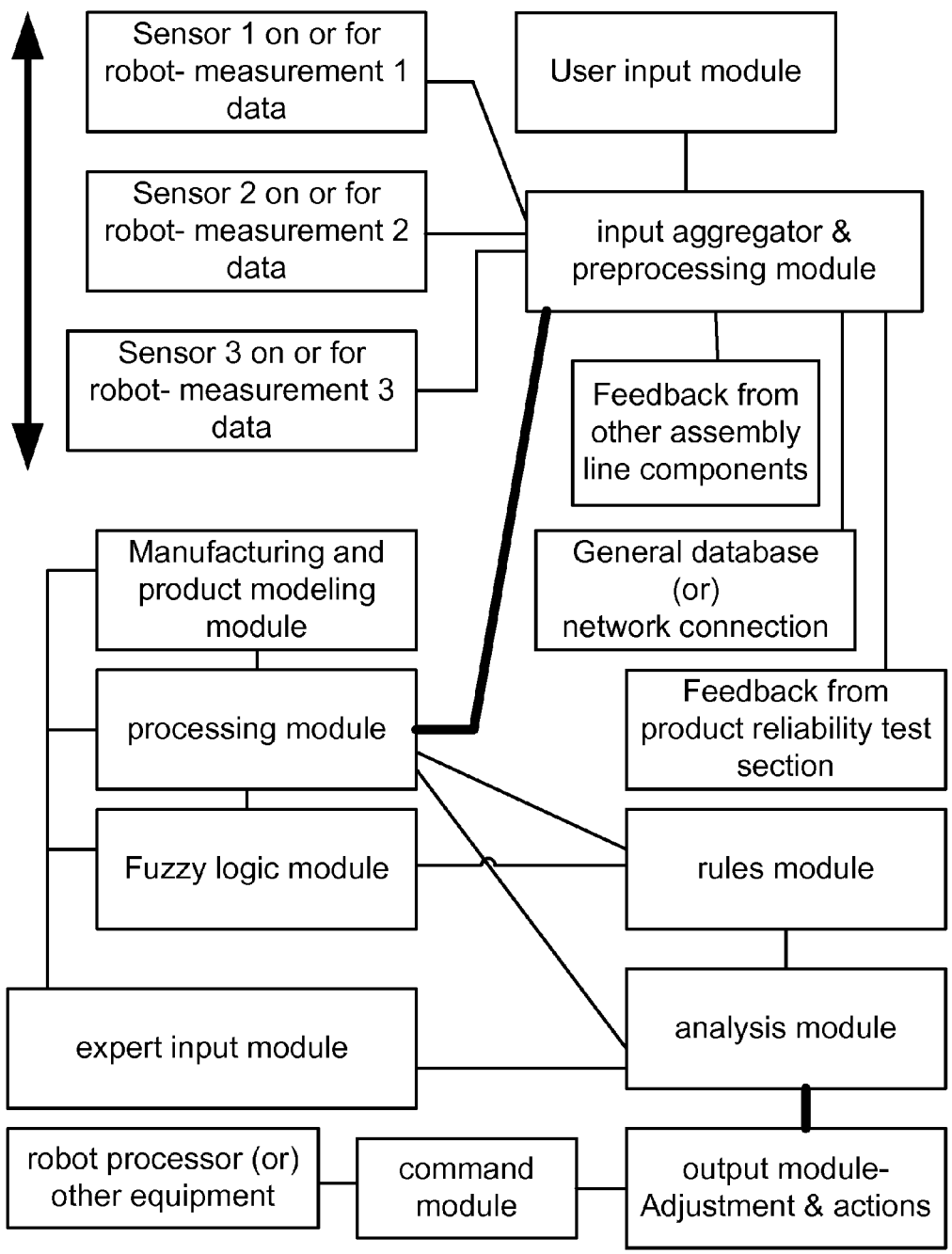

FIG. 100 is a system for a robot.

Figure 101:
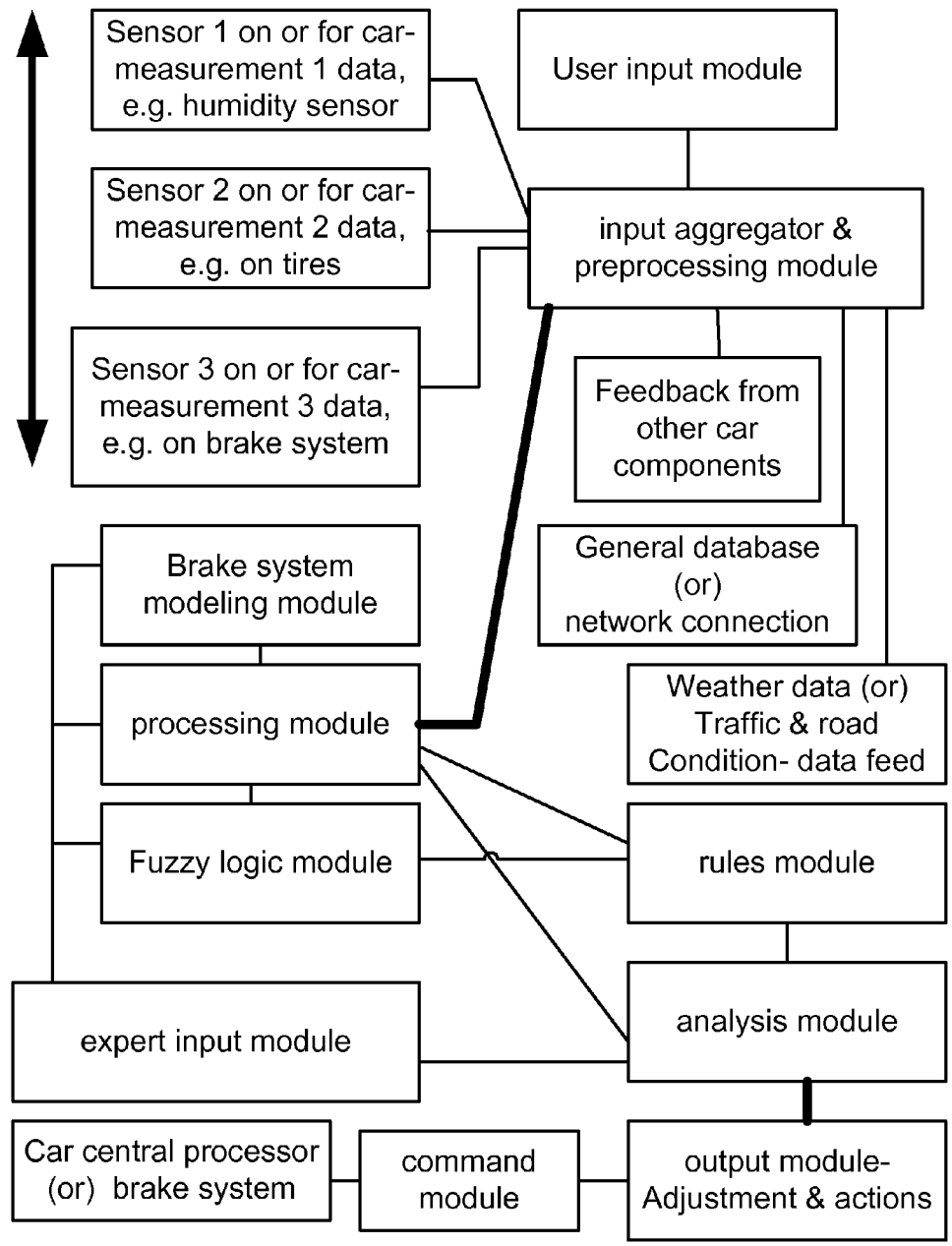

FIG. 101 is a system for a car.

Figure 102:
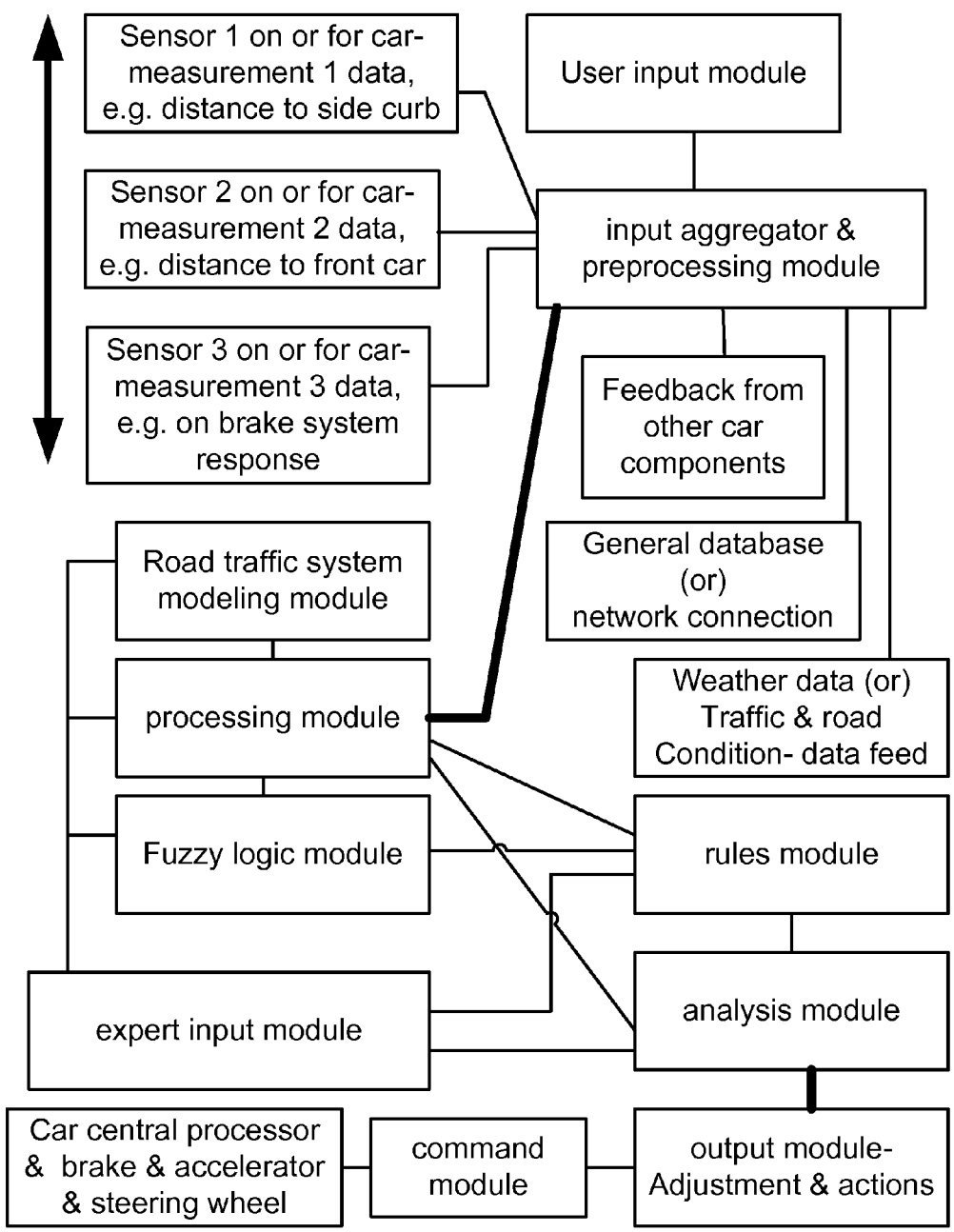

FIG. 102 is a system for an autonomous vehicle.

Figure 103:
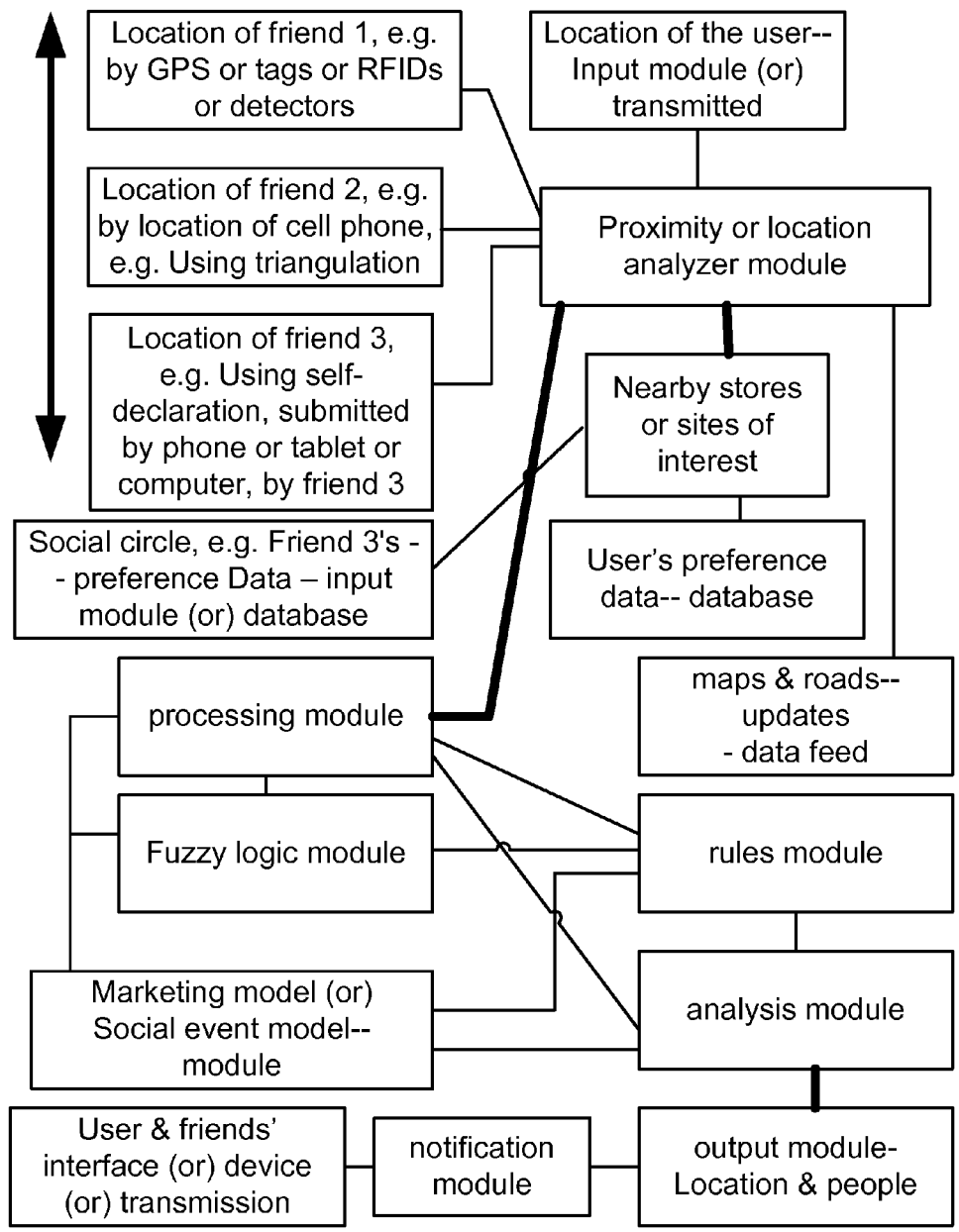

FIG. 103 is a system for marketing or social networks.

Figure 104:
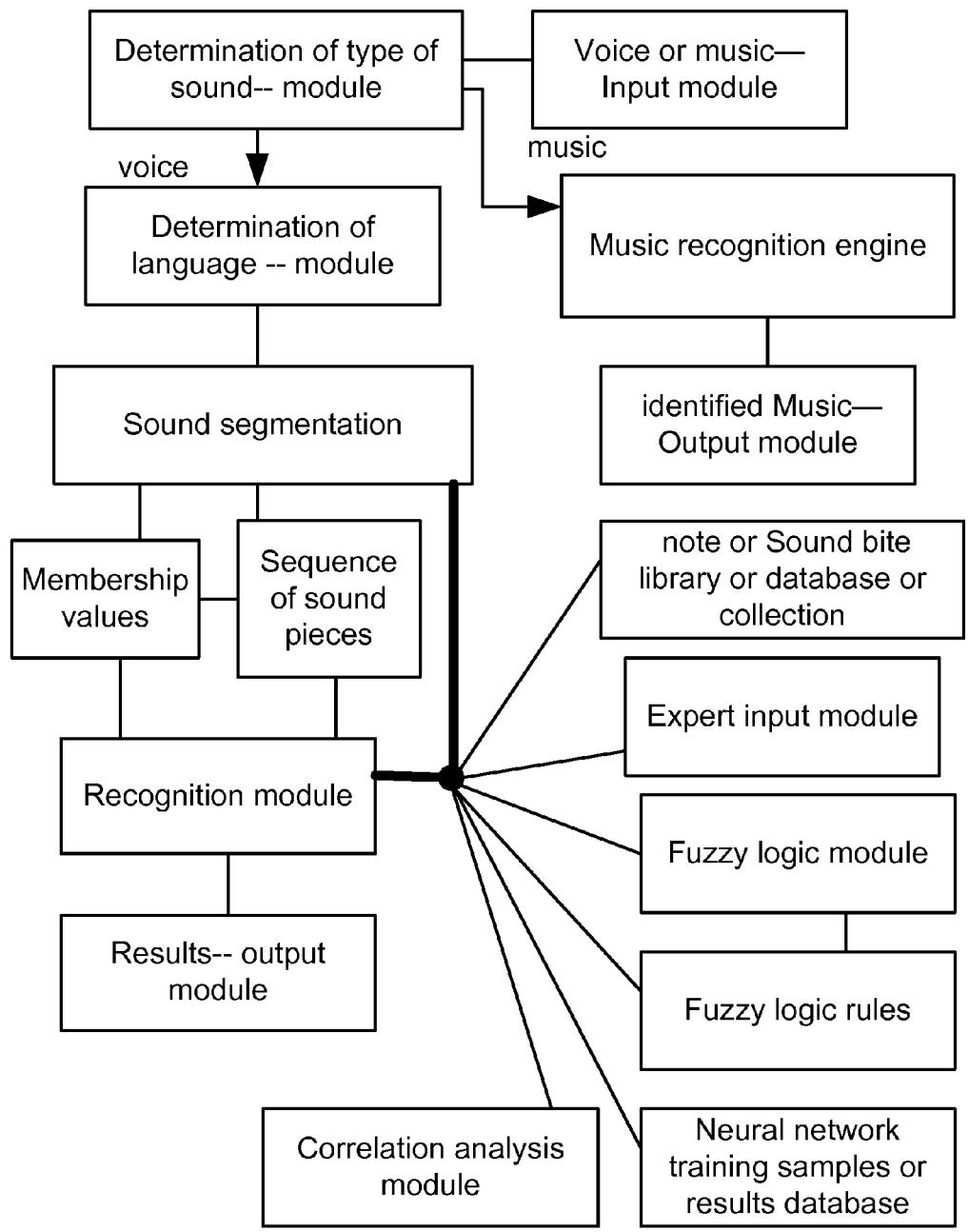

FIG. 104 is a system for sound recognition.

Figure 105:
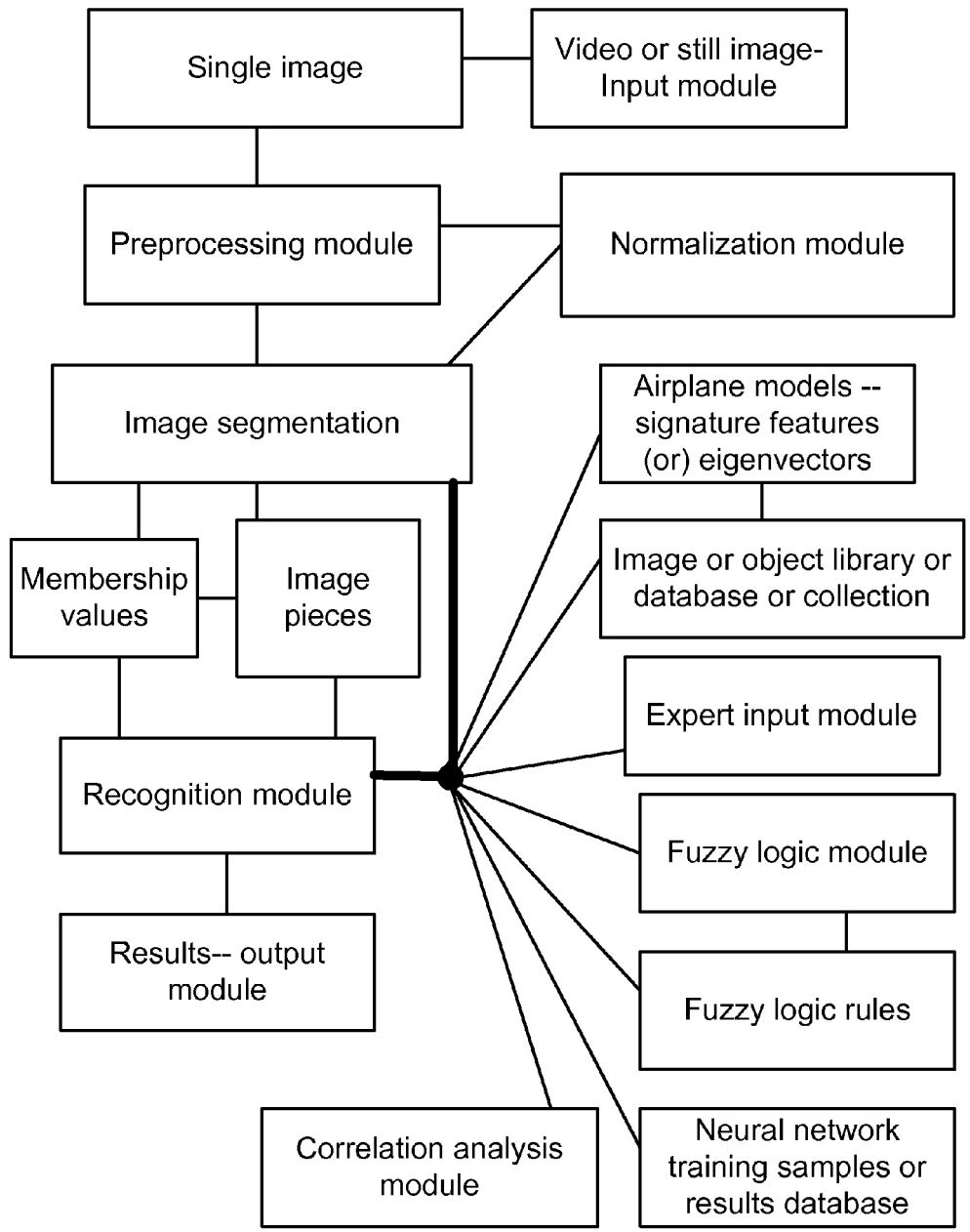

FIG. 105 is a system for airplane or target or object recognition.

Figure 106:
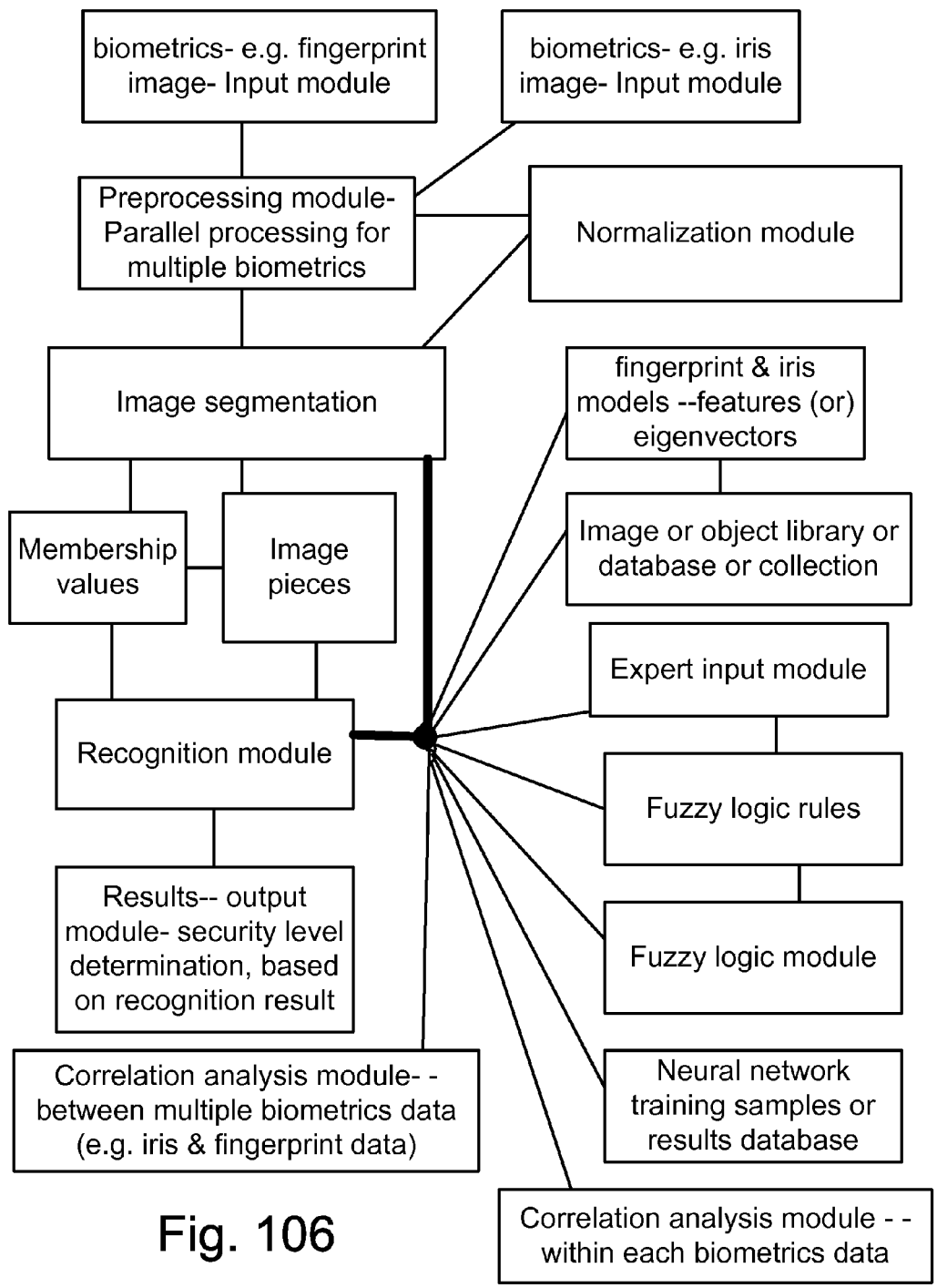

FIG. 106 is a system for biometrics and security.

Figure 107:
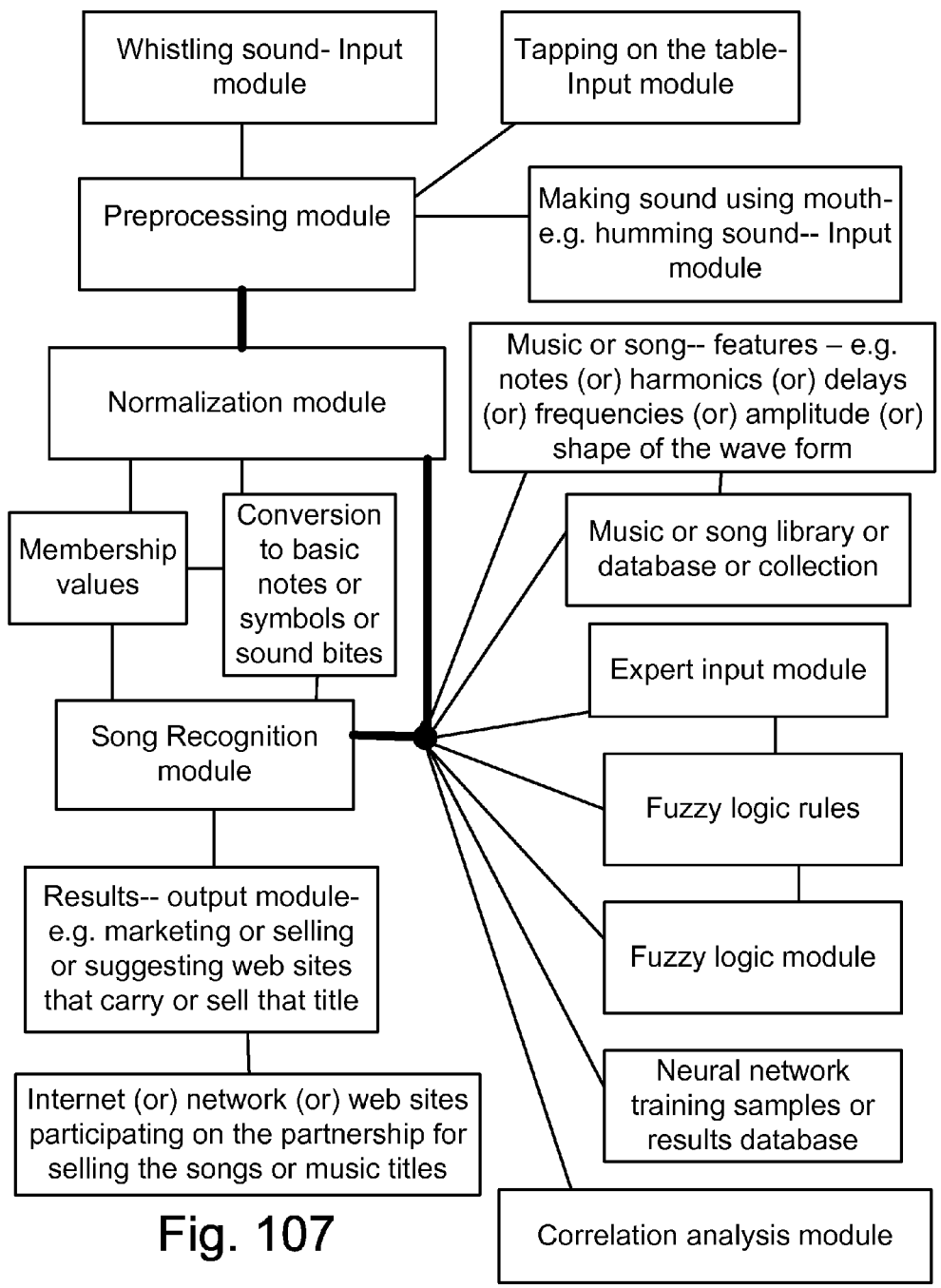

FIG. 107 is a system for sound or song recognition.

Figure 108:
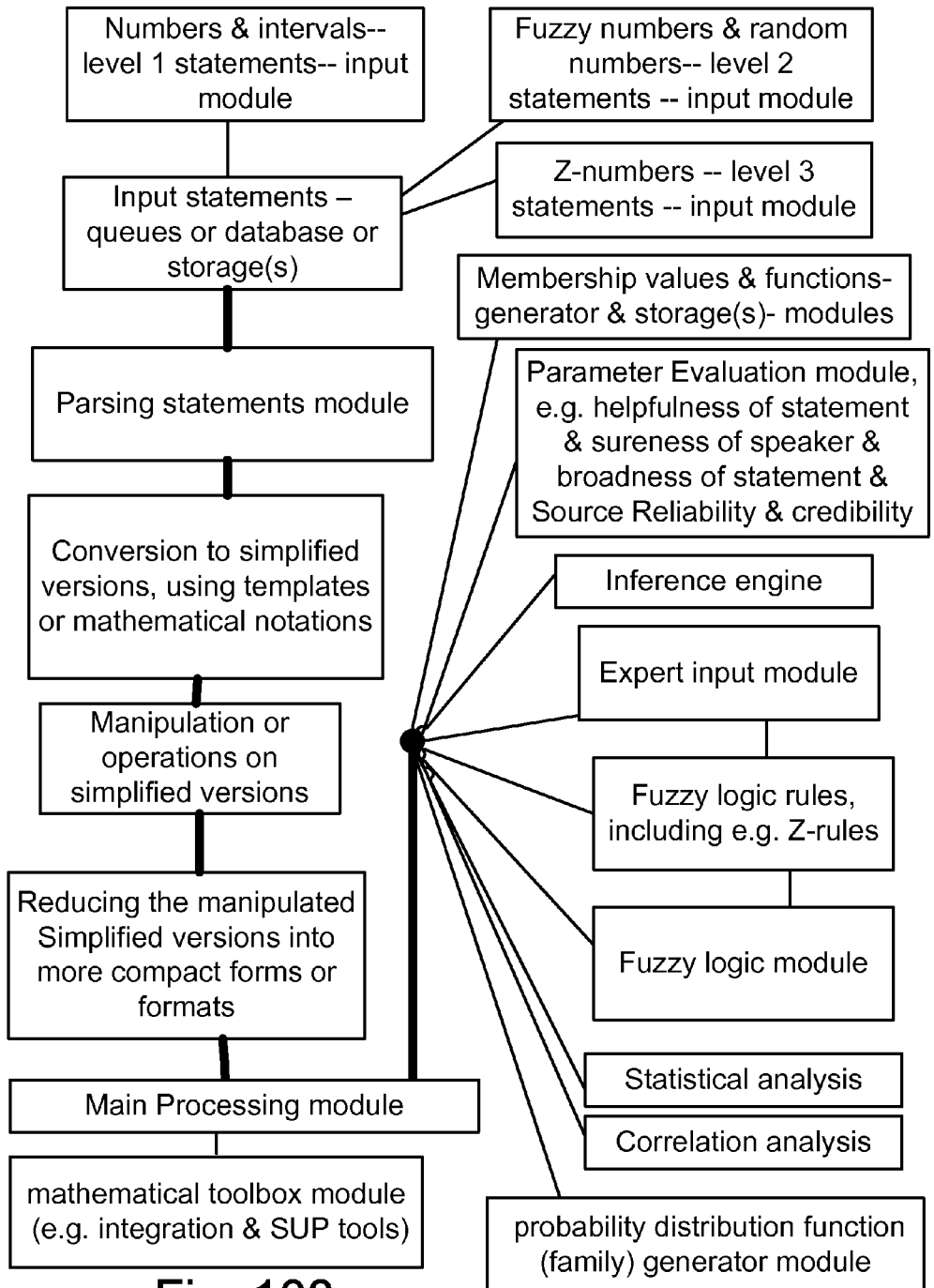

FIG. 108 is a system using Z-numbers.

Figure 109:
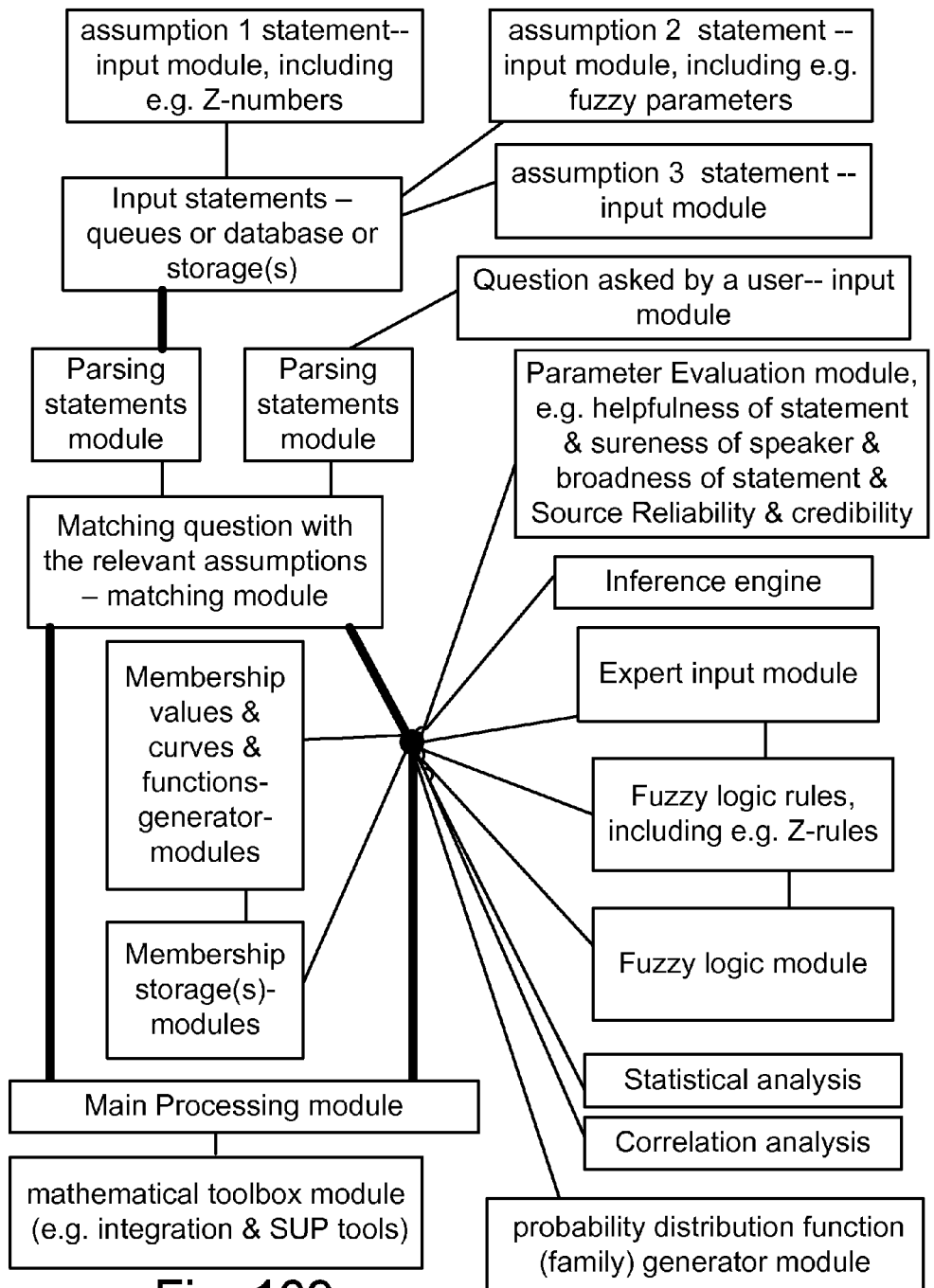

FIG. 109 is a system for a search engine or a question-answer system.

Figure 110:
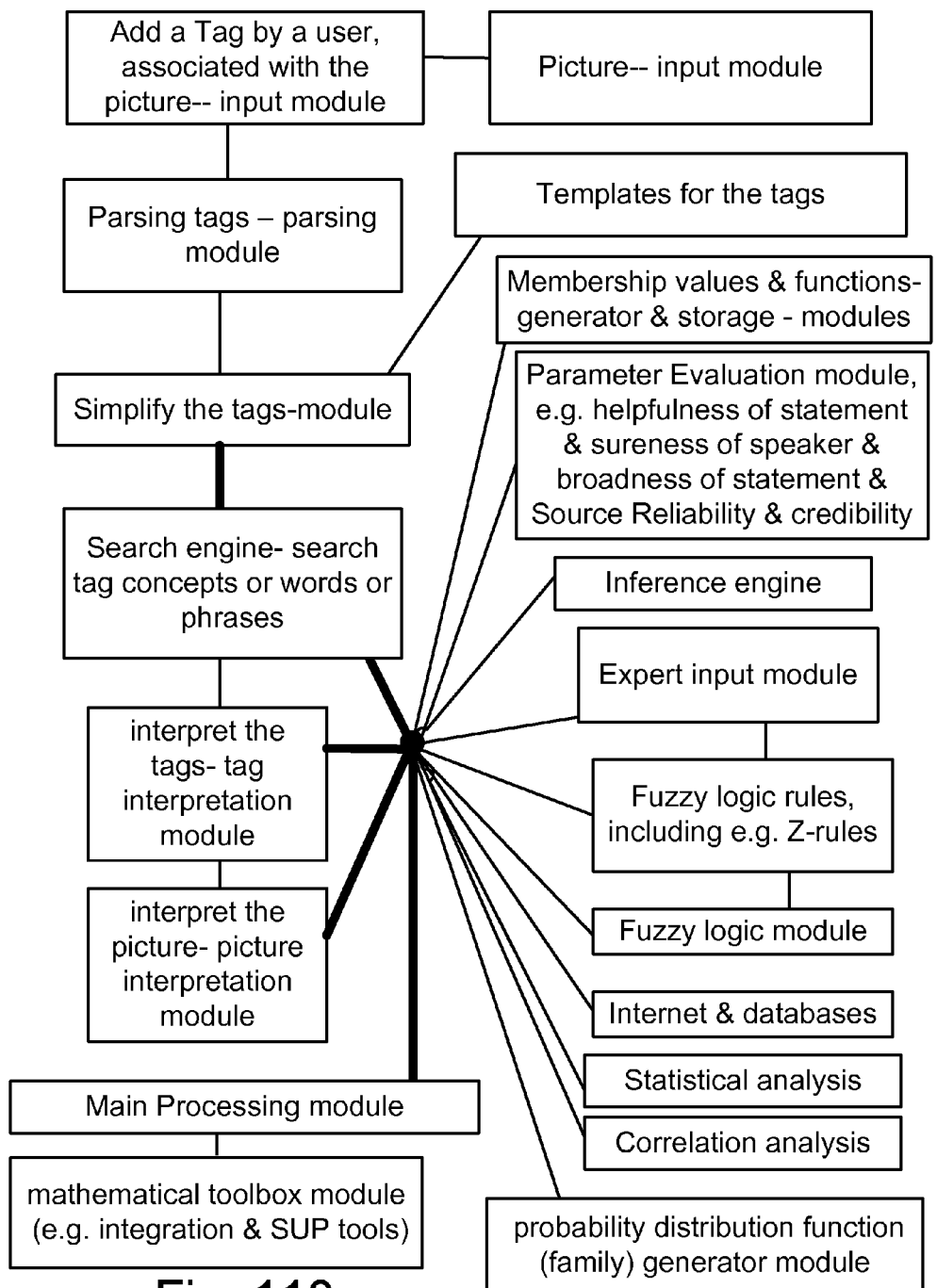

FIG. 110 is a system for a search engine.

Figure 111:
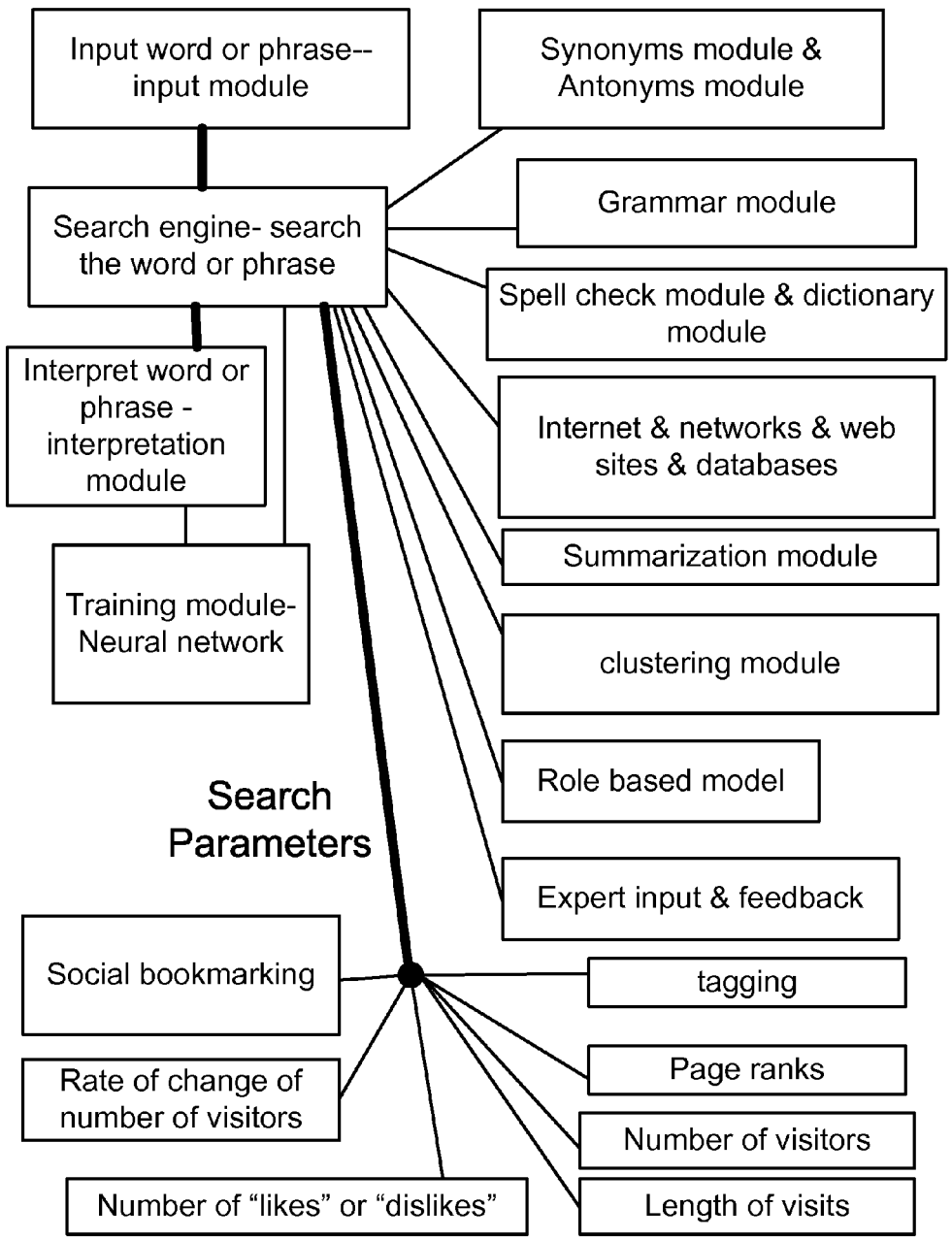

FIG. 111 is a system for a search engine.

Figure 112:
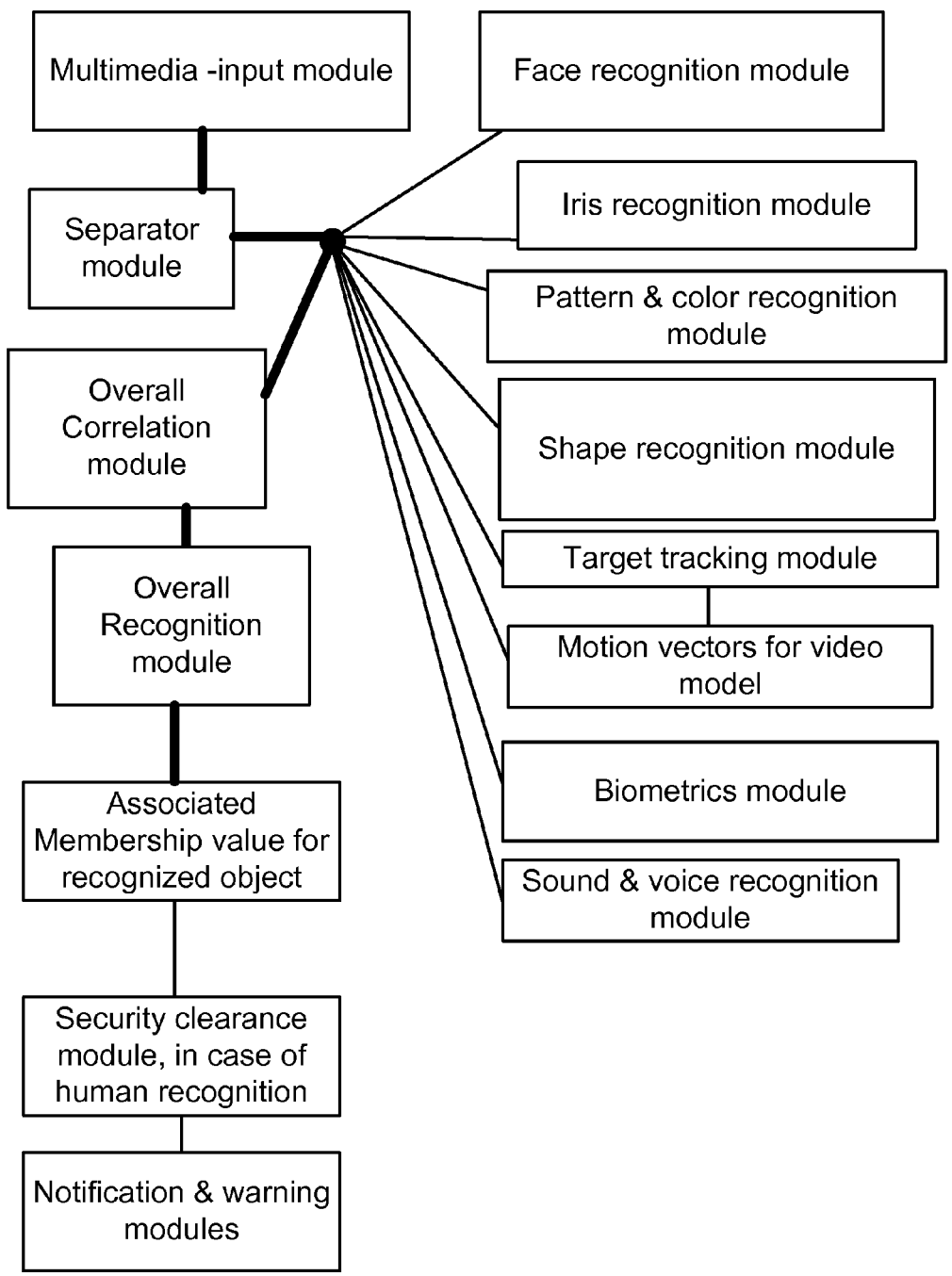

FIG. 112 is a system for the recognition and search engine.

Figure 113:
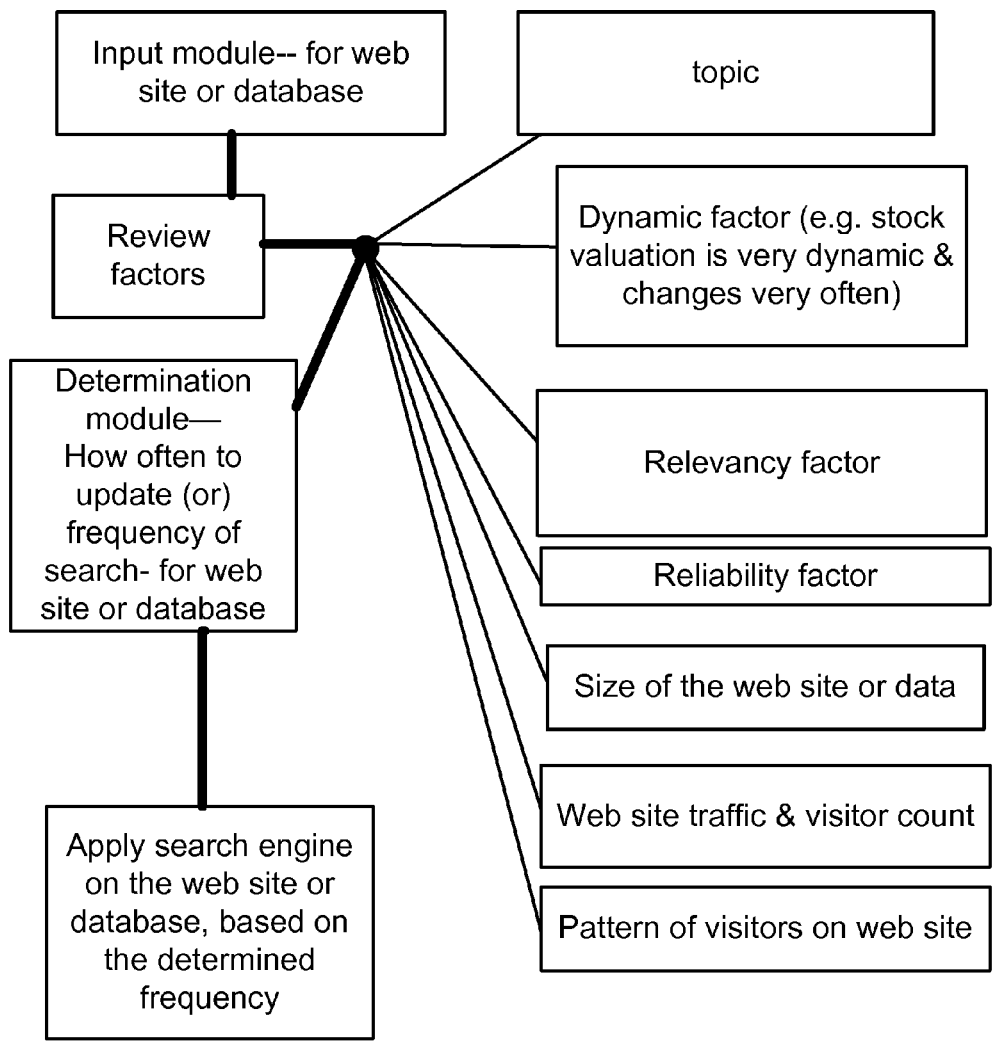

FIG. 113 is a system for a search engine.

Figure 114:
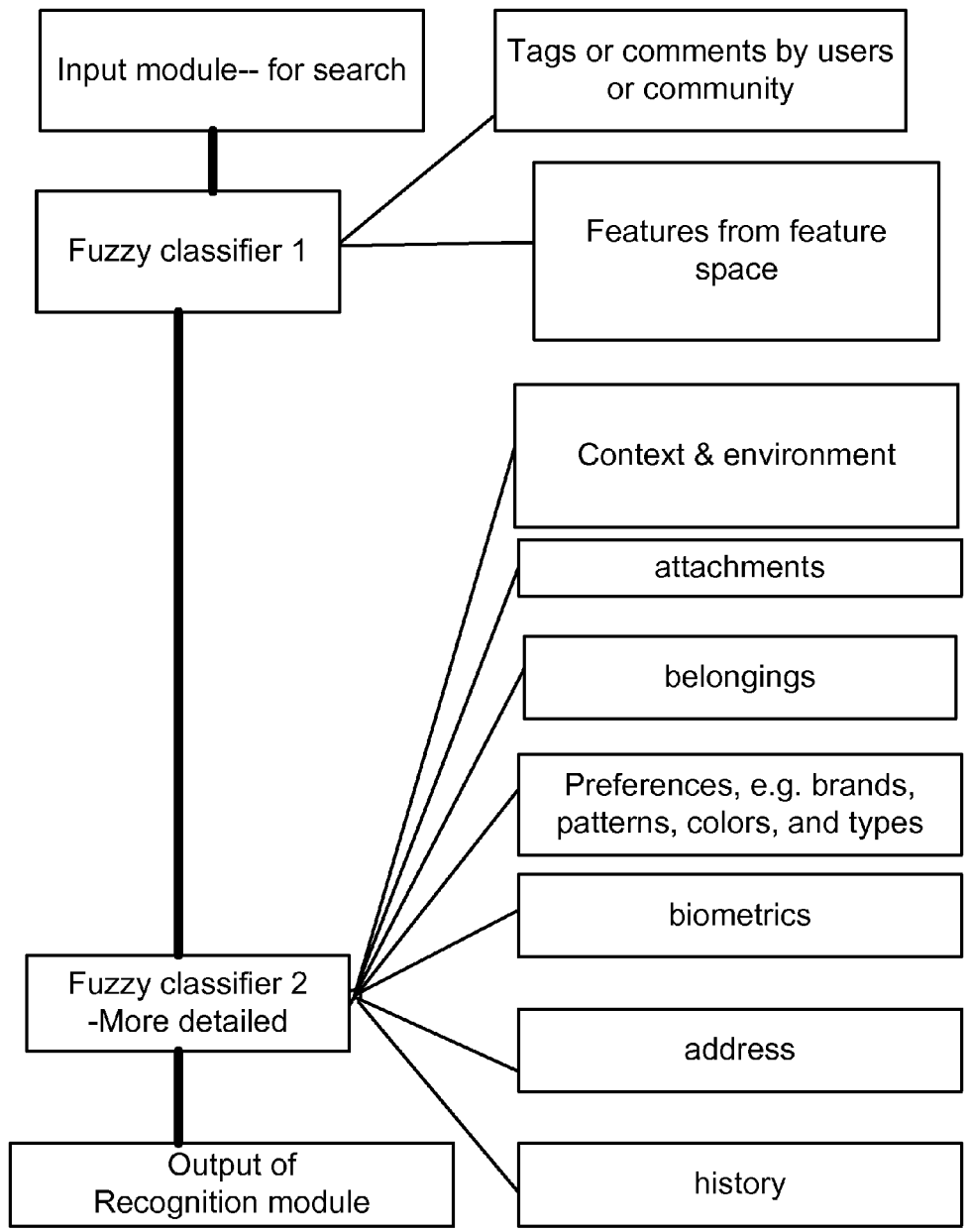

FIG. 114 is a system for the recognition and search engine.

Figure 115:
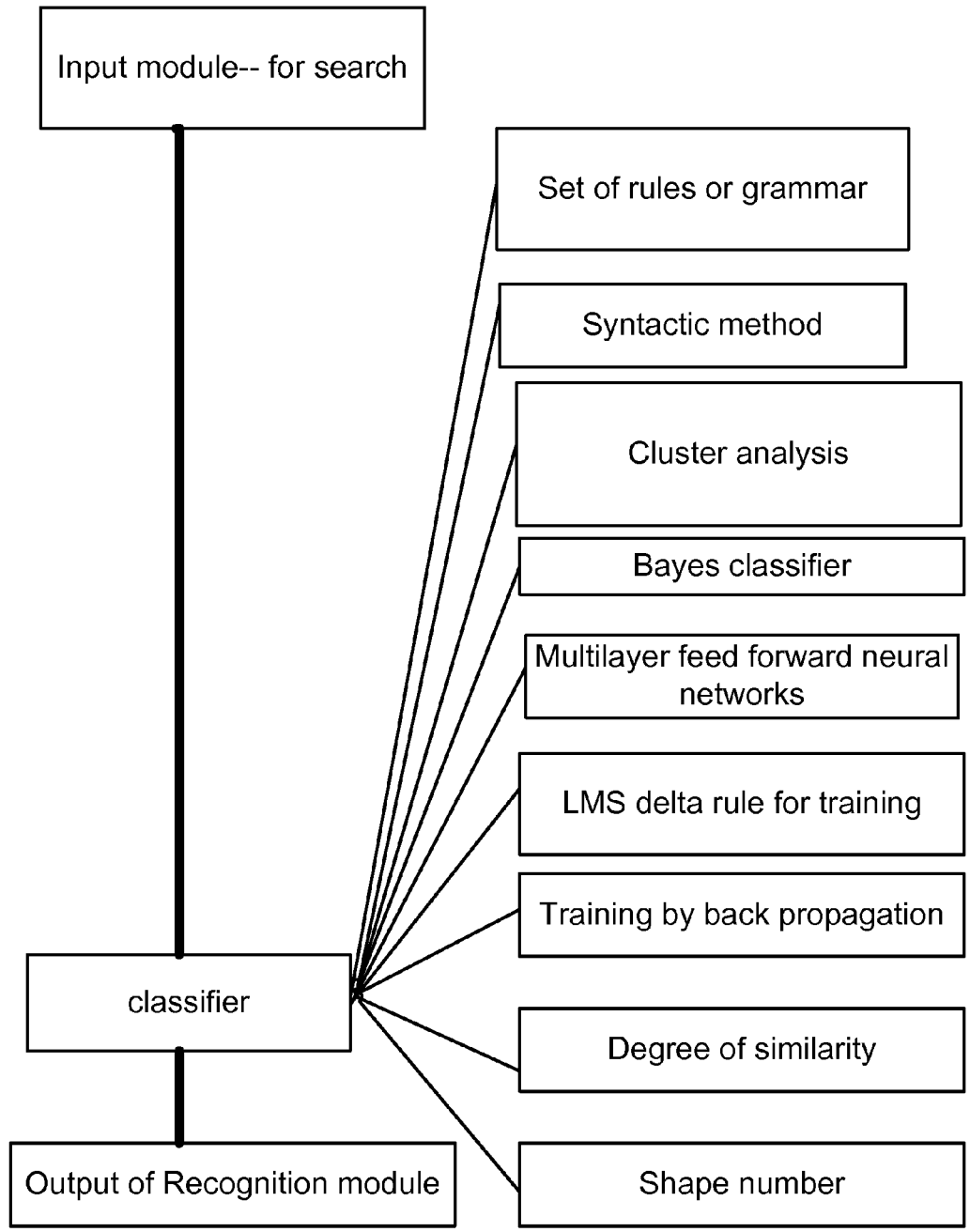

FIG. 115 is a system for the recognition and search engine.

Figure 116:
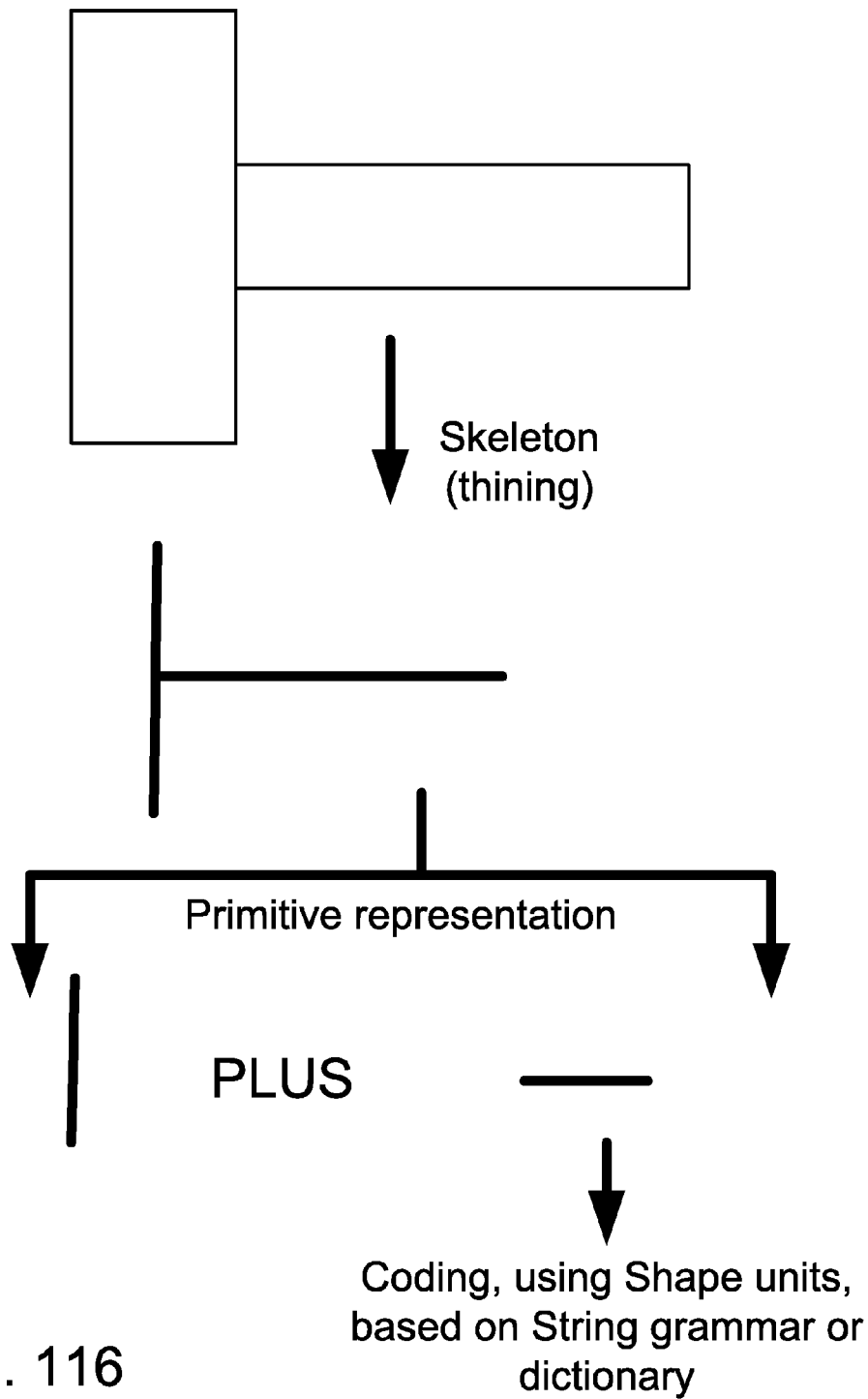

FIG. 116 is a method for the recognition engine.

Figure 117:
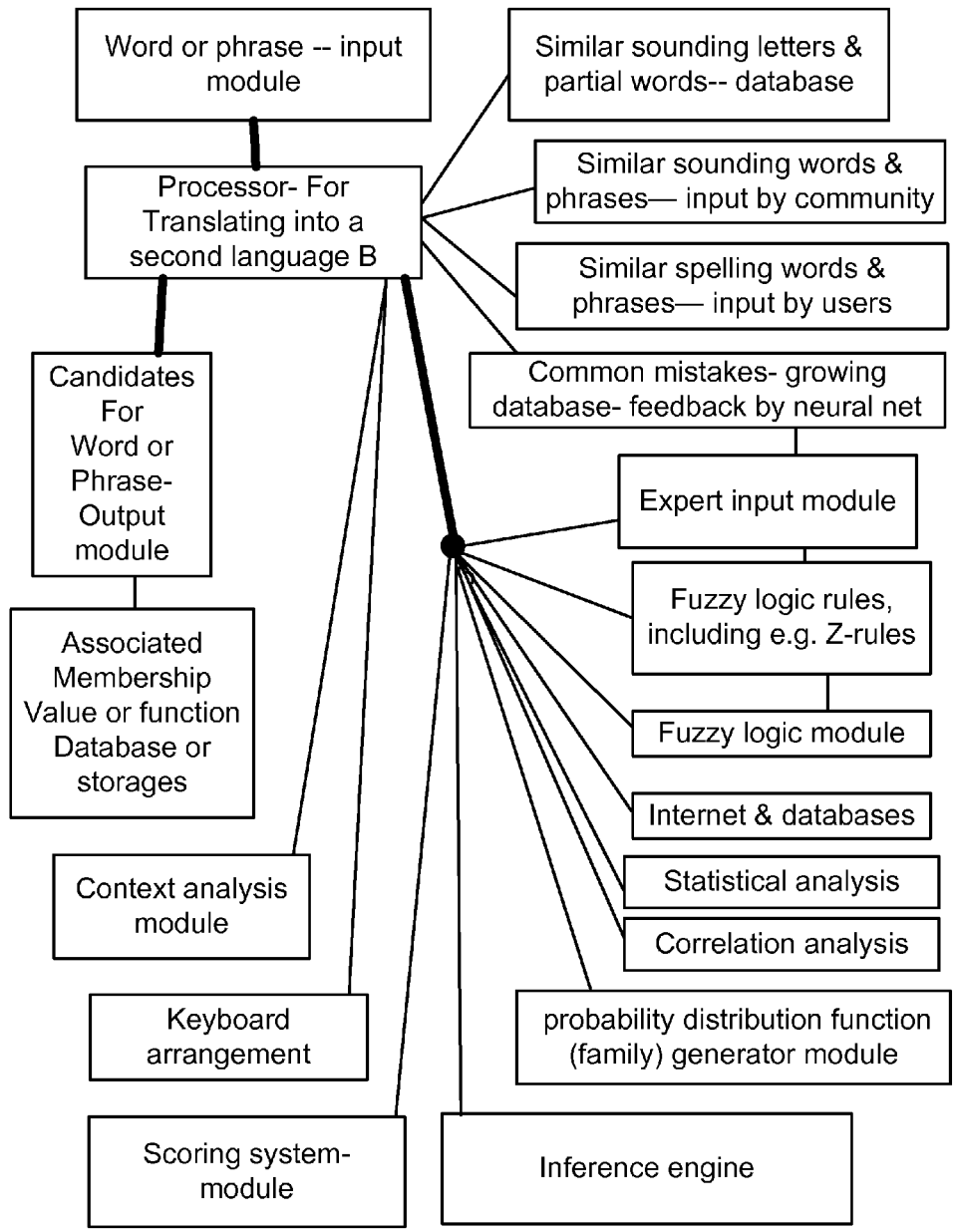

FIG. 117 is a system for the recognition or translation engine.

Figure 118:
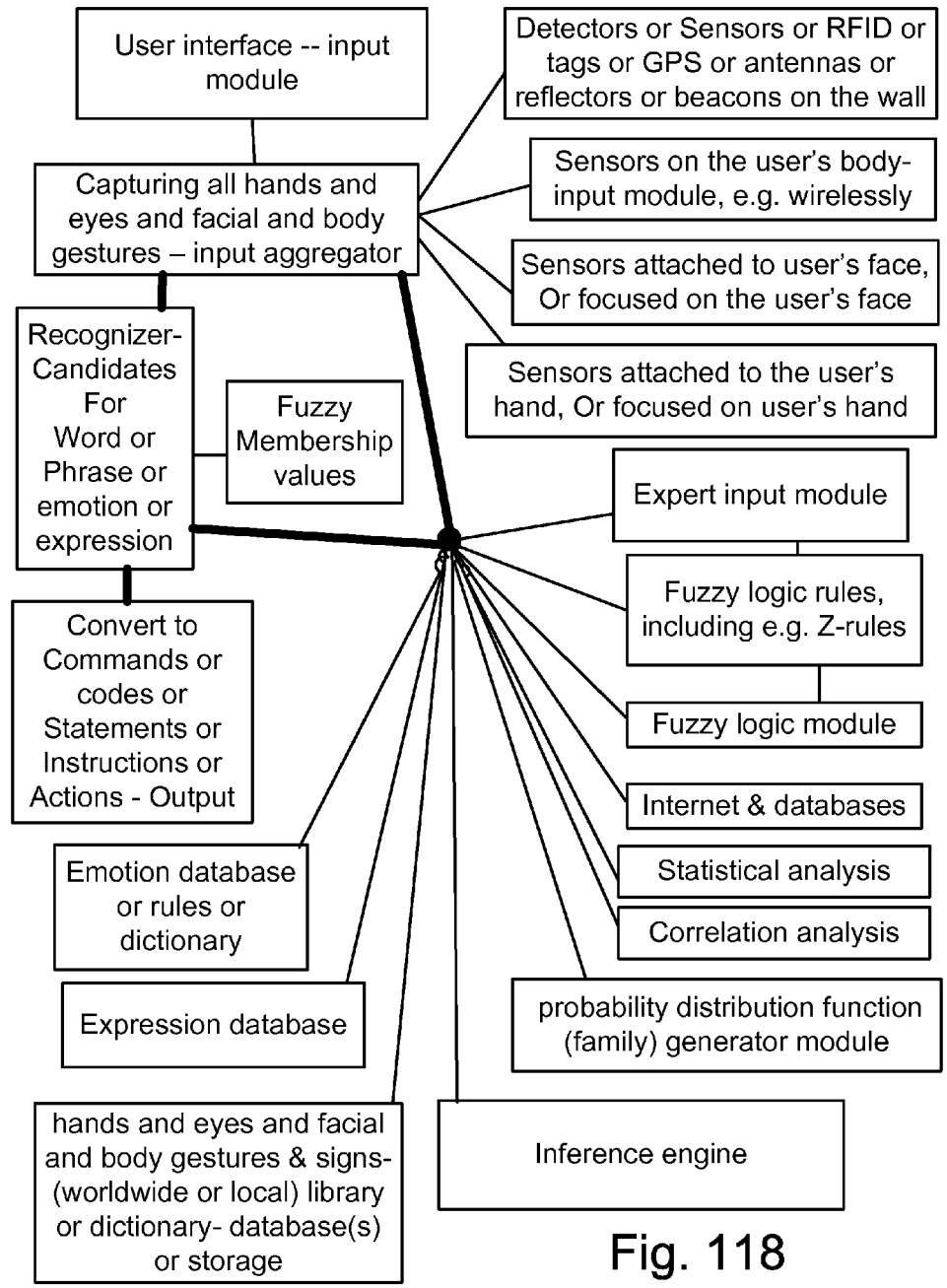

FIG. 118 is a system for the recognition engine for capturing body gestures or body parts' interpretations or emotions (such as cursing or happiness or anger or congratulations statement or success or wishing good luck or twisted eye brows or blinking with only one eye or thumbs up or thumbs down).

Figure 119:
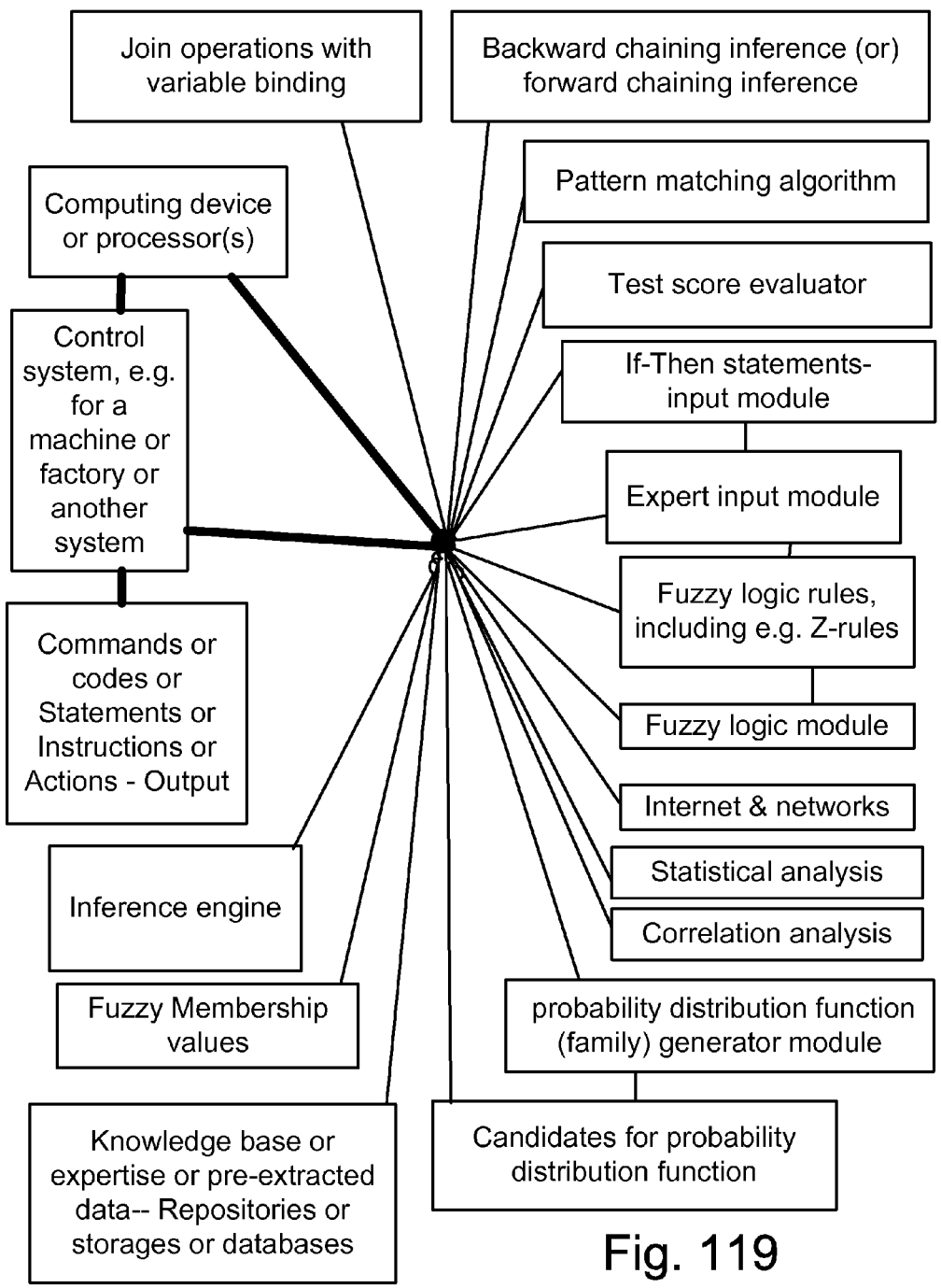

FIG. 119 is a system for Fuzzy Logic or Z-numbers.

FIG. 120($a$)-($b$) show objects, attributes, and values in an example illustrating an embodiment.

FIG. 120($c$) shows querying based on attributes to extract generalized facts/rules/functions in an example illustrating an embodiment.

FIG. 120($d$)-($e$) show objects, attributes, and values in an example illustrating an embodiment.

FIG. 120($f$) shows Z-valuation of object/record based on candidate distributions in an example illustrating an embodiment.

FIG. 120($g$) shows memberships functions used in valuations related to an object/record in an example illustrating an embodiment.

FIG. 120($h$) shows the aggregations of test scores for candidate distributions in an example illustrating an embodiment.

FIG. 121($a$) shows ordering in a list containing fuzzy values in an example illustrating an embodiment.

FIG. 121($b$) shows use of sorted lists and auxiliary queues in joining lists on the value of common attributes in an example illustrating an embodiment.

Figure 122A:
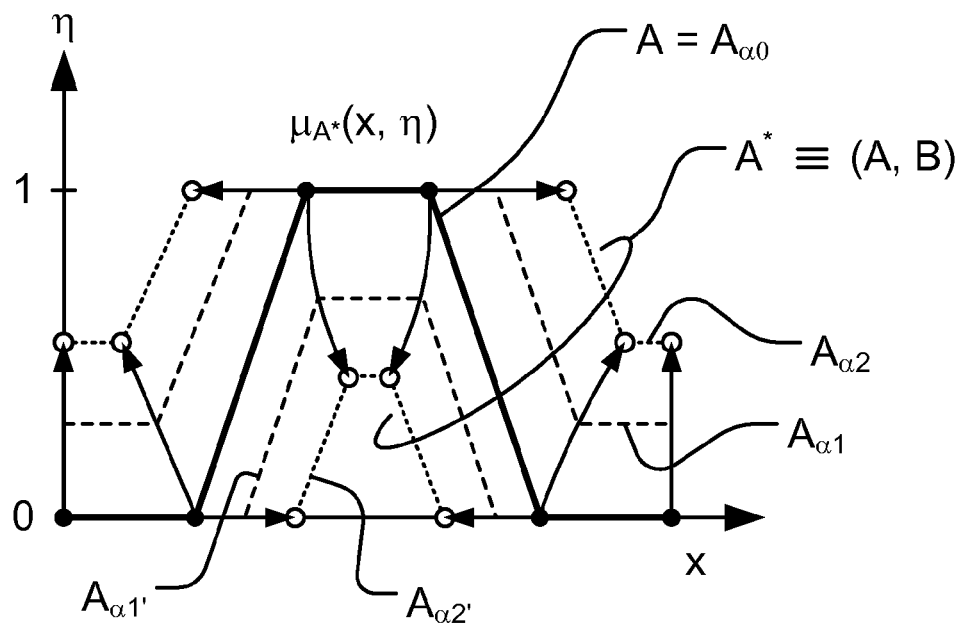
Figure 122B:
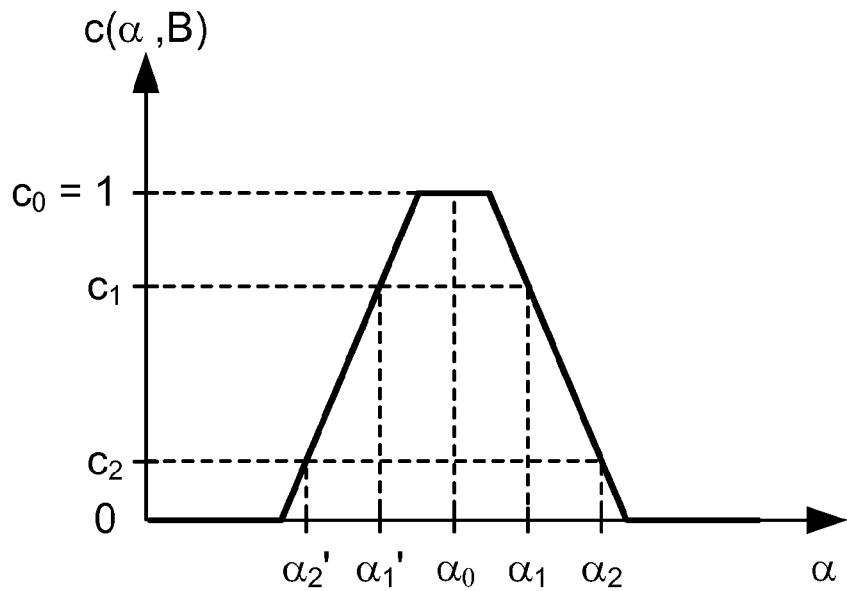

FIG. 122($a$)-($b$) show parametric fuzzy map and color/grey scale attribute in an example illustrating an embodiment.

Figure 123A:
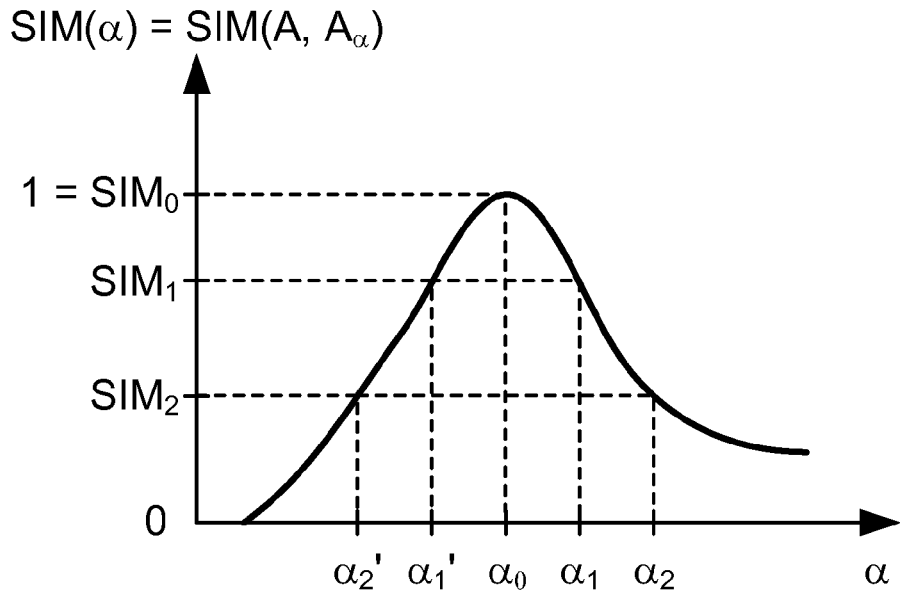
Figure 123B:
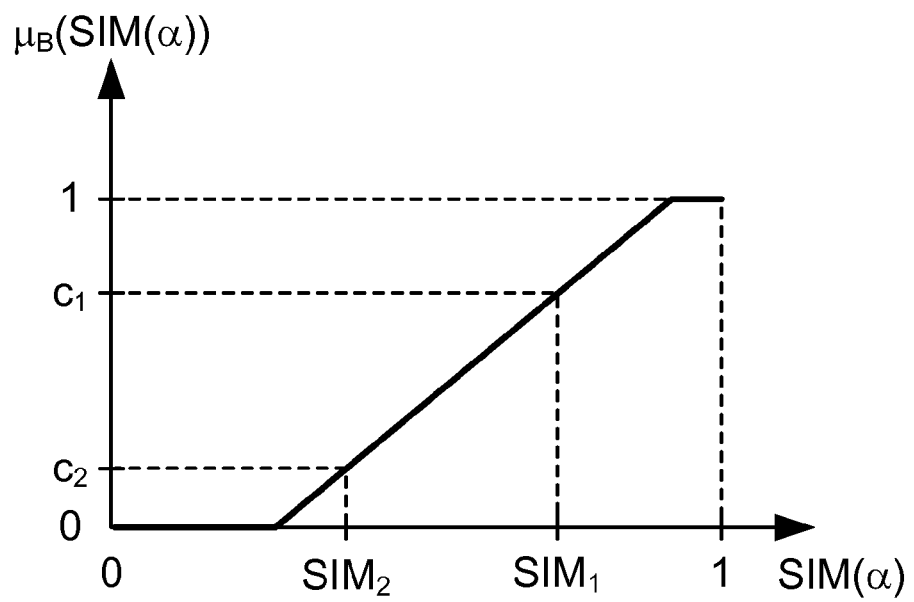

FIG. 123($a$)-($b$) show a relationship between similarity measure and fuzzy map parameter and precision attribute in an example illustrating an embodiment.

Figure 124A:
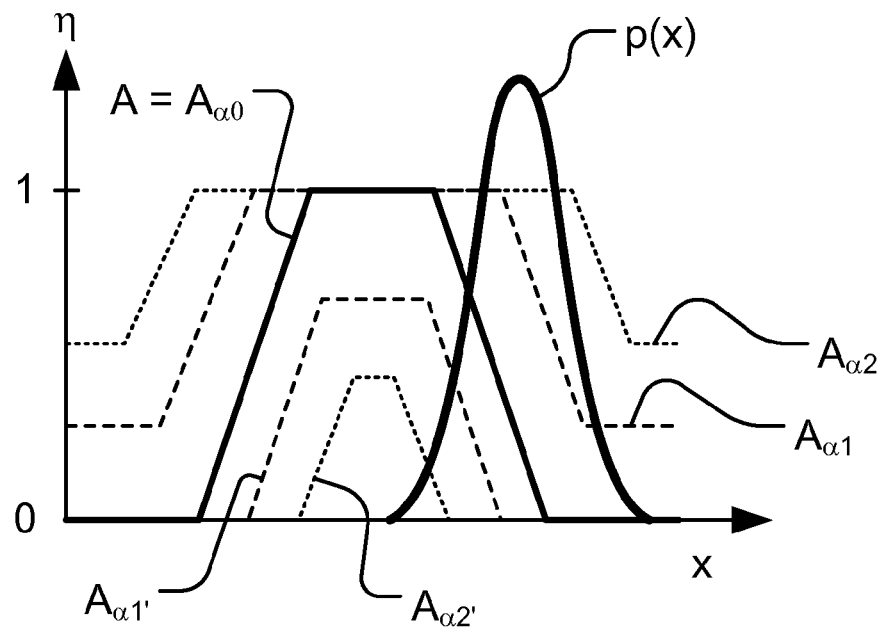
Figure 124B:
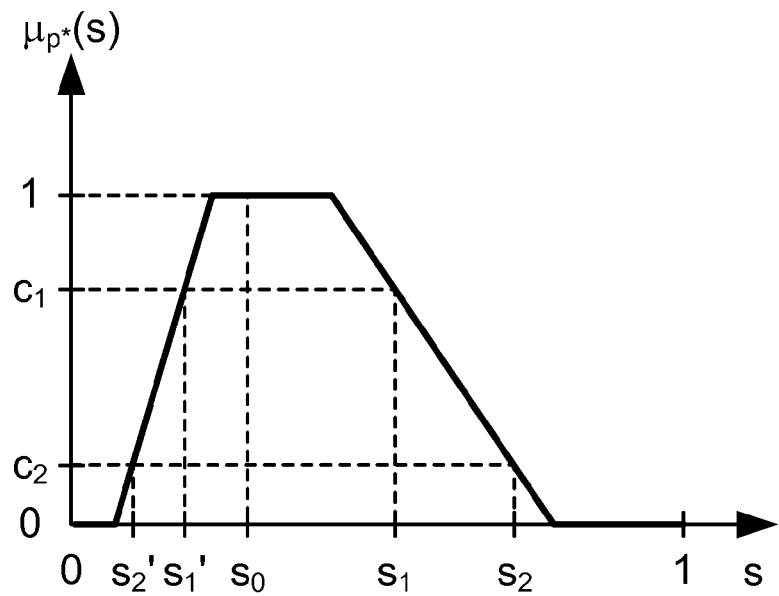

FIG. 124($a$)-($b$) show fuzzy map, probability distribution, and the related score in an example illustrating an embodiment.

Figure 125B:
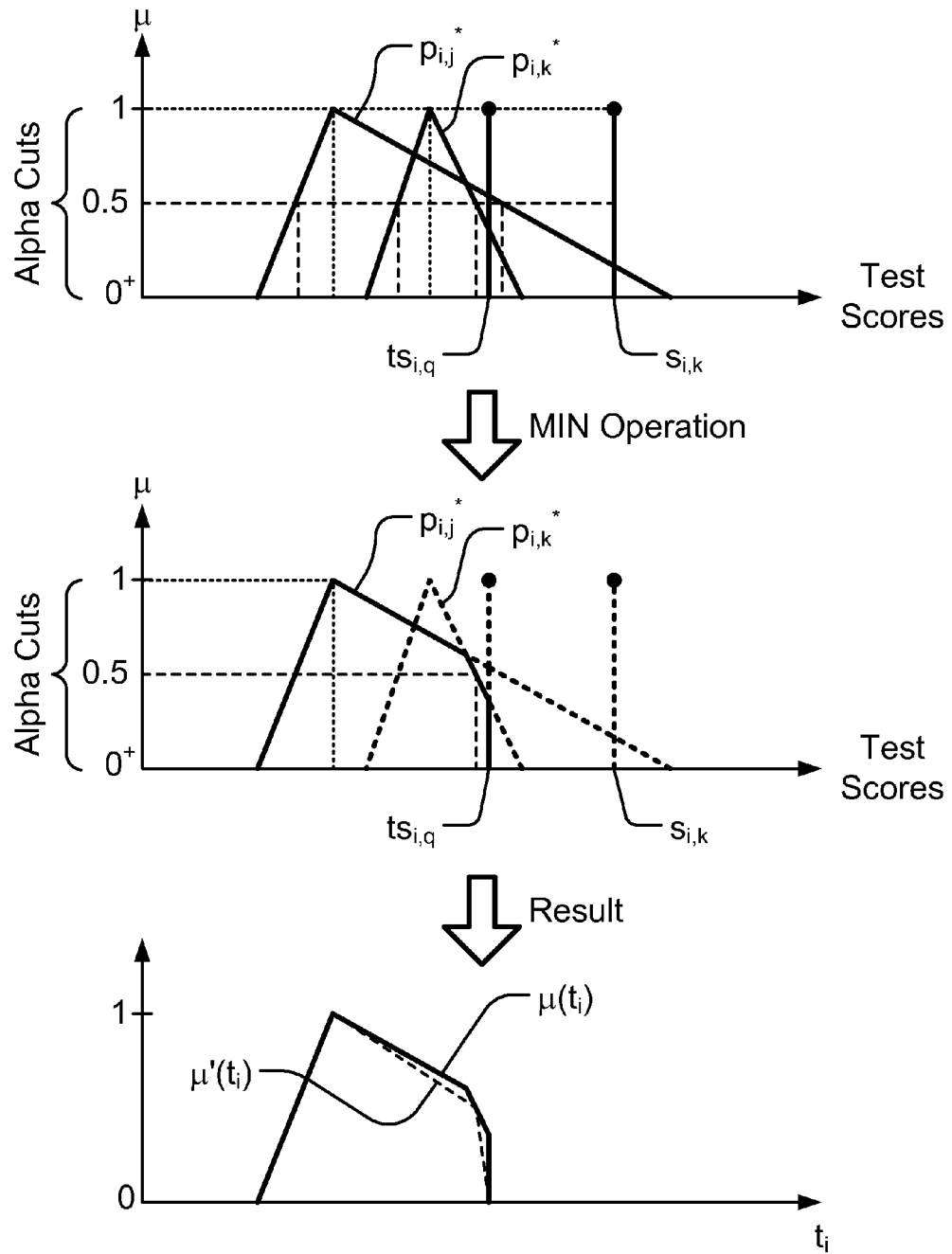

FIG. 125($a$) shows crisp and fuzzy test scores for candidate probability distributions based on fuzzy map, Z-valuation, fuzzy restriction, and test score aggregation in an example illustrating an embodiment.

FIG. 125($b$) shows MIN operation for test score aggregation via alpha-cuts of membership functions in an example illustrating an embodiment.

DETAILED DESCRIPTION OF THE EMBODIMENTS

Z-numbers:

A Z-number is an ordered pair of fuzzy numbers, (A,B). For simplicity, in one embodiment, A and B are assumed to be trapezoidal fuzzy numbers. A Z-number is associated with a real-valued uncertain variable, X, with the first component, A, playing the role of a fuzzy restriction, R(X), on the values which X can take, written as X is A, where A is a fuzzy set. What should be noted is that, strictly speaking, the concept of a restriction has greater generality than the concept of a constraint. A probability distribution is a restriction but is not a constraint (see L. A. Zadeh, Calculus of fuzzy restrictions, In: L. A. Zadeh, K. S. Fu, K. Tanaka, and M. Shimura (Eds.), Fuzzy sets and Their Applications to Cognitive and Decision Processes, Academic Press, New York, 1975, pp. 1-39). A restriction may be viewed as a generalized constraint (see L. A. Zadeh, Generalized theory of uncertainty (GTU)—principal concepts and ideas, Computational Statistics & Data Analysis 51, (2006) 15-46). In this embodiment only, the terms restriction and constraint are used interchangeably.

The restriction

R(X): X is A, is referred to as a possibilistic restriction (constraint), with A playing the role of the possibility distribution of X. More specifically, $$R(X): X \text{ is } A \rightarrow \text{Poss}(X=u) = \mu_A(u)$$

where $\mu_A$ is the membership function of A, and u is a generic value of X. $\mu_A$ may be viewed as a constraint which is associated with R(X), meaning that $\mu_A(u)$ is the degree to which u satisfies the constraint.

When X is a random variable, the probability distribution of X plays the role of a probabilistic restriction on X. A probabilistic restriction is expressed as:

R(X): X isp p where p is the probability density function of X. In this case, $$R(X): X \text{ is } pp \rightarrow \text{Prob}(u \leq X \leq u+du) = p(u)du$$

Note. Generally, the term "restriction" applies to X is R. Occasionally, "restriction" applies to R. Context serves to disambiguate the meaning of "restriction."

The ordered triple (X,A,B) is referred to as a Z-valuation. A Z-valuation is equivalent to an assignment statement, X is (A,B). X is an uncertain variable if A is not a singleton. In a related way, uncertain computation is a system of computation in which the objects of computation are not values of variables but restrictions on values of variables. In this embodiment/section, unless stated to the contrary, X is assumed to be a random variable. For convenience, A is referred to as a value of X, with the understanding that, strictly speaking, A is not a value of X but a restriction on the values which X can take. The second component, B, is referred to as certainty. Certainty concept is related to other concepts, such as sureness, confidence, reliability, strength of belief, probability, possibility, etc. However, there are some differences between these concepts.

Figure 1:
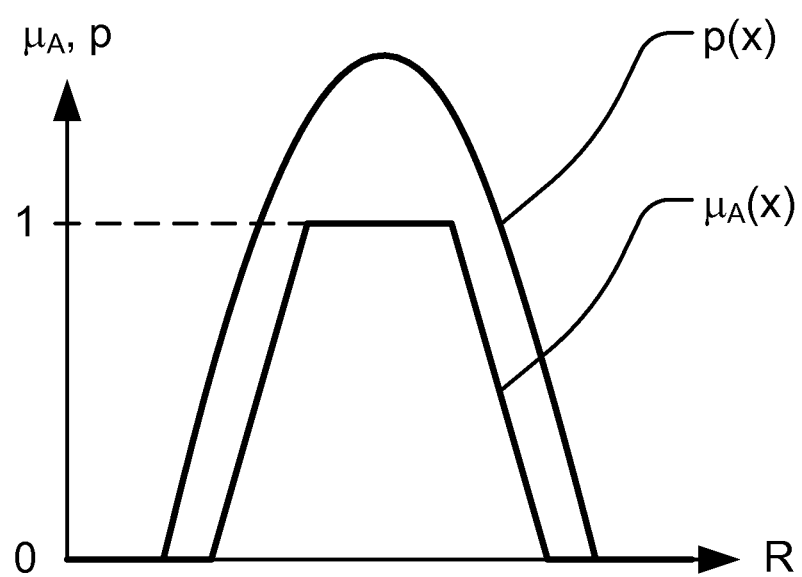
FIG. 1 shows membership function of A and probability density function of X.

In one embodiment, when X is a random variable, certainty may be equated to probability. Informally, B may be interpreted as a response to the question: How sure are you that X is A? Typically, A and B are perception-based and are described in a natural language. Example: (about 45 minutes, usually.) A collection of Z-valuations is referred to as Z-information. It should be noted that much of everyday reasoning and decision-making is based, in effect, on Z-information. For purposes of computation, when A and B are described in a natural language, the meaning of A and B is precisiated (graduated) through association with membership functions, $\mu_A$ and $\mu_B$, respectively, FIG. 1.

The membership function of A, $\mu_A$, may be elicited by asking a succession of questions of the form: To what degree does the number, a, fit your perception of A? Example: To what degree does 50 minutes fit your perception of about 45 minutes? The same applies to B. The fuzzy set, A, may be interpreted as the possibility distribution of X. The concept of a Z-number may be generalized in various ways. In particular, X may be assumed to take values in $R^n$, in which case A is a Cartesian product of fuzzy numbers. Simple examples of Z-valuations are:

(anticipated budget deficit, close to 2 million dollars, very likely)
(population of Spain, about 45 million, quite sure)
(degree of Robert's honesty, very high, absolutely)
(degree of Robert's honesty, high, not sure)
(travel time by car from Berkeley to San Francisco, about 30 minutes, usually)
(price of oil in the near future, significantly over 100 dollars/barrel, very likely)

It is important to note that many propositions in a natural language are expressible as Z-valuations. Example: The proposition, p, p: Usually, it takes Robert about an hour to get home from work, is expressible as a Z-valuation:

(Robert's travel time from office to home, about one hour, usually)

If X is a random variable, then X is A represents a fuzzy event in R, the real line. The probability of this event, p, may be expressed as (see L. A. Zadeh, Probability measures of fuzzy events, Journal of Mathematical Analysis and Applications 23 (2), (1968) 421-427.):

$$p = \int_R \mu_A(u) p_X(u) du,$$

where $p_X$ is the underlying (hidden) probability density of X. In effect, the Z-valuation (X,A,B) may be viewed as a restriction (generalized constraint) on X defined by:

Prob(X is A) is B.

What should be underscored is that in a Z-number, (A,B), the underlying probability distribution, $p_X$, is not known. What is known is a restriction on $p_X$ which may be expressed as:

$$\int_R \mu_A(u) p_X(u) du \text{ is } B$$

Note: In this embodiment only, the term "probability distribution" is not used in its strict technical sense.

In effect, a Z-number may be viewed as a summary of $p_X$. It is important to note that in everyday decision-making, most decisions are based on summaries of information. Viewing a Z-number as a summary is consistent with this reality. In applications to decision analysis, a basic problem which arises relates to ranking of Z-numbers. Example: Is (approximately 100, likely) greater than (approximately 90, very likely)? Is this a meaningful question? We are going to address these questions below.

An immediate consequence of the relation between $p_X$ and B is the following. If Z=(A,B) then Z'=(A',1-B), where A' is the complement of A and Z' plays the role of the complement of Z. 1-B is the antonym of B (see, e.g., E. Trillas, C. Moraga, S. Guadarrama, S. Cubillo and E. Castiñeira, Computing with Antonyms, In: M. Nikravesh, J. Kacprzyk and L. A. Zadeh (Eds.), Forging New Frontiers: Fuzzy Pioneers I, Studies in Fuzziness and Soft Computing Vol 217, Springer-Verlag, Berlin Heidelberg 2007, pp. 133-153.).

An important qualitative attribute of a Z-number is informativeness. Generally, but not always, a Z-number is informative if its value has high specificity, that is, is tightly constrained (see, for example, R. R. Yager, On measures of specificity, In: O. Kaynak, L. A. Zadeh, B. Turksen, I. J. Rudas (Eds.), Computational Intelligence: Soft Computing and Fuzzy-Neuro Integration with Applications, Springer-Verlag, Berlin, 1998, pp. 94-113.), and its certainty is high. Informativeness is a desideratum when a Z-number is a basis for a decision. It is important to know that if the informativeness of a Z-number is sufficient to serve as a basis for an intelligent decision.

The concept of a Z-number is after the concept of a fuzzy granule (see, for example, L. A. Zadeh, Fuzzy sets and information granularity, In: M. Gupta, R. Ragade, R. Yager (Eds.), Advances in Fuzzy Set Theory and Applications, North-Holland Publishing Co., Amsterdam, 1979, pp. 3-18. Also, see L. A. Zadeh, Possibility theory and soft data analysis, In: L. Cobb, R. M. Thrall (Eds.), Mathematical Frontiers of the Social and Policy Sciences, Westview Press, Boulder, Colo., 1981, pp. 69-129. Also, see L. A. Zadeh, Generalized theory of uncertainty (GTU)—principal concepts and ideas, Computational Statistics & Data Analysis 51, (2006) 15-46.). It should be noted that the concept of a Z-number is much more general than the concept of confidence interval in probability theory. There are some links between the concept of a Z-number, the concept of a fuzzy random number and the concept of a fuzzy random variable (see, e.g., J. J. Buckley, J. J. Leonard, Chapter 4: Random fuzzy numbers and vectors, In: Monte Carlo Methods in Fuzzy Optimization, Studies in Fuzziness and Soft Computing 222, Springer-Verlag, Heidelberg, Germany, 2008. Also, see A. Kaufman, M. M. Gupta, Introduction to Fuzzy Arithmetic: Theory and Applications, Van Nostrand Reinhold Company, New York, 1985. Also, see C. V. Negoita, D. A. Ralescu, Applications of Fuzzy Sets to Systems Analysis, Wiley, New York, 1975.).

A concept which is closely related to the concept of a Z-number is the concept of a $Z^+$-number. Basically, a $Z^+$-number, $Z^+$, is a combination of a fuzzy number, A, and a random number, R, written as an ordered pair $Z^+=(A,R)$. In this pair, A plays the same role as it does in a Z-number, and R is the probability distribution of a random number. Equivalently, R may be viewed as the underlying probability distribution of X in the Z-valuation (X,A,B). Alternatively, a $Z^+$-number may be expressed as $(A,p_X)$ or $(\mu_A,p_X)$, where $\mu_A$ is the membership function of A. A $Z^+$-valuation is expressed as $(X,A,p_X)$ or, equivalently, as $(X,\mu_A,p_X)$, where $p_X$ is the probability distribution (density) of X. A $Z^+$-number is associated with what is referred to as a bimodal distribution, that is, a distribution which combines the possibility and probability distributions of X. Informally, these distributions are compatible if the centroids of $\mu_A$ and $p_X$ are coincident, that is, $$\int_R u \cdot p_X(u) \cdot du = \frac{\int_R u \cdot \mu_A(u) \cdot du}{\int_R \mu_A(u) \cdot du}$$

The scalar product of $\mu_A$ and $p_X$, $\mu_A \cdot p_X$, is the probability measure, $P_A$, of A. More concretely, $$\mu_A \cdot p_X = P_A = \int_R \mu_A(u) p_X(u) du$$

It is this relation that links the concept of a Z-number to that of a $Z^+$-number. More concretely, $Z(A,B)=Z^+(A,\mu_A \cdot p_X \text{ is } B)$ What should be underscored is that in the case of a Z-number what is known is not $p_X$ but a restriction on $p_X$ expressed as: $\mu_A \cdot p_X$ is B. By definition, a $Z^+$-number carries more information than a Z-number. This is the reason why it is labeled a $Z^+$-number. Computation with $Z^+$-numbers is a portal to computation with Z-numbers.

The concept of a bimodal distribution is of interest in its own right. Let X be a real-valued variable taking values in U. For our purposes, it is convenient to assume that U is a finite set, $U=\{u_1, \ldots, u_n\}$. We can associate with X a possibility distribution, $\mu$, and a probability distribution, p, expressed as:

$\mu=\mu_1/u_1+ \ldots +\mu_n/u_n$ $p=p_1\backslash u_1+ \ldots +p_n\backslash u_n$ in which $\mu_i/u_i$ means that $\mu_i$, i=1, ... n, is the possibility that $X=u_i$. Similarly, $p_i\backslash u_i$ means that $p_i$ is the probability that $X=u_i$.

The possibility distribution, $\mu$, may be combined with the probability distribution, p, through what is referred to as confluence. More concretely, $\mu:p=(\mu_1,p_1)/u_1+ \ldots +(\mu_n,p_n)/u_n$ As was noted earlier, the scalar product, expressed as $\mu \cdot p$, is the probability measure of A. In terms of the bimodal distribution, the $Z^+$-valuation and the Z-valuation associated with X may be expressed as:

$(X,A,p_X)$ $(X,A,B),\mu_A \cdot p_X$ is B, respectively, with the understanding that B is a possibilistic restriction on $\mu_A \cdot p_X$.

Both Z and $Z^+$ may be viewed as restrictions on the values which X may take, written as: X is Z and X is $Z^+$, respectively. Viewing Z and $Z^+$ as restrictions on X adds important concepts to representation of information and characterization of dependencies. In this connection, what should be noted is that the concept of a fuzzy if-then rule plays a pivotal role in most applications of fuzzy logic. What follows is a very brief discussion of what are referred to as Z-rules—if-then rules in which the antecedents and/or consequents involve Z-numbers or $Z^+$-numbers.

A basic fuzzy if-then rule may be expressed as: if X is A then Y is B, where A and B are fuzzy numbers. The meaning of such a rule is defined as:

if X is A then Y is B→(X,Y) is A×B where A×B is the Cartesian product of A and B. It is convenient to express a generalization of the basic if-then rule to Z-numbers in terms of Z-valuations. More concretely, if $(X,A_X,B_X)$ then $(Y,A_Y,B_Y)$ Examples if (anticipated budget deficit, about two million dollars, very likely) then (reduction in staff, about ten percent, very likely)

if (degree of Robert's honesty, high, not sure) then (offer a position, not, sure)

if (X, small) then (Y, large, usually.)

An important question relates to the meaning of Z-rules and $Z^+$-rules. The meaning of a $Z^+$-rule may be expressed as:

$$\text{if } (X, A_X, p_X) \text{ then } (Y, A_Y, p_Y) \rightarrow (X, Y) \text{ is } (A_X \times A_Y, p_X p_Y)$$

where $A_X \times A_Y$ is the Cartesian product $A_X$ and $A_Y$

Z-rules have the important applications in decision analysis and modeling of complex systems, especially in the realm of economics (for example, stock market and specific stocks) and medicine (e.g. diagnosis and analysis).

A problem which plays a key role in many applications of fuzzy logic, especially in the realm of fuzzy control, is that of interpolation. More concretely, the problem of interpolation may be formulated as follows. Consider a collection of fuzzy if-then rules of the form:

$$\text{if X is } A_i \text{ then Y is } B_i, i=1, \ldots, n$$

where the $A_i$ and $B_i$ are fuzzy sets with specified membership functions. If X is A, where A is not one of the $A_i$, then what is the restriction on Y?

The problem of interpolation may be generalized in various ways. A generalization to Z-numbers may be described as follows. Consider a collection Z-rules of the form:

$$\text{if X is } A_i \text{ then usually (Y is } B_i), i=1, \ldots n$$

where the $A_i$ and $B_i$ are fuzzy sets. Let A be a fuzzy set which is not one of the $A_i$. What is the restriction on Y expressed as a Z-number? An answer to this question would add a useful formalism to the analysis of complex systems and decision processes.

Representation of Z-numbers can be facilitated through the use of what is called a Z-mouse. Basically, a Z-mouse is a visual means of entry and retrieval of fuzzy data.

Figure 2A:
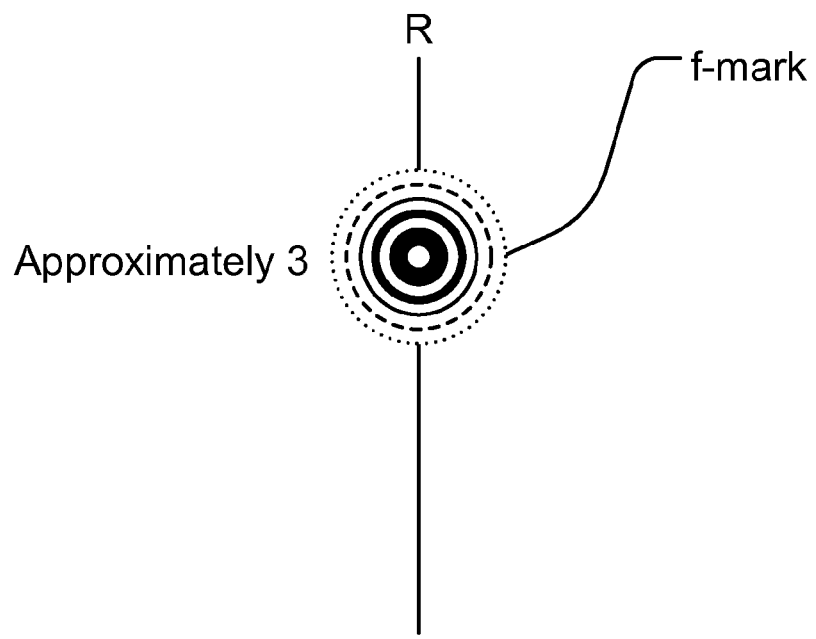
FIG. 2(a) shows f-mark of approximately 3.

The cursor of a Z-mouse is a circular fuzzy mark, called an f-mark, with a trapezoidal distribution of light intensity. This distribution is interpreted as a trapezoidal membership function of a fuzzy set. The parameters of the trapezoid are controlled by the user. A fuzzy number such as "approximately 3" is represented as an f-mark on a scale, with 3 being the centroid of the f-mark (FIG. 2a). The size of the f-mark is a measure of the user's uncertainty about the value of the number. As was noted already, the Z-mouse interprets an f-mark as the membership function of a trapezoidal fuzzy set. This membership function serves as an object of computation. A Z-mouse can be used to draw curves and plot functions.

A key idea which underlies the concept of a Z-mouse is that visual interpretation of uncertainty is much more natural than its description in natural language or as a membership function of a fuzzy set. This idea is closely related to the remarkable human capability to precisiate (graduate) perceptions, that is, to associate perceptions with degrees. As an illustration, if I am asked "What is the probability that Obama will be reelected?" I would find it easy to put an f-mark on a scale from 0 to 1. Similarly, I could put an f-mark on a scale from 0 to 1 if I were asked to indicate the degree to which I like my job. It is of interest to note that a Z-mouse could be used as an informative means of polling, making it possible to indicate one's strength of feeling about an issue. Conventional polling techniques do not assess strength of feeling.

Figure 2B:
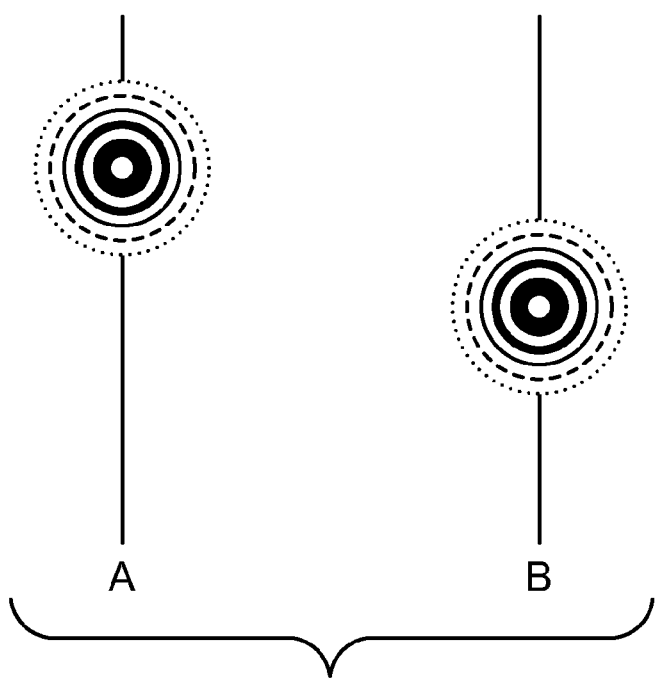
FIG. 2(b) shows f-mark of a Z-number.

Using a Z-mouse, a Z-number is represented as two f-marks on two different scales (FIG. 2b). The trapezoidal fuzzy sets which are associated with the f-marks serve as objects of computation.

Computation with Z-numbers:

What is meant by computation with Z-numbers? Here is a simple example. Suppose that I intend to drive from Berkeley to San Jose via Palo Alto. The perception-based information which I have may be expressed as Z-valuations: (travel time from Berkeley to Palo Alto, about an hour, usually) and (travel time from Palo Alto to San Jose, about twenty-five minutes, usually.) How long will it take me to drive from Berkeley to San Jose? In this case, we are dealing with the sum of two Z-numbers (about an hour, usually) and (about twenty-five minutes, usually.) Another example: What is the square root of (A,B)? Computation with Z-numbers falls within the province of Computing with Words (CW or CWW). Example: What is the square root of a Z-number?

Computation with $Z^+$-numbers is much simpler than computation with Z-numbers. Assume that * is a binary operation whose operands are $Z^+$-numbers, $Z^+_X = (A_X, R_X)$ and $Z^+_Y = (A_Y, R_Y)$. By definition, $$Z^+_X * Z^+_Y = (A_X * A_Y, R_X * R_Y)$$

with the understanding that the meaning of * in $R_X * R_Y$ is not the same as the meaning of * in $A_X * A_Y$. In this expression, the operands of * in $A_X * A_Y$ are fuzzy numbers; the operands of * in $R_X * R_Y$ are probability distributions.

Example: Assume that * is sum. In this case, $A_X + A_Y$ is defined by:

$$\mu_{(A_X + A_Y)}(v) = \sup_u (\mu_{A_X}(u) \wedge \mu_{A_Y}(v-u)), \wedge = \min$$

Similarly, assuming that $R_X$ and $R_Y$ are independent, the probability density function of $R_X * R_Y$ is the convolution, $\circ$, of the probability density functions of $R_X$ and $R_Y$. Denoting these probability density functions as $p_{R_X}$ and $p_{R_Y}$, respectively, we have:

$$p_{R_X + R_Y}(v) = \int_R p_{R_X}(u) p_{R_Y}(v-u) du$$

Thus, $$Z^+_X + Z^+_Y = (A_X + A_Y, p_{R_X} \cdot p_{R_Y})$$

It should be noted that the assumption that $R_X$ and $R_Y$ are independent implies worst case analysis.

More generally, to compute $Z_X * Z_Y$ what is needed is the extension principle of fuzzy logic (see, e.g., L. A. Zadeh, Probability measures of fuzzy events, Journal of Mathematical Analysis and Applications 23 (2), (1968) 421-427.). Basically, the extension principle is a rule for evaluating a function when what are known are not the values of arguments but restrictions on the values of arguments. In other words, the rule involves evaluation of the value of a function under less than complete information about the values of arguments.

Note. Originally, the term "extension principle" was employed to describe a rule which serves to extend the domain of definition of a function from numbers to fuzzy numbers. In this disclosure, the term "extension principle" has a more general meaning which is stated in terms of restrictions. What should be noted is that, more generally, incompleteness of information about the values of arguments applies also to incompleteness of information about functions, in particular, about functions which are described as collections of if-then rules.

There are many versions of the extension principle. A basic version was given in the article: (L. A. Zadeh, Fuzzy sets, Information and Control 8, (1965) 338-353.). In this version, the extension principle may be described as:

$$Y = f(X)$$

$$\frac{R(X): X \text{ is } A \text{ (constraint on } u \text{ is } \mu_A(u))}{R(Y): \mu_Y(v) = \sup_u \mu_A(u)(f(A) = R(Y))}$$

subject to $$v = f(u)$$

where A is a fuzzy set, $\mu_A$ is the membership function of A, $\mu_Y$ is the membership function of Y, and u and v are generic values of X and Y, respectively.

A discrete version of this rule is:

$$Y = f(X)$$

$$\frac{R(X): X \text{ is } (\mu_1/u_1 + \ldots + \mu_n/u_n)}{R(Y): \mu_Y(v) = \sup_{u_1,\ldots,u_n} \mu_i}$$

subject to $$v = f(u_i)$$

In a more general version, we have $$Y = f(X)$$

$$\frac{R(X): g(X) \text{ is } A \text{ (constraint on } u \text{ is } \mu_A(g(u)))}{R(Y): \mu_Y(v) = \sup_u \mu_A(g(u))}$$

subject to $$v = f(u)$$

For a function with two arguments, the extension principle reads:

$$Z = f(X, Y)$$

$$R(X): g(X) \text{ is } A \text{ (constraint on } u \text{ is } \mu_A(g(u)))$$
$$R(Y): h(Y) \text{ is } B \text{ (constraint on } u \text{ is } \mu_B(h(u)))$$
$$\overline{R(Z): \mu_Z(w) = \sup_{u,v}(\mu_X(g(u)) \wedge \mu_Y(h(v)))},$$

$$\wedge = \min$$

subject to $$w = f(u, v)$$

In application to probabilistic restrictions, the extension principle leads to results which coincide with standard results which relate to functions of probability distributions. Specifically, for discrete probability distributions, we have:

$$Y = f(X)$$

$$\frac{R(X): X \text{ is } p,\ p = p_1\backslash u_1 + \ldots p_n\backslash u_n}{R(Y): p_Y(v) = \sum_i p_i(f(p) = R(Y))}$$

subject to $$v = f(u_i)$$

For functions with two arguments, we have:

$$Z = f(X, Y)$$

$$R(X): X \text{ is } p,\ p = p_1\backslash u_1 + \ldots p_m\backslash u_m$$
$$\underline{R(Y): Y \text{ is } q,\ q = q_1\backslash v_1 + \ldots q_n\backslash v_n}$$
$$R(Z): p_Z(w) = \sum_{i,j} p_i q_j(f(p, q) = R(Z))$$

subject to $$w = f(u_i, v_j)$$

For the case where the restrictions are $Z^+$-numbers, the extension principle reads:

$$Z = f(X, Y)$$

$$R(X): X \text{ is } (A_X, p_X)$$

$$\frac{R(Y): Y \text{ is } (A_Y, p_Y)}{R(Z): Z \text{ is } (f(A_X, A_Y), f(p_X, p_Y))}$$

It is this version of the extension principle that is the basis for computation with Z-numbers. Now, one may want to know if $f(p_X, p_Y)$ is compatible with $f(A_X, A_Y)$.

Turning to computation with Z-numbers, assume for simplicity that *=sum. Assume that $Z_X=(A_X, B_X)$ and $Z_Y=(A_Y, B_Y)$. Our problem is to compute the sum $Z=X+Y$. Assume that the associated Z-valuations are $(X, A_X, B_X)$, $(Y, A_Y, B_Y)$ and $(Z, A_Z, B_Z)$.

The first step involves computation of $p_Z$. To begin with, let us assume that $p_X$ and $p_Y$ are known, and let us proceed as we did in computing the sum of $Z^+$-numbers. Then $$p_Z = p_X \circ p_Y$$

or more concretely, $$p_Z(v) = \int_R p_X(u) p_Y(v - u) du$$

In the case of Z-numbers what we know are not $p_X$ and $p_Y$ but restrictions on $p_X$ and $p_Y$ $$\int_R \mu_{A_X}(u) p_X(u) du \text{ is } B_X$$

$$\int_R \mu_{A_Y}(u) p_Y(u) du \text{ is } B_Y$$

In terms of the membership functions of $B_X$ and $B_Y$, these restrictions may be expressed as:

$$\mu_{B_X}\left(\int_R \mu_{A_X}(u) p_X(u) du\right)$$

-continued $$\mu_{B_Y}\left(\int_R \mu_{A_Y}(u)p_Y(u)du\right)$$

Additional restrictions on $p_X$ and $p_Y$ are:

$$\int_R p_X(u)du = 1$$

$$\int_R p_Y(u)du = 1$$

$$\int_R u p_X(u)du = \frac{\int_R u\mu_{A_X}(u)du}{\int_R \mu_{A_X}(u)du} \quad \text{(compatibility)}$$

$$\int_R u p_Y(u)du = \frac{\int_R u\mu_{A_Y}(u)du}{\int_R \mu_{A_Y}(u)du} \quad \text{(compatibility)}$$

Applying the extension principle, the membership function of $p_Z$ may be expressed as:

$$\mu_{p_Z}(p_Z) = \sup_{p_X,p_Y}\left(\mu_{B_X}\left(\int_R \mu_{A_X}(u)p_X(u)du\right) \wedge \mu_{B_Y}\left(\int_R \mu_{A_Y}(u)p_Y(u)du\right)\right)$$

subject to $$p_Z = p_X \circ p_Y$$

$$\int_R p_X(u)du = 1$$

$$\int_R p_Y(u)du = 1$$

$$\int_R u p_X(u)du = \frac{\int_R u\mu_{A_X}(u)du}{\int_R \mu_{A_X}(u)du}$$

$$\int_R u p_Y(u)du = \frac{\int_R u\mu_{A_Y}(u)du}{\int_R \mu_{A_Y}(u)du}$$

In this case, the combined restriction on the arguments is expressed as a conjunction of their restrictions, with ^ interpreted as min. In effect, application of the extension principle reduces computation of $p_Z$ to a problem in functional optimization. What is important to note is that the solution is not a value of $p_Z$ but a restriction on the values of $p_Z$, consistent with the restrictions on $p_X$ and $p_Y$.

At this point it is helpful to pause and summarize where we stand. Proceeding as if we are dealing with $Z^+$-numbers, we arrive at an expression for $p_Z$ as a function of $p_X$ and $p_Y$. Using this expression and applying the extension principle we can compute the restriction on $p_Z$ which is induced by the restrictions on $p_X$ and $p_Y$. The allowed values of $p_Z$ consist of those values of $p_Z$ which are consistent with the given information, with the understanding that consistency is a matter of degree.

The second step involves computation of the probability of the fuzzy event, Z is $A_Z$, given $p_Z$. As was noted earlier, in fuzzy logic the probability measure of the fuzzy event X is A, where A is a fuzzy set and X is a random variable with probability density $p_X$, is defined as:

$$\int_R \mu_A(u)p_X(u)du$$

Using this expression, the probability measure of $A_Z$ may be expressed as:

$$B_Z = \int_R \mu_{A_Z}(u)p_Z(u)du,$$

where $$\mu_{A_Z(u)} = \sup_v(\mu_{A_X}(v) \wedge \mu_{A_Y}(u-v))$$

It should be noted that $B_Z$ is a number when $p_Z$ is a known probability density function. Since what we know about $p_Z$ is its possibility distribution, $\mu_{p_Z}(p_Z)$, $B_Z$ is a fuzzy set with membership function $\mu_{B_Z}$. Applying the extension principle, we arrive at an expression for $\mu_{B_Z}$. More specifically, $$\mu_{B_Z}(w) = \sup_{p_Z}\mu_{p_Z}(p_Z)$$

subject to $$w = \int_R \mu_{A_Z}(u)p_Z(u)du$$

where $\mu_{p_Z}(p_Z)$ is the result of the first step. In principle, this completes computation of the sum of Z-numbers, $Z_X$ and $Z_Y$.

In a similar way, we can compute various functions of Z-numbers. The basic idea which underlies these computations may be summarized as follows. Suppose that our problem is that of computing $f(Z_X,Z_Y)$, where $Z_X$ and $Z_Y$ are Z-numbers, $Z_X=(A_X,B_X)$ and $Z_Y=(A_Y,B_Y)$, respectively, and $f(Z_X,Z_Y)=(A_Z,B_Z)$. We begin by assuming that the underlying probability distributions $p_X$ and $p_Y$ are known. This assumption reduces the computation of $f(Z_X,Z_Y)$ to computation of $f(Z_X^+,Z_Y^+)$, which can be carried out through the use of the version of the extension principle which applies to restrictions which are $Z^+$-numbers. At this point, we recognize that what we know are not $p_X$ and $p_Y$ but restrictions on $p_X$ and $p_Y$. Applying the version of the extension principle which relates to probabilistic restrictions, we are led to $f(Z_X,Z_Y)$. We can compute the restriction, $B_Z$, of the scalar product of $f(A_X,A_Y)$ and $f(p_X,p_Y)$. Since $A_Z=f(A_X,A_Y)$, computation of $B_Z$ completes the computation of $f(Z_X,Z_Y)$.

It is helpful to express the summary as a version of the extension principle. More concretely, we can write:

$$Z = f(X, Y)$$

$X$ is $(A_X, B_X)$ (restriction on $X$)

$Y$ is $(A_Y, B_Y)$ (restriction on $Y$)

$Z$ is $(A_Z, B_Z)$ (induced restriction on $Z$)

$$A_Z = f(A_X, A_Y)$$

(application of extension principle for fuzzy numbers)

$$B_Z = \mu_{A_Z} \cdot f(p_X, p_Y)$$

where $p_X$ and $p_Y$ are constrained by:

$$\int_R \mu_{A_X}(u) p_X(u) du \text{ is } B_X$$

$$\int_R \mu_{A_Y}(u) p_Y(u) du \text{ is } B_Y$$

In terms of the membership functions of $B_X$ and $B_Y$, these restrictions may be expressed as:

$$\mu_{B_X}\left(\int_R \mu_{A_X}(u) p_X(u) du\right)$$

$$\mu_{B_Y}\left(\int_R \mu_{A_Y}(u) p_Y(u) du\right)$$

Additional restrictions on $p_X$ and $p_Y$ are:

$$\int_R p_X(u) du = 1$$

$$\int_R p_Y(u) du = 1$$

$$\int_R u p_X(u) du = \frac{\int_R u \mu_{A_X}(u) du}{\int_R \mu_{A_X}(u) du} \quad \text{(compatibility)}$$

$$\int_R u p_Y(u) du = \frac{\int_R u \mu_{A_Y}(u) du}{\int_R \mu_{A_Y}(u) du} \quad \text{(compatibility)}$$

Consequently, in agreement with earlier results we can write:

$$\mu_{pz}(p_Z) = \sup_{p_X, p_Y}\left(\mu_{B_X}\left(\int_R \mu_{A_X}(u) p_X(u) du\right) \wedge \mu_{B_Y}\left(\int_R \mu_{A_Y}(u) p_Y(u) du\right)\right)$$

subject to $$p_Z = p_X \circ p_Y$$

$$\int_R p_X(u) du = 1$$

$$\int_R p_Y(u) du = 1$$

$$\int_R u p_X(u) du = \frac{\int_R u \mu_{A_X}(u) du}{\int_R \mu_{A_X}(u) du}$$

$$\int_R u p_Y(u) du = \frac{\int_R u \mu_{A_Y}(u) du}{\int_R \mu_{A_Y}(u) du}$$

What is important to keep in mind is that A and B are, for the most part, perception-based and hence intrinsically imprecise. Imprecision of A and B may be exploited by making simplifying assumptions about A and B—assumptions that are aimed at reduction of complexity of computation with Z-numbers and increasing the informativeness of results of computation. Two examples of such assumptions are sketched in the following.

Briefly, a realistic simplifying assumption is that $p_X$ and $p_Y$ are parametric distributions, in particular, Gaussian distributions with parameters $m_X$, $\sigma_X^2$ and $m_Y$, $\sigma_Y^2$, respectively. Compatibility conditions fix the values of $m_X$ and $m_Y$. Consequently, if $b_X$ and $b_Y$ are numerical measures of certainty, then $b_X$ and $b_Y$ determine $p_X$ and $p_Y$, respectively. Thus, the assumption that we know $b_X$ and $b_Y$ is equivalent to the assumption that we know $p_X$ and $p_Y$. Employing the rules governing computation of functions of $Z^+$-numbers, we can compute $B_Z$ as a function of $b_X$ and $b_Y$. At this point, we recognize that $B_X$ and $B_Y$ are restrictions on $b_X$ and $b_Y$, respectively. Employment of a general version of the extension principle leads to $B_Z$ and completes the process of computation. This may well be a very effective way of computing with Z-numbers. It should be noted that a Gaussian distribution may be viewed as a very special version of a Z-number.

Figure 3:
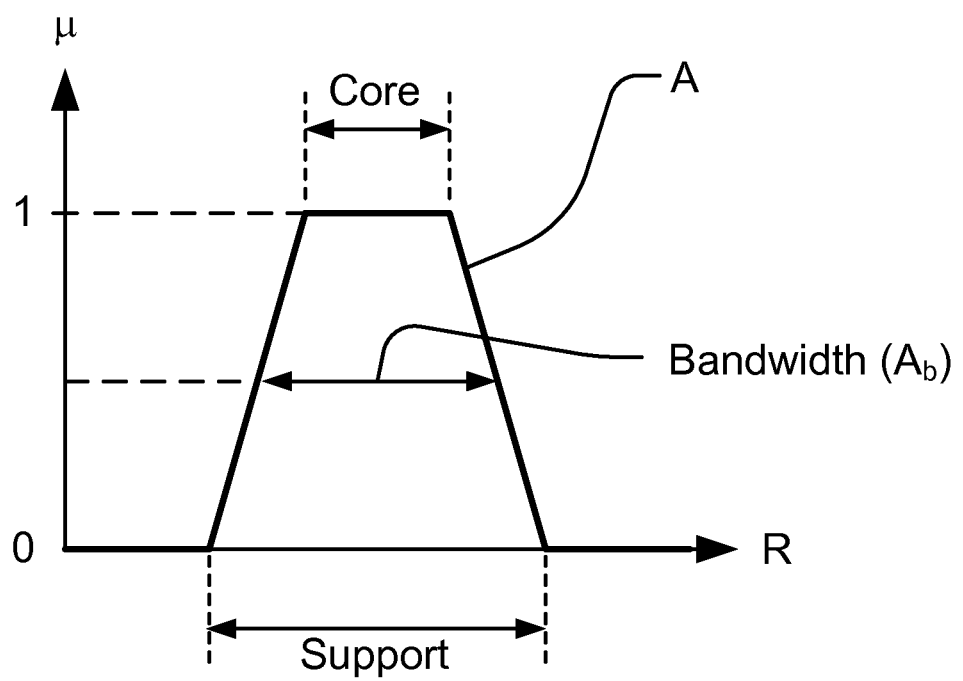
FIG. 3 shows interval-valued approximation to a trapezoidal fuzzy set.

Another effective way of exploiting the imprecision of A and B involves approximation of the trapezoidal membership function of A by an interval-valued membership function, $A^b$, where $A^b$ is the bandwidth of A (FIG. 3). Since A is a crisp set, we can write:

$$(A_X^b, B_X) * (A_Y^b, B_Y) = (A_X^b * A_Y^b, B_X \times B_Y)$$

where $B_X \times B_Y$ is the product of the fuzzy numbers $B_X$ and $B_Y$. Validity of this expression depends on how well an interval-valued membership function approximates to a trapezoidal membership function.

Clearly, the issue of reliability of information is of pivotal importance in planning, decision-making, formulation of algorithms and management of information. There are many important directions which are explored, especially in the realm of calculi of Z-rules and their application to decision analysis and modeling of complex systems.

Computation with Z-numbers may be viewed as a generalization of computation with numbers, intervals, fuzzy numbers and random numbers. More concretely, the levels of generality are: computation with numbers (ground level 1); computation with intervals (level 1); computation with fuzzy numbers (level 2); computation with random numbers (level 2); and computation with Z-numbers (level 3). The higher the level of generality, the greater is the capability to construct realistic models of real-world systems, especially in the realms of economics, decision analysis, risk assessment, planning, analysis of causality and biomedicine.

It should be noted that many numbers, especially in fields such as economics and decision analysis are in reality Z-numbers, but they are not currently treated as such because it is much simpler to compute with numbers than with Z-numbers. Basically, the concept of a Z-number is a step toward formalization of the remarkable human capability to make rational decisions in an environment of imprecision and uncertainty. FIG. 108 is an example of such a system described above.

Analysis Methods Using Probability Distributions with Z-Number

We discussed the probability measure of a fuzzy set A in $R_x$ based on a hidden probability distribution $p_X$, is determined as $$p_X \cdot \mu_A = \int_R \mu_A(u) p_X(u) du.$$

In evaluation of Z number, this probability measure is restricted by a fuzzy set B, with the restriction determined by $$\mu_B\left(\int_R \mu_A(u) p_X(u) du\right).$$

Figure 10A:
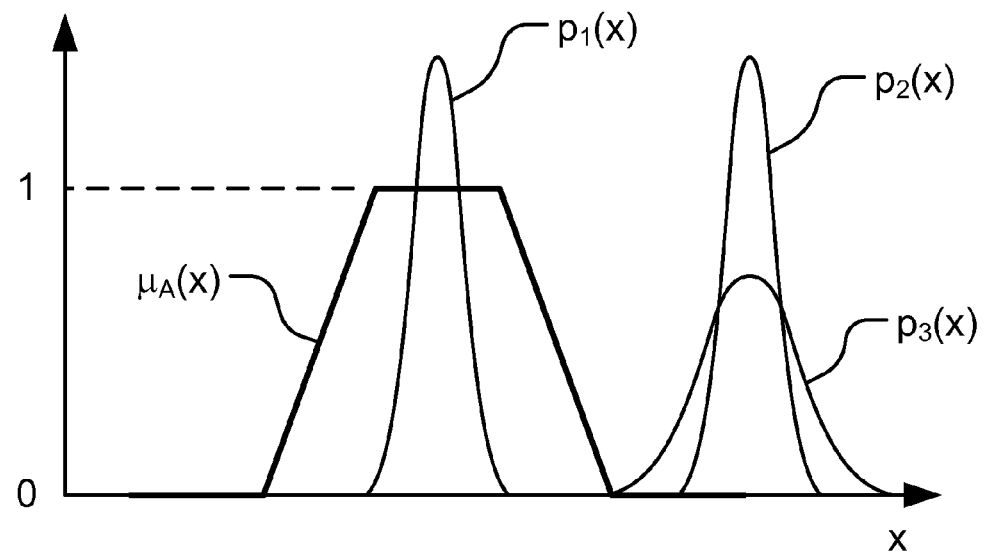
FIGS. 10(a)-(b) depict various types of normal distribution with respect to a membership function, in one embodiment.
Figure 10B:
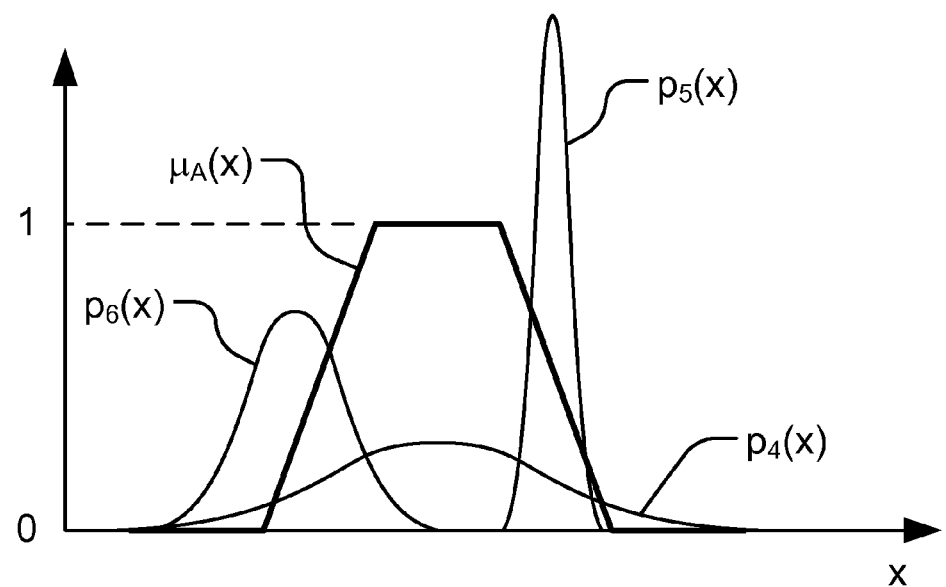
Figure 10C:
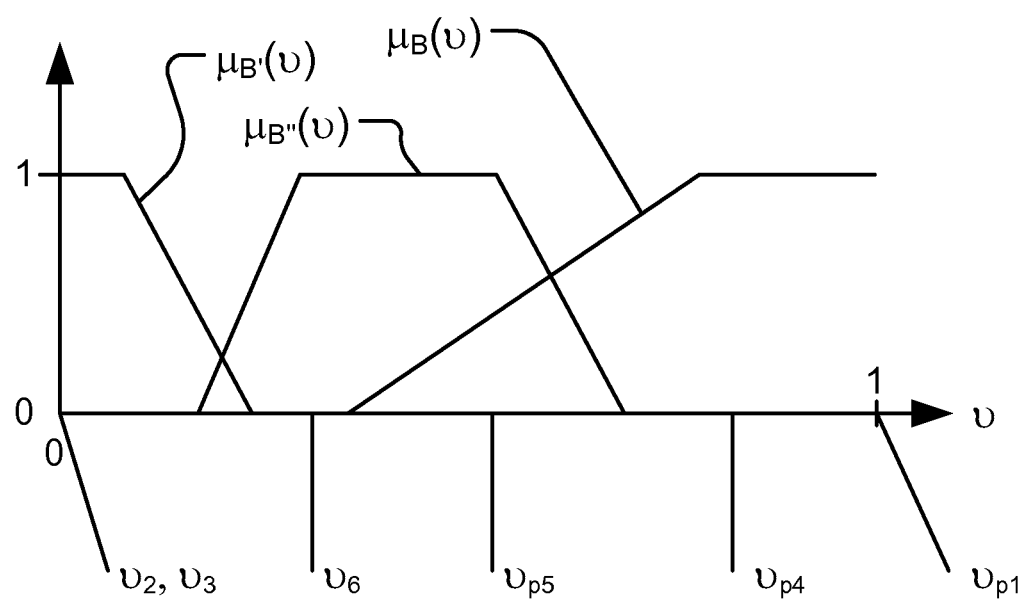
FIGS. 10(c)-(d) depict various probability measures and their corresponding restrictions, in one embodiment.

The restriction is then implied on the probability distribution. In an example shown in FIGS. 10(*a*)-(*b*), of a trapezoid like membrane function for A is depicted to several candidate probability distributions to illustrate the probability measure, in each case. Note that in this example, a Gaussian distribution is used for illustration purposes, but depending on the context, various types of distributions may be used. A category of distribution, e.g., $p_1(x)$ and $p_4(x)$, is concentric with A (or have same or similar center of mass). For a category such as $p_1(x)$, the confinement is at the core of A, and therefore, the corresponding probability measure of A, $v_{p1}$, is 1. (see FIG. 10(c)). Conversely, a category of distribution with little or no overlap with A, e.g., $p_2(x)$ and $p_3(x)$, have a corresponding probability measure of 0 (i.e., $v_{p2}$ and $v_{p3}$). The other categories resulting in probability measure (0, 1), include those such as $p_4(x)$, $p_5(x)$, and $p_6(x)$. As mentioned above, $p_4(x)$ is concentric with A, but it has large enough variance to exceed core of A, resulting probability measure ($v_{p4}$) of less than 1. $p_5(x)$ resembles a delta probability distribution (i.e., with sharply defined location), which essentially picks covered values of $\mu_A(x)$ as the probability measure. When placed at the fuzzy edge of A, it results in probability measure, $v_{p5}$, in (0, 1) range depending on $\mu_A(x)$. Such a distribution, for example, is useful for testing purposes. $p_6(x)$ demonstrates a category that encompasses portions of support or core of A, resulting in a probability measure ($v_{p4}$) in (0, 1). Unlike $p_5(x)$, $p_6(x)$ is not tied to A's core, providing a flexibility to adjust its variance and location to span various probability measures for A. Turning to FIG. 10(c), category of distributions resulting in probability measures in (0, 1) are of particular interest, as they sample and span the restriction membership function $\mu_B(v)$, where $$v = \int_R \mu_A(u) p_X(u) du.$$

FIG. 10(c), also shows three types of restriction denoted by B, B', and B". Restriction B with high membership values for higher measures of probability of A, (e.g., for $v_{p1}$ and $v_{p4}$) demonstrates restrictions such as "very sure" or "very likely". These in turn tend to restrict the probability distributions to those such as $p_1(x)$, $p_4(x)$, which present strong coverage of A, to relative exclusion of other categories such as $p_2(x)$, $p_3(x)$. In such a case, the informativeness of Z number (A, B), turns on the preciseness of both A and B, i.e., the more precise A and B are, the more restricted $p_X$ can be. On the other hand, restriction B' with high membership values for low measures of probability of A, (e.g., for $v_{p2}$ and $v_{p3}$) demonstrates restrictions such as "very seldom" or "highly unlikely". Such restrictions tend to reject distributions such as $p_1(x)$ or $p_4(x)$, in favor of those showing less or no overlap with A. Therefore, if A has a wide and imprecise nature, such a Z number would actually appear to be informative, as the possible distributions are restricted to cover those more precise regions in R corresponding to not A. Thus, in such a case, the informativeness of Z number (A, B), turns on the preciseness of both not A and B. Similarly, restriction B" with high membership values for medium measures of probability of A, (e.g., for $v_{p5}$ and $v_{p6}$ or even $v_{p4}$), demonstrates restrictions such as "often" and "possible". These tend to restrict the distributions to those over-encompassing A (such as $p_4(x)$) or those encompassing or located at the fuzzy edges of A (such as $p_6(x)$ and $p_5(x)$).

Figure 10D:
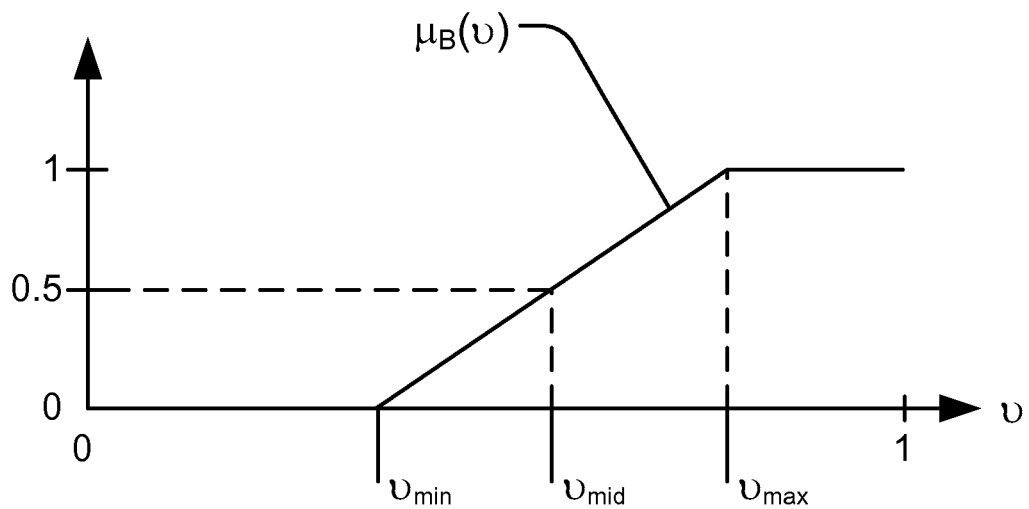

In one embodiment, as depicted for example in FIG. 10(d), the particular probability measures (e.g., $v_{min}$, $v_{mid}$ and $v_{max}$) defined by restriction B are determined, such as midpoint or corner points of membership function $\mu_B(v)$. In one embodiment, probability measures (v) corresponding to multiple cuts of $\mu_B(v)$ at (e.g., predefined levels) are determined. In one embodiment, these particular probability measures (v) for a fuzzy set ($A_x$) of a given variable X are used to determine the corresponding probability measures ($\omega$) for a fuzzy set ($A_y$) on variable Y through a method such as extension principle. This targeted approach will reduce the amount of computation resources (memory and time) needed to determine restriction $B_y$ on probability measure of $A_y$.

Figure 11A:
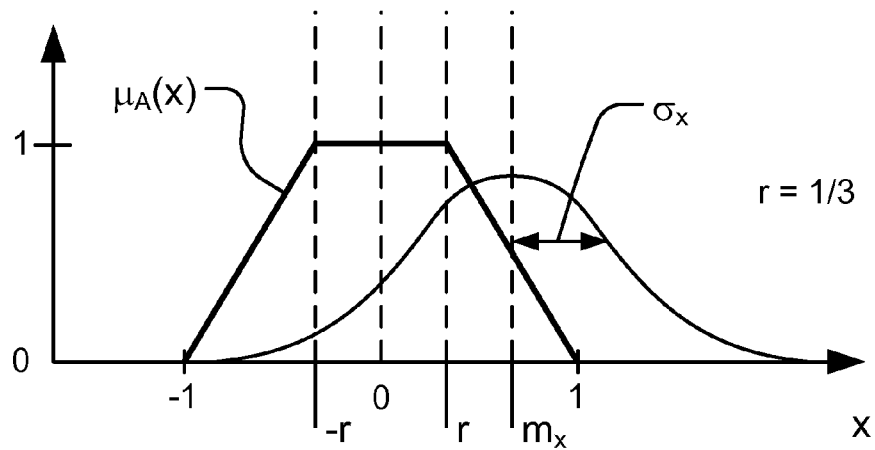
FIG. 11(a) depicts a parametric membership function with respect to a parametric normal distribution, in one embodiment.

In one embodiment, a particular class/template/type of probability distribution is selected to extend the restriction on $p_X$ onto restriction on $p_X$'s parameters. For example, in one embodiment, a normal or Gaussian distribution is taken for $p_X$ (as shown in FIG. 11(a)) with two parameters, mean and standard deviation, ($m_x$, $\sigma_x$), representing the distribution. In one embodiment, the typical or standard-shape membership functions (e.g., triangular, trapezoid, one-sided sloped step-up, one-sided sloped step-down, etc.) are normalized or taken in their normalized form to determine the probability measure against various parameters of the probability distributions (used in the same normalized domain as the fuzzy set). For example, FIG. 11(a) depicts a symmetric trapezoid membership function $\mu_A(x)$, normalized (and shifted) so that its support extends from −1 to 1 and its core at membership value of 1 (extending from −r to r, with respect to its support). In one embodiment, the normalization makes X a dimensionless quantity. The probability distribution, e.g., N($m_x$, $\sigma_x$), is used in the same normalized scale as A. (Note that, to denormalize the distribution, the shift and scaling is used to determine denormalized $m_x$ while the scaling is used inversely to determine denormalized $\sigma_x$.) In such normalized scale, the probability measure is determined, e.g., by:

$$p_X \cdot \mu_X = \int_R p_X(u) \cdot \mu_X(u) du$$

$$= \int_{-1}^{-r} p_X(u) \cdot \mu_X(u) du + \int_{-r}^{r} p_X(u) \cdot \mu_X(u) du + \int_{r}^{1} p_X(u) \cdot \mu_X(u) du$$

$$= \frac{1}{1-r} \int_{-1}^{1} p_X(u) du - \frac{r}{1-r} \int_{-r}^{r} p_X(u) du + \frac{1}{1-r} \int_{-1}^{1} p_X(u) u du -$$

$$\frac{r}{1-r} \int_{-r}^{r} p_X(u) u du$$

For $p_X$ as N($m_x$, $\sigma_x$), the above probability measure of A, is reduced to expression with erf and exp terms with $m_x$, $\sigma_x$ and r. In one embodiment, the probability measures are pre-determined/calculated/tabulated for various values of $m_x$, $\sigma_x$ and r. Note that any denormalization on X does not affect the probability measure, while a denormalization in $\mu_A(x)$ (i.e., maximum membership value) scales the probability measure.

Figure 11B:
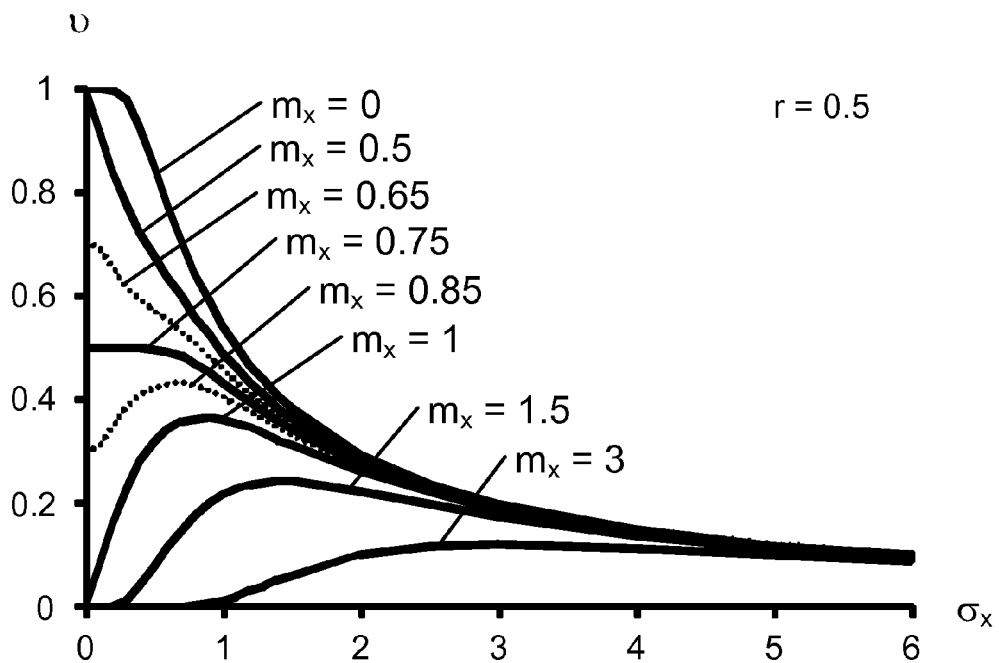
FIGS. 11(b)-(e) depict the probability measures for various values of probability distribution parameters, in one embodiment.
Figure 11C:
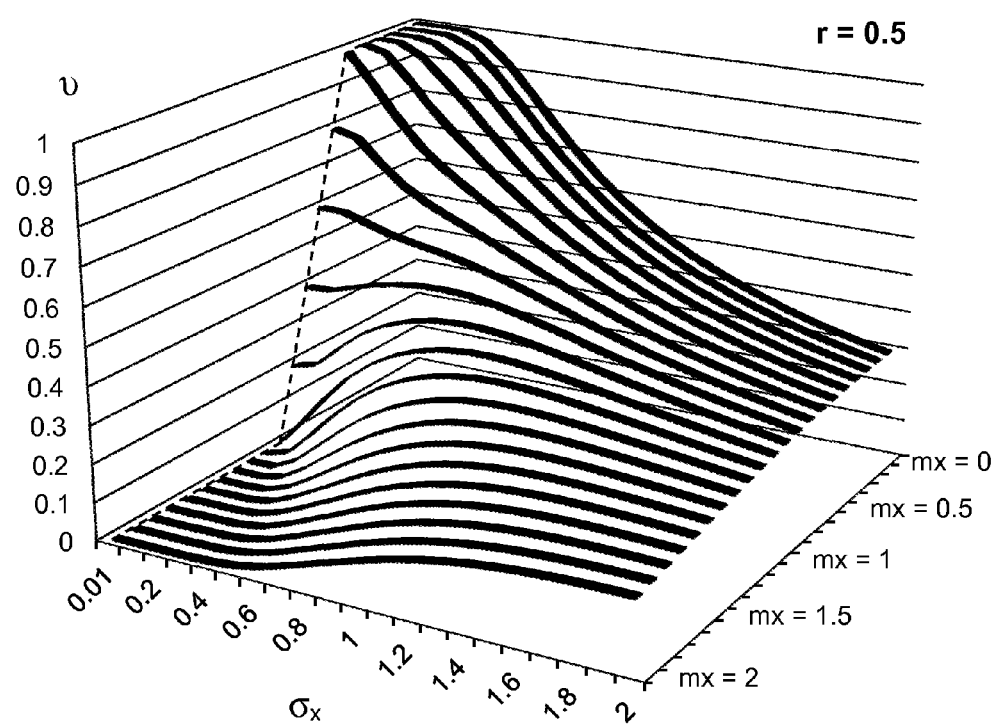
Figure 11D:
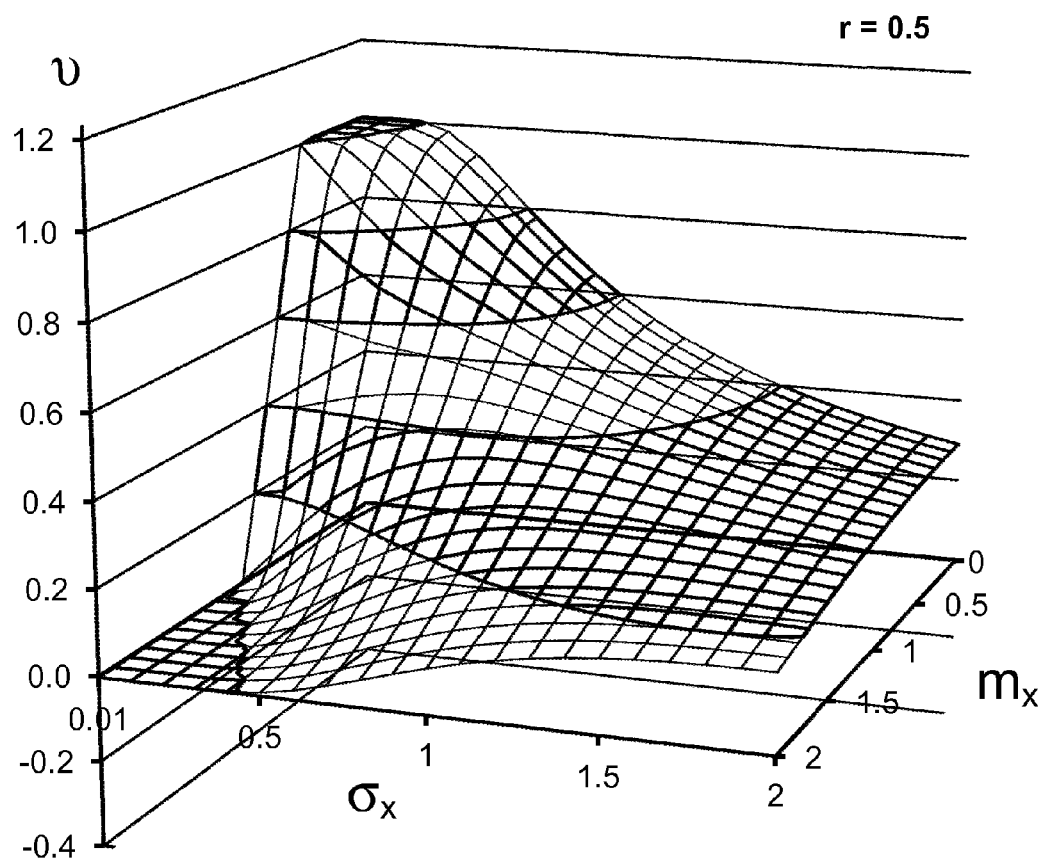
Figure 11E:
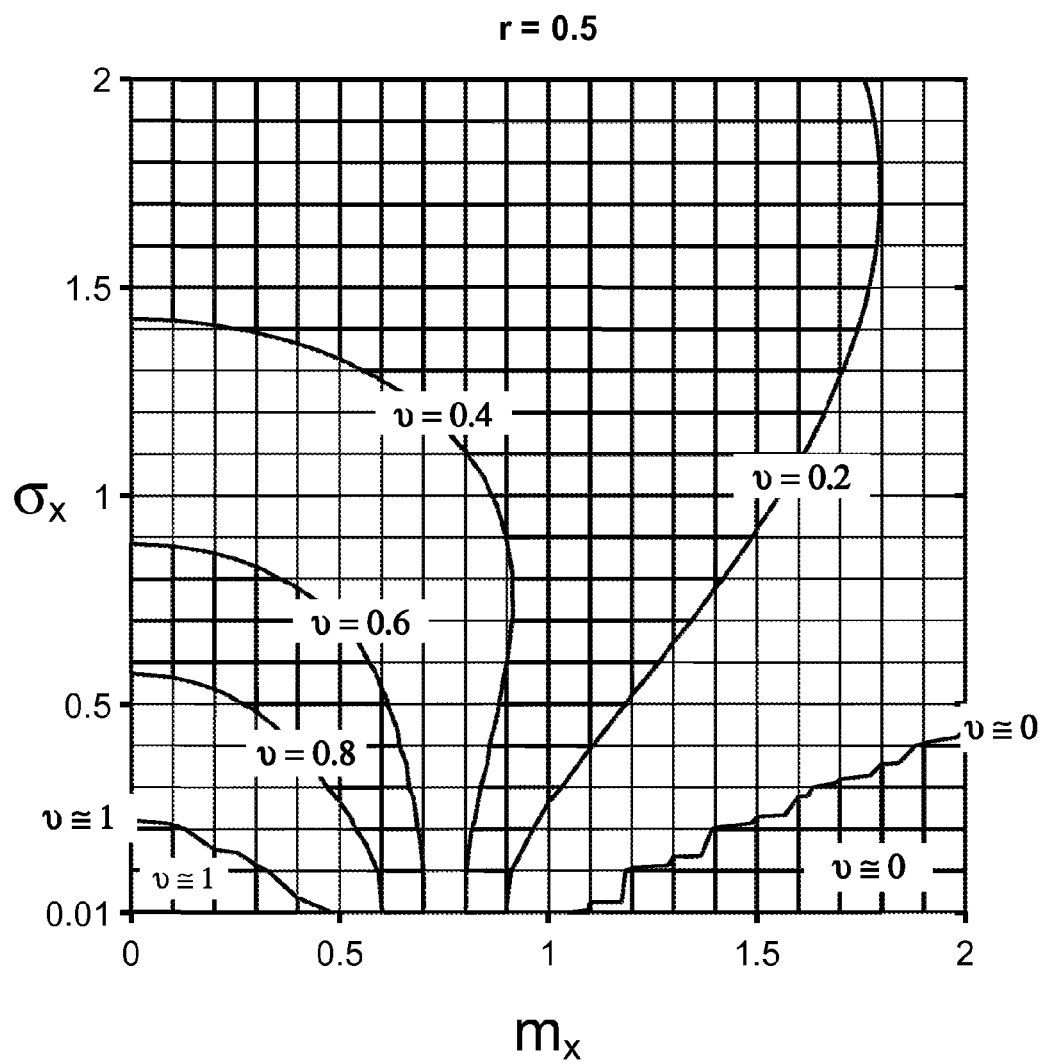
Figure 11F:
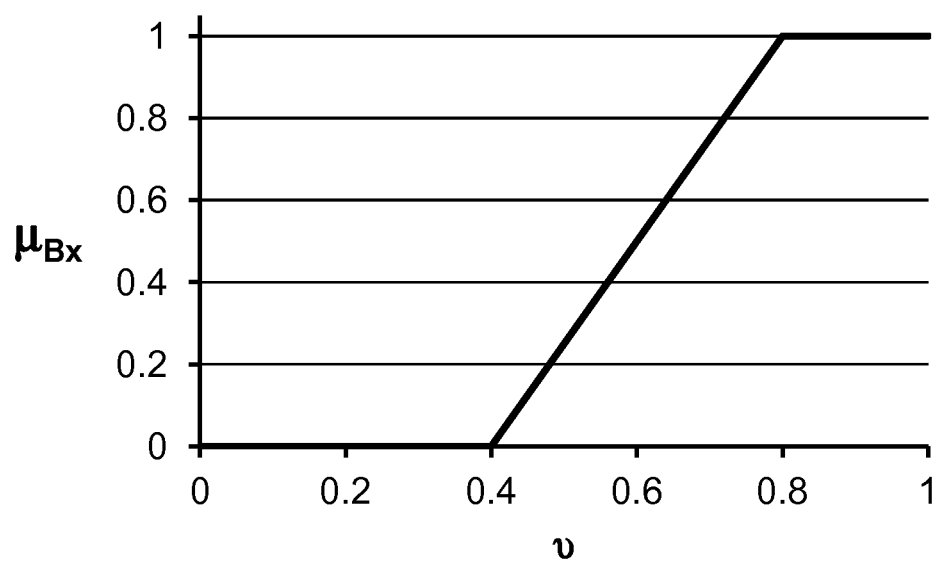
FIG. 11(f) depicts the restriction on probability measure, in one embodiment.
Figure 11G:
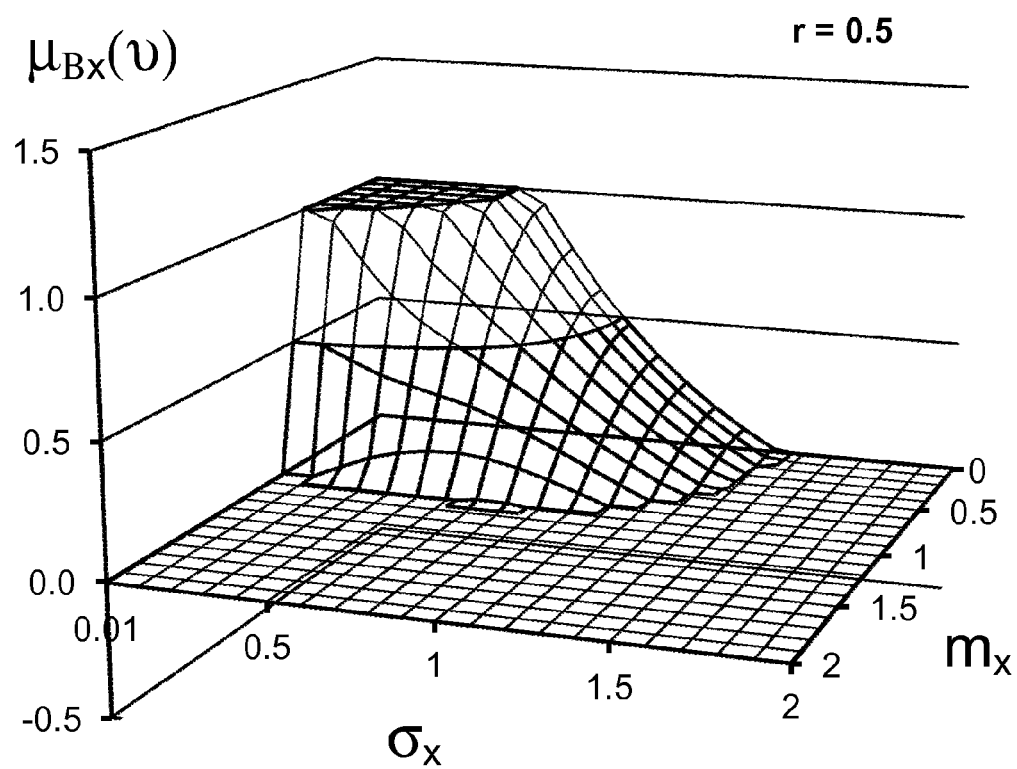
FIGS. 11(g)-(h) depict the restriction imposed on various values of probability distribution parameters, in one embodiment.
Figure 11H:
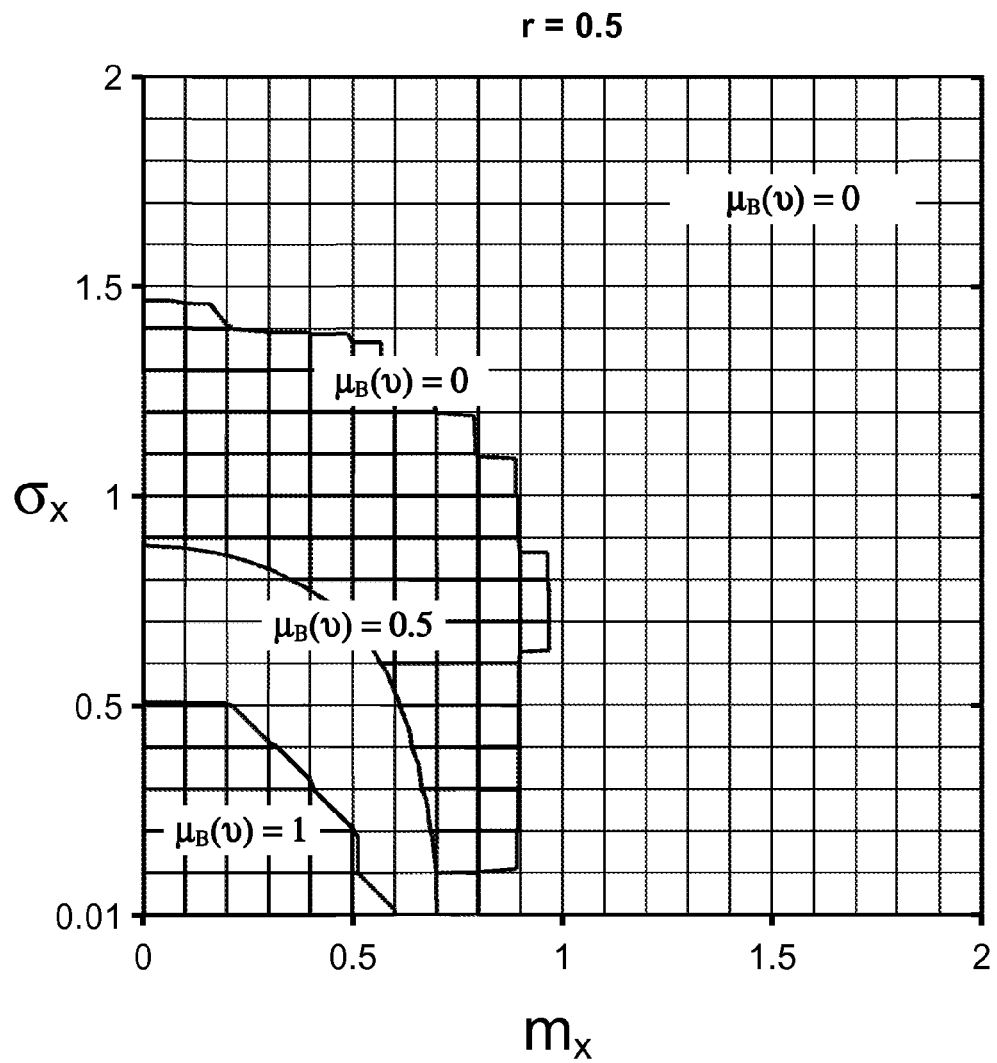

In one embodiment, ($p_X \cdot \mu_X$) (here denoted as $\upsilon$) is determined and/or stored in a model database, for various $p_X$. For example, $\upsilon$ is depicted versus $\sigma_x$ in FIG. 11(b), for various $m_x$ (from 0, to 3), based on a trapezoid $\mu_X$ with r=0.5. At low values of $\sigma_x$, $p_X$ resembles a delta function picking up values of $\mu_X$ evaluated at $m_x$. For example, FIG. 11(c), plot of $\upsilon$ depicts the trace of $\mu_x$ (as dotted line) at low $\sigma_x$. As shown on FIGS. 11(b)-(c), at high values of $\sigma_x$, $\upsilon$ drops is less sensitive to $m_x$ due to increased width of $p_X$. In one embodiment, various $p_X$ may be determined for a target value of $\upsilon$. For example, as depicted in FIG. 11(d), the contour lines of $\upsilon$ are illustrated at ~0, 0.2, 0.4, 0.6, 0.8, and ~1. Similarly, FIG. 11(e) depicts various contour lines for $\upsilon$. In one embodiment, involving Z-valuation (X, $A_x$, $B_x$), $\mu_{Bx}$ is used to restrict the probability measure $\upsilon$(=$p_X \cdot \mu_{Ax}$). For example, as depicted in FIG. 11(f), $\mu_{Bx}$ is a step up membership function with ramp from $v_{min}$ and $v_{max}$ (see FIGS. 10(d)) of 0.4 and 0.8. Applying the restriction to $v(p_X)$ or $v(m_x, \sigma_x)$, the restriction, $\mu_{Bx}(v)$, may be extended to a candidate $p_X$ or $(m_x, \sigma_x)$, as depicted in FIG. 11(g). A contour map of $\mu_{Bx}(m_x, \sigma_x)$ is for example depicted in FIG. 11(h). In this example, the contour lines of $\mu_{Bx}$ are shown for $\mu_{Bx}$ of 1, 0.5, and 0, which based on membership function of $\mu_{Bx}(v)$ (see FIG. 11(f)), correspond to $v$ values of 0.8, 0.6, and 0.4, respectively. As illustrated, these contour lines coincide from FIGS. 11(e) and (h).

In one embodiment, based on $\mu_{Bx}(v)$, for various $v$'s (e.g., $v_{min}, v_{mid}$, and/or $v_{max}$), close $p_X$'s or $(m_x, \sigma_x)$'s candidate are determined, e.g., by tracking/determining the contour lines, via (mesh) interpolation using test (or random) $p_X$'s or $(m_x, \sigma_x)$ (e.g., by using a root finding method such as Secant method). In one embodiment, these subsets of $p_X$'s or $(m_x, \sigma_x)$ reduce the computation resources needed to apply the restriction on other variables or probability distributions.

For example, in a setting where Y=F(X), Z-valuation (X, $A_x$, $B_y$) may be extended to (Y, $A_y$, $B_y$) through restrictions on $p_X$. In one embodiment, where $A_y$ is determined via extension principle using F(X) and $A_x$, $B_y$ is determined by finding the restrictions on probability measure of $A_y$. In one embodiment, F(X) is monotonic, i.e., $X=F^{-1}(Y)$ is unique.

$$p_Y(y) \cdot dy = p_X(x) \cdot \delta_{XY} \cdot dx p_Y(y)$$

or $$p_Y(y) = p_X(x) \cdot \delta_{XY} \cdot \left(\frac{dy}{dx}\right)^{-1} = p_X(x) \cdot \delta_{XY} \cdot (F'(x))^{-1} = p_X(x) \cdot \delta_{XY} \cdot \text{abs}(F'(x))^{-1}$$

where $\delta_{xy}$ is (+1) if F(X) is (monotonically) increasing and it is (−1) if F(X) is decreasing.

The extension principle also provides that, $\mu_{Ax}(x)$ is $\mu_{Ay}(y)$, where y=F(x). Therefore, the probability measure of $A_y$, denoted as $\omega (=p_Y \cdot \mu_{Ay})$, becomes the same as $v$, for the same px or $(m_x, \sigma_x)$, as shown below:

$$\omega = p_Y \cdot \mu_{A_y} = \int_{y_{min}}^{y_{max}} p_Y(y) \cdot \mu_{A_y}(y) \cdot dy$$

$$= \int_{F^{-1}(y_{min})}^{F^{-1}(y_{max})} p_Y(y) \cdot \mu_{A_y}(y) \cdot \left(\frac{dy}{dx}\right) \cdot dx$$

$$= \int_{F^{-1}(y_{min})}^{F^{-1}(y_{max})} p_Y(y) \cdot \mu_{A_x}(x) \cdot \left(\frac{dy}{dx}\right) \cdot dx$$

$$= \int_{F^{-1}(y_{min})}^{F^{-1}(y_{max})} p_X(x) \cdot \delta_{XY} \cdot (F'(x))^{-1} \cdot \mu_{A_x}(x) \cdot \left(\frac{dy}{dx}\right) \cdot dx$$

$$= \int_{x_{min}}^{x_{max}} p_X(x) \cdot \mu_{A_x}(x) \cdot dx = v$$

Therefore, $\mu_{By}(\omega)$ becomes identical to $\mu_{Bx}(v)$ (for any candidate $p_X$), when F(X) is monotonic and $A_y$ is determined via extension principle from $A_x$ and F(X). This result does not hold when F(X) is not monotonic, but it may be used as first order approximation, in one embodiment. For example, for non-monotonic F(X), still assuming $A_y$ is determined via extension principle from $A_x$ and F(X):

$$\mu_{A_y}(y) = \sup_{\forall x'} \mu_{A_x}(x')$$

where $x' \in \{\text{solutions of } F^{-1}(y)\}$

Suppose in Y domain, there are N piecewise monotonic regions of F(X). Therefore, there are up to N number of x's as solutions to $F^{-1}(y)$, denoted by a set $\{x_1, \ldots, x_i, \ldots, x_N\}$. An event occurring in Y domain, may occur at any of $\{x_i\}$, therefore $$p_Y(y) = \sum_{i=1}^{N} \frac{p_X(x_i)}{F'(x_i) \cdot \delta_{XY,i}} = \sum_{i=1}^{N} \frac{p_X(x_i)}{\text{abs}(F'(x_i))}$$

where $\delta_{xy,i}$ indicates, as before, whether $i^{th}$ monotonic region of F(X) is increasing or decreasing.

In an embodiment, $\omega$ is determined by:

$$\omega = p_Y \cdot \mu_{A_y} =$$

$$\int_{y_{min}}^{y_{max}} p_Y(y) \cdot \mu_{A_y}(y) \cdot dy = \sum_{i=1}^{N} \int_{y_{min}}^{y_{max}} \sup_{\forall x'} \mu_{A_x}(x') \cdot \frac{p_X(x_i) \cdot dx}{F'(x_i) \cdot \delta_{XY,i}} \cdot \frac{dy}{dx}$$

where $x' \in \{x_i\}$.

Therefore, $$\omega = \sum_{i=1}^{N} \int_{x_{min,i}}^{x_{max,i}} \sup_{\forall x'} \mu_{A_x}(x') \cdot p_X(x_i) \cdot dx$$

Thus, $\omega \geq v$, for a given $p_X$, because:

$$\omega = \sum_{i=1}^{N} \int_{x_{min,i}}^{x_{max,i}} \sup_{\forall x'} \mu_{A_x}(x') \cdot p_X(x_i) \cdot dx \geq$$

$$\sum_{i=1}^{N} \int_{x_{min,i}}^{x_{max,i}} \mu_{A_x}(x_i) \cdot p_X(x_i) \cdot dx$$

$$= \int_{x_{min}}^{x_{max}} \mu_{A_x}(x_i) \cdot p_X(x_i) \cdot dx = v$$

In one embodiment, where, e.g., due to relative symmetry in F(X) and $\mu_{Ax}(x)$, $\mu_{Ax}(x)$ is the same for $\forall x' \in \{x_i\}$, then $\omega = v$, because $\mu_{A_y}(y) = \sup_{\forall x'} \mu_{A_x}(x') = \mu_{A_x}(x_i)$ for any $x_i$.

Likewise, in one embodiment, where $\mu_{Ax}(x)$ is zero or negligible in a region (e.g., for N=2), then $\omega = v$, as the contribution to $\omega$ comes from the dominant monotonic region of F(X).

In one embodiment, deviation of $\omega$ from $v$ is estimated/determined by determining difference between $\sup_{\forall x'} \mu_{A_x}(x')$ and various $\mu_{A_x}(x_i)$'s.

In one embodiment, where $\mu_{Ay}(y)$ is provided via a proposition (instead of being determined via extension principle through F(X) and $A_x$), $\mu_{Ay}(y)$ is determined (via extension principle) and compared to $\mu_{Ay}(y)$. If there is a match, then $\omega$ is estimated using $v$, e.g., as described above.

Figure 11I:
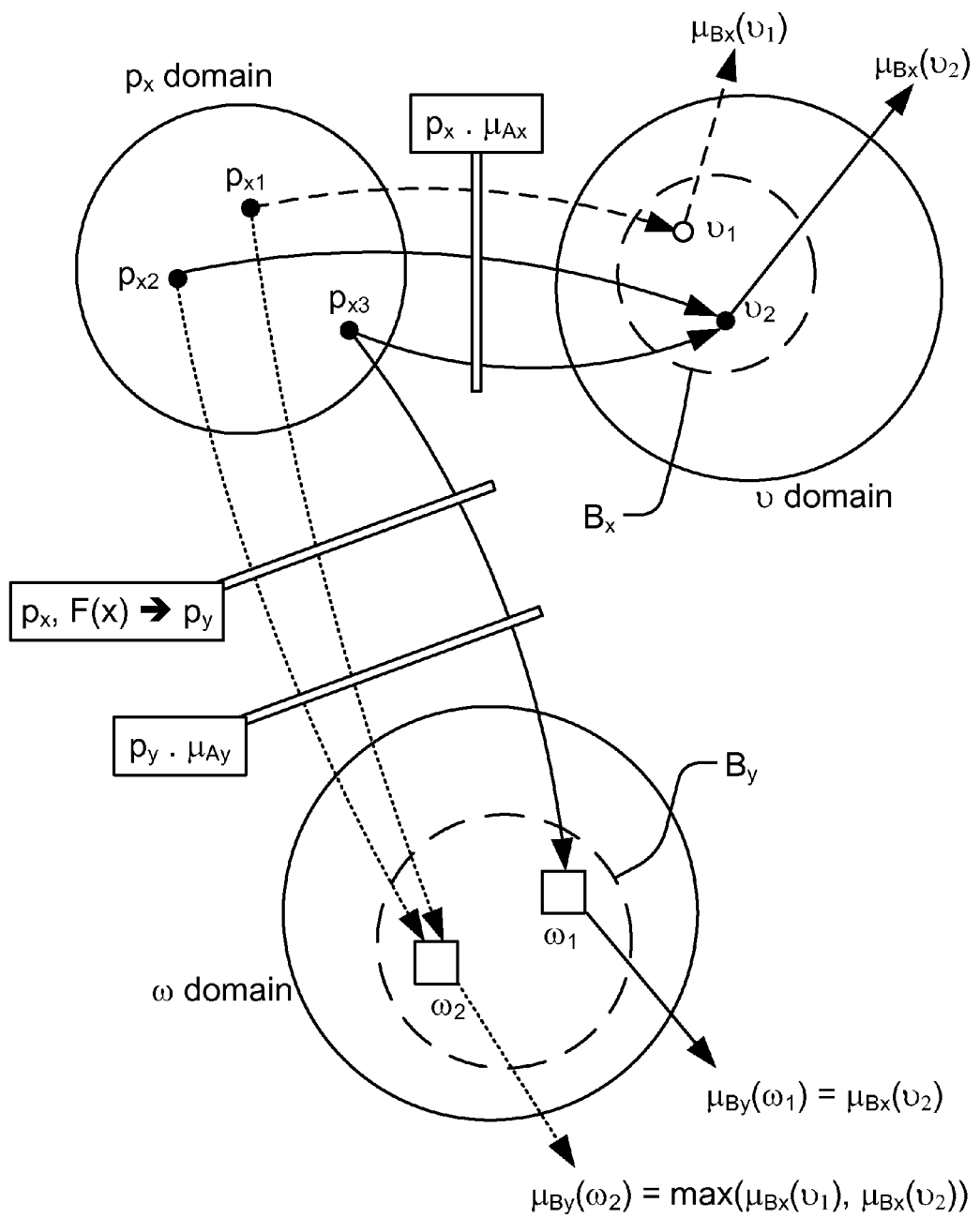
FIG. 11(i) depicts the restriction relationships between the probability measures, in one embodiment.

In one embodiment, as for example depicted in FIG. 11(i), $\mu_{By}(\omega)$ is determined by a series of mapping, aggregation and maximization between $p_X$, $v$, and $\omega$ domains.

One embodiment, for example, uses the concepts above for prediction of stock market, parameters related to economy, or other applications. Consider the following example:

EXAMPLE 1

We are given this information (for anticipation and prediction): There probability that the price of oil next month is significantly over 100 dollars/barrel is not small.

Assume that the ticket price for an airline from Washington D.C. to New York is in the form of $(Y=F(X)=a_1 \cdot X+a_2)$, where X is the next month's estimated price of oil (in dollars/barrel) and Y is the ticket price (in dollars). For this example, further assume that $a_1=1.5$ and $a_2=150$, i.e., $Y=1.5 X+150$. Then, we have the following questions:

$q_1$: What is the Price of the Ticket from Washington DC to New York?

Figure 12A:
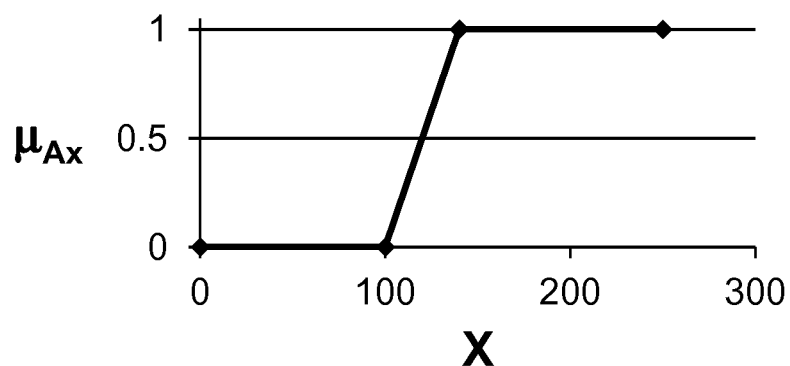
FIG. 12(a) depicts a membership function, in one embodiment.
Figure 12B:
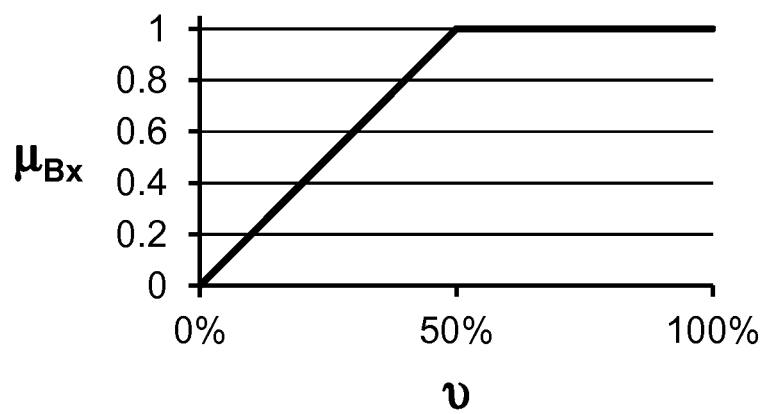
FIG. 12(b) depicts a restriction on probability measure, in one embodiment.
Figure 12C:
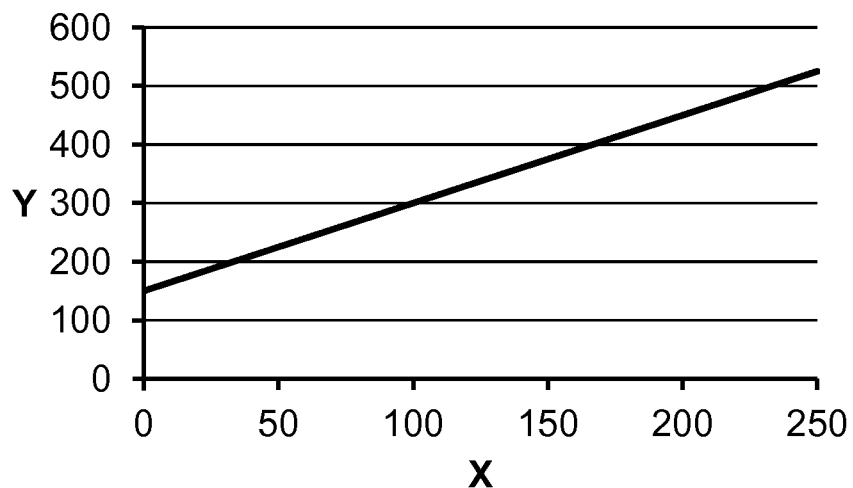
FIG. 12(c) depicts a functional dependence, in one embodiment.
Figure 12D:
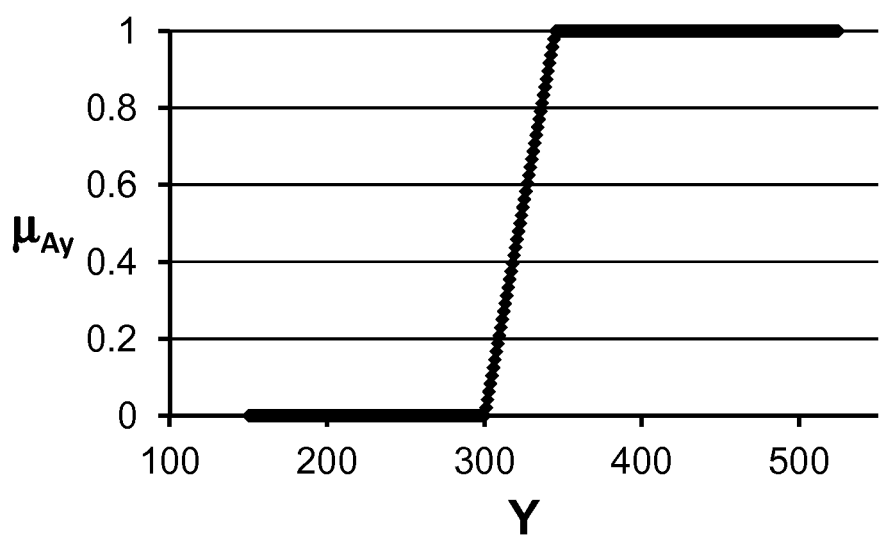
FIG. 12(d) depicts a membership function, in one embodiment.

X represents (the price of oil the next month), $A_x$ is (significantly over 100 dollars/barrel) and $B_x$ is (not small). Then, $(X, A_x, B_x)$ is a Z-valuation restricting the probability of(X) the price of oil the next month. In this example, as depicted in FIG. 12(a), significantly over is represented by a step-up membership function membership function, $\mu_{Ax}$, with a fuzzy edge from 100 to 130. Also, as depicted in FIG. 12(b), not small is represented by a ramp-up membership function membership function, $\mu_{Bx}(\upsilon)$, with the ramp edge at $\upsilon$ from 0 to 50%. Note that $\upsilon$ is the probability measure of $A_x$. The answer to $q_1$, also represented in a Z-valuation, is $(Y, A_y, B_y)$, where Y represents the price of the ticket, $A_y$ represents a fuzzy set in Y, and $B_y$ represents the certainty of Z-valuation for the answer. Here both $A_y$ and $B_y$ are being sought by $q_1$. In one embodiment, an X domain is created from [0, 250], a form of Normal Distribution, $N(m_x, \sigma_x)$, is assumed for $p_X(u)$ (where u is a value in X domain). A set of candidate $p_X$ are setup by setting a range for $m_x$, e.g., [40,200], and a range for $\sigma_x$, e.g., [0, 30]. Note that value of zero for $\sigma_x$, signifies delta function which is estimated by a very small value, such as 0.01 (in this case). In one embodiment, the range of $(m_x, \sigma_x)$ is chosen so that they cover various categories of distributions with respect to $\mu_{Ax}$, as discussed previously. For example, maximum $\sigma_x$ is determined, in one embodiment, as a factor (e.g., between 1 to 3) times the maximum ramp width of $\mu_{Ax}$. In this example, maximum $\sigma_x$ is taken as (1 times) ramp width of $\mu_{Ax}$ of 30 (=130-100). In one embodiment, $m_x$ range is determined with respect to $\mu_{Ax}$ (e.g., beginning of the ramp, at 100) and maximum $\sigma_x$ (e.g., 30). For example, $m_x$ range is taken to cover a factor of $\sigma_X$ (e.g., 2 to 3) from ramp (e.g., bottom at 100 and top at 130). In one embodiment, the range of X domain is also taken to encompass $m_x$ range by a factor of $\sigma_x$ (e.g., 2 to 3) at either extreme (e.g., if valid in the context of X). In one embodiment, as shown in FIG. 12(c), X range/ values are used to find the corresponding Y values based on F(X). Given that $q_1$ looks for $A_y$ as part of the answer, one embodiment uses extension principle determine the membership function of $A_y$ in Y, $\mu_{Ay}$. In one embodiment, $\mu_{Ay}$ is determined by determining the corresponding Y values for X values which identify $\mu_{Ax}$ (e.g., X values of ramp location or trapezoid corners). In such an embodiment, when F(X) is monotonic in the range of X domain, for X=$x_0$, the corresponding $y_0$ are $\mu_{Ay}$ are determined as: $y_0=F(x_0)$ and $\mu_{Ay}(y_0)=\mu_{Ax}(x_0)$. In one embodiment, where multiple values of X exist for $F^{-1}(y)$, $\mu_{Ay}(y)=\sup(\mu_{Ax}(x'))$ for all x' in X domain where $y_0=F(x')$. In one embodiment, $p_{Ay}(y)$ is determined at every y corresponding to every x in X domain. In one embodiment, the range of resulting Y values is determined (e.g., min and max of values). For example, the range of Y is [150, 525]. In one embodiment, $\mu_{Ay}(y)$ is determined as an envelope in Y domain covering points $(F(x'), \mu_{Ax}(x'))$ for all x' in X domain. The envelope then represents sup $(\mu_{Ax}(x'))$. In one embodiment, Y domain is divided in bins (for example of equal size). For various x values, e.g., $x_1$ and $x_2$, where values of F(x) fall in the same bin, maximum $\mu_{Ax}(x)$ for those x's are attributed to the bin. In one embodiment, y values signifying the bins are used for determining the probability measures of $A_y$. In one embodiment, the original y values corresponding to the set of x values used in X domain are used to determine probability measures of $A_y$. In such an embodiment, for example, the maximum corresponding $\mu_{Ax}$ attributed to the bin is also attributed to such y values. For example, as depicted in FIG. 12(d), $\mu_{Ay}$ is calculated for corresponding y values.

In one embodiment, the probability measure of $A_X$, (i.e., $\upsilon$), is determined by dot product of $p_X$ and $\mu_{Ax}$. In one embodiment, $p_X$ is evaluated at x values in X domain (e.g., against a set of points between $x_{min}$ and $x_{max}$). Similarly, $\mu_{Ax}$ is determined at the data set $\{x_i\}$ in X domain (or at significant, e.g., corner points of $\mu_{Ax}$). In one embodiment, the dot product is determined by evaluating $$v_{p_x} = \sum_i p_x(x_i) \cdot \mu_{A_x}(x_i)$$

Figure 12E:
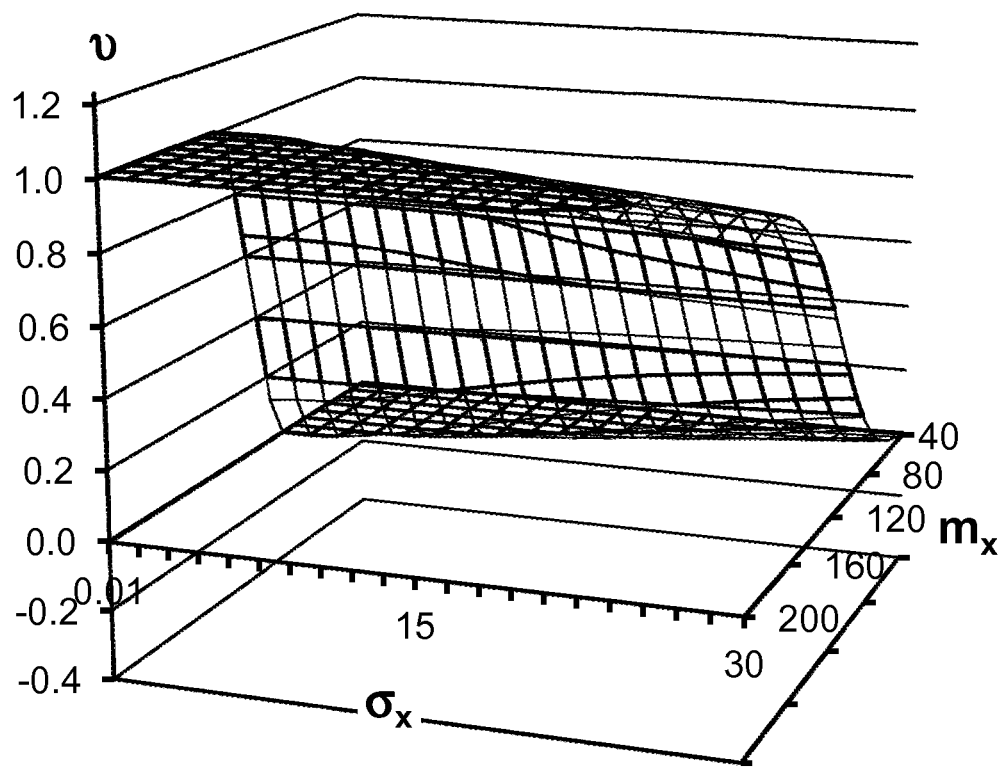
FIGS. 12(e)-(h) depict the probability measures for various values of probability distribution parameters, in one embodiment.
Figure 12F:
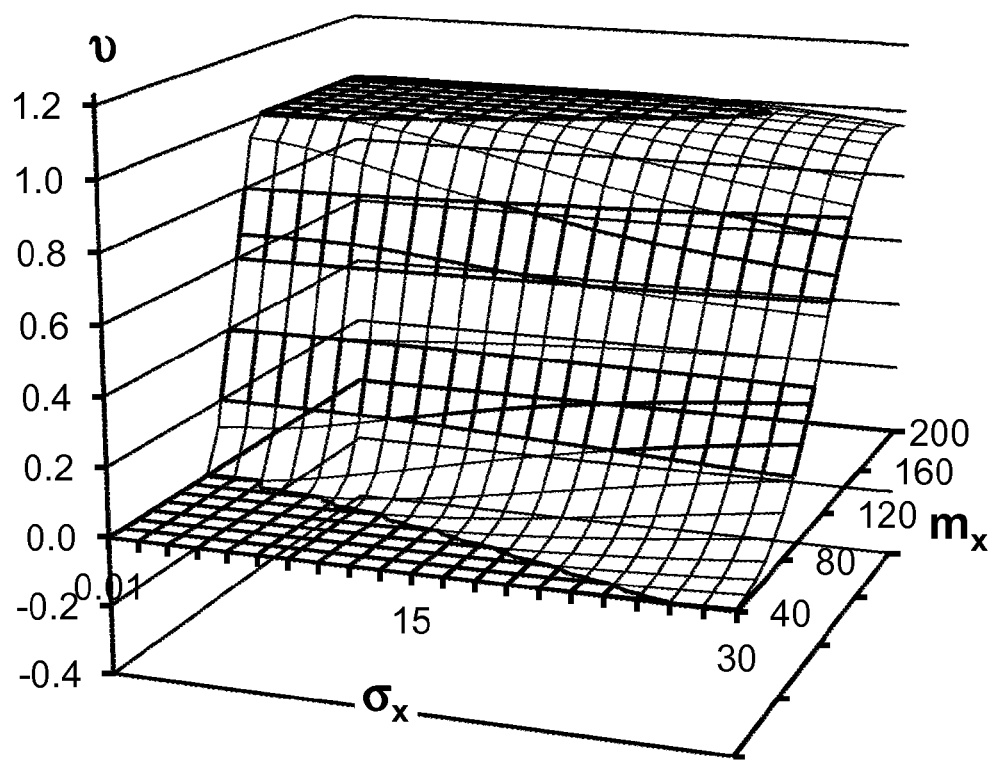
Figure 12G:
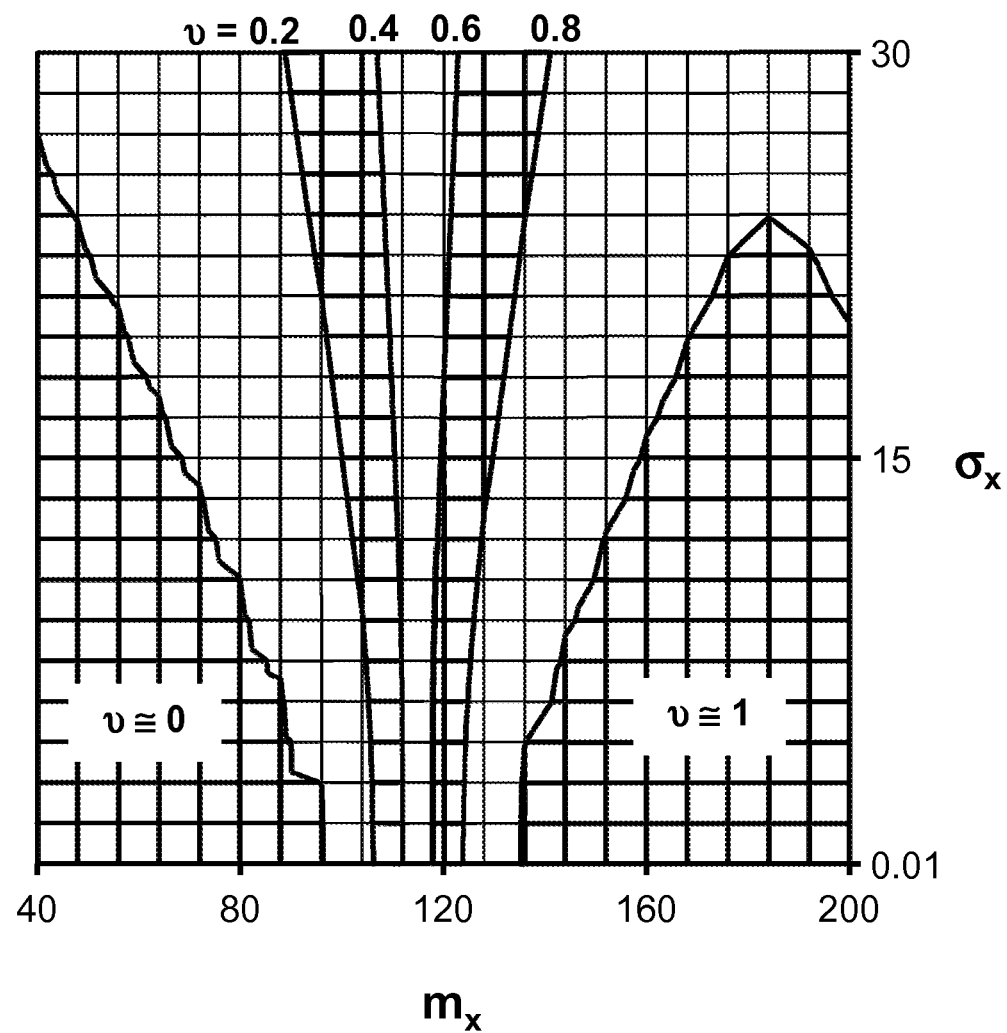
Figure 12H:
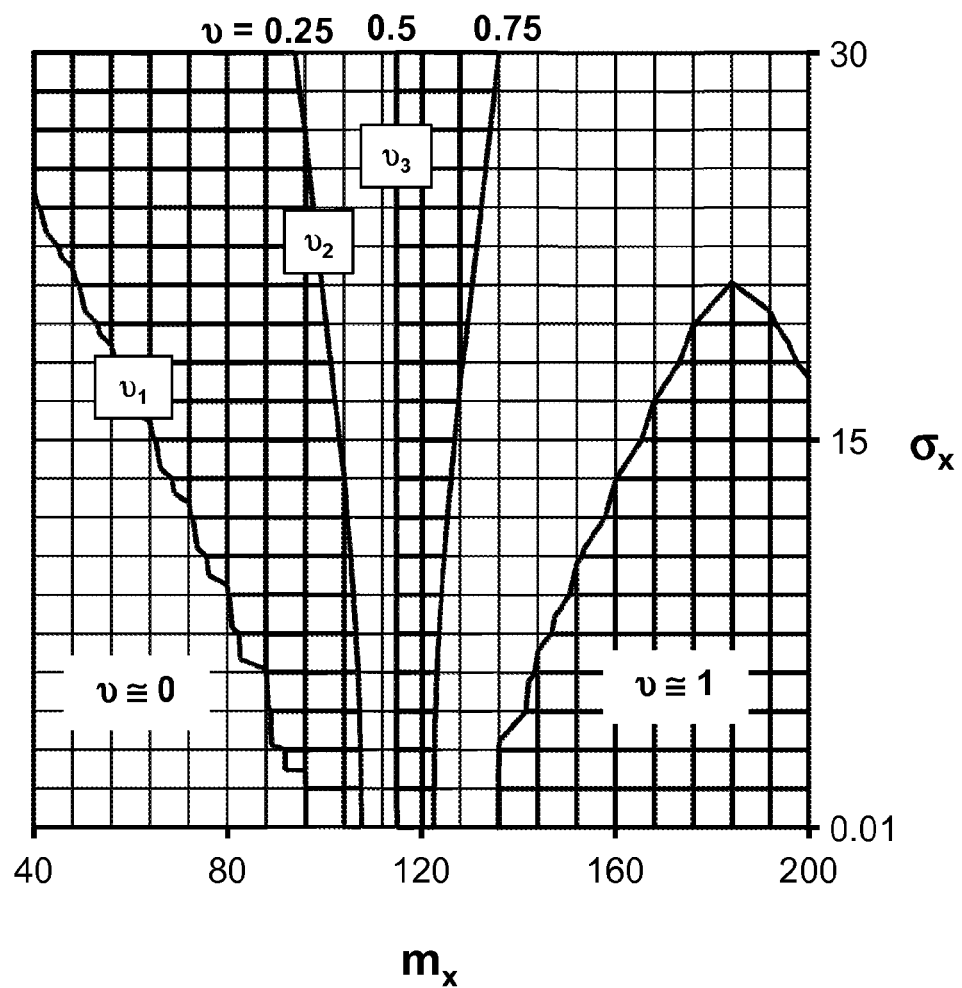

In one embodiment, $\upsilon$ is determined via piecewise evaluation (e.g., using exp and erf functions when $p_X$ is Gaussian). In one embodiment, $\upsilon$ is determined for various candidates for $p_X$. For example, taking $p_X$ as $N(m_x, \sigma_x)$ as described above, $\upsilon$ is determined for various $(m_x, \sigma_x)$ combination, as depicted in FIGS. 12(e)-(f). The contour maps of v versus $(m_x, \sigma_x)$ is depicted in FIGS. 12(g)-(h). As depicted in these figures, at low $\sigma_x$ (delta function limit of $p_X$), $\upsilon(m_x, \sigma_x)$ becomes $\mu_{Ax}(m_x)$. At higher, $\sigma_x$ smoothing effect takes over for intermediate values of $\upsilon$.

Figure 12I:
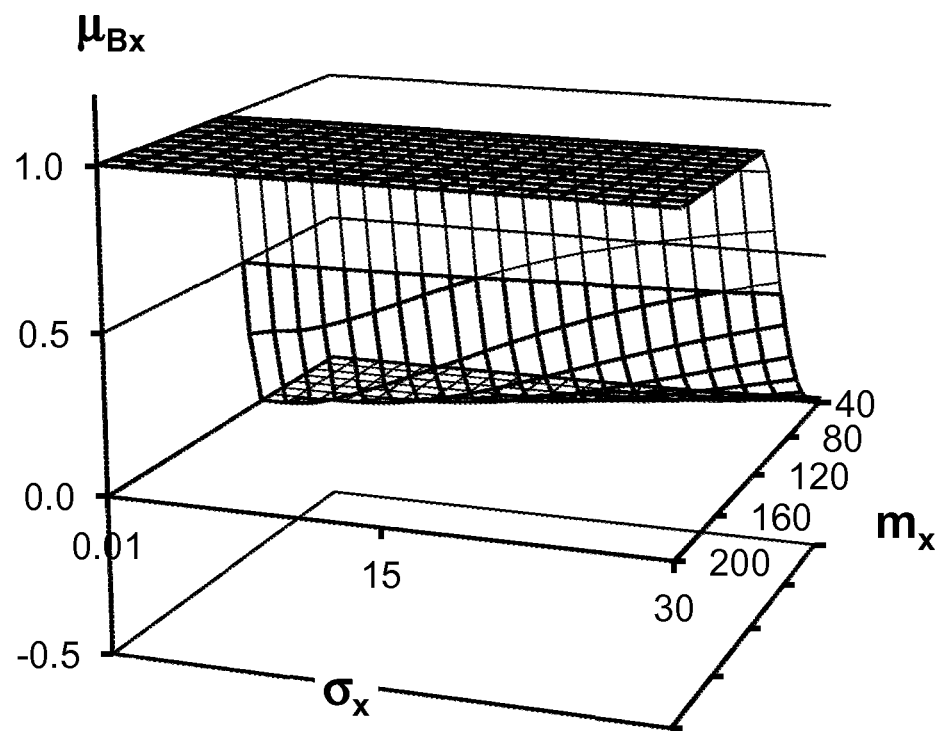
FIGS. 12(i)-(j) depict the restriction imposed on various values of probability distribution parameters, in one embodiment.
Figure 12J:
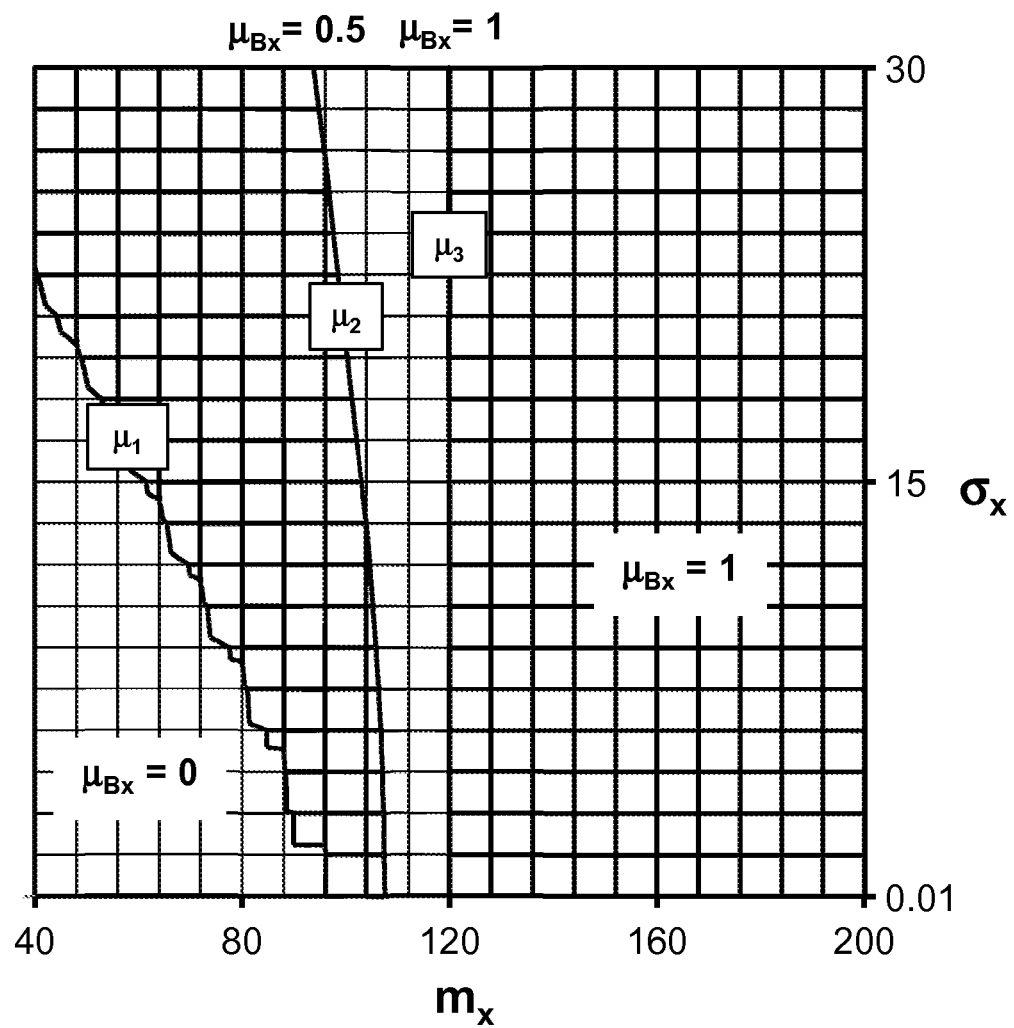

Given restriction not small, $B_x$, in one embodiment, the test score for each candidate $p_X$ is evaluated, by evaluating the truth value of its corresponding probability measure of $A_x$, $\upsilon$, in $\mu_{Bx}(\upsilon)$. In one embodiment, the assignment of test score is used for $p_X$ candidates corresponding to a particular set of $\upsilon$ values (e.g., those used to define $\mu_{Bx}(\upsilon)$ such as the ramp location or trapezoid corners). In such an embodiment, bins are associated with such particular $\upsilon$'s to determine $p_X$ candidates with corresponding $\upsilon$ values within a bin. Those candidates, are for example, identified by those $(m_x, \sigma_x)$ at or near particular contour lines of interest (e.g., marked as $\upsilon_1, \upsilon_2$, and $\upsilon_3$ at $\upsilon$ values of 0, 0.25 and 0.5, on FIG. 12(h), indicating the beginning, middle, and end of the ramp for $B_X$ as shown in FIG. 12(b)). FIG. 12(i) depicts, for example, the test score for a given $(m_x, \sigma_x)$ by evaluating the corresponding $\upsilon(m_x, \sigma_x)$ against $\mu_{Bx}(\upsilon)$. FIG. 12(j) depicts, for example, depicts a contour map of $\mu_{Bx}(\upsilon(m_x, \sigma_x))$ on $(m_x, \sigma_x)$ domain. For example, $\mu_1, \mu_2$, and $\mu_3$ at $\mu$ values of 0, 0.5, and 1 marked on the contour map correspond to $\upsilon$ contours for $\upsilon_1, \upsilon_2$, and $\upsilon_3$.

In one embodiment, the probability measure of $A_y$, (i.e., $\omega$), is determined by dot product of $p_Y$ and $\mu_{Ay}$. In one embodiment, $p_Y$ is determined via application of extension principal. In one embodiment, $p_X$'s for points in $\{x_i\}$ in X domain are attributed to their corresponding points $\{y_i\}$ in Y domain. Such an embodiment accommodates having multiple $y_i$'s have the same value (or belong to the same bin in Y domain). Alternatively, or additionally, in one embodiment, bins are setup in Y domain to determine $p_Y$ for each bin by summing over corresponding $p_i$'s (from X domain) where $F(x_i)$ is within the Y-bin. In such an embodiment, $\omega$, for example, is determined by taking $p_Y$ and $\mu_{Ay}$ dot product in Y domain over Y bins. However, in one embodiment, $p_Y$ and $\mu_{Ay}$ dot product is essentially determined in X domain, for example by:

$$\omega_{p_x} = \sum_i p_x(x_i) \cdot \mu_{Ay}(y_i)$$

Figure 12K:
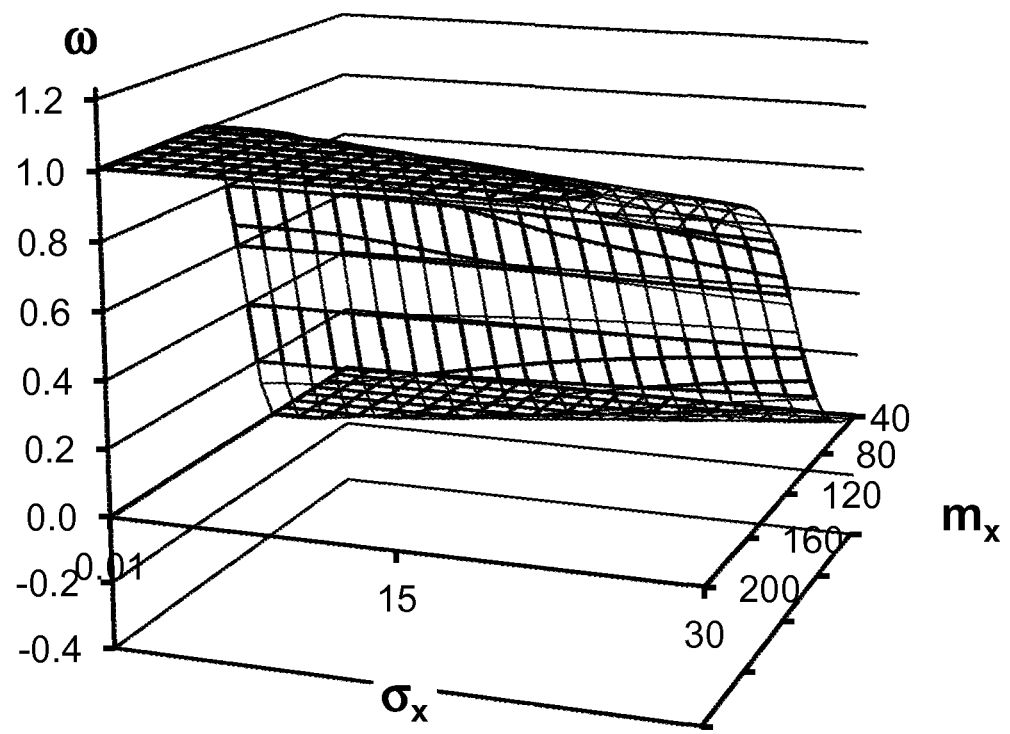
Figure 12I:
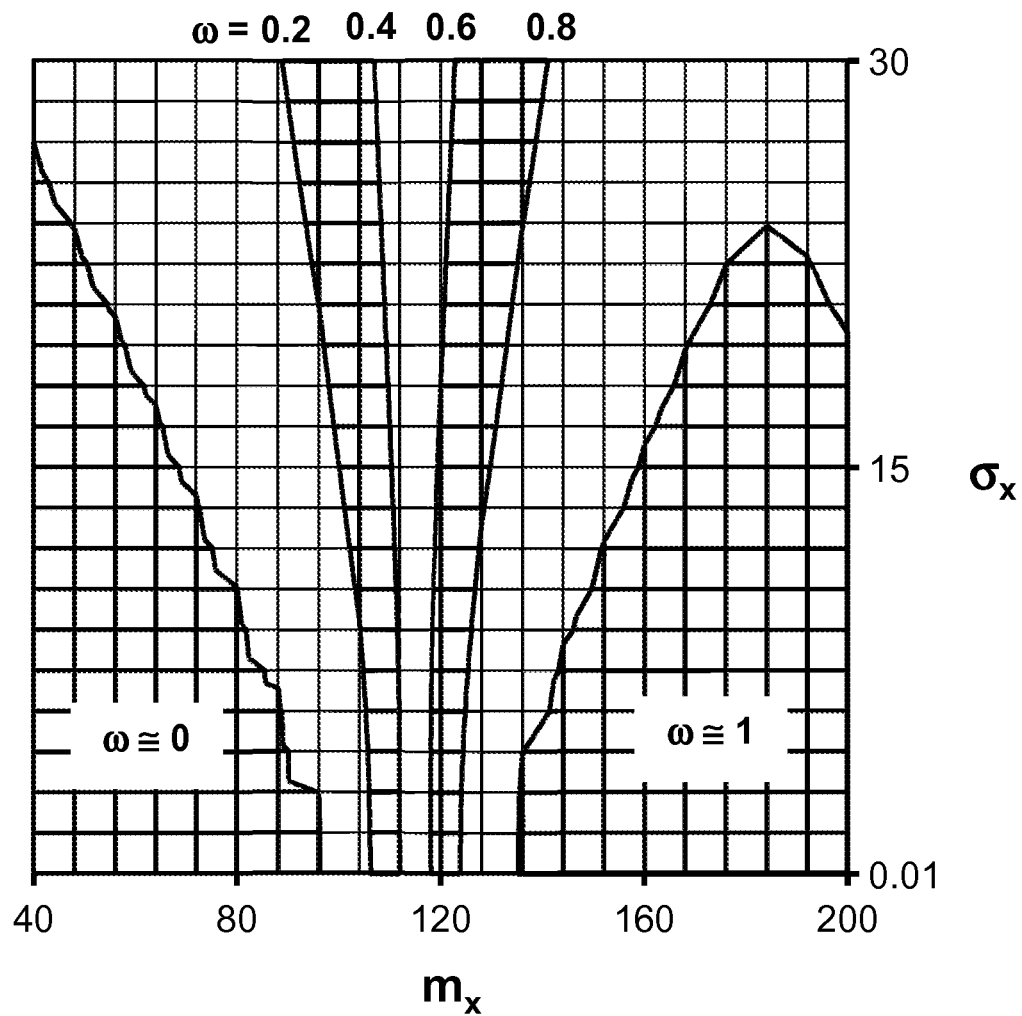

In one embodiment, ω is determined via piecewise evaluation. In one embodiment, ω is determined for various candidates for $p_X$. For example, taking $p_X$ as $N(m_x, \sigma_x)$ as described above, ω is determined for various $(m_x, \sigma_x)$ combination, as depicted in FIGS. 12(k)-(l). These contour maps of ω are identical to those of υ versus $(m_x, \sigma_x)$ (depicted in FIGS. 12(e) and (g)), as expected, since F(X), in this example, is monotonic (as explained previously).

Figure 12M:
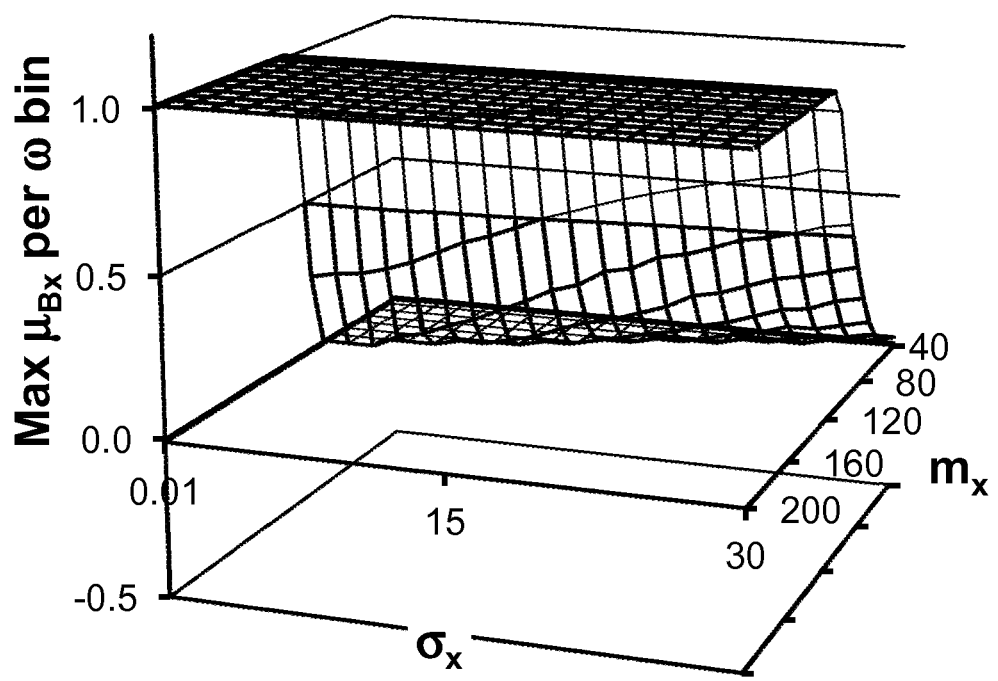
FIGS. 12(m)-(n) depict the restriction (per $\omega$ bin) imposed on various values of probability distribution parameters, in one embodiment.
Figure 12N:
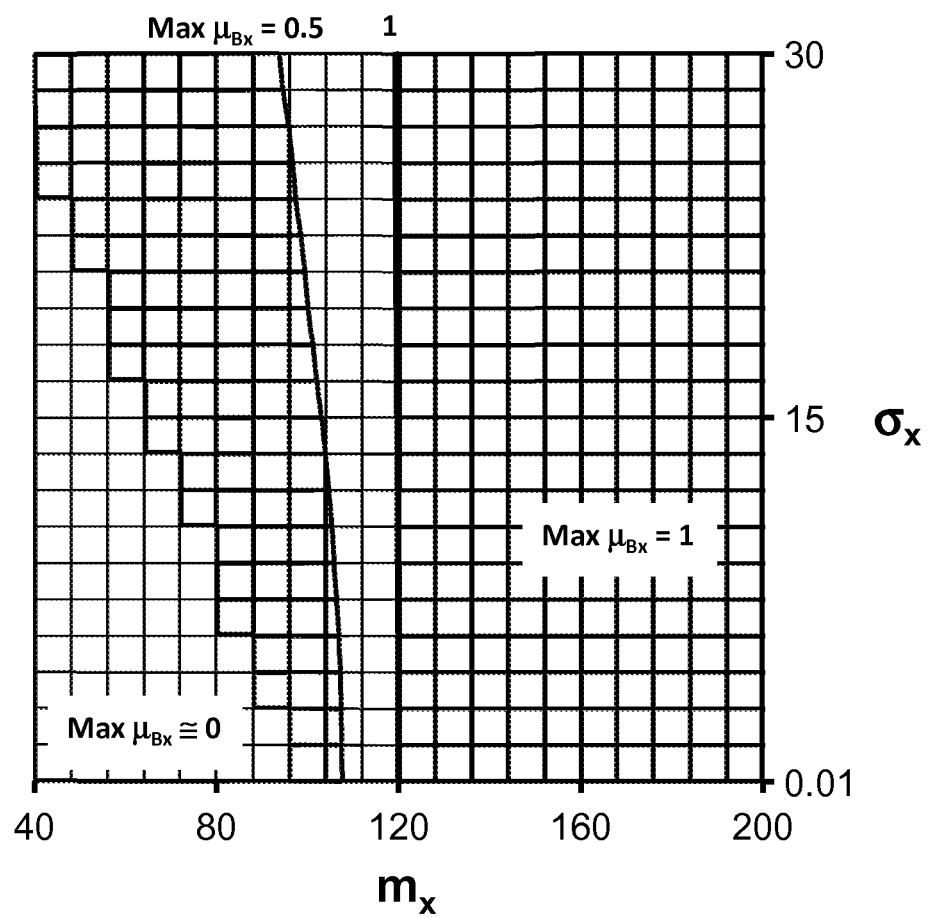
Figure 12O:
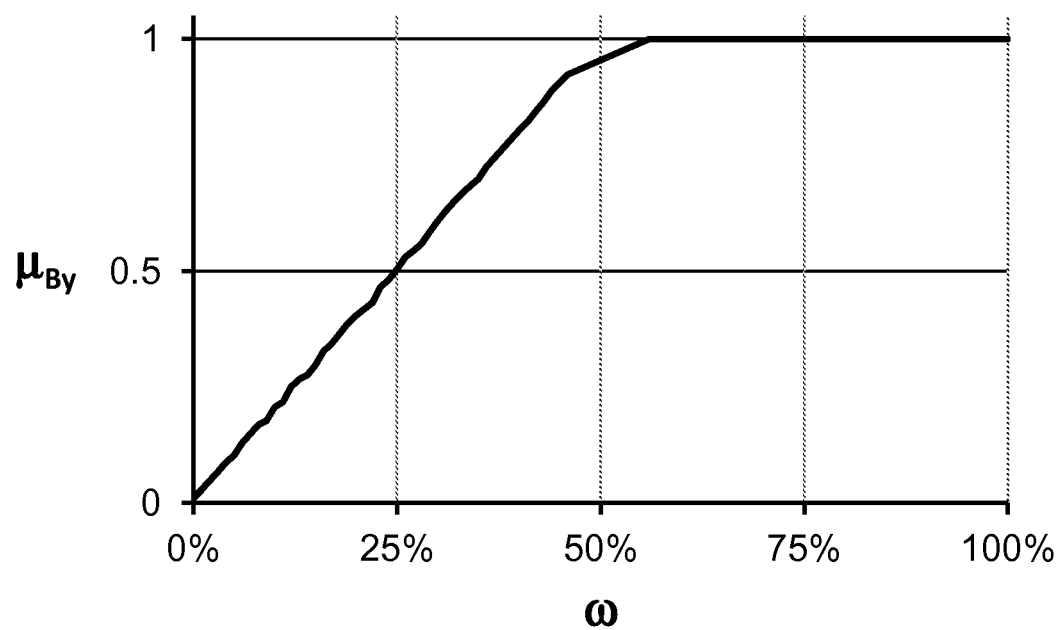
FIG. 12(o) depicts a restriction on probability measure, in one embodiment.

In one embodiment, to obtain the relationship between ω and restriction test scores from $B_x$, to determine $B_y$, bins are setup in ω domain (e.g., between $\omega_{min}$ and $\omega_{max}$, or in [0, 1] range). In one embodiment, the size/number of bin(s) in ω is adjustable or adaptive to accommodate regions in ω domain where $(m_x, \sigma_x)$ mapping is scarce, sparse or absent. In one embodiment, for each $(m_x, \sigma_x)$, the calculated $\omega(m_x, \sigma_x)$, is mapped to a bin in ω domain. In such an embodiment, each $(m_x, \sigma_x)$ becomes associated to a ω bin (e.g., identified by an ID or index). Multiple $(m_x, \sigma_x)$ may map to the same ω bin. In one embodiment, through this association with the same ω bin, the maximum $\mu_{Bx}(\upsilon(m_x, \sigma_x))$ for $(m_x, \sigma_x)$'s associated with the same ω bin is determined. For example, FIG. 12(m)-(n) depict the contour maps of Max $\mu_{Bx}(\upsilon(m_x, \sigma_x))$ for various $(m_x, \sigma_x)$. In one embodiment, maximum $\mu_{Bx}(\upsilon(m_x, \sigma_x))$ is associated to the ω bin of the corresponding $(m_x, \sigma_x)$'s. In one embodiment, unique set of ω bins is determined that are associated with at least one $(m_x, \sigma_x)$. Associated maximum $\mu_{Bx}(\upsilon(m_x, \sigma_x))$ is determined per ω value representing the corresponding ω bin. In one embodiment, this maximum $\mu_{Bx}(\upsilon(m_x, \sigma_x))$ per ω is provided as the result for $\mu_{By}(\omega)$. For example, FIG. 12(o) depicts $\mu_{By}(\omega)$ for this example, which very closely resembles $\mu_{Bx}(\upsilon)$, as expected, because F(X) is a monotonic, as explained previously.

Therefore, in this example, assuming that $\mu_{Ay}(y)$ (ramping up from 300 to 345) indicates somewhat higher than 300, and that $\mu_{By}(\omega)$ maps to more than medium (i.e., not small) (in this context), then the answer to $q_1$ becomes: The probability of the price of the ticket being somewhat higher than 300 is more than medium.

q2: What is the Probability that the Price of the Ticket (from Washington D.C. To New York) is not Low?

Figure 13A:
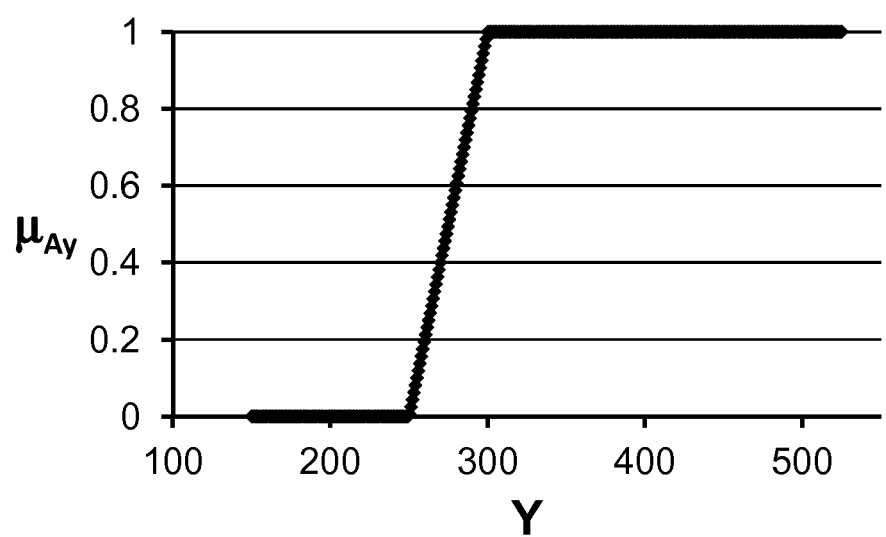
FIG. 13(a) depicts a membership function, in one embodiment.

In this question, Y still presents the price of the ticket; however, $A_y$ is already specified by $q_2$ as not low in this context. Parsing the question, Prob(Y is $A_y$) or $B_y$ in Z-valuation of $(Y, A_y, B_y)$ is the output. In one embodiment, the knowledge database is searched to precisiate the meaning of not low in the context of Y. In one embodiment, in parsing $q_2$, not is recognized as the modifier of a fuzzy set low in context of Y. In one embodiment, the knowledgebase is used to determined, for example low is a step down fuzzy set with its ramp located between 250 and 300. In one embodiment, the modifiers are used to convert the membership functions per truth system(s) used by the module. For example, FIG. 13(a) depicts $\mu_{Ay}(y)$ for not low. In one embodiment, $\mu_{Ay}$ is determined for every y in $\{y_i\}$ where $y_i = F(x_i)$. In one embodiment, $\mu_{Ay}$ is determined via a piecewise evaluation/lookup from $\mu_{Ay}$.

Figure 13B:
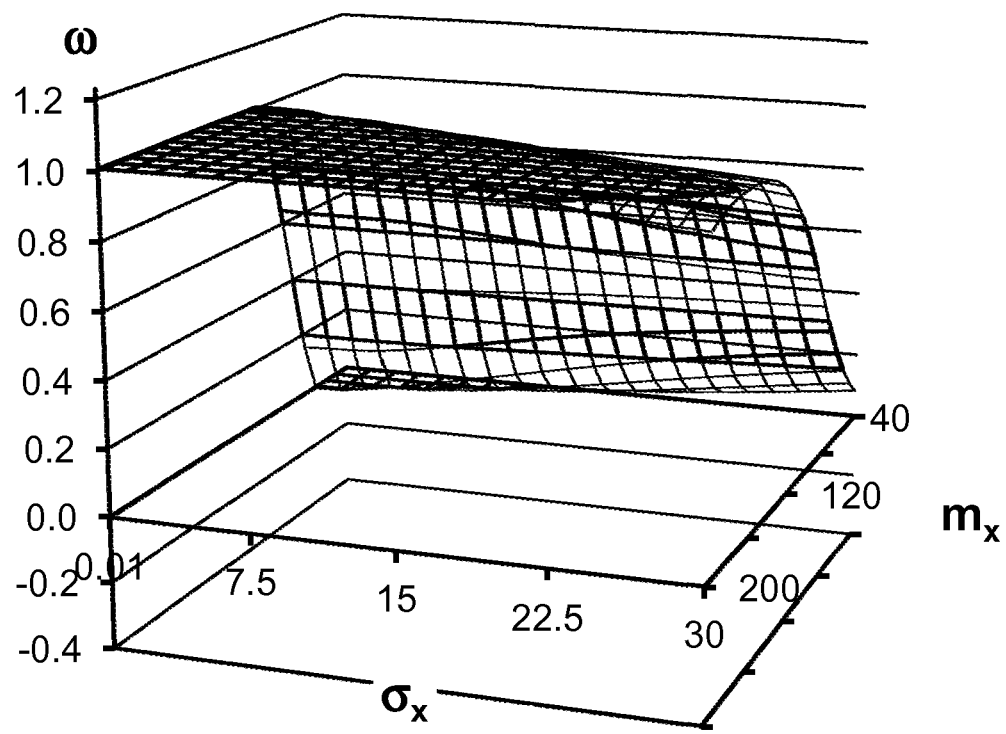
FIGS. 13(b)-(c) depict the probability measures for various values of probability distribution parameters, in one embodiment.
Figure 13C:
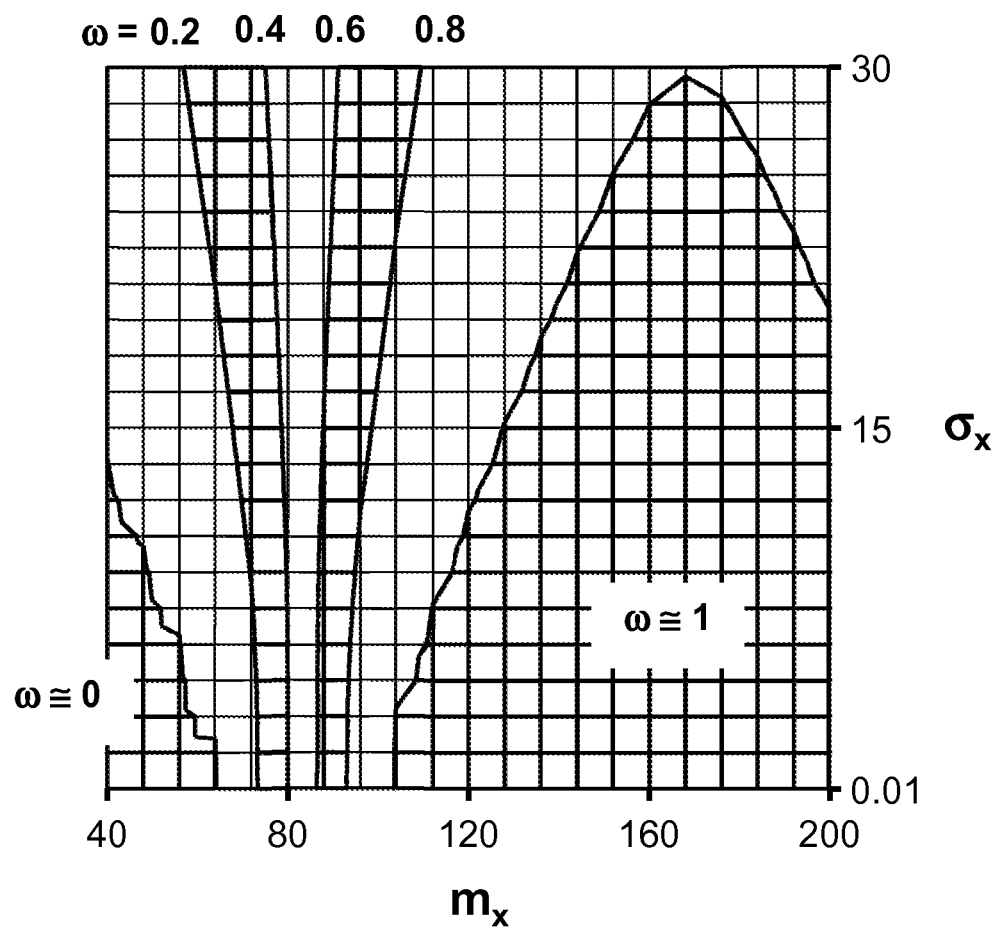
Figure 13D:
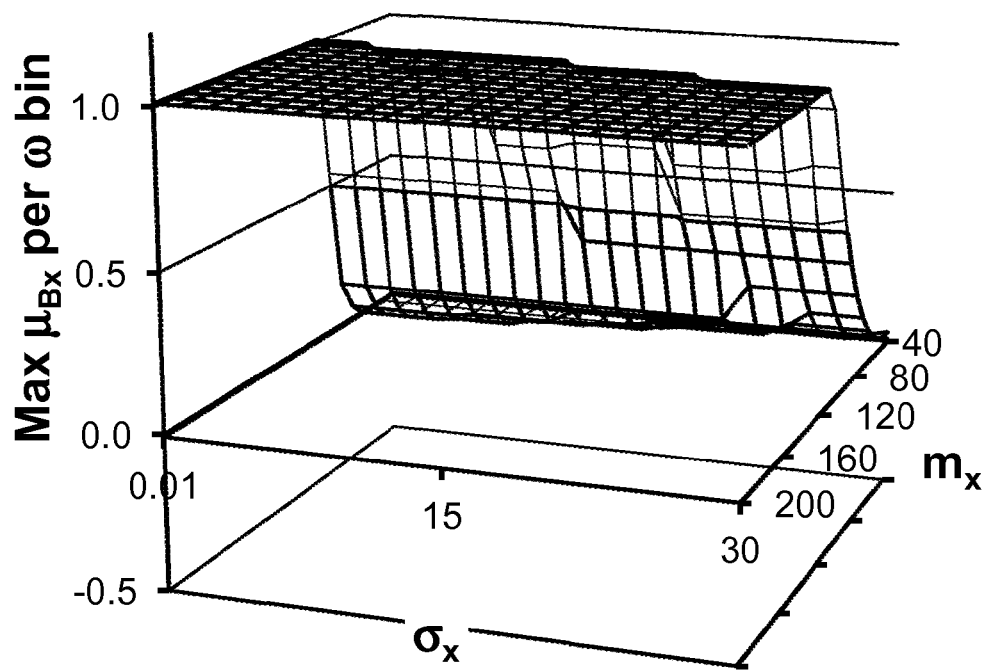
FIGS. 13(d)-(e) depict the restriction (per ω bin) imposed on various values of probability distribution parameters, in one embodiment.
Figure 13E:
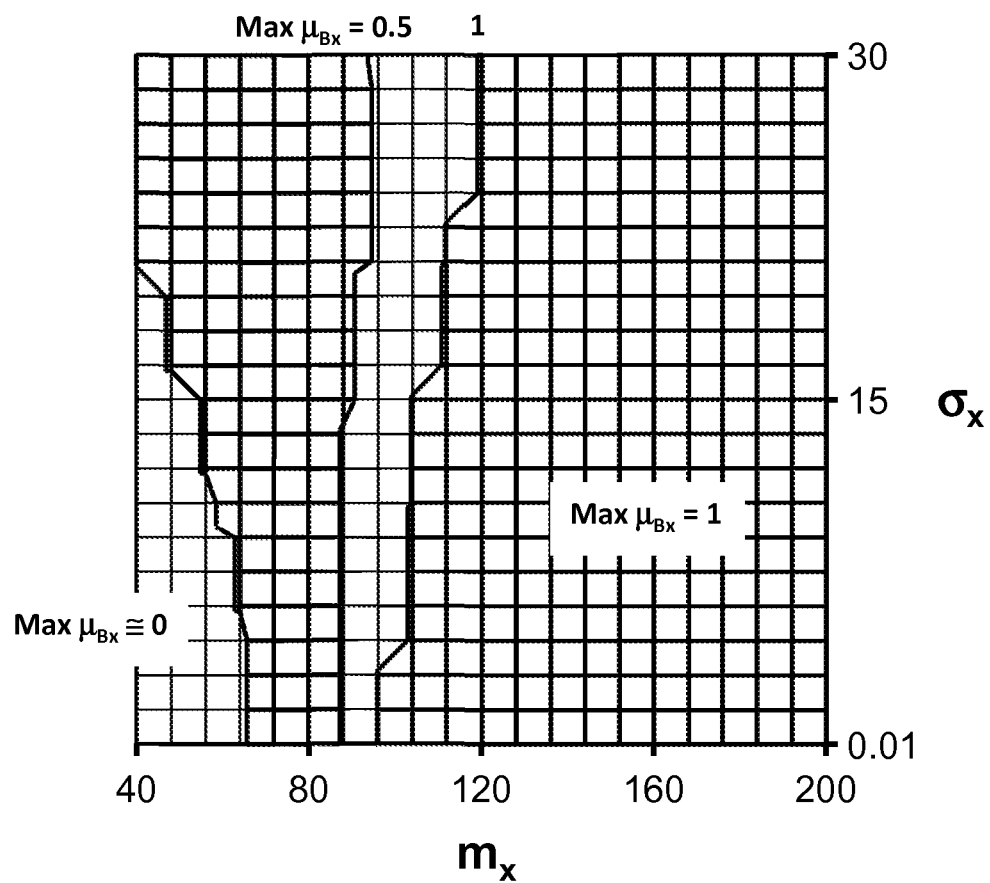

In one embodiment, the association of $(x_i, y_i)$ is used to attribute $p_X$ values to $(x_i, y_i)$. Comparing with $q_1$, in one embodiment, υ and $\mu_{Ax}$ are reused or determined similarly. For example, FIGS. 12(a)-(c) and 12(e)-(j) are applicable to $q_2$, as in this example, $\mu_{Ax}$ (FIG. 12(a)), $\mu_{Bx}$ (FIG. 12(b)), and F(X) (FIG. 12(c)) are still the same; υ determination/calculation (FIGS. 12(e)-(h)) is still applied the same; and $\mu_{Bx}$ is applied similarly to υ, in order to map $\mu_{Bx}$ to candidate $p_X$'s (FIGS. 12(i)-(j)). However, given $\mu_{Ay}$ is provided via by $q_2$ (instead of, e.g., an extension principle via $\mu_{Ax}$), the corresponding probability measures, ω, is expected to be different. For example, FIGS. 13(b)-(c) depict ω (as dot product of $\mu_{Ay}$ and $p_Y$) per various candidate distribution, i.e., $(m_x, \sigma_x)$. Compared to ω in $q_1$ (FIGS. 12(k)-(l)), the contours appear to be shifted to lower values of $m_x$, because the shift in the fuzzy edge of $\mu_{Ay}$ (from $q_1$ to $q_2$) toward lower ticket prices, causes similar shift in ω contours in this example, as F(X) is monotonic and increasing. At any rate, contours of ω and υ are no longer collocated on $(m_x, \sigma_x)$ given $A_y$ was not obtained through application of the extension principle to F(X) and $A_x$. The maximum $\mu_{Bx}(\upsilon(m_x, \sigma_x))$, for example obtained via application of ω bins, is depicted in FIGS. 13(d)-(e). In one embodiment, through association with ω bins, the corresponding $B_y$ is determined obtaining $\mu_{Bx}(\upsilon(m_x, \sigma_x))$ per ω, as shown for example in FIG. 13(f). One embodiment, varies the number/size of ω bins to compensate the scarcity of distribution candidate to provide the maximum $\mu_{Bx}(\upsilon(m_x, \sigma_x))$ at a particular ω bin. For example, ω bin factor of 5 was applied to obtain the results depicted in FIGS. 13(d)-(f), i.e., the number of bins was reduced from 101 to 20, while the bin size was increased from 0.01 to 0.0526. With ω bin factor of 1, the result for $\mu_{Bx}(\omega)$ are depicted in FIG. 13(g). In one embodiment, the ω bin factor is varied within a range (e.g., 1 to 20) to reduce the number of quick changes (or high frequency content) in the resulting $B_y$ membership function, beyond a threshold. In one embodiment, ω bins are determined for which there appear to be inadequate candidate distribution (e.g., based on quick drops in the membership function of $B_y$). For such ω values, a set of probability distributions, i.e., $(m_x, \sigma_x)$'s, are determined (e.g., those at or close to the corresponding ω contours). Then, more finely distributed parameters/distributions are used to increase the varied candidates contributing to maximum levels of $\mu_{By}(\omega)$. In one embodiment, an adaptive process is used to select various size ω bins for various ω values. In one embodiment, an envelope-forming or fitting process or module, e.g., with an adjustable smoothing parameter or minimum-piece-length parameter, is used to determine one or more envelopes (e.g., having a convex shape) connecting/covering the maximum points of resulting $\mu_{By}(\omega)$, as for example depicted as dotted line in FIG. 13(g).

In one embodiment, the resulting $\mu_{By}(\omega)$ is provided to other modules that take membership function as input (e.g., a fuzzy rule engine) or store in a knowledge data store. In one embodiment, the resulting $\mu_{By}(\omega)$ (e.g., in FIG. 13(f)) is compared with templates or knowledge base to determine the natural language counterpart for $B_y$. In one embodiment, the knowledge base, for example, includes various models of membership function (e.g., in [0, 1] vs. [0, 1] range or a subset of it) to find the best fit. In one embodiment, fuzzy logic rules (including rules for and, or, not, etc.) are used to generate more models. In one embodiment, fuzzy modifiers (e.g., very, somewhat, more or less, more than, less than, sort of slightly, etc.) are used to construct modified models. In one embodiment, the best fit is determined by a combination of models from the knowledge base. One embodiment uses adjustable parameter to indicate and control the complexity of combinations of models for fitting $B_y$.

Figure 13F:
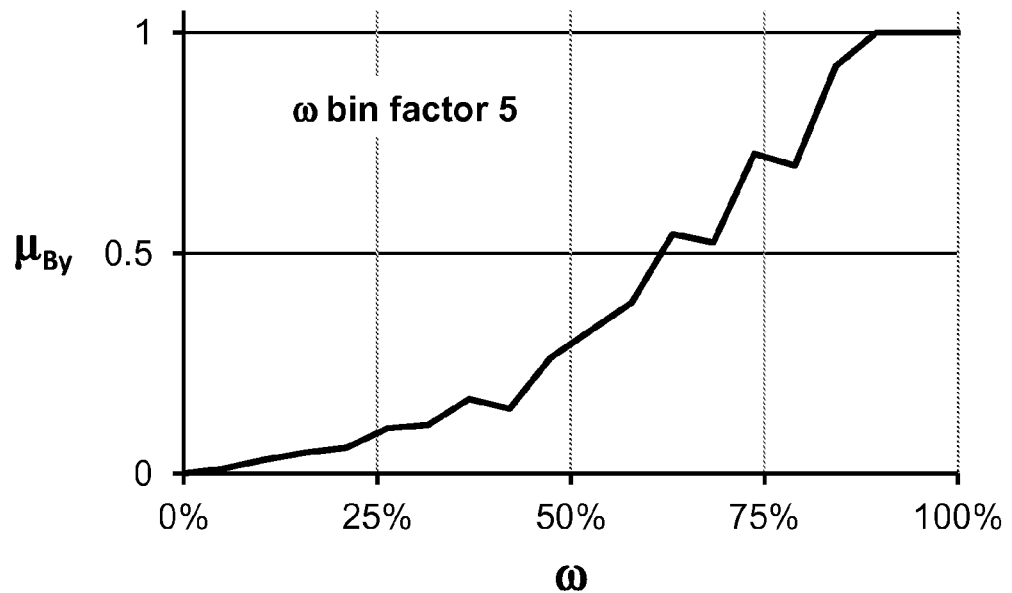
FIGS. 13(f)-(g) depict a restriction on probability measure, in one embodiment.
Figure 13G:
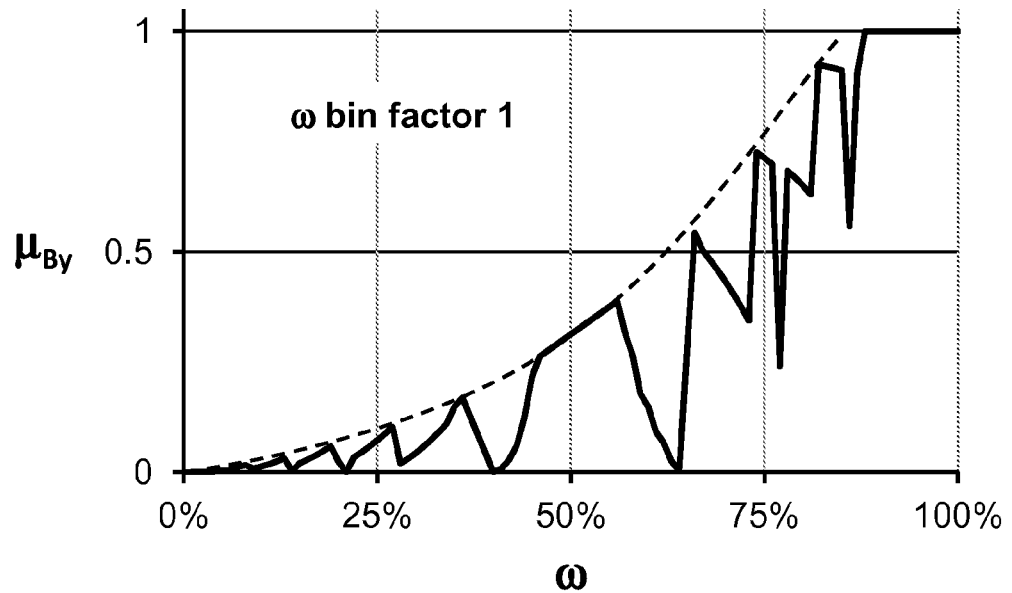

In one embodiment, $\mu_{By}(\omega)$ (e.g., in FIG. 13(f)) is determined to map to very probable. Therefore, the answer to $q_2$ becomes: The price of the ticket is very probably not low.

q3: What is the Probability that the Price of the Ticket (from Washington D.C. To New York) is High?

Figure 14A:
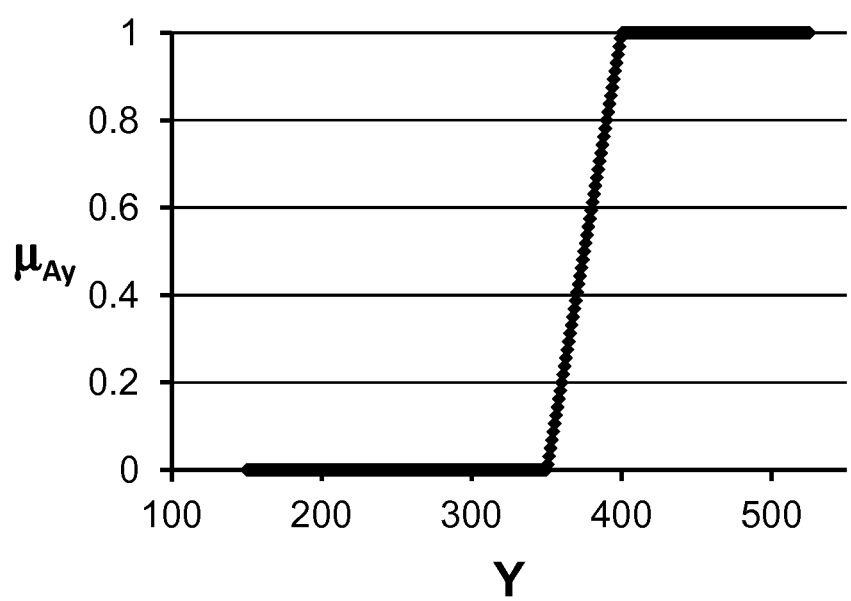
FIG. 14(a) depicts a membership function, in one embodiment.
Figure 14B:
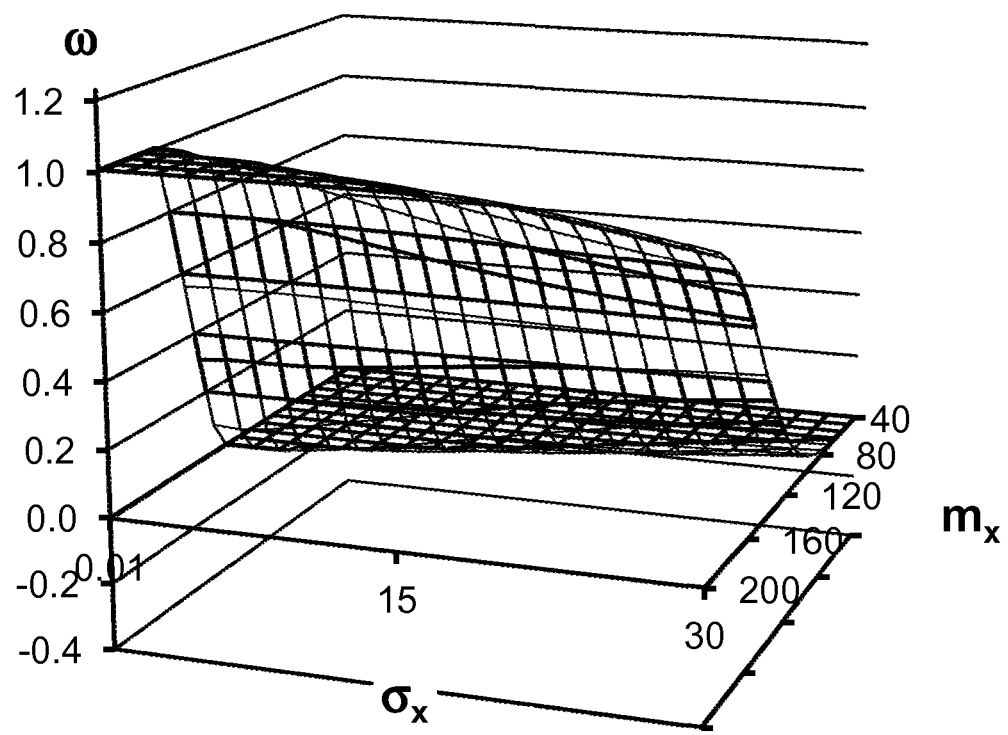
FIGS. 14(b)-(c) depict the probability measures for various values of probability distribution parameters, in one embodiment.
Figure 14C:
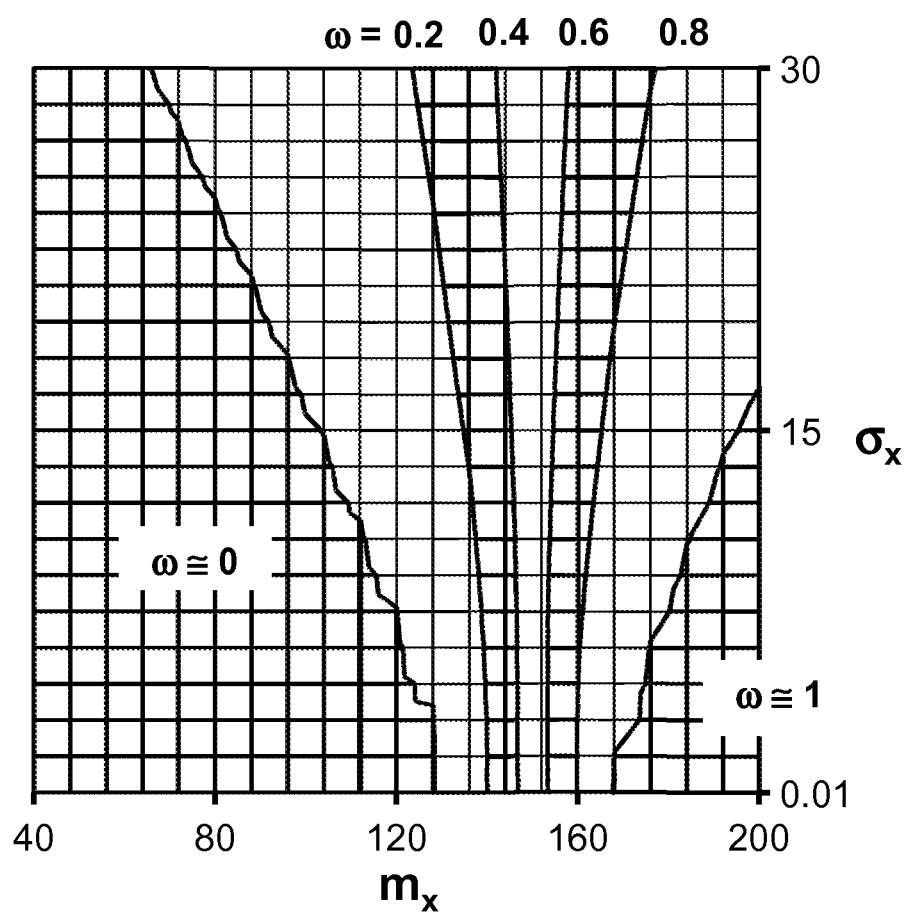
Figure 14D:
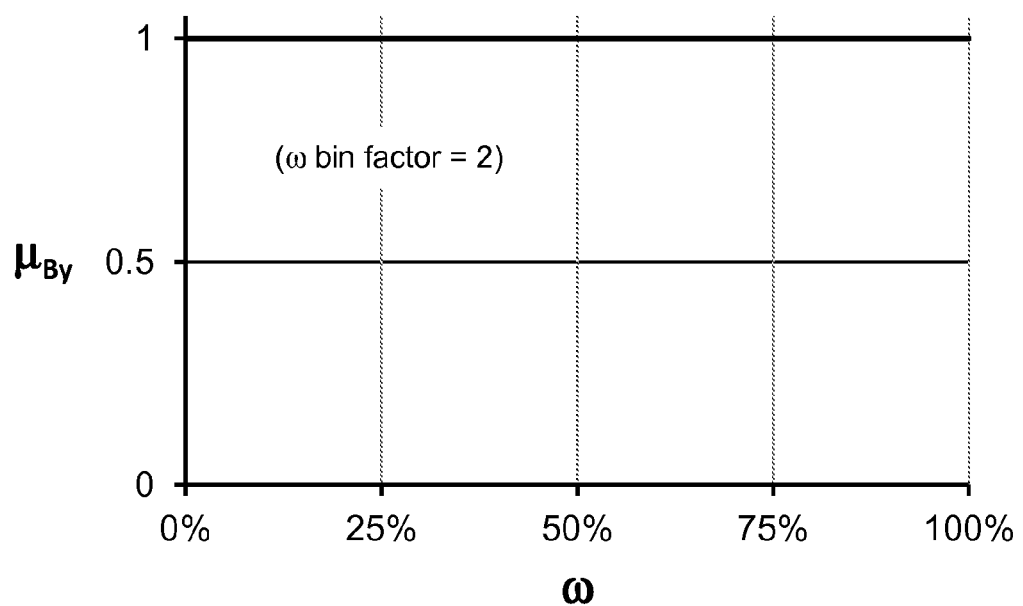
FIG. 14(d) depicts a restriction on probability measure, in one embodiment.

As in $q_2$, $q_3$ presents $A_y$ as high. In one embodiment, within the context, $\mu_{Ay}$ is given, for example, as ramp located at 350 (with a width of 50), as depicted in FIG. 14(a). Probability measure of $\mu_{Ay}$ (i.e., $\omega$) is determined as above. 14(b)-(c) depict $\omega$ contour maps, and indicate the shifting of the contour lines to higher $m_x$ values (in the reverse direction compared to the scenario of $q_2$). However, comparing with the contour map of $\mu_{Bx}$ in FIG. 12(j), it is evident that at $\sigma_x$ of 120 (contour marked as $\mu_3$), $\mu_{Bx}$ is 1, while in such a region, all potential values of $\omega$ are covered (from 0 to 1) as shown in 14(c). Therefore, all values of $\omega$'s are definitely possible (i.e., not restricted by application of $A_y$). The resulting $\mu_{By}$ is depicted in 14(d), indicating 1 for all possible values with the counterpart natural language term anything. Therefore, in this example, the answer to $q_3$ is: The probability of the price of the ticket being high can be anything.

FIG. 109 is an example of a system described above.

Fuzzy Control with Z-Number

As mentioned previously, an extension of a fuzzy control system that uses fuzzy rules can employ Z-numbers a either or both antecedent and consequent portion of IF THEN fuzzy rule. Regularly, in executing a fuzzy rule, such as (IF X is A THEN Y is B), the value of variable X used in antecedent, is determined (e.g., from an Input or from defuzzification result of other relevant rules) to be $x_0$. In one embodiment, the truth value of the antecedent is evaluated given the knowledge base (e.g., X=$x_0$) as the truth value of how (X is A) is satisfied, i.e., $\mu_A(x_0)$. The truth value of the antecedent (assuming more than a threshold to trigger the consequent) is then applied to the truth value of the consequent, e.g., by clipping or scaling the membership function of B by $\mu_A(x_0)$. Firing of fuzzy rules involving the same variable at the consequent yields a superimposed membership function for Y. Then, a crisp value for Y is determined by defuzzification of Y's resulting membership function, e.g., via taking a center of mass or based on maximum membership value (e.g., in Mamdani's inference method), or a defuzzied value for Y is determined by a weighted average of the centroids from consequents of the fuzzy rules based on their corresponding truth values of their antecedents (e.g., in Sugeno fuzzy inference method).

In one embodiment, where the antecedent involves a Z-number, e.g., as in the following fuzzy rule:

IF (X is Z) THEN (Y is C), where Z=($A_X$, $B_X$) and X is a random variable, the truth value of the antecedent (X is Z) is determined by how well its imposed restriction is satisfied based on the knowledge base. For example, if the probability or statistical distribution of X is $p_X$, the antecedent is imposing a restriction on this probability distribution as illustrated earlier as:

$$\mu_{B_X}\left(\int_R \mu_{A_X}(u) p_X(u) du\right)$$

where u is a real value parameter in X domain. In one embodiment, the probability distribution of X, $p_X$, is used to evaluate the truth value of the antecedent, by evaluating how well the restriction on the probability distribution is met. In one embodiment, an approximation for $p_X$ is used to determine the antecedent's truth value. Denoting $p_{Xi}$ as an estimate or an input probability distribution for X, the antecedent truth value is determined as:

$$\mu_{B_X}\left(\int_R \mu_{A_X}(u) p_{Xi}(u) du\right)$$

An embodiment, e.g., in a fuzzy control system or module, uses multiple values of u to estimate $p_X$. In one embodiment, the values of u are discrete or made to be discrete through bins representing ranges of u, in order to count or track the bin population representing the probability distribution of X. For example, at $bin_i$, $p_X$ is estimated as:

$$p_X|_{bin_i} \approx \frac{1}{\Delta u_i} \cdot \frac{\text{Count}_i}{\sum_j \text{Count}_j}$$

where $\Delta u_i$ and $\text{Count}_i$ are the width and population of $i^{th}$ bin. This way, a running count of population of bins is tracked as more sample data is received.

In one embodiment, Z-number appears as the consequent of a fuzzy rule, e.g.,

IF (Y is C) THEN (X is Z), where Z=($A_X$,$B_X$) and X is a random variable.

As other fuzzy rules, when the rule is executed, the truth value of the antecedent (i.e., $\mu_C(y_0)$, where $y_0$ is a value for Y, that is input to the rule) is applied to the restriction imposed by the consequent. The restriction imposed by the consequent is, e.g., on the probability distribution of X, which is the variable used in the consequent. Given the antecedent's truth value of $T_{ant}$ (between 0 and 1), in one embodiment, the contribution of the rule on the restriction of $p_X$ is represented by $\mu_{B_X}(\int_R \mu_{A_X}(u) \cdot p_X(u) \cdot du)$ clipped or scaled by $T_{ant}$ In one embodiment, Z-number appears in an antecedent of a fuzzy rule, but instead of the quantity restricted (e.g., $p_X$), other indirect knowledge base information may be available. For example, in the following fuzzy rule:

IF (X is Z) THEN (Y is C), where Z=($A_X$,$B_X$) and X is a random variable, suppose from input or other rules, it is given that (X is D), where D is a fuzzy set in X domain. In one approach, the hidden candidates of $p_X$ (denoted by index i) are given test scores based on the knowledge base, and such test scores are used to evaluate the truth value of the antecedent. For example, the truth value of the antecedent is determined by:

$$T_{ant} = \sup_{\forall i}(ts_i \wedge ts_i')$$

where $$ts_i = \int_R \mu_D(u) p_i(u) du$$

$$ts_i' = \mu_{B_X}\left(\int_R \mu_{A_X}(u) p_i(u) du\right)$$

In one embodiment, various model(s) of probability distribution is employed (based on default or other knowledge base) to parameterize $\forall i$. For example, a model of normal distribution may be assumed for $p_X$ candidates, and the corresponding parameters will be the peak location and width of the distribution. Depending on the context, other distributions (e.g., Poisson distribution) are used. For example, in "Bus usually arrives about every 10 minutes", where X is bus arrival time, $A_X$ is about 10 minutes, and $B_X$ is usually, a model of probability distribution for bus arrival time may be taken as a Poisson distribution with parameter $\tau$:

$$p_i(u) = \frac{u}{\tau_i} \cdot e^{\frac{-u}{\tau_i}}$$

Then, the antecedent truth value is determined by $$T_{ant} = \sup_{\forall \tau_i}(ts_i \wedge ts'_i)$$

In one embodiment, the truth value of the antecedent in a fuzzy rule with Z-number, e.g., IF (X is Z) THEN (Y is C), where $Z=(A_X, B_X)$ and X is a random variable, is determined by imposing the assumption that the probability distribution $p_X$ is compatible with the knowledge base possibility restriction (e.g., (X is D)). Then, a candidate for $p_X$ may be constructed per $\mu_D$. For example, by taking a normalized shape of possibility distribution:

$$p_X(u) = \frac{\mu_D(u)}{\int_R \mu_D(u')du'}$$

In one embodiment, the compatibility assumption is used with a model of distribution (e.g., based on default or knowledge base). For example, assuming a model of normal distribution is selected, the candidate probability distribution is determined as follows:

$$p_X(u) = \frac{1}{\sqrt{2\pi} \cdot r \cdot D_{width}} \cdot e^{-\frac{(u-D_{cent})^2}{2 \cdot r^2 \cdot D_{width}^2}}$$

where $D_{width}$ and $D_{cent}$ are the width and centroid location of (e.g., a trapezoid) fuzzy set D, and r is a constant (e.g., $1/\sqrt{12} \approx 0.3$) or an adjustable parameter.

In one embodiment, the truth value of the antecedent in a fuzzy rule with Z-number, e.g., IF (X is Z) THEN (Y is C), where $Z=(A_X, B_X)$ and X is a random variable, is determined by simplifying the $\forall i$ examination in $$T_{ant} = \sup_{\forall \tau_i}(ts_i \wedge ts'_i)$$

by taking a candidate for $p_X$ based on a model of probability distribution which would be compatible with fuzzy set B. Then, the antecedent truth value is determined based on such compatible probability distribution $p_o$, as $T_{ant}=ts_o \hat{} ts'_o$ In one embodiment, such optimized probability distribution is determined based on the knowledge base (e.g., X is D). For example, when the model distribution is a normal distribution, in one embodiment, the center position (parameter) of the distribution is set at the centroid position of the fuzzy set D, while the variance of the probability distribution is set based on the width of fuzzy set D.

In one embodiment, an input proposition in form of Z-valuation, e.g., $(X, A_X, B_Y)$ or (X is Z) where $Z=(A_X, B_Y)$ and X is a random variable, is used to evaluate an antecedent of a fuzzy rule, e.g., IF (X is C) THEN (Y is D), where C and D are fuzzy sets in X and Y domains, respectively. In one embodiment, candidates of $p_X$ (denoted by index i) are given test scores based on the knowledge base, and such test scores are used to evaluate the truth value of the antecedent. For example, in one embodiment, the truth value of the antecedent is determined by:

$$T_{ant} = \sup_{\forall i}(ts_i \wedge ts'_i)$$

where $$ts_i = \int_R \mu_C(u) p_i(u) du$$

$$ts'_i = \mu_{B_X}\left(\int_R \mu_{A_X}(u) p_i(u) du\right)$$

EXAMPLE 2

In one embodiment, a fuzzy rules database includes these two rules involving Z-valuation (e.g., for a rule-based analysis/engine). Rule 1: If the price of oil is significantly over 100 dollars/barrel, the stock of an oil company would most likely increase by more than about 10 percent. Rule 2: If the sales volume is high, the stock of an oil company would probably increase a lot. There is also this input information: The price of oil is at 120 dollars/barrel; the sales volume is at $20B; and the executive incentive bonus is a function of the company's stock price. The query or output sought is:

q4: What is the Likelihood of High Executive Incentive Bonuses?

In one embodiment, the rules engine/module evaluates the truth value of the rules' antecedents, e.g., after the precisiation of meaning for various fuzzy terms. For example, the truth value of Rule 1's antecedent, the price of oil is significantly over 100 dollars/barrel is evaluated by taking the membership function evaluation of 120 (per information input) in fuzzy set significantly over 100 dollars/barrel (see, e.g., FIG. 12(a)). Therefore, this antecedent truth value ($t_1$) becomes, in this example, 0.67. Similarly, the truth value of Rule 2's antecedent, the sales volume is high, is evaluated by using (e.g., contextual) membership function $\mu_{High}$ for value $20B. Let's assume the antecedent truth value ($t_2$) is determined to be 0.8, in this example. In firing the Rules, the truth values of antecedents are imposed on those of consequents. Rule 1's consequent, is a Z-valuation (X, $A_1$, $B_1$) where X represents the change in stock, $A_1$ represents more than about +10 percent, and B1 represents most likely. Rule 2's consequent, is a Z-valuation (X, $A_2$, $B_2$) where $A_2$ represents a lot, and B1 represents probably. The consequent terms impose restriction on $p_X$, therefore, the truth values of the consequent (i.e., restriction on $p_X$) is determined by triggering of the Rules. In one embodiment, the restrictions are combined, e.g., via correlation minimum and Min/Max inference or correlation product and additive inference. In one embodiment, a model of $p_X$, e.g., $N(m_x, \sigma_x)$, is used to apply the restriction on $p_X$ to restrictions on parameters of the distributions (e.g., $(m_x, \sigma_x)$). In one embodiment, the range of X domain is taken from the knowledge base. In one embodiment X domain range(s) is determined from characteristics of $A_1$ and/or $A_2$. In one embodiment, a consolidated range(s) is determined in X domain. One or more sets of X values are used to evaluate $p_X(m_x, \sigma_x)$, $\mu_{A1}$, and $\mu_{A2}$. In one embodiment, probability measures $\upsilon_1$ and $\upsilon_2$ for $A_1$ and $A_2$, respectively, are determined for candidate $p_X$'s, e.g., for various $(m_x, \sigma_x)$. The possibility measures of $\upsilon_1$ and $\upsilon_2$ in $B_1$ and $B_2$ are determined by evaluating $\mu_{B1}(\upsilon_1)$ and $\mu_{B2}(\upsilon_2)$, e.g., for various $(m_x, \sigma_x)$. These possibility measures are test scores imposed on the probability distribution candidate for X (e.g., identified by $(m_x, \sigma_x)$) via the consequents of the triggered rules. Therefore, in one embodiment, the fuzzy rule control system uses the restrictions on candidate distributions. For example, in a control system employing correlation minimum and Min/Max inference, the restriction on $p_X(m_x, \sigma_x)$ is determined as follows, e.g., for various $(m_x, \sigma_X)$:

$$\mu_{p_x}(m_x, \sigma_x) = \max_{\forall j}\left(\min(\mu_{B_j}(v_j(m_x, \sigma_x)), t_j)\right)$$

where j is an index for triggered fuzzy rule (in this example, from 1 to 2).

As an example, in a control system employing correlation product and additive inference, the restriction on $p_X(m_x, \sigma_x)$ is determined as follows, e.g., for various $(m_x, \sigma_x)$:

$$\mu_{p_x}(m_x, \sigma_x) = \min\left(\sum_{\forall j}\mu_{B_j}(v_j(m_x, \sigma_x))\cdot t_j, 1\right)$$

In one embodiment, $\mu_{p_x}(m_x, \sigma_x)$ is the basis for determining answer to $q_4$. For example, $q_4$ is reduced to Z-valuation (Y, $A_y$, $B_y$), where Y represents executive incentive bonuses, $A_y$ represents high, $B_y$ represents restriction on Prob(Y is $A_y$). The knowledge database, in one embodiment, provides the functional dependence (G) of executive incentive bonuses (Y) on the stock price (SP), and therefore on X, i.e., the change in stock, via the current stock price (CSP). For example:

$Y=G(SP)=G(CSP+X)=F(X)$

In one embodiment, as in the previous examples, $\omega$, probability measure of $A_y$, is determined for various $p_X$ (i.e., $(m_x, \sigma_x)$) candidates. In one embodiment, maximum $\mu_{px}(m_x, \sigma_x)$ for $\omega$ (or $\omega$ bin) is determined, and applied as membership function of $\mu_{By}(\omega)$. In another word, in this example, the output of rules engine provides the restriction on $p_X$ (or its parameters) similar to previous examples, and this output is used to determine restriction on a probability measure in Y.

EXAMPLE 3

In one embodiment, e.g., in a car engine diagnosis, the following natural language rule "Usually, when engine makes rattling slapping sound, and it gets significantly louder or faster when revving the engine, the timing chain is loose." is converted to a protoform, such as:

$$\text{IF}\left\{\begin{array}{c}\text{type(sound(engine))is }RattlingSlapping\\\text{AND}\\\left(\begin{array}{c}(\text{level(sound}(revved.engine)), \text{level(sound(engine)}))\\\text{is }significantly.louder\\\text{OR}\\(\text{rhythm(sound}(revved.engine)), \text{rhythm(sound(engine)}))\\\text{is }significantly.faster\end{array}\right)\end{array}\right\}\text{THEN}$$

(Prob{(tension(*TimingChain*)is loose)}is usually).

In one embodiment, a user, e.g., an expert, specifies the membership of a particular engine sound via a user interface, e.g., the user specifies that the truth value of the engine sound being Rattling-Slapping is 70%. In one embodiment, the user specifies such truth value as a fuzzy set, e.g., high, medium, very high. In one embodiment, a Z-mouse is used to specify the fuzzy values (i.e., membership function) of various attribute(s) of the sound (e.g., loudness, rhythm, pitch/squeakiness). The Z-mouse is for example provided through a user interface on a computing device or other controls such as sliding/knob type controls, to control the position and size of an f-mark.

In one embodiment, the engine sound is received by a sound recognition module, e.g., via a microphone input. In one embodiment, the loudness (e.g., average or peak or tonal) of the engine sound is determined, e.g., by a sound meter (analog or digital) or module. In one embodiment, the rhythm is determined via the frequency of the loudness, or using the frequency spectrum of the received sound (e.g., the separation of the peaks in the frequency domain corresponds to the period of (impulse) train making up the rhythm of the engine sound). In one embodiment, the values of these parameters are made fuzzy via evaluating the corresponding membership functions (of e.g., engine sound level) for evaluating the truth value of the predicate in fuzzy rule. In one embodiment, the fuzzy rule is rewritten to use more precision, e.g., if readily available. For example, in one embodiment, level(sound (revved.engine)) and level(sound(revved.engine)) take on measured values.

In one embodiment, as for example depicted in FIG. 15(*a*), the type of engine sound is determined automatically, by determining a set of (e.g., fuzzy) signature parameters (e.g., tonal or pattern). In one embodiment, various relevant fuzzy sets (e.g., RattlingSlapping) are expressed via veristic distribution restriction on signature parameters. In one embodiment, the truth value of the predicate is determined via comparison with the truth values of the fuzzy parameters. For example:

$$ts = \min_{\forall i}(ts_i) = \min_{\forall i}\left(\max_{\forall u_i}(\mu_{A,P_i}(u_i)\wedge\mu_{B,P_i}(u_i))\right)$$

where i is an index identifying the ith signature parameter $P_i$. $u_i$ is a generic truth value parameter in [0, 1]. $ts_i$ is the test score contribution from comparison of A and B against $P_i$. $\mu_{A,Pi}$ and $\mu_{B,Pi}$ are fuzzy values of the A and B with respect to signature parameter $P_i$. For example, A represents RattlingSlapping; B represents the engine sound; ts represents the truth value of the engine sound being RattlingSlapping; and $ts_i$ represents a possibility test score match of A and B with respect to the signature (fuzzy) parameter $P_i$, for example determined, by comparison of A's and B's truth degree in $P_i$. In one embodiment, the comparison with respect to $P_i$ is determined by:

$$ts_i = \max_{\forall u_i}(\mu_{A,P_i}(u_i)\wedge\mu_{B,P_i}(u_i))$$

For example, as depicted in FIG. 15(*a*), $ts_1$ is 1 as $\mu_{A,P1}$ and $\mu_{B,P1}$ overlap in $u_1$ where both are 1; and $ts_2$ is less than 1 (e.g., say 0.4) as $\mu_{A,P2}$ and $\mu_{B,P2}$ overlap in $u_2$ at their fuzzy edges. In one embodiment, as shown above, ts is determined by minimum of individual $ts_i$'s. In one embodiment, ts is determined via averaging, or weighted ($w_i$) averaging:

$$ts = \underset{\forall i}{\text{ave}}(ts_i) \text{ or } \frac{\sum_i w_k \cdot ts_i}{\sum_k w_k}$$

In one embodiment, where not all signature parameters are used, relevant, or available for A, then a subset of those signature parameters that are used, relevant, or available for A is used to determine ts, e.g., by limiting taking minimum or averaging operations based on those signature parameters. For example, $$ts = \underset{\forall i}{\min}(ts_i)$$

Subject to $P_i \in \{\text{relevant signature parameters to } A\}$

In such an embodiment, the relevant signature parameters for A are identified, for example, via a query in the model or knowledge database.

Figure 15A:
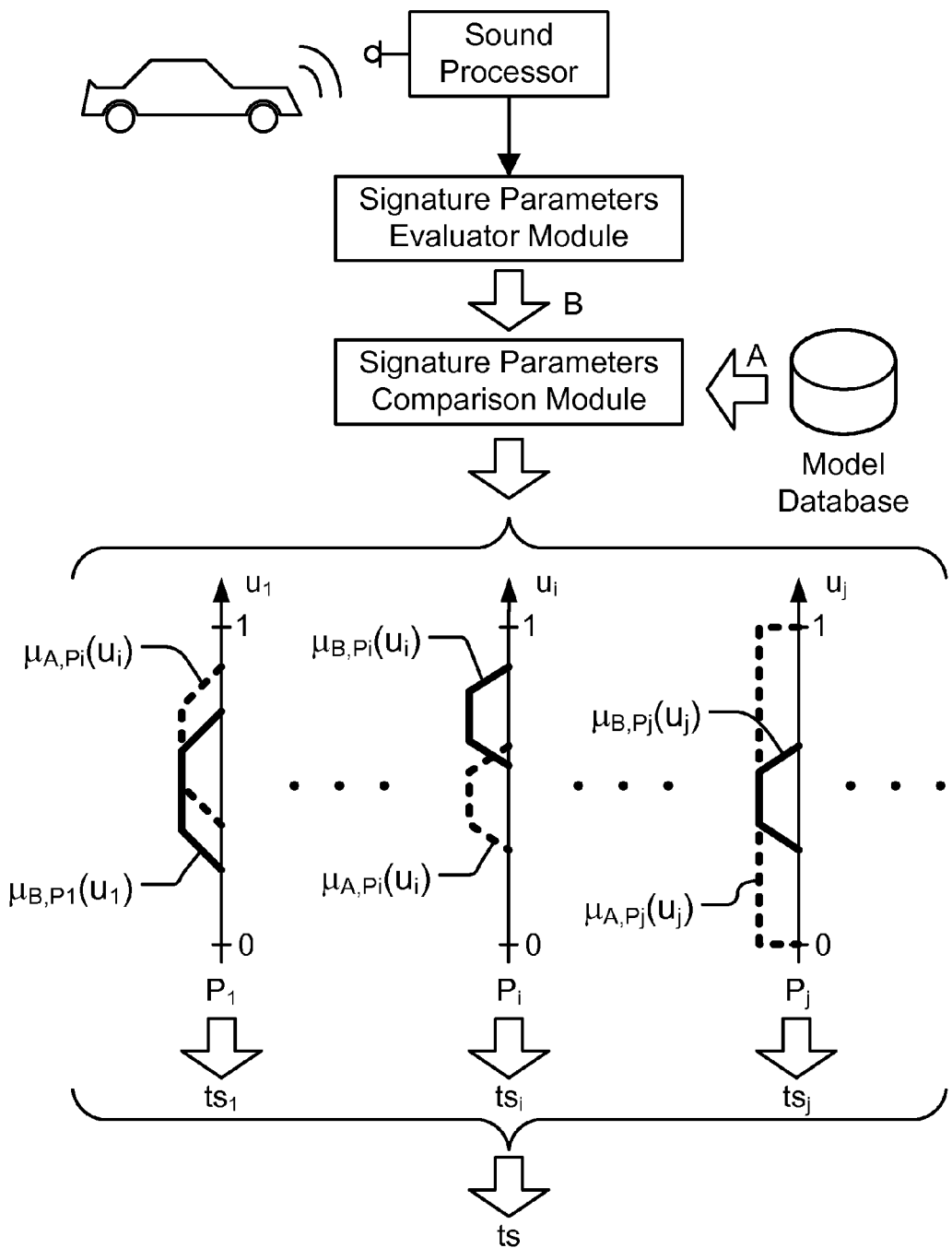
FIG. 15(a) depicts determination of a test score in a diagnostic system/rules engine, in one embodiment.

In one embodiment, for example, when minimum of $ts_i$'s are used to determine ts, the irrelevancy of a signature parameter with respect to A may be expressed as a truth membership function of 1 for all possibilities. For example, as depicted in FIG. 15(a), $\mu_{A,Pj}$ is flat (=1) for all $u_j$'s, and therefore, $ts_j$ is 1 (assuming maximum of $\mu_{B,Pj}$ is 1 at some $u_j$). Thus, in this case, the contribution of $ts_j$ in ts effectively disappears.

Figure 15B:
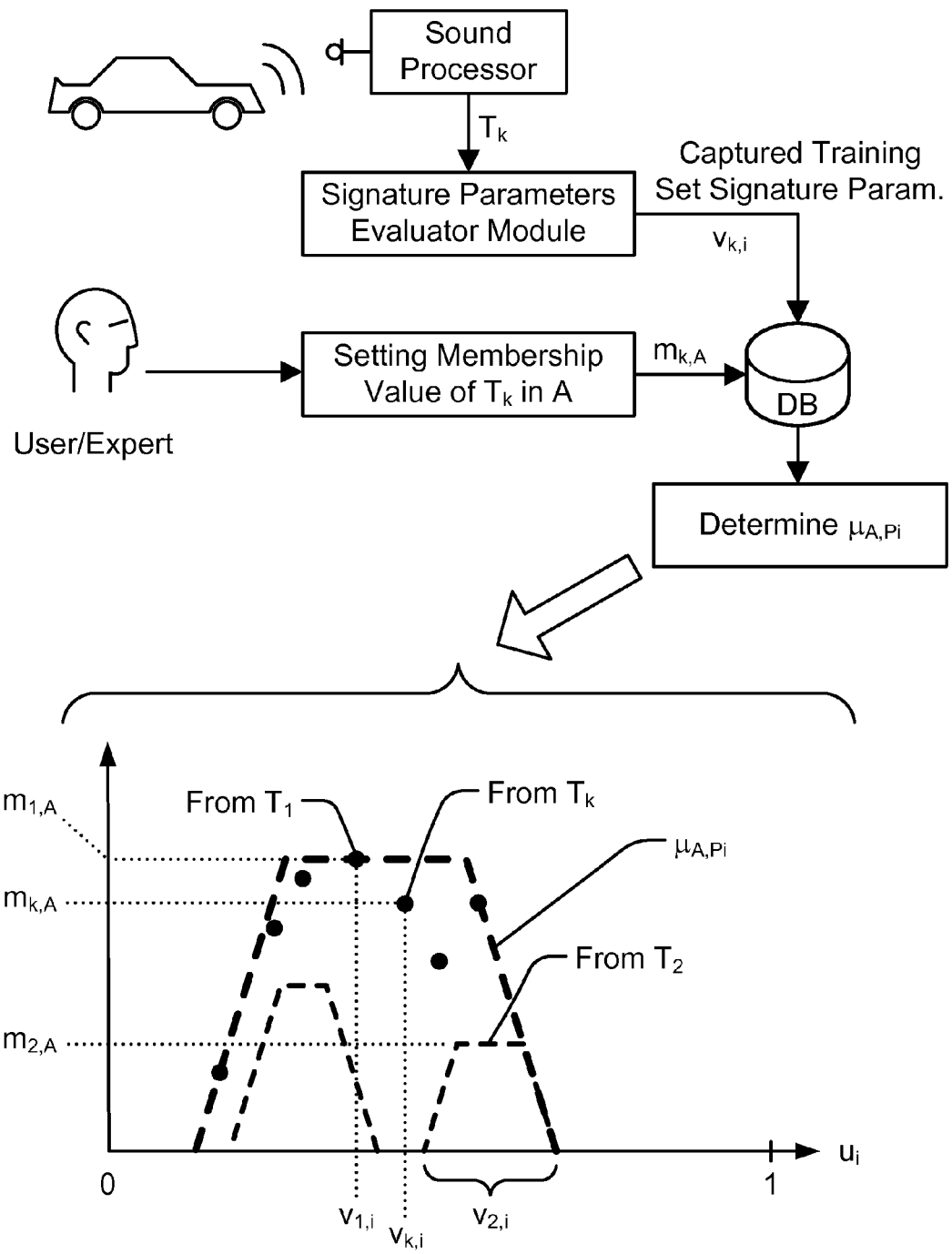
FIG. 15(b) depicts use of training set in a diagnostic system/rules engine, in one embodiment.

In one embodiment, $\mu_{A,Pi}$ is determined through empirical methods, user settings, or training sets. For example, in one embodiment, N training set engine sounds (denoted as $T_k$ with k from 1 to N) are used to determine $\mu_{A,Pi}$. In one embodiment, the truth values for the training element $T_k$ with respect to signature parameters are determined (e.g., as a crisp number, range, or a fuzzy set). For example, as depicted in FIG. 15(b), the truth value of the training element $T_k$ in signature parameter $P_i$, is determined (denoted as $v_{k,i}$), for example through an expert assignment, rule evaluation, or functional/analytical assessment. In one embodiment, the membership value of $T_k$ in A is (denoted as $m_{k,A}$) determined, e.g., by user/expert, expert system, or via analytical methods. $m_{k,A}$ may have crisp or fuzzy value. In one embodiment, the contribution of $T_k$ to $\mu_{A,Pi}$ is determined similar to the execution of the consequent of a fuzzy rule, e.g., the contribution of $v_{k,i}$ is scaled or clipped by $m_{k,A}$ as depicted in FIG. 15(b). For example, as depicted, the truth value of $T_1$ in $P_i$ is a crisp value $v_{1,i}$, and the truth value of $T_1$ in A is $m_{1,A}$. Thus, the contribution of $T_1$ to $\mu_{A,Pi}$ appears as a dot at $(v_{1,i}, m_{1,A})$. Another example is the contribution of $T_2$ to $\mu_{A,Pi}$ where the truth value of $T_2$ in $P_i$ is a fuzzy value $v_{2,i}$, and the truth value of $T_2$ in A is $m_{2,A}$. Thus, the contribution of $T_2$ to $\mu_{A,Pi}$ appears as a clipped or scaled membership function as depicted in FIG. 15(b). In one embodiment, $\mu_{A,Pi}$ is determined as the envelope (e.g., convex) covering the contributions of $T_k$'s to $\mu_{A,Pi}$, for example as depicted in FIG. 15(b). In one example, truth value bins are set up in $u_i$ to determined the maximum contribution from various $T_k$'s for a given $u_i$ (bin) to determined $\mu_{A,Pi}$.

In one embodiment, user/expert assigns verity membership values for $T_k$ in A.

In one embodiment, a module is used to determine correlation between the various type sounds and the corresponding engine diagnosis (by for example experts). In one embodiment, the correlation is made between the signature parameters of the sound and the diagnosis (e.g., in for of fuzzy graphs or fuzzy rules). In one embodiment, a typical and highly frequent type of sound may be identified as the signature parameter (e.g., RattlingSlapping may be taken as a signature parameter itself). Therefore, in one embodiment, the creation of new signature parameters may be governed by fuzzy rules (e.g., involving configurable fuzzy concepts as "typical" for similarity and "frequent"). In one embodiment, the reliability and consistency of the rules are enhanced by allowing the training or feedback adjust $\mu_{A,Pi}$.

In one embodiment, such diagnosis is used an autonomous system, e.g., in self-healing or self-repair, or through other systems/subsystems/components.

In one embodiment provides music recognition via similar analysis of its signature parameters and comparison against those from a music library/database. In one embodiment, the categories of music (e.g., classic, rock, etc) may be used as fuzzy concept A in this example.

q5: What is the Probability of Loose Timing Chain, when the Engine Sound is a Loud "Tick, Tick, Tack, Tack" and it Gets Worse when Revving the Engine?

In one embodiment, as shown by $q_5$, the specification of an input to the system is not in form of the actual sound engine (e.g., wave form or digitized audio), but a fuzzy description of the sound. A conversion process evaluates the fuzzy description to find or construct a sound/attributes (e.g., in the data store) which may be further processed by the rules. For example, in one embodiment, within the context, the module interprets fuzzy descriptions "Tick" and "Tack" as a tonal variation of abrupt sound. In one embodiment, the sequence of such descriptions is interpreted as the pattern of such sounds. With these attributes, in one embodiment, signature parameters are determined, and as described above, the test score related to whether "Tick, Tick, Tack, Tack" is RattlingSlapping is determined. The evaluation of the fuzzy rule predicate provides the test score for the limiting truth score for the consequent, which is a restriction on the probability of loose timing chain.

In one embodiment, e.g., in music recognition, similar fuzzy description of music is used to determine/search/find the candidates from the music library (or metadata) with best match(es) and/or rankings When such a description accompanies other proposition(s), e.g., a user input that "the music is classical", it would place further restrictions to narrow down the candidates, e.g., by automatic combinations of the fuzzy restrictions, as mentioned in this disclosure or via evaluation of fuzzy rules in a rules engine.

EXAMPLE 4

In this example, suppose these input propositions to system: $p_1$: the weather is seldom cold or mild. $p_2$: Statistically, the number of people showing up for an outdoor swimming pool event is given by function having a peak of 100 at 90° F., where X is the weather temperature:

$$Y = F(X) = \max\left(100 \times \left(1 - \text{abs}\left(\frac{X - 90° \text{ F.}}{25° \text{ F.}}\right)\right), 0\right)$$

q6: How Many People Will Show Up at the Swimming Event?

Figure 16A:
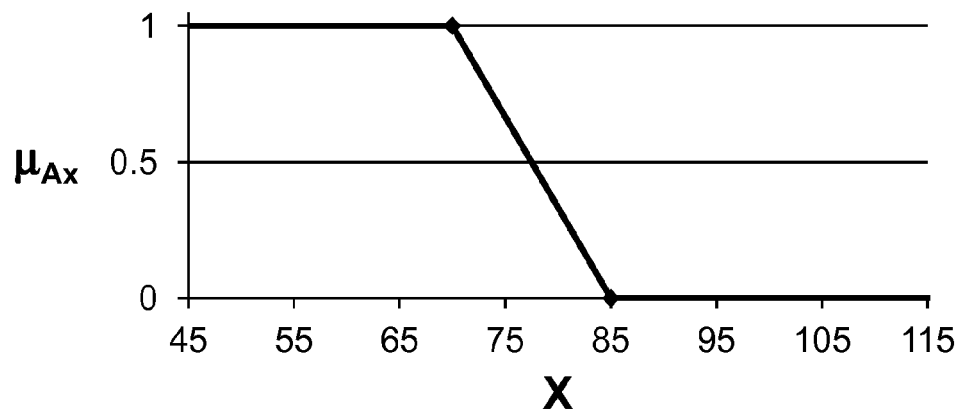
FIG. 16(a) depicts a membership function, in one embodiment.
Figure 16B:
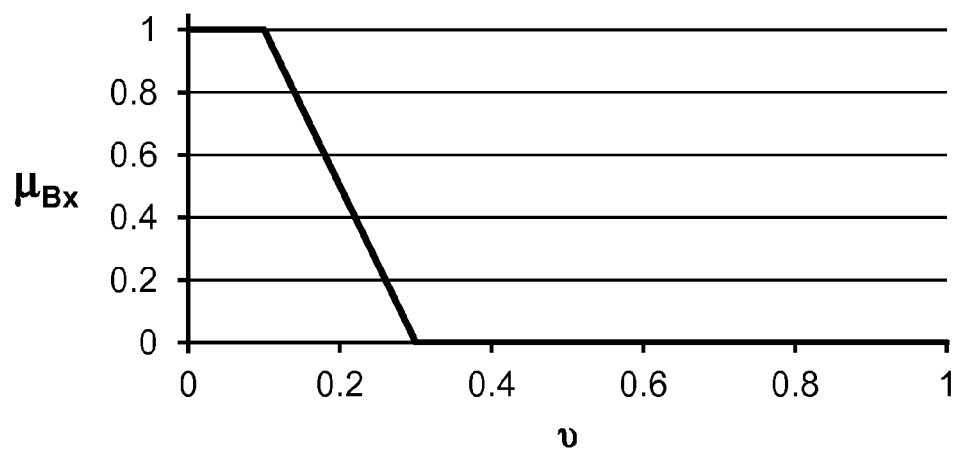
FIG. 16(b) depicts a restriction on probability measure, in one embodiment.

In one embodiment, the precisiation of input proposition is in Z-valuation $(X, A_x, B_x)$, where $A_x$ is cold or mild and $B_x$ is seldom. For example, as depicted in FIG. 16(a), $\mu_{Ay}$ is depicted as a step-down membership function with ramp from 70° F. to 85° F., representing the fuzzy edge of mild on the high side, and as depicted in FIG. 16(b), $\mu_{A_y}$ is depicted as a step-down membership function with ramp from 10% to 30%, representing seldom.

Figure 16C:
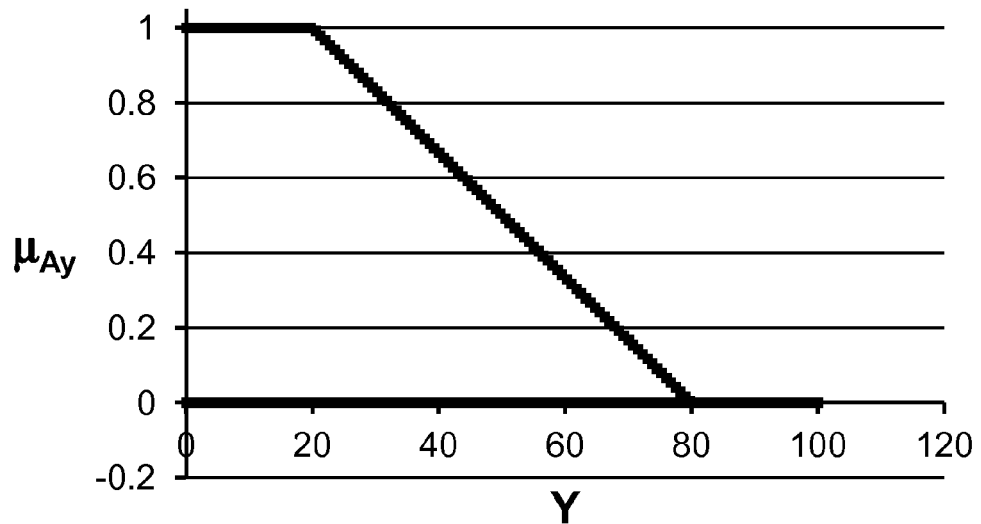
FIG. 16(c) depicts membership function tracing using a functional dependence, in one embodiment.
Figure 16D:
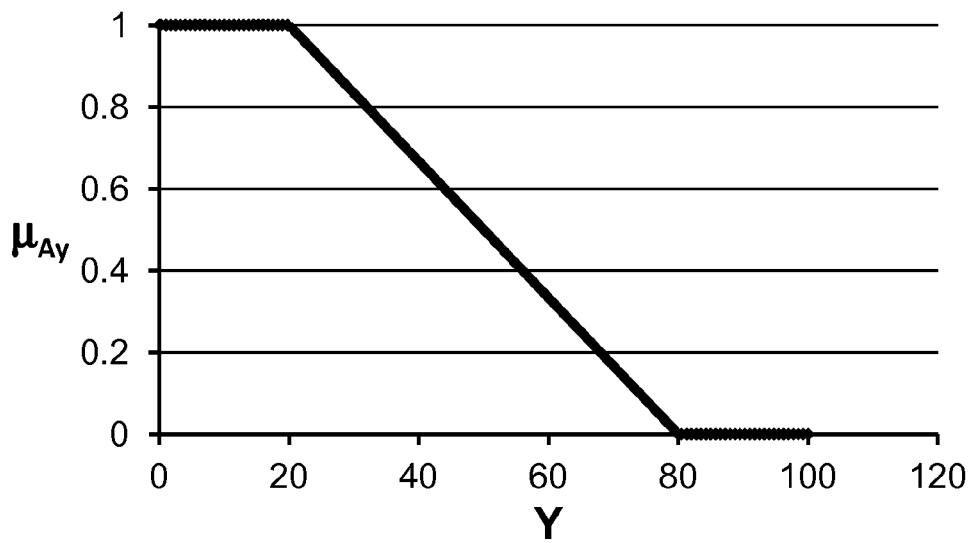
FIG. 16(d) depicts membership function determined using extension principle for functional dependence, in one embodiment.
Figure 16E:
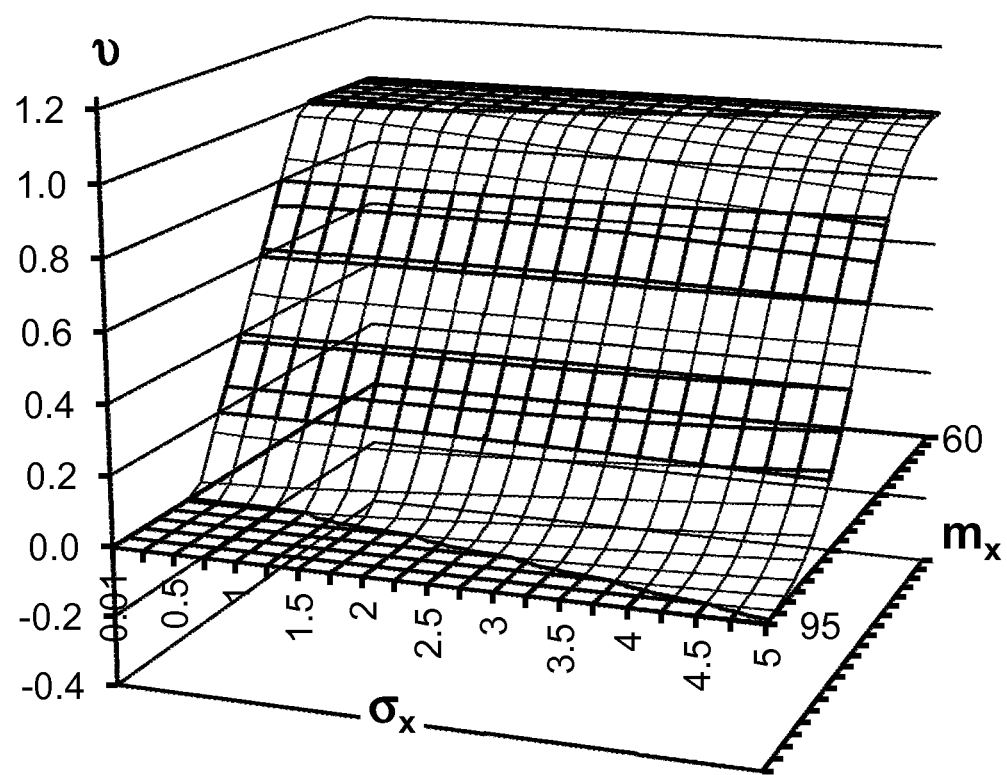
FIGS. 16(e)-(f) depict the probability measures for various values of probability distribution parameters, in one embodiment.
Figure 16F:
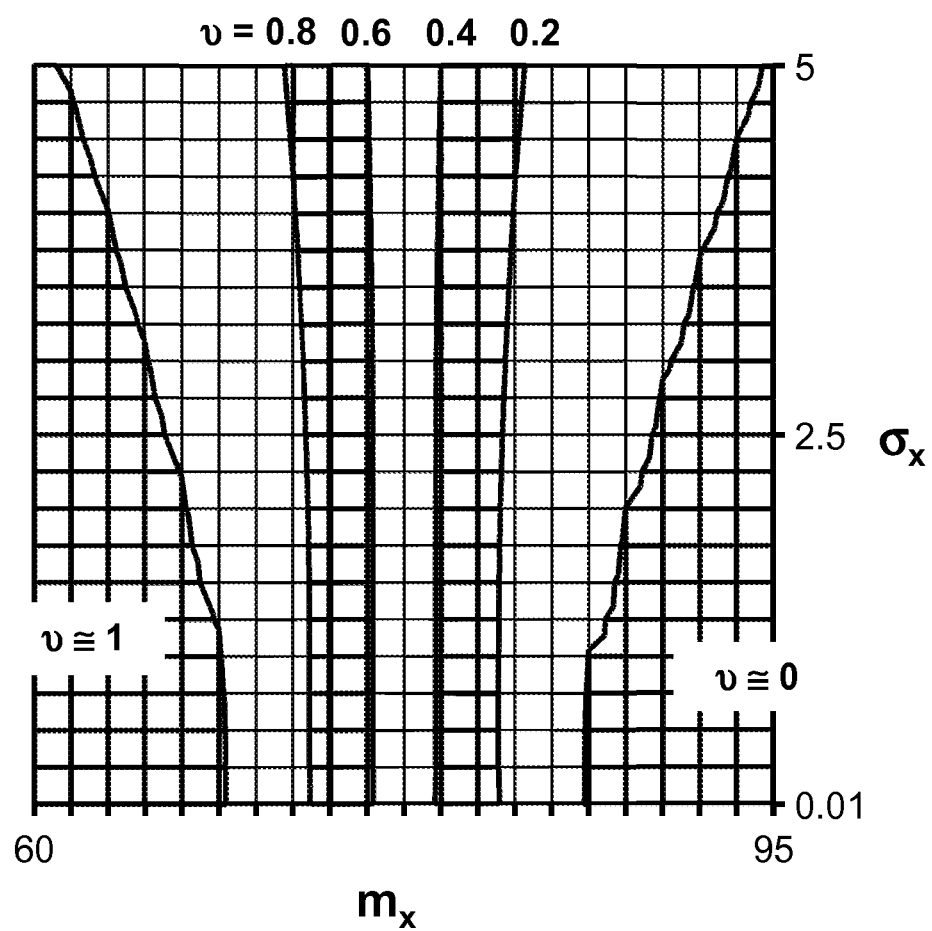
Figure 16G:
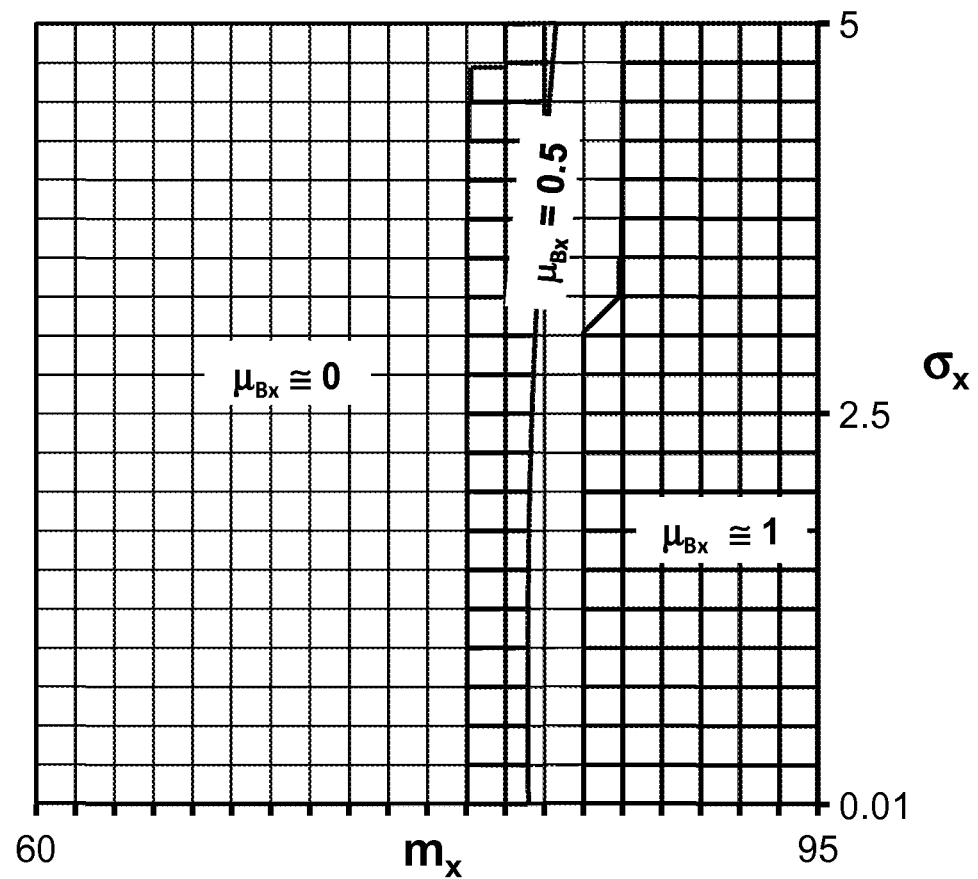
FIG. 16(g) depicts the restriction imposed on various values of probability distribution parameters, in one embodiment.
Figure 16H:
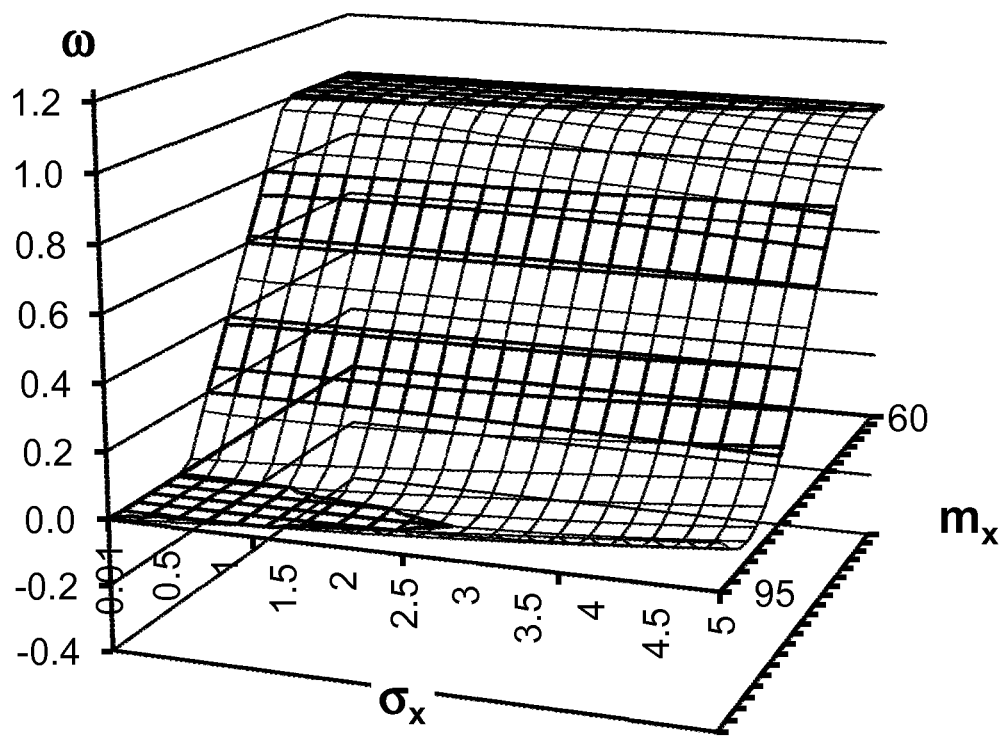
FIGS. 16(h)-(i) depict the probability measures for various values of probability distribution parameters, in one embodiment.
Figure 16I:
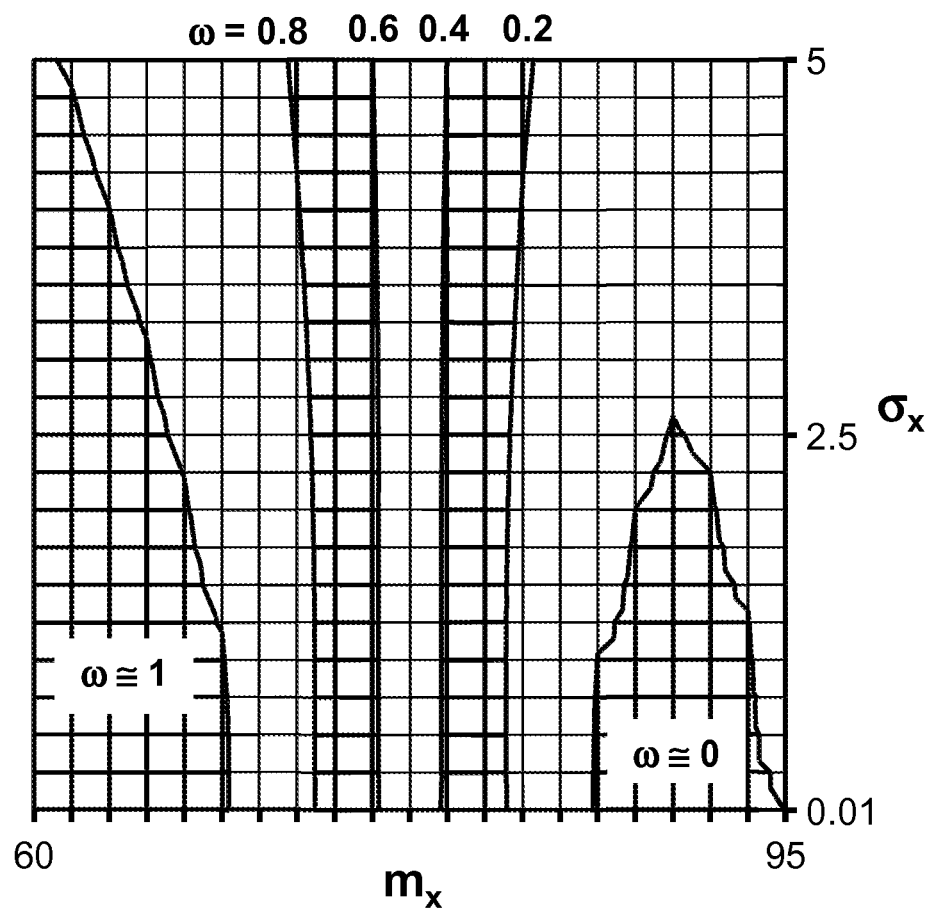
Figure 16J:
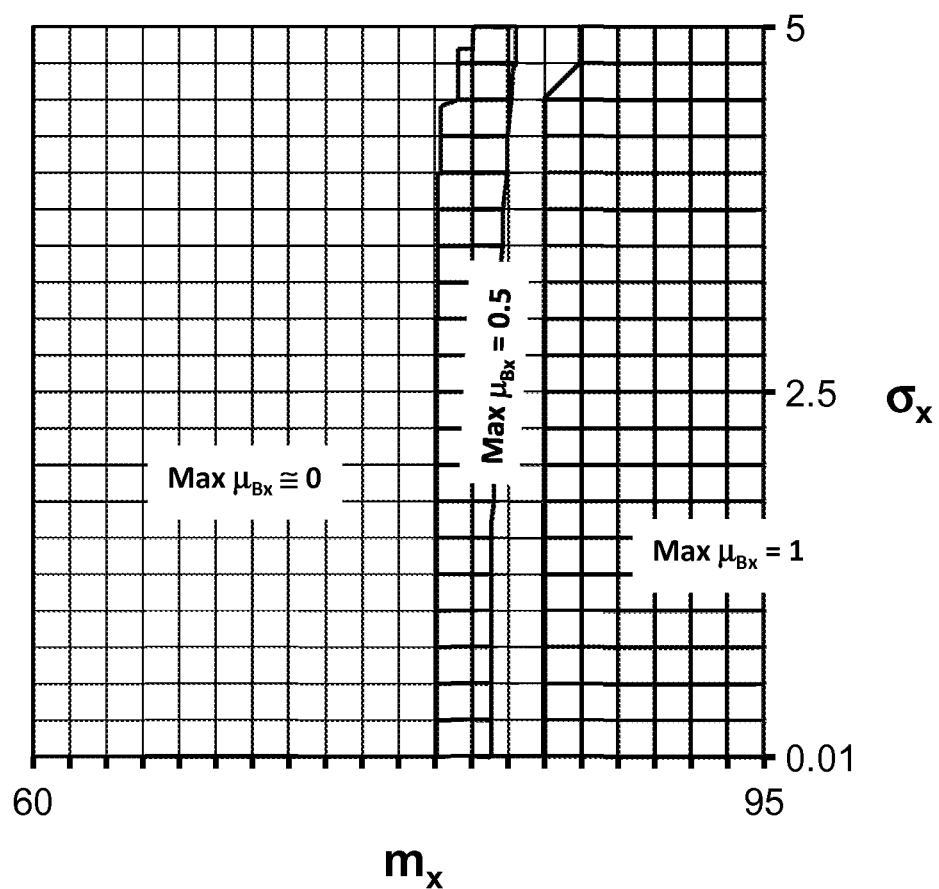
FIG. 16(j) depicts the restriction (per ω bin) imposed on various values of probability distribution parameters, in one embodiment.
Figure 16K:
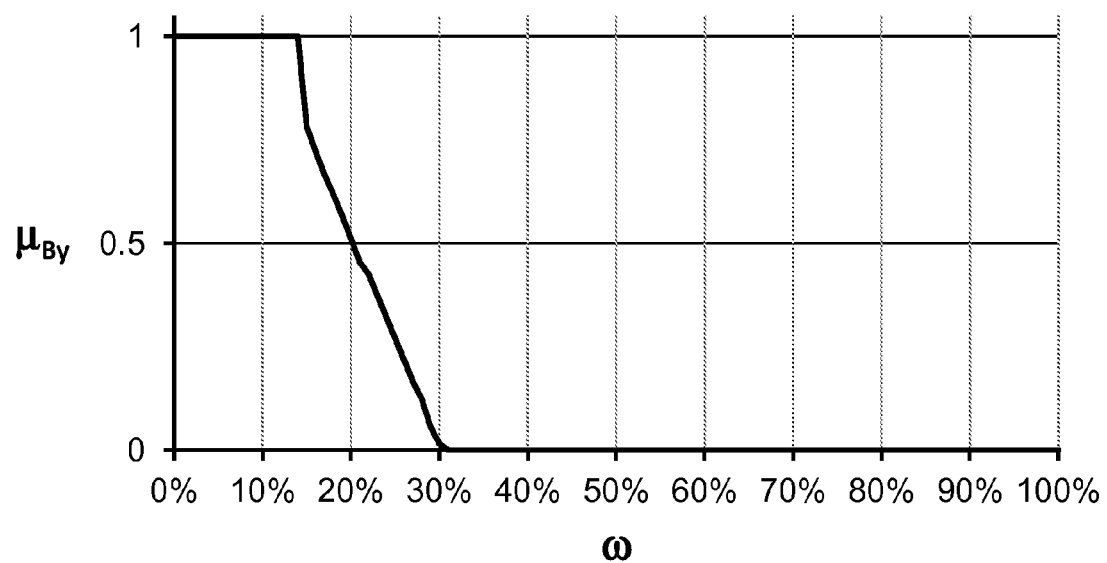
FIG. 16(k) depicts a restriction on probability measure, in one embodiment.

In one embodiment, the parsing of $q_6$ results in an answer in form of Z-valuation, (Y, $A_y$, $B_y$) form, where Y is the number of people showing up for an outdoor swimming pool event. In one embodiment, as described in this disclosure, a candidate $\mu_{A_y}$ is determined using F(X) and $\mu_{A_x}$ via extension principle. For example, as depicted in FIG. 16(c), $\mu_{A_y}$ (without taking maximum possibility) is determined for X ranging from 45° F. to 120° F. Given non-monotonic nature of F(X) in this example, same Y (or bin) maps to multiple X's with different membership function values, as depicted in FIG. 16(c). The resulting $\mu_{A_y}$, by maximizing membership function in a Y (bin) is depicted in FIG. 16(d). For example, in one embodiment, this $\mu_{A_y}$ maps to quite significantly less than 80, based on the knowledge database, context, and models. In one embodiment, for example, a probability Gaussian distribution is selected for $p_X$, $N(m_x, \sigma_x)$, with $m_x$ selected in [60, 95] and $\sigma_x$ selected in (0, 5]. In one embodiment, the corresponding probability measure of $A_x$ (denoted as υ) is determined for various candidate $p_X$'s. For example, FIGS. 16(e)-(f) show υ (and its contours) for various $(m_x, \sigma_x)$. As described in this disclosure, the test score based on $\mu_{B_x}$ for various $(m_x, \sigma_x)$ is determined as depicted in FIG. 16(g). As described in this disclosure, the probability measure of $A_Y$ (denoted as ω) is determined for various υ's or $p_X$'s. For example, as depicted in FIGS. 16(h)-(i), ω contours are shown for various values of $(m_x, \sigma_x)$. As described in this disclosure, the maximum $\mu_{B_x}$ per ω (bin) is determined, for example as depicted in FIG. 16(j). In one embodiment, $\mu_{B_y}$ is determined as described in this disclosure, and is depicted in FIG. 16(k). In one embodiment, comparison of the resulting $\mu_{B_y}$ to the model database indicates that $B_y$ maps to more or less seldom. In one embodiment, the answer to $q_6$ is provided as: More or less seldom, the number of people showing up for an outdoor swimming pool event, is quite significantly less than 80.

q7: What are the Odds that the Weather is Hot?

Figure 17A:
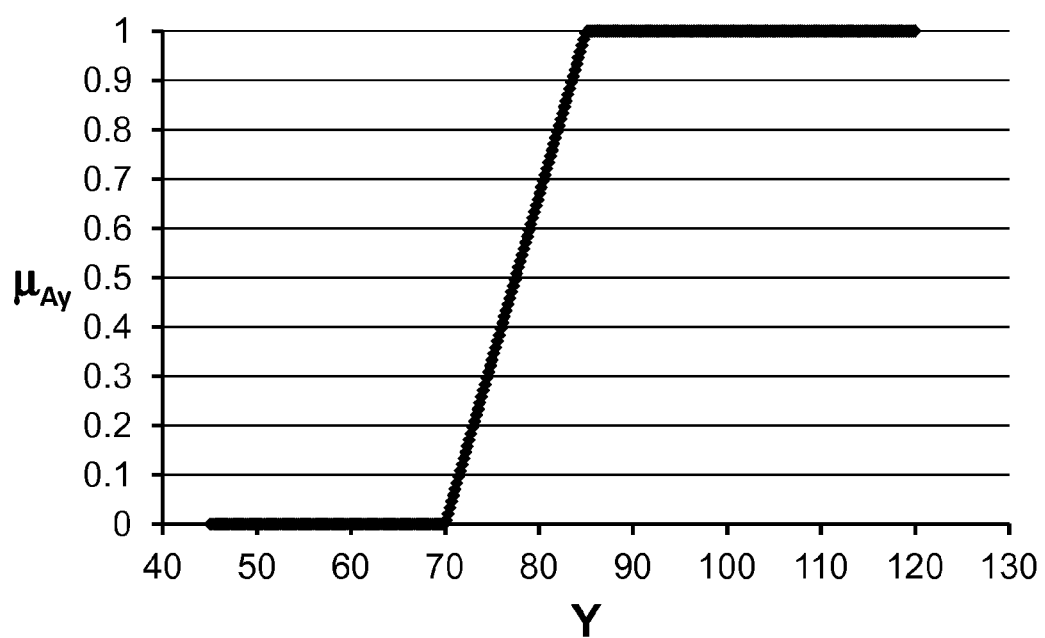
FIG. 17(a) depicts a membership function, in one embodiment.
Figure 17B:
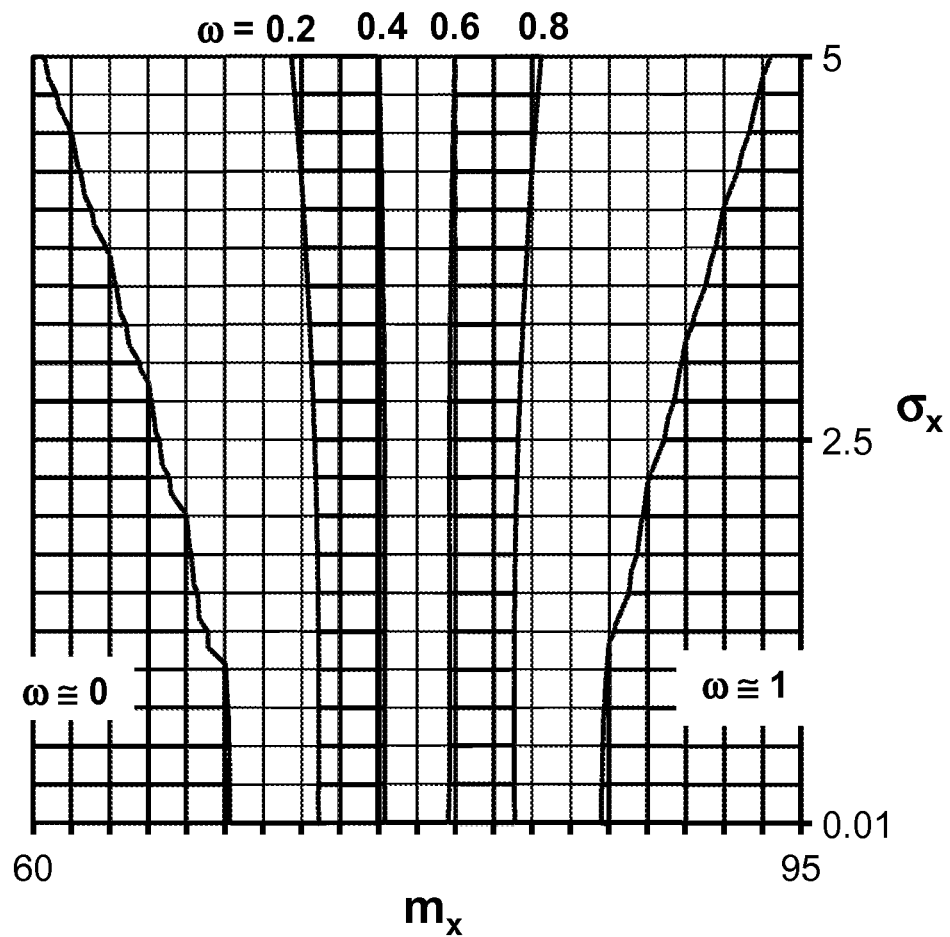
FIG. 17(b) depicts the probability measures for various values of probability distribution parameters, in one embodiment.
Figure 17C:
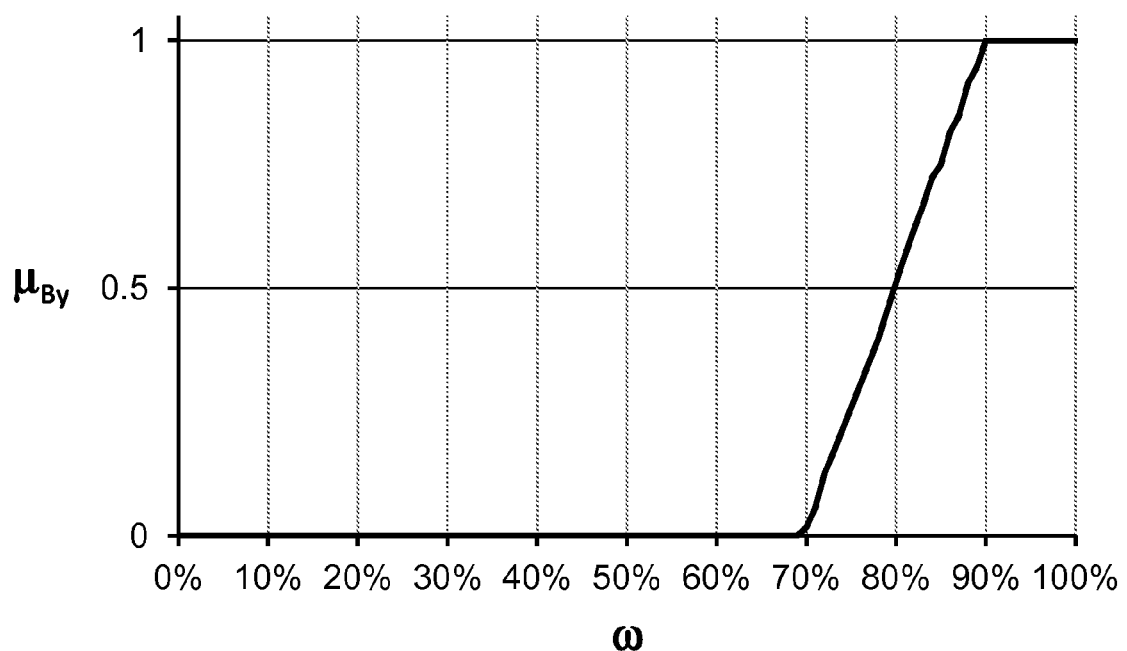
FIG. 17(c) depicts a restriction on probability measure, in one embodiment.

In one embodiment, the answer is in a Z-valuation Y, $A_Y$, $B_Y$) form, where Y is temperature (same as X, i.e., Y=F(X)=X). $q_6$ provides $A_Y$ as hot, as for example depicted in FIG. 17(a). As described in this disclosure, in one embodiment, the probability measure of $A_Y$ is determined (e.g., see FIG. 17(b)), and $\mu_{B_y}$ is determined (e.g., see FIG. 17(c)). In one embodiment, this $\mu_{B_y}$ is mapped to usually (or anti-seldom), and the answer is determined as: the weather temperature is usually hot.

q8: What are the Odds that More than about 50 People Show Up?

Figure 18A:
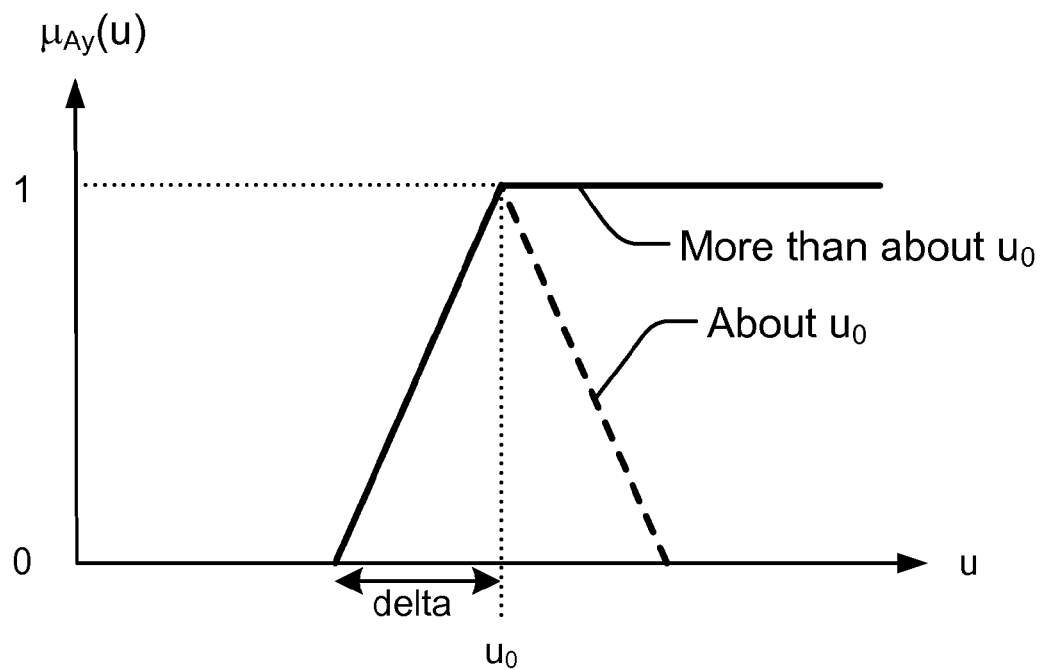
FIG. 18(a) depicts the determination of a membership function, in one embodiment.
Figure 18B:
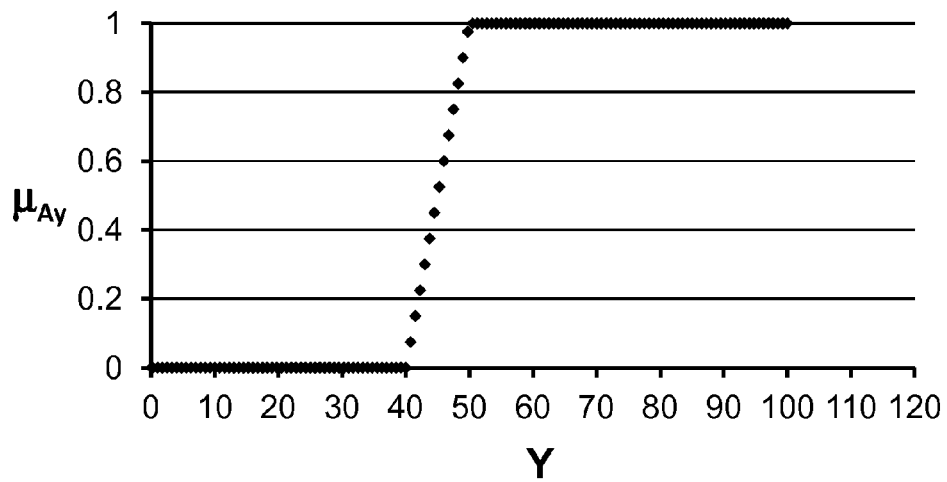
FIG. 18(b) depicts a membership function, in one embodiment.
Figure 18C:
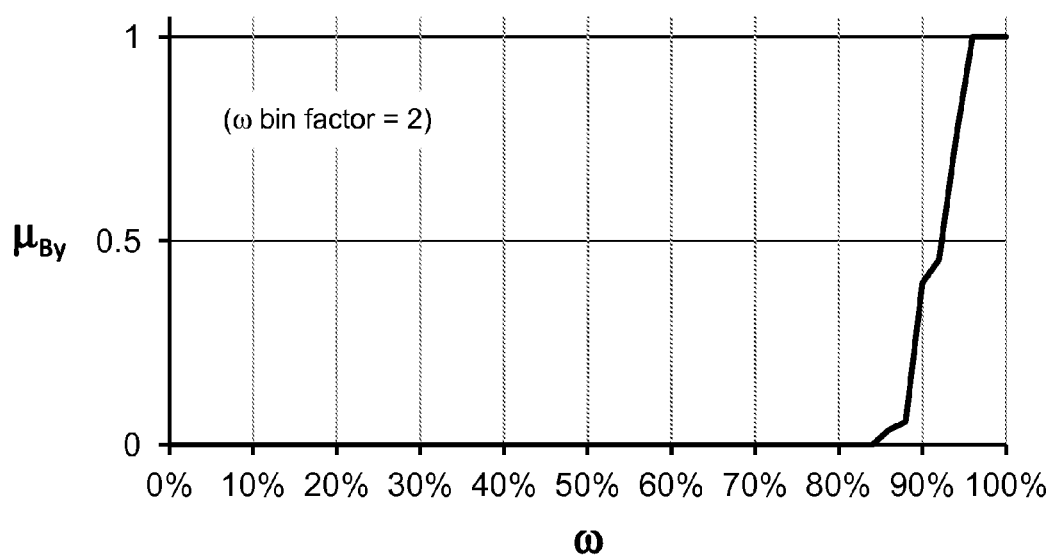
FIG. 18(c) depicts a restriction on probability measure, in one embodiment.

In one embodiment, the answer is in a Z-valuation Y, $A_Y$, $B_Y$) form, where Y is again the number of people showing up for an outdoor swimming pool event, and $A_Y$ is more than about 50. In one embodiment, $\mu_{A_y}$ is determined from $q_8$, e.g., by using the model database and fuzzy logic rules for modifiers within the context and domain of Y, for example, as depicted in FIG. 18(a). In one embodiment, $\mu_{A_y}$ is determined to be a step-up membership function with a ramp from 40 to 50 (delta=10), as depicted from FIG. 18(b). Similar to above, $B_Y$ is determined, as for example depicted in FIG. 18(c). Then, in one embodiment, the answer becomes: Almost certainly, the number of people showing up for an outdoor swimming pool event, is more than about 50. Or the odds of the number of people showing up for an outdoor swimming pool event, being more than about 50 is more than about 95%.

q9: What are the Odds that More than about 65 People Show Up?

Figure 19A:
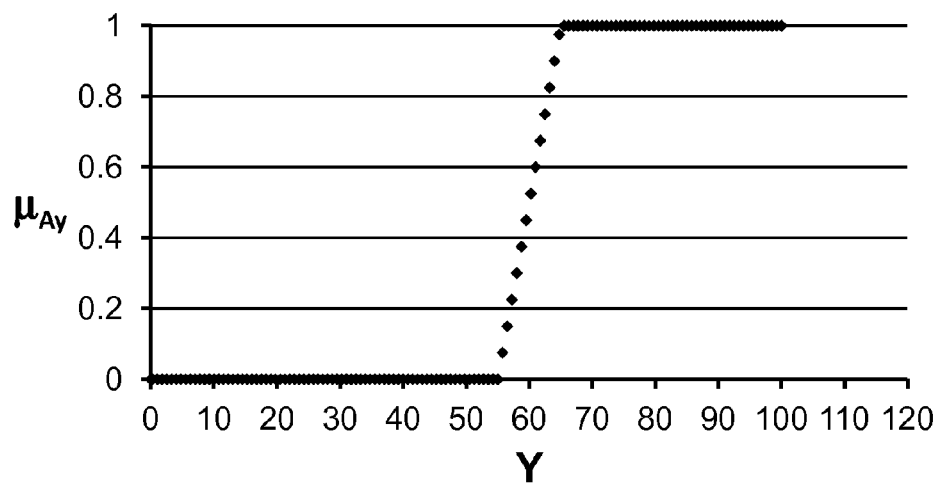
FIG. 19(a) depicts a membership function, in one embodiment.
Figure 19B:
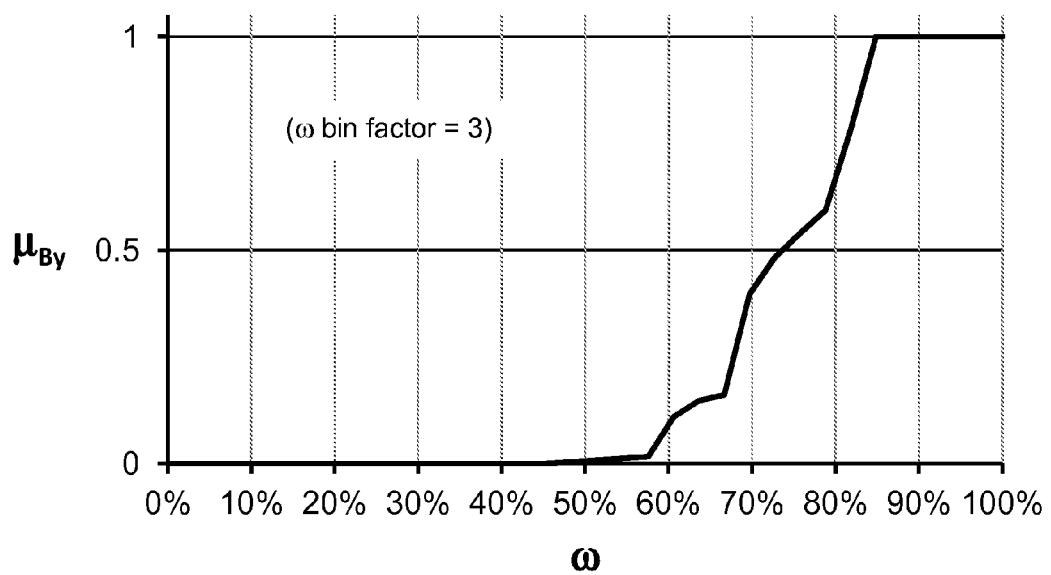
FIG. 19(b) depicts a restriction on probability measure, in one embodiment.

In one embodiment, similarly to above, $\mu_{A_y}$ is determined to be a step up membership function with a ramp from 55 to 65, as depicted in FIG. 19(a). Similarly, $B_y$ is determined, as for example depicted in FIG. 19(b). Then, in one embodiment, the answer becomes: Usually, the number of people showing up for an outdoor swimming pool event, is more than about 65. Or the odds of the number of people showing up for an outdoor swimming pool event, being more than about 65 is more than about 85%.

q10: What are the Odds that about 30 People Show Up?

Figure 20A:
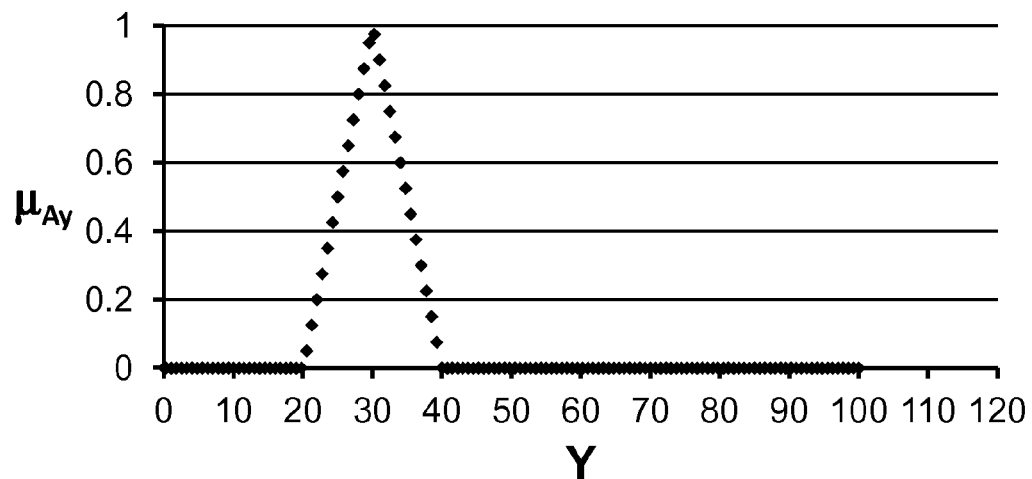
FIG. 20(a) depicts a membership function, in one embodiment.
Figure 20B:
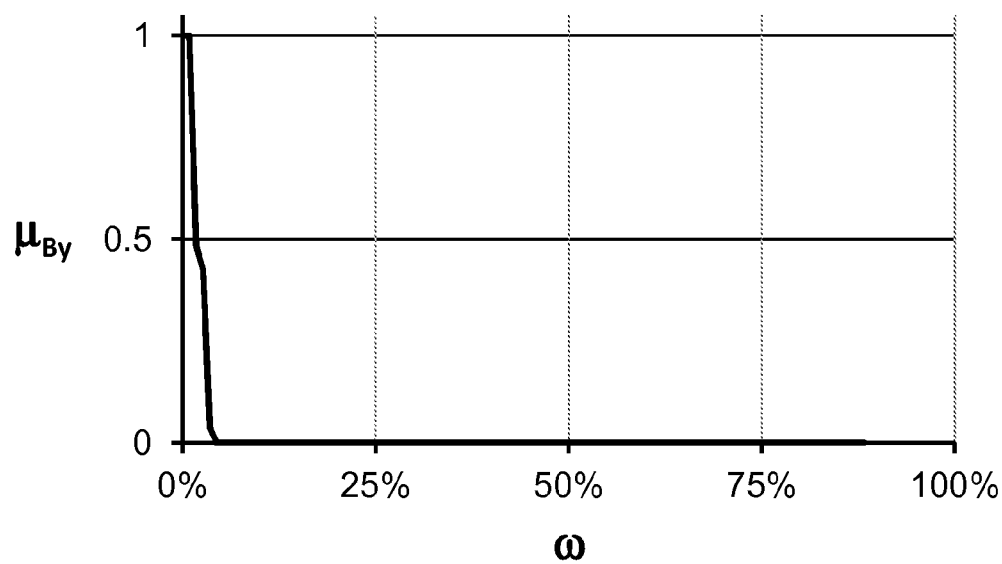
FIG. 20(b) depicts a restriction on probability measure, in one embodiment.

In one embodiment, similarly to above, $\mu_{A_y}$ is determined to be a triangular membership function with a base from ramp from 20 to 40, as depicted in FIG. 20(a). Similarly, $B_y$ is determined, as for example depicted in FIG. 20(b). Then, in one embodiment, the answer becomes: The number of people showing up for an outdoor swimming pool event, is almost never about 30.

Confidence Approach on Membership Function

As mentioned earlier, in the Z-valuation (X, A, B), a restriction on X (e.g., assuming X is a random variable), in one embodiment, is imposed via a restriction on its probability distribution $p_X$, to the degree that the probability measure of A, defined as $$p = \int_R \mu_A(u) p_X(u) du,$$

satisfies the restriction that (Prob(X is A) is B). In such a case, $p_X$ is the underlying (hidden) probability density of X. In one embodiment, this approach takes a view that such Z-valuation is based on an objective evaluation against the probability distribution $p_X$. In the following, we consider the view that B does not necessarily impose a restriction on $p_X$, but on A itself. For example, B can be viewed as the confidence level on the speaker of the proposition. For example, while there may be absolutely no confidence on the propositions generated out of a random fortune teller machine, some of the propositions themselves may in fact be true or highly probable. In such a case, the confidence level imposed on the propositions have more to do with confidence in the source of the propositions rather than restriction on the probability distributions related to the random variables associated with the content of the propositions. In another example, take the proposition "Fred's height is medium height, but I am not too sure (because I don't recall too well)." In one embodiment, we take such proposition (as a matter of degree) to allow Fred's height to be medium-high or medium low. In essence, the restriction from B, in this approach, is imposed not necessarily on $p_X$, but on imprecision of A itself. In one embodiment, this approach provides a method to deal with seemingly conflicting propositions, for example by discounting the confidence levels on such propositions (or, for example, on the speakers of those propositions), as opposed to imposing conflicting restrictions on $p_X$.

Figure 21A:
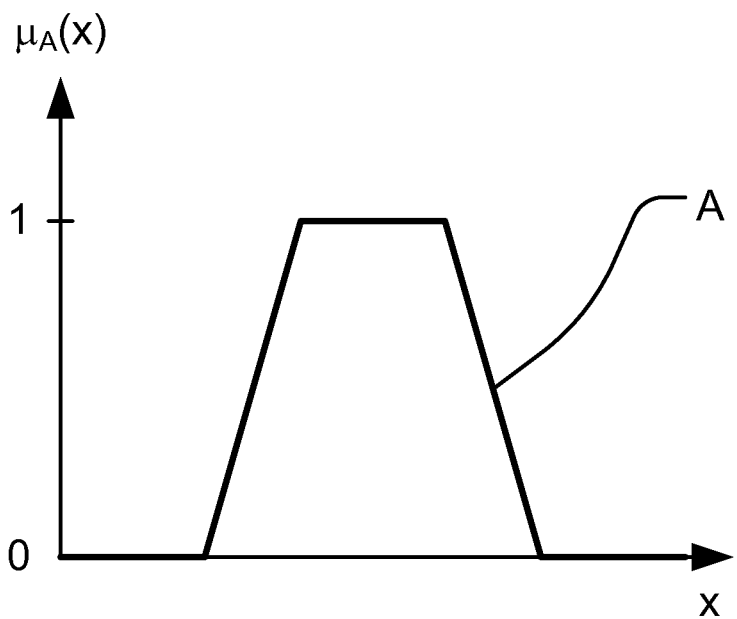
FIGS. 21(a)-(b) depict a membership function and a fuzzy map, in one embodiment.
Figure 21B:
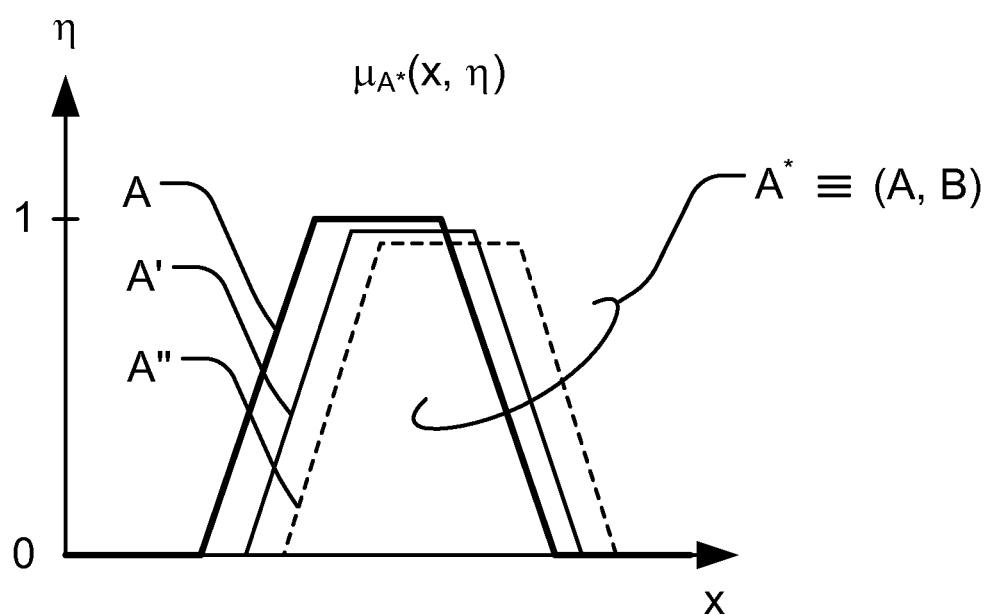

As shown in FIG. 21(a), (X is A) is graphically depicted by possibility distribution $\mu_A(x)$. (A, B) in this context allows for possibilities of other membership functions, such as A' or A", as depicted in FIG. 21(b), to various degrees, depending on the confidence level imposed by B. The fuzzy set of such membership functions are denoted as A*. In another words, whereas in (X is A) the membership degree of x is denoted by $\mu_A(x)$, in (A, B), the value of membership function of x is not a singleton, but a fuzzy value itself The possibility of such membership value is denoted by $\mu_{A*}(x, \eta)$. This would indicate the possibility degree that the value of membership function of x be $\eta$. In this approach, a single crisp trace indicating membership function of X in FIG. 21(a) turns into a two dimensional fuzzy map in FIG. 21(b), where a point in (x, $\eta$) plane is associated with a membership function $\mu_{A*}(x,\eta)$. An example of such map can be visualized in one embodiment, as color (or grayscale graduation) mapping in which high possibility (for membership values) areas (e.g., a pixel or range in (x,$\eta$) plane), are associated with (for example) darker color, and low possibility (for membership values) areas are associated with (for example) lighter color. In one extreme where there is no imprecision associated with the proposition (X is A), such map results in a crisp trace, as for example shown in FIG. 21(a).

Figure 22A:
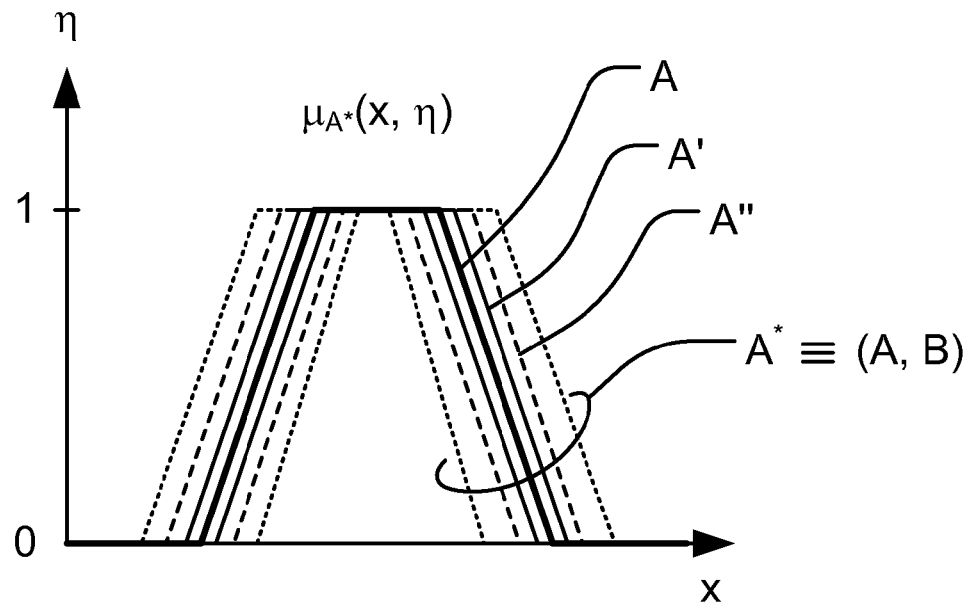
FIGS. 22(a)-(b) depict various types of fuzzy map, in one embodiment.
Figure 22B:
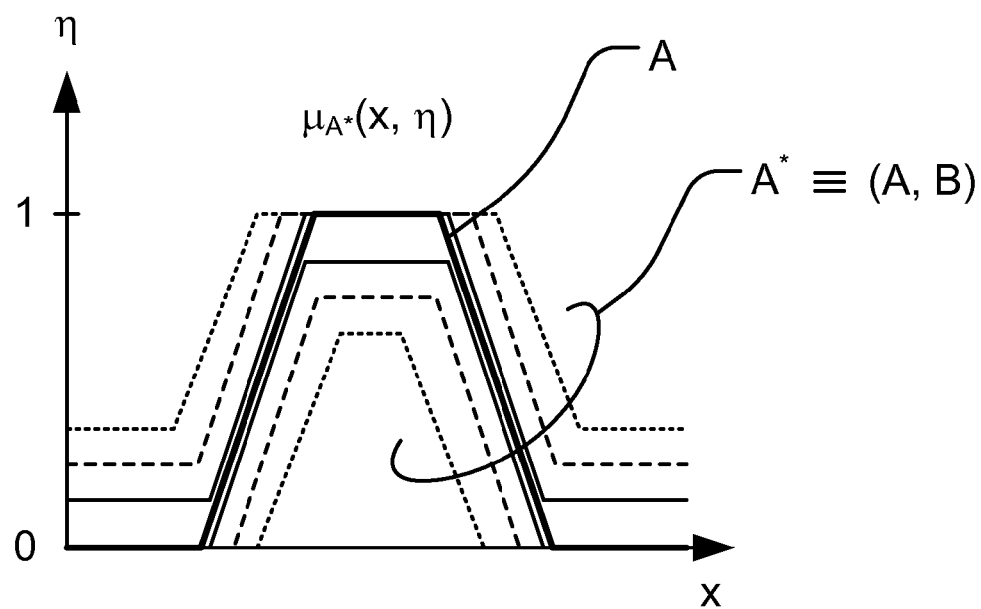

In one embodiment, as depicted for example in FIG. 22(a), the effect of B in (A, B) is to fuzzy the shape of membership function of X in A, primarily by making the sides of the membership function fuzzy (for example, compared to flat high/low portions). For example, such fuzziness is primarily performed laterally in (x,$\eta$) plane. In one embodiment, as for example depicted in FIG. 22(b), (A, B) is presented with a fuzzy map primarily carried out vertically in (x,$\eta$) plane. In one embodiment, the map may contain bands of similar color(s) (or grayscale) indicating regions having similar possibility of membership functions of x.

In one embodiment, the possibility map of membership function of x associated with A* may be determined by superimposing all possible membership functions of x with their corresponding membership degree (or test score) in A* on (x, $\eta$) plane, for example, by taking the supreme test score (or membership degree in A*) of such potential membership functions for each point in (x, $\eta$) plane.

Figure 23:
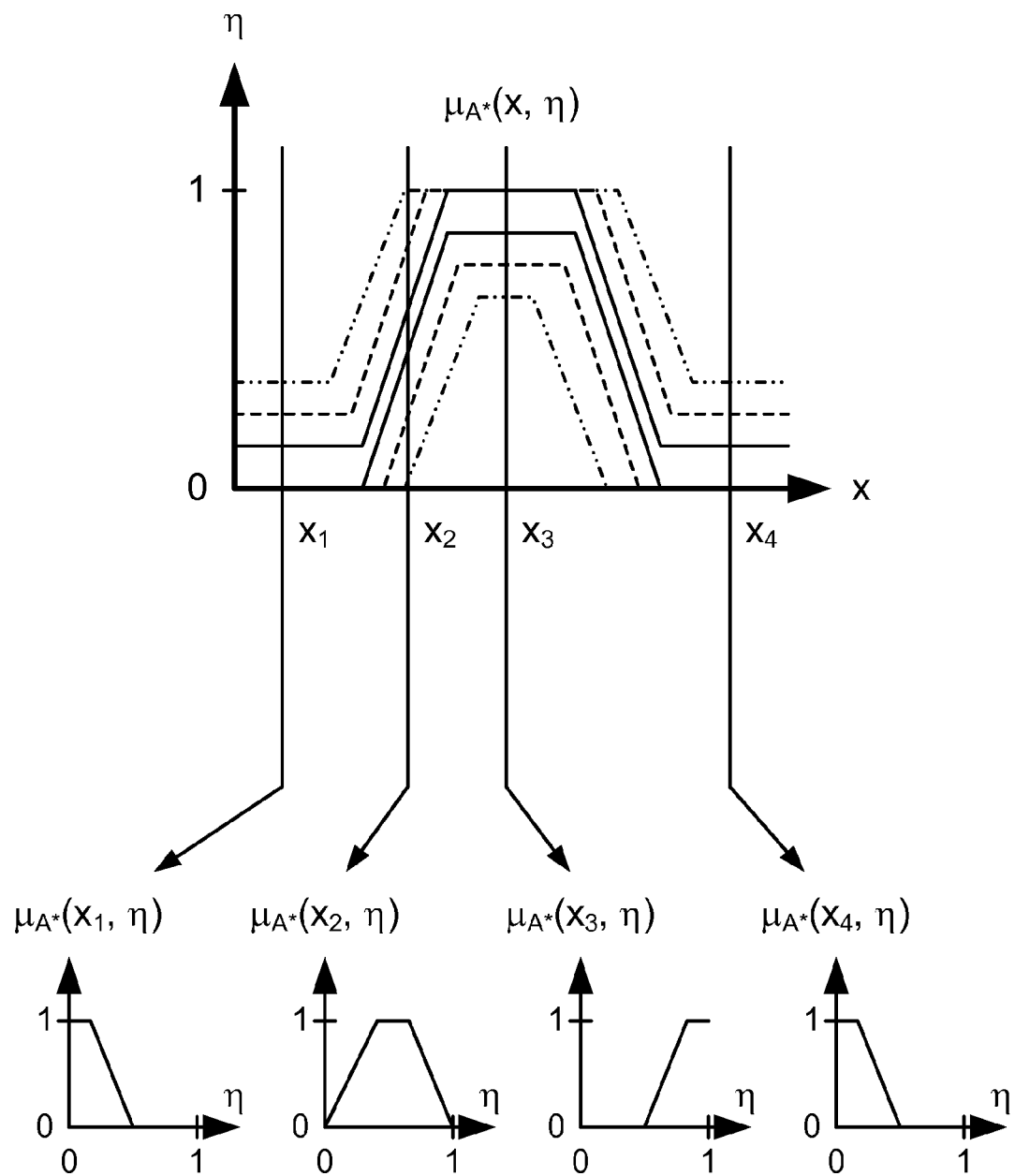
FIG. 23 depicts various cross sections of a fuzzy map, in one embodiment.

As depicted in FIG. 23, the cross sections of the fuzzy map in (x, $\eta$) plane, for example, at various X values $X_1$, $X_2$, $X_3$, and $X_4$, show a membership function for $\eta$ for each cross section. In general, the shape of membership function of $\eta$ for each X value, depends on X and B (affecting the degree of fuzziness and imprecision), i.e., the membership function of $\eta$ for a given X (e.g., $X_0$) takes the value of $\mu_{A*}(X_0, \eta)$.

Figure 24:
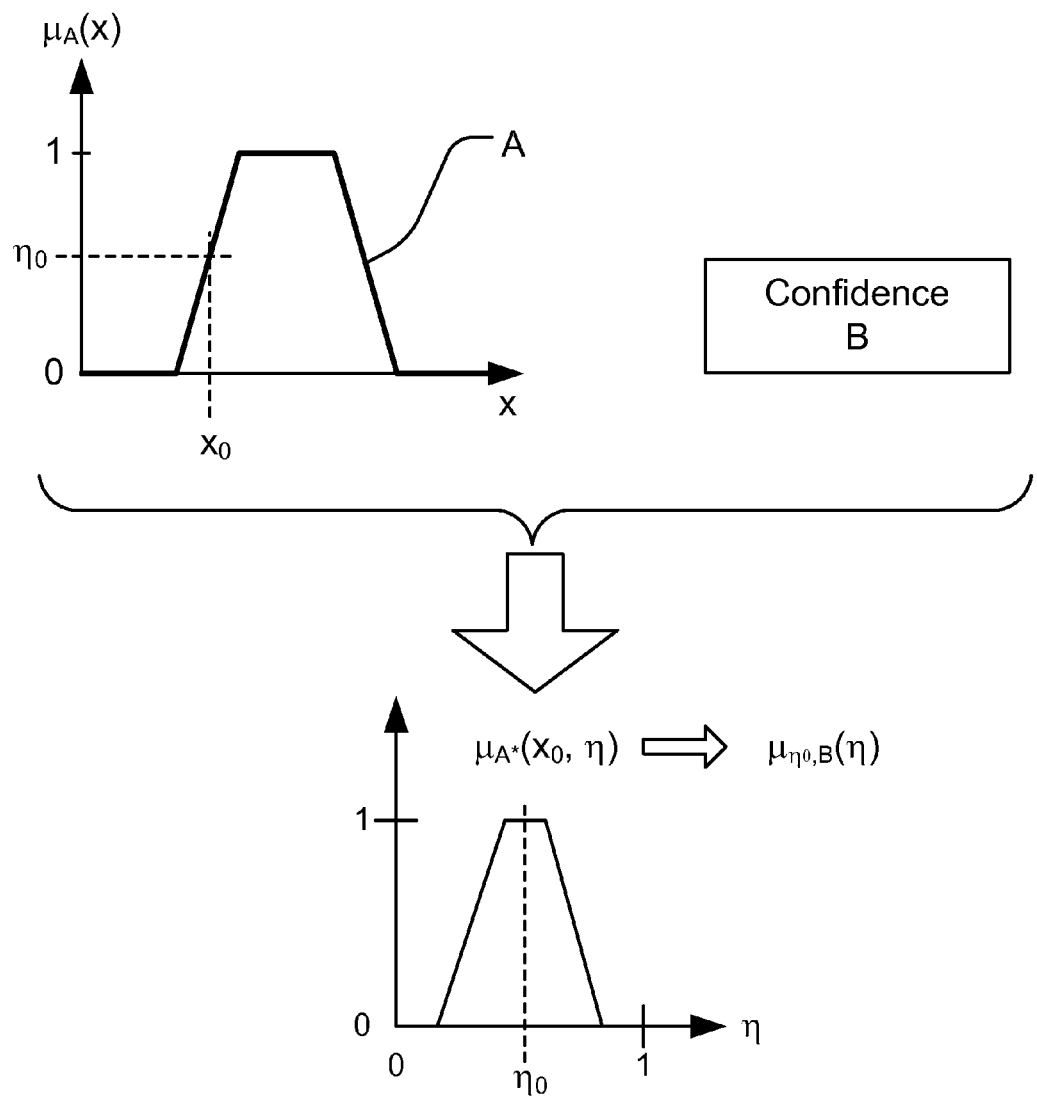
FIG. 24 depicts an application of uncertainty to a membership function, in one embodiment.

In one embodiment, as for example depicted in FIG. 24, the membership function of $\eta$, $\mu_{A*}(X_0, \eta)$, for X value of $X_0$, revolves around $\eta_0$, which is the value of membership function of X in A at $X_0$ (i.e., $\eta_0 = \mu_A(X_0)$). In one embodiment, the shape of $\mu_{A*}(X_0, \eta)$ depends on B and $X_0$. In one embodiment, the shape of $\mu_{A*}(X_0, \eta)$ depends on B and $\eta_0$. In such an embodiment, for two values of X, e.g., $X_1$ and $X_4$ (for example, as depicted in FIG. 23), where $\mu_A(X)$ is the same for both values, $\mu_{A*}(X_1, \eta)$ and $\mu_{A*}(X_2, \eta)$ also have the same shape. In such an embodiment, $\mu_{A*}(X_0, \eta)$ may be expressed as $\mu_{\eta 0,B}(\eta)$, indicating its dependence on B and $\eta_0$.

Figure 25:
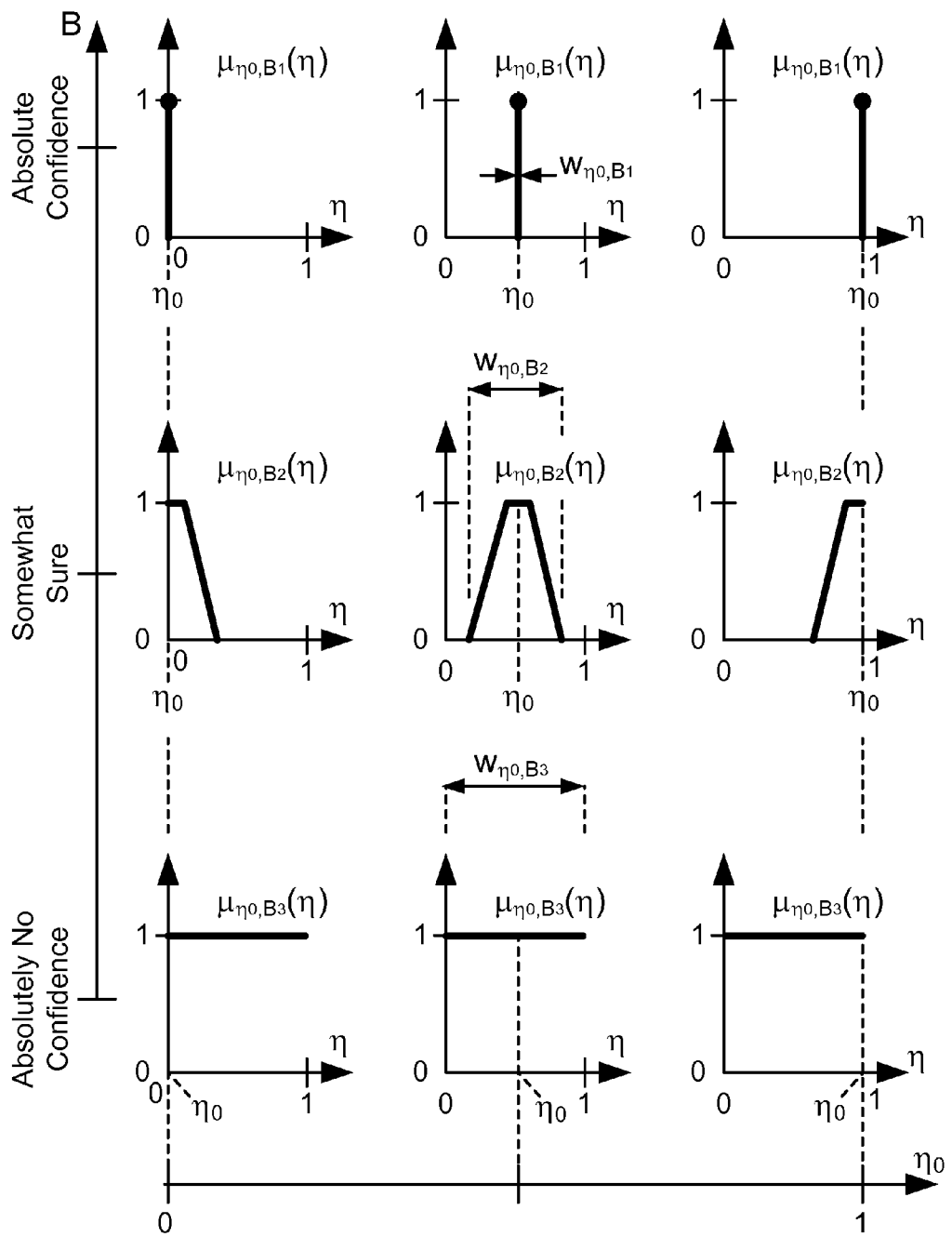
FIG. 25 depicts various cross sections of a fuzzy map at various levels of uncertainty, in one embodiment.

In one embodiment, as depicted for example in FIG. 25, $\mu_{\eta 0,B}(\eta)$ is depicted for various B's and $\eta_0$. For example, at high confidence levels (e.g., Absolute Confidence, $B_1$), the membership function of $\eta$, $\mu_{\eta 0,B}(\eta)$, is narrow ($W_{\eta 0,B1}$) precise function with membership value of 1 at $\eta_0$. In such a case, $\mu_{A*}(X, \eta)$ would resemble the crisp trace of $\mu_A(X)$ (as depicted in FIG. 21(a)). At a medium confidence level (e.g., "Somewhat Sure", $B_2$), $\mu_{\eta 0,B}(\eta)$ is a membership function of $\eta$ revolving around $\eta_0$. In one embodiment, the imprecision measure of $\mu_{\eta 0,B}(\eta)$, (e.g., $W_{\eta 0,B2}$), is increased by reduction in level of confidence B. For example, when B represent very little or no confidence at all (e.g., "Absolutely No Confidence", $B_3$), there is no confidence on the membership function of X (e.g., at $X_0$), and such membership function value $\eta$, may take any value (from 0 to 1), yielding flat profile for $\mu_{\eta 0,B}(\eta)$. In one embodiment, this flat profile has value of 1. In one embodiment, this flat profile is independent of $\eta_0$. In one embodiment, reduction in confidence level in B, works to increase the imprecision measure of $\mu_{\eta 0,B}(\eta)$, (e.g., $W_{\eta 0,B3}$), to encompass whole range of $\eta$. In such a case, the color (or grayscale) map $\mu_{A*}(X, \eta)$ would become a block of all (or mostly) black areas, indicating that any membership value is possible for a given values of X. Then in such an embodiment, "X is A, with absolutely no confidence" will put no restriction on X.

Figure 26A:
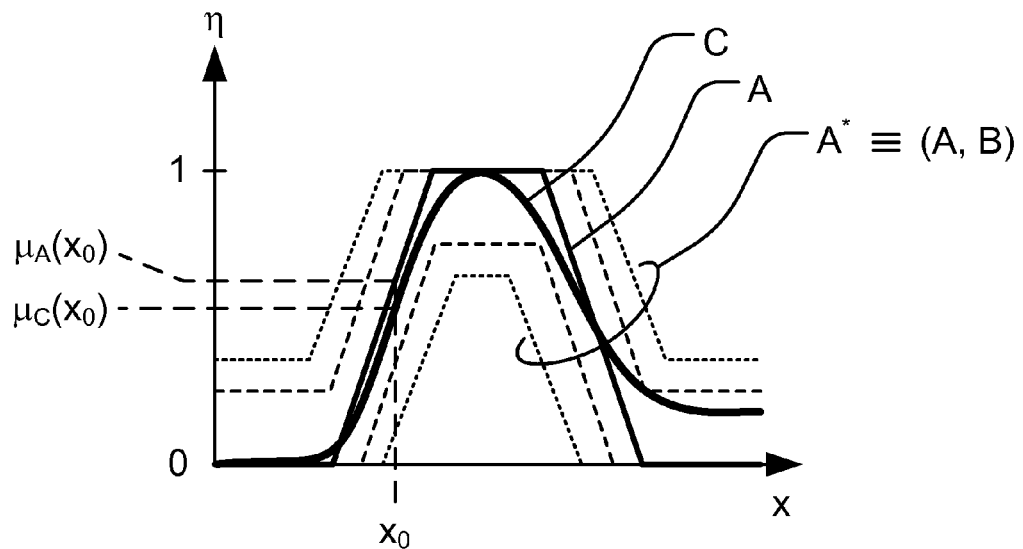
FIG. 26(a) depicts coverage of fuzzy map and a membership function, in one embodiment.
Figure 26B:
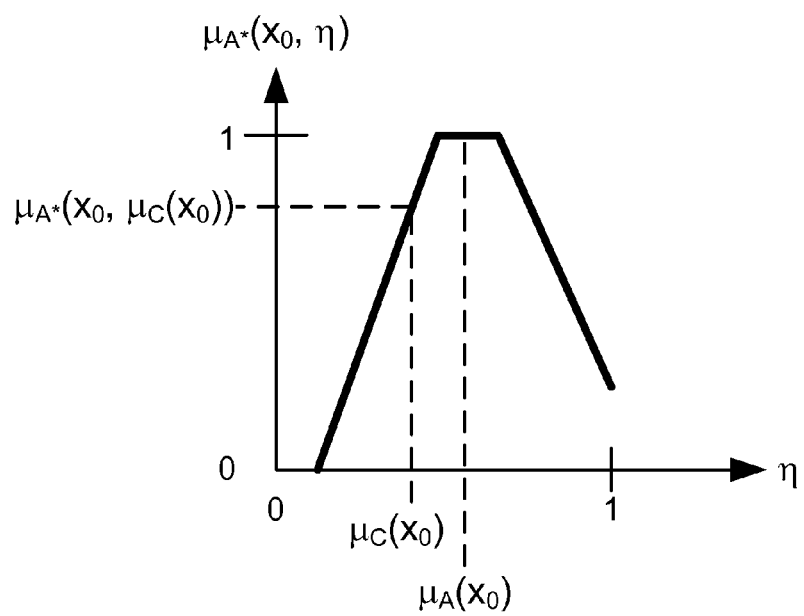
FIG. 26(b) depicts coverage of fuzzy map and a membership function at a cross section of fuzzy map, in one embodiment.

In one embodiment, as depicted in FIG. 26(a), "X is C" is evaluated against (A, B). Membership function of X in C is depicted as thick line (denoted as $\mu_C(X)$). In one embodiment, the degree in which C is consistent with (or satisfies restriction due) A* is determined by coverage of $\mu_{A*}(X, \eta)$ mapping on C. As an example, at $X=X_0$, the membership function of X in C has the value of $\mu_C(X_0)$. As depicted in FIG. 26(b), the possibility of such value in $\mu_{A*}(X, \eta)$ map is evaluated as $\mu_{A*}(X_0, \mu_C(X_0))$. In one embodiment, this is the degree in which C satisfies or is consistent with A* at $X_0$.

In one embodiment, as depicted in FIG. 26(b), $\mu_{A*}(X_0, \mu_C(X_0))$ is determined by determining the membership function of $\eta$ for a given X (i.e., $X_0$). In one embodiment, the membership function of $\eta$, i.e., $\mu_{A*}(X_0, \eta)$, is determined based on $\mu_A(X_0)$ and B (as for example shown in FIGS. 24 and 25).

In one embodiment, the consistency of "X is C" against (A, B) is evaluated based on the degree in which C satisfies or is consistent with A* at various values of X. In one embodiment, the lowest value of such degree is taken as the degree in which C satisfies (A, B):

$$\mu_{A*}(C) = \min_{\text{Overall } x \text{ in } R}(\mu_{A*}(x, \mu_C(x)))$$

In one embodiment, with $\mu_{A*}(X_0, \eta)$ expressed as $\mu_{\eta 0,B}(\eta)$, where $\eta_0$ is $\mu_A(X_0)$, $$\mu_{A*}(C) = \min_{\text{Overall } x \text{ in } R}(\mu_{\mu_A(x),B}(\mu_C(x)))$$

In one embodiment, the consistency of "X is C" against (A, B) is evaluated based on the degree in which C overall satisfies or is consistent with A* by taking an average or a weighted average of the consistency of C with A* over all X:

$$\mu_A \cdot (C) = \frac{1}{N} \int_{\text{Over all } x \text{ in } R} \mu_A * (x, \mu_C(x)) \cdot W(x) \cdot dx$$

where N is a normalization factor and W(x) is a weight factor. In one embodiment, W(x) is one for all X. In one embodiment, W(x) is a function of $\mu_A(X)$. In one embodiment, W(x) is high for low or high membership values of $\mu_A(X)$, and it is low for intermediate values of $\mu_A(X)$. The normalization factor is then:

$$N = \int_{\text{Over all } x \text{ in } R} W(x) \cdot dx$$

The above relationships may be expressed in sigma form instead of integral if X is a discrete type variable.

Figure 27:
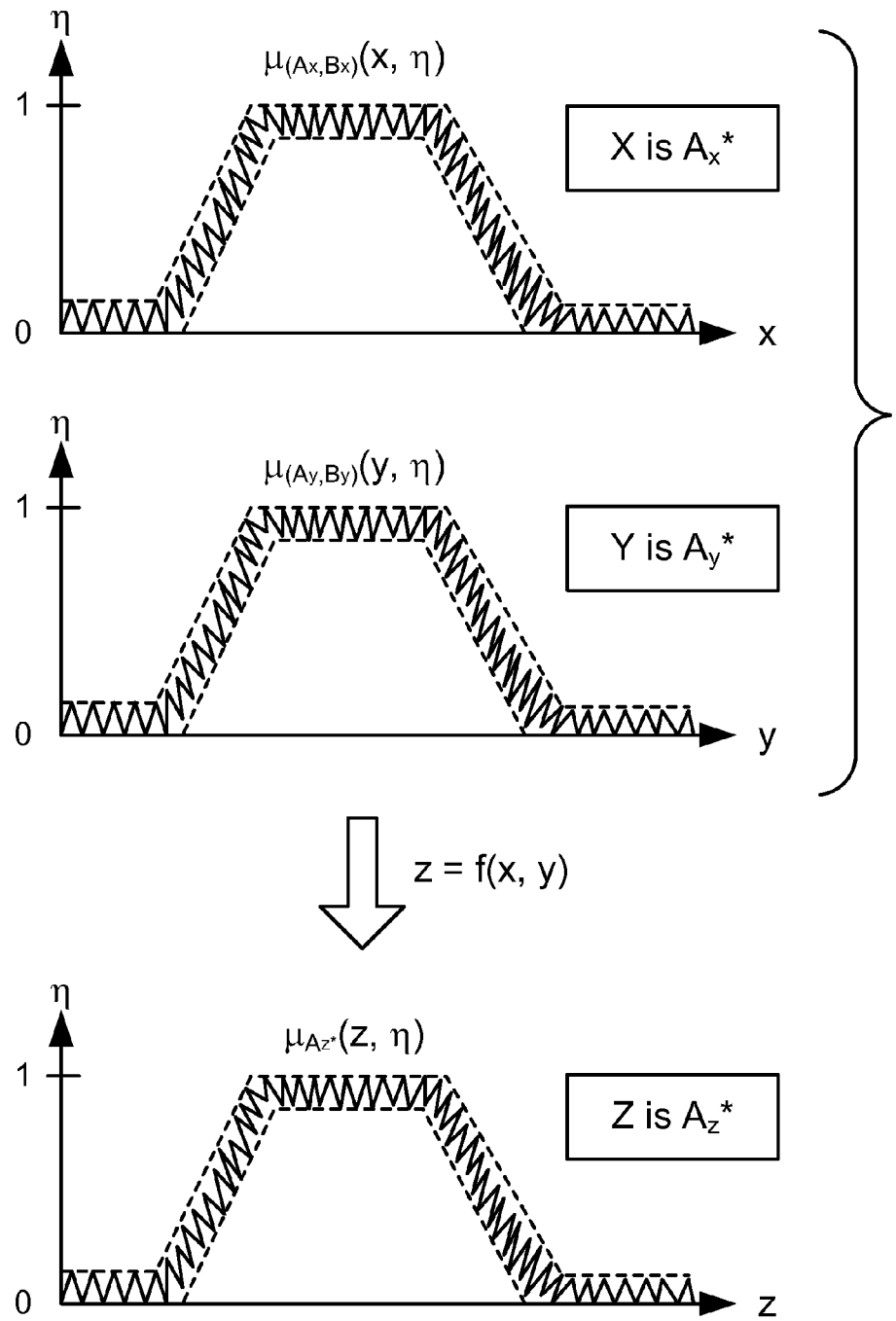
FIGS. 27 and 28(a) depict application of extension principle to fuzzy maps in functional dependence, in one embodiment.
Figure 28A:
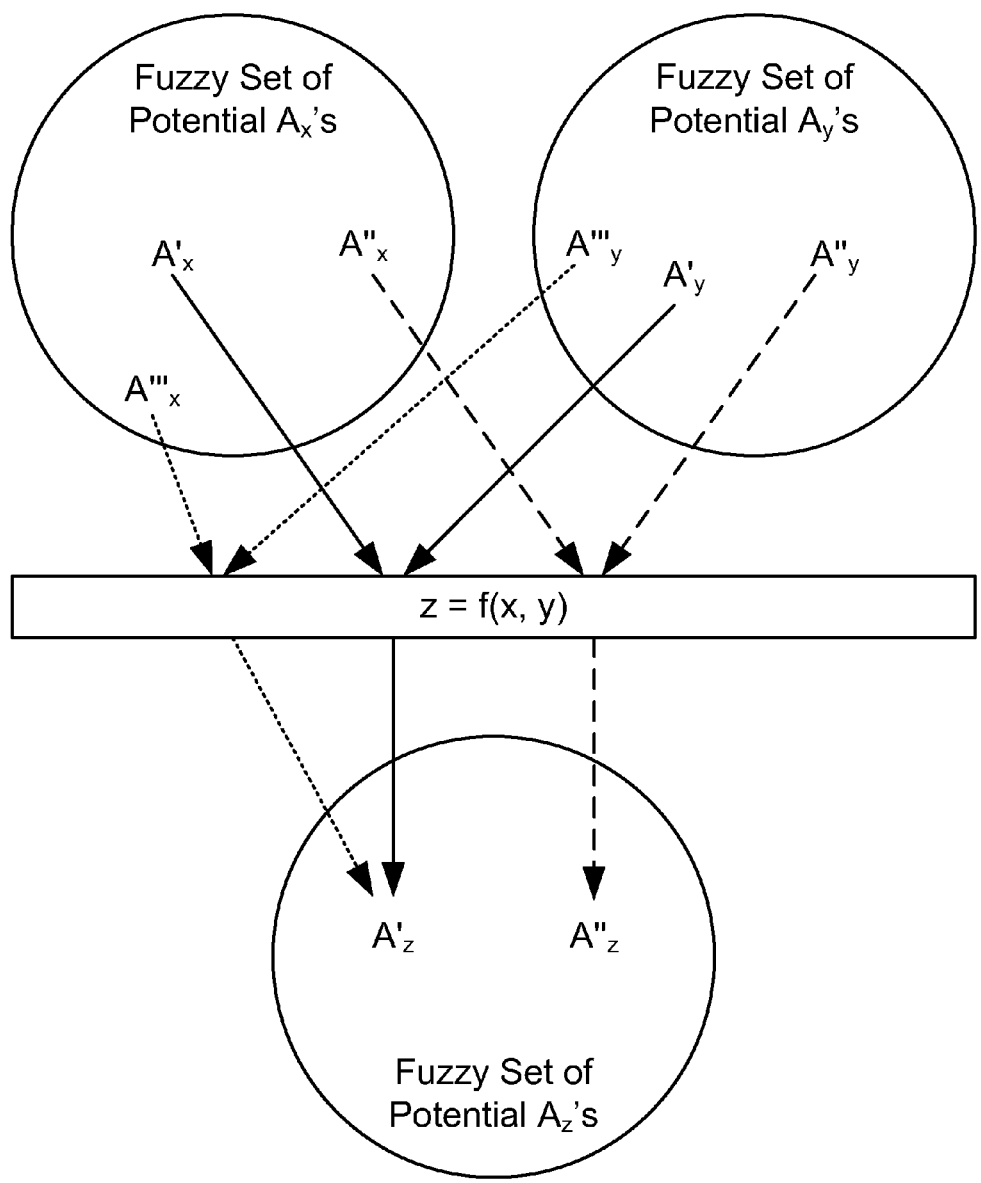

In one embodiment, as depicted in FIG. 27, two or more propositions are given, such as ($A_x$, $B_x$) and ($A_y$, $B_y$). A shorthand presentation of those propositions would be "X is $A_x$*" and "Y is $A_y$*", respectively. Given, a functional relation, such as Z=f(X, Y), in one embodiment, a fuzzy membership function for Z is determined, as depicted for example in FIG. 27. In one embodiment, as depicted in FIG. 28(a), fuzzy set $A_x$* has one or more possible membership functions in X, e.g., $A'_x$, $A''_x$, and $A'''_x$, and fuzzy set $A_y$* has one or more possible membership functions in Y, e.g., $A'_y$, $A''_y$, and $A'''_y$. In general, applying the functional relationship $f(X,Y)$, a possible membership function in Z may be obtained for each pair of membership functions in X and Y (e.g., $A''_x$ and $A''_y$). In one embodiment, the test score associated with the resulting membership function in Z (e.g., $A''_z$) is associated with the scores or membership values of $A''_x$ and $A''_y$ in $A_x*$ and $A_y*$, respectively:

$$ts(A''_Z) = \mu_{A_X^*}(A''_X) \wedge \mu_{A_Y^*}(A''_Y)$$

In one embodiment, multiple pairs of membership functions in X and Y may map to the same membership function in Z. For example as depicted in FIG. 28(a), ($A'_x$ and $A'_y$) and ($A'''_x$ and $A'''_y$) map to $A'_z$. In such an embodiment, the test score may be determined by:

$$ts(A'_Z) = \sup_{\forall A'_X, A'_Y} \mu_{A_X^*}(A'_X) \wedge \mu_{A_Y^*}(A'_Y)$$

subject to the possibility distribution of X and Y being $A'_x$ and $A'_y$, respectively, and $Z=f(X,Y)$, map to a possibility distribution of Z as $A'_z$.

Therefore, in an embodiment, possible membership functions of X and Y, belonging to fuzzy sets $A_x*$ and $A_y*$, are used to determine the corresponding membership functions of Z, with their degrees of membership in $A_z*$ determined via extension principle (from the degrees of membership of the possible membership functions of X and Y in fuzzy sets $A_x*$ and $A_y*$, respectively).

In one embodiment, the set of resulting membership functions of Z (e.g., $A'_z$) with their corresponding test score (e.g., $ts(A'_z)$) are used to setup a fuzzy map ($A_z*$) describing the membership function of Z:

$$\mu_{A_Z^*}(z, \eta) = \sup_{\forall A'_Z}(ts(A'_Z))$$

subject to $$\eta = \mu_{A'_Z}(z)$$

Figure 28B:
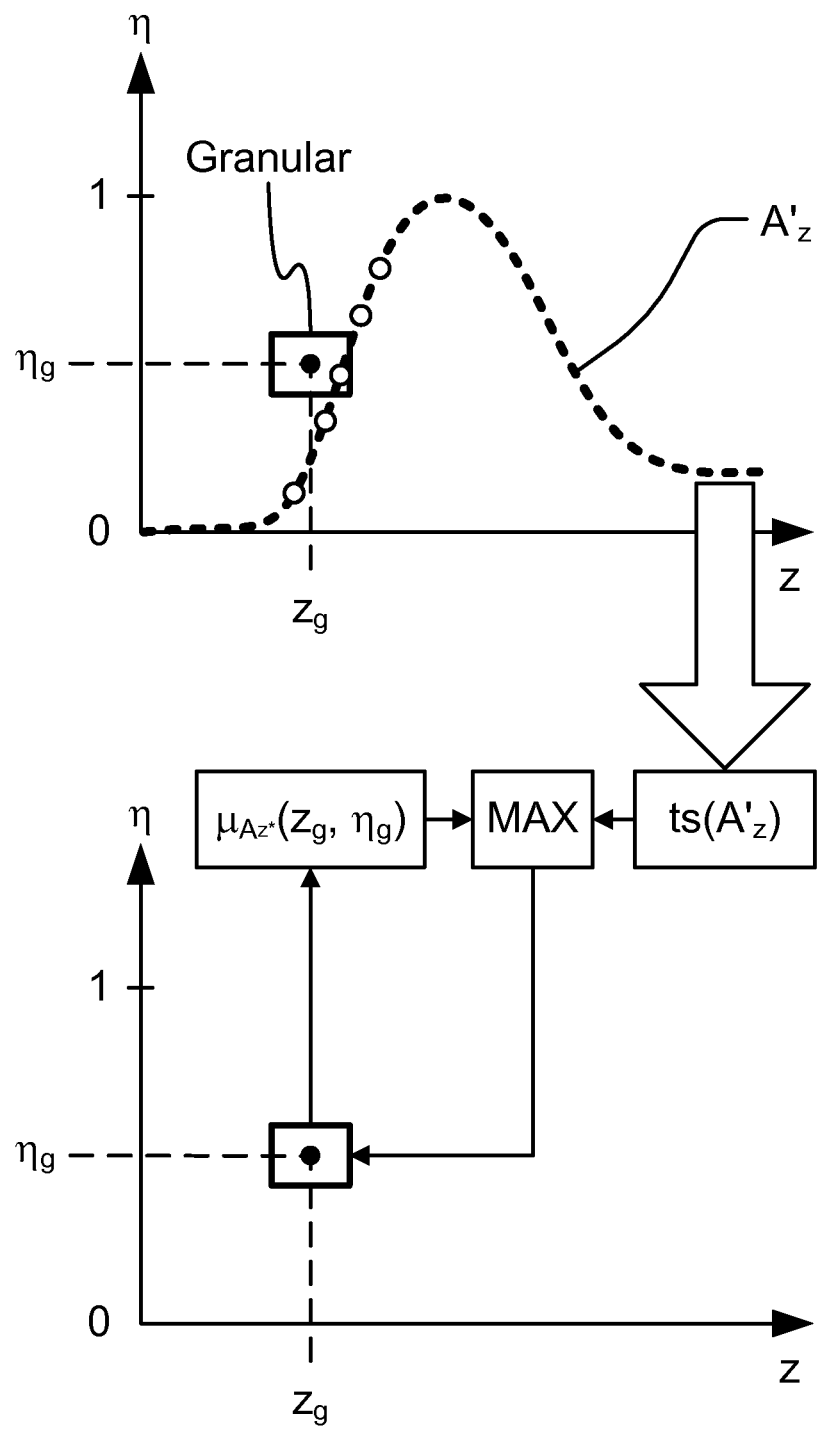
FIG. 28(b) depicts the determination of fuzzy map, in one embodiment.

In another words, in one embodiment, for all possible $A'_z$ passing through point $(z, \eta)$, the maximum corresponding test score is used to assign the fuzzy membership value of $A_z*$ for that point. In one embodiment, $A'_x$ and $A'_y$ candidates are iteratively used to determine the corresponding $A'_z$. Then, a corresponding test score for $A'_z$ is determined based on membership values of $A'_x$ and $A'_y$ candidates in $A_x*$ and $A_y*$, respectively. To drive the mapping $A_z*$, in one embodiment, $(z, \eta)$ plane is granulized into segments (e.g., pixels or granules). In one embodiment, as depicted in FIG. 28(b), each granularized segment of $(z, \eta)$ plane is represented by a point $(z_g, \eta_g)$, for example, a corner or a midpoint of the granularized segment. Then, $\mu_{A'_z}$ is evaluated at various granularized segments (e.g., by evaluating it at the representative point $z_g$, and determining $h_g$ as the granular containing $\mu_{A'_z}(z_g)$, and assigning $ts(A'_z)$ to $\mu_{A_z*}(z_g, \eta_g)$ if $ts(A'_z)$ larger than the current value of $\mu_{A_z*}(z_g, \eta_g)$. In one embodiment, at the conclusion of the iteration, $\mu_{A_z*}(z_g, \eta_g)$ estimates $\mu_{A_z*}(z, \eta)$. In one embodiment, $A'_z$ is presented by a discrete set of points or ranges in $(z, \eta)$ (as for example depicted in FIG. 28(b) by circles on $A'_z$ trace) and for each point/ranges, the corresponding $(z_g, \eta_g)$ granular is determined, and the test score contribution is imported, e.g., if larger than $(z_g, \eta_g)$ granular's current test score. In one embodiment, various size pixel or granular (e.g., both big and fine pixels) are used to monitor and evaluate the limits on iterations through candidate $A'_z$. In one embodiment, test scores are used as color (gray) scale assignment to each pixel/granular overriding a lower assigned test score to the granular.

In one embodiment, instead of taking the approach from candidate membership functions from X and Y domain to arrive at resulting membership function at Z domain, candidates are taken from X and Y domain themselves to arrive at Z domain directly. Where the membership functions in X and Y are crisp (e.g., $A_x$ and $A_y$), the resulting membership function in Z has the following form:

$$\mu_{A_Z}(z) = \sup_{\forall x', y'}(\mu_{A_X}(x') \wedge \mu_{A_Y}(y'))$$

subject to $z = f(x', y')$

When the membership functions in X and Y are themselves fuzzy (e.g., $A_x*$ and $A_y*$), the resulting map in Z domain, in one embodiment, is expressed as:

$$\mu_{A_Z^*}(z, \eta) = \sup_{\forall x', y'}\left(\sup_{\forall \eta', \eta''} \mu_{A_X^*}(x', \eta') \wedge \mu_{A_Y^*}(y', \eta'')\right)$$

Subject to $$\eta = \eta' \wedge \eta''$$

$$z = f(x', y')$$

Or alternatively expressed as:

$$\mu_{A_Z^*}(z, \eta) = \sup_{\forall \eta', \eta''}\left(\sup_{\forall x', y'} \mu_{A_X^*}(x', \eta') \wedge \mu_{A_Y^*}(y', \eta'')\right)$$

$$= \sup_{\forall x', y', \eta', \eta''} \mu_{A_X^*}(x', \eta') \wedge \mu_{A_Y^*}(y', \eta'')$$

Subject to $$\eta = \eta' \wedge \eta''$$

$$z = f(x', y')$$

Figure 28C:
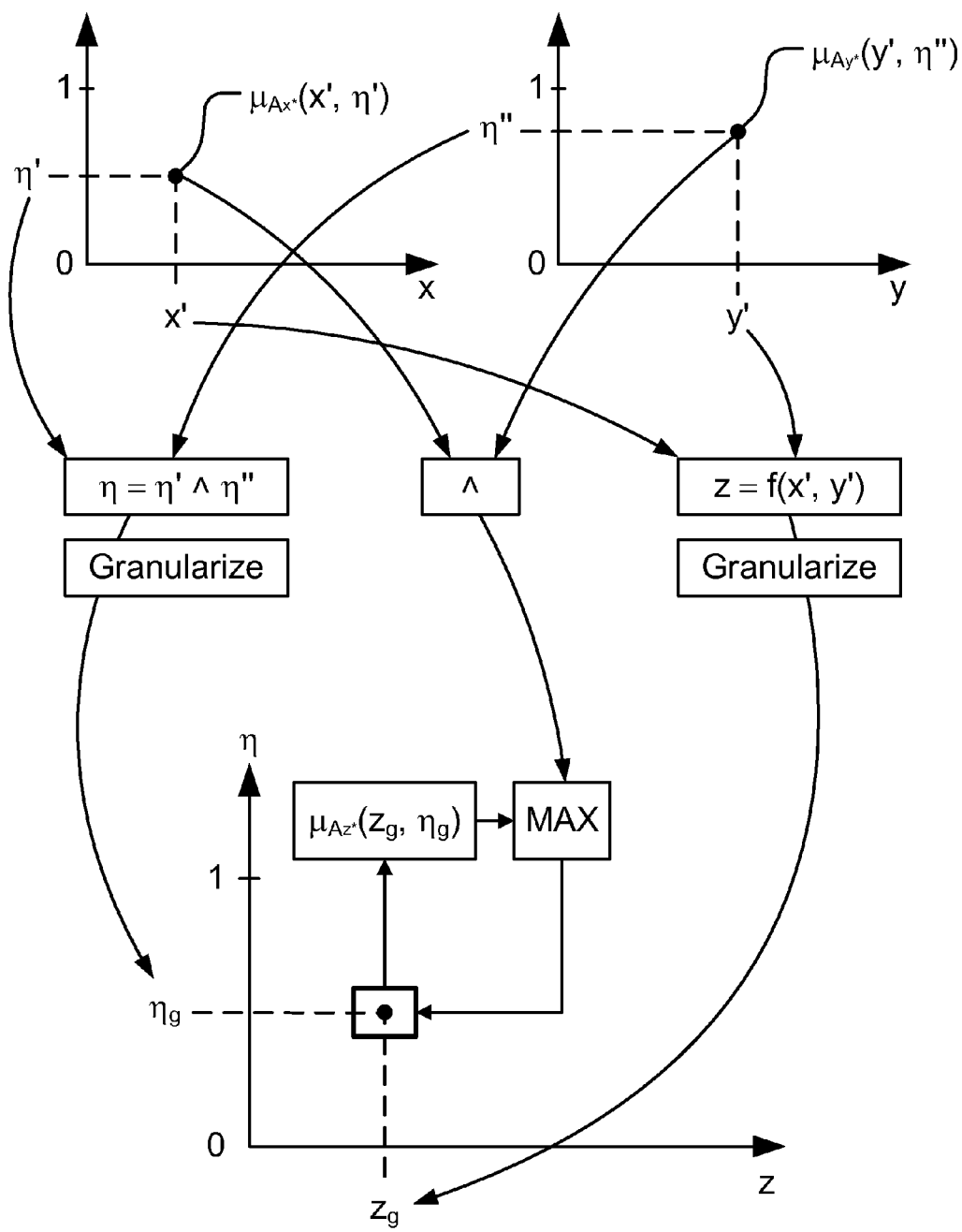
FIG. 28(c) depicts the determination of fuzzy map, in one embodiment.

In one embodiment, fuzzy maps in X and Y domains are scanned, and $\mu_{A_z*}(z, \eta)$ is determined by granularizing $(z, \eta)$ to $(z_g, \eta_g)$ as described above and illustrated in FIG. 28(c).

In one embodiment, the fuzzy map is derived based on candidate fuzzy sets in X and Y (each having same color/grayscale along its trace, e.g., based on color/grayscale contour of fuzzy maps $A_x*$ or $A_y*$) and/or using alpha-cut approach in membership functions of candidate fuzzy sets from $A_x*$ and/or $A_y*$ (e.g., explained in this disclosure) to derive candidate fuzzy sets and their associated color/grayscale representing $A_z*$ in Z.

In one embodiment, a derived fuzzy map, such as $A_z*$ mentioned above, is used to test consistency against a candidate $A_z$. Above, a method to derive the test score for such consistency was provided. In one embodiment, a fuzzy map based on such a candidate $A_z$ is used to determine the consistency of a pair $(A_z, B_z)$ against a derived map $A_z*$. In one embodiment, the confidence level $B_z$ is determined so that $(A_z, B_z)$ is a representative approximation of derived map $A_z*$.

Figure 29:
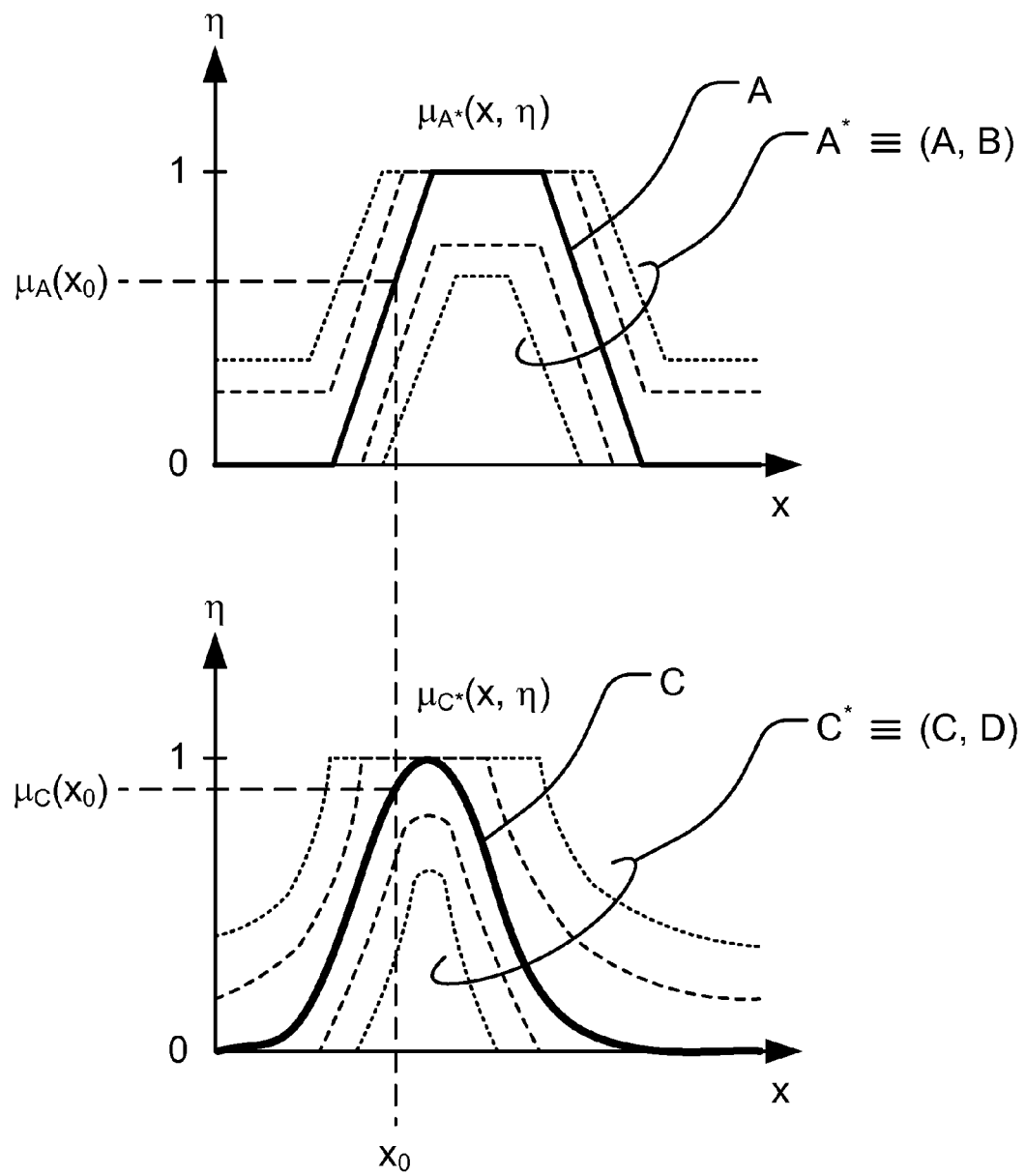
FIG. 29 depicts the determination parameters of fuzzy map, e.g., close fit and coverage, in one embodiment.

As depicted in FIG. 29 (which is using X instead of Z variable), in one embodiment, starting with a derived map $A_x^*$ (or calculated map from (A, B)), a candidate membership function of X in fuzzy set C is made fuzzy by D, to form another fuzzy map C*. In one embodiment, the consistency of C* against A* is determined. In one embodiment, D or a restriction on D is determined to make C* consistent with A*. In one embodiment, D or a restriction on D is determined to make C* consistent with or cover A*, while maintaining higher level of confidence for D.

In one embodiment, the fuzzy maps are compared for consistency over (x and η), e.g., by comparing color/gray scale at corresponding points/granular. In one embodiment, weight is assigned to such comparison where the color/gray scale difference or the possibility of such membership value in each map is large. In one embodiment, the test score comparison between fuzzy maps is determined by point-wise coverage (e.g., with weight). In one embodiment, a threshold or a fuzzy rule is used to get point-wise coverage degree through summation or integration over map or portion of the map (e.g., where A* is above a threshold).

In one embodiment, as for example depicted in FIG. 29, a candidate fuzzy set C is used with a parametric certainty measure D (e.g., $D=D(\alpha)$). In one embodiment, a model of (C, D) is used with various values of α to test the coverage over (A, B). In one embodiment, an optimization is used to optimize or select among various (e.g., candidate) C's by minimizing uncertainty level/values with respect to α. In one embodiment, coverage test score of C* over A* is treated as a constraint in an optimization engine, while coverage test score of A* over C* is used as an objective function.

Figure 30:
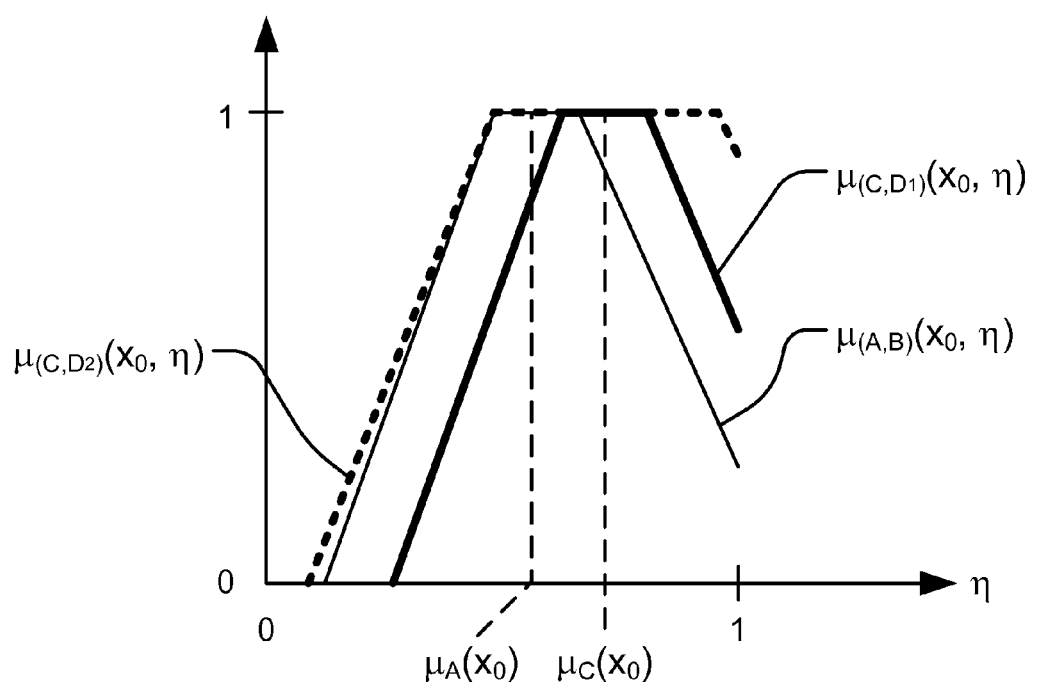
FIGS. 30 and 31 depict application of uncertainty variation to fuzzy maps and use of parametric uncertainty, in one embodiment.
Figure 31:
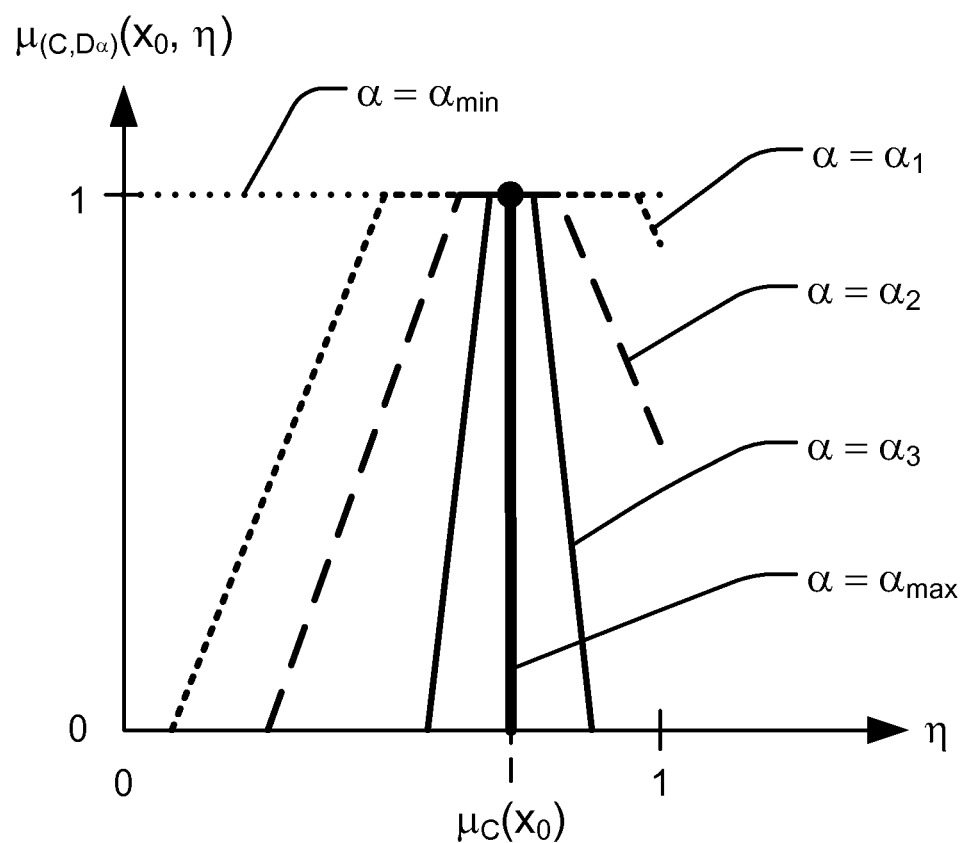
Figure 32:
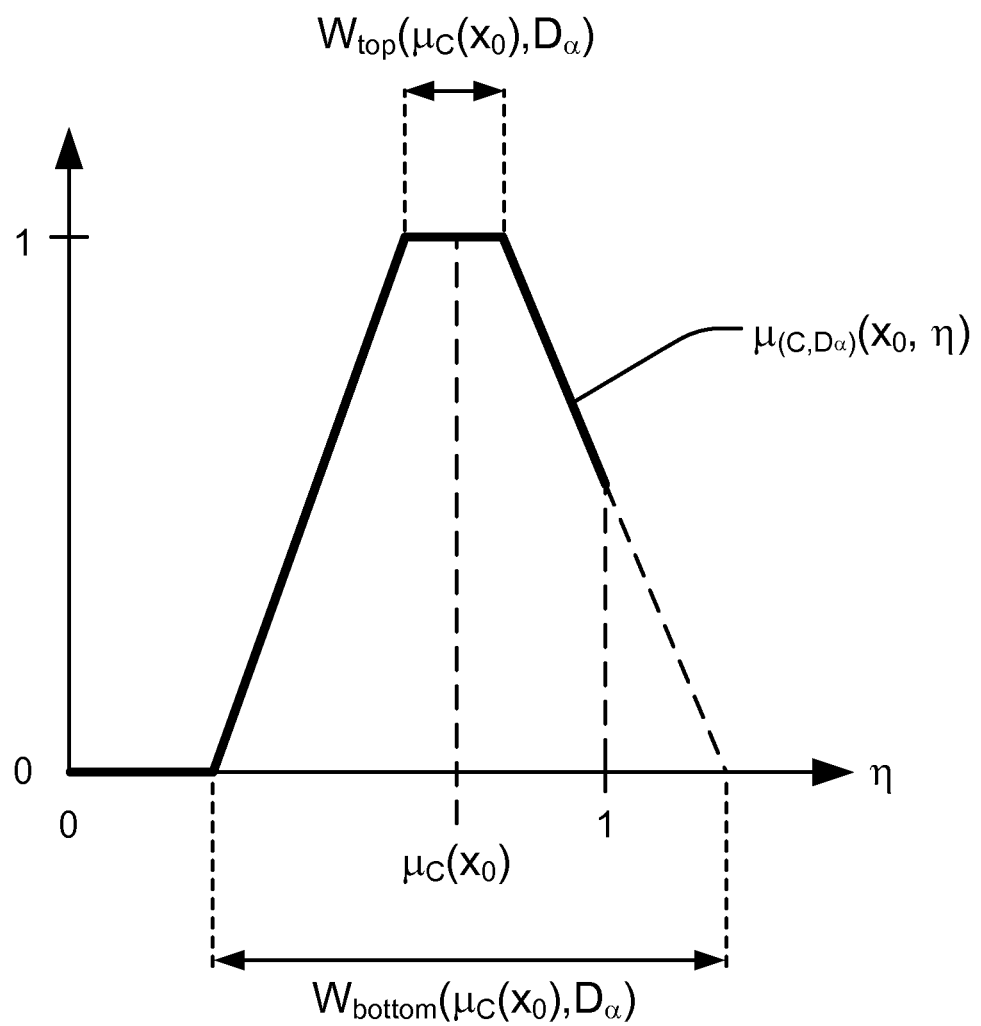
FIG. 32 depicts use of parametric uncertainty, in one embodiment.

In one embodiment, as depicted in FIG. 30, by varying D (e.g., by increasing uncertainty) from $D_1$ to $D_2$, the fuzzy map (at $x_0$ cross section) of $\mu_{(C, D2)}(x_0, \eta)$ (shown in dotted line) widens from $\mu_{(C, D1)}(x_0, \eta)$ (shown in solid thick line), to cover the fuzzy map of $\mu_{(A, B)}(x_0, \eta)$. In one embodiment, as shown in FIG. 30, when $\mu_C(x_0)$ does not coincide with $\mu_A(x_0)$, it would take larger degree of uncertainty (e.g., from $D_1$ to $D_2$) to cover the fuzzy map. In one embodiment, as for example depicted in FIG. 31, D is parameterized (e.g., by α indicating the level of certainty of D). The variation of the cross section of the fuzzy map $\mu_{(C, D\alpha)}(x_0, \eta)$, in one embodiment, is illustrated in FIG. 31, for various values of α (from $\alpha_{max}$ to $\alpha_{min}$). For example, in one embodiment, $\mu_C(x_0)$ at $\alpha_{max}$ while it becomes flat 1 at $\alpha_{min}$ (implying any membership function is possible at $x_0$). For example, in one embodiment, the core and support of fuzzy map cross section $\mu_{(C,D\alpha)}(x_0, \eta)$ is determined based on parameter α, using for example the model database and the context. For example, in one embodiment, as depicted in FIG. 32, the width of core and support of the fuzzy map cross section $\mu_{(C,D\alpha)}(x_0, \eta)$ and how they get clipped at limits of 0 and 1, are determined by $D_\alpha$ and $\mu_C(x_0)$. In such an embodiment, two values of x having the same $\mu_C(x)$ values will result in the same fuzzy map cross section as shown for example in FIG. 32.

Figure 33A:
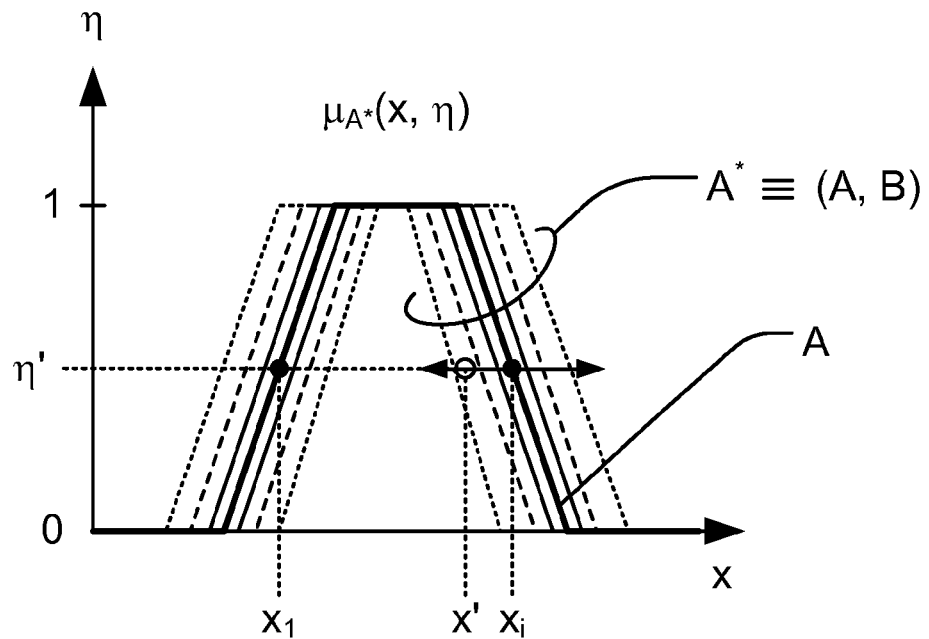
FIGS. 33(a)-(b) depict laterally/horizontally fuzzied map, in one embodiment.
Figure 33B:
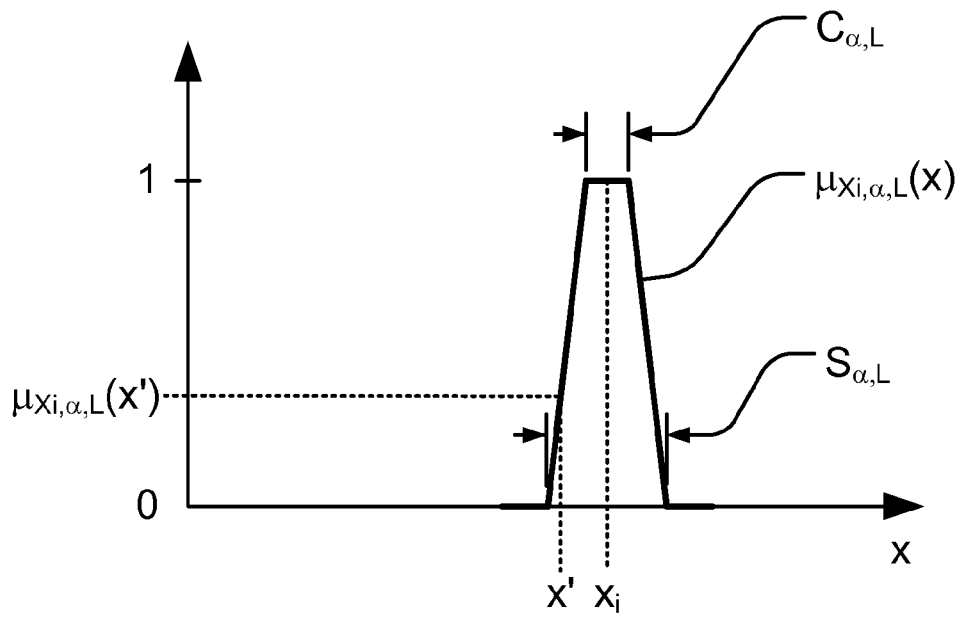

In one embodiment, as depicted in FIG. 22(a), a fuzzy map A* is constructed by lateral fuzziness of A by an amount determined by B. In one embodiment, as depicted in FIG. 33(a), the possibility of membership value at (x', η'), denoted by $\mu_{A^*}(x', \eta')$ is determined by the location of the set of x values denoted by $\{x_i\}$ where $\mu_A(x_i)$ is η'. For example, as depicted in FIG. 33(a), $x_1$ and $x_i$ belong to this set as they have the same membership function value (i.e., η') in A. In one embodiment, $\mu_{A^*}(x', \eta')$ is determined by the location of $\{x_i\}$ and B. In one embodiment, the characteristics of B is made parametric, e.g., $B=B(\alpha)$, where α (e.g., [0, 1]) represents the degree of sureness or certainty of B. In one embodiment, $\mu_{A^*}(x', \eta')$ is determined by the contributions from each x in $\{x_i\}$. In one embodiment, the contribution of possibility of membership value to $\mu_A^*(x', \eta')$ from $x_i$ is determined by a model (e.g., trapezoid or triangular) based on $x_i$ and B (or α). In one embodiment, as depicted in FIG. 33(b), the contribution of $x_i$ is represented by a fuzzy set (denoted $\mu_{xi,\alpha,L}(x)$), where L is a characteristics obtained from or dependent on the context of X domain (or A). For example, as depicted in FIG. 33(b), the trapezoid model around $x_i$, has a core and support (denoted as $C_{\alpha,L}$ and $S_{\alpha,L}$, respectively) which are dependent on the characteristic length (in X domain) and severity of α. Given α and $x_i$, $\mu_{xi,\alpha,L}(x)$ is constructed or determined and the contribution at x' is determined by $\mu_{xi,\alpha,L}(x')$, as depicted in FIG. 33(b). Therefore, in one embodiment, the fuzzy map is determined as:

$$\mu_{A^*}(x', \eta') = \sup_{\forall x_i \in \{x_k | \eta' = \mu_A(x_k)\}} (\mu_{x_i,\alpha,L}(x'))$$

In one embodiment, $C_{\alpha,L}$ and $S_{\alpha,L}$ are further dependant on $x_i$ or $\mu_A(x_i)$.

Figure 34:
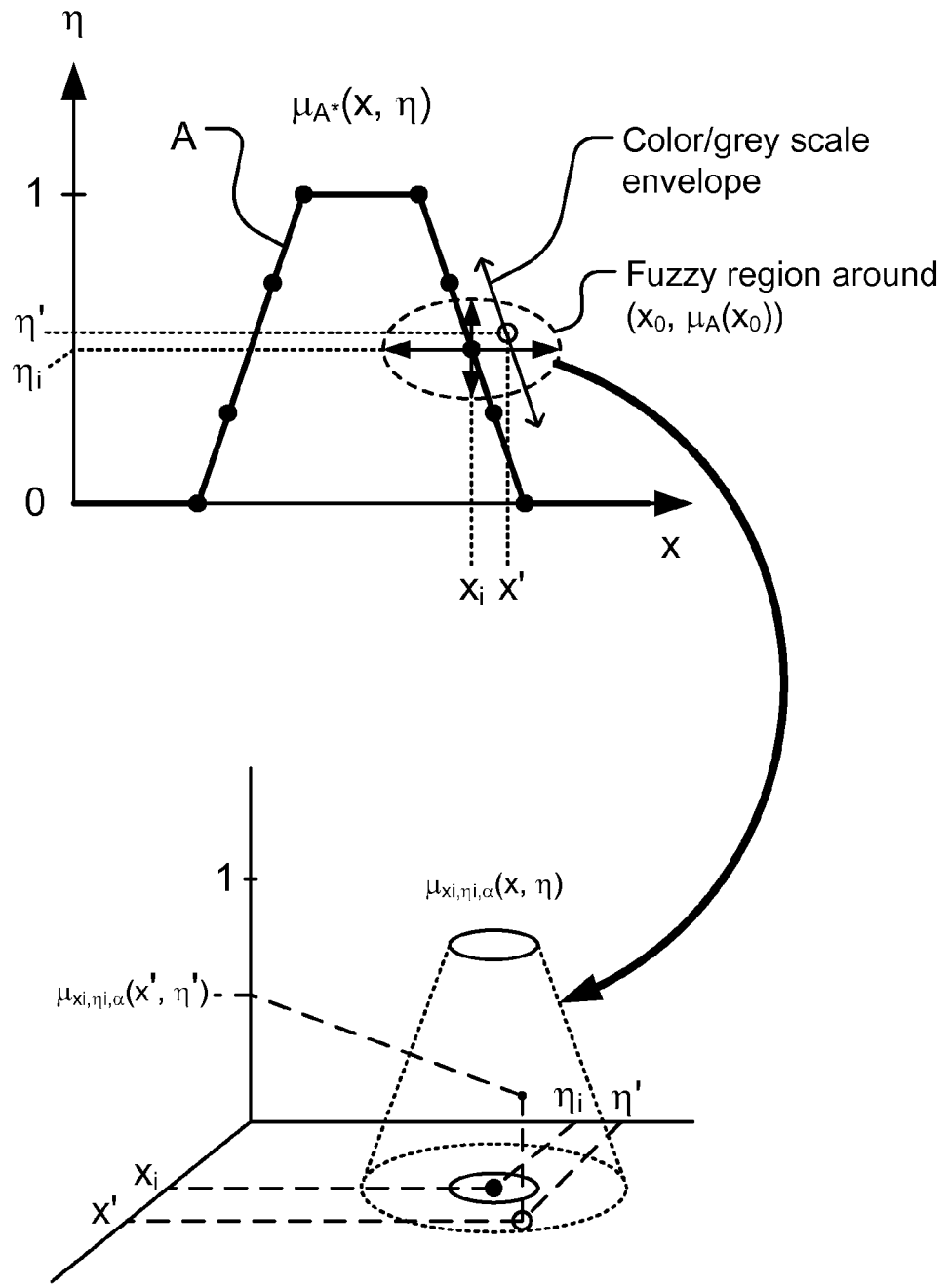
FIG. 34 depicts laterally and vertically fuzzied map, in one embodiment.

In one embodiment, a fuzzy map A* is constructed by both lateral and vertical fuzziness of A by an amount determined by B. In one embodiment, for example as depicted in FIG. 34, a fuzzy region around a set of points, e.g., $(x_i, \mu_A(x_i))$ on trace of $\mu_A(x)$, is used to determine $\mu_{A^*}(x', \eta')$. In one embodiment, such a fuzzy region describes a color/grey scale region about $(x_i, \mu_A(x_i))$ based on the certainty level of B. In one embodiment, B is parameterized, e.g., $B=B(\alpha)$, and value of α is used to determine the extent of the fuzzy region denoted by $(\mu_{xi, \eta i,\alpha}(x, \eta))$ for a given point $(x_i, \eta_i)$ on trace of $\mu_A(x)$. In one embodiment, $\mu_{A^*}(x', \eta')$ is determined as follows:

$$\mu_{A^*}(x', \eta') = \sup_{\forall (x_i, \eta_i) \text{ subject to } \eta_i = \mu_A(x_i)} (\mu_{x_i,\eta_i,\alpha}(x', \eta'))$$

In one embodiment, the fuzzy region $\mu_{xi, \eta i,\alpha}(x, \eta)$ is selected to decouple (x, η) into vertical and horizontal fuzzy components, e.g.:

$$\mu_{x_i,\eta_i,\alpha}(x',\eta') = \mu_{Lat,x_i,\eta_i,\alpha}(x') \wedge \mu_{Ver,x_i,\eta_i,\alpha}(\eta')$$

In one embodiment, the above test is limited to set of signature points (e.g., defining the corners of $\mu_{Ax}$, or certain pre-defined values of η). In such an embodiment, color/grey scale contours (e.g., convex) are determined to envelope neighboring (x', η') points having the same assigned $\mu_{A^*}(X', \eta')$ value. The envelopes are then assigned the common color/grey scale value of $\mu_{A^*}(x',\eta')$. In one embodiment, these envelops of contours define $\mu_{A^*}(x, \eta)$.

EXAMPLE 5

In one embodiment, a fuzzy rules engine employs a fuzzy rule with A* at its antecedent. E.g.:

IF (X is A*) THEN (Y is C), where $A^*=(A_X,B_Y)$.

Figure 35A:
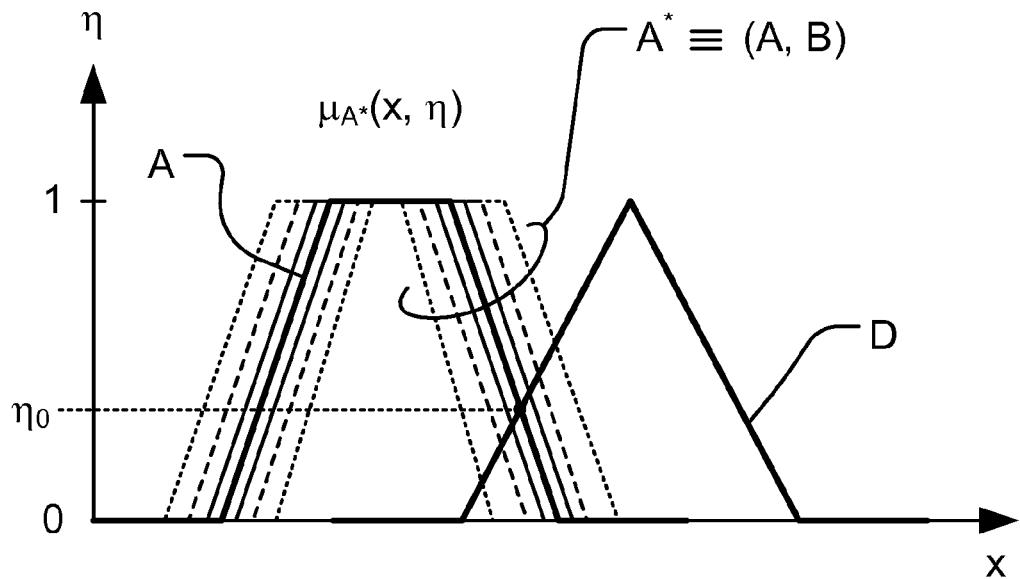
FIG. 35(a)-(d) depict determination of a truth value in predicate of a fuzzy rule involving a fuzzy map, in one embodiment.
Figure 35B:
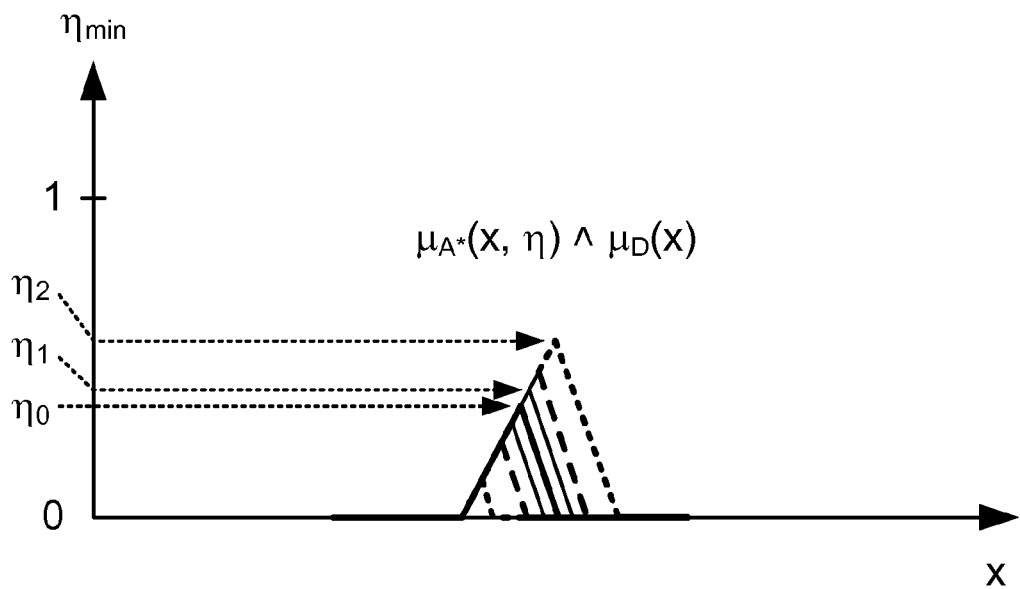
Figure 35C:
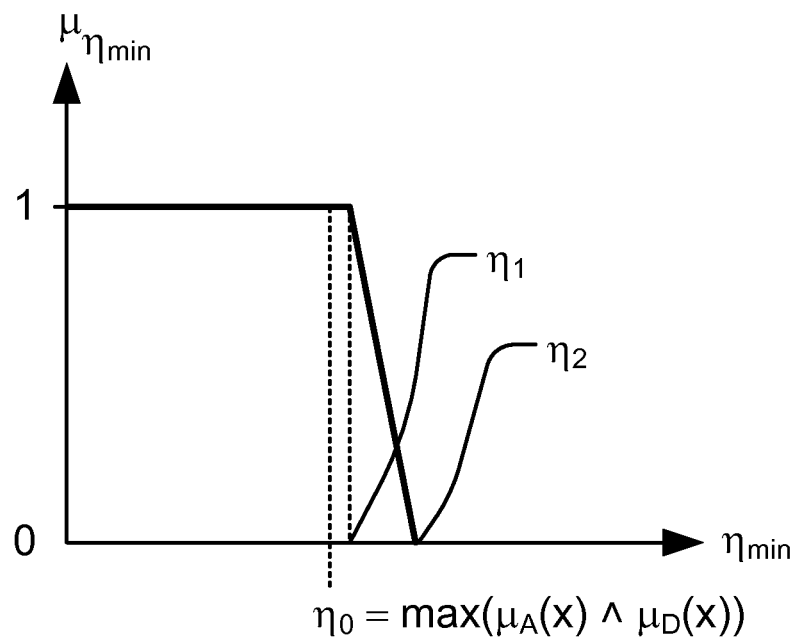

In one embodiment, an input proposition, e.g., X is D, is used to evaluate the truth value ($T_{ant}$) of the rule's antecedent. In one embodiment, $T_{ant}$ is determined based on the coverage of A* against D, such as a test score. In one embodiment, $T_{ant}$ is determined from $(\mu_{A^*} \hat{} \mu_D)$, as illustrated in FIGS. 35(a)-(d). As depicted in FIG. 35(a), $\max(\mu_A \hat{} \mu_D)$ occurs at $\eta_0$. To determine $(\mu_{A^*} \hat{} \mu_D)$, in one embodiment, at various x values, such as x', possible η values (in [0, 1]) and $\mu_D(x')$ are compared for minimum (with the result denoted as $\eta_{min}$). In one embodiment, this result is given the weight of $\max((\mu_{A*}(x', \eta)\hat{}\eta_D(x'))$ subject to $\min(\eta, \mu_D(x'))=\eta_{min}$. This result/weight is a fuzzy map in $(x, \eta_{min})$ domain, as for example depicted in FIG. 35(b), representing $(\mu_{A*}\hat{}\mu_D)$. In one embodiment, max $(\mu_{A*}\hat{}\mu_D)$ is used as the truth value of the antecedent. Note that in special case of extreme sureness for $B_x$, $T_{ant}$ is $\eta_0$ (or $\max(\mu_A\hat{}\mu_D)$). In one embodiment, based on $(\mu_{A*}\hat{}\mu_D)$, for various $\eta_{min}$ values, their corresponding degree of possibility (denoted as $\mu_{\eta min}$) are determined, as depicted for example in FIG. 35(c). For special case of $(\mu_A\hat{}\mu_D)$, such $\mu_{\eta min}$ possibility becomes a crisp set with an edge at $\eta_0$. However, due to $(\mu_{A*}\hat{}\mu_D)$ fuzzy map, the edge of $\mu_{\eta min}$ is fuzzy (ramping at $\eta_1$ to $\eta_2$) and also extended to higher values (i.e., $\eta_2$ instead of $\eta_0$, if for example, the core of A* fuzziness has non-zero width). In one embodiment, $T_{ant}$ is determined by taking maximum of $\eta_{min}$, as for example depicted in FIG. 35(d). In this example, the maximum $\eta_{min}$ has a possibility distribution (denoted as $\mu_{max(\eta min)}$) starting up at $\eta_1$ and ramping down at $\eta_2$.

Figure 35D:
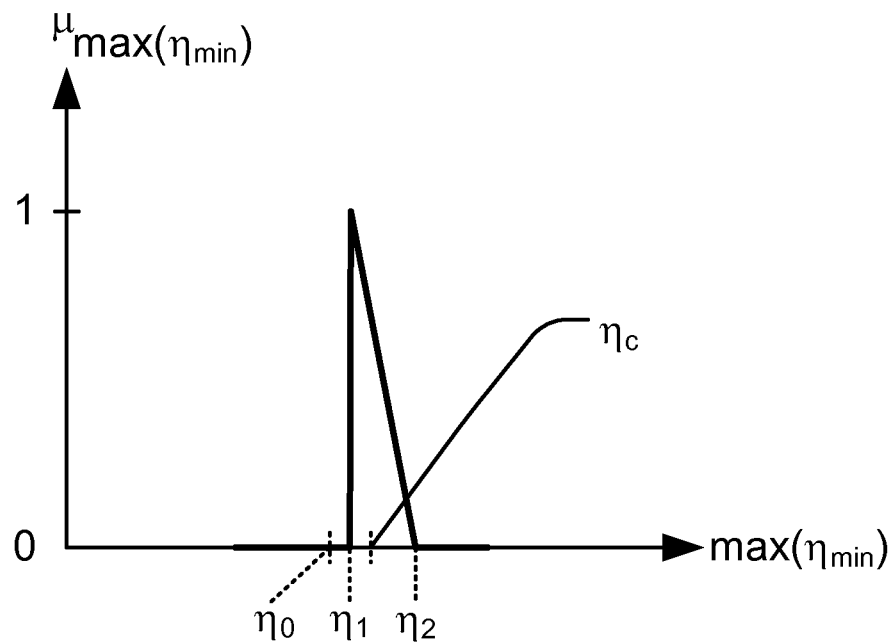

In one embodiment, a centroid location of $\mu_{max(\eta min)}$ (depicted as $\eta_c$ in FIG. 35(d)) is taken as $T_{ant}$. In one embodiment, a defuzzied value of $\mu_{max(\eta min)}$ (e.g., $\eta_1$) is taken as $T_{ant}$. In one embodiment, the fuzzy set $\mu_{max(\eta min)}$ is used directly to impact the truth value of the consequent, e.g., by fuzzy clipping of fuzzy scaling of the consequent's corresponding membership function.

Generalization of Some of the Concepts (a) Apparent Confidence of a Speaker

For example, let's start from the following statement: "Event A is very rare". Let's consider the following situation: Person B (a source of information, or the speaker, or the writer) says: "Event A is very rare, and I am sure about it". In this example, the word "rare" signifies the statistical frequency of the event A happening. "Being sure about the statement above" indicates the "apparent" confidence of the speaker (person B). In this case, the degree of the "apparent confidence of the speaker" is high. Please note that this is just the "apparent" confidence of the speaker, and it may not be the "real" confidence of the speaker, due to the parameters mentioned below, such as speaker's truthfulness (which can make the apparent confidence different from the real confidence of the speaker).

In one model, the degree of the apparent confidence of the speaker is set between 0 and 1, as a normalized axis (or scale), for example, corresponding to zero (minimum) apparent confidence of the speaker level and maximum apparent confidence of the speaker level, respectively.

Please note that sometimes, the speaker only says "Event A is very rare.", and he does not mention "and I think it is true." in his statement. However, a listener may conclude that the speaker meant to say that "Event A is very rare, and I think it is true.", which may be understood from the context of the statement by the speaker.

(b) Speaker's Truthfulness

In one embodiment, person B (the speaker) might have a bias or bad faith, or may be a liar (e.g. for the statement "Event A is very rare."). For example, he may lie very often, or he may lie often only on a specific subject or in a specific context. Or, we may have a history of lies coming from person B (as a source of information). In all of these cases, the person B "intentionally" twists his own belief, when he expresses his statement verbally or in writing. Of course, if his own belief is false (in the first place), the end result (his twisted statement) may become valid or partially valid, anyway. Thus, for any speaker who is biased, has a bad faith, or is a liar, the degree of the "speaker's truthfulness" is low. The degree of the "speaker's truthfulness" is usually hidden or unknown to the listener or reader.

In one model, the degree of the truthfulness of the speaker is set between 0 and 1, as a normalized axis (or scale), for example, corresponding to zero (minimum) and maximum truthfulness of the speaker levels, respectively. For example, 0 and 1 correspond to the always-"liar" and always-"not-liar" speakers, respectively.

Please note that the "truthfulness of a statement" is different from the "truthfulness of a speaker".

(c) Expertise of the Speaker

Another factor is the degree of expertise or knowledge of a person about a subject (or how well a person can analyze the data received on a given subject, or how well a person can express the ideas and conclusions to others using the right language and phrases). For example, if the event A is about astronomy and the speaker has low or no knowledge about astronomy, then the "degree of expertise of the speaker" (or source of information) is low. In one model, the degree of the expertise of the speaker is set between 0 and 1, or 0 to 100 percent, as a normalized axis (or scale), for example, corresponding to zero (minimum) and maximum expertise levels, respectively.

(d) Perception of the Speaker

Another factor is the degree of "perception of the speaker" about an event or subject. For example, a person with a weak eye sight (and without eyeglasses) cannot be a good witness for a visual observation of an event from a far distance, for example as a witness in a court. In one model, the degree of the perception of the speaker is set between 0 and 1, as a normalized axis (or scale), for example, corresponding to zero (minimum) and maximum levels, respectively.

(e) Trustworthiness of a Speaker

Now, here is a new parameter, the "trustworthiness of a speaker", which depends on at least the 4 factors mentioned above:

1—the degree of the "apparent confidence of the speaker"
2—the degree of the "speaker's truthfulness"
3—the degree of "expertise of the speaker"
4—the degree of "perception of the speaker"

Figure 43:
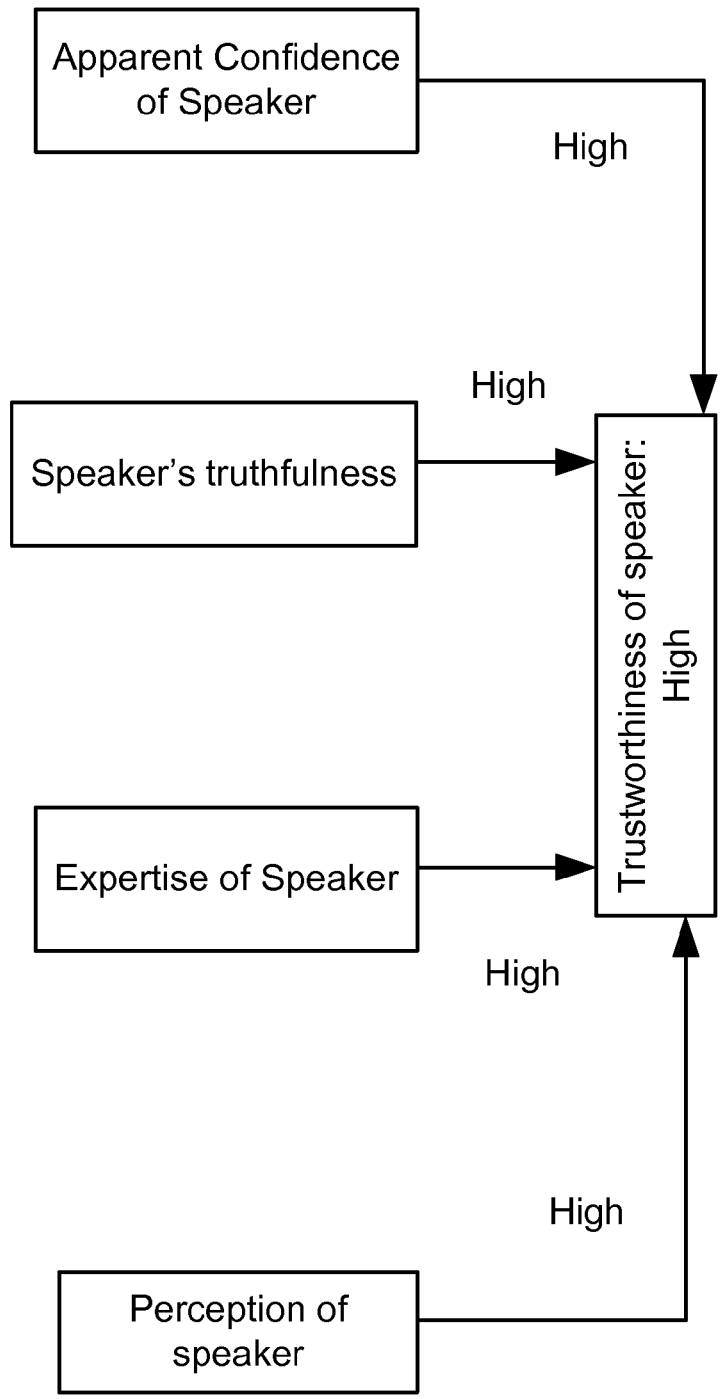
FIG. 43 shows a case in which the trustworthiness of a speaker is high (or the speaker is "trustworthy").

For example, as shown in FIG. 43, the trustworthiness of a speaker is high (or the speaker is "trustworthy"), if:

1—the degree of the "apparent confidence of the speaker" is high &
2—the degree of the "speaker's truthfulness" is high &
3—the degree of "expertise of the speaker" is high &
4—the degree of "perception of the speaker" is high In one model, the degree of the "trustworthiness" of a speaker is set between 0 and 1, as a normalized axis (or scale), for example, corresponding to zero (or minimum) and maximum trustworthiness levels, respectively.

Please note that, in some situations, the "apparent confidence of the speaker" may become dependent or intertwined on the statement itself or one of the other parameters mentioned above, e.g. the "perception of the speaker".

(f) Sureness of a Speaker

Similarly, here is another parameter, the "sureness" of a speaker, which depends on at least the 4 factors mentioned above:

1—the degree of the "apparent confidence of the speaker"
2—the degree of the "speaker's truthfulness"
3—the degree of "expertise of the speaker"
4—the degree of "perception of the speaker"

Figure 44:
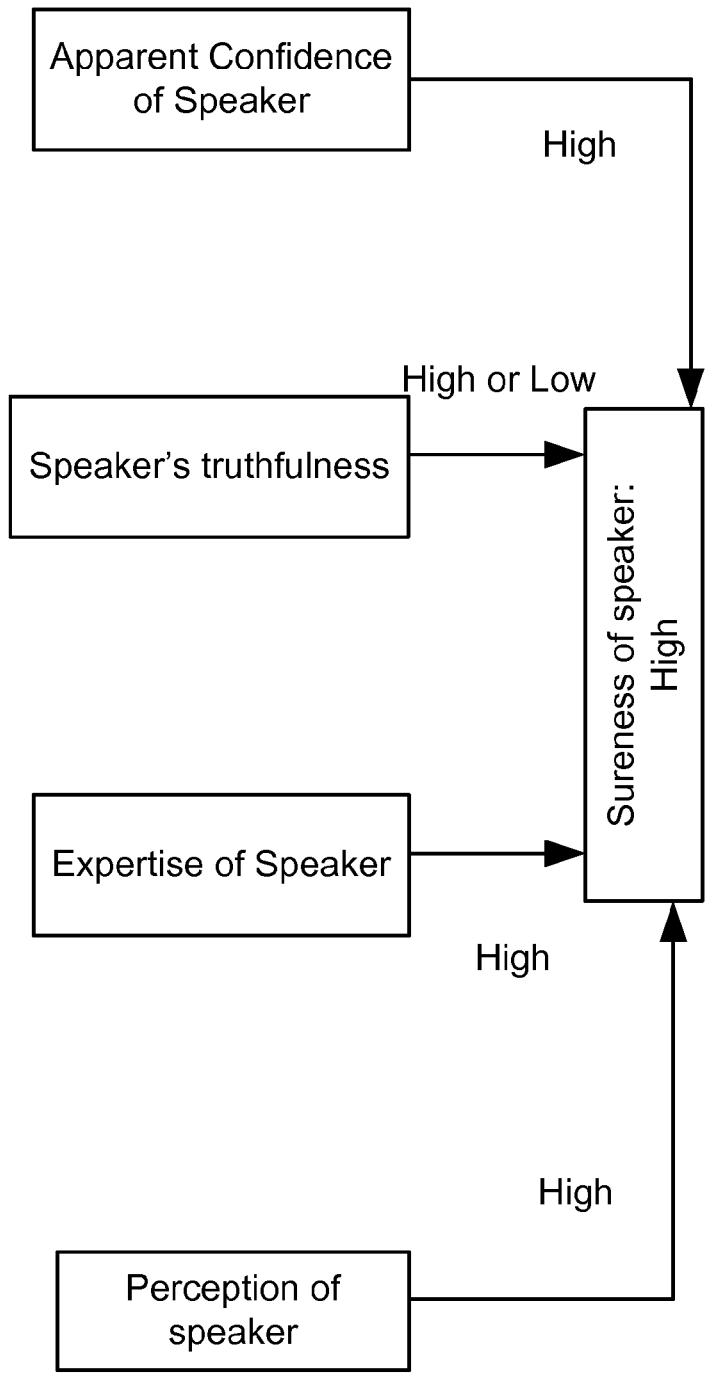
FIG. 44 shows a case in which the "sureness" of a speaker of a statement is high.

For example, as shown in FIG. 44, the "sureness" of a speaker of a statement is high, if:

1—the degree of the "apparent confidence of the speaker" is high &

2—the degree of the "speaker's truthfulness" is either high or low (but not medium) (i.e. when speaker's truthfulness is close to either 1 or 0, but away from 0.5) &

3—the degree of "expertise of the speaker" is high &

4—the degree of "perception of the speaker" is high

In one model, the degree of the "sureness of a speaker" of a statement is set between 0 and 1, as a normalized axis (or scale), for example, corresponding to zero (or minimum) and maximum sureness levels, respectively.

Please note that in our definitions here, there is a difference between the "sureness" and "trustworthiness" (of a speaker). For example, a speaker may have low trustworthiness, but has a high sureness. For example, for an always-liar speaker (i.e. when the speaker's degree of truthfulness is 0), the speaker has a low trustworthiness (for the listener), but has a high level of sureness. That is, for an always-liar speaker (i.e. not "trustworthy"), the conclusion from a statement becomes the reverse of the original statement, which means that the speaker has a high level of sureness (for the listener). For example, for an always-liar speaker, the statement "Event A is very rare" results in the following conclusion for the listener: "Event A is not very rare". That is, once the listener knows (or has the knowledge) that the speaker is an always-liar speaker, the listener can still "count on" the "reverse" of the statement given by the speaker (with a high degree of "sureness").

In another example, for a speaker that "sometimes lies" (i.e. a "sometimes-liar", with the speaker's degree of truthfulness around 0.5), the "sureness" about the speaker is low.

(g) Broadness of a Statement

Now, let's look at another factor, "the degree of the broadness of the statement", with some examples. For example, in response to the question that "What is the color of the table?", the statement "The color of the table may be green, blue, or red." has higher degree of broadness than that of the statement "The color of the table is green.", with respect to the information about the color of the table.

For example, in response to the question that "When does the meeting start today?", the statement "The meeting may start in the next few hours." has higher degree of broadness than that of the statement "The meeting starts at 10 am.", with respect to the information about the starting time of the meeting.

In one model, the degree of the "broadness" of a statement is set between 0 and 1, as a normalized axis (or scale), for example, corresponding to zero (or minimum) and maximum (or 100 percent) broadness levels, respectively.

(h) Helpfulness of a Statement

Now, let's look at another parameter, the degree of "helpfulness" (for a statement (for a listener or reader)), which depends on at least the following 2 parameters:

1—the degree of the "sureness of the speaker" of the statement

2—the degree of "broadness of the statement"

The degree of "helpfulness of a statement" is one measure of the information of a statement (for a listener or reader or the recipient of information), which is very contextual (e.g. dependent on the question asked).

Figure 45:
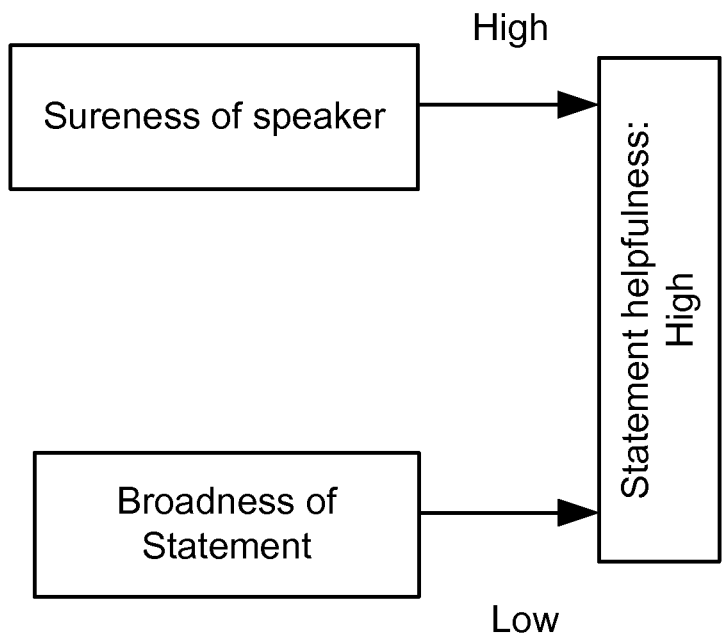
FIG. 45 shows a case in which the degree of "helpfulness" for a statement (or information or data) is high (or the statement is "helpful").

For example, as shown in FIG. 45, the degree of "helpfulness" for a statement (or information or data) is high (or the statement is "helpful"), if:

1—the degree of the "sureness of the speaker" of the statement is high &

2—the degree of the "broadness of the statement" is low (i.e. the statement is very "specific").

In one model, the degree of the "helpfulness" of a statement is set between 0 and 1, as a normalized axis (or scale), for example, corresponding to zero (or minimum) and maximum helpfulness levels, respectively. The degree of the "helpfulness" of a statement or information (I) is denoted by function H(I).

Please note that all the parameters above (e.g. the degree of the helpfulness) can also be expressed by percentages between 0 to 100 percent (or by any other scale, instead of scale of 0 to 1, respectively). The parameters above (e.g. the degree of the helpfulness) can be expressed by Fuzzy representations, as well.

Applications

The parameters above are useful for situations that one gets input or information from one or more sources, and one wants to evaluate, filter, sort, rank, data-mine, validate, score, combine, find and remove or isolate contradictions, conclude, simplify, find and delete or isolate redundancies, criticize, analyze, summarize, or highlight a collection of multiple information pieces or data, from multiple sources with various levels of reliability, credibility, reputation, weight, risk, risk-to-benefit ratio, scoring, statistics, or past performance.

For example, these parameters are useful for editors of an article (such as Wikipedia, with various writers with various levels of credibility, knowledge, and bias), search engines in a database or on Internet (with information coming various sources, with different levels of confidence or credibility), economy or stock market prediction (based on different parameter inputs or opinions of different analysts, and various political, natural, and economical events), background check for security for people (based on multiple inputs from various sources and people, each with different credibility and security risk), medical doctors' opinions or diagnosis (based on doctors with various expertise and experience, information from various articles and books, and data from various measurements and equipment), booking flights and hotel online (with information from various web sites and travel agents, each with different reliability and confidence), an auction web site (with different seller's credibility, reliability, history, and scoring by other users), customize and purchase a computer online (with different pricing and seller's credibility, reliability, history, and scoring by other users), customer feedback (with various credibility), voting on an issue (with various bias), data mining (from various sources with different credibility and weight), and news gathering (from multiple sources of news, on TV or Internet, with various reliability and weight).

Figure 46:
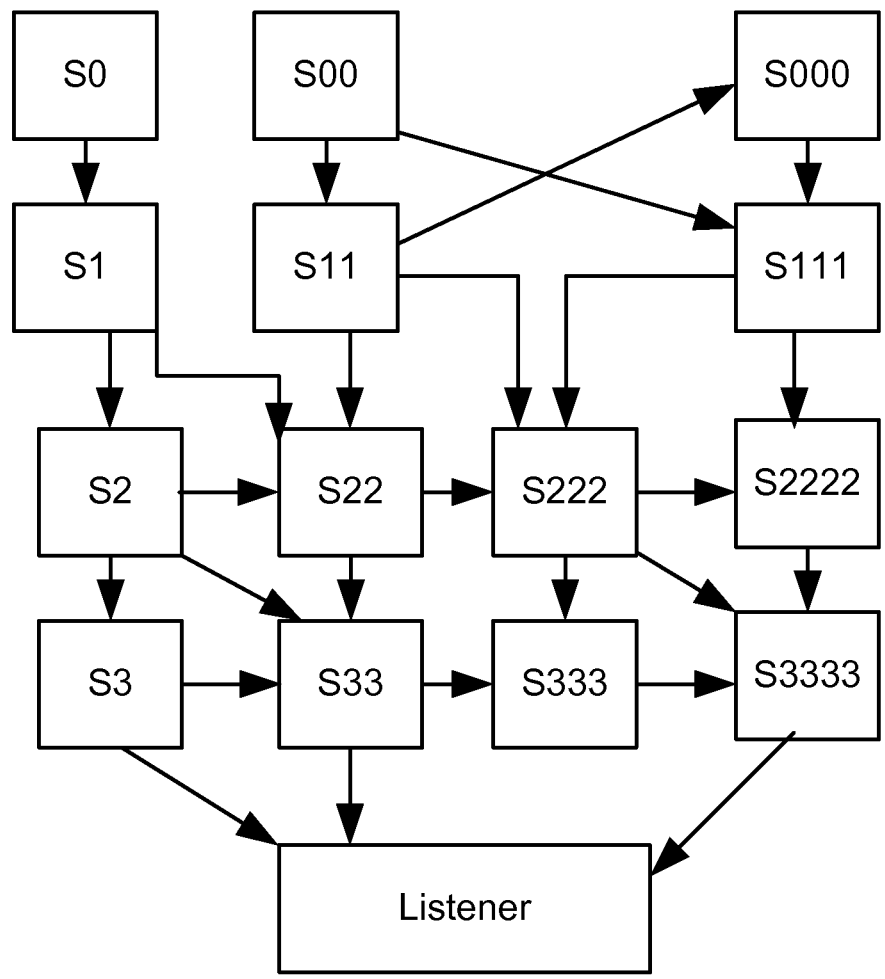
FIG. 46 shows a listener which or who listens to multiple sources of information or data, cascaded or chained together, supplying information to each other.

In one embodiment, an information source (S) may get its input or information from one or more other sources. In one embodiment, there is a network of other sources, connected in parallel or in series, or in combinations or mixtures of other sources in different configurations. In one embodiment, the information source S0 supplies some information to another information source S1, in a cascade of sources (with each source acting as a node in the structure), e.g. in a tree, pyramid, or hierarchical configuration (with many branches interconnected), where a listener gathers all the information from different sources and analyzes them to make a conclusion from all the information received, as shown in FIG. 46, as an example. The listener itself (in turn) can be a source of information for others (not shown in FIG. 46).

Thus, the overall reliability and the overall credibility of the system (or other parameters describing the system) depends on (is a function of) the components, or the chain of sources in the relevant branch(es), going back to the source(s) of information. That is, for the overall reliability, R, we have:

$$R = \text{Function}(R_{S0}, R_{S1}, \ldots, R_{Sm}),$$

for m sources in the chain, starting from S0.

In one embodiment, for a source of information, when it comes through a cascade or chain of sources, the weakest link dominates the result. For example, the most unreliable link or source determines or dominates the overall reliability. In one embodiment, this can be modeled based on the MINIMUM function for reliability values for multiple sources. In one embodiment, this can be based on the AND function between the values. In one embodiment, this can be based on the additions on inverse values, e.g.:

$$(1/R)=(1/R_1)+(1/R_2)+\ldots+(1/R_N)$$

(with R as the overall reliability, and $R_N$ as the reliability for source N)

In one embodiment, the sources are independent sources. In one embodiment, the sources are dependent sources (dependent on each other).

One of the advantages of the fuzzy analysis mentioned here in this disclosure is that the system can handle contradictory and duplicative information, to sort them out and make a conclusion from various inputs.

In one embodiment, the information can go through a source as a conduit, only (with no changes made on the received information by the source, itself). In another embodiment, the information can be generated, analyzed, and/or modified by the source, based on all the inputs to the source, and/or based on the source's own knowledge base (or database) and processor (or CPU, controller, analyzing module, computer, or microprocessor, to analyze, edit, modify, convert, mix, combine, conclude, summarize, or process the data).

In one embodiment, the source of information has time-dependent parameters. For example, the credibility or reliability of the source changes over time (with respect to a specific subject or all subjects). Or, the bias of the source may change for a specific topic or subject, as the time passes. For example, a news blog, newspaper, radio show, radio host, TV show, TV news, or Internet source may have a predetermined bias or tendency toward a specific party, political idea, social agenda, or economic agenda, which may change due to the new management, owner, or host.

Search Engines and Question-Answering Systems

This section is a part of a paper by the inventor on the subject of search engines, titled "From search engines to question answering systems", appeared in "Fuzzy logic and semantic web", edited by Elie Sanchez, 2006, Elsevier B. V. publisher, Chapter 9, pages 163-210.

For one embodiment, for search engines or question-answering systems, one of the main goals is the deduction capability—the capability to synthesize an answer to a query by drawing on bodies of information which reside in various parts of the knowledge base. By definition, a question-answering system, or Q/A system for short, is a system which has deduction capability. The first obstacle is world knowledge—the knowledge which humans acquire through experience, communication and education. Simple examples are: "Icy roads are slippery," "Princeton usually means Princeton University," "Paris is the capital of France," and "There are no honest politicians." World knowledge plays a central role in search, assessment of relevance and deduction.

The problem with world knowledge is that much of it is perception-based. Perceptions—and especially perceptions of probabilities—are intrinsically imprecise, reflecting the fact that human sensory organs, and ultimately the brain, have a bounded ability to resolve detail and store information. Imprecision of perceptions stands in the way of using conventional techniques—techniques which are based on bivalent logic and probability theory—to deal with perception-based information. A further complication is that much of world knowledge is negative knowledge in the sense that it relates to what is impossible and/or non-existent. For example, "A person cannot have two fathers," and "Netherlands has no mountains."

The second obstacle centers on the concept of relevance. There is an extensive literature on relevance, and every search engine deals with relevance in its own way, some at a high level of sophistication. There are two kinds of relevance: (a) question relevance and (b) topic relevance. Both are matters of degree. For example, on a very basic level, if the question is q: Number of cars in California? and the available information is p: Population of California is 37,000,000, then what is the degree of relevance of p to q? Another example: To what degree is a paper entitled "A New Approach to Natural Language Understanding" of relevance to the topic of machine translation.

Basically, there are two ways of approaching assessment of relevance: (a) semantic; and (b) statistical. To illustrate, in the number of cars example, relevance of p to q is a matter of semantics and world knowledge. In existing search engines, relevance is largely a matter of statistics, involving counts of links and words, with little if any consideration of semantics. Assessment of semantic relevance presents difficult problems whose solutions lie beyond the reach of bivalent logic and probability theory. What should be noted is that assessment of topic relevance is more amendable to the use of statistical techniques, which explains why existing search engines are much better at assessment of topic relevance than question relevance.

The third obstacle is deduction from perception-based information. As a basic example, assume that the question is q: What is the average height of Swedes?, and the available information is p: Most adult Swedes are tall. Another example is: Usually Robert returns from work at about 6 pm. What is the probability that Robert is home at about 6:15 pm? Neither bivalent logic nor probability theory provide effective tools for dealing with problems of this type. The difficulty is centered on deduction from premises which are both uncertain and imprecise.

Underlying the problems of world knowledge, relevance, and deduction is a very basic problem—the problem of natural language understanding. Much of world knowledge and web knowledge is expressed in a natural language. A natural language is basically a system for describing perceptions. Since perceptions are intrinsically imprecise, so are natural languages, especially in the realm of semantics.

A prerequisite to mechanization of question-answering is mechanization of natural language understanding, and a prerequisite to mechanization of natural language understanding is precisiation of meaning of concepts and proposition drawn from a natural language. To deal effectively with world knowledge, relevance, deduction and precisiation, new tools are needed. The principal new tools are: Precisiated Natural Language (PNL); Protoform Theory (PFT); and the Generalized Theory of Uncertainty (GTU). These tools are drawn from fuzzy logic—a logic in which everything is, or is allowed to be, a matter of degree.

The centerpiece of new tools is the concept of a generalized constraint. The importance of the concept of a generalized constraint derives from the fact that in PNL and GTU it serves as a basis for generalizing the universally accepted view that information is statistical in nature. More specifically, the point of departure in PNL and GTU is the fundamental premise that, in general, information is representable as a system of generalized constraints, with statistical information constituting a special case. Thus, much more general view of information is needed to deal effectively with world knowledge, relevance, deduction, precisiation and related problems. Therefore, a quantum jump in search engine IQ cannot be achieved through the use of methods based on bivalent logic and probability theory.

Deduction capability is a very important capability which the current search engines generally have not fully developed, yet. What should be noted, however, is that there are many widely used special purpose Q/A systems which have limited deduction capability. Examples of such systems are driving direction systems, reservation systems, diagnostic systems and specialized expert systems, especially in the domain of medicine.

It is of historical interest to note that question-answering systems were an object of considerable attention in the early seventies. The literature abounded with papers dealing with them. Interest in question-answering systems dwindled in the early eighties, when it became obvious that AI was not advanced enough to provide the needed tools and technology. In recent years, significant progress toward enhancement of web intelligence has been achieved through the use of concepts and techniques related to the Semantic Web, OWL, CYC and other approaches. But such approaches, based on bivalent logic and probability theory, cannot do the job. The reason, which is not widely recognized as yet, is that bivalent logic and bivalent-logic-based probability theory have intrinsic limitations. To circumvent these limitations what are needed are new tools based on fuzzy logic and fuzzy-logic-based probability theory. What distinguishes fuzzy logic from standard logical systems is that in fuzzy logic everything is, or is allowed to be graduated, that is, be a matter of degree. Furthermore, in fuzzy logic everything is allowed to be granulated, with a granule being a clump of values drawn together by indistinguishability, similarity or proximity. It is these fundamental features of fuzzy logic that give it a far greater power to deal with problems related to web intelligence than standard tools based on bivalent logic and probability theory. An analogy to this is: In general, a valid model of a nonlinear system cannot be constructed through the use of linear components.

There are three major obstacles to upgrading a search engine to a question-answering system: (a) the problem of world knowledge; (b) the problem of relevance; and (c) the underlying problem of mechanization of natural language understanding and, in particular, the basic problem of precisiation of meaning Since the issues to be discussed are not restricted to web-related problems, our discussion will be general in nature.

The Problem of World Knowledge

World knowledge is the knowledge which humans acquire through experience, education and communication. Simple examples are:

Few professors are rich
There are no honest politicians
It is not likely to rain in San Francisco in midsummer
Most adult Swedes are tall
There are no mountains in Holland
Usually Princeton means Princeton University
Paris is the capital of France
In Europe, the child-bearing age ranges from about sixteen to about forty-two The problem with world knowledge is that much of it is perception-based. Examples:

Most adult Swedes are tall
Most adult Swedes are much taller than most adult Italians
Usually a large house costs more than a small house
There are no honest politicians Perception-based knowledge is intrinsically imprecise, reflecting the bounded ability of sensory organs, and ultimately the brain, to resolve detail and store information. More specifically, perception-based knowledge is f-granular in the sense that (a) the boundaries of perceived classes are unsharp (fuzzy); and (b) the values of perceived attributes are imprecise (fuzzy). Bivalent-logic-based approaches provide no methods for deduction from perception-based knowledge. For example, given the datum: Most adult Swedes are tall, existing bivalent-logic-based methods cannot be employed to come up with valid answers to the questions q1: How many adult Swedes are short; and q2: What is the average height of adult Swedes?

The Problem of Relevance

The importance of the concept of relevance is hard to exaggerate. Relevance is central to search. Indeed, the initial success of Google is due, in large measure, to its simple but ingenious page ranking algorithm for assessment of relevance. Despite its importance, there are no satisfactory definitions of relevance in the literature.

In fact, it may be argued that, as in the case of world knowledge, the concept of relevance is much too complex to lend itself to treatment within the limited conceptual framework of bivalent logic and bivalent-logic-based probability theory. An immediate problem is that relevance is not a bivalent concept. Relevance is a matter of degree, that is, it is a fuzzy concept. To define fuzzy concepts, what is needed is the conceptual structure of fuzzy logic. As was stated earlier, in fuzzy logic everything is, or is allowed to be, a matter of degree.

For concreteness, it is convenient to define a relevance function, $R(q/p)$, as a function in which the first argument, q, is a question or a topic; the second argument, p, is a proposition, topic, document, web page or a collection of such objects; and R is the degree to which p is relevant to q. When q is a question, computation of $R(q/p)$ involves an assessment of the degree of relevance of p to q, with p playing the role of question-relevant information. For example, if q: What is the number of cars in California, and p: Population of California is 37 million, then p is question-relevant to q in the sense that p constrains, albeit imprecisely, the number of cars in California. The constraint is a function of world knowledge.

If q is a topic, e.g., q: Ontology, then a document entitled p: What is ontology?, is of obvious relevance to q, i.e., p is topic-relevant. The problem in both cases is that of assessment of degree of relevance. Basically, what we need is a method of computing the degree of relevance based on the meaning of q and p, that is, we need semantic relevance. Existing search engines have a very limited capability to deal with semantic relevance. Instead, what they use is what may be called statistical relevance. In statistical relevance, what is used is, in the main, statistics of links and counts of words. Performance of statistical methods of assessment of relevance is unreliable.

A major source of difficulty in assessment of relevance relates to non-compositionality of the relevance function. More specifically, assume that we have a question, q, and two propositions p and r. Can the value of $R(q/p, r)$ be composed from the values of $R(q/p)$ and $R(q/r)$? The answer, in general, is: No. As a simple, not web-related, example, suppose that q: How old is Vera; p: Vera's age is the same as Irene's; r: Irene is 65. In this case, $R(q/p)=0$; $R(q/r)=0$ and yet $R(q/p, r)=1$. What this implies is that, in general, relevance cannot be assessed in isolation. This suggests a need for differentiation between relevance and what may be called i-relevance, that is, relevance in isolation. In other words, a proposition, p, is i-relevant if it is relevant by itself, and it is i-irrelevant if it is not of relevance by itself, but might be relevant in combination with other propositions.

The Problem of Precisiation of Meaning—a Prerequisite to Mechanization of Natural Language Understanding Much of world knowledge and web knowledge is expressed in a natural language. This is why issues relating to natural language understanding and natural language reasoning are of direct relevance to search and, even more so, to question-answering.

Humans have no difficulty in understanding natural language, but machines have many. One basic problem is that of imprecision of meaning A human can understand an instruction such as "Take a few steps," but a machine cannot. To execute this instruction, a machine needs a precisiation of "few." Precisiation of propositions drawn from a natural language is the province of PNL (Precisiated Natural Language). A forerunner of PNL is PRUF. In PNL, precisiation is interpreted as meaning precisiation, rather than value precisiation. A proposition is precisiated through translation into the Generalized Constraint Language (GCL). An element of GCL which precisiates p is referred to as a precisiand of p, GC(p), with GC(p) representing a generalized constraint. A precisiand may be viewed as a model of meaning.

Figure 4:
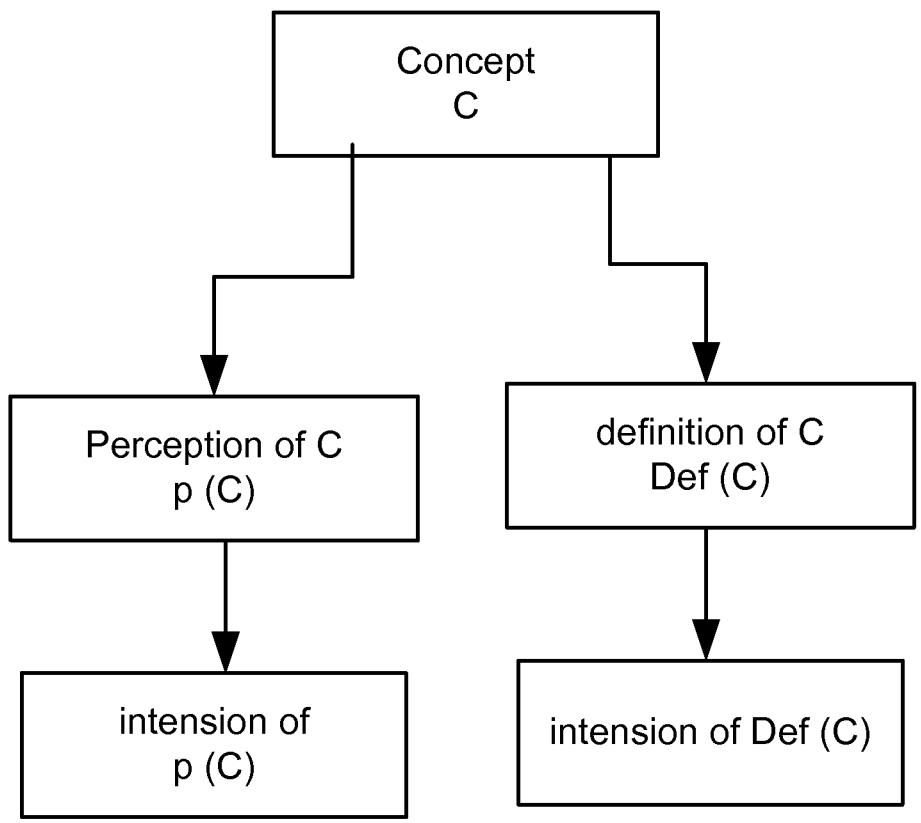
FIG. 4 shows cointension, the degree of goodness of fit of the intension of definiens to the intension of definiendum.

A concept which plays a key role in precisiation is cointension, with intension used in its usual logical sense as attribute-based meaning Thus, p and q are cointensive if the meaning of p is a close approximation to that of q. In this sense, a precisiand, GC(p), is valid if GC(p) is cointensive with p. The concept of cointensive precisiation has an important implication for validity of definitions of concepts. More specifically, if C is a concept and Def(C) is its definition, then for Def(C) to be a valid definition, Def(C) must be cointensive with C (see FIG. 4, regarding cointension: degree of goodness of fit of the intension of definiens to the intension of definiendum).

The concept of cointensive definition leads to an important conclusion: In general, a cointensive definition of a fuzzy concept cannot be formulated within the conceptual structure of bivalent logic and bivalent-logic-based probability theory.

Figure 5:
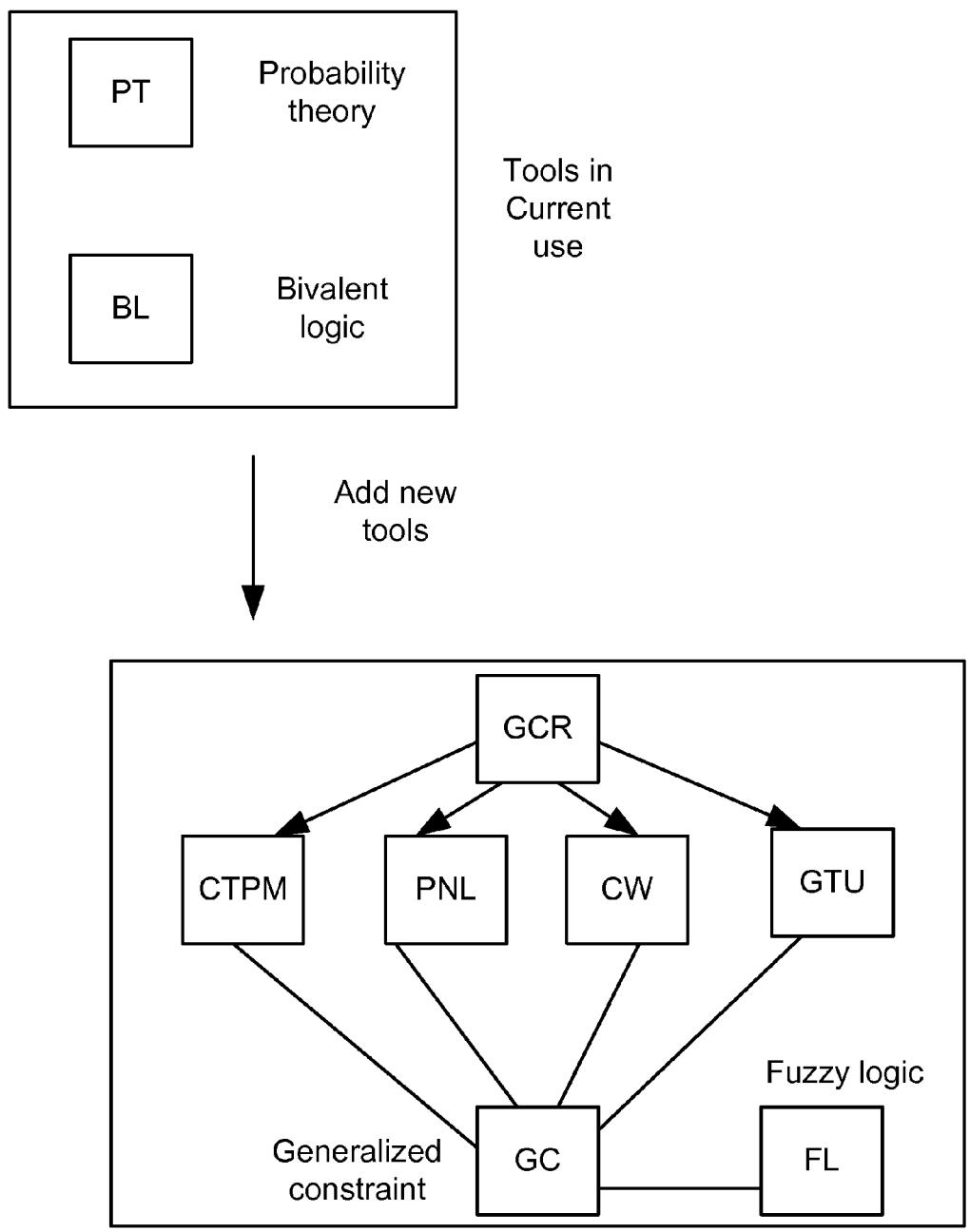
FIG. 5 shows structure of the new tools.

See FIG. 5, regarding structure of the new tools:
PT: standard bivalent-logic-based probability theory
CTPM: Computational Theory of Precisiation of Meaning
PNL: Precisiated Natural Language
CW: Computing with Words
GTU: Generalized Theory of Uncertainty
GCR: Theory of Generalized-Constraint-Based Reasoning The Concept of a Generalized Constraint Constraints are ubiquitous. A typical constraint is an expression of the form X∈C, where X is the constrained variable and C is the set of values which X is allowed to take. A typical constraint is hard (inelastic) in the sense that if u is a value of X then u satisfies the constraint if and only if u∈C.

The problem with hard constraints is that most real-world constraints are not hard, meaning that most real-world constraints have some degree of elasticity. For example, the constraints "check-out time is 1 pm," and "speed limit is 100 km/h," are, in reality, not hard. How can such constraints be defined? The concept of a generalized constraint is motivated by questions of this kind.

Real-world constraints may assume a variety of forms. They may be simple in appearance and yet have a complex structure. Reflecting this reality, a generalized constraint, GC, is defined as an expression of the form.

GC: X isr R, where X is the constrained variable; R is a constraining relation which, in general, is nonbivalent; and r is an indexing variable which identifies the modality of the constraint, that is, its semantics. R will be referred to as a granular value of X.

The constrained variable, X, may assume a variety of forms. In particular,
X is an n-ary variable, $X=(X_1, \ldots, X_n)$
X is a proposition, e.g., X=Leslie is tall
X is a function
X is a function of another variable, $X=f(Y)$
X is conditioned on another variable, X/Y
X has a structure, e.g., X=Location(Residence(Carol))
X is a group variable. In this case, there is a group, G[A]; with each member of the group, Name, , i=1, ..., n, associated with an attribute-value, $A_i$. $A_i$ may be vector-valued. Symbolically:

$G[A]:Name_1/A_1+ \ldots +Name_n/A_n.$

Basically, G[A] is a relation.
X is a generalized constraint, X=Y isr R.

A generalized constraint, GC, is associated with a test-score function, ts(u) which associates with each object, u, to which the constraint is applicable, the degree to which u satisfies the constraint. Usually, ts(u) is a point in the unit interval. However, if necessary, the test-score may be a vector, an element of a semi-ring, an element of a lattice or, more generally, an element of a partially ordered set, or a bimodal distribution. The test-score function defines the semantics of the constraint with which it is associated.

The constraining relation, R, is, or is allowed to be, nonbivalent (fuzzy). The principal modalities of generalized constraints are summarized in the following.

Principal Modalities of Generalized Constraints
(a) Possibilistic (r=blank)
X is R
with R playing the role of the possibility distribution of X. For example:
X is [a, b]
means that [a, b] is the set of possible values of X. Another example:
X is small.
In this case, the fuzzy set labeled small is the possibility distribution of X. If $\mu_{small}$ is the membership function of small, then the semantics of "X is small" is defined by $Poss\{X=u\}=\mu_{small}(u)$ where u is a generic value of X.
(b) Probabilistic (r=p)
X is p R,
with R playing the role of the probability distribution of X. For example:
X is p $N(m, \sigma2)$ means that X is a normally distributed random variable with mean m and variance $\sigma^2$.
If X is a random variable which takes values in a finite set $\{u_1, \ldots, u_n\}$ with respective probabilities $p_1, \ldots, p_n$, then X may be expressed symbolically as $X\ isp(p_1\backslash u_1+ \ldots +p_n\backslash u_n),$ with the semantics
$Prob(X=u_i)=p_i, (i=1, \ldots, n).$ What is important to note is that in the Generalized Theory of Uncertainty (GTU), a probabilistic constraint is viewed as an instance of a generalized constraint.

When X is a generalized constraint, the expression
X is p R
is interpreted as a probability qualification of X, with R being the probability of X. For example:
(X is small) is p likely,
where small is a fuzzy subset of the real line, means that the probability of the fuzzy event {X is small} is likely. More specifically, if X takes values in the interval [a, b] and g is the probability density function of X, then the probability of the fuzzy event "X is small" may be expressed as the following integral, taken between a and b interval:

$$\text{Prob}(X \text{ is small}) = \int_{\text{between } a \text{ and } b} (\mu_{small}(u))g(u)\,du$$

Hence:

$$ts(g) = \mu_{likely}\left(\int_{\text{between } a \text{ and } b} (\mu_{small}(u))g(u)\,du\right)$$

This expression for the test-score function defines the semantics of probability qualification of a possibilistic constraint.

Figure 37:
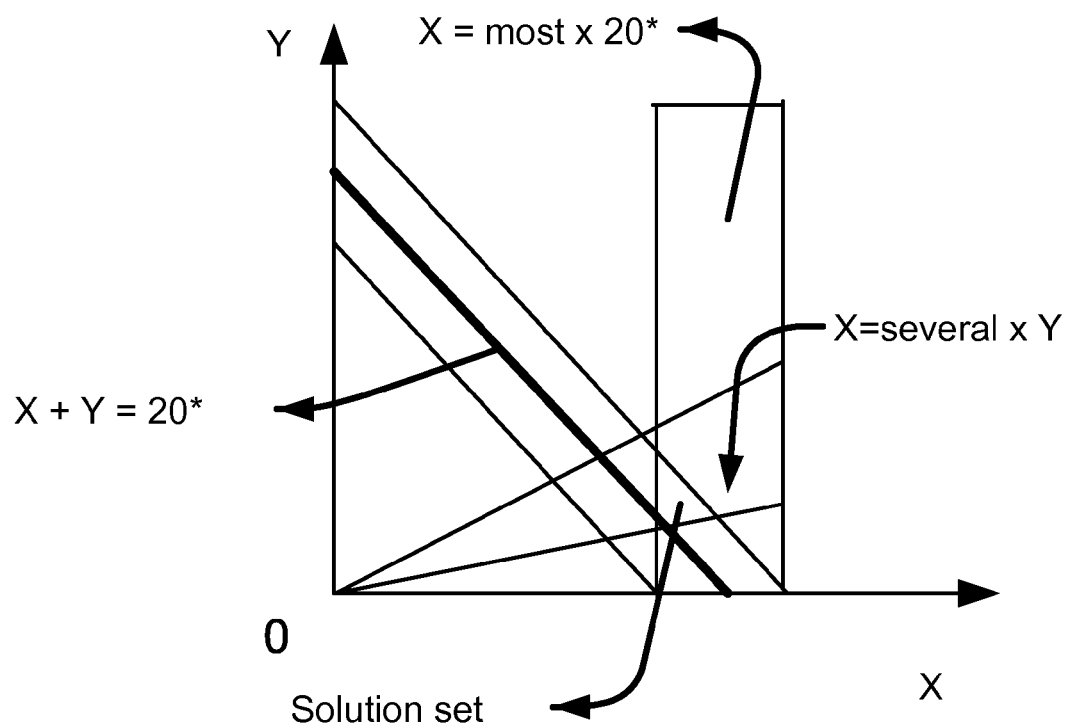
FIG. 37 shows an application of fuzzy integer programming, which specifies a region of intersections or overlaps, as the solution region.

(c) Veristic (r=v)
X isv R,
where R plays the role of a verity (truth) distribution of X. In particular, if X takes values in a finite set $\{u_1, \ldots, u_n\}$ with respective verity (truth) values $t_1, \ldots, t_n$, then X may be expressed as $X \text{ isv}(t_1|u_1 + \ldots + t_n|u_n)$, meaning that $\text{Ver}(X=u_i)=t_i$, i=1, ..., n.
For example, if Robert is half German, quarter French and quarter Italian, then
Ethnicity(Robert) isv (0.5|German+0.25|French+0.25|Italian).
When X is a generalized constraint, the expression
X isv R
is interpreted as verity (truth) qualification of X. For example,
(X is small) isv very.true,
should be interpreted as "It is very true that X is small." The semantics of truth qualification is defined this way.
Ver(X is R) is t→X is $\mu_R^{-1}$ (t),
where $\mu_R^{-1}$ is inverse of the membership function of R and t is a fuzzy truth value which is a subset of [0, 1], as shown in FIG. 37.

Note. There are two classes of fuzzy sets: (a) possibilistic, and (b) veristic. In the case of a possibilistic fuzzy set, the grade of membership is the degree of possibility. In the case of a veristic fuzzy set, the grade of membership is the degree of verity (truth). Unless stated to the contrary, a fuzzy set is assumed to be possibilistic.

(d) Usuality (r=u)
X isu R.
The usuality constraint presupposes that X is a random variable, and that probability of the event {X isu R} is usually, where usually plays the role of a fuzzy probability which is a fuzzy number. For example:
X isu small
means that "usually X is small" or, equivalently,
Prob {X is small} is usually.
In this expression, small may be interpreted as the usual value of X. The concept of a usual value has the potential of playing a significant role in decision analysis, since it is more informative than the concept of expected value.

Figure 38:
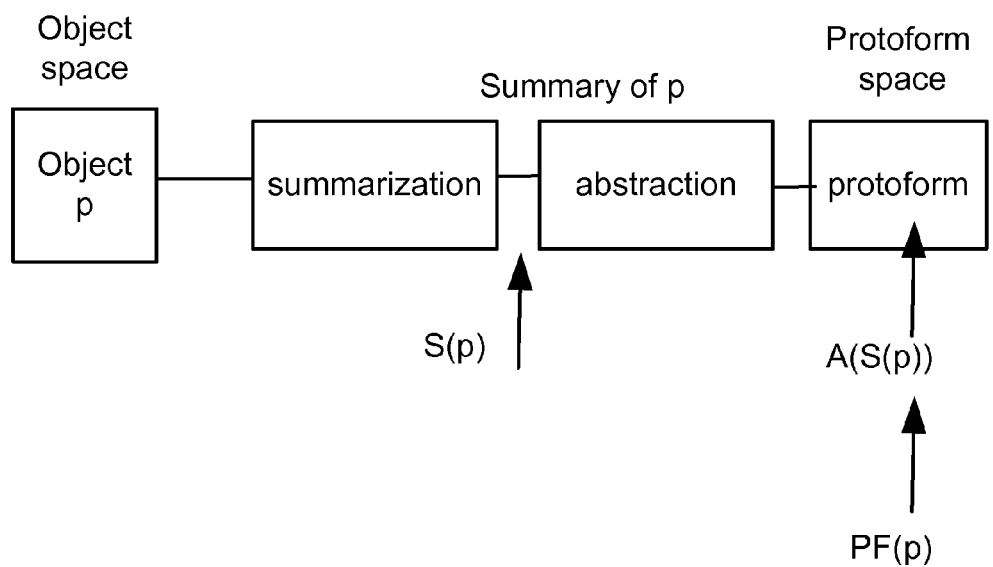
FIG. 38 shows the definition of protoform of p.

(e) Random-set (r=rs)
In
X isrs R,
X is a fuzzy-set-valued random variable and R is a fuzzy random set.
(f) Fuzzy-graph (r=fg)
In
X isfg R,
X is a function, f, and R is a fuzzy graph which constrains f (see FIG. 38). A fuzzy graph is a disjunction of Cartesian granules expressed as $R = A_1 \times B_1 + \ldots + A_n \times B_n$, where the $A_i$ and $B_i$, i=1, ..., n, are fuzzy subsets of the real line, and x is the Cartesian product. A fuzzy graph is frequently described as a collection of fuzzy if-then rules.
R: if X is $A_1$ then Y is $B_1$, i=1, ..., n.
The concept of a fuzzy-graph constraint plays an important role in applications of fuzzy logic.

(g) Bimodal (r=bm)
In the bimodal constraint,
X isbm R,
R is a bimodal distribution of the form
R: $\Sigma_i$ Pi\Ai=1, ..., n,
which means that Prob(X is Ai) is Pi.
To clarify the meaning of a bimodal distribution, it is expedient to start with an example. I am considering buying Ford stock. I ask my stockbroker, "What is your perception of the near-term prospects for Ford stock?" He tells me, "A moderate decline is very likely; a steep decline is unlikely; and a moderate gain is not likely." My question is: What is the probability of a large gain?
Information provided by my stock broker may be represented as a collection of ordered pairs:
Price: ((unlikely, steep.decline), (very.likely, moderate.decline), (not.likely, moderate.gain)).
In this collection, the second element of an ordered pair is a fuzzy event or, generally, a possibility distribution, and the first element is a fuzzy probability. The expression for Price is an example of a bimodal distribution.

The importance of the concept of a bimodal distribution derives from the fact that in the context of human-centric systems, most probability distributions are bimodal. Bimodal distributions can assume a variety of forms. The principal types are Type 1, Type 2 and Type 3. Type 1, 2 and 3 bimodal distributions have a common framework but differ in important detail. A bimodal distribution may be viewed as an important generalization of standard probability distribution. For this reason, bimodal distributions of Type 1, 2, 3 are discussed in greater detail in the following.

Figure 6:
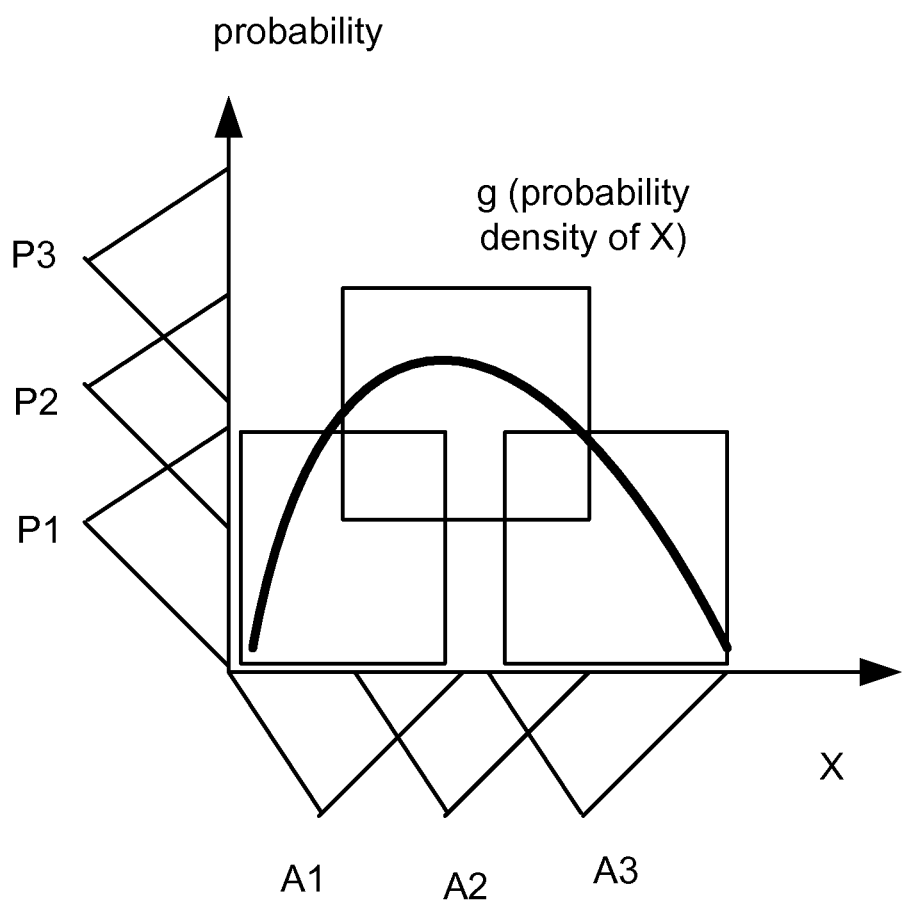
FIG. 6 shows basic bimodal distribution.

Type 1 (default): X is a random variable taking values in U
A1, ..., An, A are events (fuzzy sets)
pi=Prob(X is Ai), Prob(X is Ai) is Pi, i=1, ..., n,
$\Sigma_i$ pi is unconstrained
BD: bimodal distribution: ((P1,A1), ..., (Pn,An))
or, equivalently,
X isbm (P1\A1+ ... +Pn\An)
Now, what is the probability, p, of A? In general, this probability is fuzzy-set-valued.
A special case of bimodal distribution of Type 1 is the basic bimodal distribution (BBD). In BBD, X is a real-valued random variable, and X and P are granular. (See FIG. 6, regarding basic bimodal distribution.)
Type 2 (fuzzy random set): X is a fuzzy-set-valued random variable with values
A1, ..., An (fuzzy sets)
pi=Prob(X=Ai), Prob(X is Ai) is Pi, i=1, ..., n
BD: X isrs (P1\A1+ ... +Pn\An)

$\Sigma_i \text{Pi}=1$, where the Pi are granular probabilities.

Now, what is the probability, P, of A? P is not definable. What are definable are (a) the expected value of the conditional possibility of A given BD, and (b) the expected value of the conditional necessity of A given BD.

Type 3 (DempsterShafer): X is a random variable taking values X1, ..., Xn with probabilities p1, ..., pn.

Xi is a random variable taking values in Ai, i=1, ..., n

Probability distribution of Xi in Ai, i=1, ..., n, is not specified.

Now, what is the probability, p, that X is in A? Because probability distributions of the Xi in the Ai are not specified, p is interval-valued. What is important to note is that the concepts of upper and lower probabilities break down when the Ai are fuzzy sets.

Note: In applying Dempster-Shafer theory, it is important to check on whether the data fit Type 3 model. In many cases, the correct model is Type 1 rather than Type 3.

The importance of bimodal distributions derives from the fact that in many realistic settings a bimodal distribution is the best approximation to our state of knowledge. An example is assessment of degree of relevance, since relevance is generally not well defined. If I am asked to assess the degree of relevance of a book on knowledge representation to summarization, my state of knowledge about the book may not be sufficient to justify an answer such as 0.7. A better approximation to my state of knowledge may be "likely to be high." Such an answer is an instance of a bimodal distribution.

(h) Group (r=g)

In

X isg R,

X is a group variable, G[A], and R is a group constraint on G[A]. More specifically, if X is a group variable of the form G[A]: $\text{Name}_1/\text{A1}+ \ldots +\text{Name}_n/\text{An}$ or G[A]: $\Sigma_i \text{Name}_i/\text{Ai}$, for short, i=1, ..., n, then R is a constraint on the Ai. To illustrate, if we have a group of n Swedes, with $\text{Name}_i$ being the name of i-th Swede, and Ai being the height of $\text{Name}_i$, then the proposition "most Swedes are tall," is a constraint on the Ai which may be expressed as:

(1/n) Σ Count(tall.Swedes) is most or, more explicitly, $(1/n)(\mu_{tall}(A_1)+ \ldots +\mu_{tall}(A_n))$ is most, where most is a fuzzy quantifier which is interpreted as a fuzzy number.

Operations on Generalized Constraints

There are many ways in which generalized constraints may be operated on. The basic operations—expressed in symbolic form—are the following.

(a) Conjunction

X isr R

Y iss S (X, Y) ist T

EXAMPLE (Possibilistic Constraints).

X is R

Y is S (X, Y) is R×S where × is the Cartesian product.

EXAMPLE (Probabilistic/Possibilistic).

X isp R (X, Y) is S (X, Y) isrs T

In this example, if S is a fuzzy relation then T is a fuzzy random set. What is involved in this example is a conjunction of a probabilistic constraint and a possibilistic constraint. This type of probabilistic/possibilistic constraint plays a key role in the Dempster-Shafer theory of evidence, and in its extension to fuzzy sets and fuzzy probabilities.

EXAMPLE (Possibilistic/Probabilistic).

X is R (X, Y) isp S

Y/X isp T

This example, which is a dual of the proceeding example, is an instance of conditioning.

(b) Projection (possibilistic)

(X, Y) is R

X is S where X takes values in U={u}; Y takes values in V={v}; and the projection S=Proj×R, is defined as $\mu_s(u)=\mu_{Proj\times R}(u)=\max_v \mu_R(u, v)$, where $\mu_R$ and $\mu_S$ are the membership functions of R and S, respectively.

(c) Projection (probabilistic)

(X, Y) isp R

X isp S where X and Y are real-valued random variables, and R and S are the probability distributions of (X, Y) and X, respectively. The probability density function of S, $p_S$, is related to that of R, $p_R$, by the familiar equation i $p_S(u)=\int p_R(u,v)dv$ with the integral taken over the real line.

(d) Propagation f(X) isr R g(X) iss S where f and g are functions or functionals.

EXAMPLE (Possibilistic Constraints).

f(X) is R g(X) is S where R and S are fuzzy sets. In terms of the membership function of R, the membership function of S is given by the solution of the variational problem $\mu_s(v)=\sup_u(\mu_R f(u))$ subject to v=g(u).

Note. The constraint propagation rule described in this example is the well-known extension principle of fuzzy logic. Basically, this principle provides a way of computing the possibilistic constraint on g(X) given a possibilistic constraint on f(X).

Figure 7:
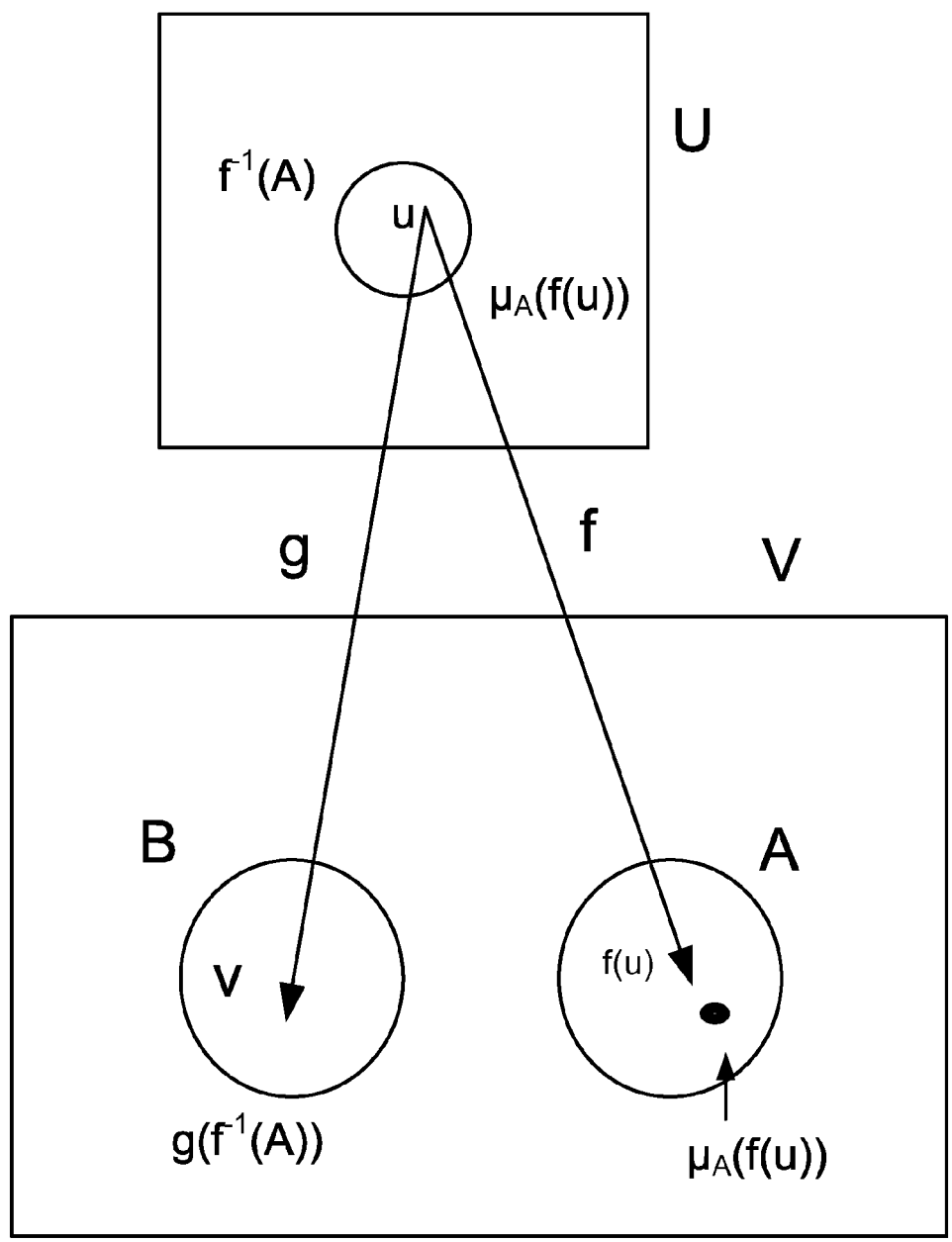
FIG. 7 shows the extension principle.

See FIG. 7, regarding extension principle:

f(X) is A g(X) is B $\mu_s(v)=\sup_u(\mu_A f(u))$ subject to v=g(u).

Primary Constraints, Composite Constraints and Standard Constraints

Among the principal generalized constraints there are three that play the role of primary generalized constraints. They are:

Possibilistic constraint: X is R

Probabilistic constraint: X isp R and

Veristic constraint: X isv R

A special case of primary constraints is what may be called standard constraints: bivalent possibilistic, probabilistic and bivalent veristic. Standard constraints form the basis for the conceptual framework of bivalent logic and probability theory. A generalized constraint, GC, is composite if it can be generated from other generalized constraints through conjunction, and/or projection, and/or constraint propagation, and/or qualification and/or possibly other operations. For example, a random-set constraint may be viewed as a conjunction of a probabilistic constraint and either a possibilistic or veristic constraint. The Dempster-Shafer theory of evidence is, in effect, a theory of possibilistic random-set constraints. The derivation graph of a composite constraint defines how it can be derived from primary constraints.

The three primary constraints—possibilistic, probabilistic and veristic—are closely related to a concept which has a position of centrality in human cognition—the concept of partiality. In the sense used here, partial means: a matter of degree or, more or less equivalently, fuzzy. In this sense, almost all human concepts are partial (fuzzy). Familiar examples of fuzzy concepts are: knowledge, understanding, friendship, love, beauty, intelligence, belief, causality, relevance, honesty, mountain and, most important, truth, likelihood and possibility. Is a specified concept, C, fuzzy? A simple test is: If C can be hedged, then it is fuzzy. For example, in the case of relevance, we can say: very relevant, quite relevant, slightly relevant, etc. Consequently, relevance is a fuzzy concept.

The three primary constraints may be likened to the three primary colors: red, blue and green. In terms of this analogy, existing theories of uncertainty may be viewed as theories of different mixtures of primary constraints. For example, the Dempster—Shafer theory of evidence is a theory of a mixture of probabilistic and possibilistic constraints. The Generalized Theory of Uncertainty (GTU) embraces all possible mixtures. In this sense the conceptual structure of GTU accommodates most, and perhaps all, of the existing theories of uncertainty.

The Generalized Constraint Language and Standard Constraint Language

A concept which has a position of centrality in PNL is that of Generalized Constraint Language (GCL). Informally, GCL is the set of all generalized constraints together with the rules governing syntax, semantics and generation. Simple examples of elements of GCL are:

$((X,Y) \text{ isp } A) \wedge (X \text{ is } B)$ $(X \text{ isp } A) \wedge ((X,Y) \text{ isv } B)$ $\text{Proj}_Y((X \text{ is } A) \wedge ((X,Y) \text{ isp } B)),$ where ˆ is conjunction.
A very simple example of a semantic rule is:

$(X \text{ is } A) \wedge (Y \text{ is } B) \rightarrow \text{Poss}(X=u, Y=v) = \mu_A(u) \wedge \mu_B(v),$ where u and v are generic values of X, Y, and $\mu_A$ and $\mu_B$ are the membership functions of A and B, respectively.

In principle, GCL is an infinite set. However, in most applications only a small subset of GCL is likely to be needed.

In PNL, the set of all standard constraints together with the rules governing syntax, semantics and generation constitute the Standard Constraint Language (SCL). SCL is a subset of GCL.

The Concept of Cointensive Precisiation

As was pointed out already, much of world knowledge and web knowledge is expressed in a natural language. For this reason, mechanization of natural language understanding is of direct relevance to enhancement of web intelligence. In recent years, considerable progress has been made in areas of computational linguistics which relate to mechanization of natural language understanding. But what is widely unrecognized is that there is a fundamental limitation to what can be achieved through the use of commonly-employed methods of meaning representation. The aim of what follows is, first, to highlight this limitation and, second, to present ways of removing it.

To understand the nature of the limitation, two facts have to be considered. First, as was pointed out earlier, a natural language, NL, is basically a system for describing perceptions; and second, perceptions are intrinsically imprecise, reflecting the bounded ability of human sensory organs, and ultimately the brain, to resolve detail and store information. A direct consequence of imprecision of perceptions is semantic imprecision of natural languages. Semantic imprecision of natural languages is not a problem for humans, but is a major problem for machines.

To clarify the issue, let p be a proposition, concept, question or command. For p to be understood by a machine, it must be precisiated, that is, expressed in a mathematically well-defined language. A precisiated form of p, Pre(p), will be referred to as a precisiand of p and will be denoted as p*. The object of precisiation, p, will be referred to us precisiend.

To precisiate p we can employ a number of meaning-representation languages, e.g., Prolog, predicate logic, semantic networks, conceptual graphs, LISP, SQL, etc. The commonly-used meaning-representation languages are bivalent, i.e., are based on bivalent logic. Are we moving in the right direction when we employ such languages for mechanization of natural language understanding? The answer is: No. The reason relates to an important issue which we have not addressed: cointension of p*, with intension used in its logical sense as attribute-based meaning More specifically, cointension is a measure of the goodness of fit of the intension of a precisiand, p*, to the intended intension of precisiend, p. Thus, cointension is a desideratum of precisiation. What this implies is that mechanization of natural language understanding requires more than precisiation—it requires cointensive precisiation. Note that definition is a form of precisiation. In plain words, a definition is cointensive if its meaning is a good fit to the intended meaning of the definiendum.

Here is where the fundamental limitation which was alluded to earlier comes into view. In a natural language, NL, most p's are fuzzy, that is, are in one way or another, a matter of degree. Simple examples: propositions "most Swedes are tall" and "overeating causes obesity;" concepts "mountain" and "honest;" question "is Albert honest?" and command "take a few steps."

Employment of commonly-used meaning-representation languages to precisiate a fuzzy p leads to a bivalent (crisp) precisiand p*. The problem is that, in general, a bivalent p* is not cointensive. As a simple illustration, consider the concept of recession. The standard definition of recession is: A period of general economic decline; specifically, a decline in GDP for two or more consecutive quarters. Similarly, a definition of bear market is: We classify a bear market as a 30 percent decline after 50 days, or a 13 percent decline after 145 days. (Robert Shuster, Ned Davis Research.) Clearly, neither definition is cointensive.

Another example is the classical definition of stability. Consider a ball of diameter D which is placed on an open bottle whose mouth is of diameter d. If D is somewhat larger than d, the configuration is stable: Obviously, as D increases, the configuration becomes less and less stable. But, according to Lyapounov's bivalent definition of stability, the configuration is stable for all values of D greater than d. This contradiction is characteristic of crisp definitions of fuzzy concepts—a well-known example of which is the Greek sorites (heap) paradox.

The magnitude of the problem becomes apparent when we consider that many concepts in scientific theories are fuzzy, but are defined and treated as if they are crisp. This is particularly true in fields in which the concepts which are defined are descriptions of perceptions. To remove the fundamental limitation, bivalence must be abandoned. Furthermore, new concepts, ideas and tools must be developed and deployed to deal with the issues of cointensive precisiation, definability and deduction. The principal tools are Precisiated Natural Language (PNL); Protoform Theory (PFT); and the Generalized Theory of Uncertainty (GTU). These tools form the core of what may be called the Computational Theory of Precisiation of Meaning (CTPM). The centerpiece of CTPM is the concept of a generalized constraint.

The concept of a generalized constraint plays a key role in CTPM by providing a basis for precisiation of meaning More specifically, if p is a proposition or a concept, its precisiand, Pre(p), is represented as a generalized constraint, GC. Thus, Pre(p)=GC. In this sense, the concept of a generalized constraint may be viewed as a bridge from natural languages to mathematics.

Figure 8:
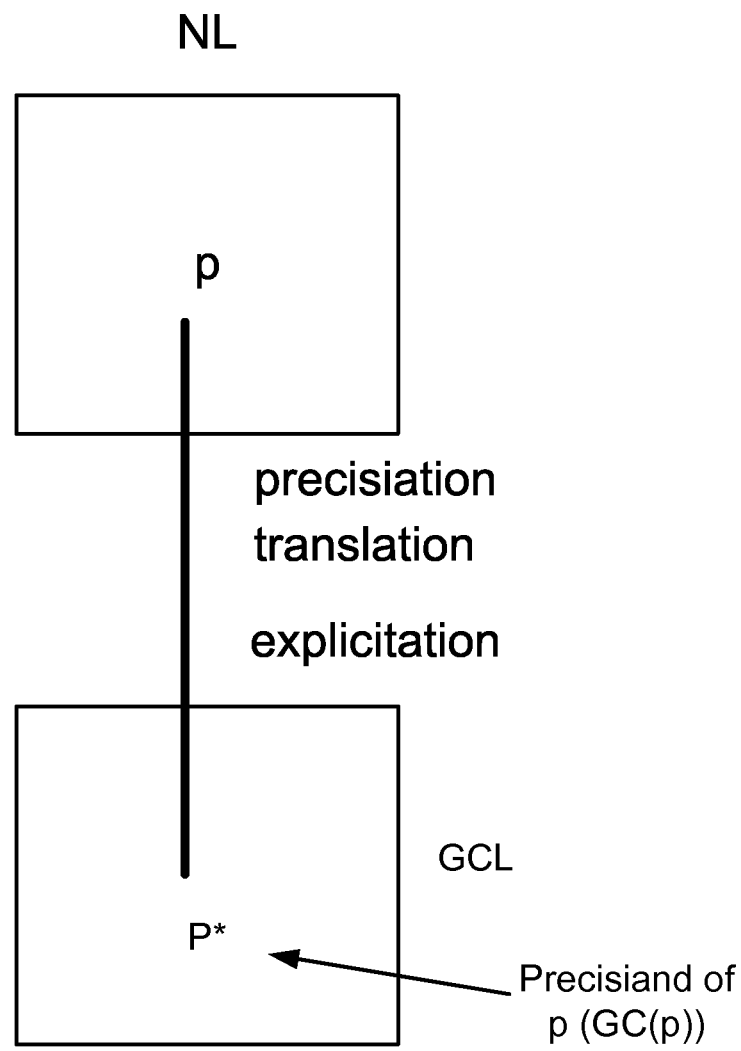
FIG. 8 shows precisiation, translation into GCL.

See FIG. 8, regarding precisiation=translation into GCL: Annotated translation:

$$p \rightarrow X/A \text{ isr } R/B \leftarrow GC(p)$$

Representing precisiands of p as elements of GCL is the pivotal idea in CTPM. Each precisiand is associated with the degree to which it is cointensive with p. Given p, the problem is that of finding those precisiands which are cointensive, that is, have a high degree of cointension. If p is a fuzzy proposition or concept, then in general there are no cointensive precisiands in SCL.

In CTPM, a refinement of the concept of precisiation is needed. First, a differentiation is made between v-precision (precision in value) and m-precision (precision in meaning). For example, proposition p: X is 5, is both v-precise and m-precise; p: X is between 5 and 7, is v-imprecise and m-precise; and p: X is small, is both v-imprecise and m-imprecise; however, p can be m-precisiated by defining small as a fuzzy set or a probability distribution. A perception is v-imprecise and its description is m-imprecise. PNL makes it possible to m-precisiate descriptions of perceptions.

Figure 9:
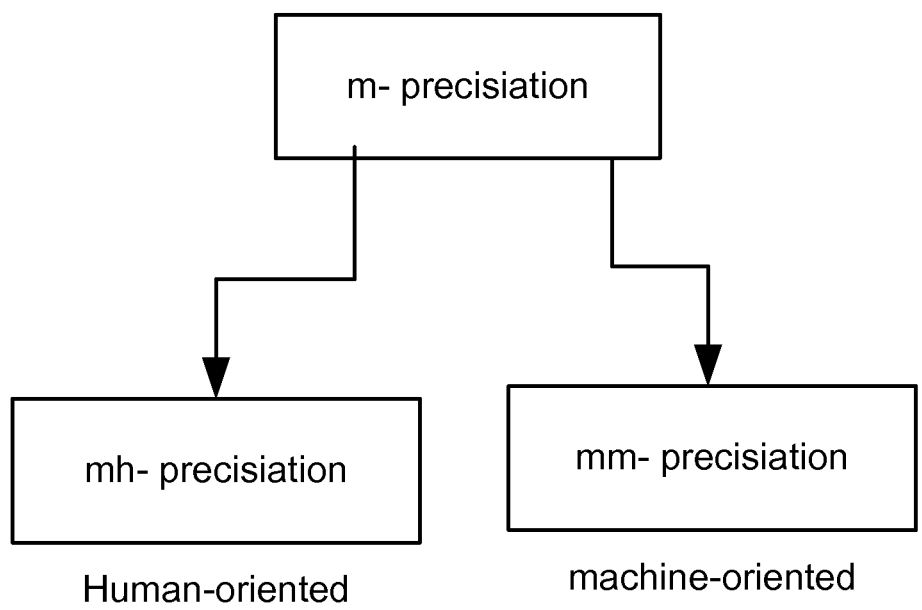
FIG. 9 shows the modalities of m-precisiation.

Granulation of a variable, e.g., representing the values of age as young, middle-aged and old, may be viewed as a form of v-imprecisiation. Granulation plays an important role in human cognition by serving as a means of (a) exploiting a tolerance for imprecision through omission of irrelevant information; (b) lowering precision and thereby lowering cost; and (c) facilitating understanding and articulation. In fuzzy logic, granulation is m-precisiated through the use of the concept of a linguistic variable. Further refinement of the concept of precisiation relates to two modalities of m-precisiation: (a) human-oriented, denoted as mh-precisiation; and (b) machine-oriented, denoted as mm-precisiation. Unless stated to the contrary, in CTPM, precisiation should be understood as mm-precisiation. (See FIG. 9, regarding modalities of m-precisiation.)

Figure 36A:
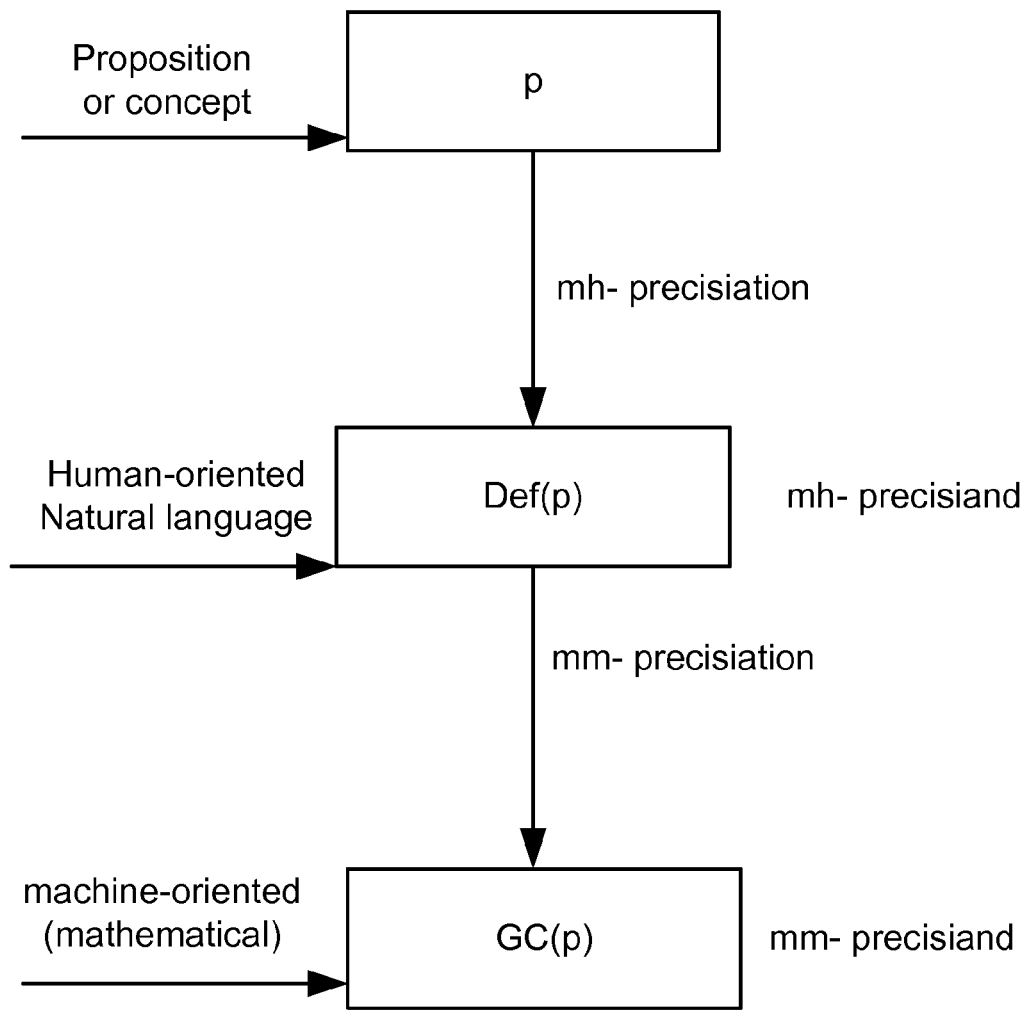
FIG. 36(a) shows bimodal lexicon (PNL).

In a bimodal dictionary or lexicon, the first entry, p, is a concept or proposition; the second entry, p*, is mh-precisiand of p; and the third entry is mm-precisiand of p. To illustrate, the entries for recession might read: mh-precisiand a period of general economic decline; and mm-precisi and—a decline in GDP for two or more consecutive quarters. (See FIG. 36(a), regarding bimodal lexicon (PNL).)

There is a simple analogy which helps to understand the meaning of cointensive precisiation. Specifically, a proposition, p, is analogous to a system, S; precisiation is analogous to modelization; a precisiand, expressed as a generalized constraint, GC(p), is analogous to a model, M(S), of S; test-score function is analogous to inputoutput relation; cointensive precisiand is analogous to well-fitting model; GCL is analogous to the class of all fuzzy-logic-based systems; and SCL is analogous to the subclass of all bivalent-logic-based systems. To say that, in general, a cointensive definition of a fuzzy concept cannot be formulated within the conceptual structure of bivalent logic and probability theory, is similar to saying that, in general, a linear system cannot be a well-fitting model of a nonlinear system.

Figure 36B:
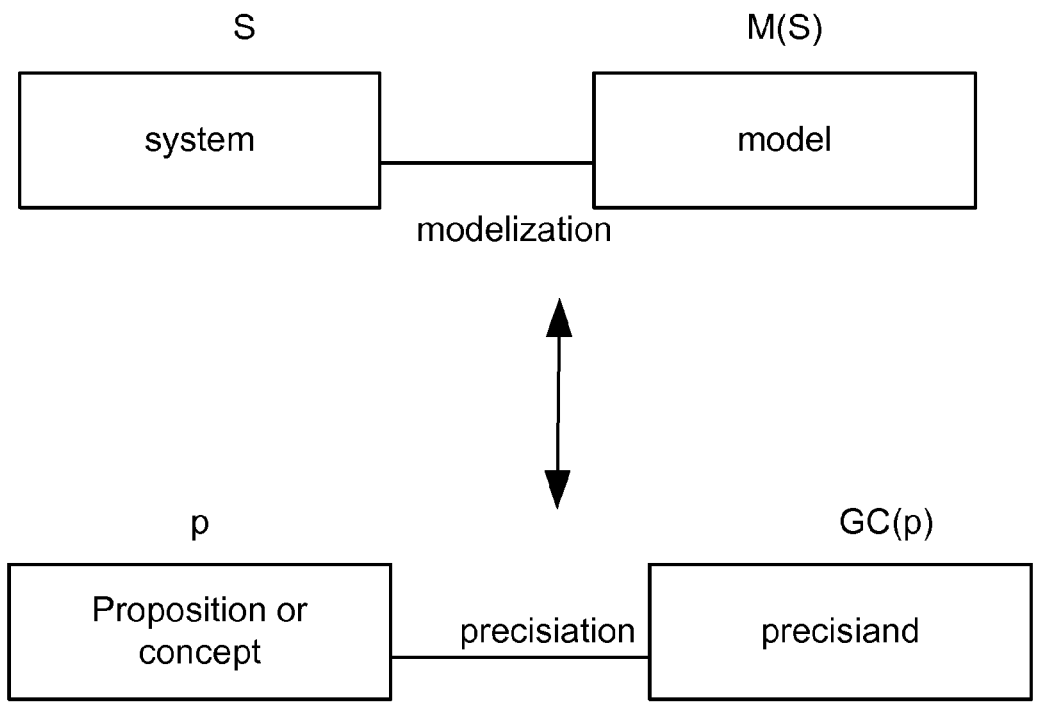
FIG. 36(b) shows analogy between precisiation and modelization.

See FIG. 36(b), regarding analogy between precisiation and modelization:
input-output relation→intension
degree of match between M(S) and S→cointension Ramifications of the concept of cointensive precisiation extend well beyond mechanization of natural language understanding. A broader basic issue is validity of definitions in scientific theories, especially in the realms of human-oriented fields such as law, economics, medicine, psychology and linguistics. More specifically, the concept of cointensive precisiation calls into question the validity of many of the existing definitions of basic concepts—among them the concepts of causality, relevance, independence, stability, complexity, and optimality.

Translation of p into GCL is made more transparent though annotation. To illustrate, (a) p: Monika is young→X/Age(Monika) is R/young (b) p: It is likely that Monika is young→Prob(X/Age (Monika) is R/young) is S/likely Note: Example (b) is an instance of probability qualification.

More concretely, let g(u) be the probability density function of the random variable, Age(Monika). Then, with reference to our earlier discussion of probability qualification, we have:

$$\text{Prob(Age(Monika) is young) is likely} \rightarrow \int_0^{100} g(u)\mu_{young}(u)\,du$$

is likely, or, in annotated form, $$GC(g) = X \bigg/ \int_0^{100} g(u)\mu_{young}(u)\,du,$$

is R/likely.
The test-score of this constraint on g is given by $$ts(g) = \mu_{likely}\bigg(\int_0^{100} g(u)\mu_{young}(u)\,du\bigg)$$

(c) p: Most Swedes are tall

Following (b), let h(u) be the count density function of Swedes, meaning that h(u) du=fraction of Swedes whose height lies in the interval [u, u+du]. Assume that height of Swedes lies in the interval [a, b]. Then, fraction of tall Swedes: $\int_a^b h(u)\mu_{tall}(u)\,du$, is most.

Interpreting this relation as a generalized constraint on h, the test-score may be expressed as:

$$ts(h) = \mu_{most}\left(\int_0^h h(u)\mu_{tall}(u)\,du\right)$$

In summary, precisiation of "Most Swedes are tall" may be expressed as the generalized constraint.

$$\text{Most Swedes are tall} \to GC(h) = \mu_{most}\left(\int_a^b h(u)\mu_{tall}(u)\,du\right)$$

An important application of the concept of precisiation relates to precisiation of propositions of the form "X is approximately a," where a is a real number. How can "approximately a," or *a (for short), be precisiated? In other words, how can the uncertainty associated with the value of X which is described as *a, be defined precisely? There is a hierarchy of ways in which this can be done. The simplest is to define *a as a. This mode of precisiation will be referred to as singular precisiation, or s-precisiation, for short. s-precisiation is employed very widely, especially in probabilistic computations in which an imprecise probability, *a, is computed with as if it were an exact number, a.

The other ways will be referred to as granular precisiation, or g-precisiation, for short. In g-precisiation, *a is treated as a granule. What we see is that various modes of precisiating *a are instances of the generalized constraint. The concept of precisiation has an inverse—the concept of imprecisiation, which involves replacing a with *a, with the understanding that *a is not unique. Imprecisiation has a negative connotation. In fact, imprecisiation serves an important purpose. More specifically, consider a proposition p of the form p:X is V, where X is a variable and V is its value. X may assume a variety of forms. In particular, X may be a real-valued variable, an n-ary variable, a function or a relation. The value, V, is v-precise if it is singular, that is, V is a singleton. V is v-imprecise if it is granular. In this framework, v-imprecisiation may be interpreted as a transition from singular to granular value of V.

v-imprecisiation is forced (necessary) when the value of V is not known precisely. v-imprecisiation is deliberate (optional) if there is no need for V to be known precisely. In this case, what may be called v-imprecisiation principle comes into play.

v-imprecisiation principle: Precision carries a cost. If there is a tolerance for imprecision, exploit it by employing v-imprecisiation to achieve lower cost, robustness, tractability, decision-relevance and higher level of confidence.

A word about confidence: If V is uncertain, the confidence in p, Con(p), may be defined as the probability that p is true. Generally, v-imprecisiation of V serves to increase Con(p). For example, Con(Carol is young)>Con(Carol is 23). Thus, as a rule, confidence increases when specificity decreases.

An important example is granulation. In fuzzy logic, granulation may be interpreted as v-imprecisiation followed by mm-precisiation. In this perspective, the concept of granulation—in combination with the associated concept of a linguistic variable—may be viewed as one of the major contributions of fuzzy logic.

A basic problem which relates to imprecisiation is the following. Assume for simplicity that we have two linear equations involving real-valued coefficients and real-valued variables:

$a_{11}X+a_{12}Y=b_1$, $a_{21}X+a_{22}Y=b_2$.

Solutions of these equations read, $X=((a_{22}b_1-a_{12}b_2)/(a_{11}a_{22}-a_{12}a_{21}))$, $Y=((a_{11}b_2-a_{21}b_1)/(a_{11}a_{22}-a_{12}a_{21}))$ Now suppose that we imprecisiate the coefficients, replacing, with $*a_{ij}$, i, j=1, 2, and replacing $b_i$ with $*b_i$, i=1, 2. How can we solve these equations when imprecisiated coefficients are defined as generalized constraints?

There is no general answer to this question. Assuming that all coefficients are defined in the same way, the method of solution will depend on the modality of the constraint. For example, if the coefficients are interval-valued, the problem falls within the province of interval analysis. If the coefficients are fuzzy-interval-valued, the problem falls within the province of the theory of relational equations. And if the coefficients are real-valued random variables, we are dealing with the problem of solution of stochastic equations.

One complication is the following. If (a) we solve the original equations, as we have done above; (b) imprecisiate the coefficients in the solution; and (c) employ the extension principle to complete X and Y, will we obtain solutions of imprecisiated equations? The answer, in general, is: No.

Nevertheless, when we are faced with a problem which we do not know how to solve correctly, we proceed as if the answer is: Yes. This common practice may be described as Precisiation/Imprecisiation Principle which is defined in the following.

Precisiation/Imprecisiation Principle (P/I Principle)

Informally, let f be a function or a functional. Y=f(X), where X and Y are assumed to be imprecise, Pr(X) and Pr(Y) are precisiations of X and Y, and *Pr(X) and *Pr(Y) are imprecisiations of Pr(X) and Pr(Y), respectively. In symbolic form, the P/I principle may be expressed as $f(X)^*=*f(Pr(X))$, where *=denotes "approximately equal," and *f is imprecisiation of f. In words, to compute f(X) when X is imprecise, (a) precisiate X, (b) compute f(Pr(X)); and (c) imprecisiate f(Pr(X)). Then, usually, *f(Pr(X)) will be approximately equal to f(X). An underlying assumption is that approximations are commensurate in the sense that the closer Pr(X) is to X, the closer f (Pr(X)) is to f(X). This assumption is related to the concept of gradual rules of Dubois and Prade.

As an example, suppose that X is a real-valued function; f is the operation of differentiation, and *X is the fuzzy graph of X. Then, using the P/I principle, *f(X) is obtained. It should be underscored that imprecisiation is an imprecise concept.

Use of the P/I principle underlies many computations in science, engineering, economics and other fields. In particular, as was alluded to earlier, this applies to many computations in probability theory which involve imprecise probabilities. It should be emphasized that the P/I principle is neither normative (prescriptive) nor precise; it merely describes imprecisely what is common practice—without suggesting that common practice is correct.

Precisiation of Propositions

In preceding discussion, we focused our attention on precisiation of propositions of the special form "X is *a." In the following, we shall consider precisiation in a more general setting. In this setting, the concept of precisiation in PNL opens the door to a wide-ranging enlargement of the role of natural languages in scientific theories, especially in fields such as economics, law and decision analysis.

Within CTPM, precisiation of propositions—and the related issues of precisiation of questions, commands and concepts—falls within the province of PNL. As was stated earlier, the point of departure in PNL is representation of a precisiand of a proposition, p, as a generalized constraint.

$$p \rightarrow X \text{ isr } R.$$

To illustrate precisiation of propositions and questions, it will be useful to consider some examples.

(a) The Robert example:
p: Usually Robert returns from work at about 6 pm.
Q: What is the probability that Robert is home at about 6:15 pm?
Precisiation of p may be expressed as
p: Prob(Time(Return(Robert)) is *6:00 pm) is usually
where "usually" is a fuzzy probability.
Assuming that Robert stays home after returning from work, precisiation of q may be expressed as $$q: \text{Prob}(\text{Time}(\text{Return}(\text{Robert})) \text{ is } \leq \circ 6:15 \text{ pm}) \text{ is A?}$$

where $\circ$ is the operation of composition, and A is a fuzzy probability.

(b) The balls-in-box problem:
p1: A box contains about 20 black and white balls
p2: Most are black
p3: There are several times as many black balls as white balls
q1: What is the number of white balls?
q2: What is the probability that a ball drawn at random is white?
Let X be the number of black balls and let Y be the number of white balls. Then, in precisiated form, the statement of the problem may be expressed as:
For the data, we have:

$$(X+Y) \text{ is } *20 \qquad \qquad p1$$

$$X \text{ is most} \times *20 \qquad \qquad p2$$

$$X \text{ is several} \times y, \qquad \qquad p3$$

And, for the questions, we have:

$$Y \text{ is ?A} \qquad \qquad q1$$

$$Y/*20 \text{ is ?B}, \qquad \qquad q2$$

where Y/*20 is the granular probability that a ball drawn at random is white.

Solution of these equations reduces to an application of fuzzy integer programming. (See FIG. 37, which specifies a region of intersections or overlaps, corresponding to pairs of X and Y coordinates, which provide solutions for our questions, related to the values for Y.)

(c) The tall Swedes problem:
p: Most Swedes are tall.
Q: What is the average height of Swedes?
Q: How many Swedes are short?
As was shown earlier, $$p: \text{Most Swedes are tall} \rightarrow \int_a^b h(u)\mu_{tall}(u)\,du,$$

is most,
where h is the count density function.
Precisiations of q1 and q2 may be expressed as $$q1: \int_a^b u h(u)\,du,$$

is ?A,
where A is a fuzzy number which represents the average height of Swedes, and $$q2: \int_a^b h(u)\mu_{short}(u)\,du,$$

is ?B,
where $\mu_{short}$ is the membership function of short, and B is the fraction of short Swedes.

(d) The partial existence problem:
X is a real number. I am uncertain about the value of X. What I know about X is:
p1: X is much larger than approximately a,
p2: X is much smaller than approximately b,
where a and b are real numbers, with a<b.
What is the value of X?
In this case, precisiations of data may be expressed as
p1: X is much larger $\circ$*a
p2: X is much smaller $\circ$*b,
where $\circ$ is the operation of composition. Precisiation of the question is:
q: X is ?A,
where A is a fuzzy number. The solution is immediate:
X is (much.larger $\circ$*a $\wedge$ much.smaller $\circ$*b),
when $\wedge$ is min or a t-norm. In this instance, depending on a and b, X may exist to a degree.

These examples point to an important aspect of precisiation. Specifically, to precisiate p, we have to precisiate or, equivalently, calibrate its lexical constituents. For example, in the case of "Most Swedes are tall," we have to calibrate "most" and "tall." Likewise, in the case of the Robert example, we have to calibrate "about 6:00 pm," "about 6:15 pm" and "usually." In effect, we are composing the meaning of p from the meaning of its constituents. This process is in the spirit of Frege's principle of compositionality, Montague grammar and the semantics of programming languages.

In probability theory, for example, independence of events is a bivalent concept. But, in reality, independence is a matter of degree, i.e., is a fuzzy concept. PNL, used as a definition language, makes it possible, more realistically, to define independence and other bivalent concepts in probability theory as fuzzy concepts. For this purpose, when PNL is used as a definition language, a concept is first defined in a natural language and then its definition is precisiated through the use of PNL.

The Concept of a Protoform

Viewed in a broader perspective, what should be noted is that precisiation of meaning is not the ultimate goal—it is an intermediate goal. Once precisiation of meaning is achieved, the next goal is that of deduction from decision-relevant information. The ultimate goal is decision.

Figure 39:
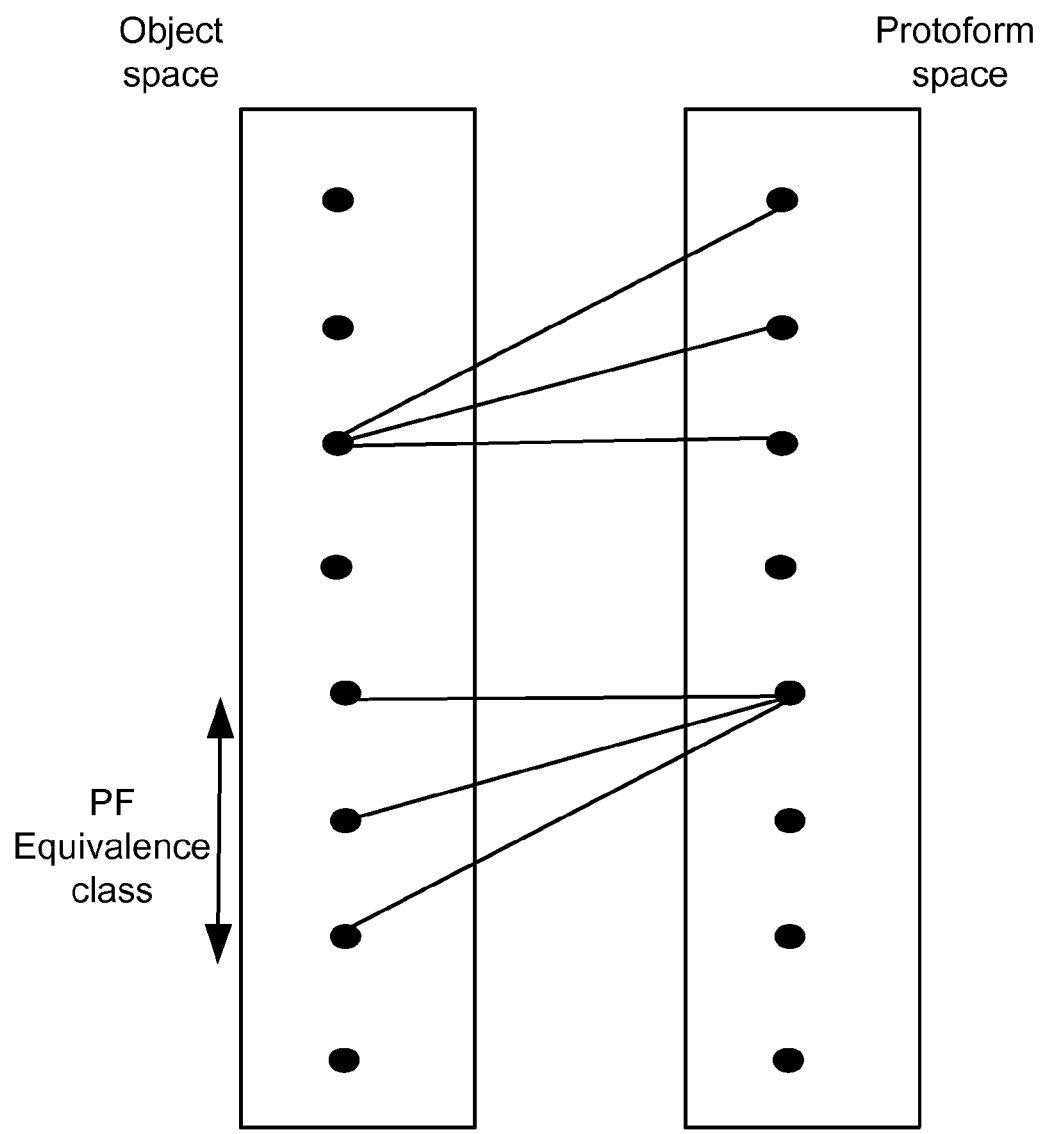
FIG. 39 shows protoforms and PF-equivalence.

In CTPM, a concept which plays a key role in deduction is that of a protoform—an abbreviation for prototypical form. Informally, a protoform of an object is its abstracted summary. More specifically, a protoform is a symbolic expression which defines the deep semantic structure of an object such as a proposition, question, command, concept, scenario, or a system of such objects. In the following, our attention will be focused on protoforms of propositions, with PF(p) denoting a protoform of p. Abstraction has levels, just as summarization does. For this reason, an object may have a multiplicity of protoforms. Conversely, many objects may have the same protoform. Such objects are said to be protoform-equivalent, or PF-equivalent, for short. The set of protoforms of all precisiable propositions in NL, together with rules which govern propagation of generalized constraints, constitute what is called the Protoform Language (PFL). (See FIG. 38, regarding definition of protoform of p, with S(p), summary of p, and PF(p), abstracted summary of p, deep structure of p.) (See also FIG. 39, regarding protoforms and PF-equivalence. Note that at a given level of abstraction and summarization, objects p and q are PF-equivalent, if PF(p)=PF(q).)

Examples.

Monika is young→Age(Monika) is young→A(B) is C, where Age refers to A, Monika to B (as instantiation), and Young to C (as abstraction).

Monika is much younger than Pat→(A(B), A(C)) is R, where Age refers to A, Monika to B, Pat to C, and "much younger" to R.

distance between New York and Boston is about 200 mi→A(B,C) is R, where Distance refers to A, New York to B, Boston to C, and "about 200 miles" to D.

usually Robert returns from work at about 6 pm→Prob {A is B} is C, where "Time(Robert.returns.from.work)" refers to A, "about 6 pm" to B, and Usually to C.

Carol lives in a small city near San Francisco→A(B(C)) is (D and E), where "small city" refers to E, "city near SF" to D, Carol to C, Residence to B, and Location to A.

most Swedes are tall→1/n Σ Count(G[A] is R) is Q, where Most refers to Q, Swedes to G, tall to R, and Height to A.

Figure 40:
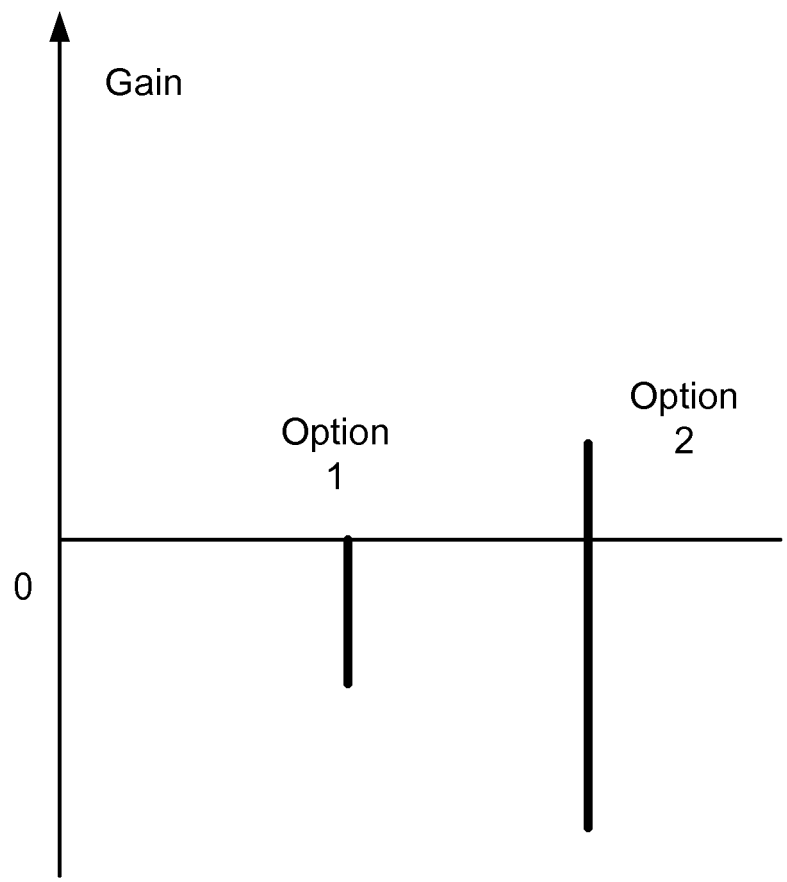
FIG. 40 shows a gain diagram for a situation where (as an example) Alan has severe back pain, with respect to the two options available to Alan.

Another example: Alan has severe back pain. He goes to see a doctor. The doctor tells him that there are two options: (1) do nothing; and (2) do surgery. In the case of surgery, there are two possibilities: (a) surgery is successful, in which case, Alan will be pain free; and (b) surgery is not successful, in which case Alan will be paralyzed from the neck down. (See FIG. 40)

Protoformal Deduction

The rules of deduction in CTPM are, basically, the rules which govern constraint propagation. In CTPM, such rules reside in the Deduction Database (DDB). The Deduction Database comprises a collection of agent-controlled modules and submodules, each of which contains rules drawn from various fields and various modalities of generalized constraints. A typical rule has a symbolic part, which is expressed in terms of protoforms; and a computational part which defines the computation that has to be carried out to arrive at a conclusion.

Figure 41:
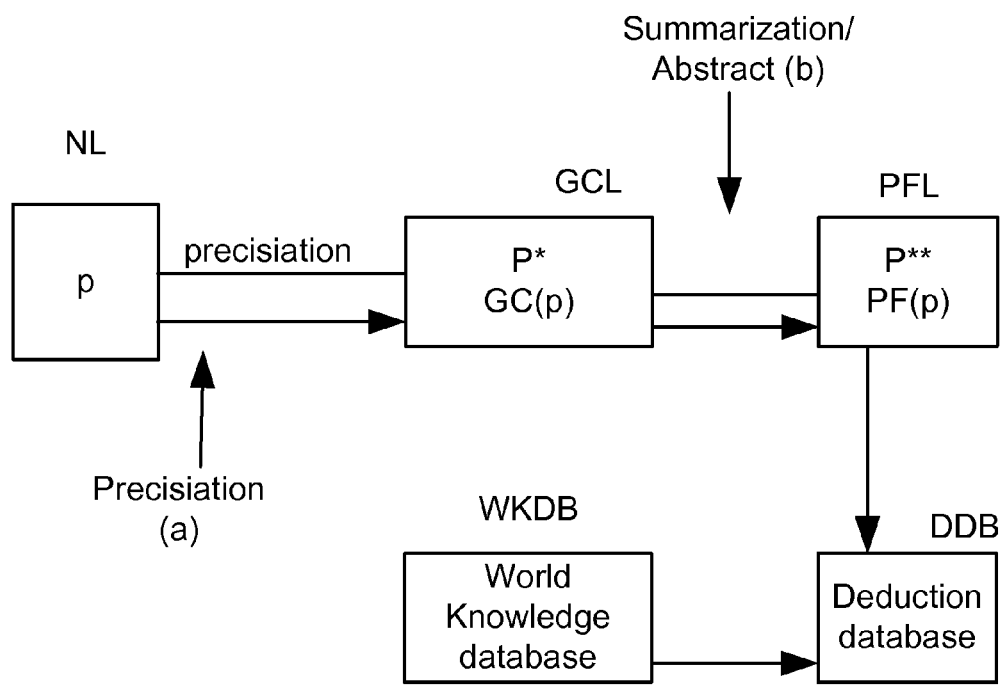
FIG. 41 shows the basic structure of PNL.
Figure 42:
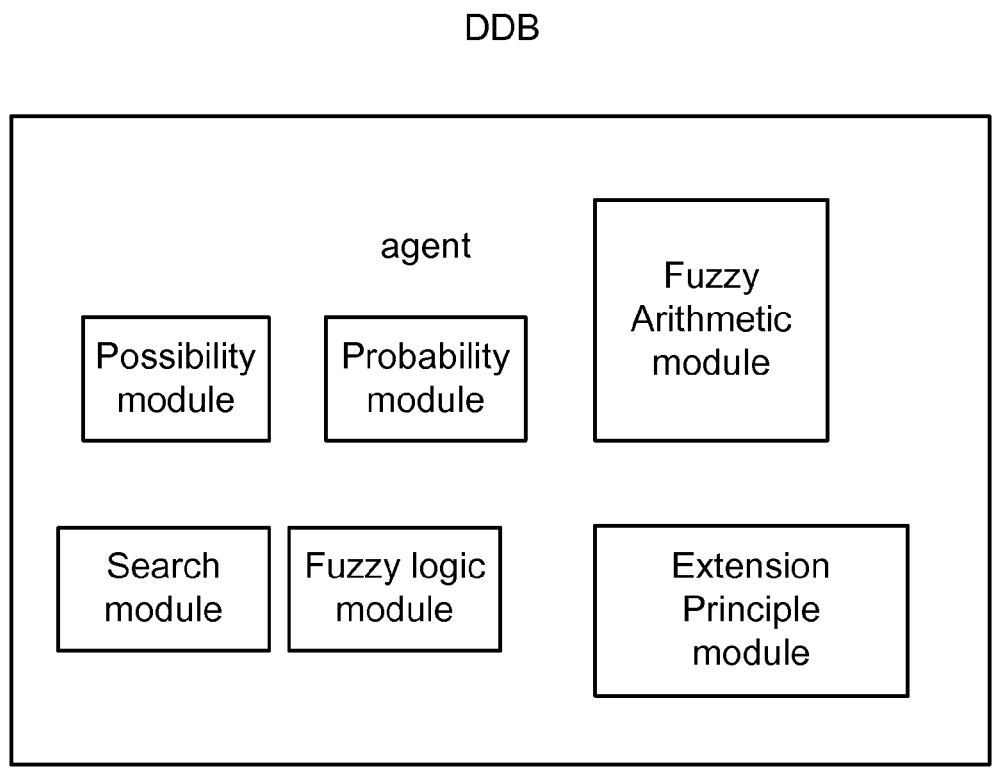
FIG. 42 shows the structure of deduction database, DDB.

See FIG. 41, regarding basic structure of PNL:
In PNL, deduction=generalized constraint propagation
PFL: Protoform Language
DDB: deduction database=collection of protoformal rules governing generalized constraint propagation
WKDB: World Knowledge Database (PNL-based)
See also FIG. 42, regarding structure of deduction database, DDB.

(a) Computational rule of inference:
For symbolic part, we have:
X is A
(X, Y) is B
Y is C
For computational part, we have:

$$\mu_C(v) = \max_u(\mu_A(u) \wedge \mu_B(u,v))$$

(b) Intersection/product syllogism:
For symbolic part, we have:
Q1 A's are B's
Q2 (A&B)'s are C's
Q3 A's are (B&C)'s
For computational part, we have:

i Q3 = Q1*Q2 where Q1 and Q2 are fuzzy quantifiers; A,B,C are fuzzy sets; * is product in fuzzy arithmetic.

(c) Basic extension principle:
For symbolic part, we have:
X is A
f(X) is B
For computational part, we have:

$$\mu_B(v) = \sup_u(\mu_A(u))$$

subject to $$v = f(u)$$

g is a given function or functional; A and B are fuzzy sets.

(d) Extension principle:
This is the principal rule governing possibilistic constraint propagation.
For symbolic part, we have:
f(X) is A
g(X) is B
For computational part, we have:

$$\mu_B(v) = \sup_u(\mu_B(f(u)))$$

subject to $$v = g(u)$$

Note. The extension principle is a primary deduction rule in the sense that many other deduction rules are derivable from the extension principle. An example is the following rule.

(e) Basic probability rule:
For symbolic part, we have:
Prob(X is A) is B
Prob(X is C) is D
For computational part, we have:

$$\mu_D(v) = \sup_r\left(\mu_B\left(\int_U \mu_A(u) r(u)\, du\right)\right)$$

subject to $$v = \int_U \mu_C(u) r(u)\, du,$$

$$\int_U r(u)\,du = 1.$$

X is a real-valued random variable; A, B, C, and D are fuzzy sets: r is the probability density of X; and U={u}. To derive this rule, we note that $$\text{Prob}(X \text{ is } A) \text{ is } B \to \int_U r(u)\mu_A(u)\,du \text{ is } B$$

$$\text{Prob}(X \text{ is } C) \text{ is } D \to \int_U r(u)\mu_C(u)\,du \text{ is } D$$

which are generalized constraints of the form
f(r) is B
g(r) is D.

Applying the extension principle to these expressions, we obtain the expression for D which appears in the basic probability rule.

(f) Bimodal interpolation rule:

The bimodal interpolation rule is a rule which resides in the Probability module of DDB. The symbolic and computational parts of this rule are:

Symbolic parts:
Prob(X is Ai) is Pi
Prob(X is A) is Q
where i=1, ..., n
Computational parts:

$$\mu_Q(v) = sup_r\left(\mu_{P1}\left(\int_U \mu_{A1}(u)r(u)\,du\right) \wedge \ldots \wedge \mu_{Pn}\left(\int_U \mu_{An}(u)r(u)\,du\right)\right)$$

subject to $$v = \int_U \mu_A(u)r(u)\,du$$

$$\int_U r(u)\,du = 1$$

In this rule, X is a real-valued random variable; r is the probability density of X; and U is the domain of X.

Note: The probability rule is a special case of the bimodal interpolation rule.

What is the expected value, E(X), of a bimodal distribution? The answer follows through application of the extension principle:

$$\mu_{E(X)}(v) = sup_r\left(\mu_{P1}\left(\int_U \mu_{A1}(u)r(u)\,du\right) \wedge \ldots \wedge \mu_{Pn}\left(\int_U \mu_{An}(u)r(u)\,du\right)\right)$$

subject to $$v = \int_U u\,r(u)\,du$$

$$\int_U r(u)\,du = 1$$

Note. E(X) is a fuzzy subset of U.

(g) Fuzzy-graph interpolation rule:

This rule is the most widely used rule in applications of fuzzy logic. We have a function, Y=f(X), which is represented as a fuzzy graph. The question is: What is the value of Y when X is A? The $A_i$, $B_i$ and A are fuzzy sets.

Symbolic part is:
X is A
Y=f(X)
f(X) isfg $\Sigma_i A_i \times B_i$
Y is C
Computational part is:

$$C = \Sigma_i m_i \hat{} B_i,$$

where $m_i$ is the degree to which A matches $A_i$ $$m_i = sup_u(\mu_A(u) \hat{} \mu_{Ai}(u)),$$

i=1, ..., n.

When A is a singleton, this rule reduces to
X=a
Y=f(X)
f(X) isfg $\Sigma_i A_i \times B_i$
i=1, ..., n.
Y=$\Sigma_i \mu_{Ai}(a) \hat{} B_i$.

In this form, the fuzzy-graph interpolation rule coincides with the Mamdani rule—a rule which is widely used in control and related applications.

In the foregoing, we have summarized some of the basic rules in DDB which govern generalized constraint propagation. A few examples of such rules are the following.

(a) Probabilistic extension principle:
f(X) isp A
g(X) isr ?B (b) Usuality-qualified extension principle:
f(X) isu A
g(X) isr ?B (c) Usuality-qualified fuzzy-graph interpolation rule:
X is A
Y=f(X)
f(X) isfg $\Sigma_i$ if X is $A_i$ then Y isu $B_i$
Y isr ?B (d) Bimodal extension principle:
X isbm $\Sigma_i \backslash Ai$
Y=f(X)
Y isr ?B (e) Bimodal, binary extension principle:
X isr R
Y iss S
Z=f(X,Y)
Z ist T In the instance, bimodality means that X and Y have different modalities, and binary means that f is a function of two variables. An interesting special case is one in which X is R and Y isp S.

The deduction rules which were briefly described in the foregoing are intended to serve as examples:

(a) The Robert example:

p: Usually Robert returns from work at about 6:00 pm. What is the probability that Robert is home at about 6:15 pm?

First, we find the protoforms of the data and the query.
Usually Robert returns from work at about 6:00 pm
→Prob(Time(Return(Robert)) is *6:00 pm) is usually
which in annotated form reads
→Prob(X/Time(Return(Robert)) is A/*6:00 pm) is B/usually Likewise, for the query, we have
Prob(Time(Return(Robert)) is ≤∘*6:15 pm) is ?D
which in annotated form reads
→Prob(X/Time(Return(Robert)) is C/≤∘*6:15 pm) is D/usually Searching the Deduction Database, we find that the basic probability rule matches the protoforms of the data and the query Prob(X is A) is B Prob(X is C) is D where $$\mu_D(v) = \sup_g \left( \mu_B \left( \int_U \mu_A(u) g(u) \, du \right) \right)$$

subject to $$v = \int_U \mu_C(u) g(u) \, du$$

$$\int_U g(u) \, du = 1$$

Instantiating A, B, C, and D, we obtain the answer to the query:

Probability that Robert is home at about 6:15 pm is D, where:

$$\mu_D(v) = \sup_g \left( \mu_{usually} \left( \int_U \mu_{*6:00\,pm}(u) g(u) \, du \right) \right)$$

subject to $$v = \int_U \mu_{\leq *6:15\,pm}(u) g(u) \, du$$

and $$\int_U g(u) \, du = 1$$

(b) The tall Swedes problem:
We start with the data
p: Most Swedes are tall.
Assume that the queries are:
q1: How many Swedes are not tall
q2: How many are short
q3: What is the average height of Swedes In our earlier discussion of this example, we found that p translates into a generalized constraint on the count density function, h. Thus:

$$p \to \int_a^b h(u) \mu_{tall}(u) \, du,$$

is most

Precisiations of q1, q2 and q3 may be expressed as $$q1: \to \int_a^b h(u) \mu_{not\text{-}tall}(u) \, du$$

$$q2: \to \int_a^b h(u) \mu_{short}(u) \, du$$

$$q3: \to \int_a^b u h(u) \, du.$$

Considering q1, we note that $$\mu_{not\text{-}tall}(u) = 1 - \mu_{tall}(u).$$

Consequently $$q1: \to 1 - \int_a^b h(u) \mu_{tall}(u) \, du$$

which may be rewritten as
q2→1-most
where 1-most plays the role of the antonym of most.
Considering q2, we have to compute $$A: \int_a^b h(u) \mu_{short}(u) \, du$$

given that $$\left( \int_a^b h(u) \mu_{tall}(u) \, du \right) \text{ is most.}$$

Applying the extension principle, we arrive at the desired answer to the query:

$$\mu_A(v) = \sup \left( \mu_{most} \left( \int_a^b \mu_{tall}(u) h(u) \, du \right) \right)$$

subject to $$v = \int_a^b \mu_{short}(u) h(u) \, du$$

and $$\int_a^b h(u) \, du = 1.$$

Likewise, for q3 we have as the answer $$\mu_A(v) = \sup_u \left( \mu_{most} \left( \int_a^b \mu_{tall}(u) h(u) \, du \right) \right)$$

subject to $$v = \int_a^b u h(u) \, du$$

and $$\int_a^b h(u) \, du = 1.$$

As an illustration of application of protoformal deduction to an instance of this example, consider:
p: Most Swedes are tall
q: How many Swedes are short?
We start with the protoforms of p and q (see earlier example):
Most Swedes are tall→1/n Σ Count(G[A is R]) is Q
?T Swedes are short→1/n Σ Count(G[A is S]) is T,
where $$G[A] = \Sigma_i \text{Name}_i / A_i, \, i = 1, \ldots, n.$$

An applicable deduction rule in symbolic form is:
1/n Σ Count(G[A is R]) is Q
1/n Σ Count(G[A is S]) is T The computational part of the rule is expressed as $$1/n \sum_i \mu_R(A_i) \text{ is } Q$$

$$1/n \sum_i \mu_S(A_i) \text{ is } T$$

where $$\mu_T(v) = \sup_{A_i, \ldots, A_n} \mu_Q\left(\sum_i \mu_R(A_i)\right)$$

subject to $$v = \sum_i \mu_S(A_i).$$

What we see is that computation of the answer to the query, q, reduces to the solution of a variational problem, as it does in the earlier discussion of this example in which protoformal deduction was not employed.

The foregoing examples are merely elementary instances of reasoning through the use of generalized constraint propagation. What should be noted is that the chains of reasoning in these examples are very short. More generally, what is important to recognize is that shortness of chains of reasoning is an intrinsic characteristic of reasoning processes which take place in an environment of substantive imprecision and uncertainty. What this implies is that, in such environments, a conclusion arrived at the end of a long chain of reasoning is likely to be vacuous or of questionable validity.

Deduction (Extension) Principle

Underlying almost all examples involving computation of an answer to a question, is a basic principle which may be referred to as the Deduction Principle. This principle is closely related to the extension principle of fuzzy logic.

Assume that we have a database, D, and database variables $X_1, \ldots, X_n$, with $u_i$ being a generic value of $X_i$, (i=1, ..., n).

Suppose that q is a given question and that the answer to q, Ans(q), is a function of the $u_i$.

$$\text{Ans}(q) = g(u_1, \ldots u_n), u = (u_1, \ldots, u_n).$$

I do not know the exact values of the $u_i$. My information about the $u_i$, $I(u_1, \ldots, u_n)$, is a generalized constraint on the $u_i$. The constraint is defined by its test-score function $$ts(u) = f(u_1, \ldots, u_n).$$

At this point, the problem is that of constraint propagation from ts(u) to g(u). Employing the extension principle, we are led to the membership function of the answer to q. More specifically, $$\mu_{\text{Ans}(q)}(v) = \sup_u (ts(u))$$

subject to $$v = g(u)$$

This, in brief, is the substance of the Deduction Principle.

As a simple illustration, let us consider an example that was discussed earlier. Suppose that q: What is the average height of Swedes. Assume that D consists of information about the heights of a population of Swedes, $\text{Swede}_1, \ldots, \text{Swede}_n$, with height of i-th Swede being $h_i$, i=1, ..., n. Thus, average height may be expressed as $$\text{Ave}(h) = (1/n)(h_1 + \ldots + h_n).$$

Now, I do not know the $h_i$. What I am given is the datum d: Most Swedes are tall. This datum constrains the $h_i$. The test-score of this constraint is $$ts(h) = \mu_{most}((1/n)(\Sigma_i \mu_{tall}(h_i))),$$

$$h = (h_1, \ldots, h_n).$$

The generalized constraint on the $h_i$ induces a generalized constraint on Ave(h). Thus:

$$\mu_{\text{Ave}(h)}(v) = \sup(\mu_{most}((1/n)(\Sigma_i \mu_{all}(h_i)))),$$

$h = (h_1, \ldots, h_n)$, subject to:

$$v = ((1/n)(\Sigma_i h_i)).$$

More Search Engine Examples:

Let's consider a search engine query in which a person age is desired. For example, the question is: "What is the age of Mary?" or "How old is Mary?" or "What is Mary's age?"

Templates

This question can be scanned or parsed, to extract its components, as (for example) in the following shorthand notation or format: "Mary/Age?" The parsing is done using many templates for recognition of the pattern or grammar for a specific language (e.g. American English), dialect, topic (e.g. political topic), or method and type of speech (e.g. written, as opposed to spoken information or question). The templates are stored and designed by linguists or experts, in special databases beforehand, to be able to dissect the sentences into its components automatically later on, and extract the relevant and important words and information. The degree of matching to a specific template (e.g. for English grammar), to find (for example) the subject and the verb in the sentence, is done by fuzzy membership function and other fuzzy concepts described elsewhere in this disclosure.

One example for the template is that the symbol "?" at the end of an English sentence "usually" indicates a "question" type sentence. (The concept of "usually" (or similar concepts) is addressed elsewhere in this disclosure.)

For question-type sentences, one can have the following template (as a simple example) for the question "How old is Mary?":

(how old?/verb (to be)/noun (person's name))

That simplifies to: (how old?/person's name)

Or, equivalently, one can get this template: (age?/person's name)

Or, equivalently, one can get this template: (Mary K. Jones/human/Age?)

For a regular sentence of "Mary is 40 years old.", we will have the following template, as an example: (Noun (person's name)/verb (to be)/number/years/age)

Using the keywords or flag words (e.g. the usage of verb "is"), that simplifies to:

(person's age/number/years)

Or, equivalently, one can get this template: (Mary K. Jones/Age/40/years)

Or, equivalently, one can get this template: (Mary K. Jones/Age/40 years)

Obviously, many other choices of templates and grammar also work here, as long as there is consistency and brevity in the definitions and templates, to reduce the size and get the common features for batch processing, faster search, faster data extraction, better data presentation, and more efficient data storage. The good thing about templates is that it makes the translation between different human languages (or translation between speech and computer commands) much easier, as they tend to carry only pure necessary (bare bone) information, without extra words, in a predetermined order or format, for fast and efficient access, search, and comparison.

Removal of Ambiguities

First of all, there is an ambiguity as which Mary we are talking about. If the prior conversation or context of the conversation makes it clear that we are talking about a specific Mary or person, e.g. "Mary Jones", then the search does not have to get the age of all people with that name or nickname that it can find, and the search will be limited (in scope) to the age of Mary Jones, only. Of course, if there are more than one persons with the name of "Mary Jones", one has to search for other identifiers or distinguishing parameters, such as her middle name, middle initial, age, social security number, address, father's name, husband's name, neighbor's name, friend's name, graduation date from high school, name of high school, nickname, pictures, tags on pictures, voice sample, fingerprint chart, other biometrics, or employee ID number, to remove the ambiguity, if possible.

Another information from context or background base knowledge is that Mary is a human, and not the name of a pet or doll, in which case the search would be diverted to another domain of age determination (e.g. for pets or dolls). Now, let's assume, for this example, that the context of the conversation or background knowledge (database) dictates or indicates that Mary is the name of a person, and furthermore, we are talking about Mary K. Jones, specifically. Thus, the question becomes: "Mary K. Jones/human/Age?"

In addition, for humans, one can distinguish male names from female names for majority of the names, stored in corresponding female and male (or human) name databases. Thus, we will have the following question: "Mary K. Jones/human/female/Age?" This is such a common question that we have a template in our template database for this type of questions: "human/female/Age?" or "human/Age?" Let's now consider the template "human/female/Age?" for this example. For our question template "human/female/Age?", we will have relevant data and relevant questions, associated with such a template, designed or input previously by humans, community users, search engine company, or the computer (automatically, based on the prior results and training or learning from the past associations in similar situations or relationships), into the template relational database(s).

The relevancy and reliability of sources of information (or information itself) are discussed elsewhere in this invention disclosure, using fuzzy systems (and Z-numbers). So, we will not repeat those formulations here again.

Relevant Questions

The examples of relevant questions are shown below. These are linked to the template "human/female/Age?", by linguists, or machine/computers trained for this purpose, using neural networks and fuzzy logic system combination, forming relational databases, that grows in size by experience and time/training, manually, automatically, or both.

"What is the age of the person's kid(s)?" or "What is the age of the person's oldest kid?" (Because, usually, one has kids within some age range. For female humans (in today's standard) (living in US), for non-adopted kids, mother's age is usually in the range of 18 to 45 years old, with a membership function that is not flat, more or less in trapezoidal shape. Thus, the oldest kid's age is a very relevant question or piece of information.)

"What year did the person graduate from high school (or college)?" (Because people in US normally graduate from high school around the ages of 17-19, with a corresponding membership function.)

"When did the person buy a house (or his or her first house)?" (Because a female person in US (or at different regions of US, or in certain city, or within a certain income bracket or job classification) buys her first house at a certain age, say, for example, around the ages 25-35, with a corresponding membership function.)

"How old is the person's best friend?" (Because, "generally", each person is about the same age as her/his best friend, with a corresponding membership function.)

(Please note that the concept of "generally" (or similar concepts) is addressed elsewhere in this disclosure.)

"How old is the person's pet?" (Because, usually, one's pet is younger than himself or herself, with a corresponding membership function.)

"How old are the person's parents?" (Because, usually, one is younger than his or her parents by about 20 to 45 years, with a corresponding membership function.)

Combining all the questions above (and their answers or similar information), one can get a good estimate of the person's age, using fuzzy concepts shown in this disclosure. In addition, using a relevance scoring system, one can filter and find all or most relevant questions. Each relevant question can in turn refer to another relevant question or information, as a cascade and chain, bringing or suggesting more questions and information for the user. The history of the user or history of the users or history of similar or same question(s) can be stored in some relational databases with relevance scoring, for future filtering and usage, based on a threshold. The system is adaptive and dynamic, as well as having learning/training mode, because as the time passes, with more experience and history, the database gets more accurate and larger in size, to fit or find the questions or relevant information better and faster.

Similarly, for answers or information available, one can find relevant information, using a membership function for relevance degree. Some examples for answers or information are:

"The age of Mary K. Jones's oldest child (or kid) is 15."
"Mary K. Jones graduated from high school in 1989."
"Mary K. Jones bought her first house in about 1996."
"Mary K. Jones's best friend is most likely 35 years old."
"Mary K. Jones's dog is roughly 10 years old."
"Mary K. Jones's mother is about 70 years old."

Sometimes, one gets the age of Mary K. Jones indirectly, through the information about her best friend's parent's age, which typically has less relevance and less credibility, in the chain of connected information. However, in this disclosure, we have shown the tools to treat and analyze/process all of those situations and information, with different degrees of relevance and credibility, using fuzzy concepts, such as membership functions for corresponding parameters.

Note that to search information and questions, one can use the following templates for the following sentences, as examples:

"Mary K. Jones's dog is roughly 10 years old." is converted to the template: (person/person's pet/pet's age/roughly/10 years), which is stored in relational databases, which can be queried, compared, aggregated, edited, combined, re-named, indexed, or re-ordered.

"How old is the person's pet?" is converted to the template: (person/person's pet/pet's age?), which is stored in relational database(s) or template storage.

Figure 64:
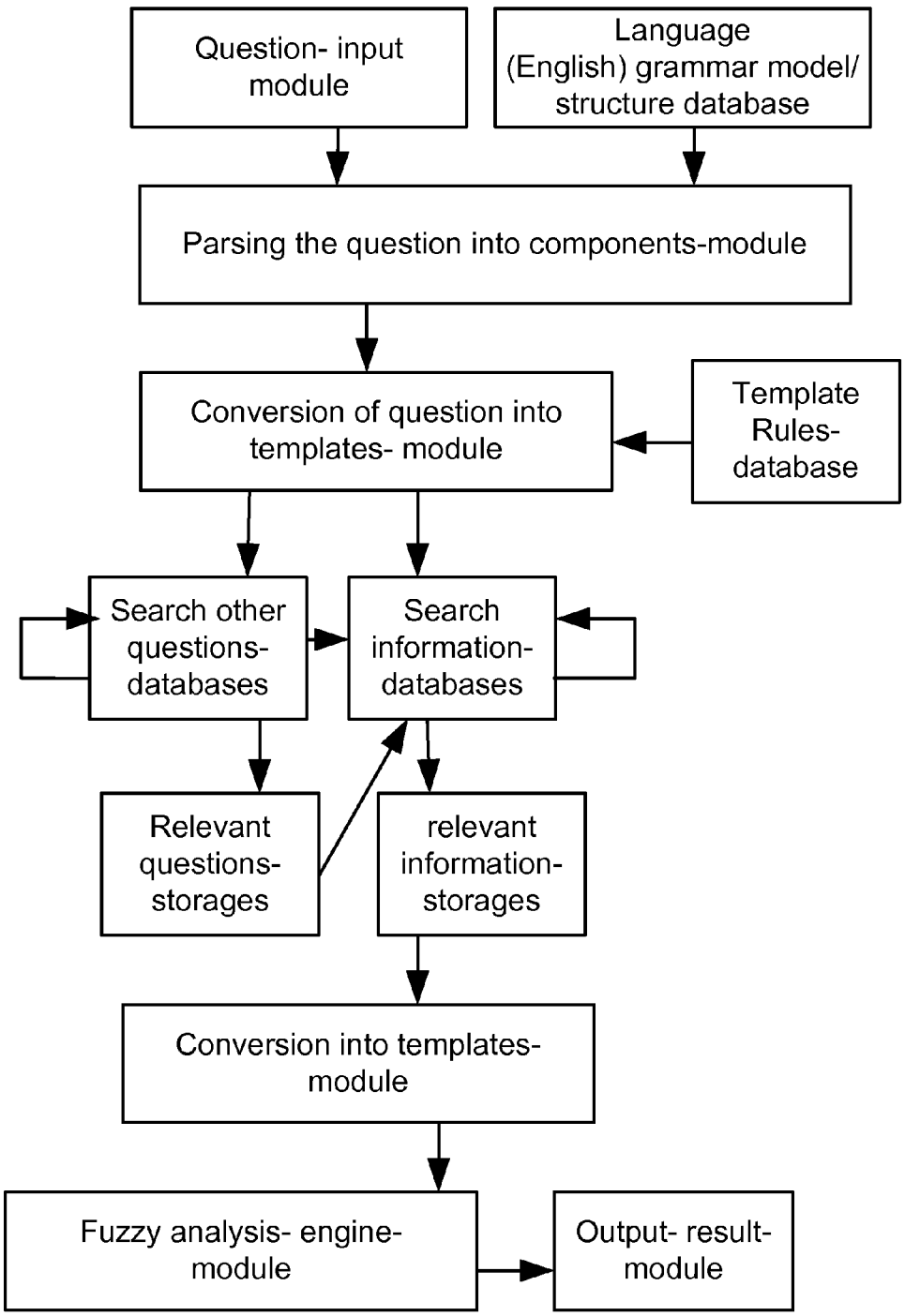
FIG. 64 is a system for the search engine.

FIG. 64 is a system for the search engine explained above. The fuzzy analysis engine is used to find Mary's age from all the received information. The scores, thresholds, and membership functions are used in the fuzzy analysis engine, as explained elsewhere in this disclosure.

Another example for the search engine is an inquiry about Mary's house: "How much is the price of Mary's house?" To analyze this question, a process and system similar to the one given above is followed. However, in this case, in addition, we have some predetermined templates for links to relevant web sites or government information repositories. For example, for price of the house, the average price of the houses (the trend) for US, city, region, county, and specific street or neighborhood become relevant, as well as, inflation, housing indices reported by Wall Street Journal or the US Government (e.g. the new permits issued for the last quarter or the current inventory of the new or old houses), and the size and details of Mary's house (such as the number of floors, number of garages, number of bedrooms, age of the house, and square feet of the land and living area), plus the recent real estate activities in the same area for similar size houses (from real estate repositories or county records for recent transactions). The prior sale prices of Mary's house, if any, with corresponding dates, are also relevant information.

Therefore, one needs some indices and data from newspapers, US Government, local government, county records, and real estate databases. These data are usually directly or indirectly available for search engines (assuming they are not protected by password or only available on subscription basis, which may need human intervention and input). The indirect ones may require proper question or another relevant data (or intermediary information) to link with the final answer. Thus, at the beginning, the people experts in economy and real estate are needed to design and set the links and relationships (or mathematics formulas and fuzzy rules or relationships between different parameters), as the initialization step. However, if similar concepts already exist in the rules and patterns or templates, the machines can initialize the new search links and populate the relationships, automatically, without any human intervention or input. The updates for the links or feedbacks can be done periodically by humans or users, or automatically by machines, e.g. by feedback from the history using a learning machine (e.g. using neural networks, trained to update the links or improve them, gradually, based on prior scores and past performances).

Figure 66:
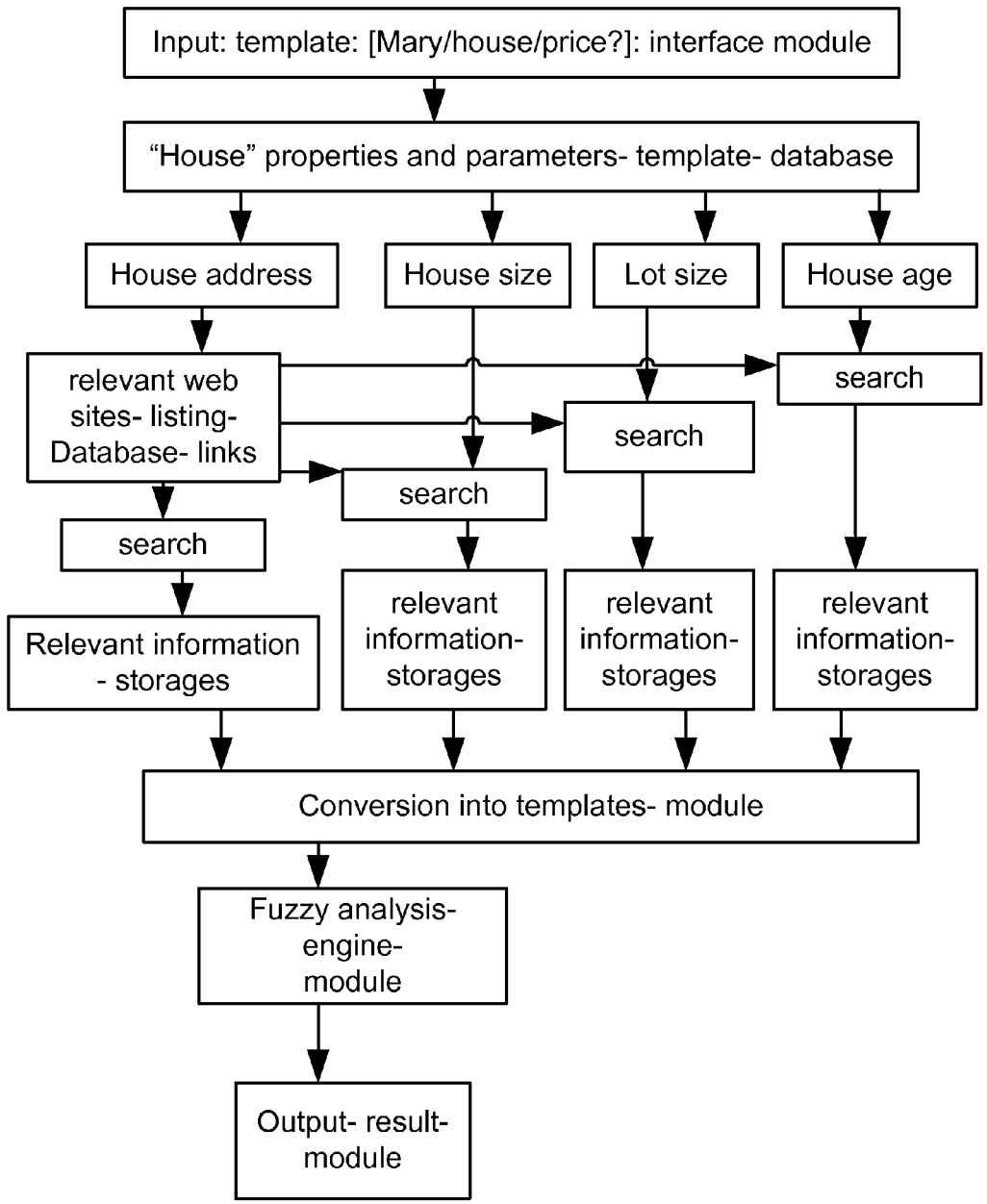
FIG. 66 is a system for the search engine.

In the above example, the most important piece of information is probably the address of the house. A system for this example is shown in FIG. 66 (with the template (Mary/ house/ price?), which is a question about the price of Mary's house). So, after finding which Mary we are talking about, we need to find the address of the house, or remove the ambiguities as much as possible, to narrow down the possibilities for the addresses, which can be expressed by the membership functions, e.g. in discrete mode, as a discrete function. Most databases and data mentioned above are expressed in terms of the house address and zip code, as shown in FIG. 66, where the search for the parameter "address" is helping the searches related to the other parameters, e.g. as an intermediate parameter to get to the other parameters.

Figure 65:
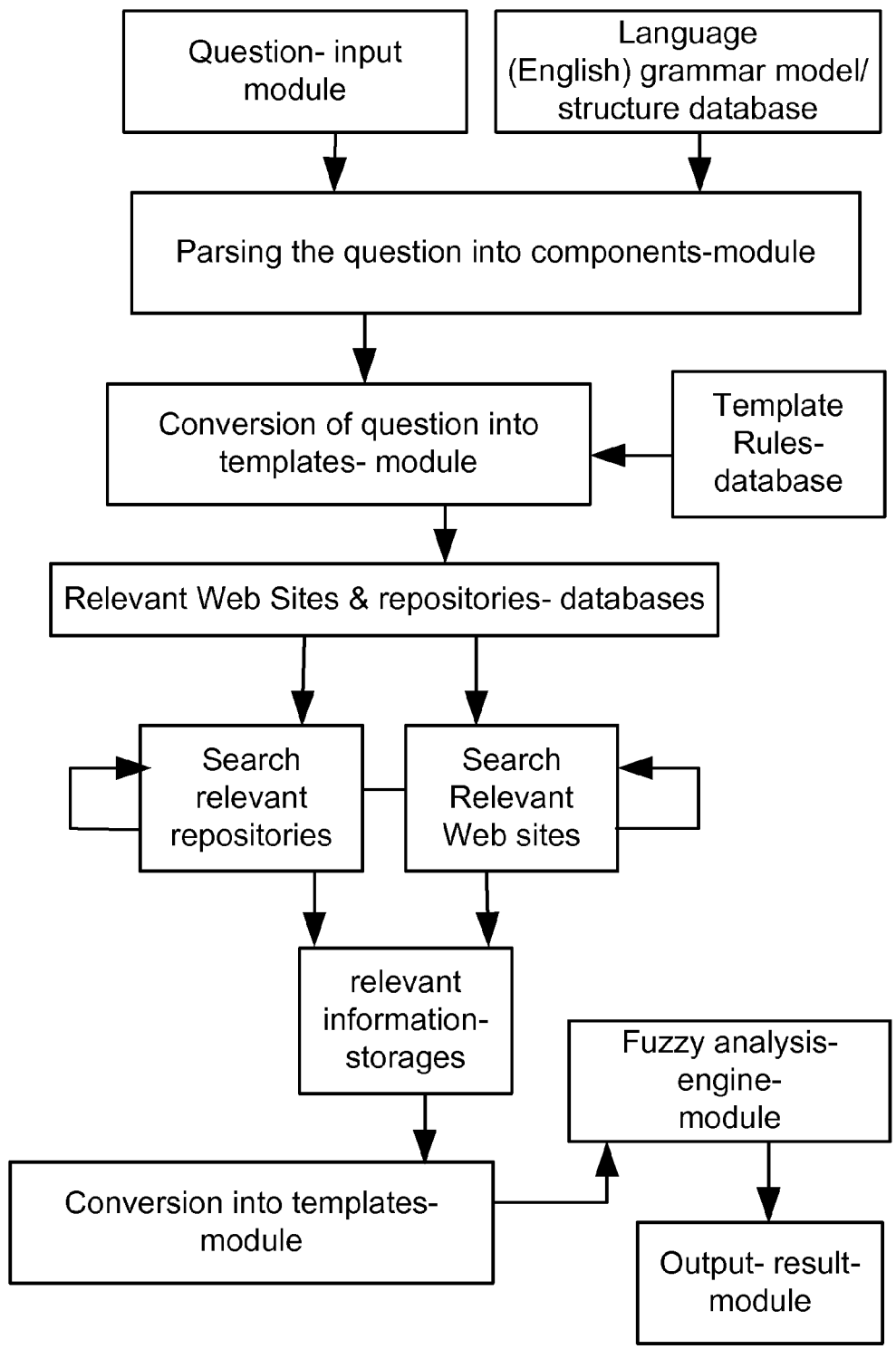
FIG. 65 is a system for the search engine.

So, after finding the address(es), the search engine is focused on any relevant information related to the found address, especially targeting the focused web sites and pre-determined repositories that probably contain relevant and reliable information, as mentioned above. In case of multiple addresses, if we cannot resolve the real address among the multiple possible addresses (or if Mary may actually own multiple houses), we end up having a list of (multiple) possible addresses and their corresponding prices, with some certainty (or confidence) value or membership function, associated with each found address (and its corresponding price). The additional system components in this example are captured in FIG. 65 (in addition to our teachings of FIG. 64).

Another example for the search engine is an inquiry about the price of a car: "How much is the price of a low mileage 1991 Ford Mustang?" or "How much does a 1991 Ford Mustang (in a good condition) worth?" To analyze this question, a process and system similar to the one given above is followed. However, in this case, in addition, we have some predetermined templates for links to relevant web sites or commercial (or standard) information repositories, such as E-Bay web site, auction web sites, used car dealers, car advertisement or newspapers' web sites, car collectors' web sites, car magazines' web sites, reliable car blogs, car experts' web sites, or Blue Book values for cars.

In addition, the mileage on the car, car condition, and details of the car are also relevant. In this case, we know that the car has a low mileage (or is in good condition), which is a fuzzy statement, with its corresponding membership values and function regarding mileage (and/or condition) of the car. The fuzzy analysis is discussed elsewhere in this disclosure. We do not know the exact details of the car, for example, the options or extra features on the car. Thus, we probably get a range of values for the car (to include various options or features).

Updating Information

History and the results of the same or similar questions asked or searched earlier by others can be stored by the search engine company (or others) on different repositories for fast retrieval or updates. Some questions have answers which are time-dependent, such as the value of a dollar with respect to Euro's, which changes every day or every hour. Some answers do not change that much (or not at all). For example, the capital of France is Paris, and it probably does not change very often or very soon. Or, (2+2) is always 4 (in conventional mathematics). So, one can separate these questions into at least 7 categories (which is a fuzzy concept by itself, with assigned percentages being approximate fuzzy ranges of numbers, as well). It can also be defined as a crisp range. One example is:

Things that never change. (about 0%)
Things that rarely change. (about 1-10 percent)
Things that seldom change. (about 10-25 percent)
Things that sometimes change. (about 25-75 percent)
Things that often change. (about 75-90 percent)
Things that usually change. (about 90-99 percent)
Things that always change. (about 100 percent)

Figure 67:
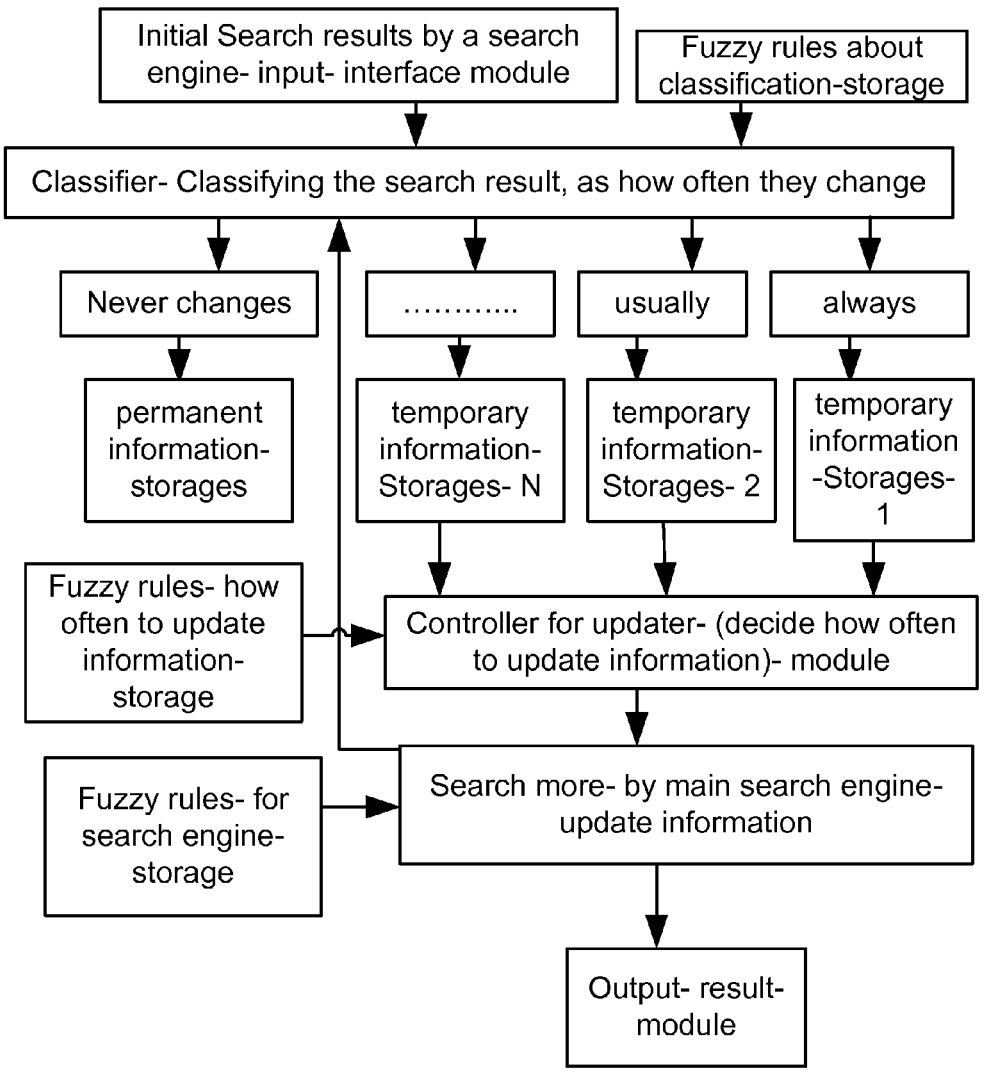
FIG. 67 is a system for the search engine.

The classification above is shown in system of FIG. 67, using a classifier module with fuzzy rules, and then updating (and looping back) the information and the assignment of the storages (to put the new data into different repositories, if applicable), for faster future search and access. In the figure, we have N temporary storage classes and one permanent storage class, based on how often they are changing, based on the corresponding fuzzy rules and predictions. The N temporary storage classes have different access time and delays (and different priorities for access), based on how often they are changing or accessed. For example, generally, temporary storages of class-1-type in the figure have the fastest access, search, and retrieval times (if all other things being equal).

For example, in one embodiment, one can store the corresponding history and past answers in repositories which have different purposes, such as "long term repository" or "daily repository". The "daily repository" is updated on a daily basis or very often. In addition, an unreliable otherwise "long term" answer (with low score or low membership value, in terms of reliability) will still be stored in a "daily repository", because it should probably be changed or updated soon. Thus, fuzzy concepts determine where we put or access the prior results or history of prior searches. In addition, generally, all things being equal, a "daily repository" has a faster access or update time, because it is used more often by the search engine, as the short term repository or database.

Figure 84:
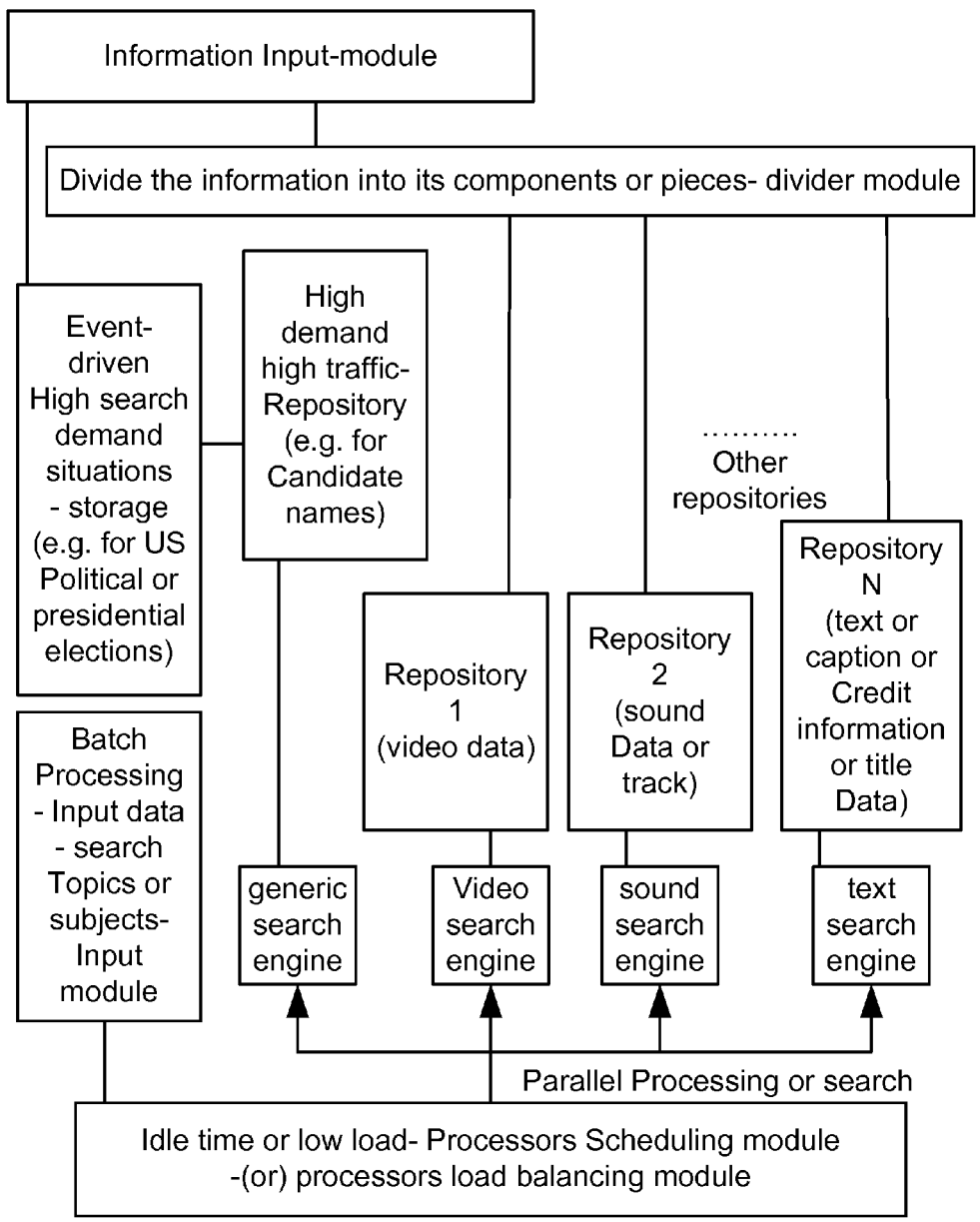

In addition, as an off-line mode, one can do batch processing in advance on future anticipated searches that are common or possible, based on some "possibility" degree (which is fuzzy value by itself), to store the information in repositories for future fast access, without too much (or not at all) processing delay. The repositories are classified based on topics they carry information for (on a fuzzy set basis). See FIG. 84 for a diagram of such system.

Also, there are some dynamic assignment and updates as to where information is stored (or be restored), for faster access, because some topics or subjects may become very much searched for in a specific period of time or on a temporary basis (e.g. political candidates' names are generally searched very often just before the elections, and the search will go down drastically right after the election). The predictor engine (which predicts or stores such trends or patterns) and assignor engine or module (which assigns or re-assigns the storage location) periodically re-evaluate and re-assign the repository locations for various subjects and topics, to be more efficient, for search and access the data. The prediction, assignment, and topics themselves are all based on fuzzy concepts and fuzzy sets. See FIG. 84 for a diagram of such system.

Furthermore, some repositories are assigned as intermediary repository, as a hierarchical structure or tree configuration, to access certain data faster. Alternatively, the data can be split up and stored in pieces for faster search or access, in a distributed fashion, due to the size of the files or the purpose of the files. For example, title, text, video, and sound related to a movie can be split and stored separately, in separate databases, servers, or repositories, where just the titles are stored in a specific server for fast access and search (by title only). Then, after the title searches are complete (with low overhead) and a specific title is selected, the pieces or components of the movie can be retrieved from various locations. For some applications, this increases the efficiency of the search engine. The classification of purposes or tasks to assign various repositories (by itself) is a fuzzy concept, with fuzzy set(s) and membership function(s). (These were addressed elsewhere in this disclosure.) See FIG. 84 for a diagram of such system.

In one embodiment, to answer the question "What is the price of Mary's house?", one tries to start from "Mary" and get to "her (Mary's) house price". But, one does not know at the beginning that which subjects are relevant and how relevant they are. For example, is the price of her car relevant? Or, is the price of her dad's house relevant information? Or, is the address of her dad's house relevant information? What is the relevancy and to what degree? Is there any general rule or relationship connecting the 2 concepts? Is there any specific rule or relationship (just for Mary) connecting the 2 concepts? If so, what is the rule or relationship connecting the 2 concepts? Should we search for the other concepts and at what length or at what expense? Now, we address the above questions.

The computational expense is generally in terms of search time and computing expenses, e.g. using total CPU power by many servers or a server farm (e.g. using the unit FLOPS (or flops or flop/s) for floating-point operations per second, as a measure of a computer's performance), to justify or gauge how far we should search for a concept, as a fuzzy limit or threshold, to stop or limit the searches. Generally, the more relevant the subject (which is a fuzzy parameter by itself), the more computational expense or time is justified, allowed, or allocated for searching that subject or topic (i.e. the threshold for how long we can search for that subject is higher).

The relevance is generally not known at the beginning So, the system guesses the best it can, and if during the search steps is proven otherwise, the relevance factor is re-adjusted accordingly (going up and down, based on the observations, performances, and satisfaction of the goals or scores, on the first search cycle). For example, the system may guess a few subjects that may be somewhat relevant to Mary's house price, but it is not sure about them. Based on the specific initial knowledge base from Mary and the general knowledge base from the Universe (all other available data), the system prioritizes those guesses and assigns some scores to those possible subjects (so that the relative or absolute computational times are determined and limited for those subjects or topics), using fuzzy rules for relevance scoring, described elsewhere in this disclosure.

Let's assume for this example that "the address of Mary's dad's house" is set as relevant (with a high degree of relevance, which is a fuzzy parameter). Then, the system tries to step forward from both sides to reach each other. This approach is similar to digging a tunnel in a big mountain, from both sides of the mountain, but without the exact GPS information, trying to get to the other side, simultaneously digging and stepping forward from both sides, using the best guesses and knowledge available for the best direction for digging (which is the same as guessing the relevance of the next step or subject, and choosing the most relevant subject(s), in the chain of relevancy, as accurate as possible, with the current knowledge we have so far, to minimize the computational power needed to get to the result (to the other side of the tunnel)). For example, now, we have "the address of Mary's dad's house", and from that, we want to get to "Mary's house price". In the next step, if we assume that "Mary's house address" is relevant to the context of this problem, then we have the following situation:

We now have "Mary's house address", and from that, we want to get to "the address of Mary's dad's house". Now, we look at the rules in our universe of rules storage, and we find that there is a strong correlation (which is another fuzzy parameter) between the address of a person and her parents, in terms of street address proximity, neighborhood, city, or zip code. So, we now can connect the two sides. That is, we can connect "Mary's house address" with "the address of Mary's dad's house". That is, from the address of her dad, we can choose the best address(es) for her house, from all possible choices so far, that "fits the best" with her dad's address (with a higher correlation factor). So, we can narrow down or pinpoint her address(es) (or choices of her addresses).

In addition, if we are dealing with 2 or more topics or subjects simultaneously, we can get to her address from 2 or more directions, adding more confidence to the final result (of her address). For example, using "her income" to get to "her address", in addition to the above, we will probably get more confidence on her address, at the end.

Figure 68:
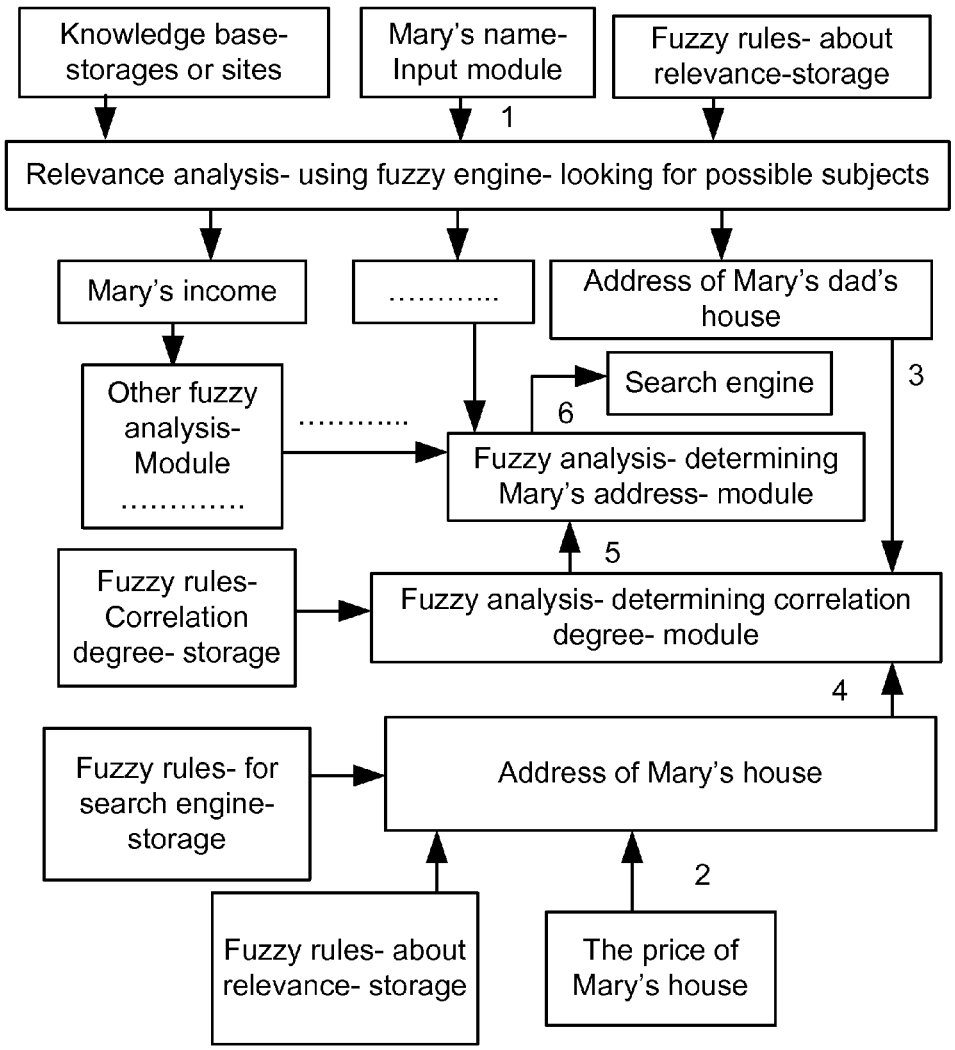
FIG. 68 is a system for the search engine.

The system described above is shown in FIG. 68, with numbers 1, 2, 3, and 4 indicating the sequence of steps of getting the 2 sides (i.e. the subjects "Mary's name" and "the price of Mary's house") approaching each other gradually, by finding the relevant information in-between in the next step, by using fuzzy analysis. Of course, in some other examples, we may need more steps in-between to connect the 2 sides together (which translates to more computing expense and power). The "Mary's income" also helps to find or ascertain the right address for Mary's home (number 5 in FIG. 68). Then, the final result for Mary's home address is fed into the search engine again, to find the price of her house (as her address is the most relevant information for indicating her house value) (number 6 in FIG. 68). Then, the result of the search engine would be the value of her house.

Figure 69:
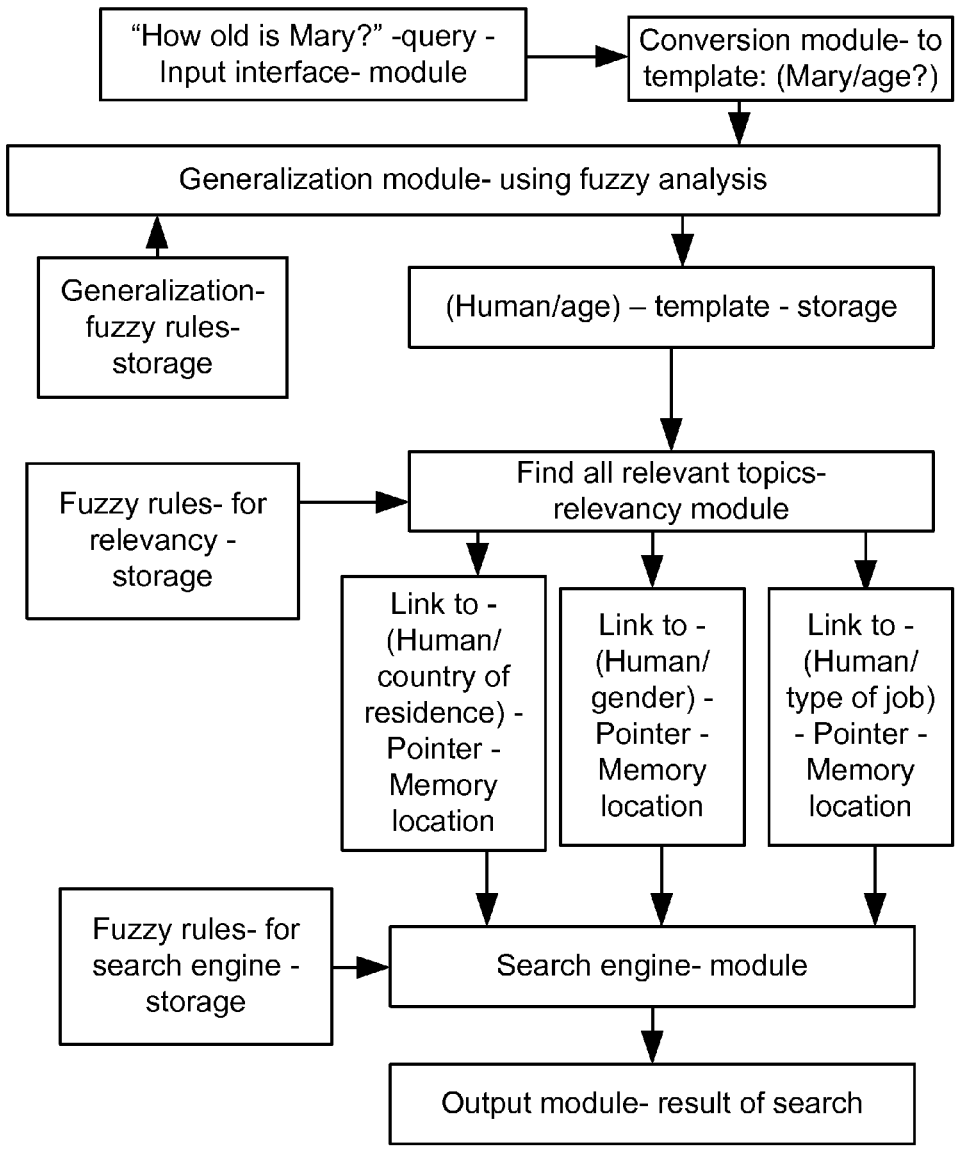
FIG. 69 is a system for the search engine.

In one embodiment, to answer the question "How old is Mary?", we are looking for relevant answers (or information, subjects, or topics) and relevant questions. If the relevant information is not readily obvious or available, we can generalize and expand the scope of the topics, to try to fish or search for new topics under the larger new scope. For example, here, we have: (Mary/age?), which can be generalized to a larger scope as: (human/age?), which (in turn) relates to (human/country of residence) & (human/gender) & (human/type of job). Therefore, we have increased our choices of relevant topics or subjects to: "country of residence", "gender", and "type of job", which were not obvious at the beginning of the analysis. Thus, we can follow those leads, for topics for the search engine, to find the possible ages (or range of ages) for Mary. This is shown in FIG. 69, where topic generalization is used to increase the scope, to find leads to better topics for the next cycle of search engine, to have a more accurate search result for the original topic or query.

Figure 83:
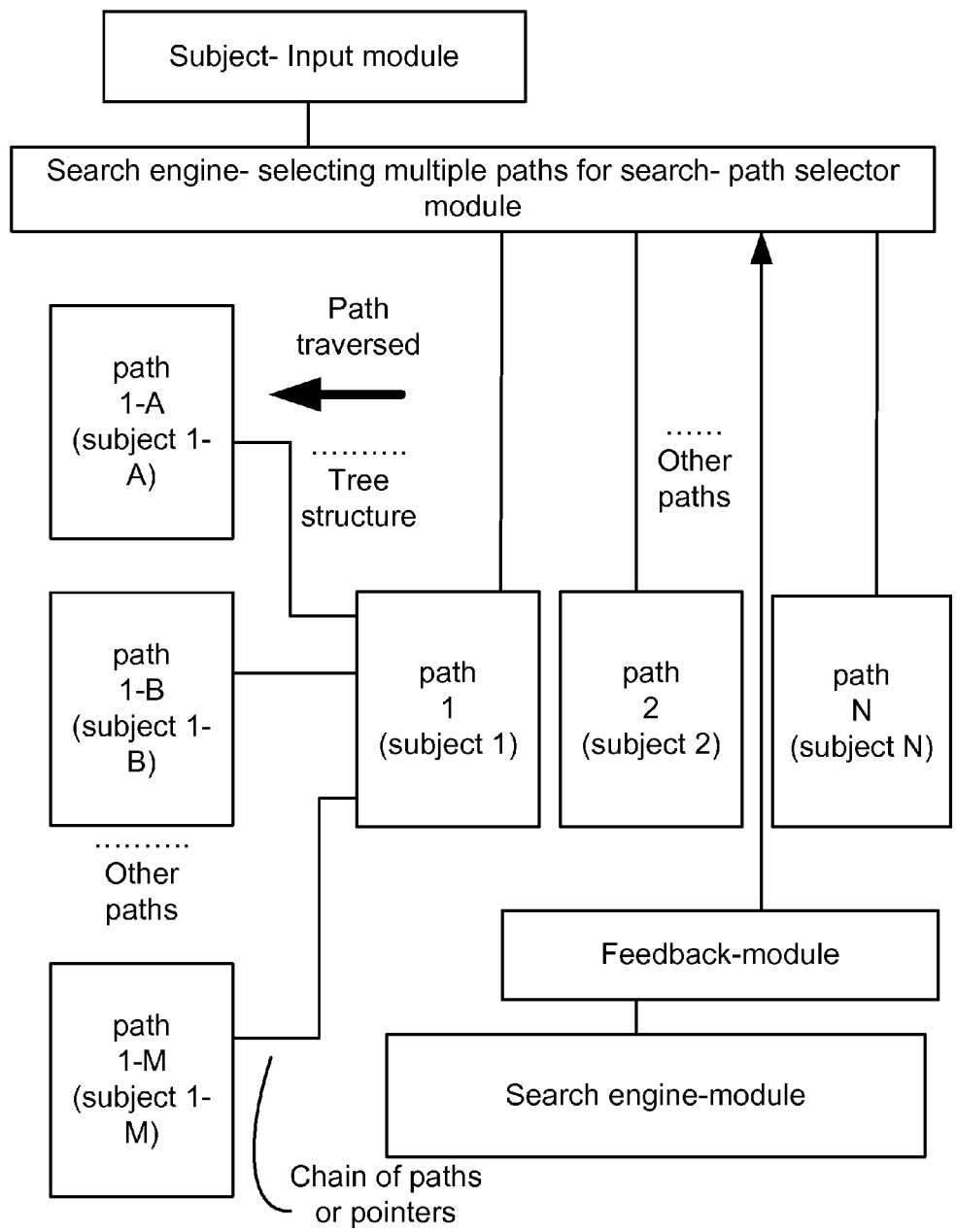
FIG. 83 is a system for the search engine.

In one embodiment, one gets to the answer(s) by following multiple paths, starting from the question template, working toward the possible answer(s). In one embodiment, users can give feedback or score answers or paths traversed, for better future path selections. See FIG. 83 for a diagram of such system.

Figure 82:
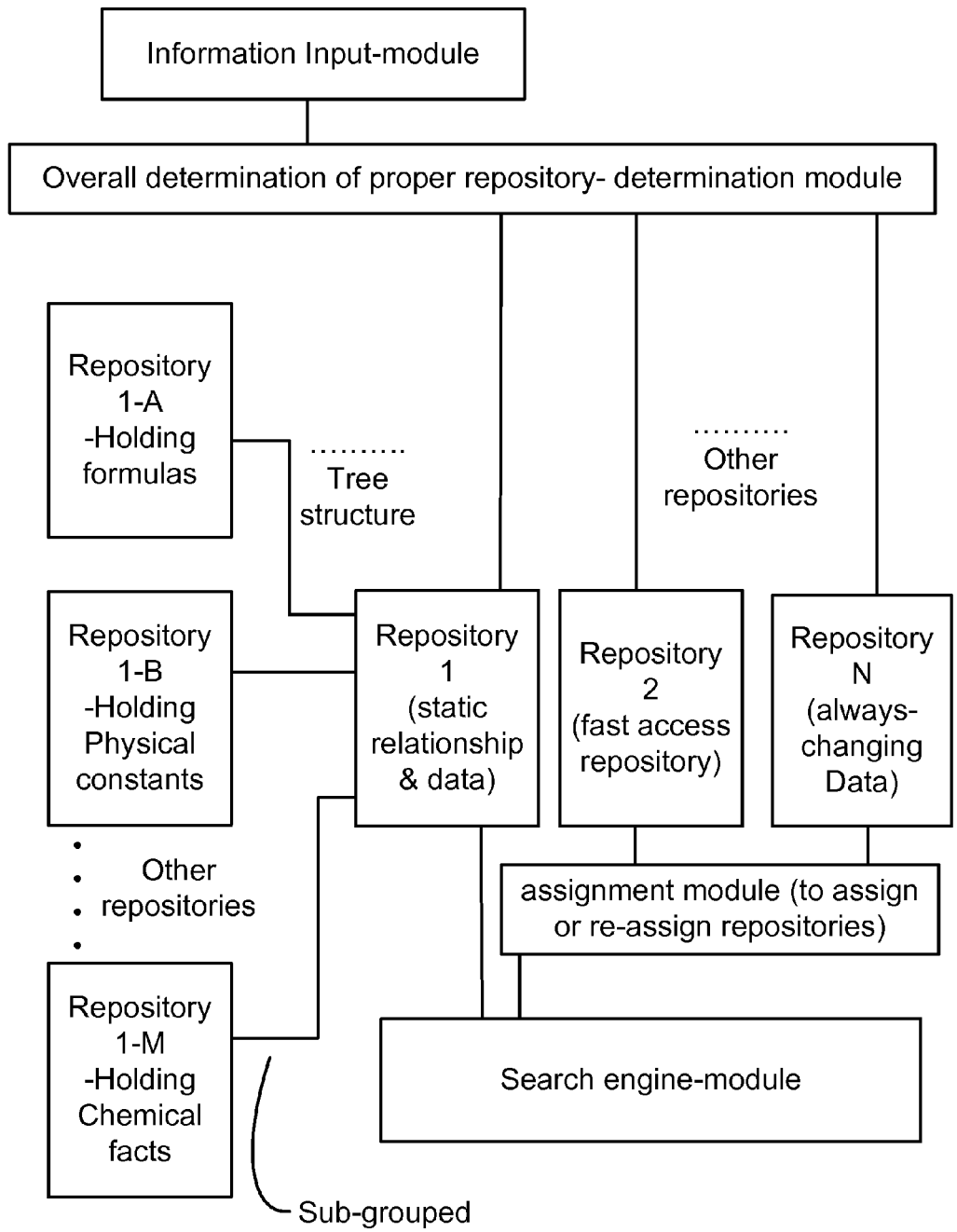
FIG. 82 is a system for the search engine.

In one embodiment, the relationships stay the same, but the inputs may constantly change, resulting in a dynamic (constantly-changing) output. For example, Gross Domestic Product (GDP) of a country and the population of a country (the inputs) constantly change. So, GDP per capita (the output) also constantly changes, but the relationship between GDP, population of the country, and GDP per capita of the country (the relationship between inputs and output) never changes. Therefore, the relationships or parameters that remain constant are stored in different repositories (compared to those of the dynamic parameters), and are accessed without any updating or verification in the future. For example, the formula for GDP per capita is always the same, for the same country or other countries, and it does not have to be updated or reviewed again, making access to that parameter or relationship much faster and less costly for the search engine. The most common or most used parameters, relationships, definitions, or topics are stored in separate repositories, which are grouped and sub-grouped in different classes and categories according to their topics, in a tree-structure or hierarchical form, for faster and easier access by the search engine. In one embodiment, the grouping is done based on fuzzy definitions and sets/subsets. See FIG. 82 for a diagram of such system.

Figure 81:
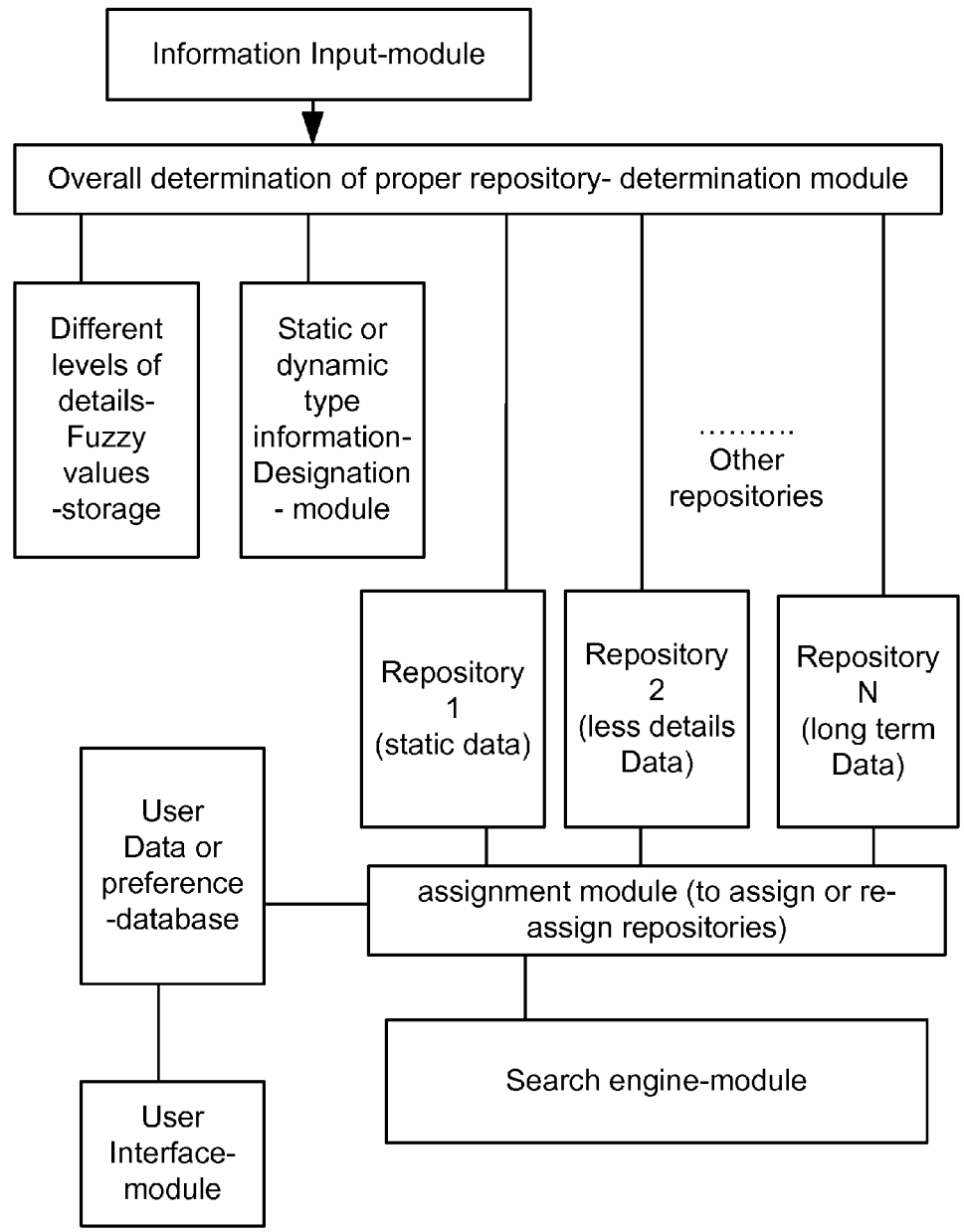
FIG. 81 is a system for the search engine.

In one embodiment, the same information may have various representations with different levels of details: $L_1, L_2, \ldots L_N$, where $L_1 < L_2 < \ldots < L_N$, in term of "level of details". So, we can store them in different repositories, available for different searches. Search and access to $L_1$ is much faster than those of $L_N$ (which carries more details). Based on the application, if it is determined that there is no need for details of $L_N$, one can choose a version with lower amount of details, such as $L_1$ or $L_2$. An example for this situation is when an image or picture is stored at different resolutions (with different sizes) at different repositories. Or, another example is when a table (or spreadsheet or database) is stored, with various sections or columns are hidden or disabled (and not stored), so that different versions of the table (with different sizes and details) are stored in different locations or repositories, and each version of the table may fit or serve different types of user, application, need, search, or query. The level of details can be expressed (by the user) as a fuzzy parameter, for the original file or data. See FIG. 81 for a diagram of such system.

In one embodiment, there are 2 types of information (static and dynamic) which yield the same result(s). For example, for Mary's age, one can store the information as "39 years old" (dynamic information, which changes every year). Or alternatively, one can store that same information as her exact birth date, as an equivalent data, which is always static (not changing). The second method or type (static information) is more useful for the future referrals. For example, once the today's date is known, the birth date is always useful (and complete information) to calculate the age of a person, whereas the age number or value (from an unknown number of years ago) (by itself) is much less useful (and less complete, to calculate the age of the person). Thus, one can store the static information separate from the dynamic information, as they are accessed differently, with different priorities, access frequencies, and degree of "usefulness" (which can be expressed by fuzzy concepts), to optimize the search engine, especially for future searches on similar topics. See FIG. 81 for a diagram of such system.

Familiar or Famous Names or Titles

Figure 80:
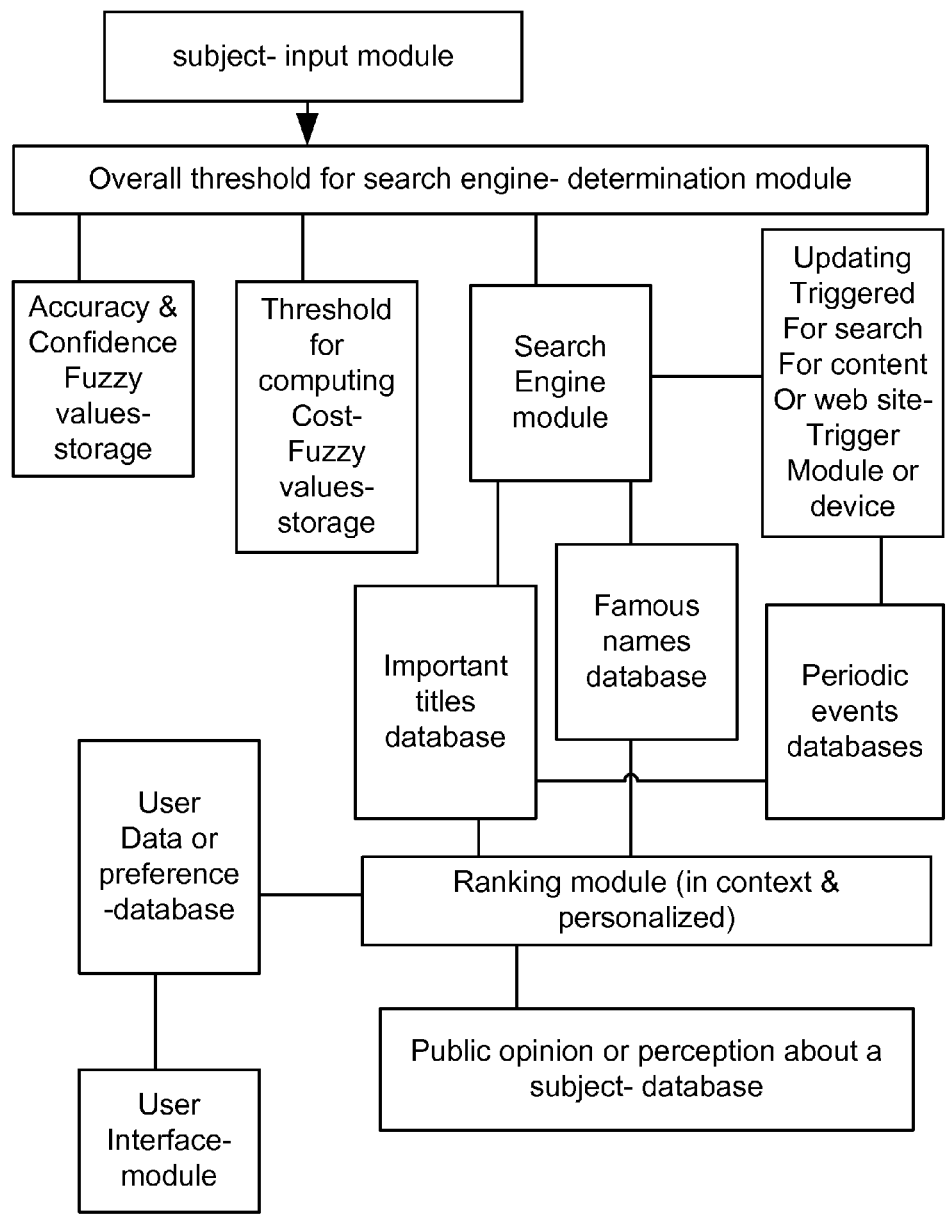
FIG. 80 is a system for the search engine.

In one embodiment, famous names and titles are stored and indexed or ranked separately, for fast and efficient access, e.g. Eiffel Tower, Clinton (referring to the former US President Clinton), Paris (referring to Paris, France), or The US President. There are 2 types of famous names and titles. The first type has a single choice only, with no ambiguity (e.g. Eiffel Tower), but the second type has more than 1 choices, with some degree of ambiguity (or membership value). For example, we have more than one city in the world called Paris, and Paris is also the name of a person, as well as the name of a Las Vegas hotel and casino. However, "Paris" by itself (without any context) most likely means "Paris, the capital city in France", as our first choice. Other choices can be ranked as a list (with some membership value), but the ranking can be changed based on the context, e.g. prior sentences, history, background, speaker, audience, or the location of the conversation. In addition, in one embodiment, the $1^{st}$ and $2^{nd}$ types are separately stored and listed, to streamline the process, for more efficient search engine access. See FIG. 80 for a diagram of such system.

In one embodiment, some titles are placeholders, e.g. The President of the United States, which is expected to have possibly different values every few years, which should be checked and updated, according to that time periodicity, e.g. every 4 years, starting from an election year in US. This means that some repositories are tagged and treated that way, for optimum performance, e.g. more accuracy and less frequency of updating of the data (or less required computing power or expense). See FIG. 80 for a diagram of such system.

In one embodiment, there are the accuracy factor and reliability factor involved in the search engine, in addition to the cost factor for computing power (used so far, for the search engine). That is, there is a threshold as to how much accuracy we need for the result (which could be a fuzzy parameter itself). As an example, we may need to find (and search for) the diameter of the planet Earth to 10 km accuracy (rather than 100 km accuracy). Thus, we generally have to do more search to get that much confidence or accuracy (with enough reliability) (i.e. for 10 km accuracy (rather than 100 km accuracy)). Another example is to find the value of real number "e" to 5 decimal point accuracy (rather than, for example, 2 decimal point accuracy). There is also a threshold as to how much computing time or money we want to spend on this search, which means that how bad we want the answer, and how long we are willing to (or allowed to) spend on this search. Thus, accuracy, reliability, confidence, and cost are some of the factors that determine the scope and depth of each search. All of these factors can be expressed as the fuzzy concepts, as explained elsewhere in this disclosure. See FIG. 80 for a diagram of such system.

Figure 79:
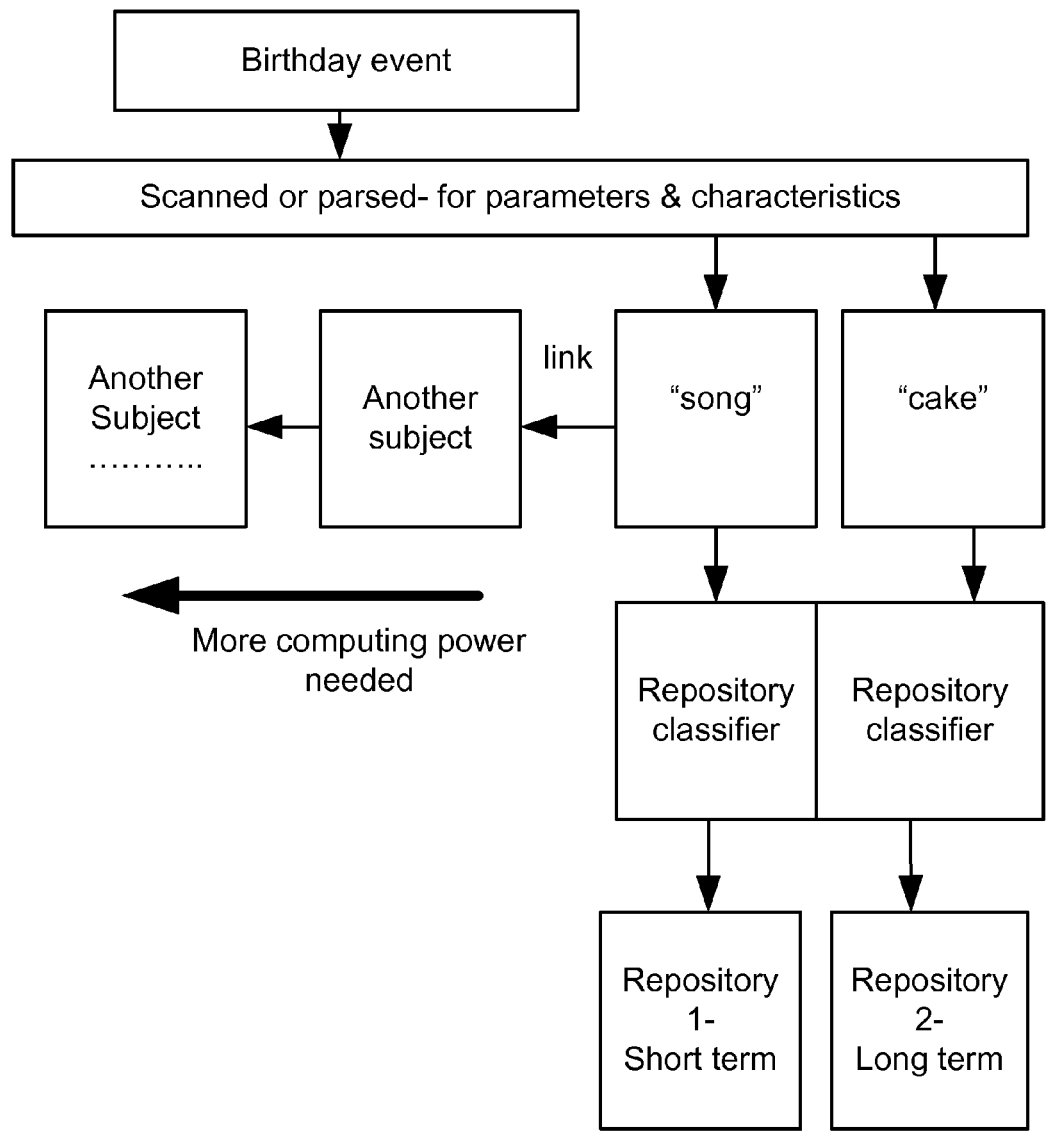
FIG. 79 is a system for the search engine.

In one embodiment, storing the prior results or calculations (or intermediate results), especially when they are requested multiple times or very often by other users or the same user, increases the efficiency of searching same or similar terms or topics in the future, similar to the way humans gain experience, learn, and store information, for future recollection. The storage and recollection of the prior information is done in multiple steps. First, the information is scanned or parsed (e.g. a birthday event for a person) for its parameters and characteristics (e.g. cake shape, cake taste, birthday song, colorful hat, friends present, and gifts received). Then, it is tagged or indexed based on those parameters and characteristics (e.g. song, cake, taste, shape, hat, gift, friend, human, and food). Then, it is stored based on the tags or indexes in proper repositories. There are multiple classes of repositories, e.g. in terms of short-term and long-term, e.g. for frequency of access or access speed for retrieval (or access speed for editing and updating information already stored). So, there is a processor or controller which makes that classification (which can be fuzzy, as well), for proper storage. See FIG. 79 for a diagram of such system.

Figure 78:
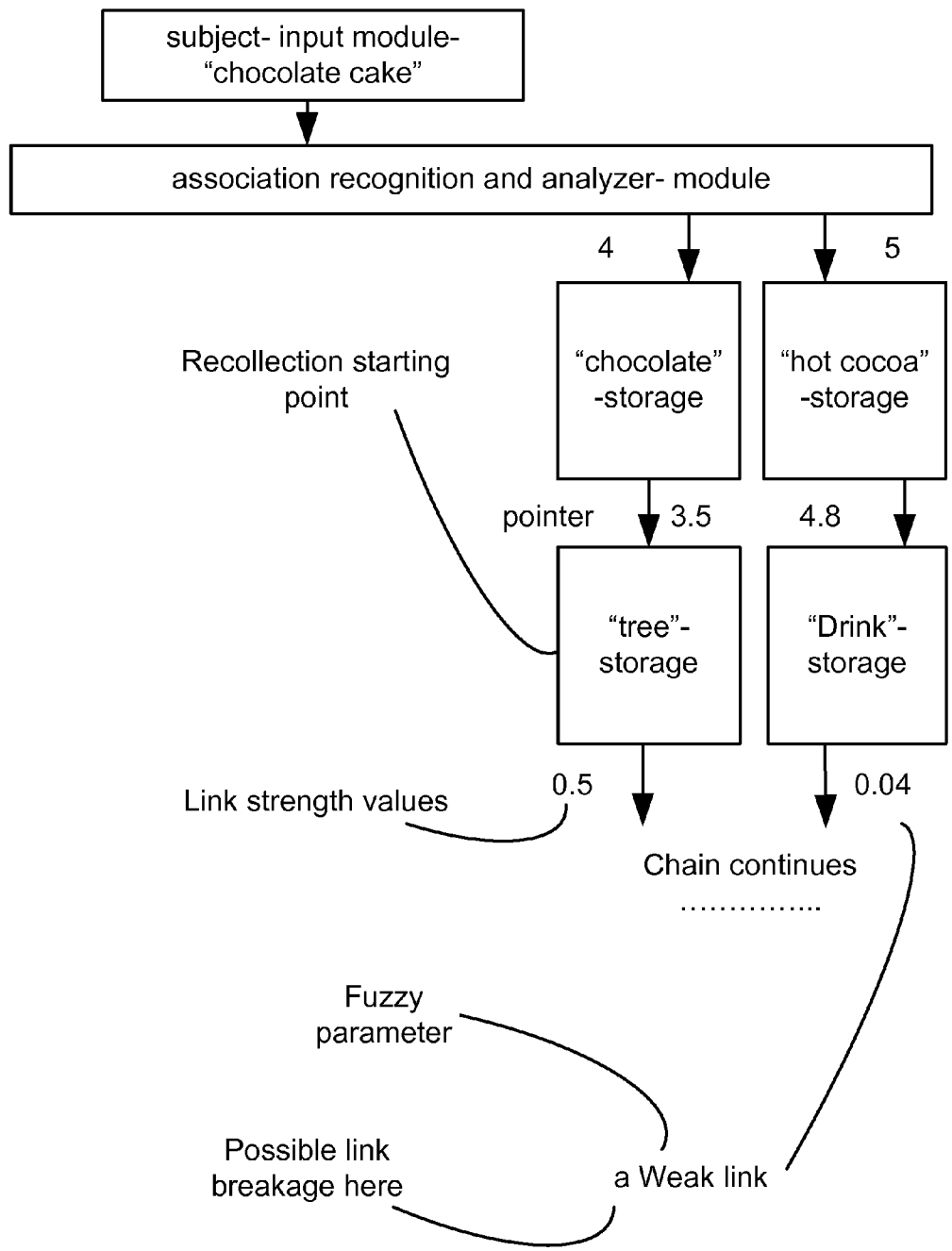
FIG. 78 is a system for the search engine.

Then, there is an association tag or pointer that points the subject to another similar subject (e.g. with a similarity degree, being expressed as a fuzzy concept, as well). For example, the taste of the cake (being a chocolate cake) is a reminder of the other subjects or topics, e.g. "chocolate" or "hot cocoa". Thus, it would point to "chocolate" or "hot cocoa", or both, with a pointer(s). In one embodiment, the association pointers can point to other subject pointers, as N cascaded or chain of pointers in series (or combination of series and parallel configurations), where N is an integer bigger or equal to one. In one embodiment, the links in the chain have different (non-uniform) strength, indicating the different degrees of associations between pair of chained subjects. In one embodiment, the association is among M subjects, where M is bigger than 2, e.g. 3 subjects, which are all related to each other. See FIG. 78 for a diagram of such system.

In one embodiment, the association can be with an event, such as "cake dropping on the curtain". Thus, it points to the subject "curtain" or "stain" (which in turn points to "circular marking" and "circle"). One way for recollection is to store the links or end of the links (or pointers or pointed subjects), and follow the chain or link backward or forward to get the result from either sides, or even start from the middle of the chain and continue in one direction, to recover or find the original subject. So, each subject can trigger another one through the chain sequence. See FIG. 78 for a diagram of such system.

In one embodiment, for long term storage, one puts the information or chain of associations as a whole (or broken into some components or parts, or even sampled e.g. every other subject in the chain, to store less data, as a lossy storage, to save storage space) into long term repositories (for not-frequent access or not-in-near-future access). Note that for the recollection of the broken data or lossy storages, one requires some computing power to reconstruct the lost links later on (by associating pointers), to reassemble the jigsaw puzzle, as the original chain. See FIG. 78 for a diagram of such system.

In one embodiment, when parsing sentences using our methods described here in this disclosure, to search for a more accurate meaning, among possible meanings, especially in a specific context, we can narrow down the choices or targets, as a whole sentence, because the possibility of adjacent two or more words to have a coherent meaning or consistent interpretation eliminates most of the initial individual possibilities for a single word, when presented as a sequence of words in a specific order (or chain of pointers between words).

Note that a human brain carries information and memories as encoded patterns of neural firings.

In one embodiment, the system (of our invention) stores the information for our search engine in the distributed memory repositories. In one embodiment, the links or pointers between subjects get deleted, by the system, if the pointers or links are not used for a long time, to recycle the released memory, as available, for future use. For example, periodically, the system checks for unused links that are idle for a long time (a fuzzy variable), to release the memory location (and break the link or pointer), if applicable.

Figure 71:
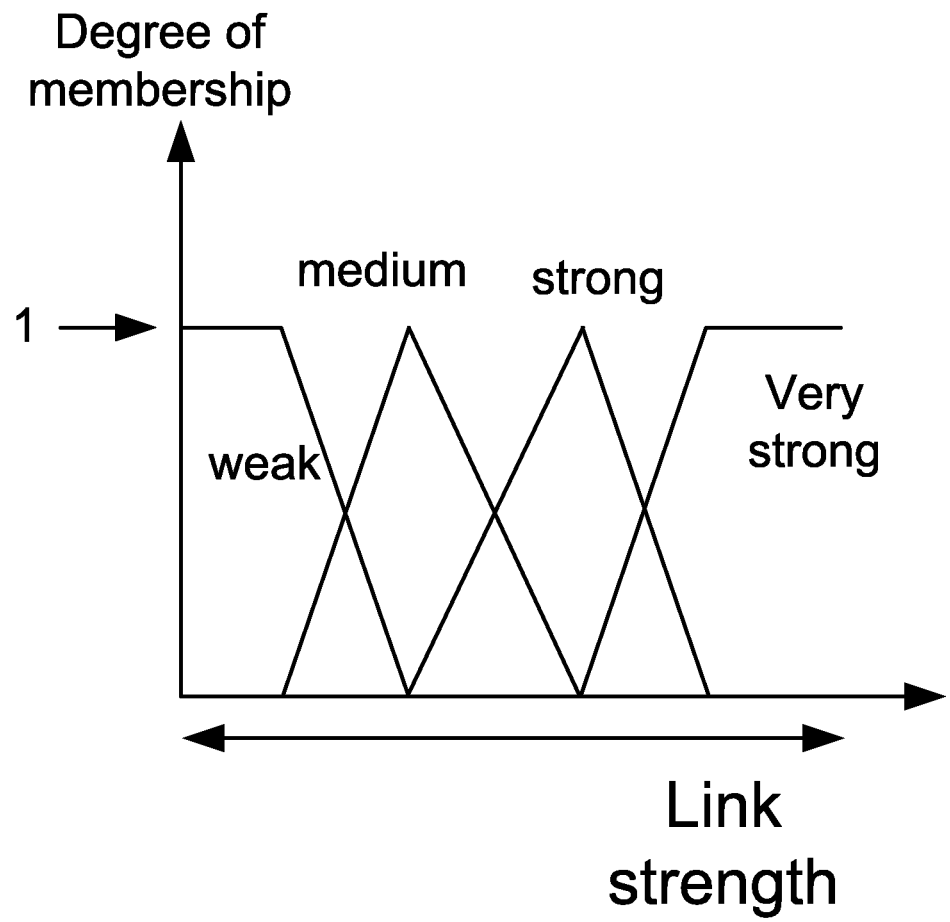
FIG. 71 shows a variable strength link between two subjects, which can also be expressed in the fuzzy domain, e.g. as: very strong link, strong link, medium link, and weak link, for link strength membership function.

In one embodiment, the links or pointers between subjects have various weights. That is, the links are not uniform in strength. Or, the link between two subjects is not binary (e.g. "linked" or "not-linked"). For example, the link strength can be expressed as a real number between 0 and 1. The higher the value of the link strength, the more correlation exists (or more correspondence) between the two subjects. Variable strength link between two subjects can also be expressed in the fuzzy domain, e.g. as: very strong link, strong link, medium link, and weak link, as shown in FIG. 71, for link strength membership function. The value of link strength helps the search engine follows the right direction (or link or pointer), in terms of finding the best solution or answer.

Figure 77:
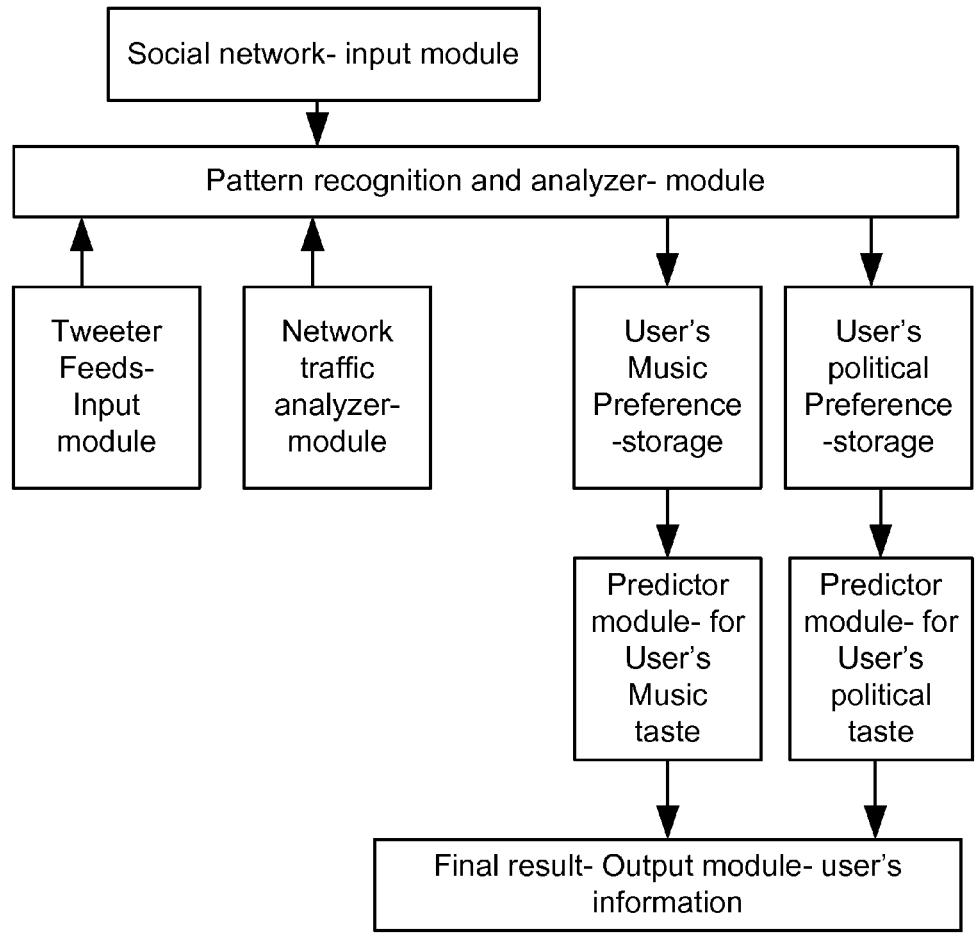
FIG. 77 is a system for the search engine.

In one embodiment, social network sites provide feedback of the users and connectivity between users as an indication of the trend or pattern of society, groups, or individuals, with respect to different subjects, such as taste in music, marketing directions, or political opinions. Thus, they are good databases for data mining. Tweeted subjects (on Tweeter feed traffic monitoring module) can also be studied and classified to find patterns and extract data, for marketing and political purposes, e.g. as to who may become the next president of the United States, e.g. by counting or getting the frequency of a name or subject at a specific time. See FIG. 77 for a diagram of such system.

Figure 76:
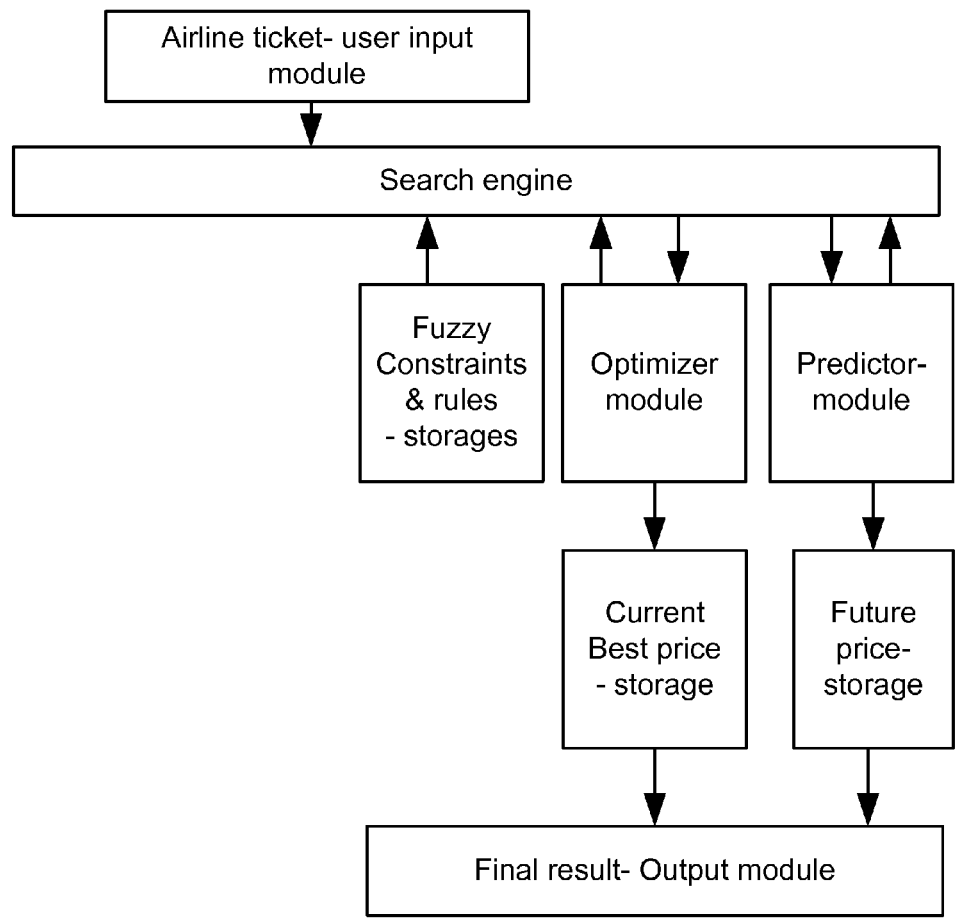
FIG. 76 is a system for the search engine.

In one embodiment, one can use the search engine to predict the price of airline ticket for next vacation for next month, or find the current best price or option available (or best travel plan), considering the travel constraints or rules that we impose. In one embodiment, the search engine can also be used to find the best route to drive home from airport, considering the rules and conditions, with traffic constraints or how much gas we have, to minimize the driving time (as an example). In one embodiment, the price of a company's stock or average group of stocks is predicted for next month, or the best stock value is distinguished, among many companies, based on the rules and constraints about their products and the industry, using fuzzy analysis, explained elsewhere in this disclosure. See FIG. 76 for a diagram of such system.

Figure 75:
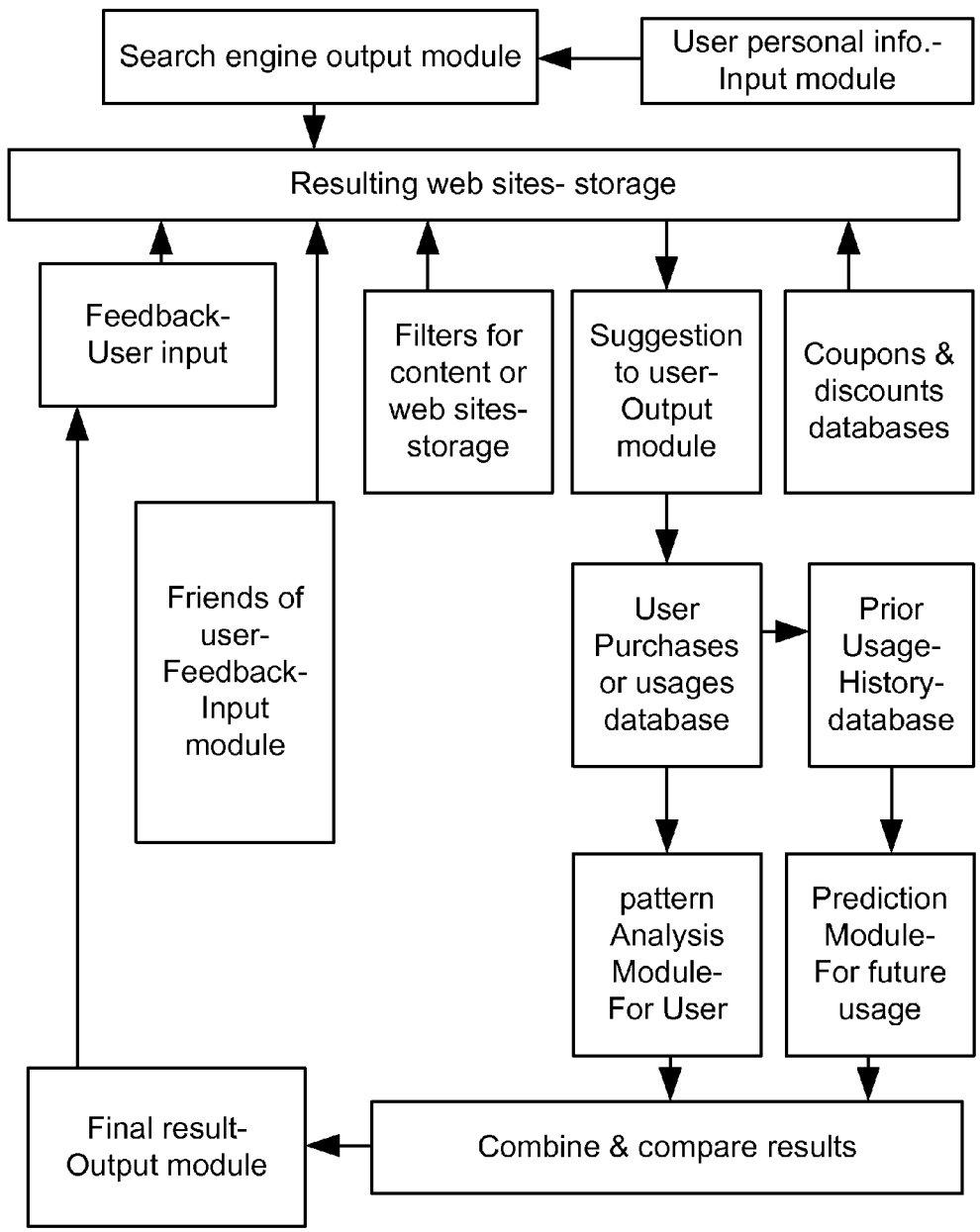
FIG. 75 is a system for the search engine.

In one embodiment, the search engine displays the source of the information for the user, e.g. "Wall Street Journal", as the added value for the search result, which accompanies the credibility of the source, e.g. as a fuzzy parameter. In one embodiment, the search engine focuses on web sites to return personalized results, based on previous browsing habits of the user. In one embodiment, the user inputs personal information to customize the search results or help the search engine go to the right or more relevant direction, with respect to the user's preferences, taste, or parameters. For example, knowing that the user lives in San Francisco or vicinity area (in California, USA) (as her resident address, as one input by the user, through the user interface module), the search for "football team" yields "The San Francisco 49ers" (which is a professional American football team based in San Francisco, Calif.), and this result has a higher ranking or score than another American football team in another city, and this result also has a higher ranking or score than a soccer team in San Francisco, Calif. (because "football" (generally, in US) refers to the "American football", not "soccer"). This means that the meanings of the words are clarified and set based on the context and background information, e.g. user's information or preferences, such as address, zip code, ethnicity, religious, weight, height, age, gender, job, income, political affiliations, college degree, food preferences, health information, marriage status, type of car, or the like. See FIG. 75 for a diagram of such system.

Similarly, in one embodiment, the prior queries help customize the search result for future queries. Other factors can be how many times or how often a user (for example) searches for food or nutritional facts, and how long the users spend on a web site related to the food. This interest in food-related subjects makes "food" a more relevant subject for that user for future, to be a factor for relevance determination of other subjects in the search. In one embodiment, the user allows that the search engine tracks her usage and habits or patterns, from the user-input module, e.g. through the menu on screen, for privacy level settings, which can also be another fuzzy parameter. See FIG. 75 for a diagram of such system.

In one embodiment, the search engine tracks the music, books, movies, and videos that the user downloads, buys, rents, listens, watches, or looks at. In one embodiment, the search engine tracks the user's emails and the patterns related to the emails or SMS, e.g. the recipients, how often sent, what time of day sent or received, any attachments to the email, what type of attachments to the email (type of file, e.g. JPEG or PDF), size of the file of the attachment or the email, or the like. All of the above parameters indicating the degrees or quality can also be expressed as fuzzy parameters. In one embodiment, the search engine has a user-interface or GUI (graphical user interface) for the user inputs, with scaling or sliding bars, knobs, or selectors. See FIG. 75 for a diagram of such system.

In one embodiment, the search engine connects to the modules for controlling ads, coupons, discounts, gifts, or filters for web sites (e.g. filters deleting specific web sites for children, from the search results). In one embodiment, the search engine rewards the user on points for discounts for purchases or coupons, in exchange for giving up some privacy, for personal information input by the user. In one embodiment, the search engine is self-customized engine or module that can be embedded on a web site. In one embodiment, the search engine helps the ads targeting a user, based on personal information, such as birth date, e.g. for gift suggestions, or statistics or biometric-driven, such as user's height or user's household's income percentage, with respect to those of national average or median. See FIG. 75 for a diagram of such system.

Figure 74:
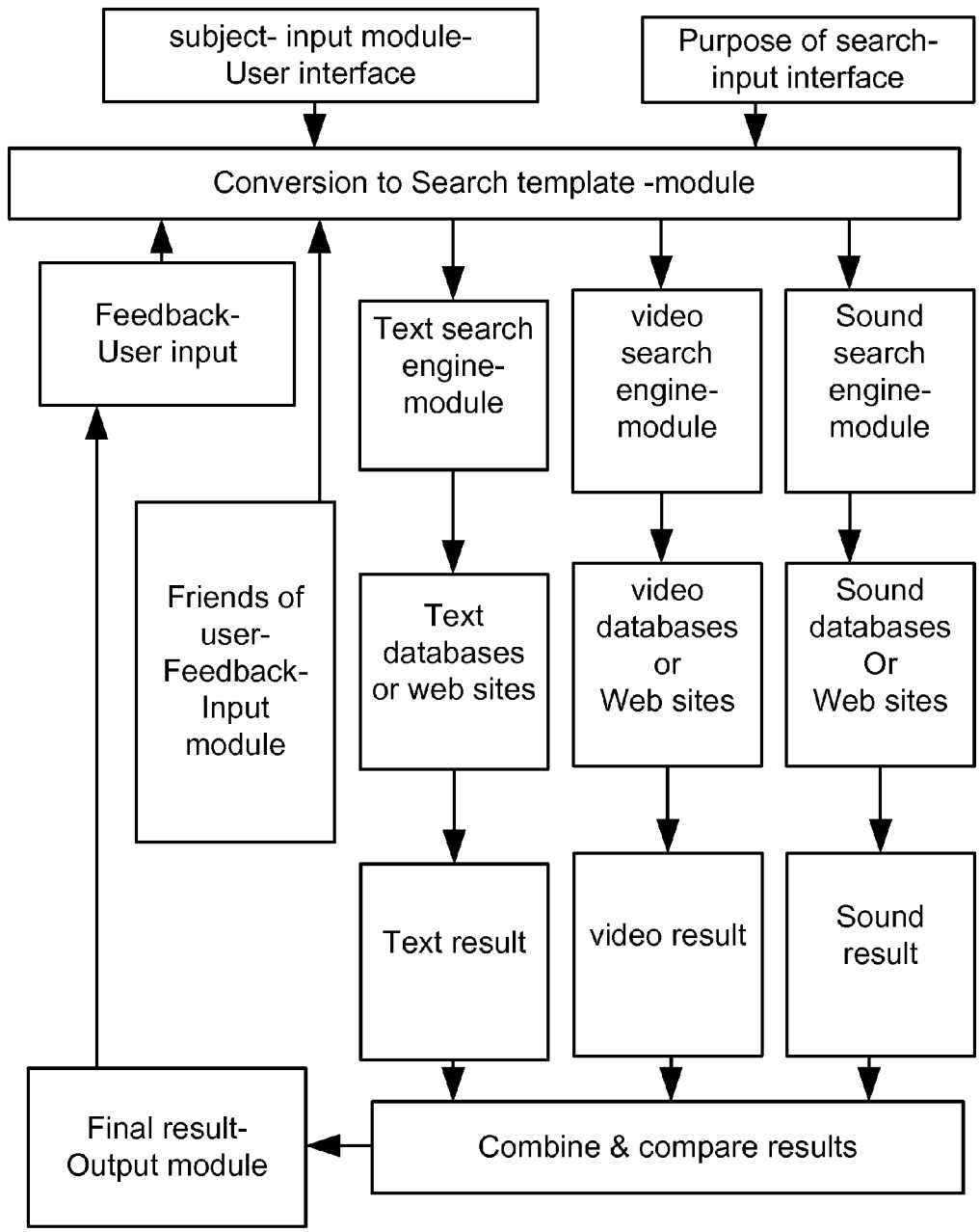
FIG. 74 is a system for the search engine.

In one embodiment, the user specifies her purpose of the search, e.g. medical, business, personal, or the like. For example, searching for a hotel yields different results for a business trip (near convention center or downtown), versus for a vacation trip (near the beach or amusement park). In addition, for example, specifying the accompanying persons can modify the search results. For example, having kids with the user during a vacation trip tilts or focuses the search results toward the vacations, hotels, or cruises that are tailored to families and kids (family-friendly or oriented), whose information can be extracted from the tags or scores supplied by the hotel itself or its web site, e.g. meta-tags or metadata, or from the tags or scores supplied by other users, or from the text comments or feedback by other users about their experiences with that hotel. See FIG. 74 for a diagram of such system.

In one embodiment, the user asks a question, and the search engine first determines the language of the question (e.g. by parsing the sentence or question), or the user herself supplies the information about the language, e.g. French. The search can be focused on web sites in French language (e.g. using the metadata or flags from the web site), or search any web site, depending on the user's or default settings for the search engine. In one embodiment, the search is on one or more of the following formats (and the search results are also in one or more of the following formats): text, web sites, links, emails, video, images, line drawings, paintings, satellite images, camera images, pictures, human pictures, music, blogs, HTML, PDF, sound, multimedia, movies, databases, spread sheets, structured data, slides, or the like (or a combination of the above), per user's setting or default. See FIG. 74 for a diagram of such system.

In one embodiment, the search engine is queryless, i.e. with no questions at all, but the search engine provides or suggests some subjects or topics automatically, sua sponte, based on the history and user's preferences or prior user's feedback. In one embodiment, the tagging, scoring, and feedback can also come from friends, social network, other users, similar users, club members, or co-workers, e.g. using bookmarks, links, and shared searches, presented, displayed, or forwarded to others. In one embodiment, there is a biometrics or security module associated with the circle of friends or social network, to protect the shared information, against unauthorized or free access or hacking. See FIG. 74 for a diagram of such system.

Figure 73:
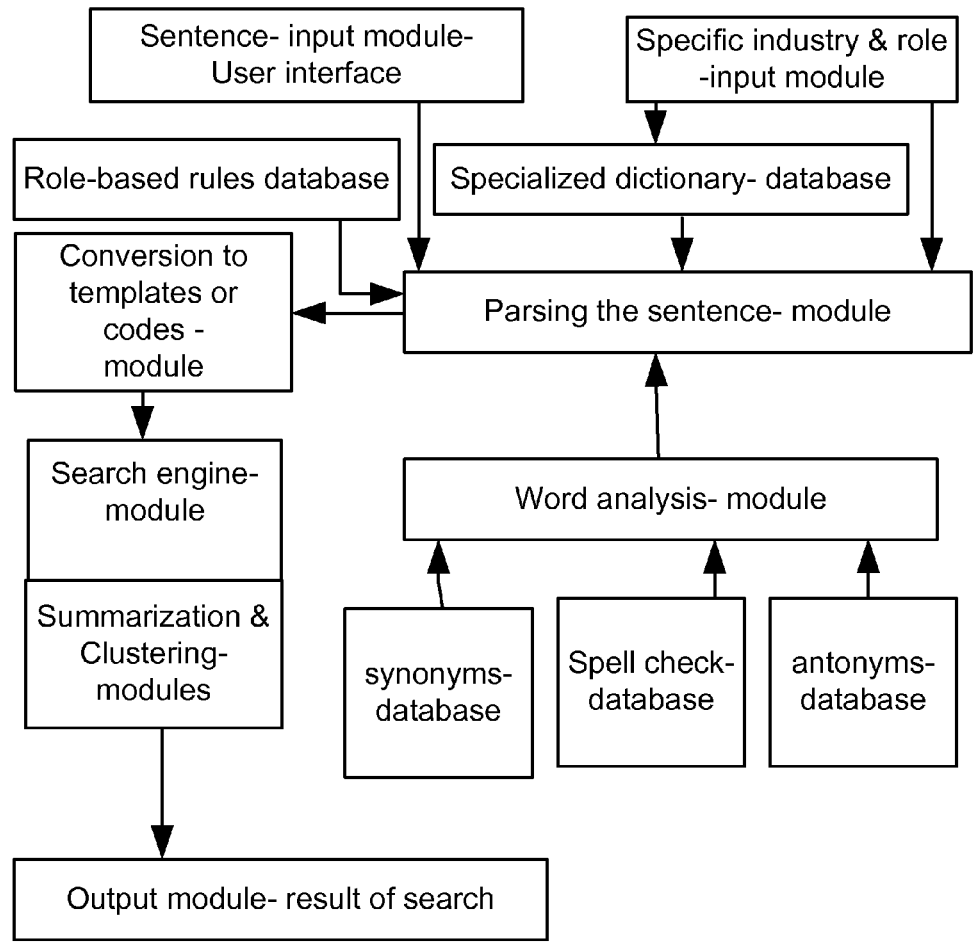
FIG. 73 is a system for the search engine.

In one embodiment, the search engine and corresponding natural language parsing and processing are tailored toward the specific application or industry, e.g. telecommunication, stock trading, economy, medical diagnosis, IP (intellectual property), patent, or claim analysis or valuation, company valuation, medical knowledge, and the like. For example, a lot of abbreviations and words have very specific meanings in a specific technology, context, or industry, which may be very different in other contexts or environments, causing uncertainty or misleading search results or language construction or interpretations. For example, "IP" means "Internet protocol" in telecom industry, but it means "intellectual property" in patent-related businesses. To minimize those negative effects, the user specifies the industry from the beginning The modules can be trained for various industries, and they can be separately sold or accessed as a service for specific industry. See FIG. 73 for a diagram of such system.

Figure 72:
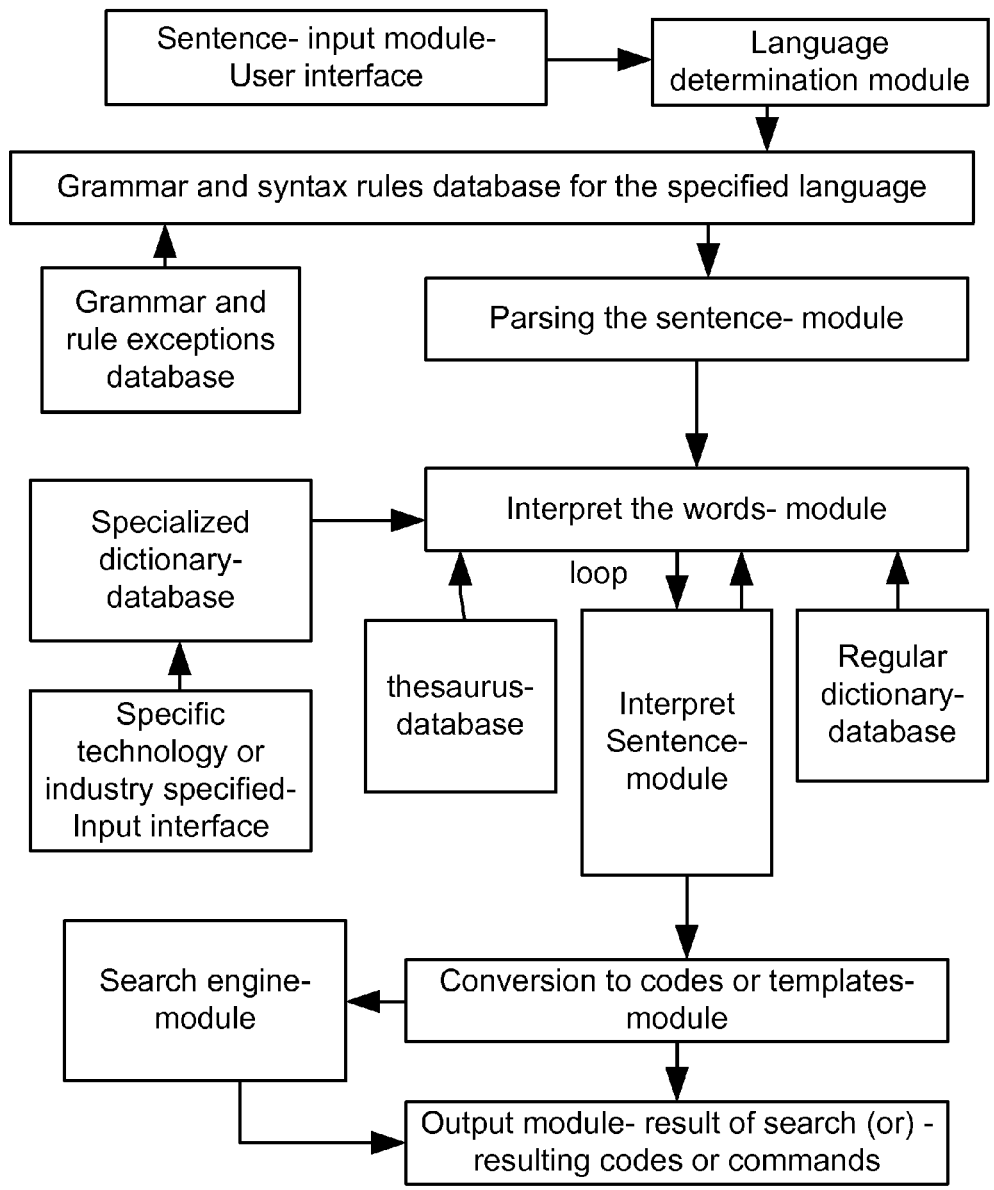
FIG. 72 is a system for the search engine.

In one embodiment, using common rules for grammar and syntax for a specific language for sentence structure (and corresponding exceptions to those rules), the search engine parses and dissects the sentence (as explained elsewhere in this disclosure) and applies dictionaries (in different categories, such as medical dictionaries) and thesaurus (or phrase books or glossaries or idiom or phrase or dialect listings) to find or interpret the meaning of the words, phrases, and sentences, e.g. to convert them into codes, templates, abbreviations, machine codes, instructions, text, printout, voice, sound, translation, script, or computer commands, to process further, if needed. See FIG. 72 for a diagram of such system.

In one embodiment, the synonyms module, spell check module, antonyms module, and variation or equivalent word module are all part of a search engine, to help find similar words and concepts, or parse the sentences. In one embodiment, for analytics, the search engine includes summarization module and clustering module, to group the data in sets for systematic analysis, such as based on N-dimensional feature space for components of a word or phrase, based on all the possibilities for basic components, partial words, or letters in a given language (as a dictionary for all possible basic word components in a given language, with all connecting possibilities with other neighboring components, which is held in a database(s) or relational databases, and can be updated and improved by users periodically as feedback, or by machine or processor, automatically, with a training module, such as a neural network). FIG. 111 is an example of a system described above.

In one embodiment, social bookmarking, tagging, page ranks, number of visitors per month, number of unique visitors per month, number of repeat visitors per month, number of new visitors per month, frequency and length of visits for a given web site or web page, number of "likes" or "dislikes" feedback for a site or topic from users, and number of links actually requested or existing for a web site, as absolute or relative numbers, or as a rate of change (first derivative) of the parameter, are all parts of the search engine analytics, for finding the more relevant search results, with respect to a specific user or general public users. In one embodiment, tagging and user comments are done as an annotation to search results, as an extra layer. In one embodiment, what other people, users, or friends have done is displayed or suggested to the user, e.g. actions performed or web sites visited or items purchased. FIG. 111 is an example of a system described above.

In one embodiment, a search is personalized or customized using the position or role of a person in an organization, e.g. CEO of a company, with her parameters pre-set as a generic CEO, and can be further defined based on specific personality of the CEO, by herself, in such a way that a new CEO does not have to change the pre-set generic or basic part of the profile, making the transitions much smoother for a new CEO. The role-based model can be combined with the concept of inherency, so that a class of roles or positions can be defined categorically (only once, in a very efficient way), and then, subclasses may have extra features, conditions, or constraints on top of those of the corresponding class. FIG. 111 is an example of a system described above.

In one embodiment, live search is conducted using human experts as helpers, to guide the searches in a general direction by input phrases or feedbacks, in a limited scope, interactively with machine or computer. This is useful for a new field, in which not much information is accumulated in the databases, and most of the information is in the head of the human experts at this early stage. In addition, the user base and number of queries are manageable (small enough) with a few experts on line. This is not scalable or cost effective for large user base or databases, with too many queries to handle by human interventions. FIG. 111 is an example of a system described above.

Pattern Recognition

In one embodiment, the images are searched for specific color or patterns or shapes, e.g. for houses or clothing, to match a target or find one similar to a target, based on the features defined in feature space, such as stripes patterns, color red, circles, dot patterns, trapezoid shape, or the like, as a pattern recognition module, looking for degree of similarity, e.g. as a fuzzy parameter, for real estate agents to search databases and sell houses or for department stores or store web sites to sell clothing to potential customers. This is also useful for analyzing and classifying Facebook® and photo album sites, e.g. for face or iris recognition, e.g. to identify, track, or classify people or objects. This is also useful for the security purposes on Internet or by cameras at the airports or buildings. FIG. 112 is an example of a system described above.

In one embodiment, the video is searched, using still images, motion vectors, and difference frames, e.g. to find a car or face in the video, to find the speed of the car from the location of the car in different frames, or to recognize a person in the video, using face, iris, or eye recognition (or other biometrics), or target tracking objects in video frames to get other identification parameters or features from the video. This is also useful for analyzing and classifying YouTube or movie repositories or music videos, e.g. to find or track people, subjects, objects, topics, or songs. FIG. 112 is an example of a system described above.

In one embodiment, the video track and sound track from a movie can be separately analyzed, for various sound and video recognitions, such as spotting some sound signatures or sequence of notes, indicating an event or music, or using voice or speaker recognition (as explained elsewhere in this disclosure), to find or recognize a person and tag or classify the track or movie. In one embodiment, the recognition engines or search engines from different tracks are combined or compared with each other, to get a better result, with more confidence, faster. FIG. 112 is an example of a system described above.

In one embodiment, the maps or road maps are scanned and analyzed to get (for example) geographical or residential information, for civilian or military purposes, e.g. for market search or business intelligence gathering. Markings, captions, scales, symbols, and names on the maps are recognized by OCR or pattern recognition module, to interpret the maps and find people and locations of interest. For satellite images, the objects have to be recognized, first (by object or pattern recognition module), as what they are, and then they can be categorized or classified (by tags or flags), with comments, text, or identifiers superimposed or attached to the image file. Object recognition with possibility of choices is expressed in fuzzy system, with membership values, e.g. recognizing an object as a bus or truck in a satellite image.

In one embodiment, Wikipedia and other encyclopedia or informational sites are referred to by the search engine for search on the topics they carry. In one embodiment, the search engine categorizes as how often a web site should be reviewed or searched based on how often it gets updated (in average), how relevant is the web site for our topic of search, and how reliable is the source of the web site. For example, the more often it gets updated and the more relevant and reliable the web site, the more often the search engine would check the web site for updates and new information, to search and extract data. In one embodiment, the search engine tracks and analyzes the web site traffic, for patterns and information about the web site, including for the web site reliability analysis. FIG. 113 is an example of a system described above.

In one embodiment, all the units of weight, length, and the like, with the corresponding conversion factors are stored in a database, for example, to convert "meter" to "foot", for unit of length. The physical constants and physical, chemical, or mathematical formulas or facts (e.g. as relationships or numbers), such as speed of light or formula for velocity in terms of distance and time, are also stored in corresponding databases or tables, for easy and fast access for the search engine, e.g. with a hierarchical indexing structure or relational database(s). Alternatively, the search engine can refer to reliable web sites with similar information, for search and extraction of data.

In one embodiment, the components (such as text, video, and sound track in a movie data) are separated and searched separately, on an optimized and dedicated search engine for that format of data. See FIG. 84 for such a system. In one embodiment, all the components are searched using the same (or generic) search engine (not optimized for any specific data format). In one embodiment, the results of all components are combined to make a better overall result. In one embodiment, the results for each component are reported separately. In one embodiment, the processors are processing the results in parallel. In one embodiment, the processors are processing the results in series.

In one embodiment, the system uses the tags or comments written by various users, or searches and parses those comments to dissect or convert them to the individual tags. (The example or method of parsing of a sentence or phrase is given in another part of the current disclosure.) This way, the collection of knowledge or intelligence of many users and people are combined to find a better or faster match(es) for the search. One example is the pictures tagged by the users, which are searchable in different databases, to find a correspondences or likelihood of relationship between one name and multiple pictures. FIG. 114 is an example of a system described above.

On the first cycle, the fuzzy classifier module or device classifies or separates different pictures into clusters or groups in N-dimensional feature space. For example, it uses facial features and parameters or biometrics, e.g. the approximate length of the nose, or ratio of width of the nose to length of the nose (as a dimensionless number or normalized parameter), or other features related to iris or eye recognition. This corresponds to multiple individuals having the same exact or similar name. Please note that "similar name" is a fuzzy concept, by itself, with its own membership function value. FIG. 114 is an example of a system described above.

On the second cycle, it further distinguishes between or finds pictures of the same person in different ages or in different forms or settings (such as with dark eyeglasses, or wearing fake or real beard or mustache, or wearing scarf), which as the first filtering pass or cycle, it may look or get classified as a different person. One way to find the right person is the use of biometrics parameters, such as eye and nose, that "usually" do not change by age "that much" for the same person. Please note that "usually" and "that much" are also fuzzy parameters and concepts, by themselves. The other way is the correspondence of the date that the picture was tagged or posted, which may correspond to the date of the original picture, or equivalently, to the age of the person in the picture (or the year the picture was originally taken or captured). The other way is the comments or text or tags by the users that accompany the pictures, which collectively give probability or correlation for the identification of such person. The other way is the correspondence of the item of clothing (or attached objects, external items, context, environment, or surrounding), e.g. wearing the same or "similar" shirt or neck tie in 2 different pictures. Note that "similar" is another fuzzy parameter here. FIG. 114 is an example of a system described above.

Even, more general is the correspondence of the preferences or characteristics of the person, as a collection or set of parameters. For example, for a person living near the beach in Florida (e.g. a Miami Beach address as residential address), the system expects higher probability of casual dressing, bathing suit, sun glasses, and tropical trees appearing in the picture. So, those features appearing in a picture (e.g. casual dressing, bathing suit, sun glasses, and tropical trees) favors or increases the probability of a person with Miami zip code or address (or a person on vacation near beach), for identification purposes of a person in a picture, instead of a person with an Alaska address (or a person with no travel habits or history in tropical or beach areas). FIG. 114 is an example of a system described above.

Another example is that if a lady has many pictures with a red dress (or striped T-shirt or particular hat or design or designer or signature or pattern or style or brand or trademark or logo or symbol, e.g. a Polo shirt with its logo on it), the system can assume that the person has a lot of red dresses or prefer the color red for dress or shoes or car. Or, the red color preference is obtained from the user herself or her friends' input, as preference or history files (or based on a detective work file, by a third party, or by a software agent searching all over Internet for a person's personal data, or by marketing databases from a Macy's department store, based on past behavior or purchases, as her file history). Thus, if a person is sitting in a red car or wearing red shoes, in a picture or a video, it has a higher probability to be the person in question, based on her past or characteristic files, for identification or recognition purposes, e.g. for searching through Internet or databases to find all pictures or videos related to a name or a person. FIG. 114 is an example of a system described above.

The recognition of a pattern, color, person, face, logo, and text, including OCR (optical character recognition), is generally done by dissecting the image or video into pieces and components (including motion vectors for video, to track the objects, between the frames, as the difference between the neighboring frames) to find features or objects, and from the parameters associated with those features and objects, e.g. geometrical lengths or ratios or angles, the system finds or guesses the identity of those features or objects, based on some certainty factor or membership value (which is a fuzzy parameter). For an object with images captured from multiple angles, the data can be more useful, as it gives the information on 3-D (dimensional) object or depth, for better recognition.

Figure 85:
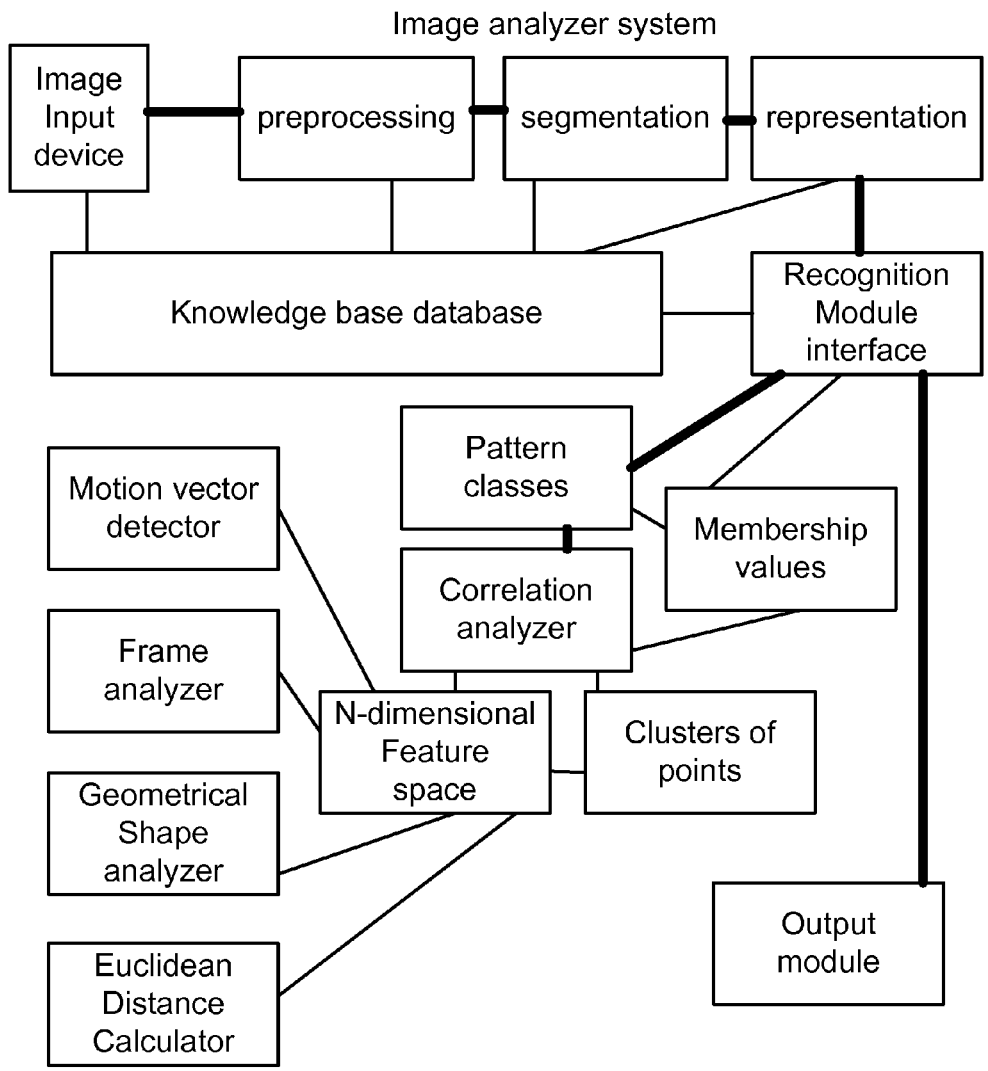

For a pattern recognition module, we have an image analyzing system, e.g. as shown in FIG. 85, with image acquisition and preprocessing modules, followed by segmentation module and description module, and ended with interpretation and recognition modules, with all modules interacting with the knowledge base databases. To recognize pattern or pattern class, using features or descriptors, based on pattern vectors, strings, or trees, the system measures the parameters (e.g. length of nose, ratio of iris width to the nose length, or angle between two curves or strikes in a letter of handwriting or signature, e.g. using the pixels of an image), and plots them as points in the N-dimensional feature space. Clusters of points around or close to letter "a" specification and parameters, as an example, are recognized as potential candidates for letter "a". For example, a letter may be recognized as 0.80 "a" and 0.05 "e". This can be expressed as membership values, as well, which is a fuzzy parameter.

In one embodiment, a decision or discriminant function (an N-dimensional pattern vector) is used, to find the pattern class memberships and the fuzzy decision boundaries between different classes. For matching, in one embodiment, the system uses a minimum distance classifier, with each pattern class being represented by a prototype or mean vector, P:

$$P=(1/N)\Sigma X_i$$

where N is the number of pattern vectors, and X is a pattern vector.

Then, the Euclidean distance to determine the closeness is determined as, D:

$$D=\|X_i-P\|$$

where $\|K\|=(K^T K)^{0.5}$ (It is the Euclidean Norm.)

The matching can be done by correlation, C, as well, between A and B, in another embodiment:

$$C(x,y)=\Sigma_g\Sigma_h A(g,h)B(g-x,h-y)$$

The correlation function may be normalized for amplitude, using correlation coefficient (e.g. for changes in size or rotation).

In one embodiment, an optimum statistical classifier is used. In one embodiment, a Bayes classifier is used, to minimize the total average loss (due to incorrect decisions), e.g. for the ones used for Guassian pattern classes. In one embodiment, a perceptron for 2-pattern classes is used. In one embodiment, the least mean square (LMS) delta rule for training perceptrons is used, to minimize the error between the actual response and the desired response (for the training purposes). FIG. 115 is an example of a system described above.

In one embodiment, a multi-layer feed-forward neural network is used. In one embodiment, the training is done by back propagation, using the total squared error between the actual responses and desired responses for the nodes in the output layer. In one embodiment, the decision surfaces consisting of intersecting hyperplanes are implemented using a 3-layer network. FIG. 115 is an example of a system described above.

In one embodiment, for pattern recognition, the system uses the structural methods, to find the structural and geometrical relationship for a pattern shape, using a degree of similarity, which is associated with a membership value, which is a fuzzy parameter. In one embodiment, a shape number is defined for the degree of similarity. In one embodiment, a four-directional chain code is used to describe the shape. The distance between 2 shapes is expressed as the inverse of their degree of similarity. So, for the identical shapes, the distance between the shapes is zero, and their degree of similarity is infinite. In one embodiment, for shapes, the system uses similarity tree and similarity matrix to evaluate the degree of similarity, which can be expressed as a membership function, which is a fuzzy parameter. FIG. 115 is an example of a system described above.

In one embodiment, for shapes, the region boundaries is coded as strings, with the number of symbols matching as an indication of the degree of similarity. In one embodiment, for shapes, polygonal approximations are used to define different object classes. In one embodiment, a syntactic method is used to recognize the patterns. The system uses a set of pattern primitives, a set of rules (grammar) for their interconnections, and a recognizer with the structure defined by the grammar. The regions and objects are expressed based on strings, using primitive elements. The grammar is a set of rules of syntax, which governs the generation of sentences from the symbols of the alphabets. The set of sentences produces a language, which represents pattern classes. FIG. 115 is an example of a system described above.

In one embodiment, we represent the string grammar as a 4-tuple, (A, B, C, D), for the strings, with e.g. A, B, C, and D representing non-terminals (a set of variables), terminals (a set of constants), the starting symbol, and a set of rules, respectively. Then, objects or shapes can be expressed mathematically, by first conversion into its skeleton (using image processing on pixel level, for example, to thin down the image to get the line structure shape), followed by primitive representation (for example, basic structure or geometrical shapes, from database, to replace the skeleton), followed by structure generated by regular string grammar (to resemble the original shape, region, or figure). String recognizers can be represented using nodes and arrow connectors between the nodes in a graphical manner, similar to a state diagram. FIG. 116 is an example of a system described above.

In one embodiment, the string grammar can be extended or generalized into the tree grammar, for syntactic recognition of the trees, using a 5-tuple, (A, B, C, D, E), with E representing a ranking function to represent the number of direct descendants of a node with a label which is terminal in the grammar. Again, objects or shapes can be expressed mathematically, by first conversion into its skeleton (using image processing on pixel level, for example, to thin down the image to get the line structure shape), followed by primitive representation, using a tree grammar, to resemble the original shape, region, or figure. Selection of the primitives in this case is based on the membership values, and thus, it is a fuzzy parameter.

For recognition, the system deals with various knowledge base databases: procedural knowledge (e.g. for selection of parameters and procedures), visual knowledge (e.g. angle of illumination, producing shadow and other visual effects), and world knowledge (for relationships between objects, e.g. in an image of a car, the system expects to find or detect one or more tires under the car, if it is visible in that perspective), which sets the expectation in an image for higher validation, consistency, and accuracy. For example, for the world knowledge, the fact that "Cars usually have 4 tires." can be expressed as follows:

[OWNERSHIP (car, tire, 4), USUALLY]

Or, it can be rewritten as:

OWNERSHIP (car, tire, at least 1)

Or, it can be expressed as: ("For all" cars, "there exists" one tire):

OWNERSHIP ($\forall$ car, $\exists$ tire)

These statements can be combined with others using logical or relationship operators, e.g. AND, OR, NOT, XOR, and IF-THEN statement (rules). Using the rules and relations, the system performs inference or deduction, using an inference module or deduction engine or device. The term USUALLY adds the Z-number to the statement of the world knowledge. Thus, if the system detects an oval or circular object in the image under the body of the car structure image object, then that may be a tire of the car. The tire detection can be expressed based on membership values, which is a fuzzy parameter.

In one embodiment, semantic networks are used, with nodes representing objects and the arrows representing the relationships between the objects. For example, for the example given above regarding "a car having a tire", one node is CAR, and the second node is TIRE, with an arrow connecting the node CAR to the node TIRE, representing OWNERSHIP relationship between the 2 nodes.

Figure 86:
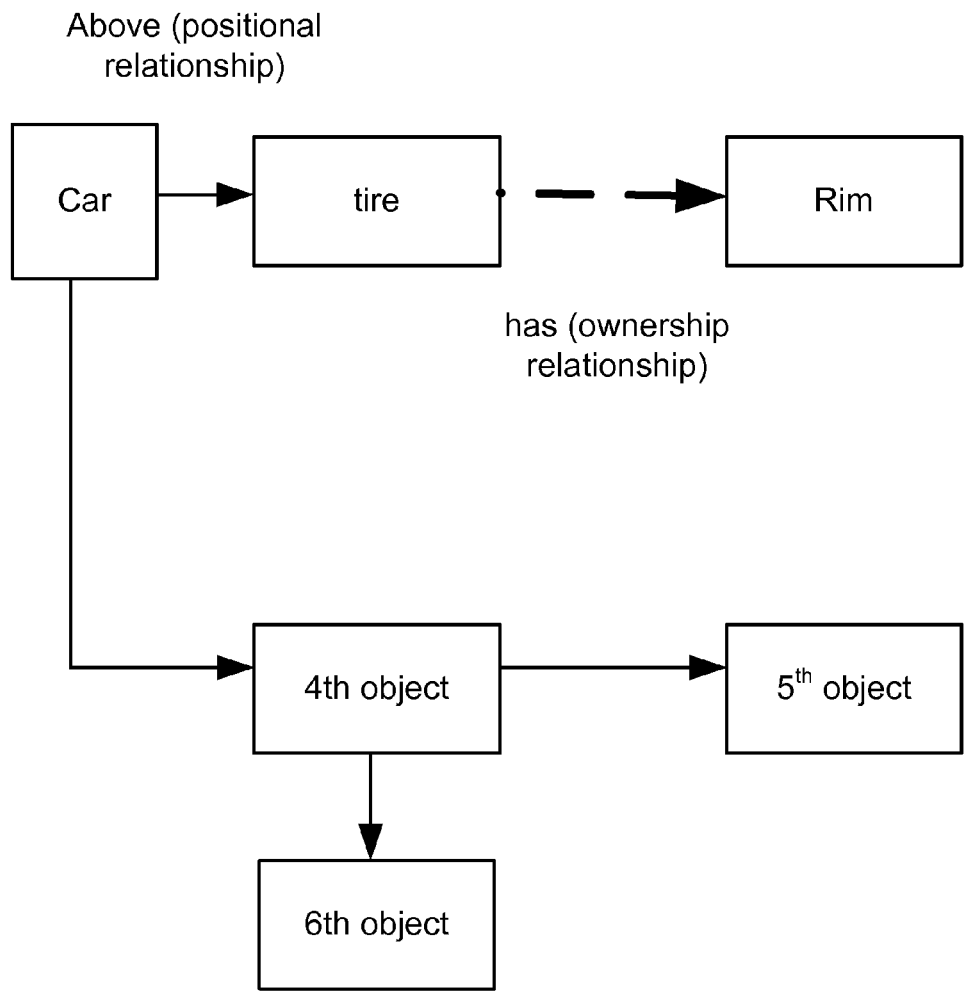

Another example is the application of the position of two objects with respect to each other. For example, for a statement of "a car located above a tire", one node is CAR, and the second node is TIRE, with an arrow connecting the node CAR to the node TIRE, representing ABOVE (positional) relationship between the 2 nodes, representing the 2 objects CAR and TIRE. The knowledge of the possibility of the existence and position of a tire in the image of a car helps the identification of the objects in the image (more accurately and faster). In addition, if the system is given another fact or statement that "A tire has a star-shaped rim.", then if a star-shaped object is detected in the middle of the object of TIRE in the car image, then that star-shaped object may be the rim for the tire of the car. FIG. 86 shows such an example. Thus, the relationship between the objects can be cascaded and expanded this way, so that the detection of the objects gets easier or better, especially if one object is detected already, or if the detection of the first object has to be confirmed or verified by other objects in the image.

The above example also works for facial features, e.g. for iris, face, or identity of a person recognition, in which there is a relationship between relative size and position of different components of eye or face of a human. The above example also works for spelling or word recognition (e.g. OCR) and voice recognition, in which there is a relationship between different sounds or letters that make up a word or sentence, for a given grammar and language, e.g. American English, in terms of sequence of the letters that make up a word or phrase or written sentence, or sequence of sound bites or tones or notes or frequencies that make up a speech or voice or spoken sentence. So, for all of the above, the relationship or relative position of one object or feature with respect to another is known, which helps the detection and recognition (or verification and confirmation) of all features and patterns in the image or in any other media.

In one example, if the comment or tag for a picture refers to "The last $4^{th}$ of July with Clinton in the office". After dissecting, parsing, and analyzing the statement (as described elsewhere in this disclosure), for a user in the United States of America (context-specific for the user), the phrases "$4^{th}$ of July" and "Clinton in the office" is probably a reference to "the former President Bill Clinton, of the United States of America" (based on the correlation of the words or concepts, or combination of the words, or order of the words in a phrase). The last $4^{th}$ of July of President Bill Clinton's presidency (from the historical facts and databases, available to the search engine) is Jul. 4, 2000. Thus, the picture is tagged by a statement which refers to the date of Jul. 4, 2000. Having a date associated with a picture or piece of data usually helps to find the owner of the picture or identity of the objects in the picture or things associated with the picture (based on correlation, association, or probability), e.g. the identity of the person(s) in the picture. Note that the dates associated with a picture may generally be multi-valued, fuzzy, a range, or approximation date(s). FIG. 110 is an example of a system described above.

Figure 87:
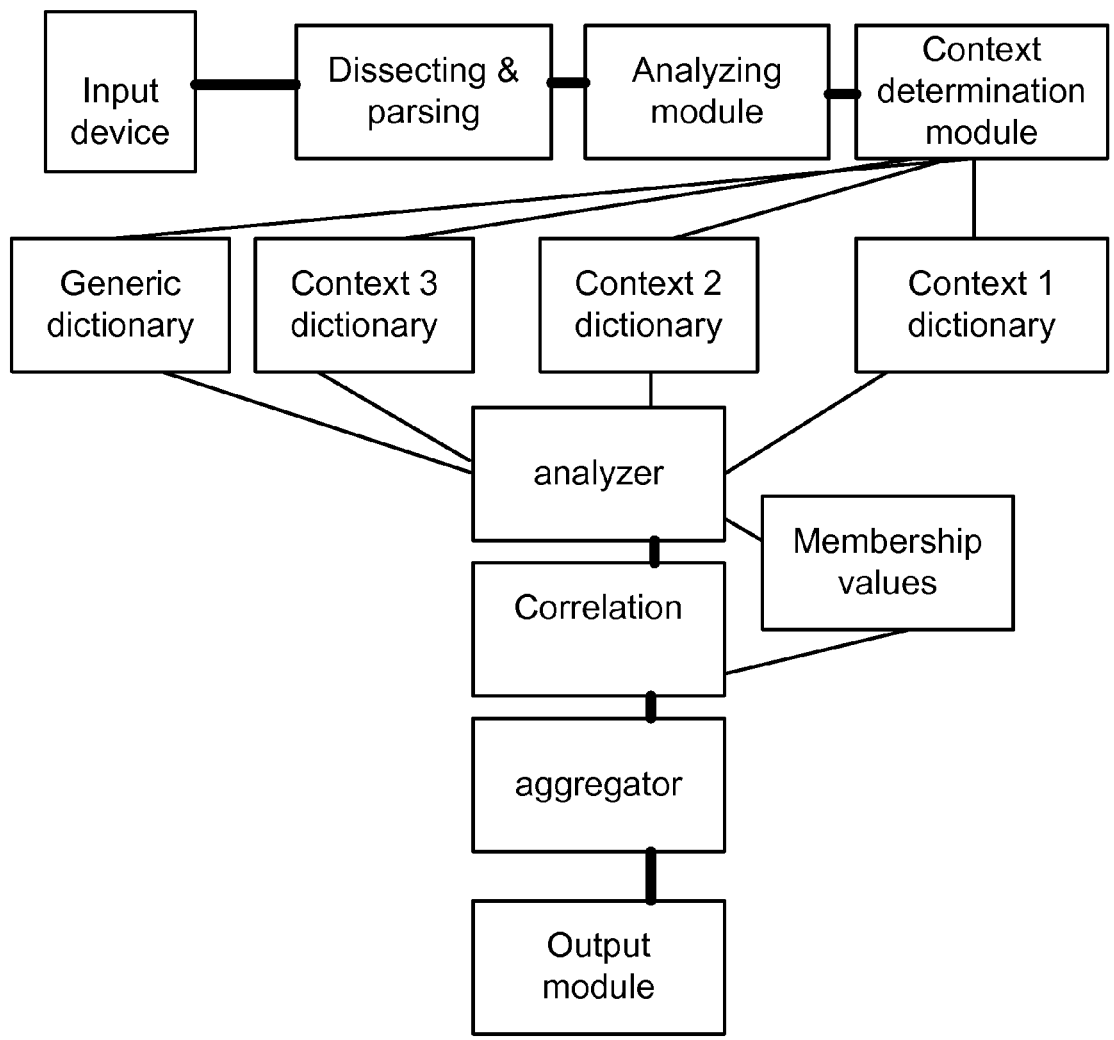

Note that in the example above, "Clinton" (extracted from the sentence and distinguished as a possible given name or family name) is already stored in a database for the famous names or people, with the following ranking order: (1) President Bill Clinton (as the more probable candidate); (2) Secretary of State Hillary Clinton; and so on. If there is no other supporting information available, the system tries the choices from the highest to the lowest. For the first choice (President Clinton), the "office" refers to the "White House" or "presidency". In fact, the generic or common words in a language may have a specific meaning or different meaning, once it gets associated with another word, concept, context, or environment (e.g. politics, versus medical field). Thus, once a context is set or determined (such as politics or politicians), the specific database(s) for that specific context is activated or referred to, instead of the general or generic databases, to find the more exact or better meaning of the words or phrases. This is shown in FIG. 87, as an example.

In an example, one name is very similar to another name in spelling or sound. Thus, during typing or conversion from sound to the text, the spelling may come out differently. In addition, names in different scripts such as Arabic, Persian, or Chinese may end up differently during conversion to the English or Latin script or alphabets. This uncertainty of the sound or spelling is captured in a database for a variation of a name or word, as possible candidates with different membership values, which is a fuzzy parameter. The database can be filled up and corrected by the users in a community of users. Another way is to have candidates for a partial word or sound, e.g. as the most common mistakes or errors, e.g. to find the final word with the correlation analysis, e.g. based on the scoring the combinations, and maximizing the score of the combination for all candidates. In an example, the partial word candidates are stored separately. FIG. 117 is an example of a system described above.

One example of the common mistakes is from the proximity of the letters on the typical keyboard, e.g. Qwerty keyboard, e.g. with R and T in the close proximity, making it likely for a person to type R, instead of T, e.g. typing RANK, instead of TANK (or typing TTANK, instead of TANK). In the cases that the mistaken word has a meaning, the mistake cannot be found by the spell check alone, and it can only be found through context analysis, e.g. for the phrase "water tank on the roof", it would be understood by the system that the phrase "water rank on the roof" is just a typo or misspell, because the second phrase does not have a proper meaning. FIG. 117 is an example of a system described above.

Figure 88:
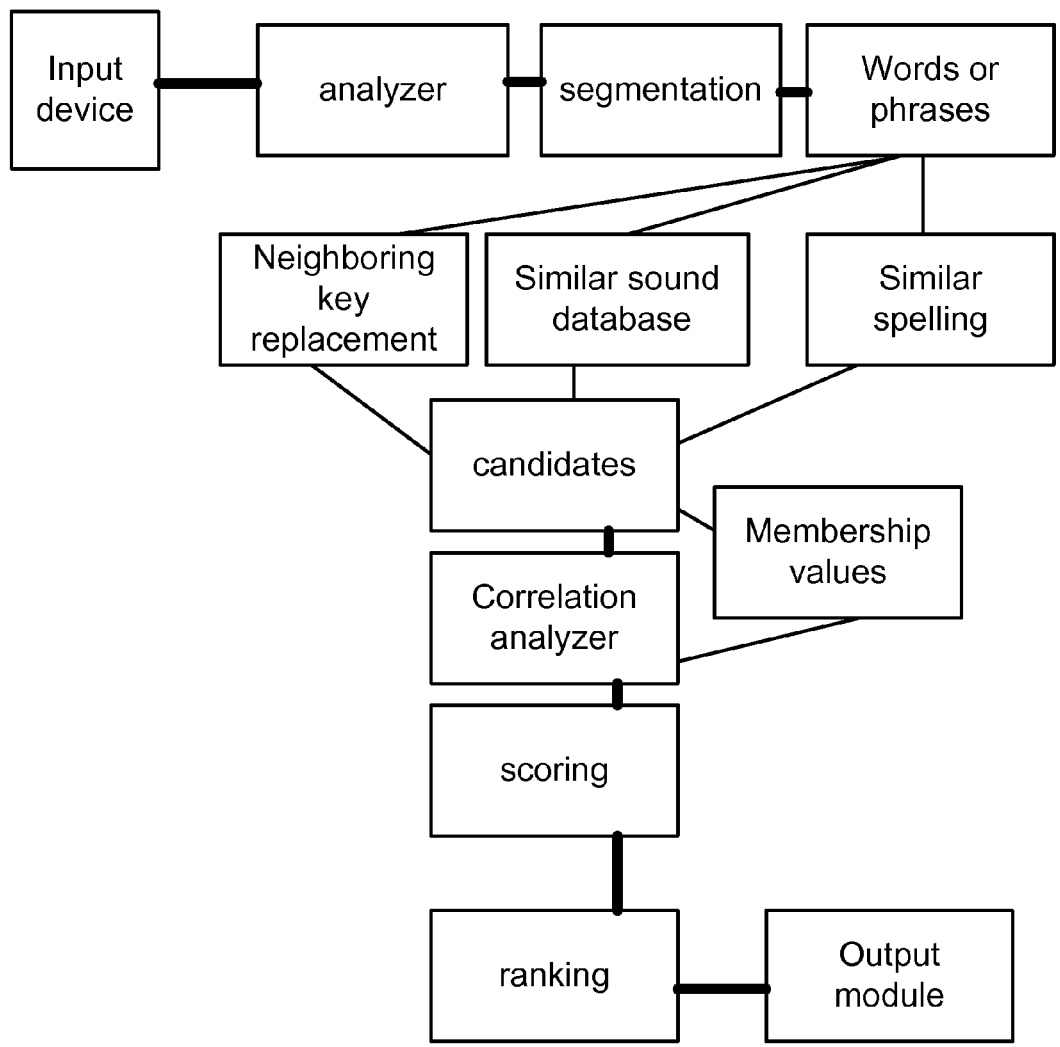

Once the flag is raised about the improper meaning or misspell in the recognition system, one of the tests that the system does is to try and test similar words or phrases with similar sound or spelling, e.g. testing neighboring keys on the keyboard for possible mistakes, by replacing them in the suspected word, to see if any of the results has a proper meaning. Then, the system ranks the results, and it marks the result that has the highest score in the context of the phrase or sentence, for possible candidate for the original (correct) word. FIG. 88 shows an example of such system. The databases of similar spellings and sounds are routinely updated by the feedback from the users' community or group or by the administrator.

To analyze a phrase or sentence, in one embodiment, the system looks at adjectives or related words, e.g. "water tank". For example, for "tank", when used as a word equivalent to a "container" (which can be extracted from the context, from neighboring words or paragraphs), it logically can hold some objects, especially fluids, e.g. gas, liquid, water, nitrogen, and liquid nitrogen. Thus, one can combine them this way, as a template:

[FLUID+tank]
Or:
[tank of +FLUID]

One can store these templates (and any exception to the templates) in multiple databases, which can be categorized and separated based on their topics and usages, in a hierarchical or tree or pyramid structure, with inherency property, e.g. parent nodes and children nodes.

This can be done with adjectives, as well, for example, "big" in the phrase "big tank", which is expressed as a template:

[ADJECTIVE+tank]

Now, when we are scanning the sentences or phrases, we are using (searching for) the stored or pre-recorded templates in databases or storages, to find the patterns mandated by a template. Once a template is found (to match the pattern of a given sentence or phrase), the system can understand the meaning of that section of the text, phrase, or sentence. Then, it can understand the meaning of the whole sentence or phrase through the combinations or series of templates that construct those phrases and sentences (for a given language, based on the collection of the grammar templates (along with their exceptions or special usages)).

For another example of "a tank on the roof", the system will have the following template:

[tank+roof+RELATIONSHIP]
Or:
[tank+roof+POSITION WITH RESPECT TO THE OTHER OBJECT]
Or:
[tank+roof+on]

Again, the above templates are categorized and stored accordingly, in various (e.g. tagged) hierarchical storages, files, and databases, for future use by the search engine, to dissect, recognize the patterns and templates, and understand the meaning of the sentence or phrase.

In one embodiment, the range of numbers or values or approximate values or measurement accuracies (e.g. length of the table=(5 meter±2 centimeter)) are expressed based on fuzzy values. In one embodiment, the dimensions in the image (for recognition purposes) are based on approximation, based on fuzzy values.

In one embodiment, the relationships and templates are based on fuzzy terms, with membership values. In one embodiment, the relationships and templates (or grammar) are based on Z-numbers, with terms such as "USUALLY", expressing concepts such as certainty for the relationships, templates, and grammar.

Multi-step Recognition

Figure 89:
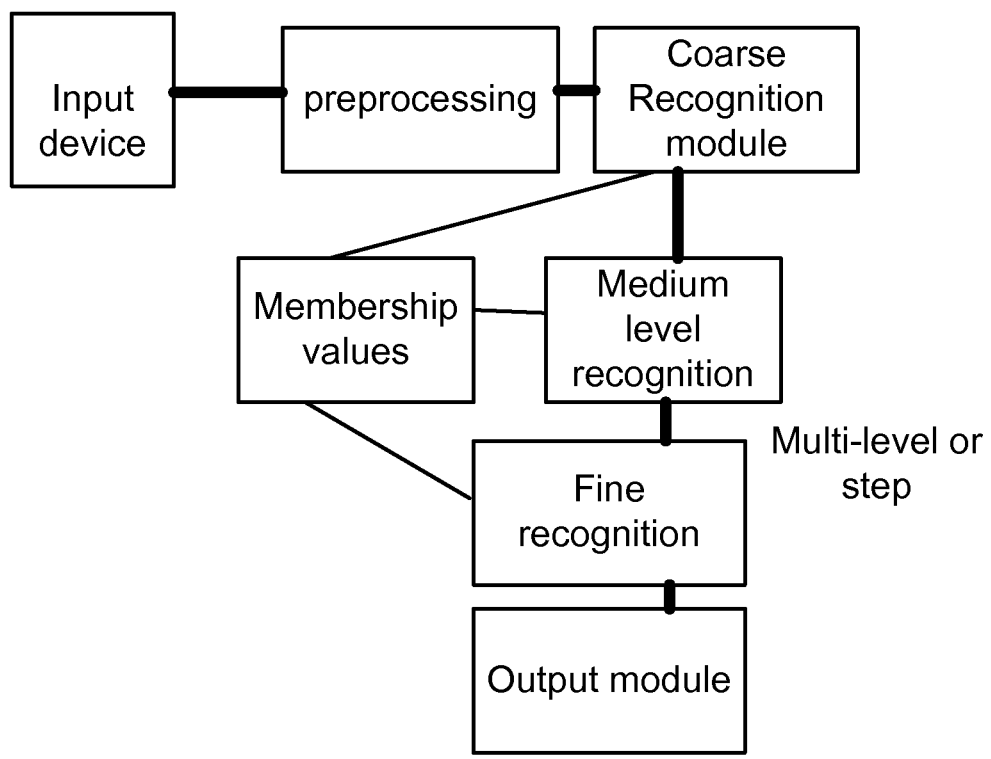

In one embodiment, the recognition (such as image recognition) is done in multiple steps. For example, for signature recognition, in one embodiment, first, we have a coarse recognition. Then, if the first step of the recognition shows a match possibility, then the system performs the second step of medium recognition. Then, if the second step of the recognition shows a match possibility, then the system performs the third step of fine recognition. Then, if the third step of the recognition shows a match possibility, then the system indicates a match, with corresponding membership value, which is a fuzzy concept. This is a much more efficient method of recognition for most samples and environments (instead of a one-step recognition method). See FIG. 89 for such a system.

Figure 90:
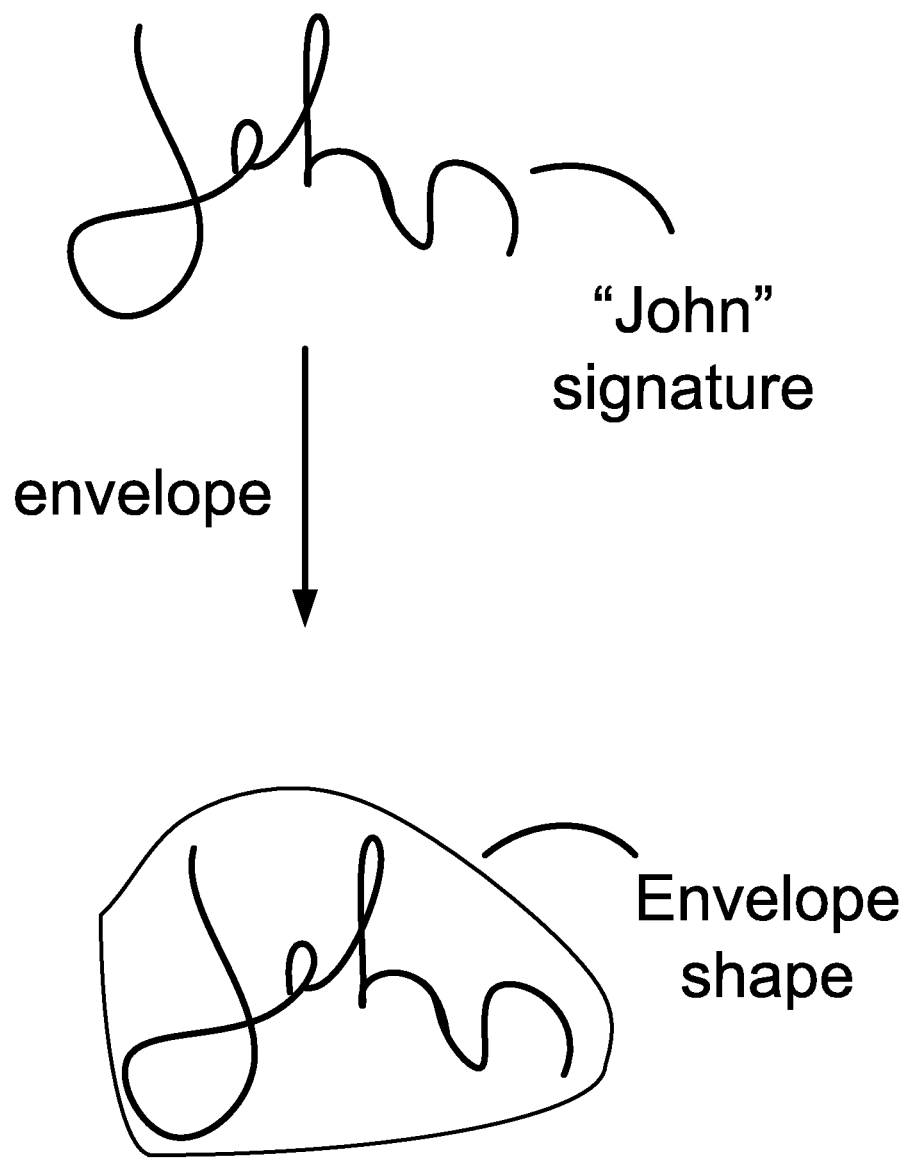
Figure 91:
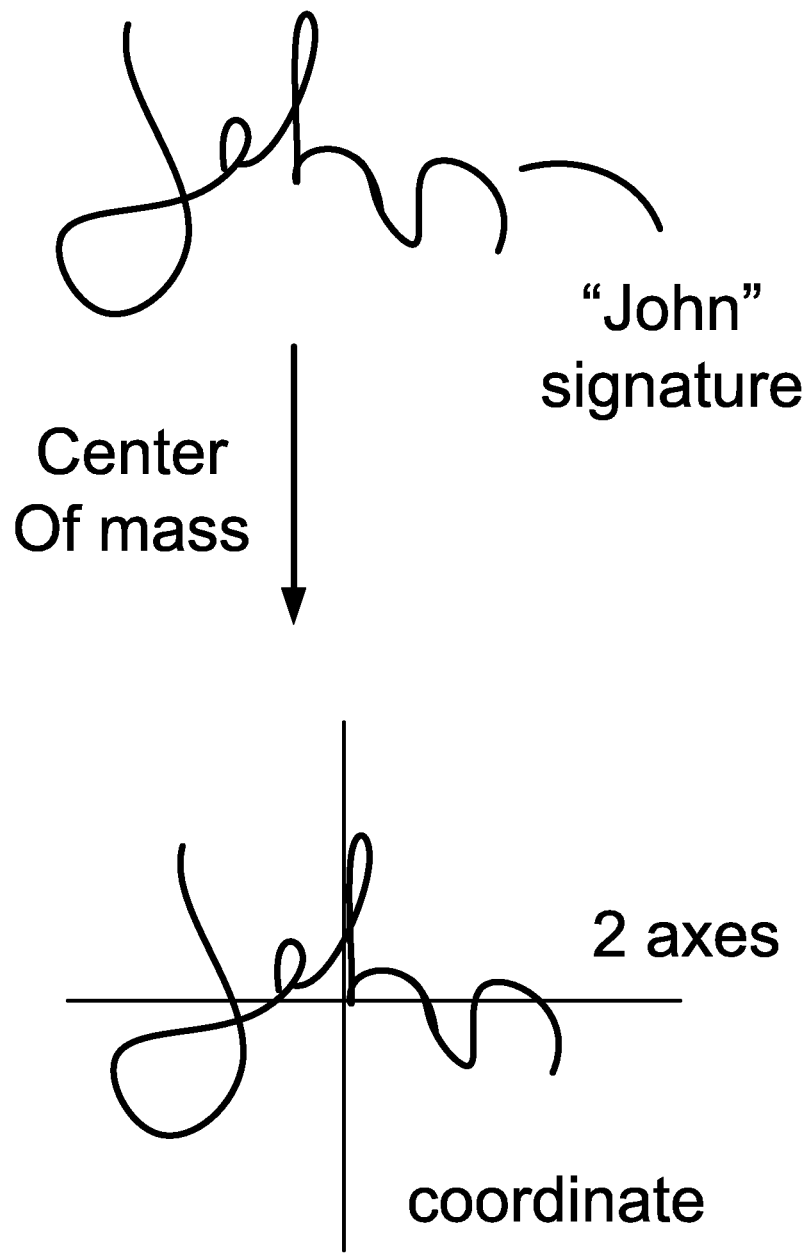

For example, for the signature recognition, the first step is the envelop analysis, which is the step of finding the general shape of the signature, and doing the first comparison, to obtain a first degree of match, which is a coarse analysis, as shown in FIG. 90. Then, the second step, the medium recognition, is to find the center of mass for the signature, based on the pixel values and pixel density on the image, to use a weighted average of the pixels, to calculate the center of the mass (coordinate) for the signature (as an object), denoted as $(X_c, Y_c)$, on both X-Y axes, for horizontal and vertical axes, for 2-dimensional image coordinates, with X and Y coordinates (as shown in FIG. 91):

$$X_c = (\Sigma_i K_i X_i)/(N(\Sigma_i K_i))$$

where $K_i$ is the weight, value, or intensity for the pixel or image element, and N is an integer denoting the number of pixels, with i as a running variable (an integer, for the summation).

Similarly, for the Y coordinate, we have:

$$Y_c = (\Sigma_i K_i Y_i)/(N(\Sigma_i K_i))$$

Figure 92:
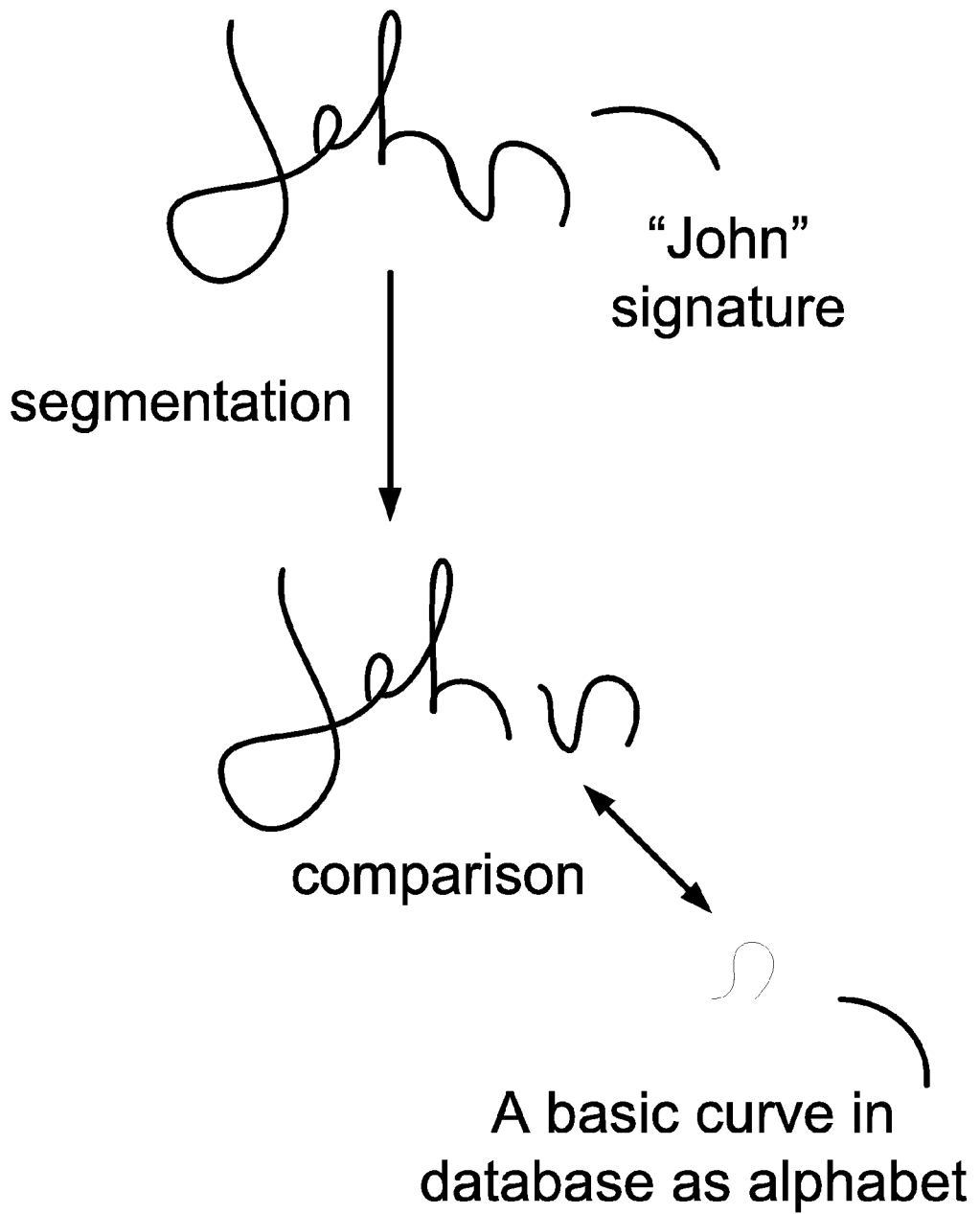

This is followed by a second comparison, to obtain a second degree of match, which is a medium degree analysis. Then, the third step, the fine recognition, is to find and compare all pieces of curves and concave and convex shapes in the signature, and map them to an alphabet or dictionary of all typical pieces of curves (cusps or arcs in various shapes, with various angles, ratios, and lengths, and various number of curve or line crossings or loops) and concave and convex shapes (stored in a databases or storage), to convert them in the new language of codes or symbols whose sequence resembles the signature form and shape (as shown in FIG. 92), as much as possible, with corresponding membership values for matching degrees, which is a fuzzy parameter. Once two shapes are in the symbolic or coded form, the comparison and degree of similarity can be done mathematically, based on the number of symbolic matches and degree of symbolic matches.

In one embodiment, a statement describes an event or object, such as a signature's shape, with a qualification of e.g. USUALLY, in the statement, which is a Z-number parameter. Thus, a signature is expressed based on the Z-number.

Context

The context, for example, can be tagged by the user, or voted by community, or based on history, habit of the user, use of other words, keywords as a flag, or proximity of the words, or any combination of the above. The context (as an attribute) is also a fuzzy parameter, with membership values. One method of measuring the context (C) is based on the word or letter distance (e.g. number of words or letters or paragraphs or pages or chapters or minutes or seconds, as physical distance in between 2 specific words or as the temporal distance or frequency or period between the usage of 2 specific words), or D, which can be expressed, for example, as:

$$C = 1/D$$

This means that the closer or shorter the distance, the higher the degree of context or related concept between 2 words or phrases or concepts. Or, in general, it can be written as some dimensionless numbers:

$$C = (K_1/D) + K_2$$

where $K_1$ and $K_2$ are some constants or coefficients.

Or, in another embodiment, we have:

$$C = \exp(-D/D_0)$$

where $D_0$ is some constant or coefficient.

In one embodiment, one adds a constant $D_1$ to the equation above:

$$C = \exp(-D/D_0) + D_1$$

The context helps us understand that, for example, the word TANK in an article about military budget (as context) refers to a military hardware with engine (that moves on the ground during the war or military exercise). However, in a plumbing magazine, the word TANK refers to a water or fluid tank, as a container. The frequency counter or histogram (e.g. how many times the word MILITARY appears in the article or magazine) and other similar parameters are attached or tagged to the article or file, as a property or attribute.

Contrast

In one embodiment, the recognition is based on the parameters representing contrast. For example, in an image, a black line in a drawing is detected based on the contrast between neighboring pixels, e.g. black pixels on a line in a white background. For example, the contrast is described as the difference between intensities or grey scale values or values from 2 neighboring pixels, image units, or data units (e.g. in a sequence of data) (or any other form similar to that):

$$\text{Contrast} = \Delta X/X = ((X_2 - X_1)/((X_2 + X_1)/2))$$

Thus, the system analyzes the contrast, as a method of the detection of patterns and features, for recognition of objects or features, e.g. face recognition or voice recognition, which uses pixel intensity contrast or sound frequency (and amplitude) contrast, respectively.

In one embodiment, the search engine works on music or sound or speech or talking pieces or notes, to find or match or compare, for taped e-books, text-to-voice conversions, people's speech, notes, music, sound effects, sound sources, ring tones, movie's music, or the like, e.g. to find a specific corresponding music title or movie title, by just humming or whistling the sound (or imitate the music or notes by mouth, or tapping or beating the table with hand), as the input. The output is all the similar sounds or sequence of notes that resemble the input, extracted and searched from Internet or a music or sound repository. See FIG. 107 for such a system, with a conversion or normalization of a music piece to a sound bite, based on a dictionary or library, e.g. a piece such as "BE-BE-BA BO------BE-BE-BA-BO", with each of BE, BA, and BO representing a sound unit or symbol or alphabet or note or frequency or pitch in the dictionary, and each "-" representing a unit of time or time delay or pause between different notes or sound pieces or sound units.

In one embodiment, the text or speech has content with more than one language. Thus, it has to be distinguished and separated into pieces, first, before it can be further processed for each language separately, as described elsewhere in this disclosure. FIG. 118 is an example of a system described above.

Body Language, Expressions, or Emotions

In one embodiment, the patterns or sequences of sign language or hand movements or eye or lip or facial or foot or body expressions can be recognized, for emotion recognition or translated or converted to text expressions. In one embodiment, the sensors or tags are attached to the body of the user (e.g. the hand of a user), to record movements and positions of a hand with respect to multiple fixed points or coordinates (with beacons or detectors or signal sources) in the room, so that the movements can be recorded and then later interpreted as emotions (e.g. anger) or expressions, such as sentences, data, commands, sequence of information, or signal, e.g. to be converted to text or voice or computer code or instructions, for a person or computer to receive. FIG. 118 is an example of a system described above.

For example, this can be used for hands-free navigation of an aircraft by a pilot, using commands, translated based on her body or facial movements or gestures or shapes, e.g. capturing position of facial features, tracking the features, and speed of movements, based on the typical templates of a face or a hand, in a database, to interpret hand signals (e.g. position of fingers with respect to each other, e.g. to indicate that "The package was received.") or facial definitions or expressions or signals (e.g. position or angle of nose, lips, eye lid, eye, and eye brows, e.g. indicating anger or smile), or based on templates from a specific user for hand or facial gestures. The commands or codes or transcripts or instructions can be fed into a computer or device for a specific action or result. The pattern recognition (described elsewhere in this disclosure) is used to find or interpret the hand or facial signals or data. The interpretations may be not-definite and has a membership value, which is a fuzzy parameter. FIG. 118 is an example of a system described above.

In one embodiment, the search is done on multimedia or movies or videos, with text, tags, and sound track associated with it, which can correlate each findings or recognitions from different components of the multimedia, for more accurate overall combined recognition process. In one embodiment, if a piece of a video or the whole video is repeated, similar, or exact copy, to save the storage space (e.g. for video archiving or referencing purposes), depending on the degree of similarity and degree of importance of the video for the user, which are fuzzy parameters, the system may eliminate full or partial data from the video storage(s). For example, for a video with the subject classified as "not-important", a second video with the same exact data can be deleted, by the policy enforcer module or device, as there is no need for a backup data, based on the pre-set policy in a database, with thresholds and fuzzy parameters or rules, as explained elsewhere in this disclosure.

This method can be used, for example, for minimizing the size of repository needed for video storage web sites (e.g. YouTube.com), or similarly, for emails or attachments carrying the same or similar content or information, e.g. to open up space and delete the duplicative data or files, on a computer or hard drive or server or memory device(s), for faster data management or faster search through that data.

More Embodiments

Rules Engine, Filter/Test and Join Networks

An embodiment implements a rules engine based using Z-valuation or fuzzy maps. In one embodiment, a set of rules are analyzed and the constituents of the antecedent part of the rules are determined, in order to determine pattern in the antecedent parts among rules. This approach helps dealing with many rules in a system where similar antecedent parts appear within different rules. In this approach, the redundancy in evaluating antecedent parts is eliminated/reduced and the temporal issues and inconsistent evaluations of the same parts in different rules are prevented. In one embodiment, a pattern network nodes based on rules' antecedents is setup, e.g., by filtering the variable attributes used in rules' antecedents. In one embodiment, multiple fact patterns satisfy/trigger/fire the same rule. In one embodiment, the facts or propositions are propagated through a pattern network, and a link or a copy of the fact/proposition (or a part thereof) is associated to a pattern node (or added to an associated list/table) along with a truth value indicating how well the fact satisfies the pattern/test/filter associated with the pattern node. For example, if a pattern associated with a pattern node is (X is A) and the fact propagated is (X is B), then the truth value is determined, for example, based on max-min approach (i.e., maximum, for all x, of minimum of $\mu_A(x)$ and $\mu_B(x)$). In one embodiment, a join network comprises of join nodes based on antecedents of rules to determine the fact patterns satisfying the antecedents. In one embodiment, the list of facts/working memory from pattern network nodes are joined with other lists of facts/working memory from nodes of pattern network of join network, in order to build up the antecedent or parts of antecedent of each rule, at each node of join network. In one embodiment, the joining is performed via a binding variable in both lists being joined. In one embodiment, the truth value associated with the joined record is determined by the truth values of the joining records and the type of the join. For example, in a conjunctive join the truth value of the joined record is determined as minimum of the truth values of the joining records. In one embodiment, the truth value associated with the joined record is also based on the binding variable matching from records of the lists being joined. For example, in one embodiment, where the binding variable has a fuzzy value in one or both lists, the threshold for binding records from the lists (e.g., in equality test of binding variable) or associated truth value based on the binding is determined based on a max-min approach. For example, if the binding variable has fuzzy values A and B in two lists being joined, then the threshold or binding truth value is determined by maximum, for all x, of minimum of $\mu_A(x)$ and $\mu_B(x)$. For example, if the binding variable has fuzzy values A and crisp value b in two lists being joined, then the threshold or binding truth value is similarly determined as $\mu_A(b)$.

To illustrate an embodiment, suppose the following example of facts provided to the rules engine or inference engine:

Rob is Vera's son.
Alice is Vera's daughter.
Vera is a woman.
Rob's age is mid twenties.
Alice's age is mid thirties.

Alice is young (with low confidence in accuracy of speaker).

Also, suppose there is a rule indicating:

If a woman is middle-age then <some consequent>.

The facts are presented in a protoform and relationships are setup (e.g., in database or linked memory), as for example, depicted in FIG. 120(*a*):

Son(Vera) is Rob.
Daughter(Vera) is Alice.
Gender(Vera) is female.
Age(Rob) is *25.
Age(Alice) is *35.

With the rule antecedent being:

(Age(<var1>) is middle-age) and (Gender(<var1>) is female).

In one embodiment, based on the existing attributes and relationships (e.g., age, son, daughter) other attributes and relationships are extracted from an attribute/relationship database based on context and existing attributes. For example, a reciprocity relationship is queried and results are used to expand the relationship between the objects or records. For example, relationships "son" and "daughter" result in the reciprocal relationships "parent" or "mother" or "father" (depending the gender of the parent). In one embodiment, the reciprocal relationships per object/record relationship is further filtered based on the existing attributes of the object/records. For example, reciprocal relationship "father" is filtered, while reciprocal relationship "mother" is kept, based on the value of the gender attribute of object/record "Vera" where the queried relationships "son" and "daughter" are based. In one embodiment, consequential attributes are determined, e.g., by querying an attribute/relationship database. For example, the consequential attribute query of "son" (to "Rob") results in consequential attribute for "Gender" with value of "male" to object/record "Rob". Similarly, the consequential attribute query for "daughter" (to "Alice") results in consequential attribute of "Gender" with value of "female" to object/record "Alice".

In one embodiment, synonym/liked attributes are queried, and the results are instantiated as supplemental relationships between the objects/records. For example, a query for "son" or "daughter" results in relationship "child", and in an embodiment, a supplemental "child" relationship between the records "Vera" and "Alice" is instantiated. Similarly, in one embodiment, "parent" relationship from between "Rob" (or "Alice") to "Vera" is instantiated (not shown in figures), based on equivalence/superset to the corresponding "mother" relationship/attribute.

In one embodiment, additional relationships (e.g., "brother" and "sister" between "Alice" and "Rob" (not depicted in figures)), are determined from knowledge base, by matching a set of related object/attributes to a set of general rule(s) for expanding relations/attributes. For example, in one embodiment, the following rules in knowledge base IF parent(<var1>) EQUAL parent(<var2>)
  THEN Bi_Direction_Relation(<var1>, <var2>, Sibling);
IF Sibling(<var1>, <var2>) AND Gender((<var1>) is Male
  THEN Relation_To(<var2>, <var1>, Brother);
IF Sibling(<var1>, <var2>) AND Gender((<var1>) is Female
  THEN Relation_To(<var2>, <var1>, Sister);

when binding with object/records "Alice" and "Rob", results in bi-directional Sibling attribute/relationship between "Rob" and "Alice", directional "Sister" and "Brother" attribute/relationship and/or protoforms.

In one embodiment, parallel/suggestive attributes are queried, e.g., from an attribute/relationship database. For example, a parallel/suggestive query for "Age" attribute, results in attribute "Birth". In one embodiment, a template set of attributes/relationship is determined based on the result of such query. For example, along with attribute/event "Birth", other related attributes, e.g., "Time" and "Place" related to "Birth" are returned as set/template for application and instantiation. For example, such template is applied to objects/records "Vera", "Rob", and "Alice", e.g., based on their existing attribute "Age". In one embodiment, the instantiation of template results in separate records and relationships for each instance. A template may include a class level attribute with instantiation at the class level. In one embodiment, the expanded attributes/relationships are supplemented to the relationships and records, e.g., in database. In one embodiment, a protoform of the existing attributes/relationships are instantiated and/or linked to the objects/records, as for example, depicted in FIG. 120(*b*) (in dotted lines):

Mother(Rob) is Vera.
Mother(Alice) is Vera.
Child(Vera) is Rob.
Child(Vera) is Alice.
Gender(Rob) is male.
Gender(Alice) is female.

In one embodiment, placeholder objects/records or protoform fragments are instantiated, e.g.: Birth(Alice), Time(Birth(Alice)), Place(Birth(Alice)), Birth(Rob), Time(Birth(Rob)), Place(Birth(Rob)), Birth(Vera), Time(Birth(Vera)), and Place(Birth(Vera)). In one embodiment, such fragments or placeholder/records/objects are used to further discover relationships and potential joins.

In one embodiment, a query (e.g., an iterative query) is made to expand the facts and related rules from the knowledgebase. For example, a query into the attributes and records results in the following attributes (as depicted in FIG. 120(*c*)): "Age", "Mother", "Birth", "Time", etc. In one embodiment, a query using the attributes in a knowledgebase (e.g., database) results in related (e.g., via tags or relevance factors) general facts or relationship, e.g., in Z-valuation form. For example, as depicted in FIG. 120(*c*), a general fact is returned indicating "Most likely, the age of mothers when giving birth is between about twenty to about forty years old." Or in a protoform, such statement/fact may appear as:

G1: Age(Mother(<var1>), at time(birth(<var1>))) is range [*20, *40], most likely.

In this example, <var1> is indicative of instantiation point or join potential.

In one embodiment, as for example depicted in FIG. 120(*c*), a query (e.g., contextual) is made in a knowledge base, e.g., to extract general relationship used to extend the existing facts and relationship and/or provide relationships (e.g., aggregate functions) between related entities or classes of objects/record types. For example, as depicted in FIG. 120(*c*), the following facts/functions/rules resulted from query:

F1: Age(<var1>, at present (DEFAULT)) is
  Age(<var1>, at time(<var2>))+Elapsed(time(<var2>), present (DEFAULT));
F2: Age(<var1>, at time(birth(<var1>))) is 0;
F3: IF time(<var2>) is before(time(birth(<var1>)))
  THEN (Age(<var1>, at time(<var2>)) is UNDEFINED;
F4: IF time(<var2>) is after(time(death(<var1>)))
  THEN (Age(<var1>, at time(<var2>)) is UNDEFINED;

In one embodiment, the contextual facts/functions are provided as template/set to supplement via instantiation and/or used in bind/join operation. In one embodiment, such instantiation further extends the attributes related to records/objects, as for example depicted in FIG. 120(d) in dotted lines, expanding "Elapsed" attribute/function on "Time" attribute, i.e., on "Time(Birth(Vera))", "Time(Birth(Rob))", and "Time (Birth(Alice))".

Figure 120A:
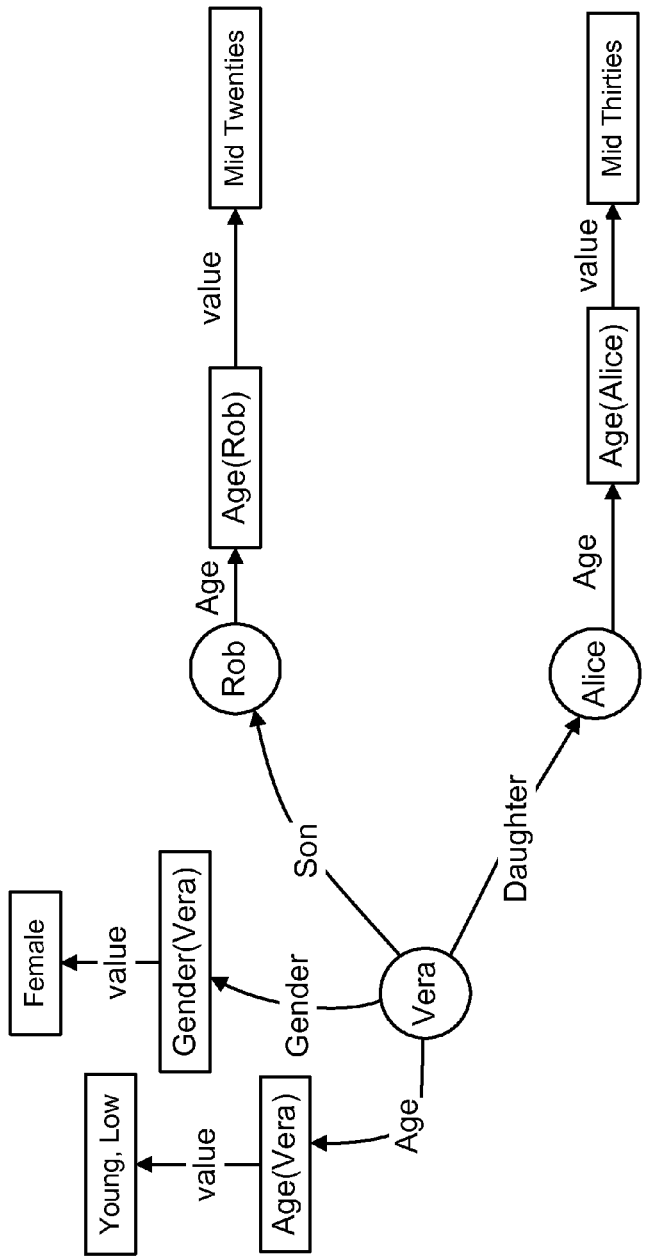
Figure 120B:
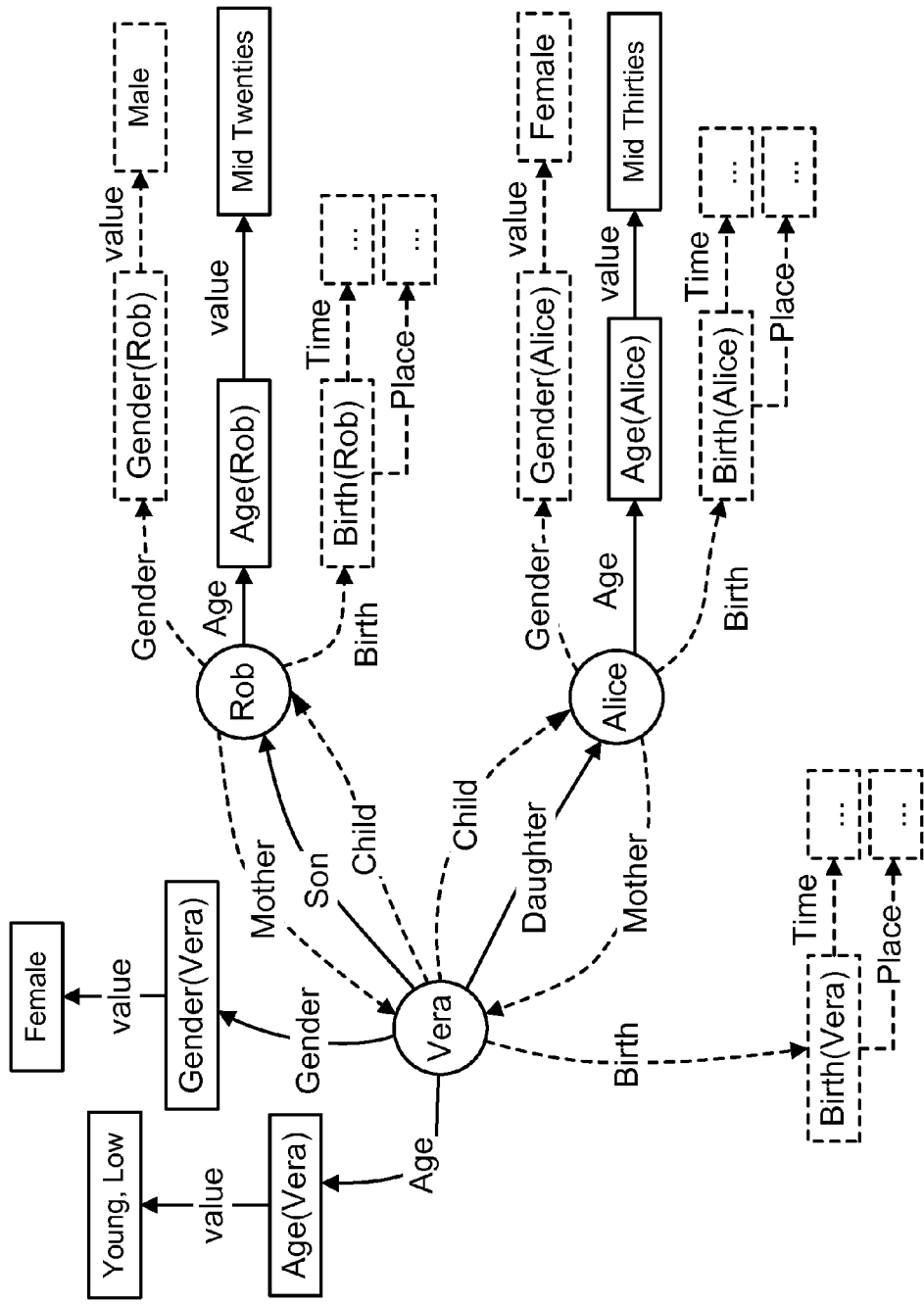
Figure 120C:
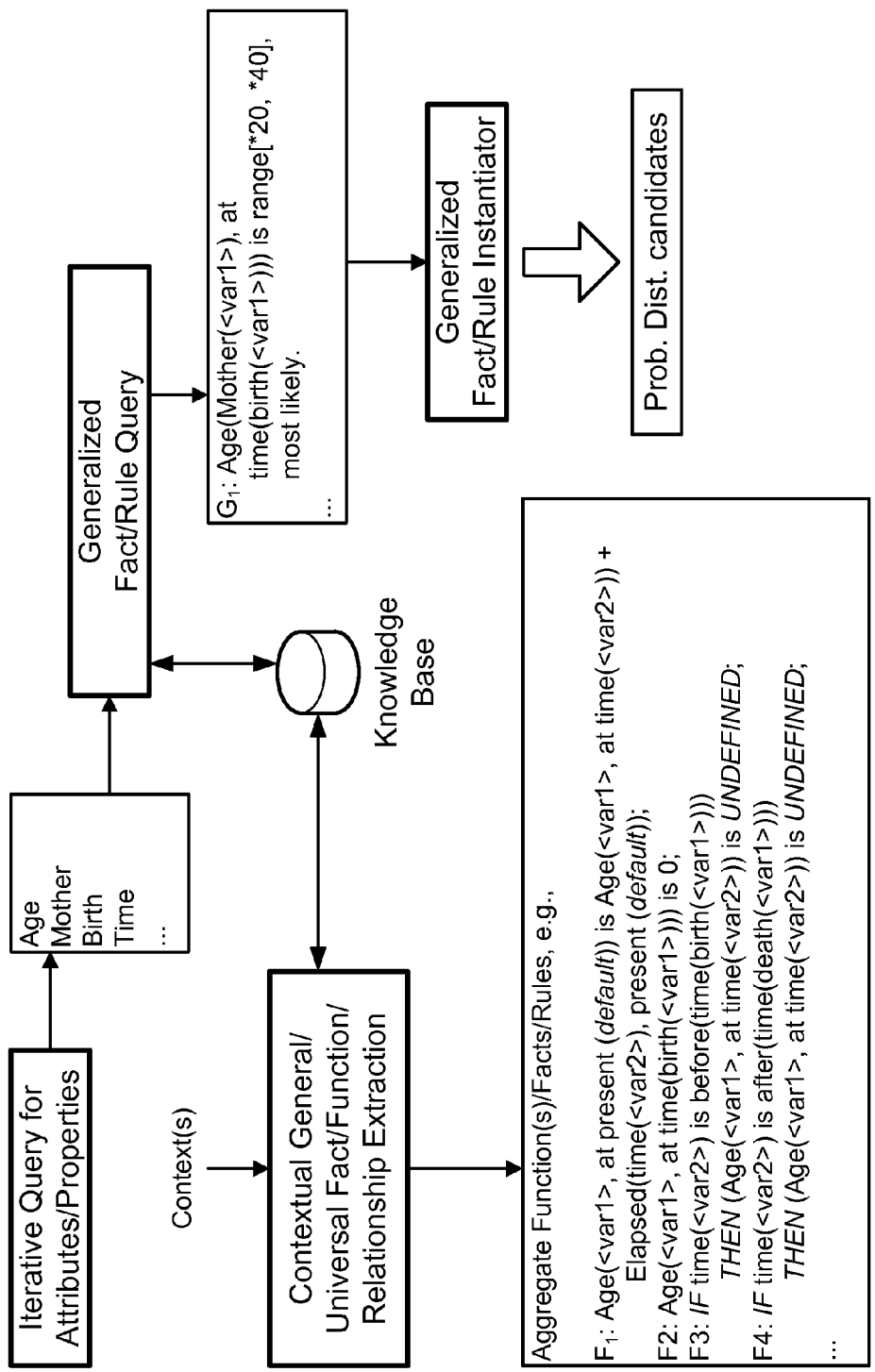
Figure 120D:
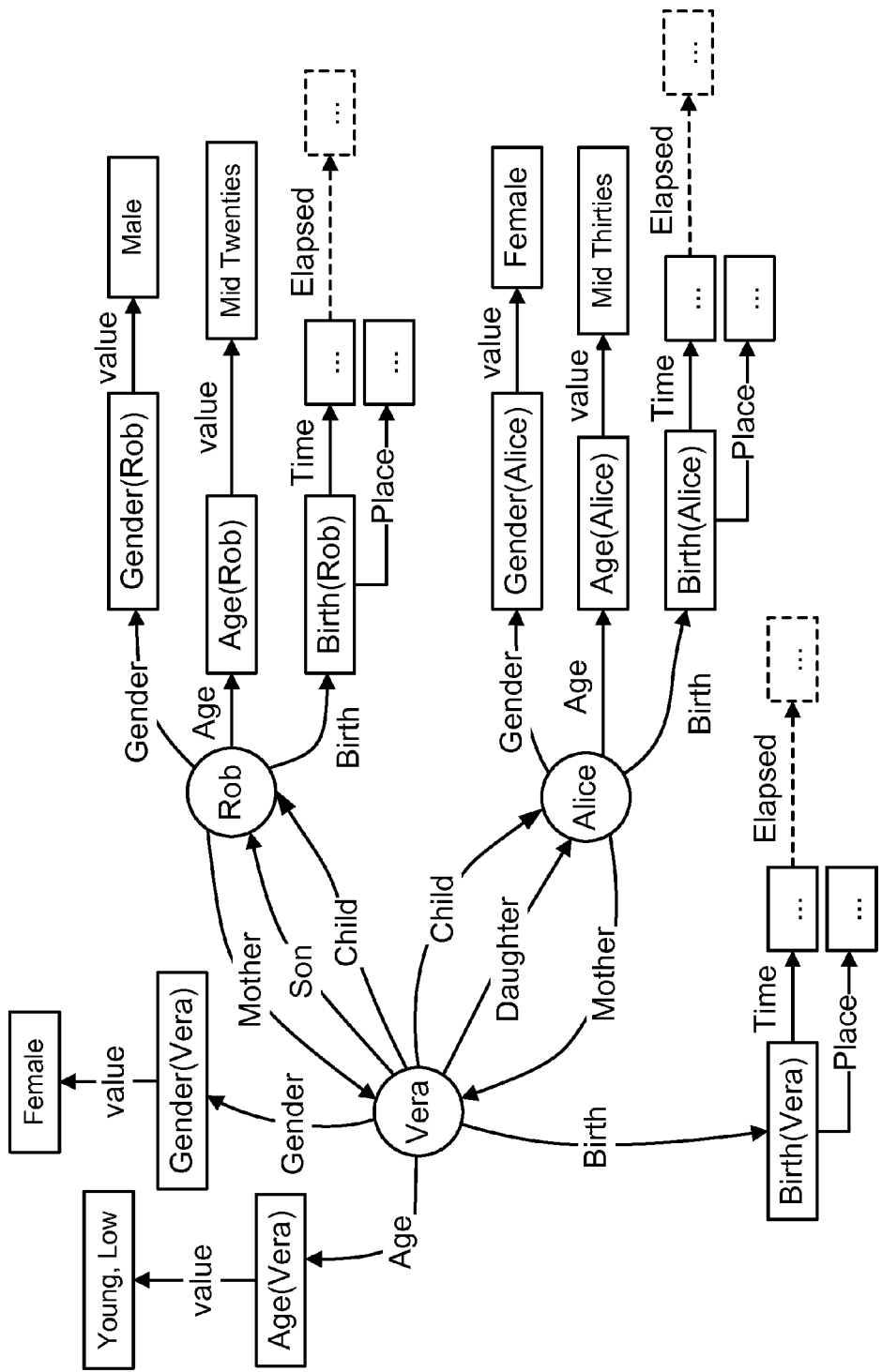

In one embodiment, to efficiently match the facts and rules, a network (e.g., linked) of objects/attributes/filters and a network of join lists are setup. For example, based on the protoform and attributes list of objects/working memory elements are determined and associated with such attributes or protoforms. For example, protoform "Age(Mother(<var1>))" in G1 has a potential match with "Rob" or "Alice" when binding to <var1>, where as "Time(Birth(<var1>))" has potential match with "Rob", "Alice", or "Vera", based on existing records/objects. Joining based on the common value, i.e., by enforcing the consistency of <var1>(e.g., via a database join operation with WHERE clause of JOIN or SELECT statement), results in joining on records "Rob" and "Alice". In one embodiment, the instantiations of general facts/functions result in additional elements or attributes (e.g., as described above for "Elapse"), in a backward chaining method. For example, in one embodiment, the following function/record/relationship is instantiated, based on F1, via binding of <var1> with "Vera" (having an attribute "Age") and binding of <var2> with "Birth(Rob)" event/record (having an attribute "time"):

Age(Vera) is Age(Vera, at time(Birth(Rob)))+Elapsed (time(Birth(Rob)));

Similarly, the following is instantiated, in an example:

Age(Vera) is Age(Vera, at time(Birth(Alice)))+Elapsed (time(Birth(Alice)));

In one embodiment, an instantiation results in further supplement of attributes for objects/records, e.g., by scanning the form of the template with binding values and linking to the existing object if it already exists (e.g., Age(Vera)) or instantiating additional attribute/object if not existing (e.g., Elapsed (time(Birth(Rob))) or Elapsed(time(Birth(Alice)))) as for example, depicted in FIG. 120(d) (in dotted lines).

In one embodiment, the instantiation of the general facts or functions result in further facts that act as functions or facts bridging or aggregating other facts. For example, instantiation of G1, based in binding <var1> with "Rob" and "Alice" due to matching/filtering protoforms ("Age(Mother( ))" and "time(birth( ))") and joining the result consistent with <var1>, results in:

Age(Mother(Rob), at time(birth(Rob))) is range[*20, *40], most likely.

Age(Mother(Alice), at time(birth(Alice))) is range[*20, *40], most likely.

In one embodiment, protoforms are resolved based on one-to-one or many-to-one type relationships. For example, Mother(Rob) is resolved to Vera or refers to the same record/object. Similarly, Mother(Alice) is resolved to Vera:

Age(Vera, at time(birth(Rob))) is range[*20, *40], most likely.

Age(Vera, at time(birth(Alice))) is range[*20, *40], most likely.

Figure 120E:
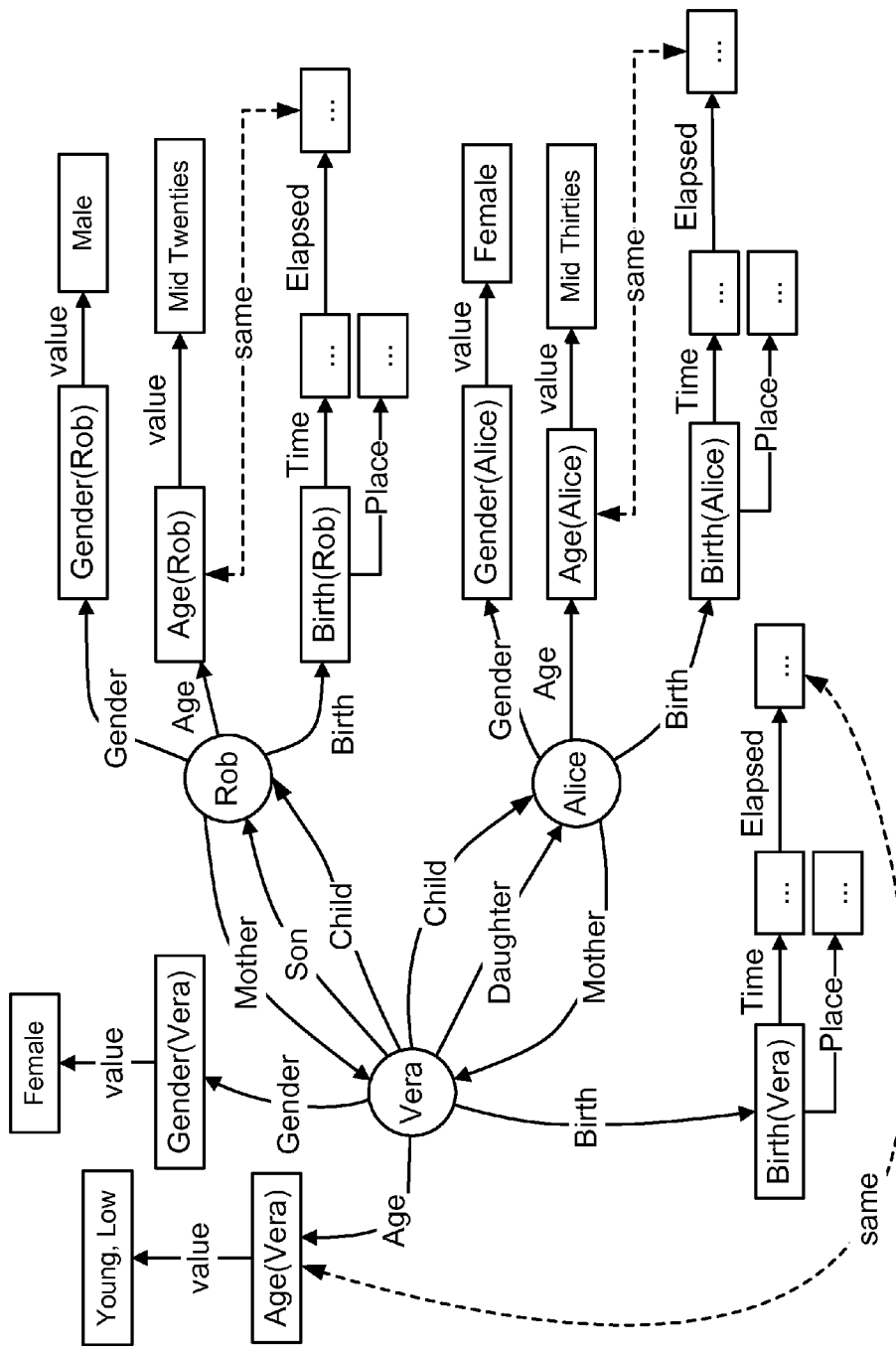

Note that the instantiation of F1 results in additional combinations when joining the list based on common attributes/protoforms. For example, binding of <var1> with "Vera", "Alice", and "Rob" (having an attribute "Age") and binding of <var2> with "Birth(Vera)", "Birth(Alice)", and "Birth(Rob)" event/record (having an attribute "time"), creates 9 Cartesian combinations (two mentioned above), e.g.:

Age(Vera) is Age(Vera, at time(Birth(Vera)))+Elapsed (time(Birth(Vera));

Age(Vera) is Age(Vera, at time(Birth(Alice)))+Elapsed (time(Birth(Alice));

Age(Vera) is Age(Vera, at time(Birth(Rob)))+Elapsed (time(Birth(Rob));

Age(Alice) is Age(Alice, at time(Birth(Vera)))+Elapsed (time(Birth(Vera));

Age(Alice) is Age(Alice, at time(Birth(Alice)))+Elapsed (time(Birth(Alice));

Age(Alice) is Age(Alice, at time(Birth(Rob)))+Elapsed (time(Birth(Rob));

Age(Rob) is Age(Rob, at time(Birth(Vera)))+Elapsed(time (Birth(Vera));

Age(Rob) is Age(Rob, at time(Birth(Alice)))+Elapsed (time(Birth(Alice));

Age(Rob) is Age(Rob, at time(Birth(Rob)))+Elapsed(time (Birth(Rob));

In one embodiment, the instantiation of other general facts/rules is used to simplify or evaluate the other facts or relations, e.g., by evaluating or substituting the prototype fragments. For example, instantiating F2 by binding <var1> with "Vera", "Alice", and "Rob" (having an attributes "Age" and "time (birth( )") results in the followings:

Age(Vera, at time(birth(Vera))) is 0;

Age(Alice, at time(birth(Alice))) is 0;

Age(Rob, at time(birth(Rob))) is 0;

In one embodiment, the relationships are partially or iteratively evaluated, e.g., by simplifying the protoforms by substitution or by creating relationships. For example, based on instantiation of F2, several of F1 instances become:

Age(Vera) is Elapsed(time(Birth(Vera));

Age(Alice) is Elapsed(time(Birth(Alice));

Age(Rob) is Elapsed(time(Birth(Rob));

In an embodiment, additional relationships/attributes are made between records/objects based on the evaluations. For example, as depicted in FIG. 120(e) in dotted lines, "identity"/"same" type relationship is made between Elapsed(time (Birth(Rob)) and Age(Rob) records/objects.

In one embodiment, such simplification is done at the template/class/general functions/rule level. For example, in one embodiment, general facts are joined via binding variables having common attributes. For example, general facts F1 and F2 are joined based on F1:<var2> and F2:birth (<var1>) both having "time( )" attribute, resulting in a general fact that:

F1': Age(<var1>, at present (default)) is Elapsed(time (birth(<var1>)), present (default));

In one embodiment, additional general facts are derived based on other facts via a background process. In one embodiment, the additional facts are tested against specific test scenarios for scoring and validations. In one embodiment, additional facts are promoted/tagged as general facts after a validation process and/or passing a validation threshold.

In one embodiment, the instantiation of other general facts/rules is used to filter and trim inapplicable combinations. For example, the instantiation of F3 with binding of <var1> with "Vera", "Alice", and "Rob" (having an attribute "time (birth( )") and binding of <var2> with "Birth(Vera)", "Birth (Alice)", and "Birth(Rob)" event/record (having an attribute "time"), creates 9 Cartesian combinations, including, e.g., "Birth(Vera)" for <var2> and "Rob" for <var1>:

IF time(Birth(Vera)) is before(time(birth(Rob)))
    THEN (Age(Rob, at time(Birth(Vera))) is UNDEFINED;

For example, further evaluation (e.g., in a subsequent cycle or during a instantiation of a general fact by feeding the instance through a filter/test network) of this instance (e.g., using other generalized facts/functions), trims and nullifies the following G1 instance:

Age(Rob) is Age(Rob, at time(Birth(Vera)))+Elapsed(time (Birth(Vera));

given that Age(Rob, at time(Birth(Vera))) is evaluated as UNDEFINED.

Figure 120F:
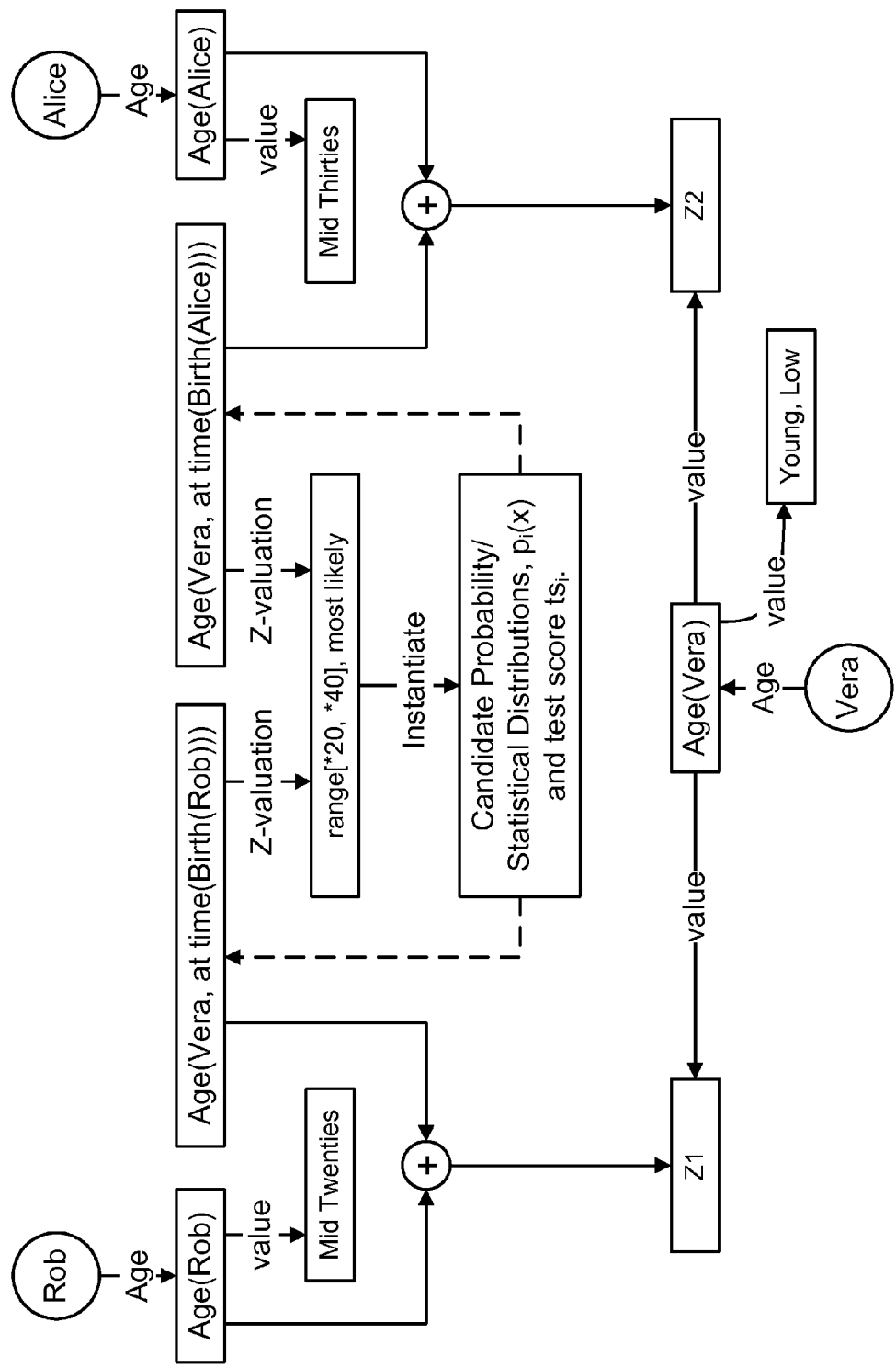
Figure 120G:
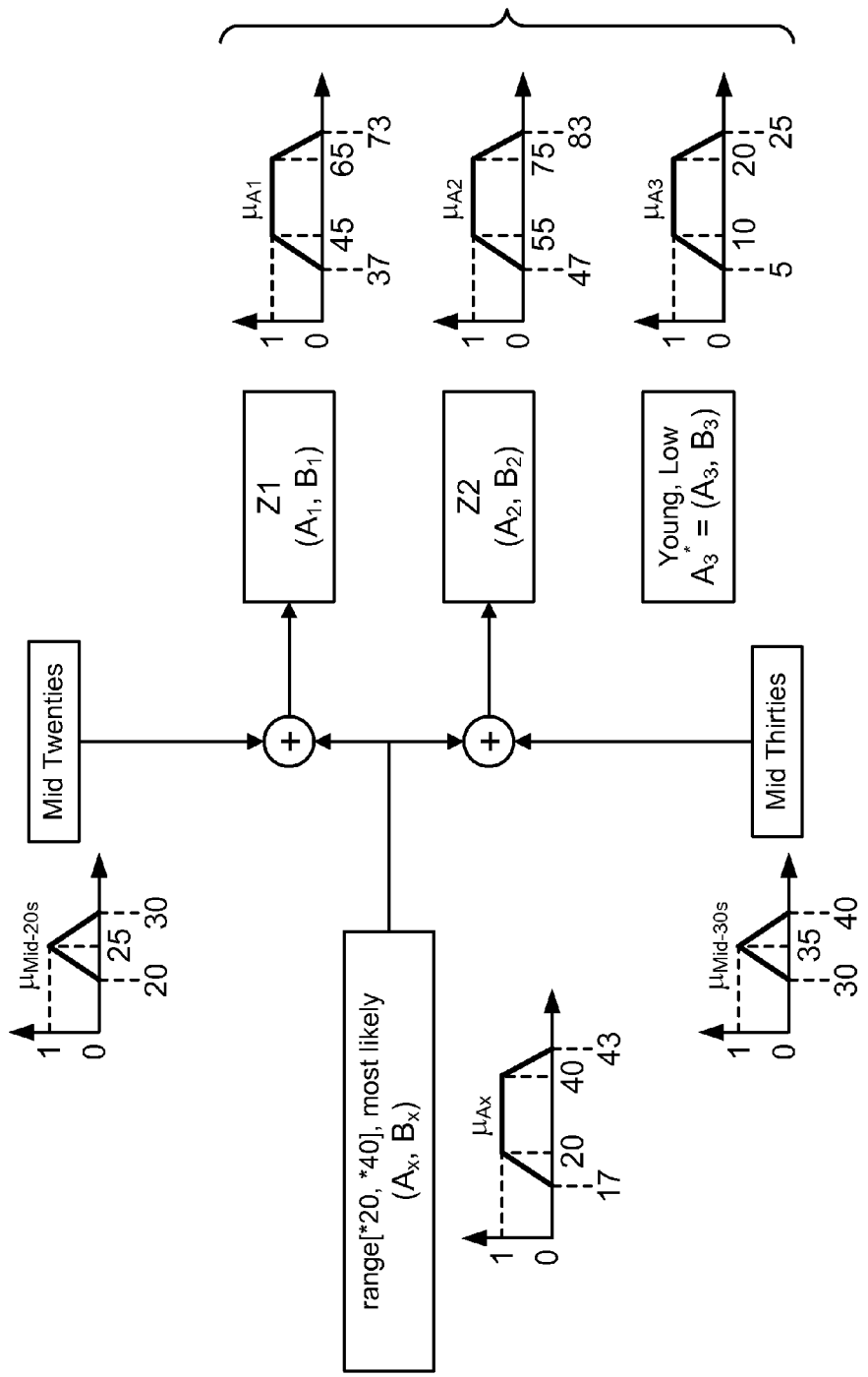
Figure 120H:
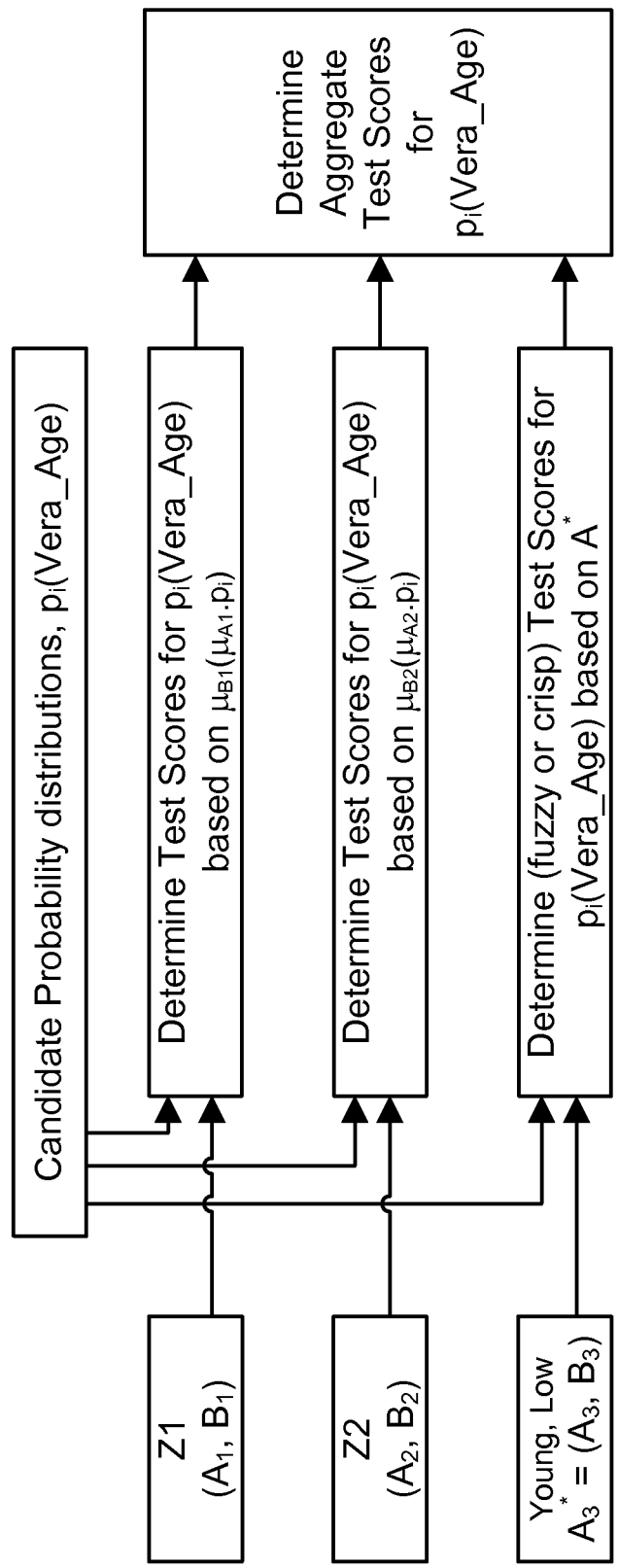

Other instances of F1, for example, are further simplified/ substituted or used to build further relationships (based on other instantiations of F1), e.g.:

Age(Vera) is Age(Vera, at time(Birth(Alice)))+Age(Alice);

Age(Vera) is Age(Vera, at time(Birth(Rob)))+Age (Rob);

In one embodiment, a candidate generalized fact is generated (e.g., in protoform) based on instantiated/modified facts, e.g., by resolving multiple object references to the same object. For example, in one embodiment, from the above statements, one or more of the following candidate generalized facts are obtained:

Age(<var1>) is Age(<var1>, at time(Birth (child<var1>)))+Age(child<var1>);

Age(mother(<var1>)) is Age(mother(<var1>), at time (Birth(<var1>)))+Age (<var1>);

In one embodiment, as for example depicted in FIG. 120(f), the valuation of Age(Vera, at time(Birth(Alice))) and Age (Vera, at time(Birth(Alice))) objects/records is of Z-valuation type. An instantiation of such valuation, in one embodiment, sets up a candidate probability or statistical distributions, $p_i(x)$ and their corresponding test scores $ts_i$. In one embodiment, additional valuations for Age(Vera) is obtained by further valuations of matching instantiated facts/aggregate functions/rules. For example, Age(Vera), in one embodiment, is given two more valuations, Z1 and Z2, based on valuation of above instantiated/simplified statements/aggregate functions. In one embodiment, an aggregate valuation of an object/record (e.g., Age(Vera)) is obtained by further aggregating its multiple valuation (e.g., Z1, Z2, and (Young, Low)). For example, as depicted in FIG. 120(g), Z1 is obtained by adding Z-valuation (range[*20, *40], most likely) and (mid twenties), and Z2 is obtained by adding Z-valuation (range [*20, *40], most likely) and (mid thirties). In one embodiment, the membership functions of various fuzzy sets/values are determined using knowledge base (e.g., by querying contextual tables/database with records identifying fuzzy sets and modifiers (e.g., "mid-twenties", "mid-thirties", "young", "about", etc) and their corresponding attributes such as their membership functions, e.g., in a piecewise format). As depicted for example in FIG. 120(g), Z1 ($A_1$, $B_1$) has a membership function for $A_1$, obtained, for example, via extension principle or alpha-cuts from the membership functions of $\mu_{Mid-20s}$ and $\mu_{Ax}$ (where Ax denotes the fuzzy range [*20, *40]). Similarly, in Z2 ($A_2$, $B_2$), a membership function for $A_2$ is determined, in one embodiment, from $\mu_{Mid-30s}$ and $\mu_{Ax}$, as depicted in FIG. 120(g). In one embodiment, the valuation of (Young, Low) is of a fuzzy map $A_3^*$, given the Low confidence level, e.g., applies to the speaker's confidence/reliability. In one embodiment, the probability distribution test scores are imposed from $B_X$ to $B_1$ and $B_2$, for example, $B_1$ and $B_2$ take on the value of $B_X$.

In one embodiment, multiple valuation of a record/object (e.g., Age(Vera)) is aggregated by aggregating test scores related to the valuations. (For example, see more detail in section Scoring with Fuzzy Map and FIGS. 125(a)-(b)). In one embodiment, as for example depicted in FIG. 120(h), multiple valuations for a record/object (e.g., Z1, Z2, and A3* (valuations of Age(Vera))) are used to determine (an aggregate) test scores or restriction (membership function) for (candidate) probability distribution of the variable representing the record/object (e.g., Vera_Age).

In one embodiment, a set of candidate probability/statistical distribution is instantiated per object/record having Z-valuation, e.g., Age(Vera, at time(Birth(Rob))) and Age (Vera, at time(Birth(Alice))) both valued to (range[*20, *40], most likely), are associated each to a set of probability/statistical distribution candidates. In one embodiment, a set of test scores are associated/instantiated per object/record having Z-valuation. In one embodiment, the candidate probability distributions are scored based on facts/rules/functions related to a specific record/object with the resulting test scores associated to the specific corresponding record/object. In one embodiment, the candidate probability distributions are shared by same Z-valuations, while the corresponding test scores are associated to specific records/objects based on the facts/rules/functions related to those specific records/objects. For example, in applying the following fact/function Age (<var1>) is Age(mother(<var1>))−Age(mother (<var1>), at time(Birth(<var1>)));

to "Rob" and "Alice" by binding to <var1>, aggregate functions affecting Age(Rob) and Age(Alice) are obtained, for example:

Age (Rob) is Age(Vera)−Age(Vera, at time(Birth(Rob)));

Age (Alice) is Age(Vera)−Age(Vera, at time(Birth(Alice)));

For example, in one embodiment, a set of probability distribution candidates are set up for variable representing Age (Rob), and test scores are determined, for example, via Z-valuations imposed via Age(Vera, at time(Birth(Rob))) (i.e., range[*20, *40], most likely). Such test scores alone are expected to be the same as those for a set of probability distribution candidates set up for variable representing Age (Alice). However, the application of other facts to the scoring of the probability distributions, in one embodiment, results in different scoring (aggregate) per record/object/variable. For example, facts (Age(Rob) is min-twenties) and (Age(Alice) is mid-thirties) produce different scores for the same set of probability distributions ($p_i$), i.e., ($p_i \cdot \mu_{Mid-20s}$) score is in general different from ($p_i \cdot \mu_{Mid-30s}$) score. In one embodiment, the resulting aggregate test scores associated with the candidate probability distributions of the same Z-valuations are different and are associated with specific records/objects (e.g., Age(Rob) and Age(Alice)).

In one embodiment, as mentioned above, supplemental facts (specific or general) are determined by applying a template for equivalent transformation (e.g., including substitutions) to recognized protoforms. For example, in one embodiment, querying form (A is B+C) in a knowledge database results in a set of equivalent templates including (B is A−C) or (C is A−B). Applying the equivalent forms, for example, by parsing and substitution or reference to objects, generates and expands the facts base or aggregate function sets.

Join Operation

Figure 121A:
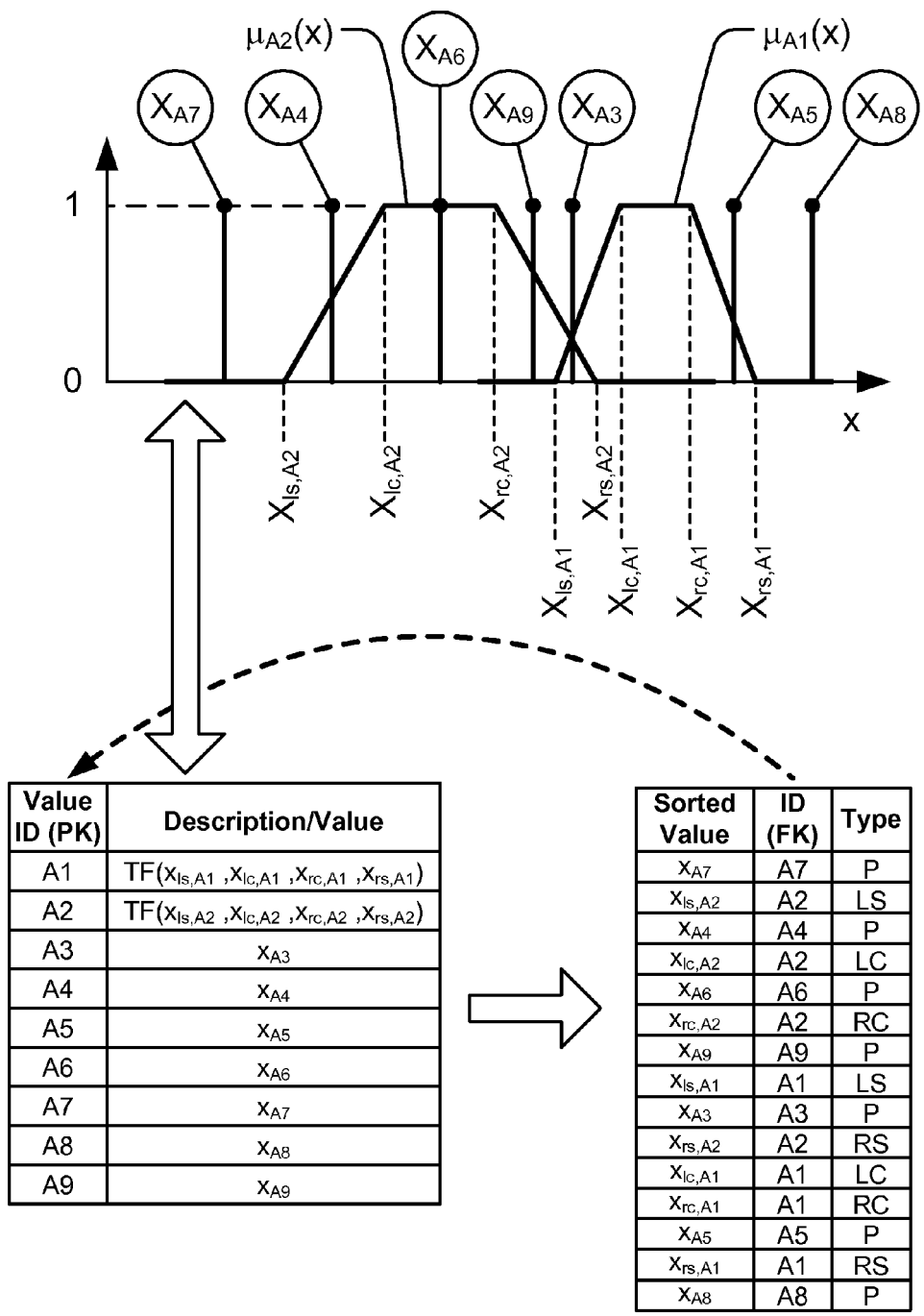

In one embodiment, the joining of the lists is optimized by using the ordering or indexing on the lists. In one embodiment, the crisp and fuzzy values of X in a list are ordered based on partial ordering $\langle \mathcal{R}, \leq \rangle$, e.g., based on alpha cuts and interval comparison. In one embodiment, as shown in FIG. 121(a), values of attribute A (column) in a list includes one or more of crisp and/or fuzzy numbers. In one embodiment, the values are identified via an identifier (e.g., a unique ID such as a primary key (PK)) as depicted in FIG. 121(a), for example, as $A_1, \ldots, A_9$. In one embodiment, the ID is a hash key or a sequential counter or an internal counter/ID, e.g., assigned by a database management system (DBMS). In this example, as depicted in FIG. 121(a), TF($x_{ls,A1}, x_{lc,A1}, x_{rc,A1}, x_{rs,A1}$) represents a trapezoid fuzzy set defined by the left (l) and right (r) of its support (s), and core (c) on x-axis, for fuzzy set identified by $A_1$. Similarly, $x_{43}$ is a value identified by $A_3$ for column/attribute A in the list. In one embodiment, as for example depicted in FIG. 121(a), an index or a sorted list is setup by sorting x values of the crisp number/intervals and corner points of fuzzy sets (e.g., the support and/or core locations). In one embodiment, the sorted list includes a type attribute to indicate the type of the sorted record, e.g., precise value (P), left-support (LS), right-core (RC), etc. as depicted in FIG. 121(a). In one embodiment, the sorted list has a column/attribute identifying the record ID of the main list, e.g., as a foreign key (FK). In one embodiment, alpha cuts (e.g., at membership function values of $0^+$, 0.5, and 1) are used to get the intervals of the fuzzy sets (e.g., A1 and A2) at those cuts. In one embodiment, the x values of such intervals are sorted in the sorted list. In one embodiment, the type for such x values is indicated as alpha cut and/by its alpha cut level/indicator, e.g., as an attribute in the sorted list. In one embodiment, left/right points of the cut interval is identified by an attribute, e.g., in the sorted list. In above example, S (support) and C (core) are indicators for special case of alpha cuts at $0^+$ and 1. In various embodiments, the indicators may be in one or more attributes/columns and in various forms (such as characters/numbers).

Figure 121B:
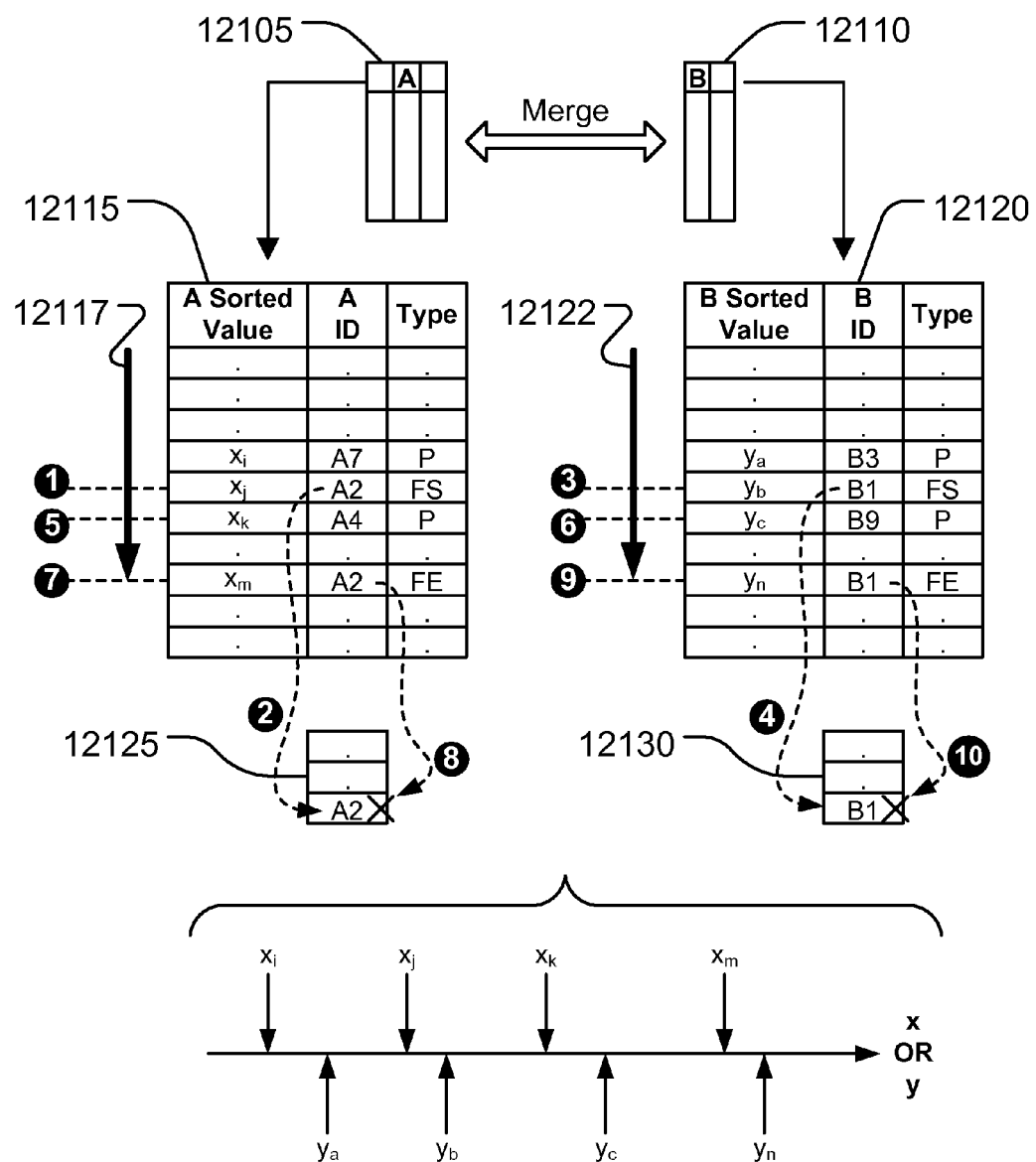

In one embodiment, as for example depicted in FIG. 121 (b), two or more lists/tables (e.g., 12105 and 12110) are joined on one or more attributes/variables (e.g., joining on attribute A from 12105 and attribute B from 12110). In one embodiment, a sorted list/index on attribute A (12115) and a sorted list/index on attribute B (12120) are used to make joining the lists more efficient by avoiding full table scan of for one attribute for every record of the other attribute. In this example, the x values (e.g., $x_i$, $x_j$, $x_k$, and $x_m$) and y values (e.g., $y_a$, $y_b$, $y_c$, and $y_n$) are in same variable domain in which the lists are being joined. To illustration purposes, as depicted in FIG. 121(b), let's assume the following order in x and y values: $x_i < y_a < x_j < y_b < x_k < y_c < x_m < y_n$. In one embodiment, as for example depicted in FIG. 121(b), the sorted lists/indexes include or are associated with one or more attributes indicating the identification of the records in original list (e.g., $A_7$, $A_2$, $A_4$, $A_2$, $B_3$, $B_1$, $B_9$, and $B_1$) and/or the type of x or y values (e.g., P for precise, FS for fuzzy start or support start, FE for fuzzy end or support end). In one embodiment, the sorted lists or indexes are scanned together, e.g., using a running counters (12117 and 12122) (e.g., in ascending direction), instead of performing a full Cartesian product search between the records. Assume for example, the counters are at some point advancing from $x_i$ from 12115 and $y_a$ from 12120. In one embodiment, an index for which the current value is smaller is advanced, i.e., given for example $x_i < y_a$, index/counter 12117 is advanced to $x_j$ (shown by annotation 1 in FIG. 121(b)). In one embodiment, when an index counter moves to a record indicating a fuzzy value/set association (e.g., FS for fuzzy start), the potential joins may be forthcoming from the other list as other index(es)/counter(s) advance. In one embodiment, the record is marked or an attribute (e.g., the identifier and/or its sorted value) or a copy of the record is moved into an auxiliary queue/list/table (e.g., 12125) associated with the original (e.g., 12105) or sorted list (e.g., 12115) as shown by annotation 2 in FIG. 121(b). In one embodiment, the join based on fuzzy $A_2$ starting at $x_j$ and crisp $B_3$ at $y_a$ (currently pointed by index/counter 12122) is tested. If, as in this example, $x_j$ is more than $y_a$, there is no join possibility (i.e., based on equality join). In one embodiment, $A_2$ is tested against records in an auxiliary queue/list/table (e.g., 12130) associated with other list (12110 or 12120) for potential join(s). In one embodiment, after testing potential joins with items of auxiliary list, index/counter is advanced, e.g., counter/index (12122) is advanced to $y_c$ associated with start of fuzzy set $B_3$, given that $y_a < x_j$ (as shown by annotation 3 in FIG. 121(b)). Likewise, in one embodiment, $B_1$ and/or its associated value(s) are marked or moved into an auxiliary queue/list/table (e.g., 12130), as shown by annotation 4 in FIG. 121(b). In one embodiment, the record pointed by the advancing index/counter (e.g., $B_1$) is tested against other crisp values (pointed by other index/counters) and items (fuzzy set/value related records) in auxiliary queue/list/table (e.g., 12125) associated with other list. In one embodiment, $B_1$ is tested for join potential against $A_2$, e.g., identified via auxiliary queue/list/table 12125. Assuming for example $x_j < y_b$, the index/counter 12117 is advanced to $x_k$ associated with $A_4$ (e.g., a precise or crisp value), as shown by annotation 5 in FIG. 121(b). Likewise, the record pointed by the advancing index/counter (e.g., $A_4$) is tested for potential join with other crisp value(s) (pointed by other index/counters) and items (fuzzy set/value related records, e.g., $B_1$) in auxiliary queue/list/table (e.g., 12130) associated with other list. Similarly, since for example $y_b < x_k$, index/counter 12122 is advanced to $B_9$ having a crisp value $y_c$, as shown by annotation 6 in FIG. 121(b). In one embodiment, $y_c$, the value of $B_9$, is tested for join with $x_k$ (i.e., crisp value of $A_2$ (currently pointed by index/counter 12117)) and fuzzy set/value $A_2$ currently in auxiliary queue/list/table 12125. As depicted in this example by annotation 7 in FIG. 121(b), index/counter 12117 advances to value $x_m$ associated with the end (of support) of fuzzy set/value $A_2$ (e.g., type FE indicates fuzzy end). In one embodiment, upon such event, as for example depicted by annotation 8 in FIG. 121(b), the record/item associated with $A_2$ is marked (e.g., as non-pending) or removed from the associated auxiliary queue/list/table (e.g., 12125). In one embodiment, such record is marked/tagged for later removal upon the value pointed to by other index/counter surpasses $x_m$. This allows finding other potential joins if other forthcoming value(s) pointed to by 12122, for example, falls between $x_j$ and $x_m$ (or support of $A_2$). For example, when index/counter 12122 advances to $y_n$ associated with the start of fuzzy set/value $B_1$ (as shown by annotation 9 in FIG. 121(b)), in one embodiment, auxiliary queue/list/table (e.g., 12125) is scanned and items marked for removal (e.g., $A_2$) are removed having fuzzy ending value(s) (e.g., $x_m$) less than current value ($y_n$) pointed to by the advancing index/counter 12122. In this example, since the type associated with $y_n$ is also a fuzzy ending type (for fuzzy set/value $B_1$), in one embodiment, the record associated with $B_1$ in the associated auxiliary queue/list/table 12130, is similarly marked/tagged for removal, as shown by annotation 10 in FIG. 121(b).

In one embodiment, tagging/marking (e.g., for removal) is done via codes and/or attributes associated with items in auxiliary queue/list/table. In one embodiment, several steps are taken in batch mode or at page level, for example, to enhance speed or the database performance. In one embodiment, a positive testing for join is followed by inserting the joined record (from two lists) in a joining list/table or a result set.

In various embodiments, various methods to join lists/tables based on variable taking fuzzy values are used. The resulting joined record, in one embodiment, includes a score relating to the joining values (fuzzy or crisp). For example, when determining the score for joining record associated with $A_2$ from 12105 to $B_1$ from 12110, the test score for the join (or threshold) is for example, determined by max-min approach, i.e., $$TS_{join(A_2,B_1)} = \sup_{\forall x}(\mu_{A_2}(x) \wedge \mu_{B_1}(x))$$

In one embodiment, the join test score is used to affect the overall truth value or test score for the joined record, e.g.:

$$TS_{joined\ record} = TS_{A_2} \wedge TS_{B_1} \wedge TS_{join(A_2,B_1)}$$

Scoring with Fuzzy Map

In one embodiment, a fuzzy map A* (e.g., as depicted in FIG. 122(*a*)) is modeled as a set of membership functions (e.g., in a piecewise fashion). In one embodiment, a membership function, e.g., $\mu_A(x)$ is modeled by its corner points (e.g., shown as black dots in FIG. 122(*a*)). In one embodiment, $\mu_A(x)$ is modeled as a set of points $(x, \eta)$ indicating corners in the piecewise membership function. In one embodiment, a fuzzy map (A, B), is represented by a (discrete or continuous) set of membership functions (e.g., denoted by $\{A_\alpha\}$), where, in one embodiment, $\alpha$ is a parameter controlling the position of the corner points of the membership function in the set. For example, as depicted in FIG. 122(*a*), for a values of $\alpha_2'$, $\alpha_1'$, $\alpha_1$, and $\alpha_2$, the corresponding piecewise membership functions are denoted as $A_{\alpha 2'}$, $A_{\alpha 1'}$, $A_{\alpha 1}$, and $A_{\alpha 2}$. In one embodiment, an $A_\alpha$, is described by a set of corner points $\{(x_{i,\alpha}, \eta_{i,\alpha})\}$, e.g., as depicted by white dots on $A_{\alpha 2}$ in FIG. 122(*a*). In this example, for $\alpha_0$, $A_{\alpha 0}$ is A. In one embodiment, each $(x, \eta)$ point on $A_\alpha$, corresponds to the same value or color/grayscale in A*, i.e.

$$\text{For } \forall x, \alpha: \mu_{A^*}(x, \mu_{A_\alpha}(x)) = c_{\alpha,B}$$

where c is the possibility degree (or color/.grayscale) of the value of membership function. For example, as depicted in FIG. 122(*b*), for various values of $\alpha$, the color/grayscale measure of the fuzzy map is indicated by $c(\alpha,B)$. In one embodiment, the uncertainty measure B affects the shape of $c(\alpha,B)$. For example, the more uncertain B is, the wider $c(\alpha,B)$ becomes. In this example, the color associated with $A_{\alpha 2'}$ and $A_{\alpha 2}$, is denoted by $c_2$ corresponding to $\alpha$ values of $\alpha_2'$ and $\alpha_2$, respectively. In this example, color $c_0$ (or 1) is associated with $\alpha_0$.

In one embodiment, a similarity measure between A and $A_\alpha$ is used as the basis for color/grayscale distribution with B. For example, in one embodiment as depicted in FIG. 123(*a*), a similarity measure is used between two fuzzy set (based on a similarity approach, e.g., Jaccard similarity coefficient, geometric distance and Hausdorff metrics, or union and intersection operations, the maximum difference, and the difference and sum of membership grades). In one embodiment, for example, the following similarity measure is used:

$$SIM(A, A_\alpha) = \frac{\|A \cap A_\alpha\|}{\|A \cup A_\alpha\|} = \frac{\int \min(\mu_A(x), \mu_{A_\alpha}(x)) \cdot dx}{\int \max(\mu_A(x), \mu_{A_\alpha}(x)) \cdot dx}$$

In one embodiment, such similarity measure is based with the certainty measure B to determine the possibility measure (i.e., the color or grayscale) for $A_\alpha$. For example, in an embodiment, as depicted in FIG. 123(*b*), the color or grayscale is determined as the value of the membership function of B at $SIM(\alpha)$, i.e., $$c_{\alpha,B} = \mu_B(SIM(A,A_\alpha))$$

In one embodiment, certainty measure B is expressed as a crisp percentage $B_c$ (as opposed to a fuzzy value). In an embodiment, a fuzzy set $B_f$ is setup based on $B_c$, e.g., as depicted in FIG. 123(*b*) with its core and support based on $B_c$, in order to provide a graduated scale to assign color/grayscale value to various $A_\alpha$'s.

In one embodiment, a non-commutative function of (A, $A_\alpha$) is used to determine a similarity measure. In one embodiment, a different similarity function is used for $\alpha'$ (e.g., $<\alpha_0$) than a (e.g., $>\alpha_0$). In one embodiment, a different color/grayscale assignment is used for $\alpha'$ (e.g., $<\alpha_0$) than a (e.g., $>\alpha_x$). In one embodiment, for example, increasing a ($>\alpha_0$) results in $A_\alpha$ allowing more possibilities, i.e., $\mu_{A\alpha}(x) \geq \mu_A(x)$ for all x, and decreasing $\alpha(<\alpha_0)$ results in $A_\alpha$ allowing less possibilities, i.e., $\mu_{A\alpha}(x)\mu_A(x)$ for all x.

In one embodiment, when a fuzzy map, e.g., A*, is used in a calculation, a set $\{A_\alpha\}$ with corresponding color set $c(\alpha,B)$ is used to determine the result of the calculation. In one embodiment, multiple values of $\alpha$'s are used to model A*. In one embodiment, values of a span the shape of $c(\alpha,B)$. In one embodiment, a predefined number of $\alpha$'s are used to form set $\{A_\alpha\}$. In one embodiment, the values of $\alpha$'s corresponding to the significant points of $c(\alpha,B)$ are used to form set $\{A_\alpha\}$. For example, in such an embodiment, the corner points of $c(\alpha,B)$ (depicted in FIG. 122(*b*)) are used determine set $\{A_\alpha\}$. In one embodiment, predefined colors (e.g., c=1 and 0.5) are used to determine (the corresponding $\alpha$'s and hence) set $\{A_\alpha\}$.

In one embodiment, a fuzzy probability measure (p*) of fuzzy map A*, given probability distribution p(x), is determined using set $\{A_\alpha\}$, as follows:

$$p^* \equiv p_x \cdot \mu_{A^*}$$

$$\mu_{p^*}(s) = \sup_{\forall \alpha} c(\alpha, B)$$

subject to:

$$s = \int p(x) \cdot \mu_{A_\alpha}(x) \cdot dx$$

where $\mu_p^*$ is the membership function of the fuzzy probability measure p*. In another words, s indicates the possible probability measures of $A_\alpha$, and the color associated with $A_\alpha$ is associated to s as the measure of this possibility (or rather maximum color for various $A_\alpha$'s resulting in the same probability measure s is associated with s) indicating the membership function of p* in s domain.

For example, as depicted in FIG. 124(*a*), a probability distribution p(x) in x domain is used to determine the probability measure for various $A_\alpha$'s. For example, for a values $\alpha_2'$, $\alpha_1'$, $\alpha_1$, and $\alpha_2$, the probability measures for (e.g., piecewise membership functions of) $A_{\alpha 2'}$, $A_{\alpha 1'}$, $A_{\alpha 0}$, $A_{\alpha 1}$, and $A_{\alpha 2}$ are determined and demoted as $s_2'$, $s_1'$, $s_0$, $s_1$, and $s_2$, respectively, as depicted in FIG. 124(*b*). The corresponding color/grayscale (sup c) is determined as the measure of the possibility of the probability measure value of s, as depicted in FIG. 124(*b*). Whereas the probability measure of A (according to p(x)) is a crisp value $s_0$, the probability measure of (A,B) is a fuzzy value p*.

In one embodiment, a test score is associated with a proposition or fact (e.g., in form of X is A). In one embodiment, this test score is based on a probability measure of A based on a probability distribution in X. In one embodiment, a fuzzy test score is associated with a proposition or fact (e.g., in form of X is A*), where the test score is based on a fuzzy probability measure of A* and a probability distribution in X. In one embodiment, multiple candidate probability distributions are used to determine test scores associated with each candidate probability distribution per one or more facts or propositions. In one embodiment, an aggregate test score is determined per candidate probability distribution based on associated test scores based on multiple facts or propositions. For example, as depicted in FIG. 125(*a*), in one embodiment, multiple facts/propositions are used to determined test scores for one or more candidate probability distribution, e.g., $p_i(x)$ in X domain. In one embodiment, one or more propositions are in form of fuzzy map A* (e.g., $(A_j, B_j)$). As described in this disclosure, a fuzzy test score, $p_{i,j}$*, associated with the probability distribution $p_i(x)$ is determined based on fuzzy map A* (e.g., $(A_j, B_j)$). In one embodiment, one or more propositions are in form of Z-valuation, e.g., X is $Z_q$ (or $(X, C_q, D_q)$). As described in this disclosure, such Z valuation imposes a restriction (or test score $ts_{i,q}$) on a candidate probability distribution $p_i(x)$, e.g., in form of value of membership function of $D_q$ for probability measure of $C_q$. In one embodiment, such a test score is a crisp value in [0, 1] range. As depicted in FIG. 125(*a*), test score $ts_{i,q}$ is shown as a sharp/crisp value between [0, 1] with a membership value (crisp) of 1. In one embodiment, one or more propositions are in form of fuzzy restriction, e.g., X is $E_k$, where $E_k$ is a fuzzy set in X domain. As described in this disclosure (as depicted in FIG. 125(*a*)), a score ($s_{i,k}$) is associated to a probability distribution $p_i(x)$, e.g., in form of a probability measure of $E_k$ based on $p_i(x)$. In one embodiment, various test scores (crisp and/or fuzzy) associated with a probability distribution $p_i(x)$ are aggregated by, for example, MIN or ˆ operation. For example, MIN operation is used between fuzzy sets/numbers and crisp numbers to determined an aggregate test score ($t_i$) associated with a probability distribution $p_i(x)$.

$$t_i = (\ldots \wedge p_{i,j}* \wedge \ldots \wedge ts_{i,q} \wedge \ldots \wedge s_{i,k} \wedge \ldots)$$

In one embodiment, ˆ operation takes the minimum of all the crisp test scores such as $ts_{i,q}$ and $s_{i,k}$. In one embodiment, the ˆ operation with fuzzy set/numbers (e.g., $p_{i,j}$*) uses extension principle. In one embodiment, the ˆ operation with fuzzy set/numbers (e.g., $p_{i,j}$*) uses alpha-cut approach to determine a minimum fuzzy set. In one embodiment, a crisp number is modeled as a discrete impulse having a membership function of one, e.g., as depicted in FIG. 125(*a*), for $s_{i,k}$. In one embodiment, for example, a set of alpha cuts (e.g., at predefined values of $0^+$, 0.5, and 1) are used to determine the alpha cut intervals in various fuzzy sets/values and crisp numbers, as depicted in FIG. 125(*b*). In one embodiment, piecewise corner points in fuzzy sets/values are used to determine MIN. For example, FIG. 125(*b*) depicts the MIN operation on two fuzzy sets $p_{i,j}$* and $p_{i,k}$* and two crisp numbers $ts_{i,q}$ and $s_{i,k}$. The result of MIN operation, $t_i$, in the example, as depicted in FIG. 125(*b*), is a fuzzy set with a membership function denoted as $\mu(t_i)$ (shown in solid line). An approximate result based on alpha cuts at $0^+$, 0.5, and 1, is a fuzzy set denoted as $\mu'(t_i)$ (shown in dash line in FIG. 125(*b*)). In one embodiment, a centroid or peak of $\mu(t_i)$ or $\mu'(t_i)$ is used as a test score associated with $p_i(x)$. In one embodiment, $\mu(t_i)$ or $\mu'(t_i)$ is used in a subsequent operation as the test score associated with $p_i(x)$.

Note that usage of "MIN" and "min" are context dependant. For example, in above "MIN" is used to indicate hierarchy/order between two or more fuzzy values/sets, such as "small", "medium", and "large". "min" has been used to indicate the minimum of two values, such as the membership functions values at a given x, e.g., $\min(\mu_A(x), \mu_B(x))$ for all x, for example, to indicate the membership function of (A∩B).

More Examples

Now, we look at some more examples:

In one embodiment, we have a method for fuzzy logic control, in which an input module receives a precisiated proposition associated with a protoform. A fuzzy logic inference engine evaluates a first fuzzy logic rule from the fuzzy logic rule repository. The fuzzy logic inference engine is in or loaded on or executed on or implemented in a computing device, which comprises one or more of following: computer, processor device, integrated circuit, microprocessor, or server. The fuzzy logic rule repository comprises one or more fuzzy logic rules. The fuzzy logic rule comprises an antecedent part and a consequent part. The precisiated proposition comprises a Z-valuation, which is in a form of ordered triple (X, A, B), representing a statement assignment of X to a pair (A, B), where X represents a variable, A is a fuzzy logic set in domain of X, and B is a fuzzy logic set representing a certainty indicator of X being possiblistically restricted by the fuzzy logic set A. FIG. 119 is an example of a system described above.

The evaluating step comprises a test score evaluation module assigning a first test score to a candidate probability distribution for X based on the Z-valuation. The candidate probability distribution belongs to a set of candidate probability distributions. The test score evaluation module assigns a second test score to the antecedent part based on the antecedent part, set of candidate probability distributions, and the first test score. The fuzzy logic inference engine determines whether the antecedent part is satisfied beyond a threshold, based on the second test score. FIG. 119 is an example of a system described above.

In one embodiment, we have the precisiated proposition comprising a Z-valuation. In one embodiment, we have the consequent part comprising a Z-valuation. The fuzzy logic inference engine determines whether the antecedent part is satisfied beyond a threshold. The system correlates the consequent part with a first truth value based on the antecedent part. The system assigns a first test score to a candidate probability distribution for X based on the Z-valuation. The candidate probability distribution belongs to a set of candidate probability distributions. The correlating step uses the first truth value and the first test score. The fuzzy logic inference engine aggregates a possibilistic restriction on the candidate probability distribution, based on the correlated consequent part. FIG. 119 is an example of a system described above.

In one embodiment, we have all parts of the system comprising a Z-valuation. In one embodiment, we have the fuzzy logic rule repository comprising one or more databases, tables, or codes (e.g. as instructions or executables). In one embodiment, the set of candidate probability distributions is generated dynamically, obtained from a database, or input from an interface, e.g. by a user. In one embodiment, the set of candidate probability distributions is based on one or more parameters associated to a model of probability distribution function, e.g. a family of class of probability distribution functions. In one embodiment, the fuzzy logic inference engine uses backward chaining inference or forward chaining inference. In one embodiment, the fuzzy logic inference engine uses a pattern matching algorithm in a forward chaining inference. In one embodiment, the fuzzy logic inference engine performs one or more join operations with variable binding. FIG. 119 is an example of a system described above.

In one embodiment, the system comprises a rule execution or a rule firing manager, an agenda or task manager, a knowledge base database or storage, a parallel rule execution module, device, or subsystem, a goal analyzing module or device, a resolving module or device, a deffuzification module or device, an aggregation module or device, a correlation module or device, and/or a join network. In one embodiment, the fuzzy logic inference engine comprises the test score evaluation module. In one embodiment, the fuzzy logic inference engine is separate or different from the test score evaluation module. FIG. 119 is an example of a system described above.

Specific Applications

Figure 94:
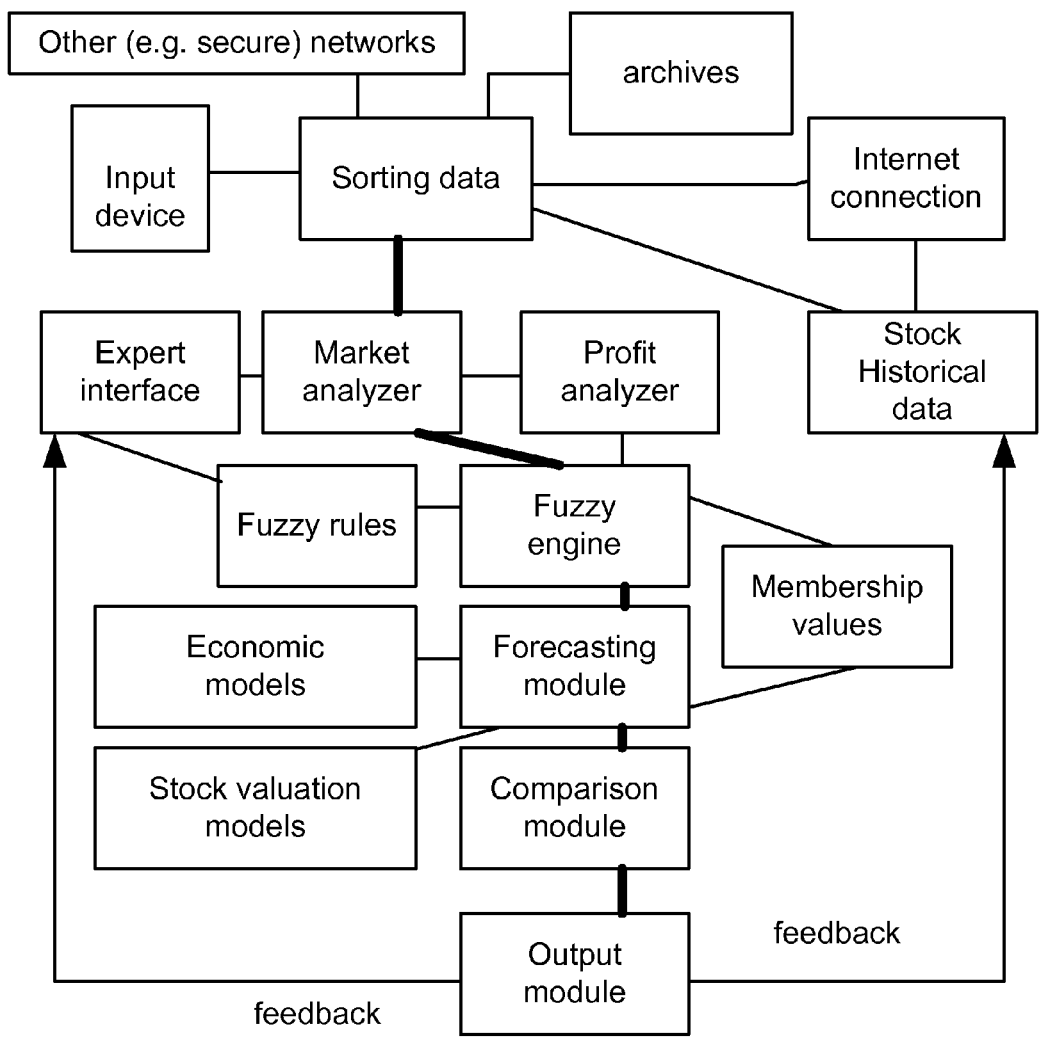
Figure 95:
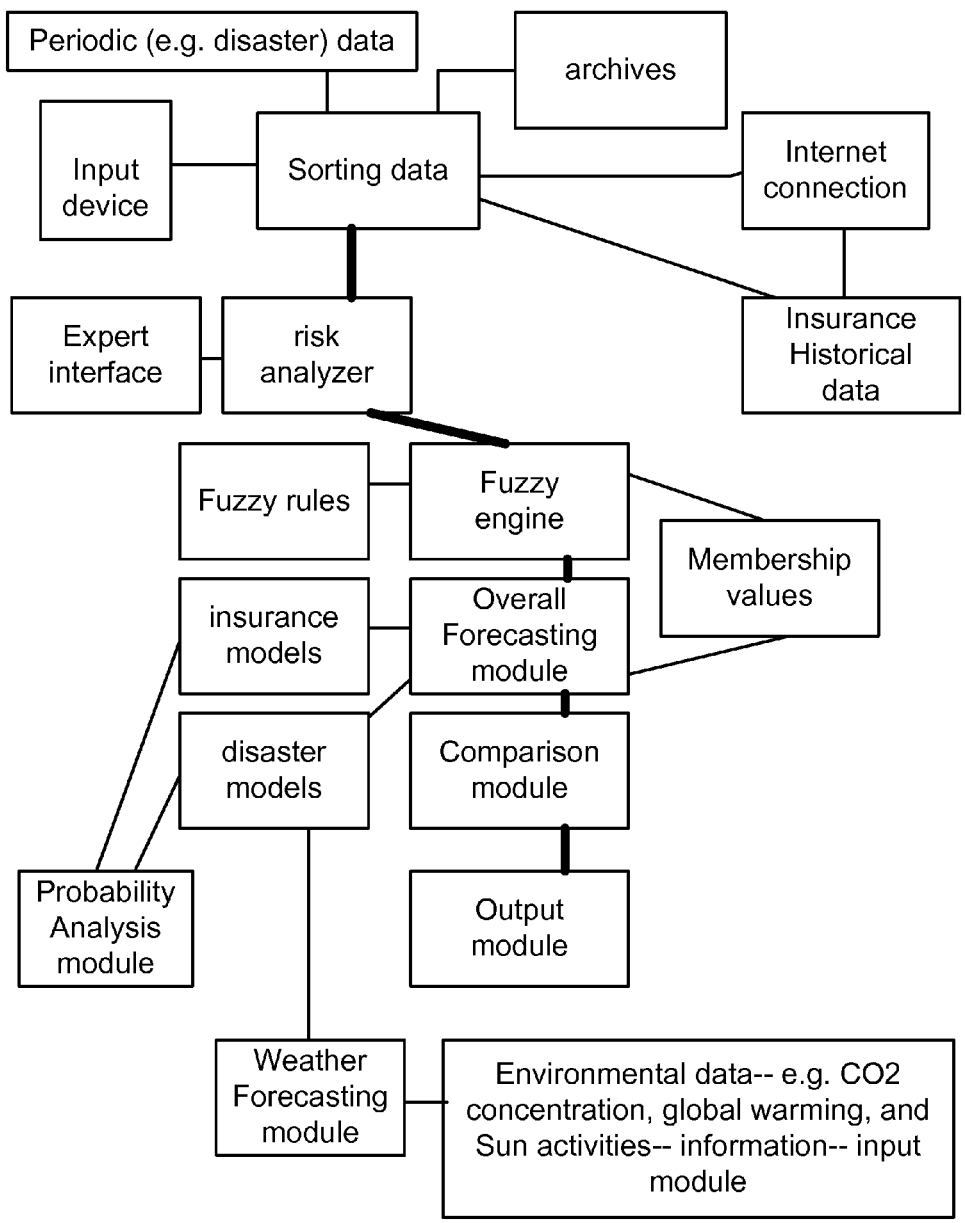

In different embodiments, the system is designed for the different applications, such as:
(a) economics and stock market or decision analysis (see FIG. 94),
(b) risk assessment and insurance (see FIG. 95),
(c) prediction or anticipation (see FIG. 96),
(d) rule-based characterization of imprecise functions and relations (see FIG. 97),
(e) biomedicine and medical diagnosis (see FIG. 99, e.g. for tele-medicine and remote diagnosis),
(f) medical equipment and measurements (see FIG. 98, e.g. for measuring blood pressure or X-ray analysis),
(g) robotics (see FIG. 100, e.g. on a factory floor for an assembly line),
(h) automobile (see FIG. 101, e.g. measuring environmental parameters, to adjust braking system in different driving conditions),
(i) control systems and autonomous systems (see FIG. 102, e.g. for driving a car autonomously, without a driver),
(j) searching for objects, search engines, and data mining (see FIG. 103, e.g. for searching to find friends in the vicinity of the user (or the store), for social networking, event planning, or marketing purposes),
(k) speaker or voice recognition (see FIG. 104, for an example of a voice recognition system),
(l) pattern or target recognition (e.g. airplane recognition or detection, or tracking in video frames, with signature or main features for an airplane) (see FIG. 105),
(m) security and biometrics (see FIG. 106),
(n) translation between languages (For example, one can use multiple systems for interpretation as shown as a part of FIG. 72, with one system per language, feeding each other, as a cascade, to translate between languages.).

In one embodiment, the system does the translation between 2 languages, however, there is not a one-to-one mapping or relationship between 2 words or phrases in the 2 languages. Thus, the system uses the context to find the proper meaning, and for the second language (to which it is translated), the system carries the real meaning as an attachment to the word. For example, for the second language, for the translated part, we have:

[Tank, CONTAINER]

where TANK is the translation in English, and CONTAINER is the real concept behind the word TANK, to remove the ambiguity in the translation (as the word TANK has at least 2 meanings in the American English language).

Surveys

In one embodiment, the system collects data through voting, survey, on-line, on-paper, using experts, using psychologists, using linguists, collecting opinions, with question on multiple choices with degree of agreement e.g. between 0 to 100, telephone surveys, computer surveys, online surveys, using social networks, using databases, government surveys, random surveys, statistical analysis, population specific surveys, target specific surveys, market surveys, using market reports, using census data, using agents on Internet, using robots, using search engines, or using neural networks as trainers, in order to get membership values, meaning of words or phrases in a language, region, dialect, profession, city, country, or population, language dynamics and evolvement, new words or usage of words, new technical words or Hollywood words or slangs, find the rate of changes in meanings, convergence or divergence of words or concepts or usages, define or extract membership curves and functions, reliability, credibility degree or value, information value, trustworthiness of the speaker or source, or any fuzzy parameter or Z-number concept, e.g. those defined or used in this disclosure.

This is a time-dependent exercise and concept, and it must be updated, as needed, or regularly, depending on the degree of dynamics of the vocabulary or dictionary or slangs or culture or industry or concept or immigration or changes in population mix, which are fuzzy values by themselves. The results of surveys and opinions of people, users, experts, section of population, and other data are stored in databases for future use, for example, for definition or values for Fuzzy membership functions or Z-number interpretations and applications.

In one embodiment, the system handles multiple Z-valuations or numbers. In one embodiment, the system does the reasoning step and/or summarization step with Z-valuations or numbers.

In one embodiment, please note that there are two types of IF-THEN statements. For the first type, at the THEN part, we set a value for a variable. Thus, if the IF section is partially satisfied, based on a membership value, then the value of the variable can be clipped or scaled down (e.g. as a ratio) based on (e.g. proportional to) the membership value. For the second type, at the THEN part, we have an action, e.g. to turn off the light switch for an equipment, which is a binary decision. In this case, if the IF section is partially satisfied, based on a membership value, then we have a threshold(s) (or ranges of values), for which for the values above or below the threshold, to activate or fire the THEN part, e.g. turn off the light switch for an equipment. The threshold can be expressed based on an absolute value, a relative value, a range, a Z-number, or a fuzzy value. Examples of threshold are 0.1, 0.5, 10 percent, 10 percent of average, 10 percent of maximum value, open/close range of real numbers (0, 0.5], 10 Kg (i.e. kilograms, for mass measurement), "usually 10 years", or "about 10 years".

Please note that since our method of computation is the closest to the human thinking and speech, it would be the most efficient way of instructing the machines to do a function based on the user's voice command (after parsing the speech, for speech recognition, and conversion to text, commands, templates, or computer codes, based on pre-defined and dynamic/adjustable grammar or rules).

Control systems, e.g. with multiple (If . . . Then . . . ) rules, can be used for efficient washing machines (consuming less water and detergent, based on level of dirt and type of clothing), braking system for train or cars (for optimum braking), air-conditioning system (better control of the temperature in the room, with less waste in energy), cameras or copy machines (for better image color adjustment or contrast adjustment or ink concentration), car fuel injection systems (for better air and fuel supply, for different engine environments and performances), parallel parking or autonomous driving cars (for optimum performances), robots in a factory assembly floor (with variations on objects received, on the manufacturing steps, for optimum correctional procedures), self-diagnosis and self-repair robots (for best possible diagnosis, to fix itself), system-of-systems (e.g. a colony of swimming robots acting together for a common task, e.g. finding an object in or under water, for proper target recognition or classification and proper feedback to each other, to guide other robots to proper areas of the ocean floor, to avoid duplicative work and effort by other robots in the colony), or any operation of complex machinery in a complex environment for optimum results. (The rules are discussed elsewhere in this disclosure.)

Figure 60:
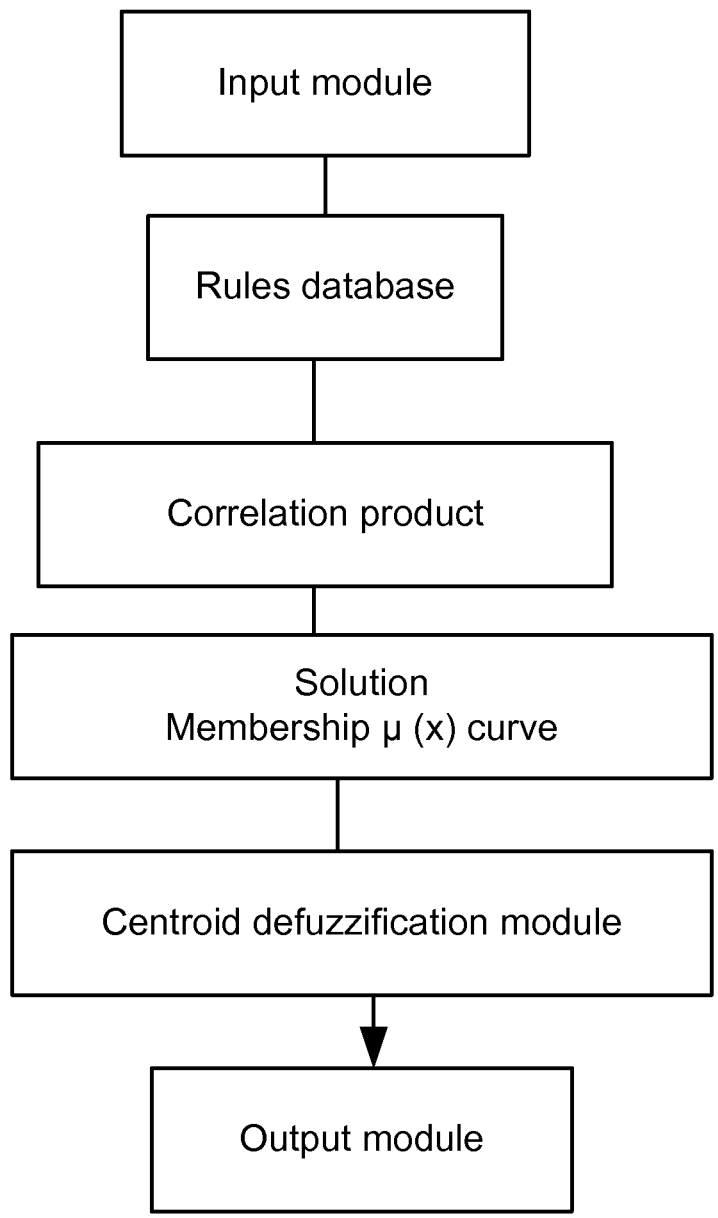
FIG. 60 shows a fuzzy system, with multiple (If . . . Then . . . ) rules.

FIG. 60 shows a fuzzy system, with multiple (If ... Then ... ) rules. There are 2 different main approaches for analysis and processing of the resulting membership function curves: (1) One method is to trim resulting membership function curve at the specific value of the membership function, as the upper allowed value. (2) The second method is to scale down the original membership function curve by a factor equal to the specific value of the membership function (which is a real number between 0 and 1), as the upper allowed value. Either way, the maximum allowed membership function is generally reduced from 1, in the final membership function curve.

In one embodiment, one uses composite maximum for the defuzzification step. In another embodiment, one uses composite moments (for the area under the curve, or the center of mass) for the defuzzification step.

Figure 57:
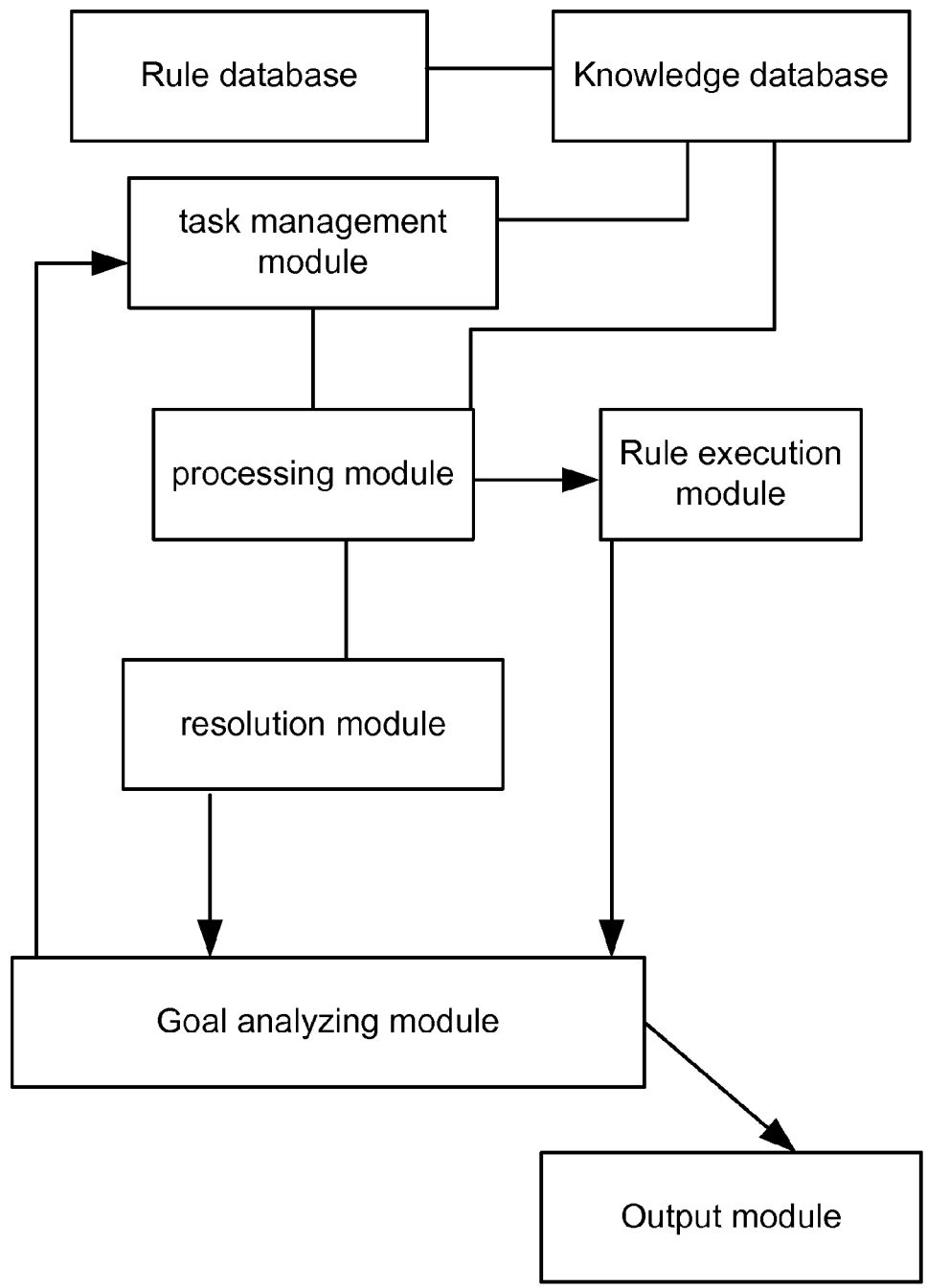
FIG. 57 shows a backward chaining inference engine.
Figure 58:
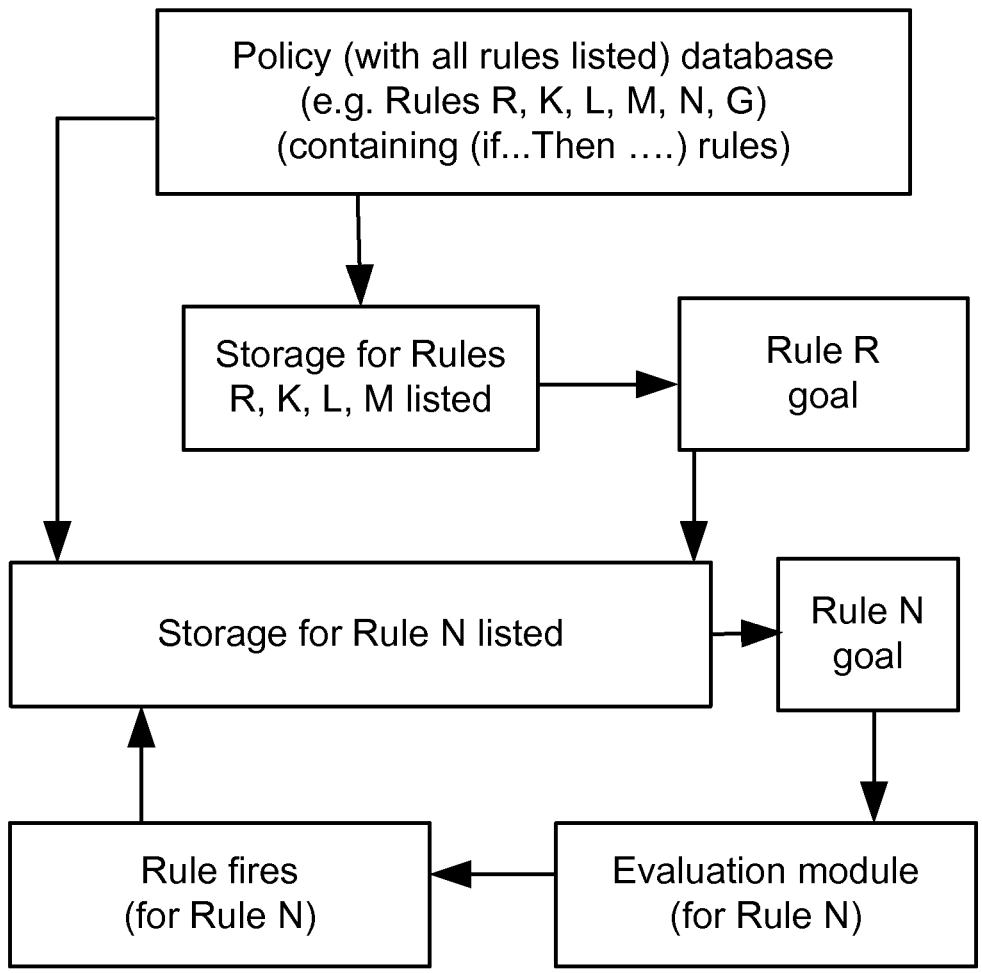
FIG. 58 shows a procedure on a system for finding the value of a goal, to fire (or trigger or execute) a rule (based on that value) (e.g. for Rule N, from a policy containing Rules R, K, L, M, N, and G).

For backward chaining inference engine, one can use a system as shown in FIG. 57, with a processor (or controlling) module, knowledge base, rule storage, and a task manager. FIG. 58 shows a procedure on a system for finding the value of a goal, to fire (or trigger or execute) a rule (based on that value) (e.g. for Rule N, from a policy containing Rules R, K, L, M, N, and G).

Figure 59:
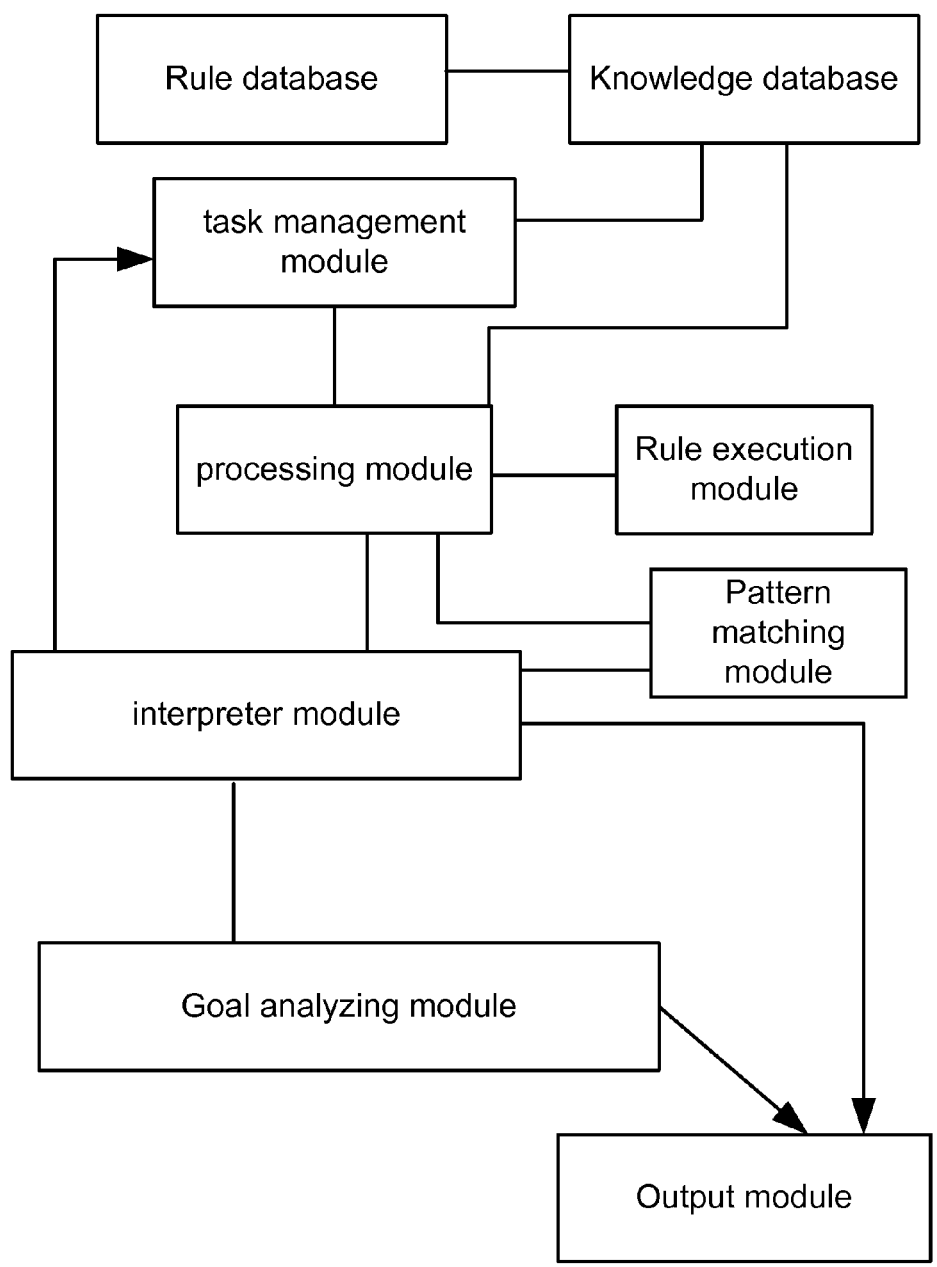
FIG. 59 shows a forward chaining inference engine (system), with a pattern matching engine that matches the current data state against the predicate of each rule, to find the ones that should be executed (or fired).

FIG. 59 shows a forward chaining inference engine (system), with a pattern matching engine that matches the current data state against the predicate of each rule, to find the ones that should be executed (or fired). Pattern matching module is connected to both processing (or controlling) module and interpreter module, to find the rules and also to change the association threads that find each candidate node for next loop (cycle).

Figure 50:
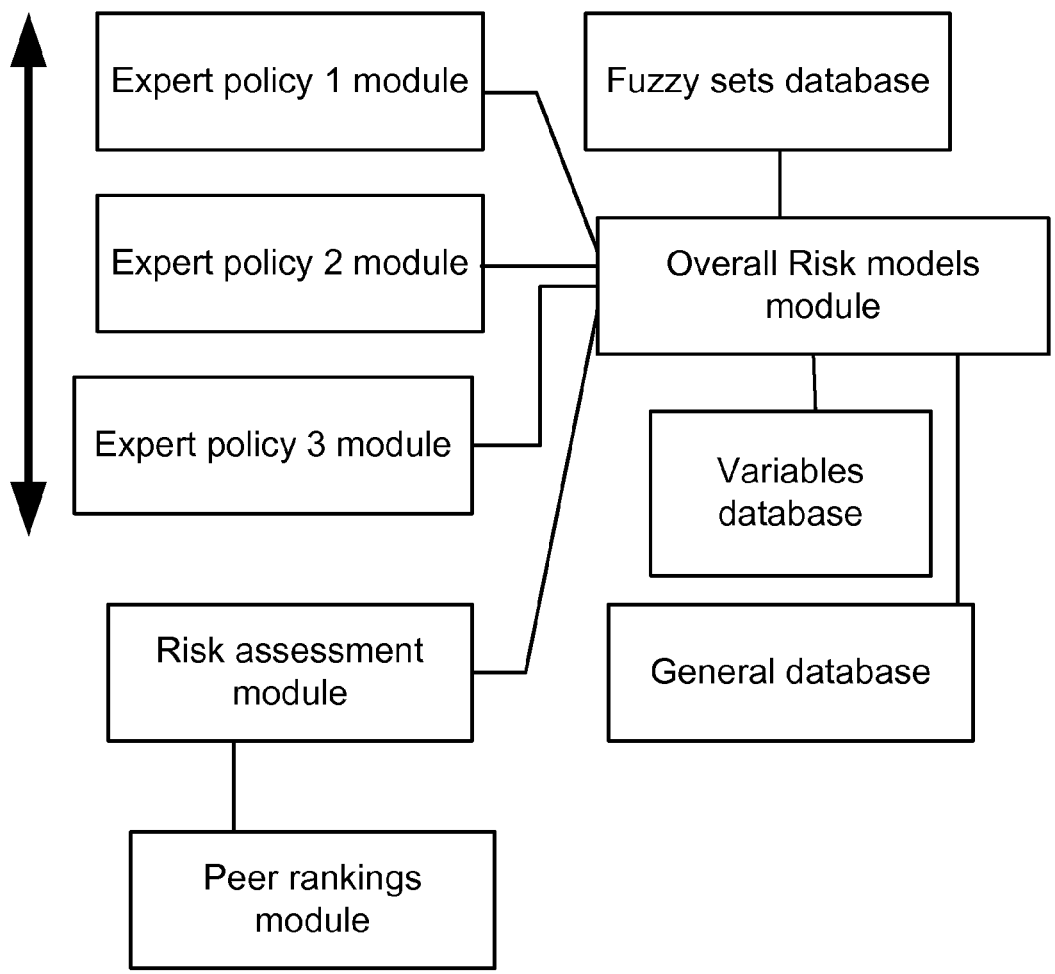
FIG. 50 shows a system for combining multiple fuzzy models.

As mentioned above, fuzzy reasoning systems can gather knowledge from multiple sources (experts), e.g. conflicting, collaborating, and cooperating experts. In a conventional system, one can use a weighted (biased) average technique, to assign weights on different advisors or sources of information. In the fuzzy system, one can use an adaptive peer ranking parameter (with peer ranking amplification), while firing rules in the fuzzy investment model, and with combination through weighted output averaging, or with combination through fuzzy set aggregation (i.e. combined intelligence). To combine multiple fuzzy models, one uses a system such as the one shown in FIG. 50.

Figure 51:
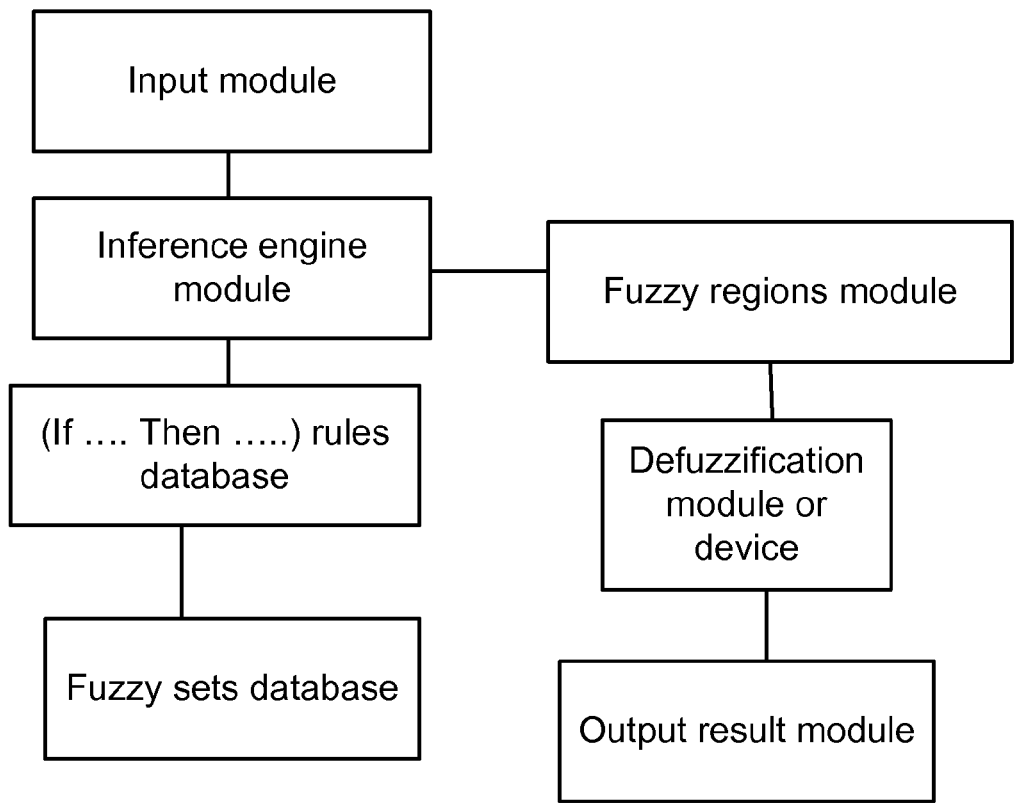
FIG. 51 shows a feed-forward fuzzy system.
Figure 52:
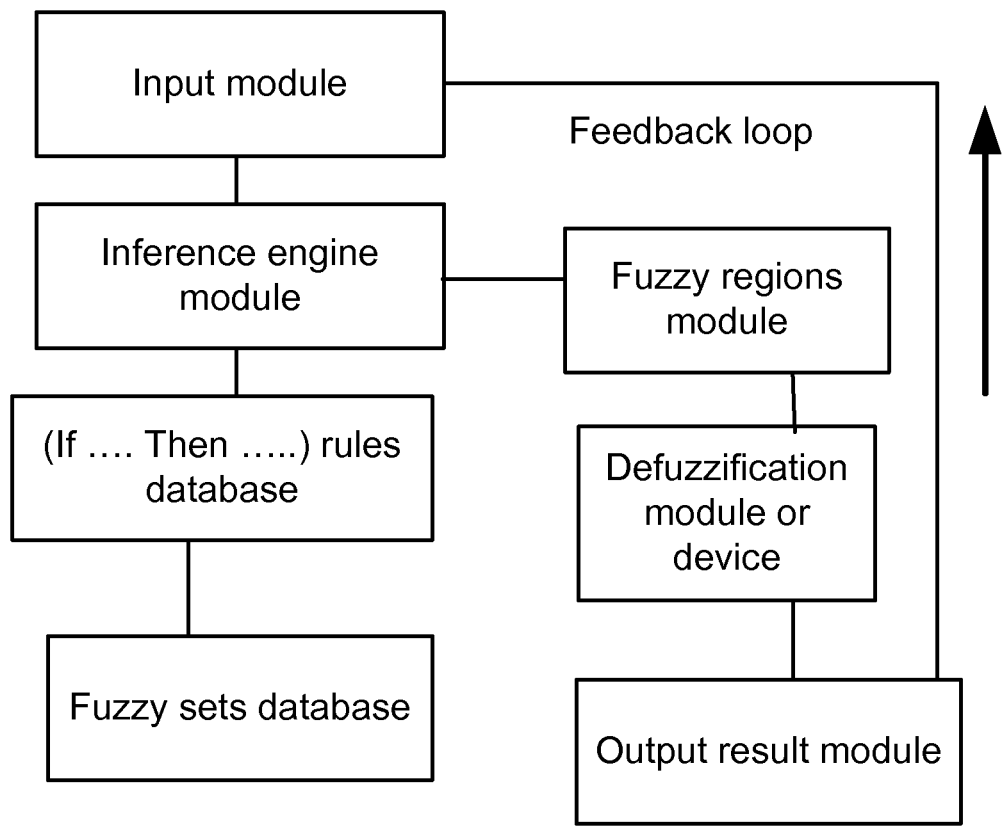
FIG. 52 shows a fuzzy feedback system, performing at different periods.
Figure 53:
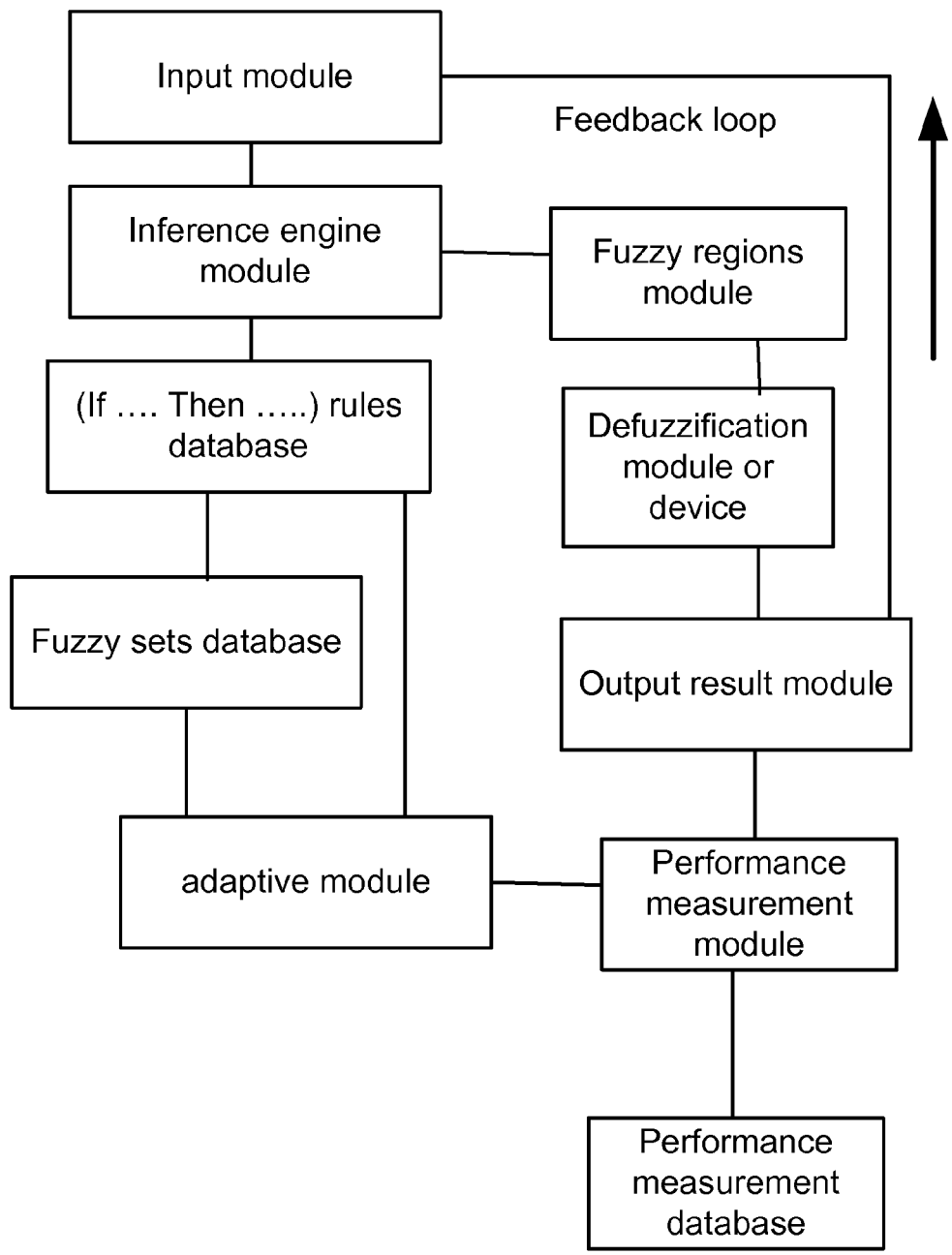
FIG. 53 shows an adaptive fuzzy system.

FIG. 51 shows a feed-forward fuzzy system. FIG. 52 shows a fuzzy feedback system, performing at different periods. FIG. 53 shows an adaptive fuzzy system, in which an objective function is measured against, to change the parameters of the model. A training algorithm such as "If ... Then ... " rules can be used, or fuzzy system rules are generated from the data. (The new rules are generated or modified.)

Figure 54:
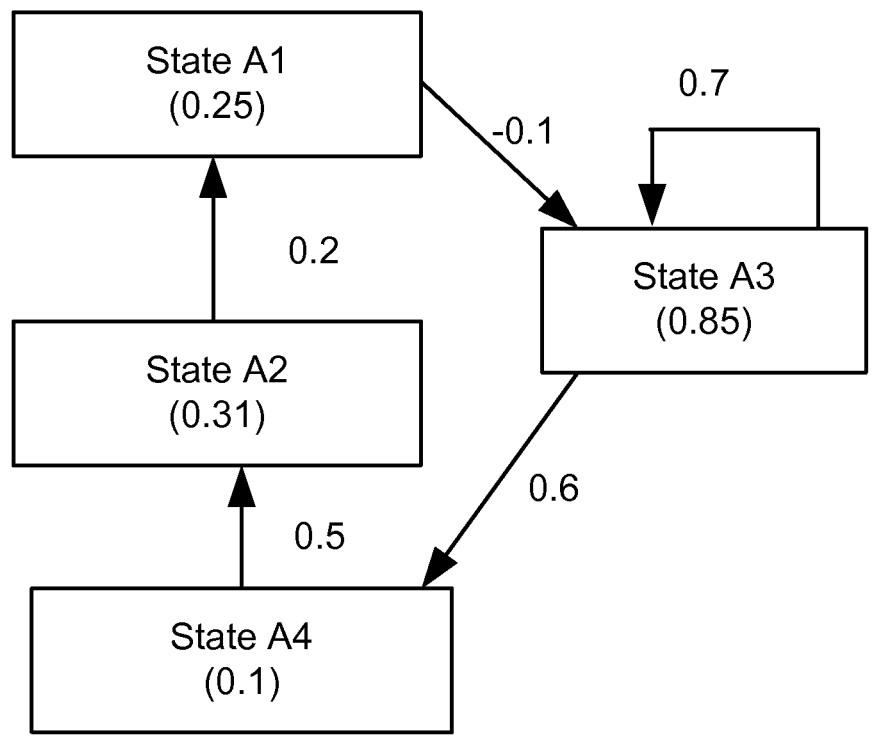
FIG. 54 shows a fuzzy cognitive map.
Figure 55:
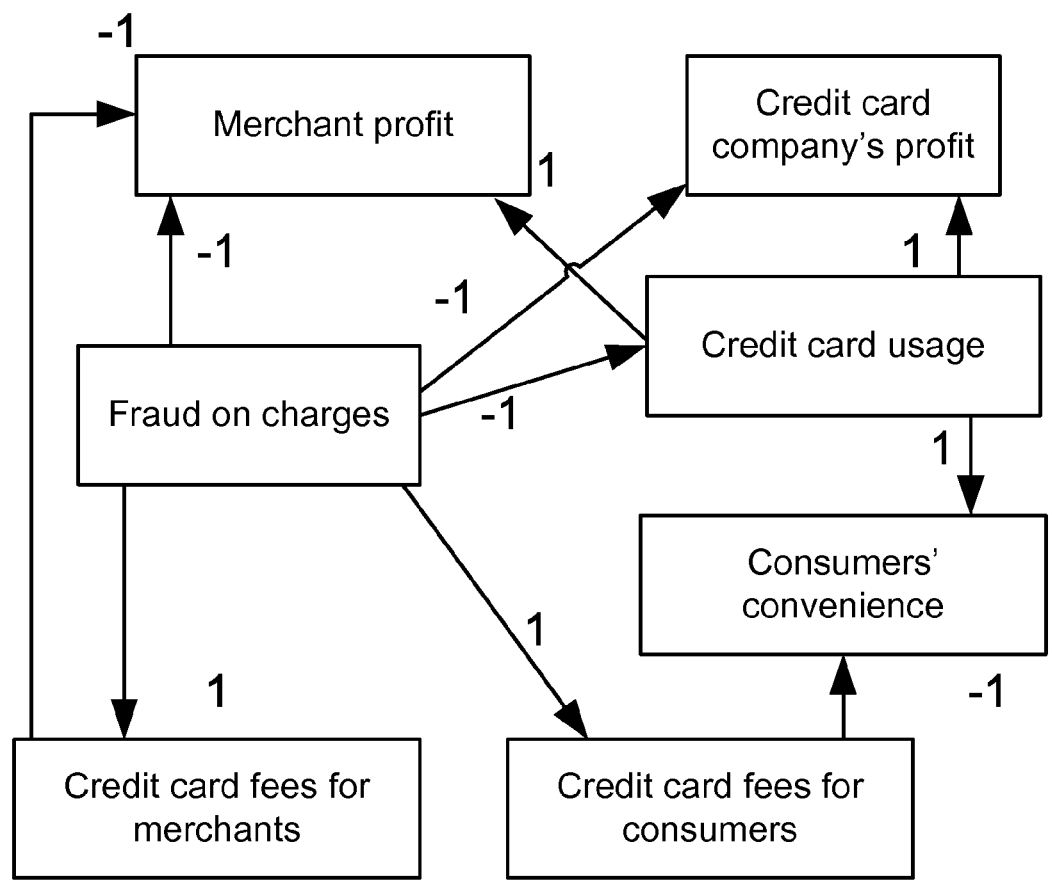
FIG. 55 is an example of the fuzzy cognitive map for the credit card fraud relationships.

A fuzzy cognitive map (FCM) for causal flow can be used for adaptive and feedback systems, to model: if $A_i$ then $A_j$ to $B_{ij}$, where the nodes are concepts (e.g. $A_i$ and $A_j$) and $B_{ij}$ represents the degree of strength of the connection between $A_i$ and $A_j$. To activate each concept, there is an activation threshold required (as the minimum strength required). This diagram can represent complex relationships (e.g. one concept increases or decreases the likelihood of another concept). A fuzzy cognitive map is shown in FIG. 54, with $B_{ij}$ displayed near the arrows and activation thresholds displayed inside the rectangles (representing each state). A special function is used to combine fuzzy rule weights. FIG. 55 is an example of the fuzzy cognitive map for the credit card fraud relationships, indicating positive or negative effects of one parameter on another, using 1 or −1 values, respectively (with the direction of the arrow).

For an M-state fuzzy cognitive map, we generally need an M×M matrix for the representation of all the relationships. So, if we get N opinions from N different experts, as N fuzzy cognitive maps, we can combine all N fuzzy cognitive maps using Σ (summation) operation on all corresponding matrix entries (L). Then, if each expert has a different level of expertise or reliability (as peer or user ranking, or an assigned weight, $w_j$, for j=1, ..., N), then we will have:

$$L=\Sigma_j(w_j L_j)$$

Figure 56:
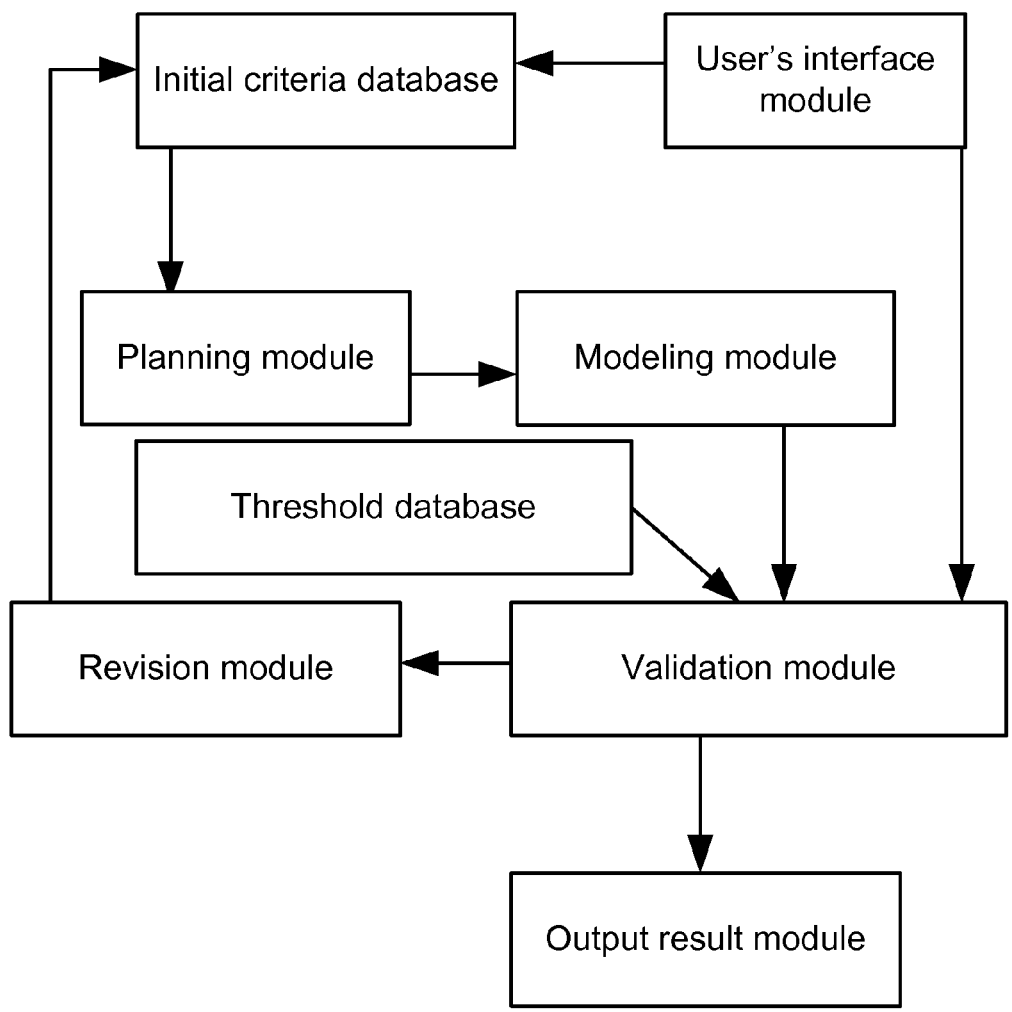
FIG. 56 shows how to build a fuzzy model, going through iterations, to validate a model, based on some thresholds or conditions.

To build a fuzzy model, one can go through iterations, as shown in FIG. 56, to validate a model, based on some thresholds or conditions.

Figure 49:
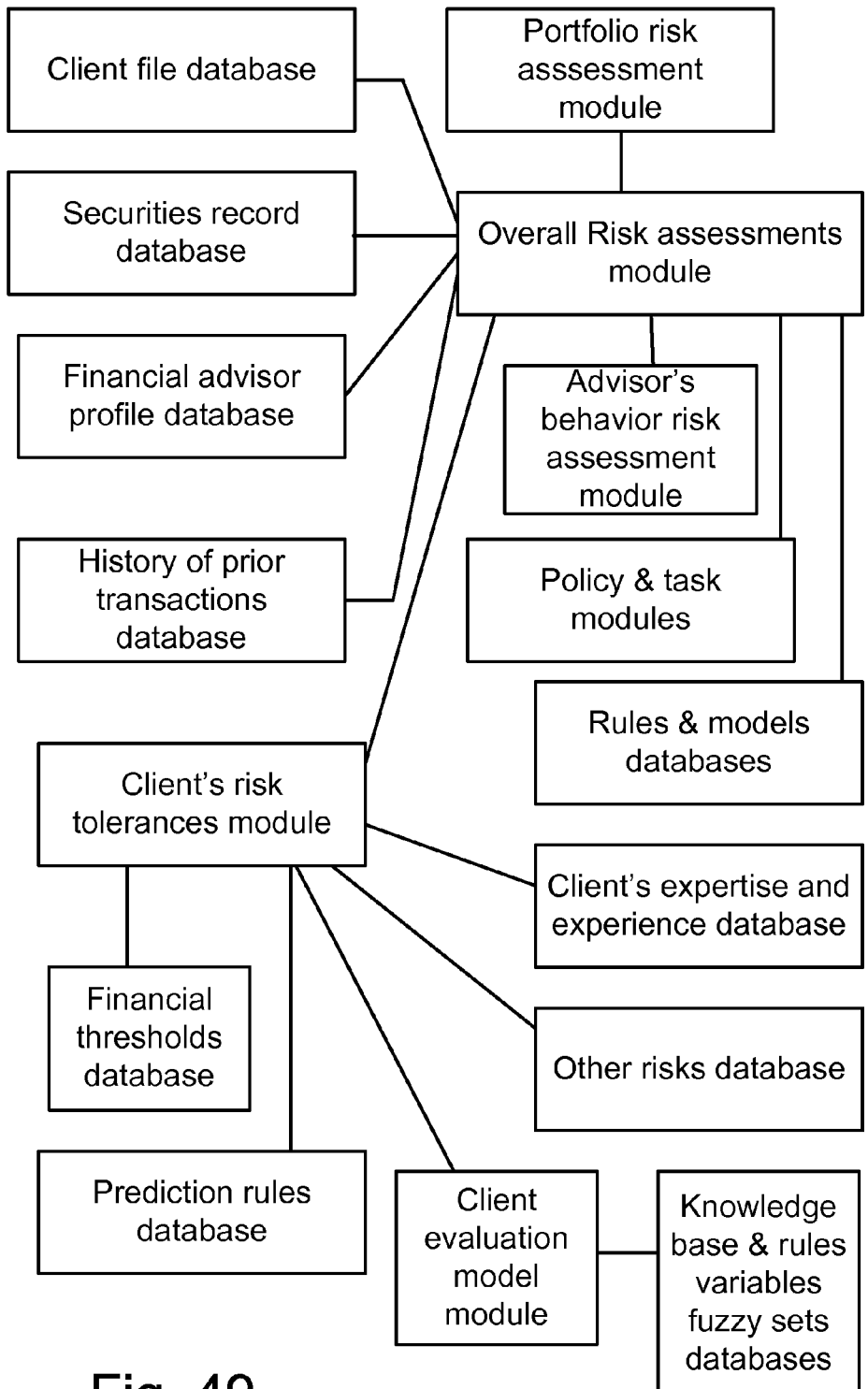
FIG. 49 shows a financial management system, relating policy, rules, fuzzy sets, and hedges (e.g. high risk, medium risk, or low risk).

For investment portfolio management for a client, one can have a financial management system as shown in FIG. 49, relating policy, rules, fuzzy sets, and hedges (e.g. high risk, medium risk, or low risk).

Figure 47:
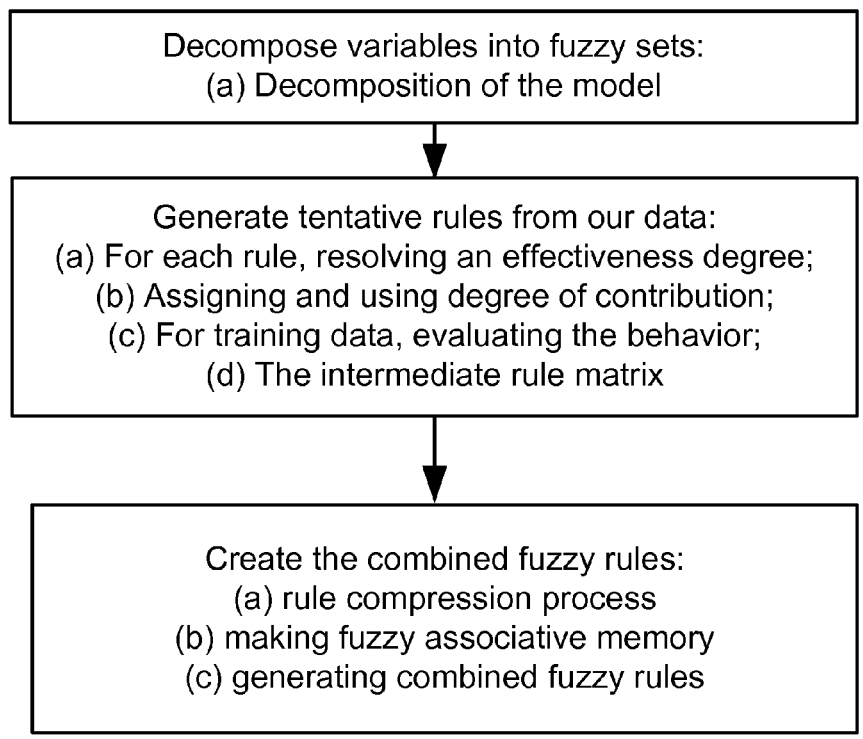
FIG. 47 shows a method employing fuzzy rules.
Figure 48:
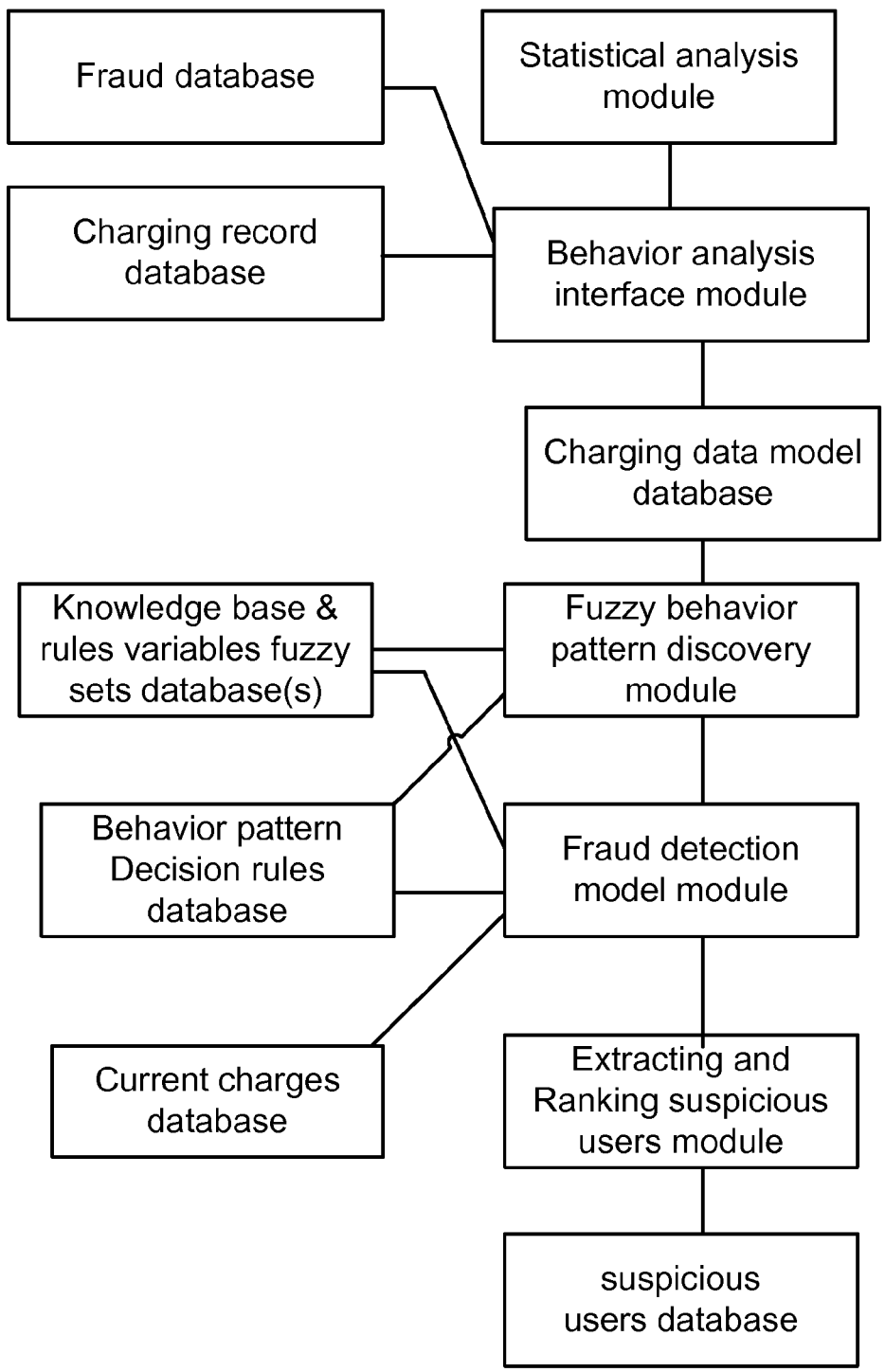
FIG. 48 shows a system for credit card fraud detection.

For knowledge mining and rule discovery, one can use Wang-Mendel rule discovery method, to partition input-output spaces into fuzzy regions, then generate fuzzy rules from training data, apply discriminant filter to rules, and create a combined fuzzy associative memory (FAM), which is a matrix (based on the inputs). A method is shown in FIG. 47. This can be used in health care claim (e.g. Medicare) and credit card processing fraud detections, as a knowledge mining technique. A system is shown in FIG. 48, for credit card fraud detection.

With the teachings mentioned above, in one embodiment, one can ask about "the top ten biggest companies" (which may change every year) or "top ten tallest mountains in the world" (which does not change every year), and get an answer by the search engine. See, for example, FIG. 109, for such a system.

The search engine can accumulate data from FACEBOOK or YOUTUBE or social sites or government sites or others on idle times, and store them for future searches in the databases, with classes and sub-classes, for faster retrieval, when needed. That also helps to find or distinguish people with the same exact name, build their profiles, and focus advertisement or marketing products, based on their preferences or past history or behaviors.

Please note that for the teachings above, a function y=f(x) as a graph, but without a known formula, can always be approximated by fuzzy graph, as piecewise approximation on the graph, which makes that relationship fuzzy. Then, one can solve based on the fuzzy graph, instead.

For systems that need load balancing, such as server farms for a search engine company or power generators in a electric grid for a country (which have different down times, delays, redundancies, supplies, demands, growths, expenses, new sources, or the like), the system can work in optimum conditions, or adjust fast, using the fuzzy rules and constraints for the system (as explained elsewhere in this disclosure), e.g. for emergency conditions and procedures, to reduce (for example) the blackout time for the consumers in the power grid in various parts of the country, or e.g. speed up the search engine in all parts of the world (by reducing the demand pressure on some areas, and increasing utilization percentages on idle or under-utilized areas of the server farms, to spread out the computing power in an optimized way), using the fuzzy parameters (such as the utilization factor which has a membership value between 0 and 1), as explained elsewhere in this disclosure.

Figure 61:
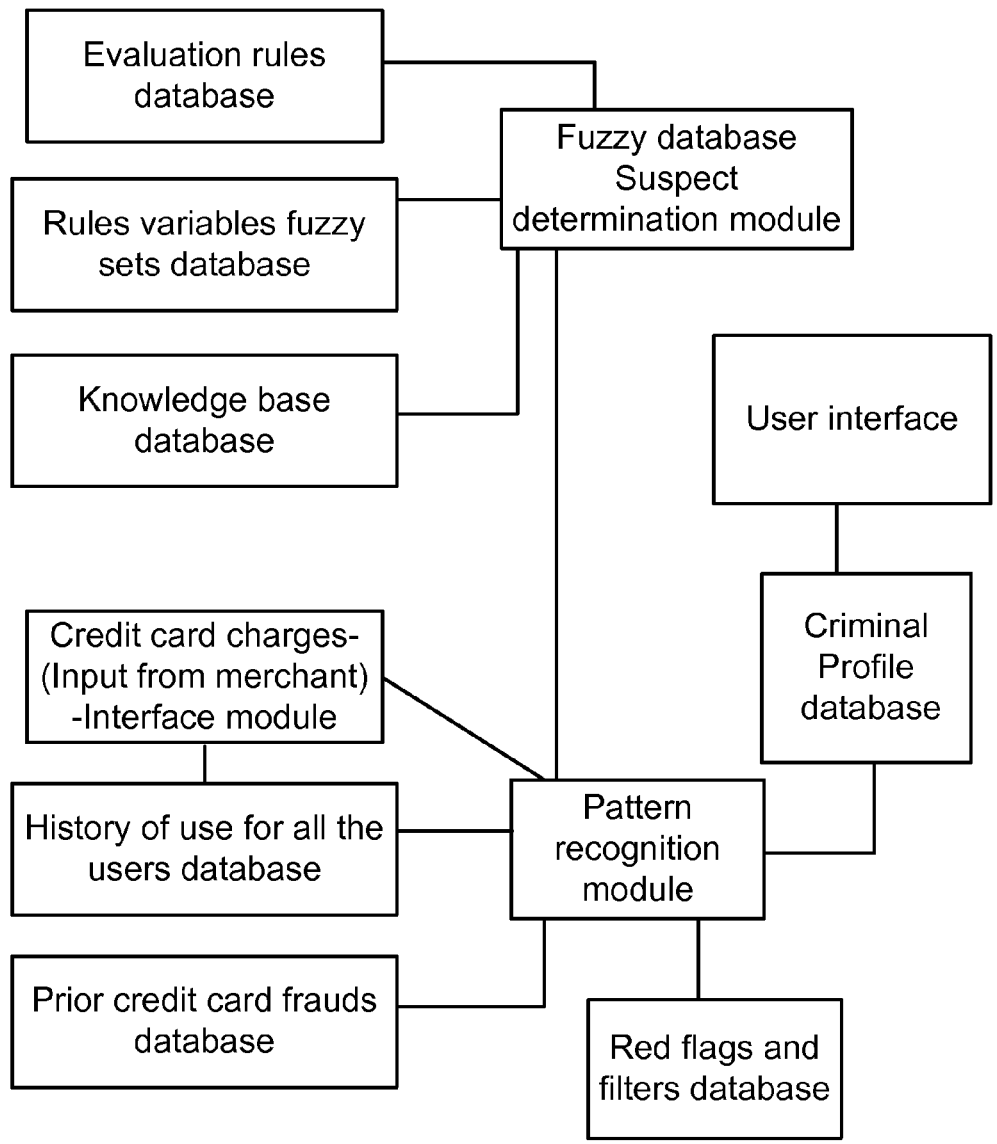
FIG. 61 shows a system for credit card fraud detection, using a fuzzy SQL suspect determination module, in which fuzzy predicates are used in relational database queries.

For databases, the database entries can generally be ordered and compared, with respect to one or more fuzzy rules, to index and sort or extract (or query) some useful information from the database(s), resulting in a listing or an ordered table. For example, FIG. 61 shows a system for credit card fraud detection, using a fuzzy SQL suspect determination module, in which fuzzy predicates are used in relational database queries. The fuzzy queries in relational database environment result in better fraud detection (because they fit better in real life situations). In one embodiment, the fuzzy database management process involves using fuzzy indexes, scanning database row, determining column membership grades, storing row locations and membership grades, and sorting the stored rows in descending membership order.

Figure 93:
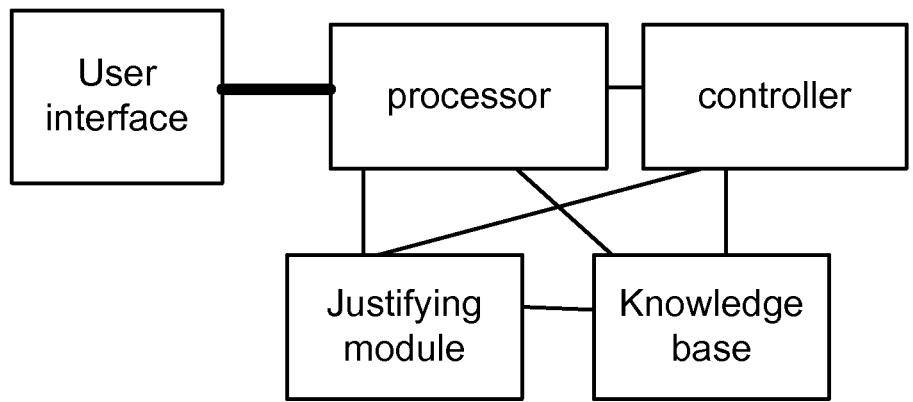

For one embodiment, FIG. 93 shows an expert system, which can be integrated or combined with any of the systems taught in this disclosure.

Figure 62:
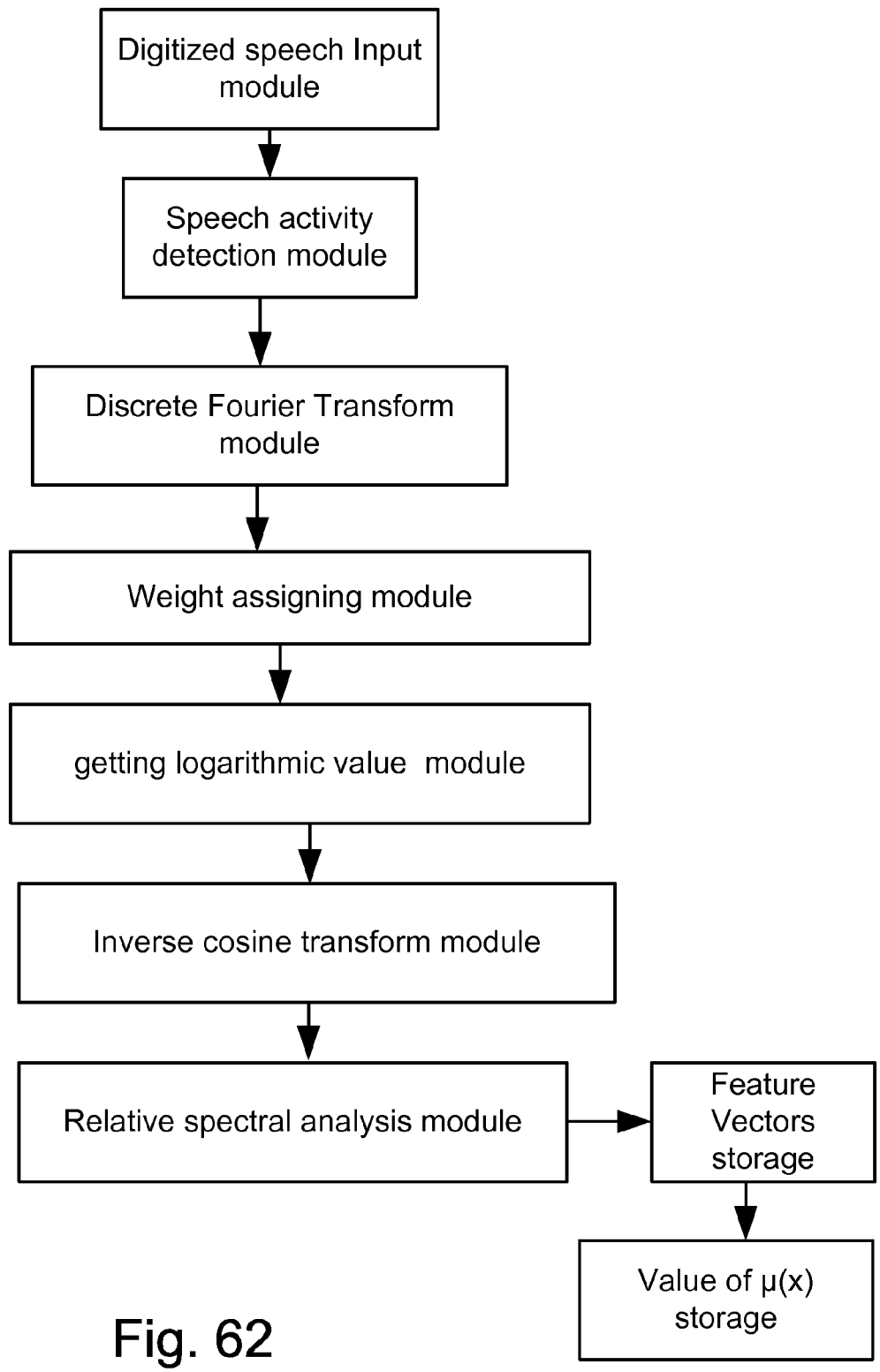
FIG. 62 shows a method of conversion of the digitized speech into feature vectors.
Figure 63:
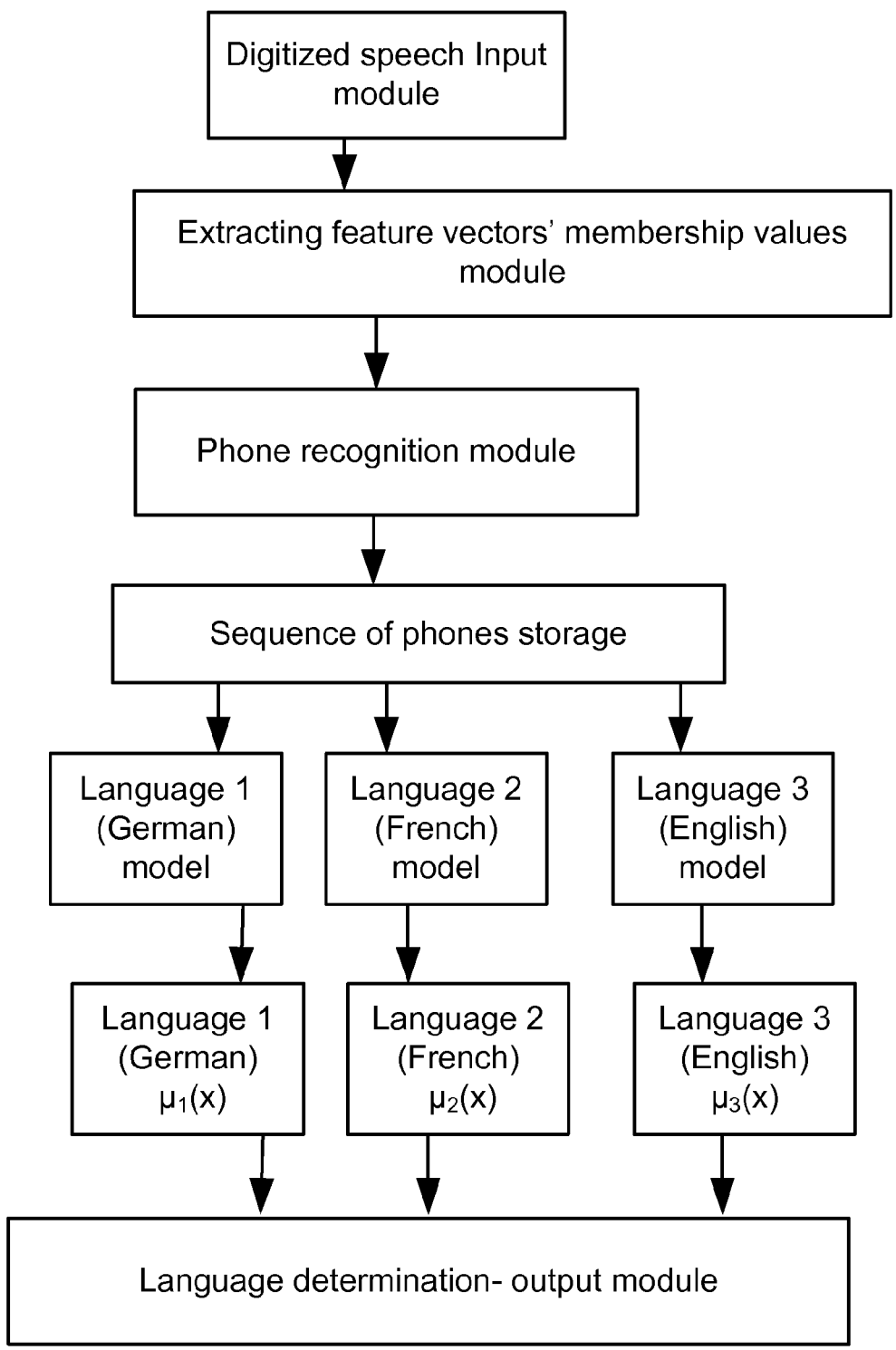
FIG. 63 shows a system for language recognition or determination, with various membership values for each language (e.g. English, French, and German).

The teachings above can be used for speech recognition, as well. For example, FIG. 62 shows a method of conversion of the digitized speech into feature vectors (for example, suggested by S. B. Davis and P. Mermelstein). In our case, the feature vectors are not the exact matches, and the matching (or contribution) is based on (expressed as) the value of membership function for the corresponding feature vector. FIG. 63 shows a system for language recognition or determination, with various membership values for each language (e.g. English, French, and German). The feature vectors can also be used for speaker recognition (e.g. male-female identity, or a specific person's identity, from pre-recorded samples in a database from various people). This can be used for the verification of the identity of a specific user, or to find the possible owner of a specific speech among many users.

Feature vectors can be used for speech recognition, as well, which can be done after the language is determined. In this case, one tries to match the phones or words with a large database of dictionary of all possible words or phones or sequence of phones in a specific language, pre-recorded and categorized. Again, the membership function values are used to find the possible words, via the possible sequence of phones which make up those words, phrases, or sentences. In one embodiment, the sequence of phones is compared to a chain of pointers connecting database phones, in a predetermined database, for all possible combinations of phones, resulting in all possible words, phrases, or sentences, especially the most common ones in a language, to give a possibility of each candidate word or phrase, to rank and select one or more of them for further processing, depending on some threshold(s), which can be a fuzzy parameter itself. In one embodiment, the sequences of phones are mapped to the words in a relational database, which can be updated by the user frequently, or gets trained to recognize the words (with an accompanied neural network system) for a specific user(s).

The similar teachings can be applied to the OCR (optical character recognition) of typed text or handwriting or signature. The text can be broken down in units of letters, pieces of words or letters, or feature vectors (as a basis for a fuzzy set, corresponding to an N-dimensional feature space), and gets compared with those in a database with variations on style or in handwriting, to find the possible targets, with various membership values.

This can be applied to any pattern recognition system or method, such as image mining or recognition on a large number of images (for example, for satellite or radar or laser or stereo or 3D (3-dimensional) imaging), e.g. using a knowledge-based database, with metadata attached or annotated to each image, identifying the source, parameters, or details of the image, e.g. as keywords or indices (which can also be used for database query). This can be used as a user-trainable search tool, employing a neural network module, with scoring functions using examples and counterexamples histograms. For example, in a bin (or partition) where there are more counterexamples than the number of examples, the resulting score is negative. These can be used for the recognition of (for example) trucks, cars, people, structures, and buildings in the images, with membership values associated with each target recognition. Each stored object or class of objects in the database (of all possible objects) has a signature (or one or more specific features, in an N-dimensional feature space, such as the length of the object, the angle between two lines, or the ratio of the length-to-width of the object), which can be matched to (or compared with) a target, with a corresponding membership value for each feature. This can be used for biometrics and security applications, as well, such as face recognition, iris recognition, hand recognition, or fingerprint recognition (e.g. with feature vectors defined from the curved pieces on fingerprints).

There are 2 major types of fuzzy inference systems: Mamdani-type (using the center of mass of the aggregation result) and Sugeno-type, both of which can be used in the systems of the current invention.

In one embodiment, the fuzzy system is used for trip planning or scheduling and its optimization in a trip or daily work. For example, the time for traffic delays and time for leaving the office, plus the threshold time for catching an air plane, are all expressed as fuzzy parameters, as discussed and analyzed elsewhere in this disclosure.

In one embodiment, when we have many systems, one feeding another one, we may want to keep the result of one in fuzzy form (as fuzzy region(s)), e.g. without applying the centroid defuzzification step. This way, the information does not get lost, when it feeds into another system, and it is also convertible to the human's natural language, based on the combination of predetermined templates and their corresponding hedges, stored beforehand in some database (for comparison and conclusion or conversion).

Context Dependant

Please note that the concept of "tall" (as an example) is both speaker-dependent and audience-dependent. For example, the same person giving lectures in Holland (having very tall population, in general) and Indonesia means differently, when talking with the audience of different population (having different size and height) in different countries, regarding various concepts, such as "being tall". This is also time-dependent. For example, if a person is giving lecture in the year 1700 AD (or talk about people living a few hundred years ago), in comparison to today (when people are generally taller), the concept of "being tall" is different for those situations. For some embodiments, the membership function and values are time-dependant. In addition, for some embodiments, the element of time is a part of the context analysis.

Figure 70:
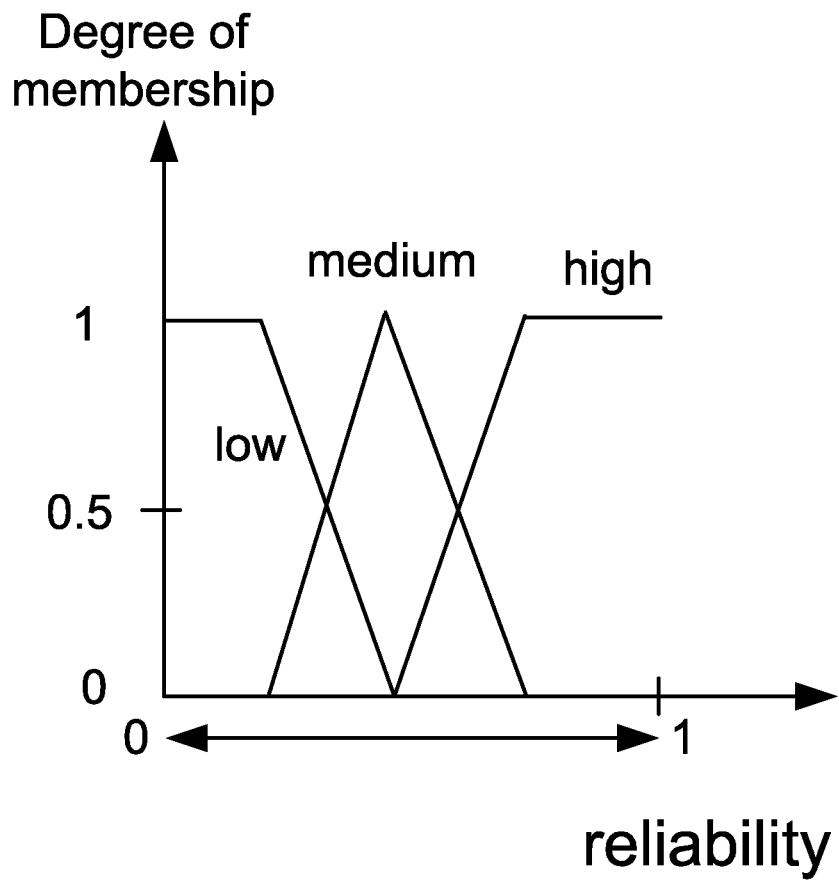
FIG. 70 shows the range of reliability factor or parameter, with 3 designations of Low, Medium, and High.

In one embodiment, the sum of the values of membership functions (corresponding to any point on the horizontal axis) is exactly 1. See FIG. 70 for an example, for the range of reliability factor or parameter, with 3 designations of Low, Medium, and High.

Please note that for all of our teachings above, different truth-value systems (e.g. those suggested by or known as Lukasiewicz, Godel, Product, and Zadeh), for definitions of e.g. T-norm operation, T-co-norm, and negation, can be used. For example, the symbol ^ means AND, "minimum", or PRODUCT, for various truth-value systems. We can be consistent on one definition throughout the calculations and analysis (from the beginning to the end), or alternatively, mix the definitions (i.e. use various definitions for the same operation, from various truth-value systems) for various steps of the analysis. Either way, it is covered in our teachings here, for this patent application.

For all the systems taught here, one can use a microprocessor, processor, computer, computing device, controller, CPU, central processing module, processing unit, or controlling unit, to calculate, analyze, convert, and process the data, and it can store the information on a disk, hard drive, memory unit, storage unit, ROM, RAM, optical disc, magnetic unit, memory module, database, flash drive, removable drive, server, PC, RAID, tape, or the like. The information can be processed serially or in parallel. The communication between different units, devices, or modules are done by wire, cable, fiber optics, wirelessly, WiFi, Bluetooth, through network, Internet, copper interconnect, antenna, satellite dish, or the like.

Any variations of the above teaching are also intended to be covered by this patent application.

The invention claimed is:

1. A method for image recognition, said method comprising:
    an input device receiving a first image of an object;
    an image analytics module receiving said first image of said object from said input device;
    said image analytics module examining said first image of said object;
    said image analytics module recognizing said object within said first image;
    a processing module searching for one or more characteristic elements of said object among parameters associated with images deposited in one or more storages;
    said processing module finding said one or more characteristic elements of said object within a second image among said parameters associated with said images deposited in said one or more storages;
    said processing module determining a Z-valuation as a value of an attribute for said finding said one or more characteristic elements of said object within said second image;
    a computer module determining a relevancy factor for said second image based on said Z-valuation, said first image, and said second image;
    a processor determining a source associated with said second image;
    said processor communicating with a ranking module, in regard to said relevancy factor for said second image and said second image.

2. The method for image recognition as recited in claim 1, said method comprises:
    displaying a targeted advertisement to a user on a computing, mobile, or communication device.

3. The method for image recognition as recited in claim 1, wherein said first image is a still image.

4. The method for image recognition as recited in claim 1, wherein said second image is a still image.

5. The method for image recognition as recited in claim 1, wherein said first image is a video frame image.

6. The method for image recognition as recited in claim 1, wherein said second image is a video frame image.

7. The method for image recognition as recited in claim 1, said method comprises:
    filtering content for said images deposited in said storage.

8. The method for image recognition as recited in claim 1, said method comprises:
    receiving a feedback from a user.

9. The method for image recognition as recited in claim 1, said method comprises:
    providing a suggestion to a user.

10. The method for image recognition as recited in claim 1, said method comprises:
    providing a coupon or discount to a user.

11. The method for image recognition as recited in claim 1, said method comprises:
    determining a behavior or preference prediction, pattern, or history about a user.

12. The method for image recognition as recited in claim 1, said method comprises:
    providing a feedback from a user's friends.

13. The method for image recognition as recited in claim 1, said method comprises:
    communicating with a text search engine or image search engine.

14. The method for image recognition as recited in claim 1, said method comprises:
    marketing or suggesting a participating or partner web page.

15. The method for image recognition as recited in claim 1, said method comprises:
    measuring or monitoring traffic, pattern of visitors, visitor count, and information regarding web sites.

16. The method for image recognition as recited in claim 1, said method comprises:
    collecting personal information, preferences, statistics, and habits.

17. A method for image recognition, said method comprising:
    an input device receiving a first image of an object;
    an image analytics module receiving said first image of said object from said input device;
    said image analytics module examining said first image of said object;
    said image analytics module recognizing said object within said first image;
    a processing module searching for one or more characteristic elements of an item similar or related to said object among parameters associated with images deposited in one or more storages;
    said processing module finding said one or more characteristic elements of said item similar or related to said object within a second image among said parameters associated with said images deposited in said one or more storages;
    said processing module determining a Z-valuation as a value of an attribute for said finding said one or more characteristic elements of said item similar or related to said object within said second image;
    a computer module determining a relevancy factor for said second image based on said Z-valuation, said first image, and said second image;
    a processor determining a source associated with said second image;
    said processor communicating with a ranking module, in regard to said relevancy factor for said second image and said second image.

18. The method for image recognition as recited in claim 17, said method comprises:
    displaying a targeted advertisement to a user on a computing, mobile, or communication device.

19. A method for image recognition, said method comprising:

an input device receiving a first image of an object;

an image analytics module receiving said first image of said object from said input device;

said image analytics module examining said first image of said object;

said image analytics module recognizing said object within said first image;

a processing module searching for one or more characteristic elements of said object among parameters associated with images deposited in one or more storages;

said processing module finding said one or more characteristic elements of said object within a second image among said parameters associated with said images deposited in said one or more storages;

said processing module determining a reliability valuation as a subset of a Z-valuation as a value of an attribute for said finding said one or more characteristic elements of said object within said second image;

a computer module determining a relevancy factor for said second image based on said reliability valuation as a subset of said Z-valuation, said first image, and said second image;

a processor determining a source associated with said second image;

said processor communicating with a ranking module, in regard to said relevancy factor for said second image and said second image.

20. The method for image recognition as recited in claim 19, said method comprises:

displaying a targeted advertisement to a user on a computing, mobile, or communication device.

* * * * *